US012022119B2

(12) United States Patent
Lim et al.

(10) Patent No.: US 12,022,119 B2
(45) Date of Patent: Jun. 25, 2024

(54) IMAGE ENCODING/DECODING METHOD AND DEVICE USING SECONDARY TRANSFORM, AND RECORDING MEDIUM STORING BITSTREAM

(71) Applicant: Electronics and Telecommunications Research Institute, Daejeon (KR)

(72) Inventors: Sung Chang Lim, Daejeon (KR); Jung Won Kang, Daejeon (KR); Ha Hyun Lee, Seoul (KR); Jin Ho Lee, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 168 days.

(21) Appl. No.: 17/616,581

(22) PCT Filed: Jun. 18, 2020

(86) PCT No.: PCT/KR2020/007934
§ 371 (c)(1),
(2) Date: Dec. 3, 2021

(87) PCT Pub. No.: WO2020/256447
PCT Pub. Date: Dec. 24, 2020

(65) Prior Publication Data
US 2022/0264151 A1 Aug. 18, 2022

(30) Foreign Application Priority Data
Jun. 18, 2019 (KR) ........................ 10-2019-0072175
Jan. 17, 2020 (KR) ........................ 10-2020-0006637

(51) Int. Cl.
*H04N 19/61* (2014.01)
*H04N 19/11* (2014.01)
(Continued)

(52) U.S. Cl.
CPC ............. *H04N 19/61* (2014.11); *H04N 19/11* (2014.11); *H04N 19/176* (2014.11); *H04N 19/593* (2014.11); *H04N 19/91* (2014.11)

(58) Field of Classification Search
CPC ...... H04N 19/61; H04N 19/11; H04N 19/176; H04N 19/593; H04N 19/91
(Continued)

(56) References Cited

FOREIGN PATENT DOCUMENTS

| | | | |
|---|---|---|---|
| KR | 100772576 | B1 | 11/2007 |
| KR | 1020180001485 | A | 1/2018 |
| KR | 1020180063186 | A | 6/2018 |

OTHER PUBLICATIONS

Benjamin Bross et al., Versatile Video Coding (Draft 5), Joint Video Experts Team (JVET) of ITU-T SG 16 WP 3 and ISO/IEC JTC 1/SC 29/WG 11, Document: JVET-N1001-v8, 14th Meeting: Geneva, CH, Mar. 19-27, 2019.
(Continued)

*Primary Examiner* — Nguyen T Truong
(74) *Attorney, Agent, or Firm* — BROADVIEW IP LAW, PC

(57) ABSTRACT

Disclosed herein is a video decoding method including: obtaining a transform skip mode flag indicating whether or not a transform skip mode is applied to a current block; based on the transform skip mode flag, when a transform skip mode is applied to the current block, determining that secondary transform/inverse transform is not applied to the current block; and, according to the transform skip mode flag, when a transform skip mode is not applied to the current block, obtaining a transform matrix index for secondary transform/inverse transform of the current block and, according to the transform matrix index, determining whether or not secondary transform/inverse transform is applied to the current block.

12 Claims, 82 Drawing Sheets

(51) Int. Cl.
*H04N 19/176* (2014.01)
*H04N 19/593* (2014.01)
*H04N 19/91* (2014.01)

(58) Field of Classification Search
USPC .................................................... 375/240.02
See application file for complete search history.

(56) References Cited

OTHER PUBLICATIONS

Moonmo Koo et al., CE6: Reduced Secondary Transform (RST) (CE6-3.1), Joint Video Experts Team (JVET) of ITU-T SG 16 WP 3 and ISO/IEC JTC 1/SC 29/WG 11, Document: JVET-N0193, 14th Meeting: Geneva, CH, Mar. 19-27, 2019, LG Electronics Inc.

Takeshi Tsukuba et al., AHG13/Non-CE6/CE8: Chroma Transform Skip, Joint Video Experts Team (JVET) of ITU-T SG 16 WP 3 and ISO/IEC JTC 1/SC 29/WG 11, Document: JVET-N0123-v2, 14th Meeting: Geneva, CH, Mar. 19-27, 2019, Sony Corporation.

Bross (Fraunhofer) B et al.: "Non-CE8: Unified Transform Type Signalling and Residual Coding for Transform Skip", Jan. 2019 (Jan. 15, 2019), No. JVET-M0464 15,13. JVET Meeting; Jan. 9, 2019-Jan. 18, 2019; Marrakech; (The Joint Video Exploration Team of ISO/IEC TC1/SC29/WG11 and ITU-T SG.16), XP030202239.

Jianle Chen et al.: "Algorithm description for Versatile Video Coding and Test Model 5 (VTM 5)", Jun. 2019 (Jun. 11, 2019), pp. 1-76, No. JVET-N1002 11, 14. JVET Meeting; Mar. 19, 2019-Mar. 27, 2019; Geneva; (The Joint Video Exploration Team of ISO/IEC JTC1/SC29/WG1 1 and ITU-T SG. 16), XP030205562.

FIG. 9

| | | | | | | | |
|---|---|---|---|---|---|---|---|
| 9.76 | 9.62 | 9.6 | 9.86 | 9.81 | 10 | 9.85 | 10.1 |
| 9.74 | 9.68 | 9.44 | 9.68 | 9.59 | 9.74 | 9.64 | 9.91 |
| 9.82 | 9.65 | 9.3 | 9.49 | 9.27 | 9.5 | 9.5 | 9.86 |
| 9.79 | 9.63 | 9.26 | 9.46 | 9.27 | 9.61 | 9.58 | 10.1 |
| 9.78 | 9.79 | 9.44 | 9.43 | 9.26 | 9.54 | 9.46 | 9.87 |
| 9.68 | 9.8 | 9.48 | 9.48 | 9.26 | 9.6 | 9.41 | 9.72 |
| 9.75 | 9.78 | 9.47 | 9.52 | 9.36 | 9.63 | 9.42 | 9.67 |
| 9.93 | 9.87 | 9.63 | 9.77 | 9.62 | 9.7 | 9.5 | 9.87 |

| | | | | | | | |
|---|---|---|---|---|---|---|---|
| 9.76 | 9.62 | 9.6 | 9.86 | 9.81 | 10 | 9.85 | 10.1 |
| 9.74 | 9.68 | 9.44 | 9.68 | 9.59 | 9.74 | 9.64 | 9.91 |
| 9.82 | 9.65 | 9.3 | 9.49 | 9.27 | 9.5 | 9.5 | 9.86 |
| 9.79 | 9.63 | 9.26 | 9.46 | 9.27 | 9.61 | 9.58 | 10.1 |
| 9.78 | 9.79 | 9.44 | 9.43 | 9.26 | 9.54 | 9.46 | 9.87 |
| 9.68 | 9.8 | 9.48 | 9.48 | 9.26 | 9.6 | 9.41 | 9.72 |
| 9.75 | 9.78 | 9.47 | 9.52 | 9.36 | 9.63 | 9.42 | 9.67 |
| 9.93 | 9.87 | 9.63 | 9.77 | 9.62 | 9.7 | 9.5 | 9.87 |

FIG. 13

| | | | |
|---|---|---|---|
| a(0,0) | a(1,0) | a(2,0) | a(3,0) |
| a(0,1) | a(1,1) | a(2,1) | a(3,1) |
| a(0,2) | a(1,2) | a(2,2) | a(3,2) |
| a(0,3) | a(1,3) | a(2,3) | a(3,3) |

(a) before rearrangement

| | | | |
|---|---|---|---|
| a(3,3) | a(3,2) | a(3,1) | a(3,0) |
| a(2,3) | a(2,2) | a(2,1) | a(2,0) |
| a(1,3) | a(1,2) | a(1,1) | a(1,0) |
| a(0,3) | a(0,2) | a(0,1) | a(0,0) |

(b) after rearrangement

| | | | |
|---|---|---|---|
| a'(0,0) | a'(1,0) | a'(2,0) | a'(3,0) |
| a'(0,1) | a'(1,1) | a'(2,1) | a'(3,1) |
| a'(0,2) | a'(1,2) | a'(2,2) | a'(3,2) |
| a'(0,3) | a'(1,3) | a'(2,3) | a'(3,3) |

(c) rearranged data

FIG. 15

| | | | | | | | |
|---|---|---|---|---|---|---|---|
| 45 | 20 | 23 | 10 | 16 | 20 | 9 | 60 |
| 40 | 12 | 10 | 12 | 10 | 15 | 30 | 45 |
| 20 | 8 | 8 | 10 | 10 | 10 | 20 | 30 |
| 16 | 10 | 4 | 5 | 10 | 10 | 20 | 30 |
| 8 | 3 | 1 | 2 | 7 | 5 | 8 | 10 |
| 10 | 15 | 10 | 8 | 8 | 16 | 18 | 40 |
| 40 | 30 | 15 | 10 | 19 | 27 | 30 | 40 |
| 60 | 39 | 15 | 10 | 25 | 28 | 35 | 60 |

| | | | | | | | |
|---|---|---|---|---|---|---|---|
| 63 | 65 | 16 | 10 | 86 | 87 | 19 | −9 |
| 60 | 60 | 12 | 10 | 81 | 83 | 21 | −12 |
| 3 | 1 | −6 | 1 | 1 | 5 | 9 | −10 |
| 0 | −2 | −4 | 1 | −5 | −3 | 5 | −5 |
| 69 | 66 | 5 | −3 | 94 | 91 | 11 | −8 |
| 64 | 62 | 7 | −2 | 86 | 83 | 11 | −6 |
| 0 | 2 | 6 | 1 | −5 | −4 | 3 | 4 |
| 1 | 2 | 2 | 1 | −6 | −8 | −6 | 4 |

| | | | | | | | |
|---|---|---|---|---|---|---|---|
| 72 | −6 | 6 | 4 | 94 | −19 | 24 | −7 |
| −11 | 1 | 0 | −5 | 10 | 1 | −8 | 11 |
| 19 | 1 | −4 | 2 | 8 | −1 | 10 | −6 |
| −8 | 5 | 0 | 1 | 10 | −2 | −4 | 3 |
| 87 | −16 | 5 | 5 | 108 | −4 | 18 | −3 |
| −23 | 12 | −2 | 0 | −9 | −2 | −2 | −1 |
| 0 | −6 | 3 | 0 | −1 | 0 | 3 | 2 |
| 3 | −4 | 2 | −1 | −6 | 9 | −4 | 4 |

FIG. 18

| | | | | | | | |
|---|---|---|---|---|---|---|---|
| 63 | 62 | 61 | 60 | 59 | 58 | 57 | 56 |
| 36 | 35 | 34 | 33 | 32 | 31 | 30 | 55 |
| 37 | 16 | 15 | 14 | 13 | 12 | 29 | 54 |
| 38 | 17 | 4 | 3 | 2 | 11 | 28 | 53 |
| 39 | 18 | 5 | 0 | 1 | 10 | 27 | 52 |
| 40 | 19 | 6 | 7 | 8 | 9 | 26 | 51 |
| 41 | 20 | 21 | 22 | 23 | 24 | 25 | 50 |
| 42 | 43 | 44 | 45 | 46 | 47 | 48 | 49 |

(a)

| | | | | | | | |
|---|---|---|---|---|---|---|---|
| 60 | 61 | 52 | 53 | 48 | 49 | 40 | 41 |
| 62 | 63 | 54 | 55 | 50 | 51 | 42 | 43 |
| 56 | 57 | 0 | 1 | 2 | 3 | 16 | 18 |
| 58 | 59 | 4 | 5 | 6 | 7 | 17 | 19 |
| 44 | 45 | 8 | 9 | 10 | 11 | 20 | 21 |
| 46 | 47 | 12 | 13 | 14 | 15 | 22 | 23 |
| 36 | 37 | 24 | 25 | 28 | 29 | 32 | 33 |
| 38 | 39 | 26 | 27 | 30 | 31 | 34 | 35 |

(b)

| | | | | | | | |
|---|---|---|---|---|---|---|---|
| 0 | 2 | 3 | 9 | 10 | 20 | 21 | 35 |
| 1 | 4 | 8 | 11 | 19 | 22 | 34 | 36 |
| 5 | 7 | 12 | 18 | 23 | 33 | 37 | 48 |
| 6 | 13 | 17 | 24 | 32 | 38 | 47 | 49 |
| 14 | 16 | 25 | 31 | 39 | 46 | 50 | 57 |
| 15 | 26 | 30 | 40 | 45 | 51 | 56 | 58 |
| 27 | 29 | 41 | 44 | 52 | 55 | 59 | 62 |
| 28 | 42 | 43 | 53 | 54 | 60 | 61 | 63 |

Transformation process for scaled transform coefficients

Inputs to this process are:

- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1, y = 0..nTbH − 1.

Output of this process is the (nTbW)x(nTbH) array r[ x ][ y ] of residual samples with x = 0..nTbW − 1, y = 0..nTbH − 1.

The variable implicitMtsEnabled is derived as follows:

- If sps_mts_enabled_flag is equal to 1 and one of the following conditions is true, implicitMtsEnabled is set equal to 1:
  - IntraSubPartitionsSplitType is not equal to ISP_NO_SPLIT
  - cu_sbt_flag is equal to 1 and Max( nTbW, nTbH ) is less than or equal to 32
  - sps_explicit_mts_intra_enabled_flag and sps_explicit_mts_inter_enabled_flag are both equal to 0 and CuPredMode[ xTbY ][ yTbY ] is equal to MODE_INTRA
- Otherwise, implicitMtsEnabled is set equal to 0

The variable trTypeHor specifying the horizontal transform kernel and the variable trTypeVer specifying the vertical transform kernel are derived as follows:

- If cIdx is greater than 0, trTypeHor and trTypeVer are set equal to 0.
- Otherwise, if implicitMtsEnabled is equal to 1, the following applies:
  - If IntraSubPartitionsSplitType is not equal to ISP_NO_SPLIT or (sps_explicit_mts_intra_enabled_flag and sps_explicit_mts_inter_enabled_flag are equal to 0), trTypeHor and trTypeVer are derived as follows:
    - trTypeHor = ( nTbW >= 4 && nTbW <= 16 ) ? 1 : 0 (8-1030)
    - trTypeVer = ( nTbH >= 4 && nTbH <= 16 ) ? 1 : 0 (8-1031)
  - Otherwise, if cu_sbt_flag is equal to 1, trTypeHor and trTypeVer are specified in Table 8-14 depending on cu_sbt_horizontal_flag and cu_sbt_pos_flag.
- Otherwise, trTypeHor and trTypeVer are specified in Table 8-13 depending on tu_mts_idx[ xTbY ][ yTbY ].

The variables nonZeroW and nonZeroH are derived as follows:

nonZeroW = Min( nTbW, ( trTypeHor > 0 ) ? 16 : 32 ) (8-1032)

nonZeroH = Min( nTbH, ( trTypeVer > 0 ) ? 16 : 32 ) (8-1033)

FIG. 50

Transformation process for scaled transform coefficients

Inputs to this process are:

– a luma location ( xTbY, yTbY ) specifying the top-left sample of the current luma transform block relative to the top-left luma sample of the current picture – a variable nTbW specifying the width of the current transform block, – a variable nTbH specifying the height of the current transform block, a variable cIdx specifying the colour component of the current block, – an (nTbW)x(nTbH) array d[ x ][ y ] of scaled transform coefficients with x = 0..nTbW − 1, y = 0..nTbH − 1.

Output of this process is the (nTbW)x(nTbH) array r[ x ][ y ] of residual samples with x = 0..nTbW − 1, y = 0..nTbH − 1.

The variable implicitMtsEnabled is derived as follows:

– If sps_mts_enabled_flag is equal to 1 and one of the following conditions is true, implicitMtsEnabled is set equal to 1:

– IntraSubPartitionsSplitType is not equal to ISP_NO_SPLIT

– cu_sbt_flag is equal to 1 and Max( nTbW, nTbH ) is less than or equal to 32

– sps_explicit_mts_intra_enabled_flag and sps_explicit_mts_inter_enabled_flag are both equal to 0 and CuPredMode[ xTbY ][ yTbY ] is equal to MODE_INTRA – Otherwise, implicitMtsEnabled is set equal to 0.

The variable trTypeHor specifying the horizontal transform kernel and the variable trTypeVer specifying the vertical transform kernel are derived as follows:

– If cIdx is greater than 0, trTypeHor and trTypeVer are set equal to 0.

– Otherwise, if implicitMtsEnabled is equal to 1, the following applies:

– If IntraSubPartitionsSplitType is not equal to ISP_NO_SPLIT or (sps_explicit_mts_intra_enabled_flag and sps_explicit_mts_inter_enabled_flag are equal to 0 and CuPredMode[ xTbY ][ yTbY ] is equal to MODE_INTRA), trTypeHor and trTypeVer are derived as follows:

– trTypeHor = ( nTbW >= 4 && nTbW <= 16 ) ? 1 : 0 (8-1030)

– trTypeVer = ( nTbH >= 4 && nTbH <= 16 ) ? 1 : 0 (8-1031)

Otherwise, if cu_sbt_flag is equal to 1, trTypeHor and trTypeVer are specified in Table 8-14 depending on cu_sbt_horizontal_flag and cu_sbt_pos_flag.

– Otherwise, trTypeHor and trTypeVer are specified in Table 8-13 depending on tu_mts_idx[ xTbY ][ yTbY ].

The variables nonZeroW and nonZeroH are derived as follows:

nonZeroW = Min( nTbW, ( trTypeHor > 0 ) ? 16 : 32 ) (8-1032)

nonZeroH = Min( nTbH, ( trTypeVer > 0 ) ? 16 : 32 ) (8-1033)

FIG. 51

The (nTbW)x(nTbH) array r of residual samples is derived as follows:

1. When nTbH is greater than 1, each (vertical) column of scaled transform coefficients d[ x ][ y ] with x = 0..nonZeroW − 1, y = 0..nonZeroH − 1 is transformed to e[ x ][ y ] with x = 0..nonZeroW − 1, y = 0..nTbH − 1 by invoking the one-dimensional transformation process as specified in clause 8.7.4.2 for each column x = 0..nonZeroW − 1 with the height of the transform block nTbH, the non-zero height of the scaled transform coefficients nonZeroH, the list d[ x ][ y ] with y = 0..nonZeroH − 1 and the transform type variable trType set equal to trTypeVer as inputs, and the output is the list e[ x ][ y ] with y = 0..nTbH − 1.
2. When nTbH and nTbW are both greater than 1, the intermediate sample values g[ x ][ y ] with x = 0..nonZeroW − 1, y = 0..nTbH − 1 are derived as follows:

$$g[\,x\,][\,y\,] = \text{Clip3}(\,\text{CoeffMin},\ \text{CoeffMax},\ (\,e[\,x\,][\,y\,] + 64\,) >> 7\,) \quad (8\text{-}1034)$$

3. When nTbW is greater than 1, each (horizontal) row of the resulting array g[ x ][ y ] with x = 0..nonZeroW − 1, y = 0..nTbH − 1 is transformed to r[ x ][ y ] with x = 0..nTbW − 1, y = 0..nTbH − 1 by invoking the one-dimensional transformation process as specified in clause 8.7.4.2 for each row y = 0..nTbH − 1 with the width of the transform block nTbW, the non-zero width of the resulting array g[ x ][ y ] nonZeroW, the list g[ x ][ y ] with x = 0..nonZeroW − 1 and the transform type variable trType set equal to trTypeHor as inputs, and the output is the list r[ x ][ y ] with x = 0..nTbW − 1.

FIG. 52

Table 8-13 – Specification of trTypeHor and trTypeVer depending on tu_mts_idx[ x ][ y ]

| **tu_mts_idx[ x0 ][ y0 ]** | **0** | **1** | **2** | **3** | **4** |
|---|---|---|---|---|---|
| trTypeHor | 0 | 1 | 2 | 1 | 2 |
| trTypeVer | 0 | 1 | 1 | 2 | 2 |

FIG. 53

Table 8-14 – Specification of trTypeHor and trTypeVer depending on cu_sbt_horizontal_flag and cu_sbt_pos_flag

| **cu_sbt_horizontal_flag** | **cu_sbt_pos_flag** | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

$$T_{RxN} = \begin{bmatrix} t_{11} & t_{12} & t_{13} & \cdots & t_{1N} \\ t_{21} & t_{22} & t_{23} & & t_{2N} \\ & \vdots & & \ddots & \vdots \\ t_{R1} & t_{R2} & t_{R3} & \cdots & t_{RN} \end{bmatrix}$$

When nTrS is 16, lfnstTrSetIdx is 0 and lfnstIdx is 1, the following lowFreqTransMatrix is derived.
lowFreqTransMatrix[ m ][ n ] =

```
{
{ 106 -44 -15   1 -44  19   7  -1 -11   6   2  -1   0  -1  -1   0 }
{ -40 -97  56  12 -11  29 -12  -3  18  18 -15  -3  -1  -3   2   1 }
{  25 -31  -1   7 100 -16 -29   1 -54  21  14  -4  -7   2   4   0 }
{ -32 -39 -92  51  -6 -16  36  -8   3  22  18 -15   4   1  -5   2 }
{   8  -9  33  -8 -16 -102 36  23  -4  38 -27  -5   5  16  -8  -6 }
{ -25   5  16  -3 -38  14  11  -3 -97   7  26   1  55 -10 -19   3 }
{   8   9  16   1  37  36  94 -38  -7   3 -47  11  -6 -13 -17  10 }
{   2  34  -5   1  -7  24 -25  -3   8  99 -28 -29   6 -43  21  11 }
{ -16 -27 -39 -109  6  10  16  24   3  19  10  24  -4  -7  -2  -3 }
{  -9 -10 -34   4  -9  -5 -29   5 -33 -26 -96  33  14   4  39 -14 }
{ -13   1   4  -9 -30 -17  -3 -64 -35  11  17  19 -86   6  36  14 }
{   8  -7  -5 -15   7 -30 -28 -87  31   4   4  33  61  -5 -17  22 }
{  -2  13  -6  -4  -2  28 -13 -14  -3  37 -15  -3  -2 107 -36 -24 }
{   4   9  11  31   4   9  16  19  12  33  32  94  12   0  34 -45 }
{   2  -2   8 -16   8   5  28 -17   6  -7  18 -45  40  36  97  -8 }
{   0  -2   0 -10  -1  -7  -3 -35  -1  -7  -2 -32  -6 -35 -16 -112 }
},
```

Otherwise, when nTrS is 16, lfnstTrSetIdx is 0 and lfnstIdx is 2, the following lowFreqTransMatrix is derived.
lowFreqTransMatrix[ m ][ n ] =

```
{
{ 119 -30 -22  -3 -23  -2   3   2 -16   3   6   0  -3   2   1   0 }
{ -27 -101 31  17 -47   2  22   3  19  30  -7  -9   5   3  -5  -1 }
{   0  58  22 -15 -102  2  38   2  10 -13  -5   4  14  -1  -9   0 }
{  23   4  66 -11  22  89  -2 -26  13  -8 -38  -1  -9 -20  -2   8 }
{ -19  -5 -89   2 -26  76 -11 -17  20  13  18  -4   1 -15   3   5 }
{ -10  -1  -1   6  23  25  67  -7 -74   4  39  -5   0  -1 -20  -1 }
{ -17 -28  12  -8 -32  14 -53  -6 -66 -67  17  29   2   6  25   4 }
{   1 -24 -23   1  17  -7  52   9  50 -92 -15  27 -15 -10  -6   3 }
{  -6 -17  -2 -111  7 -17   8 -42   9  18  16  25  -4   2  -1  11 }
{   9   5  35   0   6  21  -9  34  44  -3 102  11  -7  13  11 -20 }
{   4  -5  -5 -10  15  19  -2   6   6 -12 -13   6  95  69 -29 -24 }
{  -6  -4  -9 -39   1  22   0 102 -19  19 -32  30 -16 -14  -8 -23 }
{   4  -4   7   8   4 -13 -18   5   0   0  21  22  58 -88 -54  28 }
{  -4  -7   0 -24  -7   0 -25   3  -3 -30   8 -76 -34   4 -80 -26 }
{   0   6   0  30  -6   1 -13 -23   1  20  -2  80 -44  37 -68   1 }
{   0   0  -1   5  -1  -7   1 -34  -2   3  -6  19   5 -38  11 -115 }
},
```

Otherwise, when nTrS is 16, lfnstTrSetIdx is 1 and lfnstIdx is 1, the following lowFreqTransMatrix is derived.
lowFreqTransMatrix[ m ][ n ] =

```
{ -111  39   4   3  44  11 -12  -1   7 -16  -5   2   3  -1   4   2 }
{  -47 -27  15  -1 -92  43  20  -2  20  39 -16  -5  10  -5 -13   2 }
{  -35 -23   4   4 -17 -72  32   6 -59  18  50  -6   0  40   0 -13 }
{   13  93 -27  -4 -48  13 -34   4 -52  11   1  10   3  16  -3   1 }
{  -11 -27   1   2 -47  -4 -36  10  -2 -85  14  29 -20  -2  57   4 }
{    0 -35  32  -2  26  60  -3 -17 -82   1 -30   0 -37  21   3  12 }
{  -17 -46 -92  14   7 -10 -39  29 -17  27 -28  17   1 -15 -13  17 }
{    4 -10 -23   4  16  58 -17  26  30  21  67   2 -13  59  13 -40 }
{    5 -20  32  -5   8  -3 -46  -7  -4   2 -15  24 100  44   0   5 }
{   -4  -1  38 -18  -7 -42 -63  -6  33  34 -23  15 -65  33 -20   2 }
{   -2 -10  35 -19   5   8 -44  14 -25  25  58  17   7 -84 -16 -18 }
{    5  13  18  34  11  -4  18  18   5  58  -3  42  -2 -10  85  38 }
{   -5  -7 -34 -83   2  -1  -4 -73   4  20  15 -12   4  -3  44  12 }
{    0   4  -2 -60   5   9  42  34   5 -14   9  80  -5  13 -38  37 }
{   -1   2   7 -57   3  -7   9  68  -9   6 -49 -20   6  -4  36 -64 }
{   -1   0 -12  23   1  -4  17 -53  -3   4 -21  72  -4  -8  -3 -83 }
},
```

Otherwise, when nTrS is 16, lfnstTrSetIdx is 1 and lfnstIdx is 2, the following lowFreqTransMatrix is derived.
lowFreqTransMatrix[ m ][ n ] =

```
{
{  88 -55   6  -3 -66  27   9  -2  11  11 -13   1  -2  -7   1   2 }
{ -58 -20  27  -2 -27  75 -29   0  47 -42 -11  11  -9  -3  19  -4 }
{ -51  23 -22   5 -63   3  37  -5   1  64 -35  -4  29 -31 -11  13 }
{ -27 -76  49  -2  40  14   9 -17 -56  36 -25   6  14   3  -6   8 }
{  19  -4 -36  22  52   7  36 -23  28 -17 -64  15  -5 -44  48   9 }
{  29  50  13 -10   1  34 -59   1 -51   4 -16  30  52 -33  24  -5 }
{ -12 -21 -74  43 -13  39  18  -5 -58 -35  27  -5  19  26   6  -5 }
{  19  38 -10  -5  28  66   0  -5  -4  19 -30 -26 -40  28 -60  37 }
{  -6  27  18  -5 -37 -18  12 -25 -44 -10 -38  37 -66  45  40  -7 }
{ -13 -28 -45 -39   0  -5 -39  69 -23  16 -12 -18 -50 -31  24  13 }
{  -1   8  24 -51 -15  -9  44  10 -28 -70 -12 -39  24 -18  -4  51 }
{  -8 -22 -17  33 -18 -45 -57 -27   0 -31 -30  29  -2 -13 -53  49 }
{   1  12  32  51  -8   8  -2 -31 -22   4  46 -39 -49 -67  14  17 }
{   4   5  24  60  -5 -14 -23  38   9   8 -34 -59  24  47  42  28 }
{  -1  -5 -20 -34   4   4 -15 -46  18  31  42  10  10  27  49  78 }
{  -3  -7 -22 -34  -5 -11 -36 -69  -1  -3 -25 -73   5   4   4 -49 }
},
```

Otherwise, when nTrS is 16, lfnstTrSetIdx is 2 and lfnstIdx is 1, the following lowFreqTransMatrix is derived.
lowFreqTransMatrix[ m ][ n ] =

```
{
{ -112  47  -2   2 -34  13   2   0  15  -7   1   0   8  -3  -1   0 }
{  29  -7   1  -1 -108  40   2   0 -45  13   4  -1   8  -5   1   0 }
{ -36 -87  69 -10 -17 -33  26  -2   7  14 -11   2   6   8  -7   0 }
{  28  -5   2  -2 -29  13  -2   0 103 -36  -4   1  48 -16  -4   1 }
{ -12 -24  15  -3  26  80 -61   9  15  54 -36   2   0  -4   6  -2 }
{  18  53  69 -74  14  24  28 -30  -6  -7 -11  12  -5  -7  -6   8 }
{   5  -1   2   0 -26   6   0   1  45  -9  -1   0 -113  28   8  -1 }
{ -13 -32  18  -2  15  34 -27   7 -25 -80  47  -1 -16 -50  28   2 }
{  -4 -13 -10  19  18  46  60 -48  16  33  60 -48   1   0   5  -2 }
{  15  33  63  89   8  15  25  40  -4  -8 -15  -8  -2  -6  -9  -7 }
{  -8 -24 -27  15  12  41  26 -29 -17 -50 -39  27   0  35 -67  26 }
{  -2  -6 -24  13  -1  -8  37 -22   3  18 -51  22 -23 -95  17  17 }
{  -3  -7 -16 -21  10  24  46  75   8  20  38  72   1   2   1   7 }
{   2   6  10  -3  -5 -16 -31  12   7  24  41 -16 -16 -41 -89  49 }
{   4   8  21  40  -4 -11 -28 -57   5  14  31  70   7  18  32  52 }
{   0   1   4  11  -2  -4 -13 -34   3   7  20  47  -6 -19 -42 -101 }
},
```

Otherwise, when nTrS is 16, lfnstTrSetIdx is 2 and lfnstIdx is 2, the following lowFreqTransMatrix is derived.
lowFreqTransMatrix[ m ][ n ] =

```
{
{ -99  39  -1   2  65 -20  -5   0 -15  -2   5  -1   0   3  -1   0 }
{  58  42 -33   3  33 -63  23  -1 -55  32   3  -5  21  -2  -8   3 }
{ -15  71 -44   5 -58 -29  25   3  62  -7  -4  -4 -19   4   0   1 }
{  46   5   4  -6  71 -12 -15   5  52 -38  13  -2 -63  23   3  -3 }
{ -14 -54 -29  29  25  -9  61 -29  27  44 -48   5 -27 -21  12   7 }
{  -3   3  69 -42 -11 -50 -26  26  24  63 -19  -5 -18 -22  12   0 }
{  17  16  -2   1  38  18 -12   0  62   1 -14   5  89 -42   8  -2 }
{  15  54  -8   6   6  60 -26  -8 -30  17 -38  22 -43 -45  42  -7 }
{  -6 -17 -55 -28   9  30  -8  58   4  34  41 -52 -16 -36 -20  16 }
{  -2  -1  -9 -79   7  11  48  44 -13 -34 -55   6  12  23  20 -11 }
{   7  29  14  -6  12  53  10 -11  14  59 -15  -3   5  71 -54  13 }
{  -5 -24 -53  15  -3 -15 -61  26   6  30 -16  23  13  56  44 -35 }
{   4   8  21  52  -1  -1  -5  29  -7 -17 -44 -84   8  20  31  39 }
{  -2 -11 -25  -4  -4 -21 -53   2  -5 -26 -64  19  -8 -19 -73  39 }
{  -3  -5 -23 -57  -2  -4 -24 -75   1   3   9 -25   6  15  41  61 }
{   1   1   7  18   1   2  16  47   2   5  24  67   3   9  25  88 }
},
```

Otherwise, when nTrS is 16, lfnstTrSetIdx is 3 and lfnstIdx is 1, the following lowFreqTransMatrix is derived.
lowFreqTransMatrix[ m ][ n ] =

```
{
{ -114  37   3   2 -22 -23  14   0  21 -17  -5   2   5   2  -4  -1 }
{  -19 -41  19  -2  85 -60 -11   7  17  31 -34   2 -11  19   2  -8 }
{   36 -25  18  -2 -42 -53  35   5  46 -60 -25  19   8  21 -33  -1 }
{  -27 -80  44  -3 -58   1 -29  19 -41  18 -12  -7  12 -17   7  -6 }
{  -11 -21  37 -10  44  -4  47 -12 -37 -41  58  18  10 -46 -16  31 }
{   15  47  10  -6 -16 -44  42  10 -80  25 -40  21 -23  -2   3 -14 }
{   13  25  79 -39 -13  10  31  -4  49  45  12  -8   3  -1  43   7 }
{   16  11 -26  13 -13 -74 -20  -1   5  -6  29 -47  26 -49  54   2 }
{   -8 -34 -26   7 -26 -19  29 -37   1  22  46  -9 -81  37  14  20 }
{   -6 -30 -42 -12  -3   5  57 -52  -2  37 -12   6  74  10   6 -15 }
{    5   9  -6  42 -15 -18  -9  26  15  58  14  43  23 -10 -37  75 }
{   -5 -23 -23  36   3  22  36  40  27  -4 -16  56 -25 -46  56 -24 }
{    1   3  23  73   8   5  34  46 -12   2  35 -38  26  52   2 -31 }
{   -3  -2 -21 -52   1 -10 -17  44 -19 -20  30  45  27  61  49  21 }
{   -2  -7 -33 -56  -4  -6  21  63  15  31  32 -22 -10 -26 -52 -38 }
{   -5 -12 -18 -12   8  22  38  36  -5 -15 -51 -63  -5   0  15  73 }
},
```

Otherwise, when nTrS is 16, lfnstTrSetIdx is 3 and lfnstIdx is 2, the following lowFreqTransMatrix is derived.
lowFreqTransMatrix[ m ][ n ] =

```
{
{ -102  22   7   2  66 -25  -6  -1 -15  14   1  -1   2  -2   1   0 }
{   12  93 -27  -6 -27 -64  36   6  13   5 -23   0  -2   6   5  -3 }
{  -59 -24  17   1 -62  -2  -3   2  83 -12 -17  -2 -24  14   7  -2 }
{  -33  23 -36  11 -21  50  35 -16 -23 -78  16  19  22  15 -30  -5 }
{    0 -38 -81  30  27   5  51 -32  24  36 -16  12 -24  -8   9   1 }
{   28  38   8  -9  62  32 -13   2  51 -32  15   5 -66  28   0  -1 }
{   11 -35  21 -17  30 -18  31  18 -11 -36 -80  12  16  49  13 -32 }
{  -13  23  22 -36 -12  64  39  25 -19  23 -36   9 -30 -58  33  -7 }
{   -9 -20 -55 -83   3  -2   1  62   8   2  27 -28   7  15 -11   5 }
{   -6  24 -38  23  -8  40 -49   0  -7   9 -25 -44  23  39  70  -3 }
{   12  17  17   0  32  27  21   2  67  11  -6 -10  89 -22 -12  16 }
{    2  -9   8  45   7  -8  27  35  -9 -31 -17 -87 -23 -22 -19  44 }
{   -1  -9  28 -24  -1 -10  49 -30  -8  -7  40   1   4  33  65  67 }
{    5 -12 -24 -17  13 -34 -32 -16  14 -67  -7   9   7 -74  49   1 }
{    2  -6  11  45   3 -10  33  55   8  -5  59   4   7  -4  44 -66 }
{   -1   1 -14  36  -1   2 -20  69   0   0 -15  72   3   4   5  65 }
},
```

Otherwise, when nTrS is 48, lfnstTrSetIdx is 0 and lfnstIdx is 1, the following lowFreqTransMatrix is derived.
lowFreqTransMatrix[ m ][ n ] = lowFreqTransMatrixCol0to15[ m ][ n ] with m = 0..15, n = 0..15
lowFreqTransMatrixCol0to15 =

```
{
{ -117  28  18   2   4   1   2   1  32 -18  -2   0  -1   0   0   0 }
{  -29 -91  47   1   9   0   3   0 -54  26  -8   3   0   1   0   0 }
{  -10  62 -11  -8  -2  -2  -1  -1 -95   3  32   0   4   0   2   0 }
{  -15  15 -10  -2   1   0   1   0  10 112 -20 -17  -4  -4  -1  -2 }
{   32  39  92 -44   4 -10   1  -4  26  12 -15  13  -5   2  -2   0 }
{  -10   1  50 -15   2  -3   1  -1 -28 -15  14   6   1   1   1   0 }
{    1 -33 -11 -14   7  -2   2   0  29 -12  37  -7  -4   0  -1   0 }
{    0   6  -6  21  -4   2   0   0 -20 -24 -104 30   5   5   1   2 }
{  -13 -13 -37 -101 29 -11   8  -3 -12 -15 -20   2 -11   5  -2   1 }
{    6   1 -14 -36   9  -3   2   0  10   9 -18  -1  -3   1   0   0 }
{  -12  -2 -26 -12  -9   2  -1   1  -3  30   4  34  -4   0  -1   0 }
{    0  -3   0  -4 -15   6  -3   1  -7 -15 -28 -86  19  -5   4  -1 }
{   -1   9  13   5  14  -2   2  -1  -8   3  -4 -62   4   1   1   0 }
{    6   2  -3   2  10  -1   2   0   8   3  -1 -20   0   1   0   0 }
{    6   9  -2  35 110 -22  11  -4  -2   0  -3   1 -18  12  -3   2 }
{   -1   7  -2   9 -11   5  -1   1  -7   2 -22   4 -13   0  -1   0 }
},
```

lowFreqTransMatrix[ m ][ n ] = lowFreqTransMatrixCol16to31[ m − 16 ][ n ] with m = 16..31, n = 0..15
lowFreqTransMatrixCol16to31 =

```
{
{  14  -1  -3   0  -1   0   0   0   2   0   0   0   0   0   0   0 }
{  33   5  -9  -1  -2   0  -1   0  -3   3   0   0   0   0   0   0 }
{  32 -30  -4   4  -1   1   0   0   6   2  -5   0   0   0   0   0 }
{ -20 -26  31   1   0   0   0   0   2 -16  -1   6   0   1   0   0 }
{  29 -16 -22   8   0   1   0   1 -20   6   4  -3   1   0   0   0 }
{ -99  -4   9   5   5   2   2   1  44 -10 -11   1  -2   0  -1   0 }
{   6 -99   3  26  -1   5   0   2  14  30 -27  -2   1  -1   0  -1 }
{  -7 -46  10 -14   7   0   1   0   9  21   7  -6  -2  -1   0  -1 }
{ -12  10  26  12  -6   0  -1   0 -32  -2  11   3   3  -1   1   0 }
{  38  26 -13  -1  -5  -1  -1   0 102   3 -14  -1  -5  -1  -2   0 }
{ -30   3 -92  14  19   0   3   0 -11  34  21 -33   1  -2   0  -1 }
{  -5 -17 -41  42  -6   2  -1   1  -1 -40  37  13  -4   2  -1   1 }
{ -12  23  16 -11 -17   0  -1   0 -11  97  -3  -3   0  -6   0  -2 }
{  -4   4 -16   0  -2   0   1   0  34  23   6  -7  -4  -2  -1   0 }
{  -5  -4 -22   8 -25   3   0   0  -3 -21   2  -3   9  -2   1   0 }
{   0  28   0  76   4  -6   0  -2 -13   5 -76  -4  33  -1   3   0 }
},
```

lowFreqTransMatrix[ m ][ n ] = lowFreqTransMatrixCol32to47[ m − 32 ][ n ] with m = 32..47, n = 0..15
lowFreqTransMatrixCol32to47 =

```
{
{   3   0  -1   0   1   0   0   0   1   0   0   0   1   0   0   0 }
{   7   2  -2   0  -1   1   0   0   2   1  -1   0   0   0   0   0 }
{   6  -3   0   0   2   0  -1   0   2  -1   0   0   1   0   0   0 }
{   1  -4   0   0   0  -3   0   1   0  -1   0   0   0  -2   0   0 }
{   1  -4  -3   2  -4   1   0   0   1  -1  -2   1  -2   0   0   0 }
{  -5   4  -3   0   8  -1  -2   0  -2   1  -1   0   4   0  -1   0 }
{  -6   6   6  -3   1   3  -3   0  -1   1   1   0   0   1  -1   0 }
{   2   2   5  -2   0   3   4  -1   0   0   1   0   0   1   2  -1 }
{  11  -5  -1   6  -4   2   1   0   3  -1   1   2  -1   0   0   0 }
{ -29  10  10   0  10  -4  -1   1  -7   1   2   1   2  -1   0   0 }
{  -9  -4  18   3   2   0   0  -2  -1  -1   3   0   0   0   0  -1 }
{ -10  13  -1  -4   4  -4   3   4  -2   2  -1  -1   1  -1   1   2 }
{ -21  -5  23   0   2  -2  -1   6  -3  -3   1   0   0   0   0   2 }
{ 108  -5 -30   6 -27  10   7  -2  11  -3  -1   1  -4   1   0   1 }
{  -7   1   3  -5   3   0  -1   0   0   1   0  -1   1   0   0   0 }
{   9  18  -3 -35  -4  -1   6   1   1   2   0  -3  -1   0   2   0 }
},
```

```
Otherwise, when nTrS is 48, lfnstTrSetIdx is 0 and lfnstIdx is 2, the following lowFreqTransMatrix is derived.
lowFreqTransMatrix[ m ][ n ] = lowFreqTransMatrixCol0to15[ m ][ n ] with m = 0..15, n = 0..15
lowFreqTransMatrixCol0to15 =
{
{ -108  48   9   1   1   1   0   0  44  -6  -9  -1  -1   0  -1   0 }
{  55  66 -37  -5  -6  -1  -2   0  67 -30 -20   4  -2   0  -1   0 }
{   2  86 -21 -13  -4  -2  -1  -1 -88   5   6   4   5   1   1   0 }
{ -24 -21 -38  19   0   4  -1   2 -23 -89  31  20   2   3   1   1 }
{   9  20  98 -26  -3  -5   0  -2  -9 -26  15 -16   2   0   1   0 }
{ -21  -7 -37  10   2   2  -1   1 -10  69  -5  -7  -2  -2   0  -1 }
{ -10 -25   4 -17   8  -2   2  -1 -27 -17 -71  25   8   2   1   1 }
{   2   5  10  64  -9   4  -3   1  -4   8  62   3 -17   1  -2   0 }
{ -11 -15 -28 -97   6  -1   4  -1   7   3  57 -15  10  -2   0  -1 }
{   9  13  24  -6   7  -2   1  -1  16  39  20  47  -2  -2  -2   0 }
{  -7  11  12   7   2  -1   0  -1 -14  -1 -24  11   2   0   0   0 }
{   0   0   7  -6  23  -3   3  -1   5   1  18  96  13  -9  -1  -1 }
{  -2  -6  -1 -10   0   1   1   0  -7  -2 -28  20 -15   4  -3   1 }
{  -1   6 -16   0  24  -3   1  -1   2   6   6  16  18  -7   1  -1 }
{  -5  -6  -3 -19 -104 18  -4   3   0   6   0  35 -41  20  -2   2 }
{  -1  -2   0  23  -9   0  -2   0   1   1   8  -1  29   1   1   0 }
},
lowFreqTransMatrix[ m ][ n ] = lowFreqTransMatrixCol16to31[ m − 16 ][ n ] with m = 16..31, n = 0..15
lowFreqTransMatrixCol16to31 =
{
{   9  -9  -1   1   0   0   0   0   3  -1   1   0   0   0   0   0 }
{ -31 -19  14   4   1   1   1   0  -6   3   5  -2   0   0   0   0 }
{  14  -5   0   3   0   0   0   0  10  -5  -2   0  -1   0   0   0 }
{ -30  26  36  -8  -2  -2   0  -1  14  18  -7  -9  -1  -1   0   0 }
{ -61  -3  -2   3   7   1   1   0  12  16  -6  -1   0  -1   0   0 }
{ -93   2  19   0   3   0   2   0  17   4   0   0  -1   0   0   0 }
{  -4 -66  28  36  -5   3   0   1 -10  20  33 -13  -8   0   0  -1 }
{  -3 -75   5 -14   1   4   0   1 -36   3  18  -4   4   0   1   0 }
{  -1 -27  13   6   1  -1   0   0 -34  -6   0   3   4   1   2   0 }
{  28  23  76  -5 -25  -3  -3  -1   6  36  -7 -39  -4  -1   0  -1 }
{ -20  48  11 -13  -5  -2   0  -1 -105 -19 17   0   6   2   3   0 }
{ -21  -7 -42  14 -24  -3   0   0  11 -47  -7   3  -5   9   1   2 }
{  -2 -32  -2 -66   3   7   1   2 -11  13 -70   5  43  -2   3   0 }
{  -3  11 -63   9   4  -5   2  -1 -22  94  -4  -6  -4  -4   1  -2 }
{  -2  10 -18  16  21   3  -2   0  -2  11   6 -10   6  -3  -1   0 }
{   3  -6  13  76  30 -11  -1  -2 -26  -8 -69   7  -9  -7   3  -1 }
},
lowFreqTransMatrix[ m ][ n ] = lowFreqTransMatrixCol32to47[ m − 32 ][ n ] with m = 32..47, n = 0..15
lowFreqTransMatrixCol32to47 =
{
{   1  -1   0   0   1   0   0   0   0  -1   0   0   0   0   0   0 }
{  -7  -1   1   0  -1   1   1   0  -2  -1   1   0   0   0   0   0 }
{   6  -5   0   1   2  -1   0   0   1  -1   0   0   1   0   0   0 }
{   1   3  -2  -1   3   2  -2  -1   0   1   0   0   1   1  -1   0 }
{   2   0  -8   1   3   1  -1   1   0  -1  -2   0   1   0  -1   0 }
{   5  -4  -2   0   4  -2   0   1   0   0   0   0   2  -1   0   0 }
{   3   6  -3  -7  -1   3   3  -1   1   0  -1   0   0   1   1  -1 }
{   1  14  -2  -8  -2   1  -3   0   2   2  -1  -2   0   1  -1   0 }
{  -2   8   1   5  -2   0  -3   1   1   1   0   2  -1   0  -1   0 }
{   2  -4 -18  -3  -1  -1  -2  -2   1  -2  -2   0   0   0  -1  -1 }
{ -14   8   8   2   1   2  -1  -2   3   0  -1   0   0   0   0   0 }
{   0  -1  19  -1   1   0  -1  -6  -1   1   2   0   1   0   0  -2 }
{   8 -14  -3  43  -1   2   7  -1   1  -2   1   3  -1   1   1   0 }
{  10  23 -19  -5   0  -6  -4   6   3  -2   1   1   0  -1   0   0 }
{  -1   5  -1  -6  -1  -1  -1  -1  -1   0   0   0   0   0   0  -1 }
{ -10 -34 -25  13  -1   0  11   5   1  -1   1  -2   0   0   2   0 }
},
```

FIG. 63

Otherwise, when nTrS is 48, lfnstTrSetIdx is 1 and lfnstIdx is 1, the following lowFreqTransMatrix is derived.

```
lowFreqTransMatrix[ m ][ n ] = lowFreqTransMatrixCol0to15[ m ][ n ] with m = 0..15, n = 0..15
lowFreqTransMatrixCol0to15 =
{
{ 110 -49  -3  -4  -1  -1   0  -1 -38  -1  10   0   2   0   1   0 }
{ -43 -19  17  -1   3   0   1   0 -98  46  14  -1   2   0   1   0 }
{ -19  17  -7   3  -2   1  -1   0 -32 -59  29   3   4   0   2   0 }
{ -35 -103 39   1   7   0   2   0  38 -13  25  -6   1  -1   0   0 }
{   9   5  -6  -1  -1   0  -1   0  42   4  21 -11   1  -3   1  -1 }
{  -5  -5 -28   9  -3   2  -1   1 -20 -78  22  16   1   3   0   1 }
{  14  17  27 -12   1  -3   1  -1   8  19 -13   4  -2   1  -1   0 }
{   7  35  17  -4  -1   0   0   0   3   8  54 -17   1  -2   1  -1 }
{ -13 -27 -101 24  -8   6  -3   2  11  43   6  28  -6   3  -1   1 }
{ -11 -13  -3 -10   3  -1   1   0 -19 -19 -37   8   4   2   0   1 }
{  -4 -10 -24 -11   3  -2   0  -1  -6 -37 -45 -17   8  -2   2  -1 }
{  -2   1  13 -17   3  -5   1  -2   3   0 -55  22   6   1   1   0 }
{   3   1   5 -15   1  -2   1  -1   7   4  -7  29  -1   2  -1   1 }
{  -4  -8  -1 -50   6  -4   2  -2  -1   5 -22  20   6   1   0   0 }
{   5  -1  26 102 -13  12  -4   4  -4  -2 -40  -7 -23   3  -5   1 }
{  -5  -6 -27 -22 -12   0  -3   0  -5   8 -20 -83   0   0   0   0 }
},
lowFreqTransMatrix[ m ][ n ] = lowFreqTransMatrixCol16to31[ m − 16 ][ n ] with m = 16..31, n = 0..15
lowFreqTransMatrixCol16to31 =
{
{  -9  13   1  -2   0   0   0   0  -4   2  -3   0   0   0   0   0 }
{  26  26 -15  -3  -2  -1  -1   0  11  -7  -9   2   0   0   0   0 }
{ -72  43  34  -9   3  -2   1  -1  13  36 -18 -10   0  -2   0  -1 }
{  -1   7   6  -7   1  -1   0   0 -13  14   2  -4   2  -1   0   0 }
{  21  70 -32 -21   0  -4  -1  -1  34 -26 -57  11   4   2   0   1 }
{  80  -6  25  -5  -4  -1  -1   0   6 -24   7  -9   0   0   0   0 }
{  48  -1  48 -15  -4  -2  -1  -1   1  60 -28 -42   5  -6   1  -2 }
{  10  14 -11 -34   4  -4   1  -1 -80  -7  -6   2  15   0   3   0 }
{  -3  14  21 -12  -7  -2  -1  -1 -23  10  -4 -12   3   0   1   0 }
{ -12 -30   3  -9   5   0   1   0 -56  -9 -47   8  21   1   4   1 }
{  17  14 -58  14  15   0   2   0 -10  34  -7  28   4  -1   1   0 }
{   8  74  21  40 -14   0  -2   0 -36  -8  11 -13 -23   1  -3   0 }
{   8   3  12 -14  -9  -1  -1   0   4  29 -15  31  10   4   1   1 }
{ -16 -15  18 -29 -11   2  -2   1  40 -45 -19 -22  31   2   4   1 }
{  -1   5   8 -23   7   2   1   1  10 -11 -13  -3  12  -3   2   0 }
{   9   7  24 -20  41   3   6   1  15  20  12  11  17  -9   1  -2 }
},
lowFreqTransMatrix[ m ][ n ] = lowFreqTransMatrixCol32to47[ m − 32 ][ n ] with m = 32..47, n = 0..15
lowFreqTransMatrixCol32to47 =
{
{  -2   2   0   1  -1   1   0   0  -1   1   0   0  -1   0   0   0 }
{   9  -3  -1   2   3  -3   0   0   4  -1   0   0   2  -1   0   0 }
{   3   0 -12   3   6   1  -3   2   1  -1  -2   0   3   1  -1   1 }
{  -2  11  -6  -2  -2   4  -3   0   0   3  -2   0  -1   1  -1   0 }
{  -4 -32   5  24   1  -6  12   4  -3  -2   4  -2   0  -1   0   0 }
{  -7   3  13  -4  -3   5   1  -5  -2   3   1  -2  -1   2  -1  -2 }
{  11 -11 -51  11  -2 -10  -2  13   2  -6  -4   4  -2  -3   2   2 }
{ -16  46   1   3   2   7 -24   0   2  -2  -5   8   1  -1  -2   2 }
{   2   9 -10   0   1  -5  -4   4   2  -2   2   2   0  -2   1   0 }
{ -11 -30  10  59  -2   8  41   8   2   5   6  -7  -1   3   5  -2 }
{  23  34 -31   4  10 -22 -30  22   4 -15   9  20   2  -5   9   4 }
{ -36   6  16 -14   2  19  -4 -12  -1   0  -7  -3   0   2  -2  -1 }
{  61  22  55  14  13   3  -9 -65   1 -11 -21  -7   0   0  -1   3 }
{ -25  41   0  12   9   7 -42  12  -3 -14   2  28   5   1   6   2 }
{  -9  23   4   9  14   9 -14  -4   0 -12  -7   6   3   0   6   3 }
{ -26  -1  18  -1 -12  32   3 -18  -5  10 -25  -5  -2   1  -8  10 }
},
```

FIG. 64

Otherwise, when nTrS is 48, lfnstTrSetIdx is 1 and lfnstIdx is 2, the following lowFreqTransMatrix is derived.

```
lowFreqTransMatrix[ m ][ n ] = lowFreqTransMatrixCol0to15[ m ][ n ] with m = 0..15, n = 0..15
lowFreqTransMatrixCol0to15 =
{
{  80 -49   6  -4   1  -1   1  -1 -72  36   4   0   1   0   0   0 }
{ -72  -6  17   0   3   0   1   0 -23  58 -21   2  -3   1  -1   0 }
{ -50  19 -15   4  -1   1  -1   1 -58  -2  30  -3   4  -1   2   0 }
{ -33 -43  28  -7   4  -2   2  -1 -38  11  -8   4   1   1   0   0 }
{  10  66 -21  -3  -3   0  -1   0 -53 -41  -2  16  -1   4  -1   1 }
{  18  14  13  -9   2  -2   1  -1  34  32 -31  12  -5   2  -2   1 }
{  21  66  -1   9  -4   2  -1   1 -21  41 -30 -10   0  -2   0  -1 }
{   1  -6 -24  17  -5   3  -2   1  24  10  39 -21   5  -4   2  -1 }
{   9  33 -24   1   4   0   1   0   6  50  26   1 -10   0  -2   0 }
{  -7  -9 -32  14  -3   3  -1   1 -23 -28   0  -5  -1   0   0   0 }
{   6  30  69 -18   5  -4   3  -1  -3 -11 -34 -16   9  -4   2  -1 }
{   1  -8  24  -3   7  -2   2  -1  -6 -51  -6  -4  -5   0  -1   0 }
{   4  10   4  17  -9   4  -2   1   5  14  32 -15   9  -3   2  -1 }
{  -3  -9 -23  10 -10   3  -3   1  -5 -14 -16 -27  13  -5   2  -1 }
{   2  11  22   2   9  -2   2   0  -6  -7  20 -32  -3  -4   0  -1 }
{   2  -3   8  14  -5   3  -1   1  -2 -11   5 -18   8  -3   2  -1 }
},
lowFreqTransMatrix[ m ][ n ] = lowFreqTransMatrixCol16to31[ m − 16 ][ n ] with m = 16..31, n = 0..15
lowFreqTransMatrixCol16to31 =
{
{  26   0 -12   2  -2   1  -1   0  -7  -9   6   1   0   0   0   0 }
{  55 -46  -1   6  -2   1  -1   0 -22   7  17  -7   2  -1   1   0 }
{   6  57 -34   0  -2   0  -1   0  34 -48  -2  14  -4   3  -1   1 }
{ -55  24  26  -5   2  -1   1   0  15  46 -40  -1  -1   0  -1   0 }
{  36  -5  41 -20   3  -3   1  -1 -30  26 -32  -3   7  -2   2  -1 }
{  40   4  -4  -9  -3  -2  -1  -1  27 -31 -43  19  -2   3  -1   1 }
{ -35 -17  -3  26  -6   5  -2   2  56   3  18 -25  -1  -2  -1  -1 }
{  33  32 -30   4  -3  -1  -1   0  -4  13 -16 -10   0  -1   0   0 }
{ -27   1 -28 -21  16  -5   3  -2 -23  36  -2  40 -17   4  -3   1 }
{ -36 -59 -24  14   4   2   1   1 -23 -26  23  26  -3   5   0   2 }
{ -16  35 -35  30  -9   3  -2   1 -57 -13   6   4  -5   5  -1   1 }
{  38  -1   0  25   6   2   1   1  47  20  35   1 -27   1  -5   0 }
{   7  13  19  15  -8   1  -1   0   3  25  30 -18   1  -2   0  -1 }
{  -1 -13 -30  11  -5   2  -1   0  -5  -8 -22 -16  10   0   1   0 }
{  13  -5 -28   6  18  -4   3  -1 -26  27 -14   6 -20   0  -2   0 }
{  12 -23 -19  22   2   0   1   0  23  41  -7  35 -10   4  -1   1 }
},
lowFreqTransMatrix[ m ][ n ] = lowFreqTransMatrixCol32to47[ m − 32 ][ n ] with m = 32..47, n = 0..15
lowFreqTransMatrixCol32to47 =
{
{   3   5  -1  -2  -2  -2  -1   1   1   1   0   0  -1  -1   0   0 }
{   9   5 -12   1  -3  -4   4   2   4   1  -2  -1  -1  -1   1   0 }
{ -10   7  21 -10   6   1 -11   0  -1  -1   4   2   3   0  -2  -1 }
{  17 -38   1  17  -3  11  15 -11   3  -1 -10   1   0   1   3   2 }
{  15  -8   1  17  -1  -2   4  -8   2   0  -1   3   0   0   0  -1 }
{   7 -49  52  10 -11  22   7 -26  -1  -6  -9   6  -2   2   4  -2 }
{ -15 -13 -27   9   9  -6  20   5  -3   2  -6  -9   3  -3   1   5 }
{  24 -26 -37  33   5 -32  55  -5  -7  22 -14 -22   1  -9  -3  13 }
{  43 -13   4 -41 -19  -2 -24  17  11  -4   8   4  -3  -3  -3  -3 }
{  10 -26  38   7 -12  11  42 -22  -5  20 -14 -15  -1  -2   1   6 }
{  28  10   4   7   0 -15   7 -10  -1   7  -2   2   1  -3   0   0 }
{  37 -37  -9 -47 -28   5   0  18   8   6   0  -6  -4  -3  -3   1 }
{  11  24  22 -11  -3  37 -13 -58  -5  12 -63  26   9 -15  11   8 }
{   0 -29 -27   6 -27 -10 -30   9  -3 -10  -7  77   9 -13  45  -8 }
{ -76 -26  -4  -7  12  51   5  24   7 -17 -16 -12  -5   4   2  13 }
{   5   7  23   5  69 -38  -8 -32 -15 -31  24  11   2  18  11 -15 }
},
```

FIG. 65

```
Otherwise, when nTrS is 48, lfnstTrSetIdx is 2 and lfnstIdx is 1, the following lowFreqTransMatrix is derived.
lowFreqTransMatrix[ m ][ n ] = lowFreqTransMatrixCol0to15[ m ][ n ] with m = 0..15, n = 0..15
lowFreqTransMatrixCol0to15 =
{
{ -121  33   4   4   1   2   0   1  -1  -1   1   0   0   0   0   0 }
{   0  -2   0   0   0   0   0   0 121 -23  -7  -3  -2  -1  -1   0 }
{ -20  19  -5   2  -1   1   0   0  16   3  -2   0   0   0   0   0 }
{  32 108 -43  10  -9   3  -3   1   4  19  -7   1  -1   0   0   0 }
{  -3   0  -1   0   0   0   0   0 -29  11  -2   1   0   0   0   0 }
{  -4 -12  -3   1  -1   0   0   0  19 105 -31   7  -6   1  -2   0 }
{   7   1   2   0   0   0   0   0   4   3  -2   0   0   0   0   0 }
{  -8 -31  14  -4   3  -1   1   0   9  43   0   1  -1   0   0   0 }
{ -15 -43 -100 23 -12   6  -4   2  -6 -17 -48  10  -5   2  -1   1 }
{  -3   1   2   0   0   0   0   0  -6   3   1   0   0   0   0   0 }
{  -1  -6  -3   2  -1   0   0   0  -6 -35   9   0   2   0   0   0 }
{  -5 -14 -48   2  -5   1  -2   0  10  24  99 -17  10  -4   3  -1 }
{  -2   0   2   0   0   0   0   0  -2   0   1   0   0   0   0   0 }
{  -2 -10  -4   0   0   0   0   0   3  11  -1  -1   0   0   0   0 }
{  -2  -3 -25  -2  -3   0  -1   0  -1  -3  -1   4  -2   2   0   1 }
{   4  -4  28 103 -42  24  -9   7   1   2   4   0   3  -1   0   0 }
},
lowFreqTransMatrix[ m ][ n ] = lowFreqTransMatrixCol16to31[ m − 16 ][ n ] with m = 16..31, n = 0..15
lowFreqTransMatrixCol16to31 =
{
{  24  -5  -1  -1   0   0   0   0   5  -1   0   0   0   0   0   0 }
{  17   1  -2   0   0   0   0   0 -27   4   2   0   0   0   0   0 }
{ -120  14   8   1   3   1   1   0 -18  -2   3   0   1   0   0   0 }
{  11 -30   9  -2   1  -1   0   0   0  -8   2   0   0   0   0   0 }
{  12   7  -1   0   0   0   0   0 -117 12   9   1   3   0   1   0 }
{   9  46  -6   0   0   0   0   0   8 -29   9  -3   1   0   0   0 }
{  22  -6   1  -1   0   0   0   0 -28  -9   4   0   1   0   0   0 }
{ -13 -105 17  -2   2   0   0   0  -8 -25  -3   0   0   0   0   0 }
{   1  -5  19  -6   3  -1   1   0   2   7  15  -3   1  -1   0   0 }
{   0   3  -2   0   0   0   0   0 -20   8  -2   0   0   0   0   0 }
{   1  -6  11  -2   2   0   1   0  -9 -100 17  -1   1   0   0   0 }
{   4  14  32   0   2   0   1   0  -4   0 -39   6  -4   1  -1   0 }
{  -1  -1   1  -1   0   0   0   0  -1  -4   2   0   0   0   0   0 }
{  -6 -40 -15   6  -2   1   0   0   5  57  -6   2   0   0   0   0 }
{  -7  -8 -97  17  -9   3  -3   1  -8 -26 -61  -1  -3  -1  -1  -1 }
{  -1   0  -9 -42  17  -9   3  -2  -1   1 -14   6  -4   2  -1   0 }
},
lowFreqTransMatrix[ m ][ n ] = lowFreqTransMatrixCol32to47[ m − 32 ][ n ] with m = 32..47, n = 0..15
lowFreqTransMatrixCol32to47 =
{
{   3  -1   0   0   2  -1   0   0   2  -1   0   0   1   0   0   0 }
{ -12   2   1   0  -5   1   0   0  -1   0   0   0  -2   0   0   0 }
{  17  -3  -1   0   6  -1  -1   0   2   0   0   0   2   0   0   0 }
{  -7  -1   2   0  -3  -1   1   0  -2  -2   1   0   0   0   0   0 }
{ -32  -3   3   0  12  -2  -1   0   7   0   0   0   1   0   0   0 }
{  -3 -19   3   0  -4  -6   1   0   0   0   0   0   0  -1   0   0 }
{ 117 -10  -8   0  32   1  -4   0   3   1  -1   0  -3   1   0   0 }
{  -7  32  -5   1  -1   4   0   0   2  -1   0   0   1   0  -1   0 }
{   4  10   5  -1   0   3   1   0  -2   1   2   0  -1   1   1   0 }
{  30  13  -3   0 -116  6  10   0 -35  -5   4   0  -3  -1   0   0 }
{ -10 -63   1   2 -17   3  -4   0  -1   9  -1   0   3   4  -1   0 }
{   2  -3  -4   0   2  -2  -2   0   0   0  -1   0   0  -1  -1   0 }
{  -8  -2  -1   1  30   4  -4   1 -102  4   8  -1 -69  -2   6  -1 }
{   1 -95  18  -6 -10 -34  -2   0  -4  17  -2   0   0   2   1   0 }
{   2  10  24  -7   5   9  19  -1   0   1   4   0  -2   0   1   0 }
{  -1  -2  -4   4   0   3   1  -1   0   2   0  -2   2   0   0   0 }
},
```

FIG. 66

Otherwise, when nTrS is 48, lfnstTrSetIdx is 2 and lfnstIdx is 2, the following lowFreqTransMatrix is derived.

```
lowFreqTransMatrix[ m ][ n ] = lowFreqTransMatrixCol0to15[ m ][ n ] with m = 0..15, n = 0..15
lowFreqTransMatrixCol0to15 =
{
{  87 -41   3  -4   1  -1   0  -1 -73  28   2   1   1   1   0   0 }
{ -75   4   7   0   2   0   1   0 -41  36  -7   3  -1   1   0   0 }
{  26 -44  22  -6   4  -2   1  -1  77  24 -22   2  -4   0  -1   0 }
{ -39 -68  37  -7   6  -2   2   0  -9  56 -21   1  -2   0  -1   0 }
{  10 -20   2   0   1   0   0   0  50  -1   8  -5   1  -1   0   0 }
{ -21 -45   8  -2   3  -1   1   0  -7 -30  26  -8   3  -1   1  -1 }
{  -4  -2 -55  28  -8   5  -3   2  -2  37  43 -19   1  -2   1  -1 }
{   2  19  47 -23   6  -4   2  -1 -23 -22 -44  17  -2   2  -1   0 }
{ -19 -62  -9   3   0   0   0   0 -12 -56  27  -7   3  -1   1   0 }
{   1   9  -5   0  -1   0   0   0   0  22  -1   2   0   1   0   0 }
{   5  17  -9   0  -2   1   0   0  13  54  -2   7  -1   1   0   0 }
{   7  27  56  -2  10  -3   3  -1  -2  -6   8 -28   3  -4   1  -1 }
{   0   0  19  -4   3  -2   2  -1  -3 -13  10  -4   1   0   0   0 }
{  -3   0 -27 -80  40 -16   6  -4   4   3  31  61 -22   7  -1   1 }
{   1   2  -8   6  -1   1   0   0   2   8  -5  -1   0   0   0   0 }
{  -4 -18 -57   8  -8   1  -3   0  -5 -20 -69   7  -6   2  -2   1 }
},
lowFreqTransMatrix[ m ][ n ] = lowFreqTransMatrixCol16to31[ m − 16 ][ n ] with m = 16..31, n = 0..15
lowFreqTransMatrixCol16to31 =
{
{  30  -5  -6   1  -1   0   0   0  -8  -3   3   0   0   0   0   0 }
{  72 -29  -2   0  -1   0  -1   0 -37   6   7  -2   1   0   0   0 }
{   7 -38  10   0   1   0   0   0 -51  27   4  -3   2  -1   1   0 }
{ -45   4  -3   6  -1   2   0   1  49 -13   3  -3  -1   0   0   0 }
{  66  17 -24   4  -3   1  -1   0  13 -49  15   1   0   0   0   0 }
{  -9  69 -33   5  -2   0  -1   0 -44 -31  10   7  -2   2   0   1 }
{ -47 -34 -27   5   4  -1   1   0 -39  -2  27   4  -2   1   0   0 }
{ -33   3  22  -2  -4   1  -1   0 -58 -17   6  -6   7  -1   1   0 }
{   7  -8  16  -6   4  -2   1  -1 -15  54 -23   2  -1   0   0   0 }
{ -13  17   0  -2   0  -1   0   0 -46 -10 -10   4  -1   1   0   0 }
{   4  51  -3  -6  -1  -1   0   0 -20   6 -34   9  -2   2  -1   0 }
{  -1  -4 -68  35  -5   5  -2   1   0  35  43  -4  -6   1  -1   0 }
{  -6 -37 -18  -5   2  -2   1  -1   6  -6  -7  25  -6   4  -1   1 }
{  -4  -7 -26  -6 -10   6  -4   1   3   8  14 -18  15  -5   2  -1 }
{   1  24   3   5  -1   1   0   0  -3  12   6 -10   1  -1   0   0 }
{   1   4   0  33  -7   5  -2   1   0  -9  53 -22   3  -1   0   0 }
},
lowFreqTransMatrix[ m ][ n ] = lowFreqTransMatrixCol32to47[ m − 32 ][ n ] with m = 32..47, n = 0..15
lowFreqTransMatrixCol32to47 =
{
{   3   2  -1   0  -2  -1   0   0   1   1   0   0  -1   0   0   0 }
{  12   3  -4   0  -3  -2   1   0   4   0   0   0  -1   0   0   0 }
{  31  -5  -8   3 -14   0   5  -1   6   1  -3   0  -4  -1   1   0 }
{ -19   2   0   0   5   1   1   0  -2   0  -1   0   1   0   0   0 }
{ -53  34   6  -5  30  -7 -11   3 -11  -2   5   1   4   2  -1  -1 }
{  49   7   2  -6 -23  -3  -2   2   9   4   0   0  -2  -1  -1   0 }
{ -11  32  -8  -7  27 -12  -6   6 -13   0   4  -3   3  -1  -2   1 }
{ -23  40  -2   5  43 -11  -8  -1 -18  -4   5   2   4   3   0  -1 }
{ -42 -25   4   6  34   8   2  -2 -15  -1   0  -1   3   2   0   1 }
{ -80 -27  20  -4 -66  23  -2  -2  20  -3  -2   3 -14   2   3  -1 }
{  16 -52  28   1  59  15  -8  -5 -28  -7   2   2  10   3   0  -1 }
{ -14 -38 -12 -10   9   5   7   6  -9   7  -4  -3   4  -4   0   3 }
{  16  10  55 -24  15  46 -52   1  35 -43  10  12 -23  13   5  -8 }
{  -2  -4  -1  13   0   2  -4  -3   3  -1   2   1  -2   0  -2  -1 }
{  -9  -1 -25  10  45 -11  18   2  86   1 -13  -4 -65  -6   7   2 }
{   4 -27  -2  -9   5  36 -13   5  -7 -17   1   2   4   6   4  -1 }
},
```

FIG. 67

Otherwise, when nTrS is 48, lfnstTrSetIdx is 3 and lfnstIdx is 1, the following lowFreqTransMatrix is derived.
lowFreqTransMatrix[ m ][ n ] = lowFreqTransMatrixCol0to15[ m ][ n ] with m = 0..15, n = 0..15
lowFreqTransMatrixCol0to15 =

```
{
{ -115  37   9   2   2   1   1   0  10 -29   8   0   1   0   1   0 }
{  15  51 -18   0  -3   0  -1   0 -95   7  34  -3   5  -1   2   0 }
{  29 -22  16  -6   3  -2   1  -1  -4 -80  12  15   0   3   0   1 }
{ -36 -98  25   5   4   1   2   1 -59  11 -17   1   1   1   0   0 }
{  -6  18   3  -3  -1   0   0   0 -50  -5 -38  12   0   2   0   1 }
{   4  15  52 -13   5  -3   2  -1 -17 -45  16  24  -2   4  -1   2 }
{ -20  -7 -43   4   0   1  -1   1  -7  35   0  12  -4   1  -1   0 }
{   4  29   1  26  -5   4  -2   1 -17  -7 -73   6   6   2   1   1 }
{  12  13  10   2  -1   3  -1   1  17  -2 -46  12   7   0   2   0 }
{   5  20  90 -17   4  -3   2  -1   6  66   8  28  -7   3  -1   1 }
{  -3  -4 -34 -12   2  -1  -1   0   5  25  11  43 -10   4  -2   1 }
{  -1  -3   2  19  -2   4  -1   2   9   3 -35  22  11   1   2   0 }
{  10  -4  -6  12   5   1   1   0  11  -9 -12  -2  -7   0  -1   0 }
{   4   6  14  53  -4   4   0   2   0  -1 -20 -13   3   2  -1   1 }
{   2   9  13  37  19   6   2   2  -9  -3  -9 -28 -20  -4  -3  -1 }
{   3  -3  12  84 -12   8  -2   3   6  13  50  -1  45   1   7   0 }
},
```

lowFreqTransMatrix [ m ][ n ] = lowFreqTransMatrixCol16to31[ m − 16 ][ n ] with m = 16..31, n = 0..15
lowFreqTransMatrixCol16to31 =

```
{
{  23  -8  -8   1  -1   0   0   0   3   3  -2  -1   0   0   0   0 }
{  23 -47   1   6   0   1   0   1   8   5 -12   0  -1   0   0   0 }
{  45   7 -59   7  -2   1  -1   0 -15  41  -3 -16   2  -3   0  -1 }
{   6 -13   7  -3   0   0   0   0  14  -4 -14   3  -1   0   0   0 }
{   3  67  -7 -40   3  -6   1  -3 -12 -13  65  -3 -10   0  -1   0 }
{ -87  -8 -14   7   8   1   2   0  23 -35  -6  -3   1   1   0   0 }
{ -51  -2 -57   5  15   0   4   0   7  39   5 -55   1  -7   1  -3 }
{  -5  21  -3   5  -1  -3   0  -1 -11   2 -52  -3  27  -2   5   0 }
{  16 -45  -9 -53   6   1   1   0  70  16   8  -4 -37   1  -7   0 }
{  29   5 -19  12   9  -1   1   0 -10  14  -1 -13   7   0   1   0 }
{  23  20 -40  12  21  -3   4  -1  25 -28 -10   5   8   6   0   2 }
{  -7 -65 -19 -22  11   4   2   1 -75 -18   3  -1 -10   2   0   1 }
{  33 -10  -4  18  18  -4   4  -1  28 -72   1 -49  15   2   2   1 }
{  -3   1  -5  35 -16  -6  -1  -2  46  29  13  21  37  -5   4  -1 }
{   1  18   9  28  24   6   2   2 -20  -5 -25 -33 -36   9  -2   2 }
{  -2  18 -22 -37 -13  14   0   3   1 -12  -3   2 -15  -8   1  -1 }
},
```

lowFreqTransMatrix[ m ][ n ] = lowFreqTransMatrixCol32to47[ m − 32 ][ n ] with m = 32..47, n = 0..15
lowFreqTransMatrixCol32to47 =

```
{
{   4   0   0  -1   1   1   0   0   2   0   0   0   0   0   0   0 }
{   3  -3   1  -1   2   1  -2   0   1  -1   0   0   1   1  -1   0 }
{   1   0   7  -2  -3   6   1  -2   0   0   1   0  -1   2   0  -1 }
{   2   8  -3  -5   2   0   0   0   0   3   0  -1   1   0   0   0 }
{   9 -20  -5  22  -2   0   0  -1   2  -3  -2   3  -1   0   1   0 }
{   2   5 -17   0   3  -1  -1  -5   0   1  -4   0   1   0   0  -2 }
{   1 -10  41   2   4  -3  -2   3  -1  -2   7   1   1  -1  -1   0 }
{   0  27   8 -58   2  -5  25   3   0   3   0  -5   0  -2   7   0 }
{ -12  29   3  21   4   0   5  -1  -3   4   1   4   2   0   1   0 }
{   0  -6  13  -4   0  -4   1   5   0  -1  -1   1   0  -1   0   0 }
{  -4  21 -64  -8  -5  19  10 -48   3  -1  10  -3   0   4   3  -6 }
{   2 -35 -27   4   1   8 -17 -19   3   0   3  -6   0   2  -1  -2 }
{  56 -23  22  -1   4  -1 -15  26   6   4 -10   0   0   2  -3   2 }
{ -10 -53 -18   8   9  12 -41 -25  -2   2  13 -16   4   1  -5   1 }
{ -13  42   1  57 -22  -2 -25 -28   5   6  19 -12  -5  -3  -2   4 }
{  19  14  -4 -12  -4   5  17   8   2  -4  -4   4  -2   2   1   0 }
},
```

Otherwise, when nTrS is 48, lfnstTrSetIdx is 3 and lfnstIdx is 2, the following lowFreqTransMatrix is derived.
lowFreqTransMatrix[ m ][ n ] = lowFreqTransMatrixCol0to15[ m ][ n ] with m = 0..15, n = 0..15
lowFreqTransMatrixCol0to15 =

```
{
{ 109 -26 -8 -3 -2 -1 -1 0 -50 28 2 1 0 0 0 0 }
{ -39 31 -5 2 -1 1 0 0 -95 6 18 0 4 0 1 0 }
{ 29 -3 -2 -2 0 0 0 0 0 -41 9 0 2 0 1 0 }
{ 18 96 -23 2 -5 1 -2 0 -10 6 10 -2 1 -1 1 0 }
{ -29 -60 16 -2 3 -1 1 0 -52 9 -17 5 -2 1 -1 1 }
{ -23 -5 -15 5 -2 1 -1 1 2 79 -13 -4 -2 -1 -1 0 }
{ -7 -3 12 -3 3 -1 1 0 -31 -62 8 7 0 2 0 1 }
{ 1 -26 5 0 1 0 1 0 24 -3 43 -6 4 -2 1 -1 }
{ 11 14 6 -3 1 -1 1 0 10 -7 -9 3 -2 1 -1 0 }
{ -10 -11 -47 3 -4 1 -1 0 5 28 11 -2 -1 0 0 0 }
{ -8 -24 -99 11 -10 3 -4 1 -5 -36 19 -26 4 -5 1 -2 }
{ -5 1 -1 0 1 0 0 0 -10 -14 -6 8 0 1 0 0 }
{ 1 12 -20 21 -4 5 -2 2 -5 -2 -75 9 -1 2 -1 1 }
{ 2 -9 -18 8 -3 3 -1 1 3 -25 -62 -6 0 -2 0 -1 }
{ 4 9 39 18 0 2 0 1 -6 -16 -22 -37 5 -5 1 -2 }
{ -7 -2 15 -6 1 -1 1 -1 -11 -3 22 -14 0 -2 1 -1 }
},
```

lowFreqTransMatrix[ m ][ n ] = lowFreqTransMatrixCol16to31[ m − 16 ][ n ] with m = 16..31, n = 0..15
lowFreqTransMatrixCol16to31 =

```
{
{ -18 -8 6 0 1 0 1 0 6 -2 -3 0 0 0 0 0 }
{ 32 -49 5 1 1 0 0 0 27 -1 -14 2 -2 1 -1 0 }
{ 86 4 -33 2 -6 1 -2 0 -32 58 1 -7 0 -2 0 -1 }
{ -14 26 2 -4 1 -1 0 0 -43 -9 35 -2 4 -1 1 0 }
{ 13 56 -2 -9 0 -2 0 -1 -34 -18 41 0 3 0 1 0 }
{ -9 1 5 -1 1 0 0 0 -4 49 2 -14 1 -3 0 -1 }
{ -75 9 -45 5 -1 1 -1 0 14 35 0 -23 2 -5 1 -2 }
{ -7 -64 9 14 0 3 0 1 -12 -4 5 3 -1 1 0 0 }
{ 22 21 1 -21 2 -4 1 -2 92 1 53 0 -9 1 -2 0 }
{ -12 -2 -38 2 0 1 0 0 16 38 11 -16 -1 -3 0 -2 }
{ 0 25 41 5 -3 1 0 0 10 -5 -7 12 2 1 0 0 }
{ -17 -2 7 -5 3 -1 0 0 -16 13 3 31 -1 6 0 2 }
{ -1 -2 -16 -4 0 -1 0 0 -7 7 -31 0 3 0 0 0 }
{ -6 -61 14 -51 2 -6 0 -2 -19 0 40 -7 -17 0 -3 0 }
{ -5 15 63 9 -16 0 -3 0 18 42 -18 27 15 1 3 1 }
{ -18 -7 30 -9 -4 0 -1 0 -35 23 23 10 -17 1 -3 0 }
},
```

lowFreqTransMatrix[ m ][ n ] = lowFreqTransMatrixCol32to47[ m − 32 ][ n ] with m = 32..47, n = 0..15
lowFreqTransMatrixCol32to47 =

```
{
{ -3 2 1 -1 0 0 0 0 -2 0 0 0 0 0 0 0 }
{ 3 5 -3 -2 4 1 -1 -1 2 0 0 0 2 0 0 0 }
{ -14 -8 20 0 -2 -3 0 4 -1 -1 0 0 -1 1 0 0 }
{ 14 -40 1 10 2 1 -10 1 2 -4 -1 -1 0 0 -1 0 }
{ 19 -36 -10 13 3 6 -14 -1 3 1 -1 -3 1 1 -1 -1 }
{ -31 -14 56 -1 13 -37 -4 20 -2 2 -10 0 2 -4 0 -1 }
{ 1 -8 32 -1 7 -12 -4 10 0 2 -6 -1 2 0 0 -2 }
{ 8 -59 -3 26 14 6 -58 6 -5 17 -7 -18 3 3 -1 -5 }
{ -21 -11 1 40 -5 -4 -24 5 -4 5 -6 -5 0 0 0 -3 }
{ 12 -9 -22 7 -8 60 4 -36 -6 -15 54 7 3 -7 -8 14 }
{ -1 1 9 -3 -3 -14 -3 12 2 4 -13 -2 -1 3 2 -4 }
{ -93 -15 -46 -3 23 -19 0 -47 8 4 8 3 2 3 0 0 }
{ 4 11 -12 4 -12 14 -50 -1 -8 32 -4 -54 2 0 30 -15 }
{ 13 -4 11 9 17 0 24 5 1 -12 4 28 0 0 -15 8 }
{ 12 -34 9 -24 4 28 -2 4 -11 -4 30 2 5 -13 -4 18 }
{ -19 53 6 48 -65 12 -12 11 -8 -16 10 -21 -2 -12 6 2 }
},
```

<table>
<tr><th>coding_unit( x0, y0, cbWidth, cbHeight, cqtDepth, treeType, modeType ) {</th><th>Descriptor</th></tr>
<tr><td>...</td><td></td></tr>
<tr><td>LfnstDcOnly = 1</td><td></td></tr>
<tr><td>LfnstZeroOutSigCoeffFlag = 1</td><td></td></tr>
<tr><td>MtsZeroOutSigCoeffFlag = 1</td><td></td></tr>
<tr><td>transform_tree( x0, y0, cbWidth, cbHeight, treeType, chType )</td><td></td></tr>
<tr><td>lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth )</td><td></td></tr>
<tr><td>lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight )</td><td></td></tr>
<tr><td>if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>transform_skip_flag[ x0 ][ y0 ][ 0 ] = = 0 &&<br>( treeType != DUAL_TREE_CHROMA || !intra_mip_flag[ x0 ][ y0 ] ||<br>Min( lfnstWidth, lfnstHeight ) >= 16 ) &&<br>Max( cbWidth, cbHeight ) <= MaxTbSizeY) {</td><td></td></tr>
<tr><td>if( ( IntraSubPartitionsSplitType != ISP_NO_SPLIT || LfnstDcOnly = = 0 ) &&<br>LfnstZeroOutSigCoeffFlag = = 1 )</td><td></td></tr>
<tr><td>lfnst_idx</td><td>ae(v)</td></tr>
<tr><td>}</td><td></td></tr>
<tr><td>if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) {</td><td></td></tr>
<tr><td>if( ( ( CuPredMode[ chType ][ x0 ][ y0 ] = = MODE_INTER &&<br>sps_explicit_mts_inter_enabled_flag ) ||<br>( CuPredMode[ chType ][ x0 ][ y0 ] = = MODE_INTRA &&<br>sps_explicit_mts_intra_enabled_flag ) ) )</td><td></td></tr>
<tr><td>mts_idx</td><td>ae(v)</td></tr>
<tr><td>}</td><td></td></tr>
<tr><td>}</td><td></td></tr>
</table>

FIG. 70

| transform_tree( x0, y0, tbWidth, tbHeight , treeType, chType ) { | Descriptor |
|---|---|
| InferTuCbfLuma = 1 | |
| if( IntraSubPartitionsSplitType = = ISP_NO_SPLIT && !cu_sbt_flag ) { | |
| if( tbWidth > MaxTbSizeY \|\| tbHeight > MaxTbSizeY ) { | |
| verSplitFirst = ( tbWidth > MaxTbSizeY && tbWidth > tbHeight ) ? 1 : 0 | |
| trafoWidth = verSplitFirst ? (tbWidth / 2) : tbWidth | |
| trafoHeight = !verSplitFirst ? (tbHeight / 2) : tbHeight | |
| transform_tree( x0, y0, trafoWidth, trafoHeight, treeType, chType ) | |
| if( verSplitFirst ) | |
| transform_tree( x0 + trafoWidth, y0, trafoWidth, trafoHeight, treeType, chType ) | |
| else | |
| transform_tree( x0, y0 + trafoHeight, trafoWidth, trafoHeight, treeType, chType ) | |
| } else { | |
| transform_unit( x0, y0, tbWidth, tbHeight, treeType, 0, chType ) | |
| } | |
| } else if( cu_sbt_flag ) { | |
| if( !cu_sbt_horizontal_flag ) { | |
| trafoWidth = tbWidth * SbtNumFourthsTb0 / 4 | |
| transform_unit( x0, y0, trafoWidth, tbHeight, treeType , 0, 0 ) | |
| transform_unit( x0 + trafoWidth, y0, tbWidth − trafoWidth, tbHeight, treeType, 1, 0 ) | |
| } else { | |
| trafoHeight = tbHeight * SbtNumFourthsTb0 / 4 | |
| transform_unit( x0, y0, tbWidth, trafoHeight, treeType , 0, 0 ) | |
| transform_unit( x0, y0 + trafoHeight, tbWidth, tbHeight − trafoHeight, treeType, 1, 0 ) | |
| } | |
| } else if( IntraSubPartitionsSplitType = = ISP_HOR_SPLIT ) { | |
| trafoHeight = tbHeight / NumIntraSubPartitions | |
| for( partIdx = 0; partIdx < NumIntraSubPartitions; partIdx++ ) | |
| transform_unit( x0, y0 + trafoHeight * partIdx, tbWidth, trafoHeight, treeType, partIdx, 0 ) | |
| } else if( IntraSubPartitionsSplitType = = ISP_VER_SPLIT ) { | |
| trafoWidth = tbWidth / NumIntraSubPartitions | |
| for( partIdx = 0; partIdx < NumIntraSubPartitions; partIdx++ ) | |
| transform_unit( x0 + trafoWidth * partIdx, y0, trafoWidth, tbHeight, treeType, partIdx, 0 ) | |
| } | |
| } | |

FIG. 71

| transform_unit( x0, y0, tbWidth, tbHeight, treeType, subTuIndex, chType ) { | Descriptor |
|---|---|
| if( IntraSubPartitionsSplitType != ISP_NO_SPLIT &&<br>treeType = = SINGLE_TREE && subTuIndex = = NumIntraSubPartitions − 1 ) { | |
| xC = CbPosX[ chType ][ x0 ][ y0 ] | |
| yC = CbPosY[ chType ][ x0 ][ y0 ] | |
| wC = CbWidth[ chType ][ x0 ][ y0 ] / SubWidthC | |
| hC = CbHeight[ chType ][ x0 ][ y0 ] / SubHeightC | |
| } else { | |
| xC = x0 | |
| yC = y0 | |
| wC = tbWidth / SubWidthC | |
| hC = tbHeight / SubHeightC | |
| } | |
| chromaAvailable = treeType != DUAL_TREE_LUMA && ChromaArrayType != 0 &&<br>( IntraSubPartitionsSplitType = = ISP_NO_SPLIT \|\|<br>( IntraSubPartitionsSplitType != ISP_NO_SPLIT &&<br>subTuIndex = = NumIntraSubPartitions − 1 ) ) | |
| if( ( treeType = = SINGLE_TREE \|\| treeType = = DUAL_TREE_CHROMA ) &&<br>ChromaArrayType != 0 ) { | |
| if( ( IntraSubPartitionsSplitType = = ISP_NO_SPLIT && !( cu_sbt_flag &&<br>( ( subTuIndex = = 0 && cu_sbt_pos_flag ) \|\|<br>( subTuIndex = = 1 && !cu_sbt_pos_flag ) ) ) ) \|\|<br>( IntraSubPartitionsSplitType != ISP_NO_SPLIT &&<br>( subTuIndex = = NumIntraSubPartitions − 1 ) ) ) { | |
| **tu_cbf_cb**[ xC ][ yC ] | ae(v) |
| **tu_cbf_cr**[ xC ][ yC ] | ae(v) |
| } | |
| } | |
| if( treeType = = SINGLE_TREE \|\| treeType = = DUAL_TREE_LUMA ) { | |
| if( ( IntraSubPartitionsSplitType = = ISP_NO_SPLIT && !( cu_sbt_flag &&<br>( ( subTuIndex = = 0 && cu_sbt_pos_flag ) \|\|<br>( subTuIndex = = 1 && !cu_sbt_pos_flag ) ) ) &&<br>( CuPredMode[ chType ][ x0 ][ y0 ] = = MODE_INTRA \|\|<br>( chromaAvailable && ( tu_cbf_cb[ xC ][ yC ] \|\| tu_cbf_cr[ xC ][ yC ] ) ) \|\|<br>CbWidth[ chType ][ x0 ][ y0 ] > MaxTbSizeY \|\|<br>CbHeight[ chType ][ x0 ][ y0 ] > MaxTbSizeY ) ) \|\|<br>( IntraSubPartitionsSplitType != ISP_NO_SPLIT &&<br>( subTuIndex < NumIntraSubPartitions − 1 \|\| !InferTuCbfLuma ) ) ) | |
| **tu_cbf_luma**[ x0 ][ y0 ] | ae(v) |
| if(IntraSubPartitionsSplitType != ISP_NO_SPLIT ) | |
| InferTuCbfLuma = InferTuCbfLuma && !tu_cbf_luma[ x0 ][ y0 ] | |
| } | |

FIG. 72

<table>
<tr><td>if( ( CbWidth[ chType ][ x0 ][ y0 ] > 64 || CbHeight[ chType ][ x0 ][ y0 ] > 64 ||<br>tu_cbf_luma[ x0 ][ y0 ] || ( chromaAvailable && ( tu_cbf_cb[ xC ][ yC ] ||<br>tu_cbf_cr[ xC ][ yC ] ) ) ) && treeType != DUAL_TREE_CHROMA ) {</td><td></td></tr>
<tr><td>if( cu_qp_delta_enabled_flag && !IsCuQpDeltaCoded ) {</td><td></td></tr>
<tr><td>cu_qp_delta_abs</td><td>ae(v)</td></tr>
<tr><td>if( cu_qp_delta_abs )</td><td></td></tr>
<tr><td>cu_qp_delta_sign_flag</td><td>ae(v)</td></tr>
<tr><td>}</td><td></td></tr>
<tr><td>}</td><td></td></tr>
<tr><td>if( ( CbWidth[ chType ][ x0 ][ y0 ] > 64 || CbHeight[ chType ][ x0 ][ y0 ] > 64 ||<br>( chromaAvailable && ( tu_cbf_cb[ xC ][ yC ] || tu_cbf_cr[ xC ][ yC ] ) ) ) &&<br>treeType != DUAL_TREE_LUMA ) {</td><td></td></tr>
<tr><td>if( cu_chroma_qp_offset_enabled_flag && !IsCuChromaQpOffsetCoded) {</td><td></td></tr>
<tr><td>cu_chroma_qp_offset_flag</td><td>ae(v)</td></tr>
<tr><td>if( cu_chroma_qp_offset_flag && chroma_qp_offset_list_len_minus1 > 0 )</td><td></td></tr>
<tr><td>cu_chroma_qp_offset_idx</td><td>ae(v)</td></tr>
<tr><td>}</td><td></td></tr>
<tr><td>}</td><td></td></tr>
<tr><td>if( sps_joint_cbcr_enabled_flag && ( ( CuPredMode[ chType ][ x0 ][ y0 ] = = MODE_INTRA<br>&& ( tu_cbf_cb[ xC ][ yC ] || tu_cbf_cr[ xC ][ yC ] ) ) ||<br>( tu_cbf_cb[ xC ][ yC ] && tu_cbf_cr[ xC ][ yC ] ) ) && chromaAvailable )</td><td></td></tr>
<tr><td>tu_joint_cbcr_residual_flag[ xC ][ yC ]</td><td>ae(v)</td></tr>
<tr><td>if( tu_cbf_luma[ x0 ][ y0 ] && treeType != DUAL_TREE_CHROMA ) {</td><td></td></tr>
<tr><td>if( sps_transform_skip_enabled_flag && !BdpcmFlag[ x0 ][ y0 ][ 0 ] &&<br>tbWidth <= MaxTsSize && tbHeight <= MaxTsSize &&<br>( IntraSubPartitionsSplit[ x0 ][ y0 ] = = ISP_NO_SPLIT ) && !cu_sbt_flag )</td><td></td></tr>
<tr><td>transform_skip_flag[ x0 ][ y0 ][ 0 ]</td><td>ae(v)</td></tr>
<tr><td>if( !transform_skip_flag[ x0 ][ y0 ][ 0 ] )</td><td></td></tr>
<tr><td>residual_coding( x0, y0, Log2( tbWidth ), Log2( tbHeight ), 0 )</td><td></td></tr>
<tr><td>else</td><td></td></tr>
<tr><td>residual_ts_coding( x0, y0, Log2( tbWidth ), Log2( tbHeight ), 0 )</td><td></td></tr>
<tr><td>}</td><td></td></tr>
<tr><td>if( tu_cbf_cb[ xC ][ yC ] && treeType != DUAL_TREE_LUMA ) {</td><td></td></tr>
<tr><td>if( sps_transform_skip_enabled_flag && !BdpcmFlag[ x0 ][ y0 ][ 1 ] &&<br>wC <= MaxTsSize && hC <= MaxTsSize && !cu_sbt_flag )</td><td></td></tr>
<tr><td>transform_skip_flag[ xC ][ yC ][ 1 ]</td><td>ae(v)</td></tr>
<tr><td>if( !transform_skip_flag[ xC ][ yC ][ 1 ] )</td><td></td></tr>
<tr><td>residual_coding( xC, yC, Log2( wC ), Log2( hC ), 1 )</td><td></td></tr>
<tr><td>else</td><td></td></tr>
<tr><td>residual_ts_coding( xC, yC, Log2( wC ), Log2( hC ), 1 )</td><td></td></tr>
<tr><td>}</td><td></td></tr>
<tr><td>if( tu_cbf_cr[ xC ][ yC ] && treeType != DUAL_TREE_LUMA &&<br>!( tu_cbf_cb[ xC ][ yC ] && tu_joint_cbcr_residual_flag[ xC ][ yC ] ) ) {</td><td></td></tr>
<tr><td>if( sps_transform_skip_enabled_flag && !BdpcmFlag[ x0 ][ y0 ][ 2 ] &&<br>wC <= MaxTsSize && hC <= MaxTsSize && !cu_sbt_flag )</td><td></td></tr>
<tr><td>transform_skip_flag[ xC ][ yC ][ 2 ]</td><td>ae(v)</td></tr>
<tr><td>if( !transform_skip_flag[ xC ][ yC ][ 2 ] )</td><td></td></tr>
<tr><td>residual_coding( xC, yC, Log2( wC ), Log2( hC ), 2 )</td><td></td></tr>
<tr><td>else</td><td></td></tr>
<tr><td>residual_ts_coding( xC, yC, Log2( wC ), Log2( hC ), 2 )</td><td></td></tr>
<tr><td>}</td><td></td></tr>
<tr><td>}</td><td></td></tr>
</table>

FIG. 73

| coding_unit( x0, y0, cbWidth, cbHeight, cqtDepth, treeType, modeType ) { | Descriptor |
| --- | --- |
| ... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth ) | |
| lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( treeType = = SINGLE_TREE && ( transform_skip_flag[ x0 ][ y0 ][ 0 ] = = 0 \| \| transform_skip_flag[ x0 ][ y0 ][ 1 ] = = 0 \| \| transform_skip_flag[ x0 ][ y0 ][ 2 ] = = 0 ) ) &&<br>( treeType = = DUAL_TREE_CHROMA \| \| ( !intra_mip_flag[ x0 ][ y0 ] \| \| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \| \| LfnstDcOnly = = 0 ) &&<br>LfnstZeroOutSigCoeffFlag = = 1 ) | |
| lfnst_idx | ae(v) |
| } | |
| if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) { | |
| if( ( ( CuPredMode[ chType ][ x0 ][ y0 ] = = MODE_INTER &&<br>sps_explicit_mts_inter_enabled_flag ) \| \|<br>( CuPredMode[ chType ][ x0 ][ y0 ] = = MODE_INTRA &&<br>sps_explicit_mts_intra_enabled_flag ) ) ) | |
| mts_idx | ae(v) |
| } | |
| } | |

FIG. 74

<table>
<tr><td>coding_unit( x0, y0, cbWidth, cbHeight, cqtDepth, treeType, modeType ) {</td><td>Descriptor</td></tr>
<tr><td>...</td><td></td></tr>
<tr><td>LfnstDcOnly = 1</td><td></td></tr>
<tr><td>LfnstZeroOutSigCoeffFlag = 1</td><td></td></tr>
<tr><td>MtsZeroOutSigCoeffFlag = 1</td><td></td></tr>
<tr><td>transform_tree( x0, y0, cbWidth, cbHeight, treeType, chType )</td><td></td></tr>
<tr><td>lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth )</td><td></td></tr>
<tr><td>lfnstHeight = ( treeType = = DUAL_TREE_CHROMA ) ? cbHeight / SubHeightC<br>: ( ( IntraSubPartitionsSplitType = = ISP_HOR_SPLIT ) ? cbHeight /<br>NumIntraSubPartitions : cbHeight )</td><td></td></tr>
<tr><td>if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( treeType = = DUAL_TREE_LUMA && transform_skip_flag[ x0 ][ y0 ][ 0 ] = = 0 ) &&<br>( treeType = = DUAL_TREE_CHROMA || ( intra_mip_flag[ x0 ][ y0 ] || Min( lfnstWidth, lfnstHeight ) >= 16 ) ) &&<br>Max( cbWidth, cbHeight ) <= MaxTbSizeY) {</td><td></td></tr>
<tr><td>if( ( IntraSubPartitionsSplitType != ISP_NO_SPLIT || LfnstDcOnly = = 0 ) &&<br>LfnstZeroOutSigCoeffFlag = = 1 )</td><td></td></tr>
<tr><td>lfnst_idx</td><td>ae(v)</td></tr>
<tr><td>}</td><td></td></tr>
<tr><td>if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) {</td><td></td></tr>
<tr><td>if( ( ( CuPredMode[ chType ][ x0 ][ y0 ] = = MODE_INTER &&<br>sps_explicit_mts_inter_enabled_flag ) ||<br>( CuPredMode[ chType ][ x0 ][ y0 ] = = MODE_INTRA &&<br>sps_explicit_mts_intra_enabled_flag ) ) )</td><td></td></tr>
<tr><td>mts_idx</td><td>ae(v)</td></tr>
<tr><td>}</td><td></td></tr>
<tr><td>}</td><td></td></tr>
</table>

FIG. 75

| coding_unit( x0, y0, cbWidth, cbHeight, cqtDepth, treeType, modeType ) { | Descriptor |
|---|---|
| ... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth ) | |
| lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( ( treeType = = SINGLE_TREE \|\| treeType = = DUAL_TREE_LUMA ) && transform_skip_flag[ x0 ][ y0 ][ 0 ] = = 0 ) &&<br>( treeType = = DUAL_TREE_CHROMA \|\| ( intra_mip_flag[ x0 ][ y0 ] \|\| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \|\| LfnstDcOnly = = 0 ) &&<br>LfnstZeroOutSigCoeffFlag = = 1 ) | |
| **lfnst_idx** | ae(v) |
| } | |
| if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) { | |
| if( ( ( CuPredMode[ chType ][ x0 ][ y0 ] = = MODE_INTER &&<br>sps_explicit_mts_inter_enabled_flag ) \|\|<br>( CuPredMode[ chType ][ x0 ][ y0 ] = = MODE_INTRA &&<br>sps_explicit_mts_intra_enabled_flag ) ) ) | |
| **mts_idx** | ae(v) |
| } | |
| } | |

FIG. 76

| coding_unit( x0, y0, cbWidth, cbHeight, cqtDepth, treeType, modeType ) { | Descriptor |
| --- | --- |
| ... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth ) | |
| lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( treeType = = DUAL_TREE_CHROMA && ( transform_skip_flag[ x0 ][ y0 ][ 1 ] = = 0 \|\| transform_skip_flag[ x0 ][ y0 ][ 2 ] = = 0 ) && ChromaArrayType != 0 ) &&<br>( treeType = = DUAL_TREE_CHROMA \|\| ( intra_mip_flag[ x0 ][ y0 ] \|\| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \|\| LfnstDcOnly = = 0 ) &&<br>LfnstZeroOutSigCoeffFlag = = 1 ) | |
| **lfnst_idx** | ae(v) |
| } | |
| if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) { | |
| if( ( ( CuPredMode[ chType ][ x0 ][ y0 ] = = MODE_INTER &&<br>sps_explicit_mts_inter_enabled_flag ) \|\|<br>( CuPredMode[ chType ][ x0 ][ y0 ] = = MODE_INTRA &&<br>sps_explicit_mts_intra_enabled_flag ) ) ) | |
| **mts_idx** | ae(v) |
| } | |
| } | |

FIG. 77

| coding_unit( x0, y0, cbWidth, cbHeight, cqtDepth, treeType, modeType ) { | Descriptor |
|---|---|
| ... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth ) | |
| lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( ( treeType = = SINGLE_TREE && ( transform_skip_flag[ x0 ][ y0 ][ 0 ] = = 0 \|\| transform_skip_flag[ x0 ][ y0 ][ 1 ] = = 0 \|\| transform_skip_flag[ x0 ][ y0 ][ 2 ] = = 0 ) ) \|\|<br>( treeType = = DUAL_TREE_LUMA && transform_skip_flag[ x0 ][ y0 ][ 0 ] = = 0 ) \|\|<br>( treeType = = DUAL_TREE_CHROMA && ( transform_skip_flag[ x0 ][ y0 ][ 1 ] = = 0 \|\| transform_skip_flag[ x0 ][ y0 ][ 2 ] = = 0 ) && ChromaArrayType != 0 ) ) &&<br>( treeType = = DUAL_TREE_CHROMA \|\| ( !intra_mip_flag[ x0 ][ y0 ] \|\| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \|\| LfnstDcOnly = = 0 ) &&<br>LfnstZeroOutSigCoeffFlag = = 1 ) | |
| **lfnst_idx** | ae(v) |
| } | |
| if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) { | |
| if( ( ( CuPredMode[ chType ][ x0 ][ y0 ] = = MODE_INTER &&<br>sps_explicit_mts_inter_enabled_flag ) \|\|<br>( CuPredMode[ chType ][ x0 ][ y0 ] = = MODE_INTRA &&<br>sps_explicit_mts_intra_enabled_flag ) ) ) | |
| **mts_idx** | ae(v) |
| } | |
| } | |

FIG. 78

| coding_unit( x0, y0, cbWidth, cbHeight, cqtDepth, treeType, modeType ) { | Descriptor |
|---|---|
| … | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth ) | |
| lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( ( treeType = = SINGLE_TREE && ( transform_skip_flag[ x0 ][ y0 ][ 0 ] = = 0 \|\| transform_skip_flag[ x0 ][ y0 ][ 1 ] = = 0 \|\| transform_skip_flag[ x0 ][ y0 ][ 2 ] = = 0 ) ) \|\|<br>(( treeType = = SINGLE_TREE \|\| treeType = = DUAL_TREE_LUMA ) && transform_skip_flag[ x0 ][ y0 ][ 0 ] = = 0 ) \|\|<br>( treeType = = DUAL_TREE_CHROMA && ( transform_skip_flag[ x0 ][ y0 ][ 1 ] = = 0 \|\| transform_skip_flag[ x0 ][ y0 ][ 2 ] = = 0 ) && ChromaArrayType != 0 ) ) &&<br>( treeType = = DUAL_TREE_CHROMA \|\| ( intra_mip_flag[ x0 ][ y0 ] \|\| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \|\| LfnstDcOnly = = 0 ) &&<br>LfnstZeroOutSigCoeffFlag = = 1 ) | |
| **lfnst_idx** | ae(v) |
| } | |
| if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) ) | |
| if( ( ( CuPredMode[ chType ][ x0 ][ y0 ] = = MODE_INTER &&<br>sps_explicit_mts_inter_enabled_flag ) \|\|<br>( CuPredMode[ chType ][ x0 ][ y0 ] = = MODE_INTRA &&<br>sps_explicit_mts_intra_enabled_flag ) ) ) | |
| **mts_idx** | ae(v) |
| } | |
| } | |

FIG. 79

| coding_unit( x0, y0, cbWidth, cbHeight, cqtDepth, treeType, modeType ) { | Descriptor |
|---|---|
| … | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth ) | |
| lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( ( ( treeType = = SINGLE_TREE \|\| treeType = = DUAL_TREE_LUMA ) && transform_skip_flag[ x0 ][ y0 ][ 0 ] = = 0 ) \|\|<br>( treeType = = DUAL_TREE_CHROMA && ( transform_skip_flag[ x0 ][ y0 ][ 1 ] = = 0 \|\| transform_skip_flag[ x0 ][ y0 ][ 2 ] = = 0 ) && ChromaArrayType != 0 ) ) &&<br>( treeType = = DUAL_TREE_CHROMA \|\| ( !intra_mip_flag[ x0 ][ y0 ] \|\| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \|\| LfnstDcOnly = = 0 ) &&<br>LfnstZeroOutSigCoeffFlag = = 1 ) | |
| **lfnst_idx** | ae(v) |
| } | |
| if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) { | |
| if( ( ( CuPredMode[ chType ][ x0 ][ y0 ] = = MODE_INTER &&<br>sps_explicit_mts_inter_enabled_flag ) \|\|<br>( CuPredMode[ chType ][ x0 ][ y0 ] = = MODE_INTRA &&<br>sps_explicit_mts_intra_enabled_flag ) ) ) | |
| **mts_idx** | ae(v) |
| } | |
| } | |

FIG. 80

| coding_unit( x0, y0, cbWidth, cbHeight, cqtDepth, treeType, modeType ) { | Descriptor |
|---|---|
| ... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth ) | |
| lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( treeType = = SINGLE_TREE && ( transform_skip_flag[ x0 ][ y0 ][ 0 ] = = 0 && transform_skip_flag[ x0 ][ y0 ][ 1 ] = = 0 && transform_skip_flag[ x0 ][ y0 ][ 2 ] = = 0 ) ) &&<br>( treeType = = DUAL_TREE_CHROMA \|\| ( !intra_mip_flag[ x0 ][ y0 ] \|\| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \|\| LfnstDcOnly = = 0 ) &&<br>LfnstZeroOutSigCoeffFlag = = 1 ) | |
| lfnst_idx | ae(v) |
| } | |
| if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) { | |
| if( ( ( CuPredMode[ chType ][ x0 ][ y0 ] = = MODE_INTER &&<br>sps_explicit_mts_inter_enabled_flag ) \|\|<br>( CuPredMode[ chType ][ x0 ][ y0 ] = = MODE_INTRA &&<br>sps_explicit_mts_intra_enabled_flag ) ) ) | |
| mts_idx | ae(v) |
| } | |
| } | |

FIG. 81

<table>
<tr><td>coding_unit( x0, y0, cbWidth, cbHeight, cqtDepth, treeType, modeType ) {</td><td>Descriptor</td></tr>
<tr><td>...</td><td></td></tr>
<tr><td>LfnstDcOnly = 1</td><td></td></tr>
<tr><td>LfnstZeroOutSigCoeffFlag = 1</td><td></td></tr>
<tr><td>MtsZeroOutSigCoeffFlag = 1</td><td></td></tr>
<tr><td>transform_tree( x0, y0, cbWidth, cbHeight, treeType, chType )</td><td></td></tr>
<tr><td>lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth )</td><td></td></tr>
<tr><td>lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight )</td><td></td></tr>
<tr><td>if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( treeType = = SINGLE_TREE && transform_skip_flag[ x0 ][ y0 ][ 0 ] = = 0 ) &&<br>( treeType = = DUAL_TREE_CHROMA || ( !intra_mip_flag[ x0 ][ y0 ] || Min( lfnstWidth, lfnstHeight ) >= 16 ) ) &&<br>Max( cbWidth, cbHeight ) <= MaxTbSizeY) {</td><td></td></tr>
<tr><td>if( ( IntraSubPartitionsSplitType != ISP_NO_SPLIT || LfnstDcOnly = = 0 ) &&<br>LfnstZeroOutSigCoeffFlag = = 1 )</td><td></td></tr>
<tr><td>lfnst_idx</td><td>ae(v)</td></tr>
<tr><td>}</td><td></td></tr>
<tr><td>if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) {</td><td></td></tr>
<tr><td>if( ( ( CuPredMode[ chType ][ x0 ][ y0 ] = = MODE_INTER &&<br>sps_explicit_mts_inter_enabled_flag ) ||<br>( CuPredMode[ chType ][ x0 ][ y0 ] = = MODE_INTRA &&<br>sps_explicit_mts_intra_enabled_flag ) ) )</td><td></td></tr>
<tr><td>mts_idx</td><td>ae(v)</td></tr>
<tr><td>}</td><td></td></tr>
<tr><td>}</td><td></td></tr>
</table>

FIG. 82

| coding_unit( x0, y0, cbWidth, cbHeight, cqtDepth, treeType, modeType ) { | Descriptor |
|---|---|
| ... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth ) | |
| lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( treeType = = DUAL_TREE_LUMA && transform_skip_flag[ x0 ][ y0 ][ 0 ] = = 0 ) &&<br>( treeType = = DUAL_TREE_CHROMA \|\| ( intra_mip_flag[ x0 ][ y0 ] \|\| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \|\| LfnstDcOnly = = 0 ) &&<br>LfnstZeroOutSigCoeffFlag = = 1 ) | |
| **lfnst_idx** | ae(v) |
| } | |
| if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) { | |
| if( ( CuPredMode[ chType ][ x0 ][ y0 ] = = MODE_INTER &&<br>sps_explicit_mts_inter_enabled_flag ) \|\|<br>( CuPredMode[ chType ][ x0 ][ y0 ] = = MODE_INTRA &&<br>sps_explicit_mts_intra_enabled_flag ) ) ) | |
| **mts_idx** | ae(v) |
| } | |
| } | |

FIG. 83

| coding_unit( x0, y0, cbWidth, cbHeight, cqtDepth, treeType, modeType ) { | Descriptor |
|---|---|
| ... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth ) | |
| lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( ( treeType = = SINGLE_TREE \|\| treeType = = DUAL_TREE_LUMA ) && transform_skip_flag[ x0 ][ y0 ][ 0 ] = = 0 ) &&<br>( treeType = = DUAL_TREE_CHROMA \|\| ( !intra_mip_flag[ x0 ][ y0 ] \|\| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \|\| LfnstDcOnly = = 0 ) &&<br>LfnstZeroOutSigCoeffFlag = = 1 ) | |
| lfnst_idx | ae(v) |
| } | |
| if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) { | |
| if( ( ( CuPredMode[ chType ][ x0 ][ y0 ] = = MODE_INTER &&<br>sps_explicit_mts_inter_enabled_flag ) \|\|<br>( CuPredMode[ chType ][ x0 ][ y0 ] = = MODE_INTRA &&<br>sps_explicit_mts_intra_enabled_flag ) ) ) | |
| mts_idx | ae(v) |
| } | |
| } | |

FIG. 84

| coding_unit( x0, y0, cbWidth, cbHeight, cqtDepth, treeType, modeType ) { | Descriptor |
|---|---|
| … | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth ) | |
| lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( treeType = = DUAL_TREE_CHROMA && ( transform_skip_flag[ x0 ][ y0 ][ 1 ] = = 0 && transform_skip_flag[ x0 ][ y0 ][ 2 ] = = 0 ) ) &&<br>( treeType = = DUAL_TREE_CHROMA \|\| ( !intra_mip_flag[ x0 ][ y0 ] \|\| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \|\| LfnstDcOnly = = 0 ) &&<br>LfnstZeroOutSigCoeffFlag = = 1 ) | |
| lfnst_idx | ae(v) |
| } | |
| if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) { | |
| if( ( ( CuPredMode[ chType ][ x0 ][ y0 ] = = MODE_INTER &&<br>sps_explicit_mts_inter_enabled_flag ) \|\|<br>( CuPredMode[ chType ][ x0 ][ y0 ] = = MODE_INTRA &&<br>sps_explicit_mts_intra_enabled_flag ) ) ) | |
| mts_idx | ae(v) |
| } | |
| } | |

FIG. 85

| coding_unit( x0, y0, cbWidth, cbHeight, cqtDepth, treeType, modeType ) { | Descriptor |
|---|---|
| ... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth ) | |
| lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( treeType = = DUAL_TREE_CHROMA && ( transform_skip_flag[ x0 ][ y0 ][ 1 ] = = 0 && transform_skip_flag[ x0 ][ y0 ][ 2 ] = = 0 ) && ChromaArrayType != 0 ) &&<br>( treeType = = DUAL_TREE_CHROMA \|\| ( intra_mip_flag[ x0 ][ y0 ] \|\| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \|\| LfnstDcOnly = = 0 ) &&<br>LfnstZeroOutSigCoeffFlag = = 1 ) | |
| **lfnst_idx** | ae(v) |
| } | |
| if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) { | |
| if( ( ( CuPredMode[ chType ][ x0 ][ y0 ] = = MODE_INTER &&<br>sps_explicit_mts_inter_enabled_flag ) \|\|<br>( CuPredMode[ chType ][ x0 ][ y0 ] = = MODE_INTRA &&<br>sps_explicit_mts_intra_enabled_flag ) ) ) | |
| **mts_idx** | ae(v) |
| } | |
| } | |

FIG. 86

<table>
<tr><td>coding_unit( x0, y0, cbWidth, cbHeight, cqtDepth, treeType, modeType ) {</td><td>Descriptor</td></tr>
<tr><td>...</td><td></td></tr>
<tr><td>LfnstDcOnly = 1</td><td></td></tr>
<tr><td>LfnstZeroOutSigCoeffFlag = 1</td><td></td></tr>
<tr><td>MtsZeroOutSigCoeffFlag = 1</td><td></td></tr>
<tr><td>transform_tree( x0, y0, cbWidth, cbHeight, treeType, chType )</td><td></td></tr>
<tr><td>lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth )</td><td></td></tr>
<tr><td>lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight )</td><td></td></tr>
<tr><td>if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( ( treeType = = SINGLE_TREE && ( transform_skip_flag[ x0 ][ y0 ][ 0 ] = = 0 && transform_skip_flag[ x0 ][ y0 ][ 1 ] = = 0 && transform_skip_flag[ x0 ][ y0 ][ 2 ] = = 0 ) ) ||<br>( treeType = = DUAL_TREE_LUMA && transform_skip_flag[ x0 ][ y0 ][ 0 ] = = 0 ) ||<br>( treeType = = DUAL_TREE_CHROMA && ( transform_skip_flag[ x0 ][ y0 ][ 1 ] = = 0 && transform_skip_flag[ x0 ][ y0 ][ 2 ] = = 0 ) && ChromaArrayType != 0 ) ) &&<br>( treeType = = DUAL_TREE_CHROMA || ( !intra_mip_flag[ x0 ][ y0 ] || Min( lfnstWidth, lfnstHeight ) >= 16 ) ) &&<br>Max( cbWidth, cbHeight ) <= MaxTbSizeY ) {</td><td></td></tr>
<tr><td>if( ( IntraSubPartitionsSplitType != ISP_NO_SPLIT || LfnstDcOnly = = 0 ) &&<br>LfnstZeroOutSigCoeffFlag = = 1 )</td><td></td></tr>
<tr><td>lfnst_idx</td><td>ae(v)</td></tr>
<tr><td>}</td><td></td></tr>
<tr><td>if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) {</td><td></td></tr>
<tr><td>if( ( ( CuPredMode[ chType ][ x0 ][ y0 ] = = MODE_INTER &&<br>sps_explicit_mts_inter_enabled_flag ) ||<br>( CuPredMode[ chType ][ x0 ][ y0 ] = = MODE_INTRA &&<br>sps_explicit_mts_intra_enabled_flag ) ) )</td><td></td></tr>
<tr><td>mts_idx</td><td>ae(v)</td></tr>
<tr><td>}</td><td></td></tr>
<tr><td>}</td><td></td></tr>
</table>

FIG. 87

| coding_unit( x0, y0, cbWidth, cbHeight, cqtDepth, treeType, modeType ) { | Descriptor |
|---|---|
| ... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth ) | |
| lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( ( treeType = = SINGLE_TREE && ( transform_skip_flag[ x0 ][ y0 ][ 0 ] = = 0 && transform_skip_flag[ x0 ][ y0 ][ 1 ] = = 0 && transform_skip_flag[ x0 ][ y0 ][ 2 ] = = 0 ) ) \|\|<br>( treeType = = DUAL_TREE_LUMA && transform_skip_flag[ x0 ][ y0 ][ 0 ] = = 0 ) \|\|<br>( treeType = = DUAL_TREE_CHROMA && ( transform_skip_flag[ x0 ][ y0 ][ 1 ] = = 0 && transform_skip_flag[ x0 ][ y0 ][ 2 ] = = 0 ) ) ) &&<br>( treeType = = DUAL_TREE_CHROMA \|\| ( !intra_mip_flag[ x0 ][ y0 ] \|\| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \|\| LfnstDcOnly = = 0 ) &&<br>LfnstZeroOutSigCoeffFlag = = 1 ) | |
| **lfnst_idx** | ae(v) |
| } | |
| if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) { | |
| if( ( ( CuPredMode[ chType ][ x0 ][ y0 ] = = MODE_INTER &&<br>sps_explicit_mts_inter_enabled_flag ) \|\|<br>( CuPredMode[ chType ][ x0 ][ y0 ] = = MODE_INTRA &&<br>sps_explicit_mts_intra_enabled_flag ) ) ) | |
| **mts_idx** | ae(v) |
| } | |
| } | |

FIG. 88

| coding_unit( x0, y0, cbWidth, cbHeight, cqtDepth, treeType, modeType ) { | Descriptor |
|---|---|
| ... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth ) | |
| lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( ( ( treeType = = SINGLE_TREE \|\| treeType = = DUAL_TREE_LUMA ) && transform_skip_flag[ x0 ][ y0 ][ 0 ] = = 0 ) \|\|<br>( treeType = = DUAL_TREE_CHROMA && ( transform_skip_flag[ x0 ][ y0 ][ 1 ] = = 0 && transform_skip_flag[ x0 ][ y0 ][ 2 ] = = 0 ) && ChromaArrayType != 0 ) ) &&<br>( treeType = = DUAL_TREE_CHROMA \|\| ( !intra_mip_flag[ x0 ][ y0 ] \|\| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \|\| LfnstDcOnly = = 0 ) &&<br>LfnstZeroOutSigCoeffFlag = = 1 ) | |
| **lfnst_idx** | ae(v) |
| } | |
| if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) { | |
| if( ( ( CuPredMode[ chType ][ x0 ][ y0 ] = = MODE_INTER &&<br>sps_explicit_mts_inter_enabled_flag ) \|\|<br>( CuPredMode[ chType ][ x0 ][ y0 ] = = MODE_INTRA &&<br>sps_explicit_mts_intra_enabled_flag ) ) ) | |
| **mts_idx** | ae(v) |
| } | |
| } | |

FIG. 89

| coding_unit( x0, y0, cbWidth, cbHeight, cqtDepth, treeType, modeType ) { | Descriptor |
|---|---|
| ... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType == DUAL_TREE_CHROMA ) ? cbWidth / SubWidthC<br>: ( ( IntraSubPartitionsSplitType == ISP_VER_SPLIT ) ? cbWidth /<br>NumIntraSubPartitions : cbWidth ) | |
| lfnstHeight = ( treeType == DUAL_TREE_CHROMA ) ? cbHeight / SubHeightC<br>: ( ( IntraSubPartitionsSplitType == ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag == 1 &&<br>CuPredMode[ chType ][ x0 ][ y0 ] == MODE_INTRA &&<br>( ( ( treeType == SINGLE_TREE \|\| treeType == DUAL_TREE_LUMA ) && transform_skip_flag[ x0 ][ y0 ][ 0 ] == 0 ) \|\|<br>( treeType == DUAL_TREE_CHROMA && ( transform_skip_flag[ x0 ][ y0 ][ 1 ] == 0 && transform_skip_flag[ x0 ][ y0 ][ 2 ] == 0 ) ) ) &&<br>( treeType == DUAL_TREE_CHROMA \|\| ( intra_mip_flag[ x0 ][ y0 ] \|\| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \|\| LfnstDcOnly == 0 ) &&<br>LfnstZeroOutSigCoeffFlag == 1 ) | |
| **lfnst_idx** | ae(v) |
| } | |
| if( treeType != DUAL_TREE_CHROMA && lfnst_idx == 0 &&<br>transform_skip_flag[ x0 ][ y0 ][ 0 ] == 0 && Max( cbWidth, cbHeight ) <= 32 &&<br>IntraSubPartitionsSplit[ x0 ][ y0 ] == ISP_NO_SPLIT && cu_sbt_flag == 0 &&<br>MtsZeroOutSigCoeffFlag == 1 && tu_cbf_luma[ x0 ][ y0 ] ) { | |
| if( ( ( CuPredMode[ chType ][ x0 ][ y0 ] == MODE_INTER &&<br>sps_explicit_mts_inter_enabled_flag ) \|\|<br>( CuPredMode[ chType ][ x0 ][ y0 ] == MODE_INTRA &&<br>sps_explicit_mts_intra_enabled_flag ) ) ) | |
| **mts_idx** | ae(v) |
| } | |
| } | |

FIG. 90

| coding_unit( x0, y0, cbWidth, cbHeight, cqtDepth, treeType, modeType ) { | Descriptor |
|---|---|
| ... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC<br>: ( ( IntraSubPartitionsSplitType = = ISP_VER_SPLIT ) ? cbWidth /<br>NumIntraSubPartitions : cbWidth ) | |
| lfnstHeight = ( treeType = = DUAL_TREE_CHROMA ) ? cbHeight / SubHeightC<br>: ( ( IntraSubPartitionsSplitType = = ISP_HOR_SPLIT) ? cbHeight /<br>NumIntraSubPartitions : cbHeight ) | |
| if( Min( lfnstWidth, lfnstHeight ) >= 4 && sps_lfnst_enabled_flag = = 1 &&<br>CuPredMode[ chType ][ x0 ][ y0 ] = = MODE_INTRA &&<br>( ( ( treeType = = SINGLE_TREE \|\| treeType = = DUAL_TREE_LUMA \|\| ChromaArrayType = = 0) && transform_skip_flag[ x0 ][ y0 ][ 0 ] = = 0 ) \|\|<br>( treeType = = DUAL_TREE_CHROMA && ( transform_skip_flag[ x0 ][ y0 ][ 1 ] = = 0 && transform_skip_flag[ x0 ][ y0 ][ 2 ] = = 0 ) && ChromaArrayType != 0 ) ) &&<br>( treeType = = DUAL_TREE_CHROMA \|\| ( Intra_mip_flag[ x0 ][ y0 ] \|\| Min( lfnstWidth, lfnstHeight ) >= 16 ) ) &&<br>Max( cbWidth, cbHeight ) <= MaxTbSizeY) { | |
| if( ( IntraSubPartitionsSplitType != ISP_NO_SPLIT \|\| LfnstDcOnly = = 0 ) &&<br>LfnstZeroOutSigCoeffFlag = = 1 ) | |
| **lfnst_idx** | ae(v) |
| } | |
| if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplit[ x0 ][ y0 ] = = ISP_NO_SPLIT && cu_sbt_flag = = 0 &&<br>MtsZeroOutSigCoeffFlag = = 1 && tu_cbf_luma[ x0 ][ y0 ] ) { | |
| if( ( ( CuPredMode[ chType ][ x0 ][ y0 ] = = MODE_INTER &&<br>sps_explicit_mts_inter_enabled_flag ) \|\|<br>( CuPredMode[ chType ][ x0 ][ y0 ] = = MODE_INTRA &&<br>sps_explicit_mts_intra_enabled_flag ) ) ) | |
| **mts_idx** | ae(v) |
| } | |
| } | |

FIG. 91

<table>
<tr><td>coding_unit( x0, y0, cbWidth, cbHeight, cqtDepth, treeType, modeType ) {</td><td></td></tr>
<tr><td>. . . . .</td><td>ae(v)</td></tr>
<tr><td>LfnstDcOnly = 1</td><td></td></tr>
<tr><td>LfnstZeroOutSigCoeffFlag = 1</td><td></td></tr>
<tr><td>MtsDcOnly = 1</td><td></td></tr>
<tr><td>MtsZeroOutSigCoeffFlag = 1</td><td></td></tr>
<tr><td>transform_tree( x0, y0, cbWidth, cbHeight, treeType, chType )</td><td></td></tr>
<tr><td>lfnstWidth = ( treeType = = DUAL_TREE_CHROMA ) ? cbWidth / SubWidthC<br>( ( IntraSubPartitionsSplitType = = ISP_VER_SPLIT ) ? cbWidth / NumIntraSubPartitions : cbWidth )</td><td></td></tr>
<tr><td>lfnstHeight = ( treeType = = DUAL_TREE_CHROMA ) ? cbHeight / SubHeightC :<br>( ( IntraSubPartitonsSplitType = = ISP_HOR_SPLIT) ? cbHeigh / NumIntraSubPartitions : cbHeight )</td><td></td></tr>
<tr><td>lfnstNotTsFlag = ( treeType = = DUAL_TREE_CHROMA || !tu_y_coded_flag[ x0 ][ y0 ] ||<br>transform_skip_flag[ x0 ][ y0 ][ 0 ] = = 0 ) && ( treeType = = DUAL_TREE_LUMA ||<br>( ( !tu_cb_coded_flag[ x0 ][ y0 ] || transform_skip_flag[ x0 ][ y0 ][ 1 ] = = 0 ) &&<br>( !tu_cr_coded_flag[ x0 ][ y0 ] || transform_skip_flag[ x0 ][ y0 ][ 2 ] = = 0 ) ) )</td><td></td></tr>
<tr><td>if( Min( lfnstWidth, lfnstHeight ) >= 4 && sps_lfnst_enabled_flag = = 1 &&<br>CuPredMode[ chType ][ x0 ][ y0 ] = = MODE_INTRA && lfnstNotTsFlag = = 1 &&<br>( treeType = = DUAL_TREE_CHROMA || !intra_mip_flag[ x0 ][ y0 ] ||<br>Min( lfnstWidth, lfnstHeight ) >= 16 ) &&<br>Max( cbWidth, cbHeight ) <= MaxTbSizeY) {</td><td></td></tr>
<tr><td>if( ( IntraSubPartitionsSplitType != ISP_NO_SPLIT || LfnstDcOnly = = 0 ) && LfnstZeroOutSigCoeffFlag = = 1 )</td><td></td></tr>
<tr><td>lfnst_idx</td><td>ae(v)</td></tr>
<tr><td>}</td><td></td></tr>
<tr><td>if( treeType != DUAL_TREE_CHROMA && lfnst_idx = = 0 &&<br>transform_skip_flag[ x0 ][ y0 ][ 0 ] = = 0 && Max( cbWidth, cbHeight ) <= 32 &&<br>IntraSubPartitionsSplitType = = ISP_NO_SPLIT && cu_sbt_flag = = 0 &&<br>MtsZeroOutSigCoeffFlag = = 1 && MtsDcOnly = = 0 ) {</td><td></td></tr>
<tr><td>if( ( ( CuPredMode[ chType ][ x0 ][ y0 ] = = MODE_INTER && sps_explicit_mts_inter_enabled_flag ) ||<br>( CuPredMode[ chType ][ x0 ][ y0 ] = = MODE_INTRA && sps_explicit_mts_intra_enabled_flag ) ) )</td><td></td></tr>
<tr><td>mts_idx</td><td>ae(v)</td></tr>
<tr><td>}</td><td></td></tr>
<tr><td>}</td><td></td></tr>
<tr><td>}</td><td></td></tr>
</table>

IMAGE ENCODING/DECODING METHOD AND DEVICE USING SECONDARY TRANSFORM, AND RECORDING MEDIUM STORING BITSTREAM

TECHNICAL FIELD

The present invention relates to an image encoding/decoding method and apparatus, and a recording medium for storing a bitstream. More particularly, the present invention relates to a method and apparatus for encoding/decoding a video image based on transform.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

In a conventional transform/inverse transform method, since a single transform/inverse transform type is used or signaling for various transform/inverse transform types requires overhead, an image has its limit both in objective quality and in subjective quality.

DISCLOSURE

Technical Problem

For improving the objective quality and subjective quality of an image, the present invention provides a video encoding/decoding method and apparatus that determines at least one of a reduced secondary transform/inverse transform matrix set, a reduced secondary transform/inverse transform matrix, and whether or not to perform a reduced secondary transform/inverse transform, on the basis of at least one of a one-dimensional transform type, a two-dimensional transform combination, and whether or not a transform is used, which are again based on an intra-prediction mode, a prediction mode, a color component, a size and a form.

Technical Solution

The present disclosure provides a video decoding method including: obtaining a transform skip mode flag indicating whether a transform skip mode is applied to a current block; when the transform skip mode is applied to the current block, determining that secondary transform/inverse transform is not applied to the current block, according to the transform skip mode flag; and, when the transform skip mode is not applied to the current block according to the transform skip mode flag, obtaining a transform matrix index for secondary transform/inverse transform of the current block and, determining whether secondary transform/inverse transform is applied to the current block based on the transform matrix index.

According to an embodiment, the video decoding method may further include: when secondary transform/inverse transform is applied to the current block, according to the transform matrix index, determining a secondary transform matrix of the current block; and, according to the secondary transform matrix, applying secondary transform/inverse transform to the current block.

According to an embodiment, the determining of the secondary transform matrix of the current block may include determining the secondary transform matrix of the current block according to at least one of the transform matrix index, a transform matrix set index of the current block, and a size of the current block.

According to an embodiment, the video decoding method may include, obtaining information on whether or not an intra residual DPCM method is used for the current block and, when the information on whether an intra residual DPCM method is used indicates that the intra residual DPCM is used for the current block, determining that a transform skip mode is applied to the current block. The obtaining of the transform skip mode flag may include obtaining the transform skip mode flag, when the information on whether an intra residual DPCM method is used indicates that the intra residual DPCM method is not used for the current block.

According to an embodiment, the transform matrix index for secondary transform/inverse transform of the current block is obtained when the current block is predicted according to an intra-prediction mode that is not a matrix-based intra-prediction mode.

According to an embodiment, the obtaining of the transform skip mode flag may include obtaining a transform skip mode flag for a luma component, a transform skip mode flag for a Cb component, and a transform skip mode flag for a Cr component.

According to an embodiment, the determining of that secondary transform/inverse transform is not applied to the current block may include determining that secondary transform/inverse transform is not applied to the current block, when a tree structure of the current block is a single-tree type, a transform skip mode flag for the luma component indicates that a transform skip mode is applied to a luma component, a transform skip mode flag for the Cb component indicates that a transform skip mode is applied to a Cb component, and a transform skip mode flag for the Cr component indicates that a transform skip mode is applied to a Cr component.

According to an embodiment, the determining of that secondary transform/inverse transform is not applied to the current block may include determining that secondary transform/inverse transform is not applied to the current block, when a tree structure of the current block is a dual-tree luma type and a transform skip mode flag for the luma component indicates that a transform skip mode is applied to a luma component.

According to an embodiment, the determining of that secondary transform/inverse transform is not applied to the current block may include determining that secondary transform/inverse transform is not applied to the current block, when a tree structure of the current block is a dual-tree chroma type, a transform skip mode flag for the Cb component indicates that a transform skip mode is applied to a Cb component, and a transform skip mode flag for the Cr component indicates that a transform skip mode is applied to a Cr component.

According to an embodiment, the determining of, based on the transform matrix index, whether secondary transform/inverse transform is applied to the current block may include determining whether secondary transform/inverse transform is applied to the current block on the basis of at least one among the transform matrix index, the size of the current block, and the transform skip mode flag.

The present disclosure provides a video encoding method including: entropy encoding a transform skip mode flag indicating whether a transform skip mode is applied to a current block; when a transform skip mode is applied to the current block according to the transform skip mode flag, determining that secondary transform/inverse transform is not applied to the current block; when a transform skip mode is not applied to the current block according to the transform skip mode flag, determining whether secondary transform/inverse transform is applied to the current block and, entropy encoding a transform matrix index for secondary transform/inverse transform of the current block according to whether secondary transform/inverse transform is applied to the current block.

According to an embodiment, the entropy encoding of the transform matrix index may include: when secondary transform/inverse transform is applied to the current block, determining a secondary transform matrix of the current block; and, depending on whether secondary transform/inverse transform is applied to the current block, entropy encoding the transform matrix index.

According to an embodiment, the determining of the secondary transform matrix of the current block may include determining the secondary transform matrix of the current block according to at least one of the transform matrix index, a transform matrix set index of the current block, and a size of the current block.

According to an embodiment, the video encoding method may include, entropy encoding information on whether an intra residual DPCM method is used for the current block and, when the information on whether or not an intra residual DPCM method is used indicates that the intra residual DPCM is used for the current block, determining that a transform skip mode is applied to the current block. The entropy encoding of the transform skip mode flag may include entropy encoding the transform skip mode flag, when the information on whether an intra residual DPCM method is used indicates that the intra residual DPCM method is not used for the current block.

According to an embodiment, the entropy encoding of a transform matrix index for secondary transform/inverse transform of the current block may include entropy encoding the transform matrix index, when the current block is predicted according to not a matrix-based intra-prediction mode but an intra-prediction mode.

According to an embodiment, the entropy encoding of a transform skip mode flag may include entropy encoding a transform skip mode flag for a luma component, a transform skip mode flag for a Cb component, and a transform skip mode flag for a Cr component.

According to an embodiment, the determining of that secondary transform/inverse transform is not applied to the current block may include determining that secondary transform/inverse transform is not applied to the current block, when a tree structure of the current block is a single-tree type, a transform skip mode flag for the luma component indicates that a transform skip mode is applied to a luma component, a transform skip mode flag for the Cb component indicates that a transform skip mode is applied to a Cb component, and a transform skip mode flag for the Cr component indicates that a transform skip mode is applied to a Cr component.

According to an embodiment, the determining of that secondary transform/inverse transform is not applied to the current block may include determining that secondary transform/inverse transform is not applied to the current block, when a tree structure of the current block is a dual-tree luma type and a transform skip mode flag for the luma component indicates that a transform skip mode is applied to a luma component.

According to an embodiment, the determining of that secondary transform/inverse transform is not applied to the current block may include determining that secondary transform/inverse transform is not applied to the current block, when a tree structure of the current block is a dual-tree chroma type, a transform skip mode flag for the Cb component indicates that a transform skip mode is applied to a Cb component, and a transform skip mode flag for the Cr component indicates that a transform skip mode is applied to a Cr component.

According to an embodiment, whether or not secondary transform/inverse transform is applied to the current block may be determined on the basis of at least one among the transform matrix index, the size of the current block, and the transform skip mode flag.

The present disclosure provides a computer-readable recording medium for storing a bitstream generated by encoding a video through a video encoding method. Herein, the video encoding method includes: entropy encoding a transform skip mode flag indicating whether a transform skip mode is applied to a current block; when a transform skip mode is applied to the current block according to the transform skip mode flag, determining that secondary transform/inverse transform is not applied to the current block; when a transform skip mode is not applied to the current block according to the transform skip mode flag, determining whether secondary transform/inverse transform is applied to the current block and, entropy encoding a transform matrix index for secondary transform/inverse transform of the current block according to whether secondary transform/inverse transform is applied to the current block.

Advantageous Effects

The present invention may improve the objective quality and subjective quality of an image by providing an image encoding/decoding method and apparatus that determines at least one of a reduced secondary transform/inverse transform matrix set, a reduced secondary transform/inverse transform matrix, and whether or not to perform a reduced secondary transform/inverse transform, on the basis of at least one of a one-dimensional transform type, a two-dimensional transform combination, and whether or not a transform is used, which are again based on an intra-prediction mode, a prediction mode, a color component, a size and a form.

DESCRIPTION OF DRAWINGS

FIG. 9 is a diagram illustrating distribution of average residual values according to the position within a 2N×2N prediction unit (PU) of a 8×8 coding unit (CU) that is predicted in the inter mode, in which "Cactus" sequence is obtained through a test in a low delay-P profile environment.

FIG. 13 is a diagram illustrating an example of 4×4 residual data rearrangement of sub-blocks according to the present invention.

FIG. 15 is a diagram illustrating the result of performing DCT-2 transform and SDST transform according to the distribution of the residual signals of a 2N×2N prediction unit (PU).

FIG. 18 is a diagram illustrating residual signal scanning order and rearrangement order of the transform unit (TU) at the depth of zero within the prediction unit (PU) according to an embodiment of the present invention.

FIG. 49 shows an embodiment of performing secondary transform and/or secondary inverse transform in an encoder/decoder.

FIG. 50 shows an embodiment of secondary transform matrix.

FIG. 51 shows a reduced secondary transform/inverse transform process.

FIG. 52 illustrates a video decoding method according to an embodiment of the present invention.

FIG. 53 illustrates a video encoding method according to an embodiment of the present invention.

BEST MODE

Figure 1:
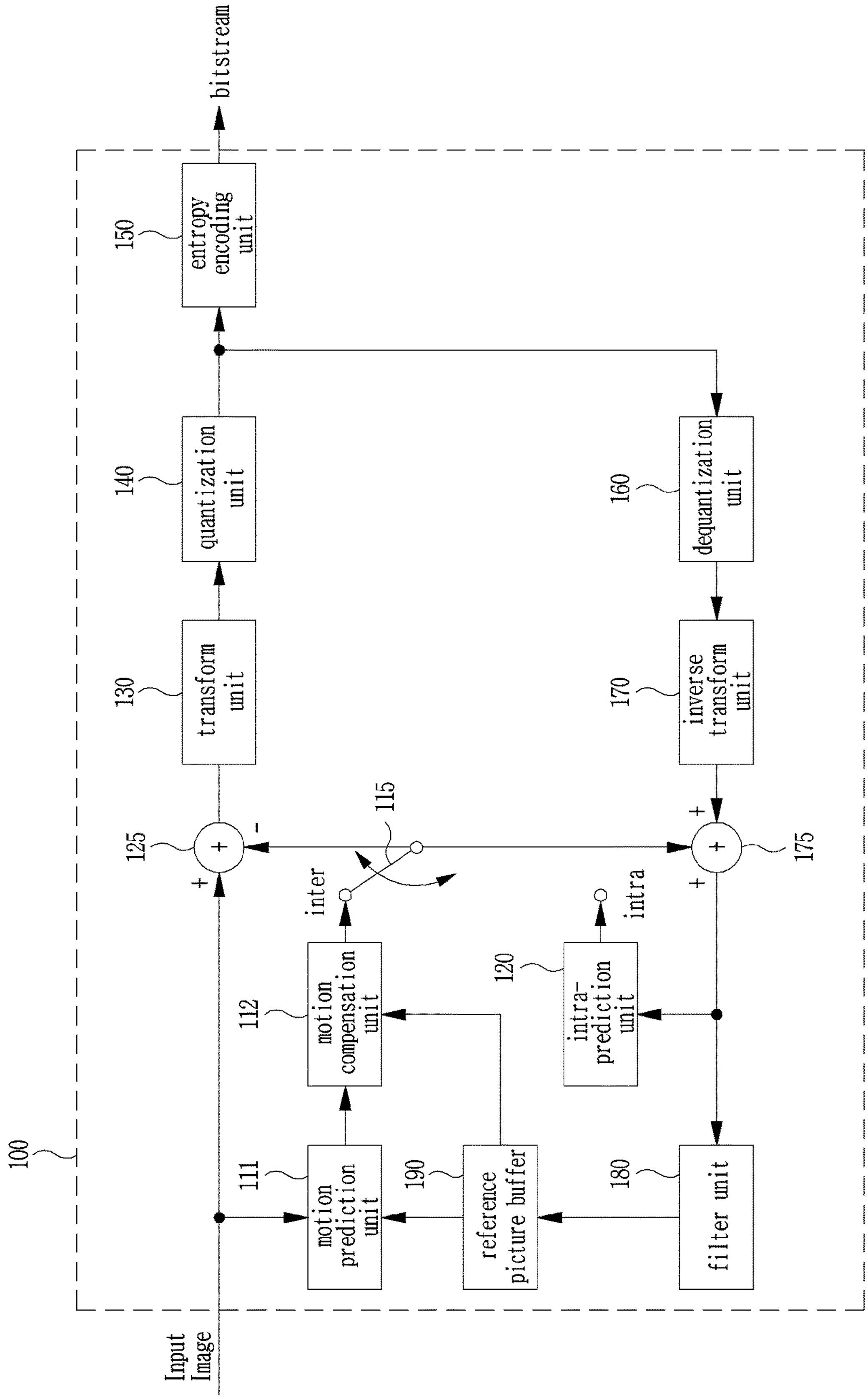
FIG. 1 is a block diagram showing a configuration of an encoding apparatus according to an embodiment to which the present invention is applied.

The present disclosure provides a video decoding method including: obtaining a transform skip mode flag indicating whether or not a transform skip mode is applied to a current block; according to the transform skip mode flag, when the transform skip mode is applied to the current block, determining that secondary transform/inverse transform is not applied to the current block; and, according to the transform skip mode flag, when the transform skip mode is not applied to the current block, obtaining a transform matrix index for secondary transform/inverse transform of the current block and, based on the transform matrix index, determining whether or not secondary transform/inverse transform is applied to the current block.

MODE FOR INVENTION

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element, and attribute, etc. may have a value. A value of information, data, flag, index, element, and attribute equal to "0" may represent a logical false or the first predefined value. In other words, a value "0", a false, a logical false and the first predefined value may be replaced with each other. A value of information, data, flag, index, element, and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to 2Bd−1 according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term “tile group” means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero-merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block, or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, a coding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, the probability model, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive in-loop filter, an adaptive in-loop filter coefficient, an adaptive in-loop filter tab, an adaptive in-loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive in-loop filter (ALF) to a reconstructed sample, a reconstructed block, or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, a different filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive in-loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
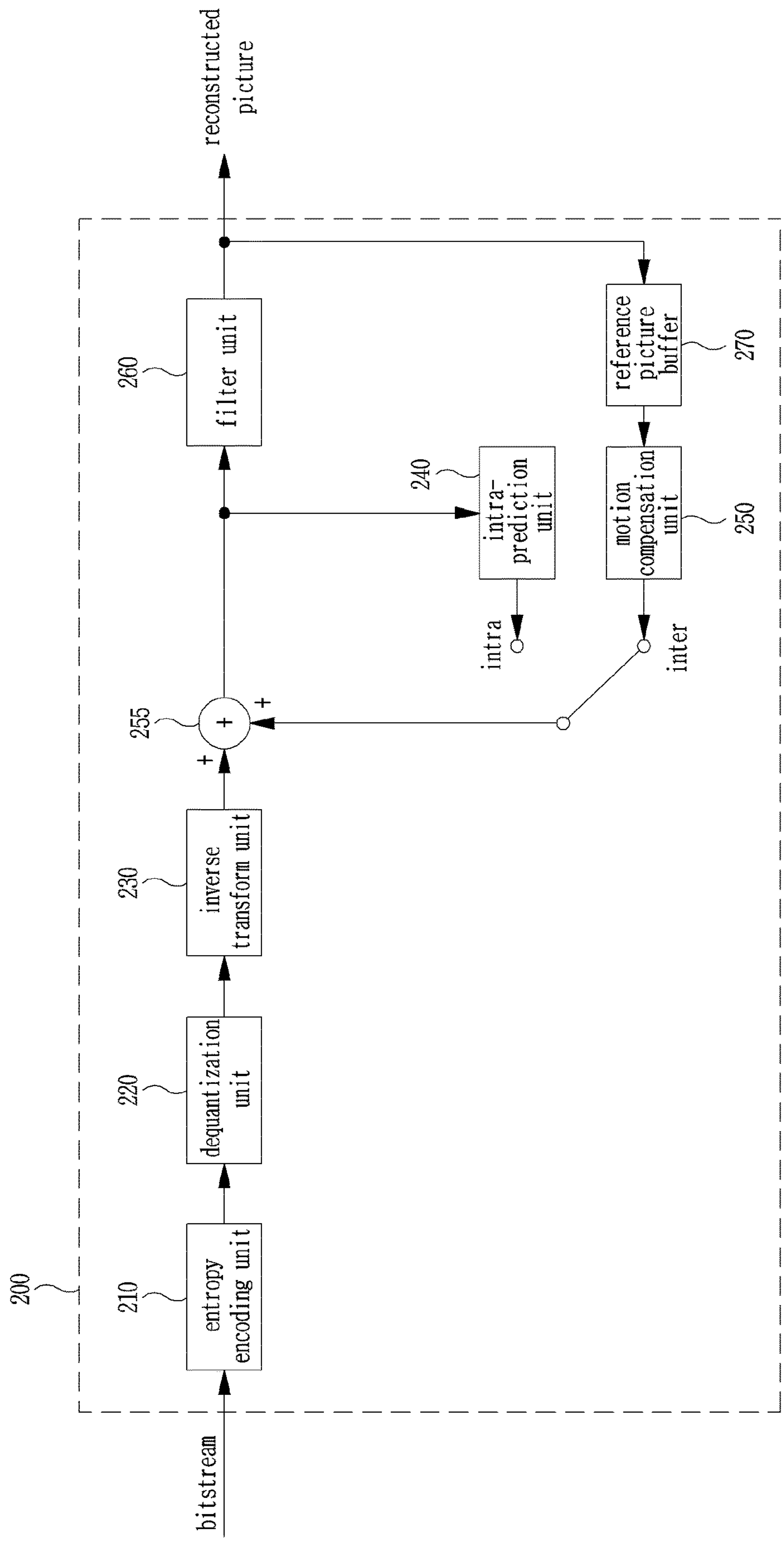
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive in-loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
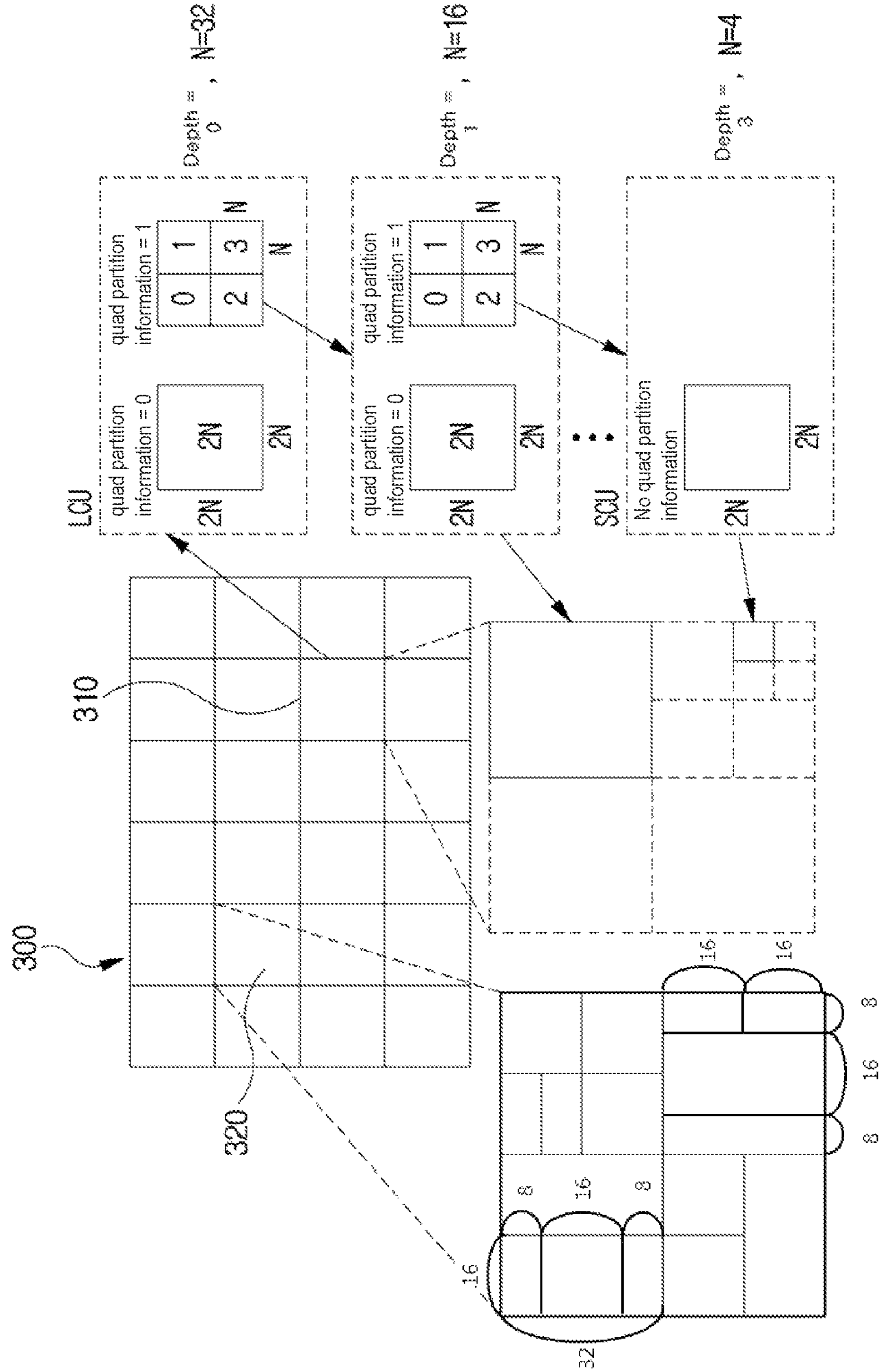
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and an LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning.

The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size, and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding unit that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. The quad partition information may be inferred to be a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be inferred from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be inferred from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be inferred from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be inferred from a value indicating a possible partitioning tree structure.

Figure 4:
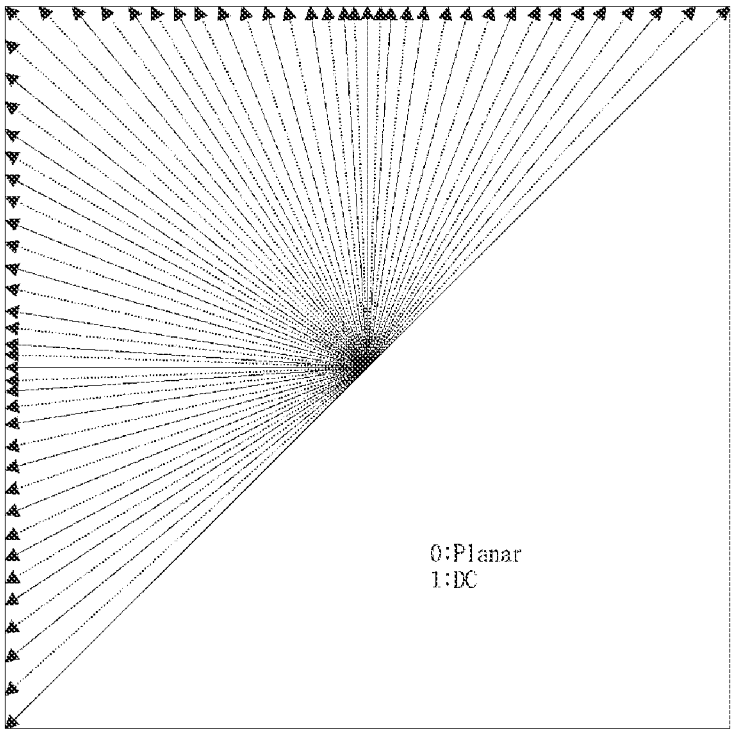
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using a coding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
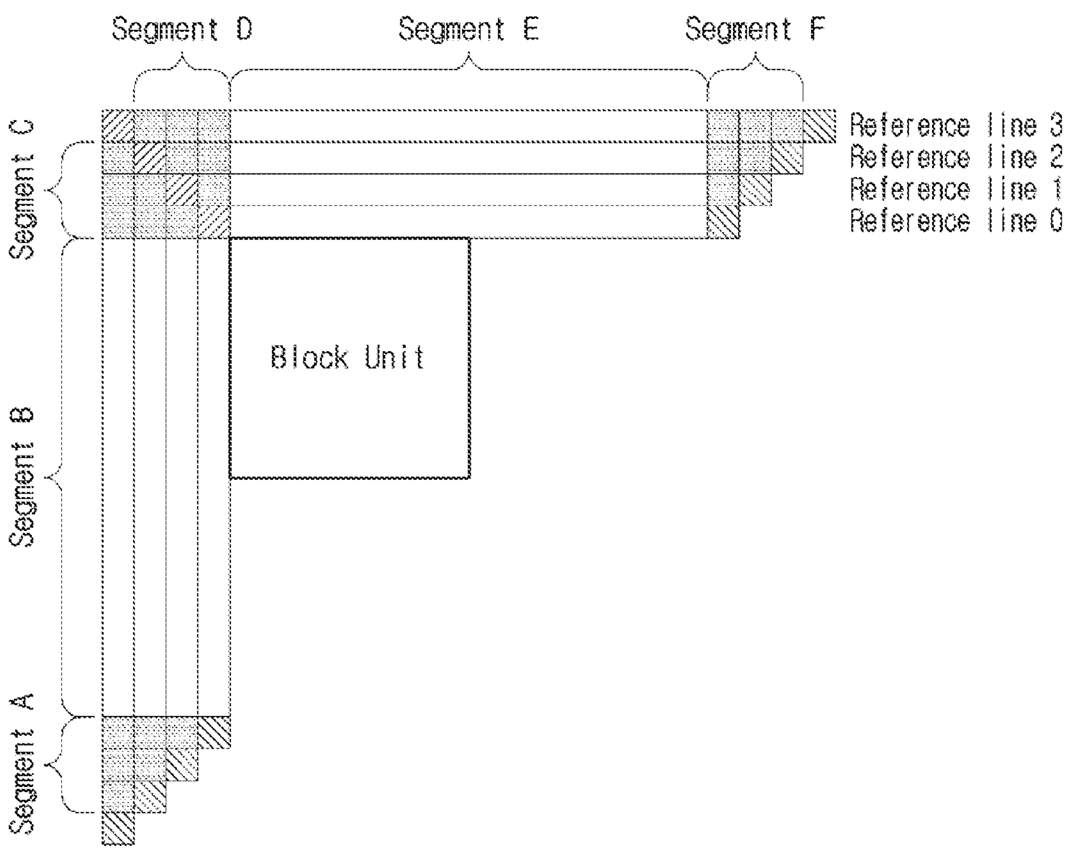
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. For example, in FIG. 7, reference sample line indicators 0, 1, and 2 may be signaled as index information indicating reference sample lines 0, 1 and 2. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on at least one of an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current block, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
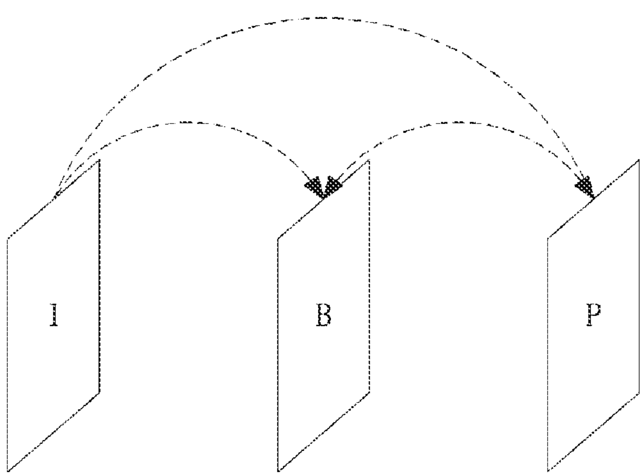
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a geometric partitioning mode, an combined inter intra prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the coded block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The geometric partitioning mode may mean a mode that derives motion information by partitioning the current block into the predefined directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
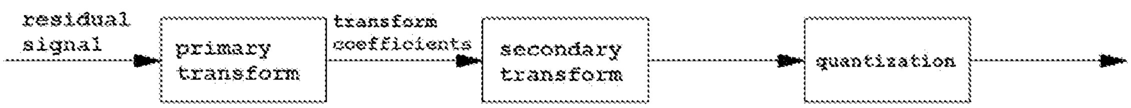
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, a method for enhancing video compression efficiency by improving a transform method, which is one of video coding processes, will be described. More specifically, encoding in the conventional video coding schematically includes: an intra/inter prediction step of prediction the original block that is a part of the current original image; a transform and quantization step for a residual block that is a difference between the predicted prediction block and the original block; and an entropy coding step which is a lossless compression method based on the probability for the coefficient of the block on which transform and quantization have been performed and for compression information obtained at the preceding step. Consequently, a bitstream which is a compressed form of the original image is generated, and this is transmitted to the decoder or stored in a recording medium. Shuffling and discrete sine transform (hereinafter, referred to as "SDST"), which will be described below in this specification, is intended to enhance compression efficiency by increasing transform efficiency.

The SDST method according to the present invention uses a discrete sine transform type-7 (hereinafter, referred to as "DST-VII" or "DST-7") instead of a discrete cosine transform type-2 (hereinafter, referred to as "DCT-II" or "DCT-2") that is a transform kernel widely used in video coding, thereby reflecting the frequency characteristics common to images much better.

According to the transform method of the present invention, a high objective video quality may be obtained even at a relatively low bit rate compared to the conventional video coding method.

DST-7 may be applied to data of a residual block. Application of DST-7 to the residual block may be performed on the basis of the prediction mode corresponding to the residual block. For example, it may be applied to the residual block that is encoded in the inter mode. According to an embodiment of the present invention, DST-7 may be applied after rearranging or shuffling the data of the residual block. Here, shuffling may mean rearrangement of image data, and may be equivalent to residual signal rearrangement or flipping. Here, the residual block may have the same meaning as the residual, a remaining block, a remaining signal, a residual signal, remaining data, or residual data. Further, the residual block may have the same meaning as the reconstructed residual, a reconstructed remaining block, a reconstructed remaining signal, a reconstructed residual signal, reconstructed remaining data, or reconstructed residual data that are in the reconstructed form of the residual block in the encoder and the decoder.

According to an embodiment of the present invention, SDST may use DST-7 as a transform kernel. Here, the transform kernel of SDST is not limited to DST-7, and it is possible to use at least one among various types of DST and DCT, such as discrete sine transform type-1 (DST-1), discrete sine transform type-2 (DST-2), discrete sine transform type-3 (DST-3), . . . , discrete sine transform type-n (DST-n), discrete cosine transform type-1 (DCT-1), discrete cosine transform type-2 (DCT-2), discrete cosine transform type-3 (DCT-3), . . . , discrete cosine transform type-n (DCT-n), and the like. (Here, n may be a positive integer of one or more)

Equation 1 below may represent a method of performing one-dimensional DCT-2 according to an embodiment of the present invention. Here, N may denote the size of the block, k may denote the position of the frequency component, and $x_n$ may denote the value of the n-th coefficient in the spatial domain.

$$X_k = \sum_{n=0}^{N-1} x_n * \cos\left[\frac{\pi}{N}\left(n+\frac{1}{2}\right)k\right] \quad k = 0, \ldots , N-1 \qquad \text{[Equation 1]}$$

DCT-2 in the two-dimensional domain may be realized by performing horizontal transform and vertical transform on the residual block with Equation 1 above.

The DCT-2 transform kernel may be defined as Equation 2 below. Here, $X_k$ may denote a basis vector according to position in the frequency domain, and N may denote the size of the frequency domain.

$$X_k = \cos\left(\frac{\pi}{N}\left(i + \frac{1}{2}\right)k\right)\ i, k = 0, 1, \ldots, N-1 \quad \text{[Equation 2]}$$

In the meantime, FIG. 7 is a diagram illustrating a basis vector in the frequency domain of DCT-2 according to the present invention. FIG. 7 shows frequency characteristics of DCT-2 in the frequency domain. Here, the value computed through X0 basis vector of DCT-2 may denote a DC component.

DCT-2 may be used in the transform process for the residual block in the size of 4×4, 8×8, 16×16, 32×32, and the like.

In the meantime, DCT-2 may be used selectively on the basis of at least one among the size of the residual block, a color component (for example, a luma component, and a chroma component) of the residual block, and the prediction mode corresponding to the residual block. For example, when the residual block is in the size of 4×4 and is encoded in the intra mode and the component of the residual block is the luma component, DCT-2 is used. For example, when the horizontal length (width) of the residual block encoded in the intra mode is in a predetermined range (for example, equal to or larger than four pixels and equal to or smaller than 16 pixels) and the horizontal length (width) is no longer than the vertical length (height), a first transform kernel may be used for horizontal transform. Otherwise, a second transform kernel may be used for horizontal transform. For example, when the vertical length (height) of the residual block encoded in the intra mode is equal to or longer than four pixels and equal to or shorter than 16 pixels and the vertical length (height) is no longer than the horizontal length (width), a first transform kernel may be used for vertical transform. Otherwise, a second transform kernel may be used for vertical transform. The first transform kernel may differ from the second transform kernel. That is, horizontal transform and vertical transform methods for the block encoded in the intra mode may be implicitly determined on the basis of the shape of the block under a predetermined condition. For example, the first transform kernel may be DST-7, and the second transform kernel may be DCT-2. Here, the residual block is the transform target, so it may have the same meaning as the transform block. Here, the prediction mode may mean inter prediction or intra prediction. Further, in the case of intra prediction, the prediction mode means an intra prediction mode or an intra prediction direction.

Transform through a DCT-2 transform kernel may achieve high compression efficiency for a block having a characteristic that the change between neighboring pixels is small like a background of an image. However, it may not appropriate as a transform kernel for a region, such as a texture image, which has a complex pattern. This is because when a block having a low correlation between neighboring pixels is transformed through DCT-2, a large number of transform coefficients occurs in the high frequency component of the frequency domain. When the transform coefficient is frequently generated in the high frequency domain, compression efficiency of an image may decrease. In order to enhance compression efficiency, a coefficient having a large value needs to occur near a low frequency component, and the value of the coefficient needs to be close to zero at a high frequency component.

Equation 3 below may represent a method of performing one-dimensional DST-7 according to an embodiment of the present invention. Here, N may denote the size of the block, k may denote the position of the frequency component, and xn may denote the value of the n-th coefficient in the spatial domain.

$$X_k = \sum_{n=0}^{N-1} x_n * \sin\left[\frac{\pi(2n+1)}{2N+1}(k+1)\right]\ k = 0, \ldots, N-1 \quad \text{[Equation 3]}$$

DST-7 in the two-dimensional domain may be realized by performing horizontal transform and vertical transform on the residual block with Equation 3 above.

The DST-7 transform kernel may be defined as Equation 4 below. Here, Xk may denote the K-th basis vector of DST-7, i may denote the position in the frequency domain, and N may denote the size of the frequency domain.

$$X_k = \sin\left(\frac{(2i+1)(k+1)\pi}{2N+1}\right)\ i, k = 0, 1, \ldots, N-1 \quad \text{[Equation 4]}$$

DST-7 may be used in the transform process for the residual block in the size of at least one among 2×2, 4×4, 8×8, 16×16, 32×32, 64×64, 128×128, and the like.

In the meantime, DST-7 may be applied to a rectangular block rather than a square block. For example, DST-7 may be applied to at least one among vertical transform and horizontal transform of a rectangular block of which the horizontal size differs from the vertical size, such as 8×4, 16×8, 32×4, 64×16, and the like. When selective application of multiple transform methods is possible, DCT-2 is applied to horizontal transform and vertical transform of a square block. When selective application of multiple transform methods is impossible, DST-7 is applied to horizontal transform and vertical transform of a square block.

Further, DST-7 may be used selectively on the basis of at least one among the size of the residual block, the color component (for example, the luma component, and the chroma component) of the residual block, the prediction mode corresponding to the residual block, the intra prediction mode (direction), and the shape of the residual block. For example, when the residual block is in the size of 4×4 and is encoded in the intra mode and the component of the residual block is the luma component, DST-7 is used. Here, the prediction mode may mean inter prediction or intra prediction. Further, in the case of intra prediction, the prediction mode means an intra prediction mode or an intra prediction direction. For example, for the chroma component, selection of the transform method on the basis of the block shape may not be available. For example, when the intra prediction mode is prediction between color components, selection of the transform method on the basis of the block shape is not available. For example, the transform method for the chroma component may be specified by information signaled through a bitstream. When the current block is partitioned into multiple sub-blocks and intra prediction is performed on each of the sub-blocks, the transform method for the current block is determine on the basis of the intra prediction mode and/or the block size (horizontal and/or vertical size). For example, when the intra prediction mode is non-directional (DC or Planar) and the horizontal length (width) (or vertical length (height)) is in a predetermined range, a first transform kernel is used for horizontal transform (vertical transform). Otherwise, a second transform kernel is used. The first transform kernel may differ from the second transform kernel. For example, the first transform kernel may be DST-7, and the second transform kernel may be DCT-2. The predetermined range may range, for example, from four pixels to 16 pixels. When the size of the block is not in the predetermined range, the same kernel (for example, the second transform kernel) is used for horizontal transform and vertical transform. When the size of the block is in the predetermined range, different transform kernels are used for intra prediction modes adjacent to each other. For example, when the second transform kernel and the first transform kernel are used for horizontal transform and vertical transform in mode 27, respectively, the first transform kernel and the second transform kernel are respectively used for horizontal transform and vertical transform in modes 26 and 28 adjacent to mode 27.

Figure 8A:
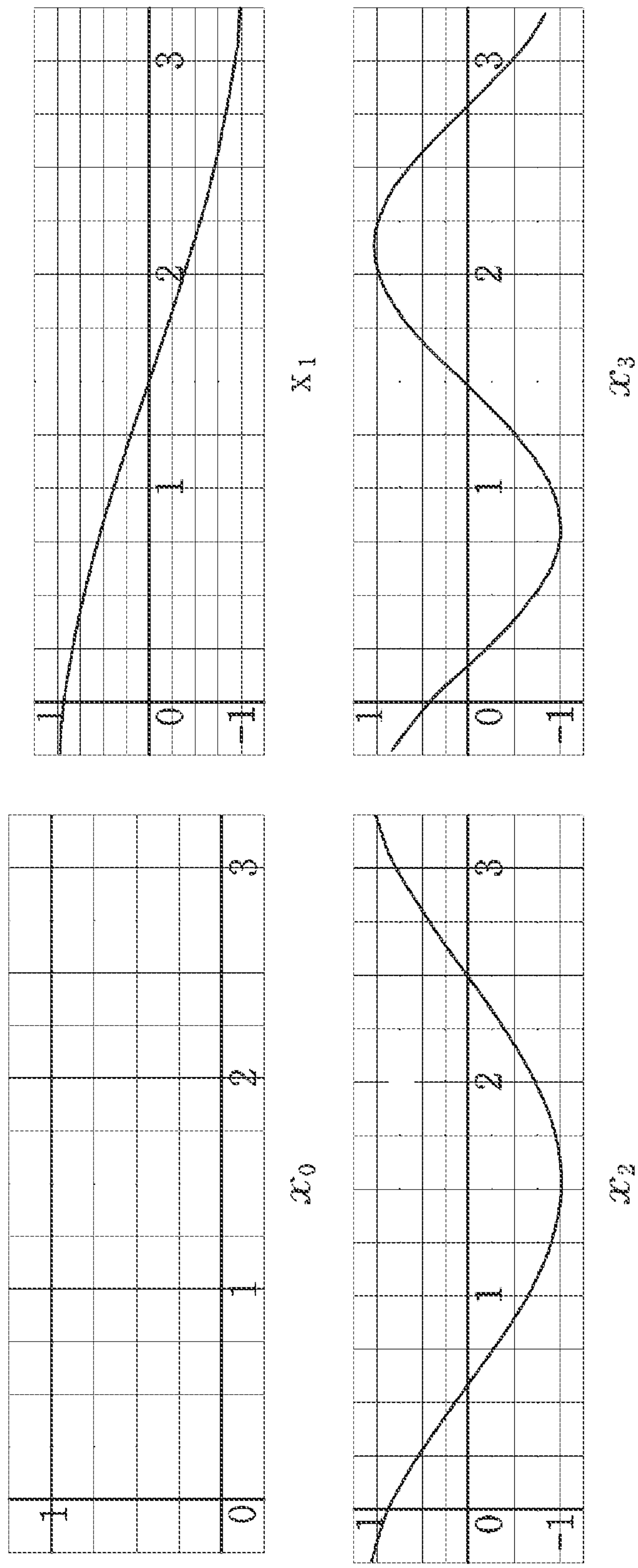
FIG. 8*a* is a view showing a basis vector in a frequency domain of DCT-2 according to the present invention.
Figure 8B:
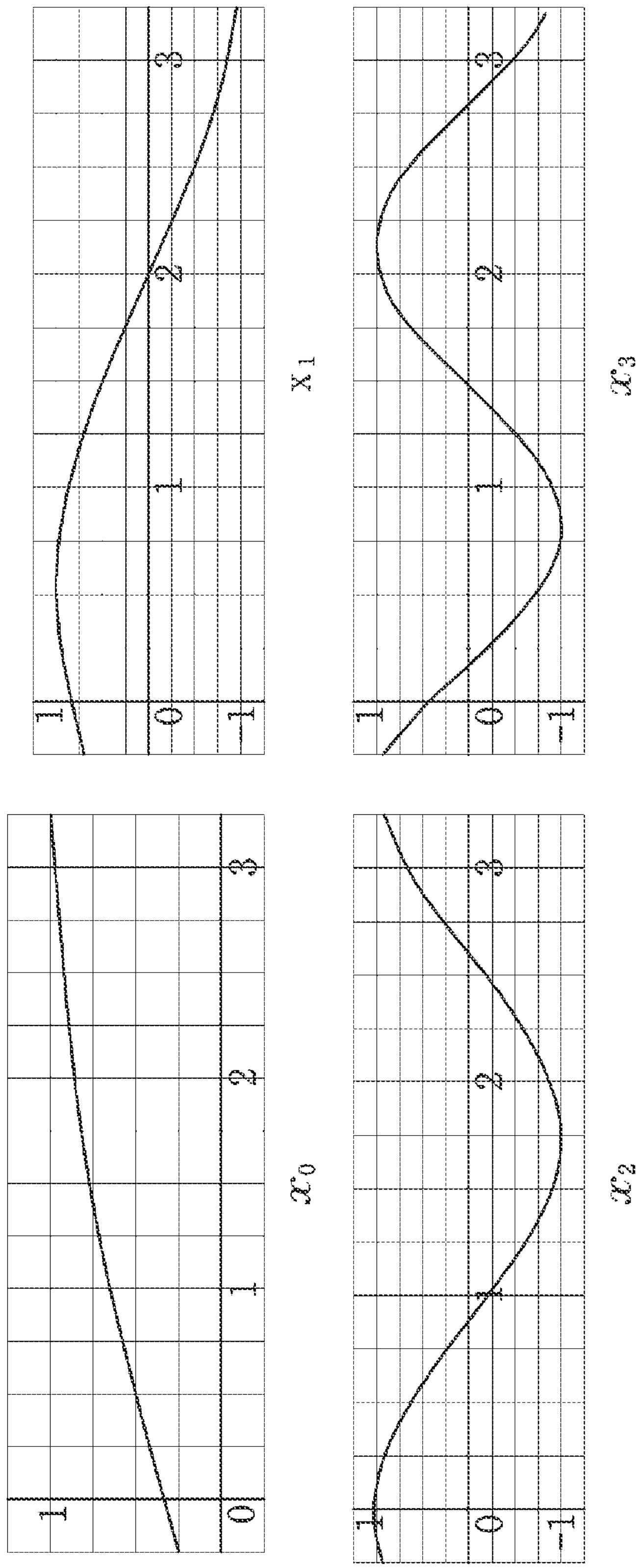
FIG. 8*b* is a diagram illustrating a basis vector in each frequency domain of DST-7 according to the present invention.

In the meantime, FIG. 8 is a diagram illustrating a basis vector in each frequency domain of DST-7 according to the present invention. Referring to FIG. 8, a first basis vector (x0) of DST-7 is in the shape of a curve. Through this, it is predicted that DST-7 will show higher transform performance for a block with large spatial change in an image compared to DCT-2.

In transform of a 4×4 transform unit (TU) within an intra-predicted coding unit (CU), DST-7 may be used. By reflecting the characteristic of intra prediction that as the distance from the reference sample increases, the amount of error increases, DST-7 with higher transform efficiency may be used. That is, in the case of a block in which the amount of residual signal increases as the distance from the position of (0, 0) within a block in the spatial domain increases, DST-7 may be used to efficiently compress the block.

As described above, in order to increase transform efficiency, it is important to use a transform kernel appropriate for the frequency characteristics of an image. Particularly, since transform is performed on the residual block for the original block, it is possible to be aware of transform efficiency of DST-7 and DCT-2 by checking the distribution characteristic of residual signals within CU or PU or TU block.

FIG. 9 is a diagram illustrating distribution of average residual values according to the position within a 2N×2N prediction unit (PU) of a 8×8 coding unit (CU) that is predicted in the inter mode, in which "Cactus" sequence is obtained through a test in a low delay-P profile environment.

Referring to FIG. 9, the left of FIG. 9 shows relatively large values marked, which are the top 30% among average residual signal values within a block. The right shows relatively large values marked, which are top 70% among average residual signal values within the same block as shown in the left.

As shown in FIG. 9, the distribution of residual signals within a 2N×2N PU of a 8×8 CU predicted in the inter mode has a characteristic that small residual signal values are concentrated mainly near the center of the block and the residual signal value increases as being away from the center point of the block. That is, the residual signal value is large at the block boundary. The distribution characteristic of residual signals as described above may be a common feature of residual signal within the PU regardless of the size of the CU and PU partitioning modes (2N×2N, 2N×N, N×2N, N×N, nR×2N, nL×2N, 2N×nU, and 2N×nD) that the inter-predicted CU may have.

Figure 10:
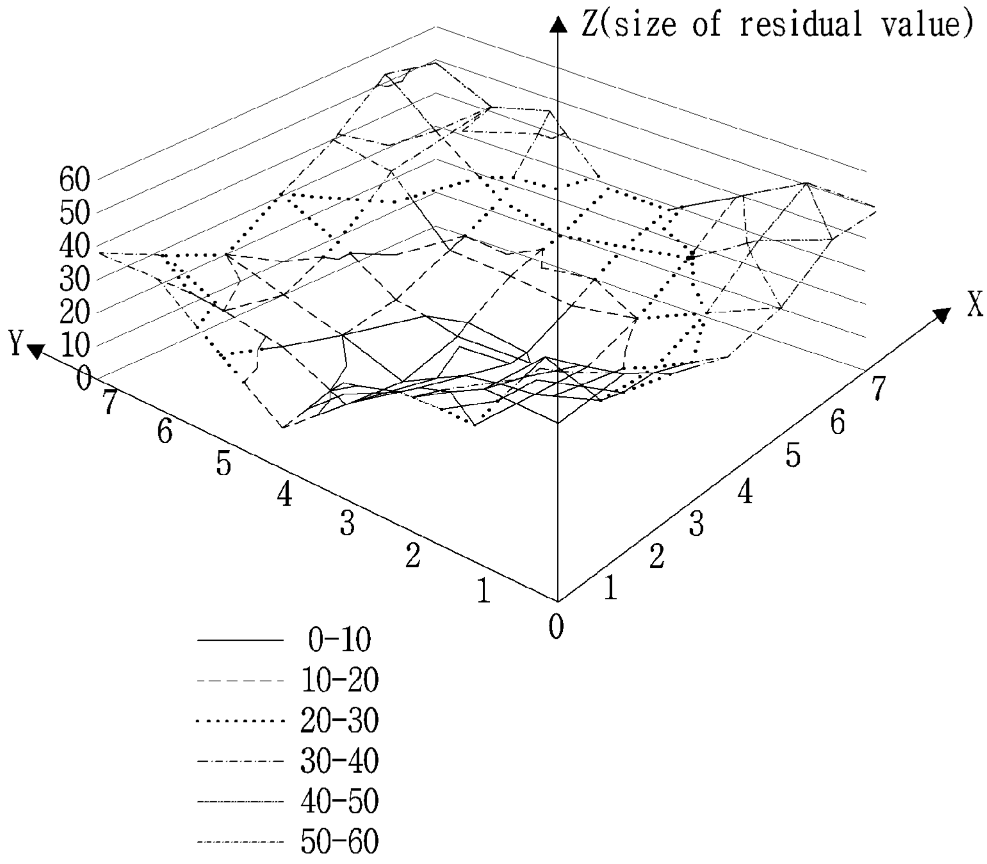
FIG. 10 is a three-dimensional graph illustrating the distribution characteristic of residual signals within a 2N×2N prediction unit (PU) of an 8×8 coding unit (CU) that is predicted in the inter prediction mode (inter mode).

FIG. 10 is a three-dimensional graph illustrating the distribution characteristic of residual signals within a 2N×2N prediction unit (PU) of an 8×8 coding unit (CU) that is predicted in the inter prediction mode (inter mode).

Referring to FIG. 10, it is found that residual signals having relatively small values are distributed in a concentrated manner near the center of the block and the residual signal closer to the block boundary has a relatively larger value.

On the basis of the distribution characteristic of residual signals shown in FIGS. 9 and 10, transform of the residual signal within the PU of the inter-predicted CU is more efficient when using DST-7 rather than DCT-2.

Hereinafter, SDST, which is one among transform methods using DST-7 as the transform kernel, will be described.

Hereinafter, the block may mean one among the CU, the PU, and the TU.

The SDST according to the present invention may be performed in two steps. The first step is to perform shuffling on the residual signal within the PU of the CU predicted in the inter mode or intra mode. The second step is to apply DST-7 to the residual signal within the block on which shuffling has been performed.

The residual signals arranged within the current block (for example, the CU, the PU, or the TU) may be scanned in a first direction and may be rearranged in a second direction. That is, the residual signals arranged within the current block may be scanned in the first direction and may be rearranged in the second direction for performing shuffling. Here, the residual signal may mean a signal indicating a different signal between the original signal and the prediction signal. That is, the residual signal may mean a signal before performing at least one of transform and quantization. Alternatively, the residual signal may mean a signal form in which at least one of transform and quantization is performed. Further, the residual signal may mean a reconstructed residual signal. That is, the residual signal may mean a signal on which at least one of inverse transform and dequantization has been performed. Further, the residual signal may mean a signal before performing at least one of inverse transform and dequantization.

In the meantime, the first direction (or scan direction) may be one among raster scan order, up-right diagonal scan order, horizontal scan order, and vertical scan order. Further, the first direction may be defined as at least one among the following (1) to (10).

Scanning from the top row to the bottom row, and scanning from the left to the right in one row Scanning from the top row to the bottom row, and scanning from the right to the left in one row Scanning from the bottom row to the top row, and scanning from the left to the right in one row Scanning from the bottom row to the top row, and scanning from the right to the left in one row Scanning from the left column to the right column, and scanning from the top to the bottom in one column Scanning from the left column to the right column, and scanning from the bottom to the top in one column Scanning from the right column to the left column, and scanning from the top to the bottom in one column Scanning from the right column to the left column, and scanning from the bottom to the top in one column Scanning in the spiral shape: scanning from inside (or outside) the block to outside (or inside) the block, and scanning in a clockwise/counterclockwise direction Diagonal scanning: starting from one vertex within a block, diagonally scanning in top left, top right, bottom left, or bottom right direction In the meantime, regarding the second direction (or rearrangement direction), at least one among (1) to (10) scan directions may be selectively used. The first direction and the second direction may be the same, or may differ from each other.

The scanning and rearrangement process for the residual signal may be performed in units of the current block.

Here, the rearrangement may mean that the residual signals scanned in the first direction within the block are arranged in the second direction in a block of the same size. Here, the size of the block for scanning in the first direction may differ from the size of the block for rearrangement in the second direction.

Further, the scanning and the rearrangement are described as being performed separately according to the first direction and the second direction, but the scanning and the rearrangement may be performed as one process for the first direction. For example, for the residual signal within the block, scanning may be performed from the top row to the bottom row, and scanning is performed from the right to the left in one row for storage (rearrangement) in the block.

In the meantime, the scanning and rearrangement process for the residual signal may be performed in predetermined units of the sub-block within the current block. Here, the sub-block may be a block that is equal to or smaller than the current block in size. The sub-block may be a block that results from the partitioning of the current block in quad tree, binary tree forms, and the like.

The sub-block unit may have a fixed size and/or shape (for example, 4×4, 4×8, 8×8, . . . , N×M, wherein N and M are positive integers). Further, the size and/or the shape of the sub-block unit may be variably derived. For example, the size and/or the shape of the sub-block unit may be determined depending on the size, the shape, and/or the prediction mode (inter and intra) of the current block.

The scan direction and/or the rearrangement direction may be determined adaptively depending on the position of the sub-block. In this case, different scan directions and/or rearrangement directions may be used for sub-blocks, or all or a part of the sub-blocks of the current block may use the same scan direction and/or the same rearrangement direction.

Figure 11:
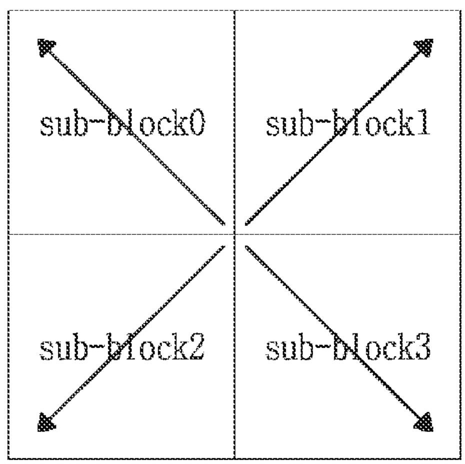
FIG. 11 is a diagram illustrating the distribution characteristic of the residual signals in a 2N×2N prediction unit (PU) mode of a coding unit (CU) according to the present invention.

FIG. 11 is a diagram illustrating the distribution characteristic of the residual signals in a 2N×2N prediction unit (PU) mode of a coding unit (CU) according to the present invention.

Referring to FIG. 11, the PU is partitioned into four sub-blocks in the quad tree structure, and the arrow direction of each sub-block shows the distribution characteristic of the residual signals. Specifically, the arrow direction of each sub-block indicates the direction in which the residual signal increases. This is due to the distribution characteristic common to the residual signals within the PU regardless of the PU partitioning mode. Therefore, the shuffling operation for rearranging the residual signals of each sub-block may be performed to have the distribution characteristic appropriate for DST-7 transform.

Figure 12:
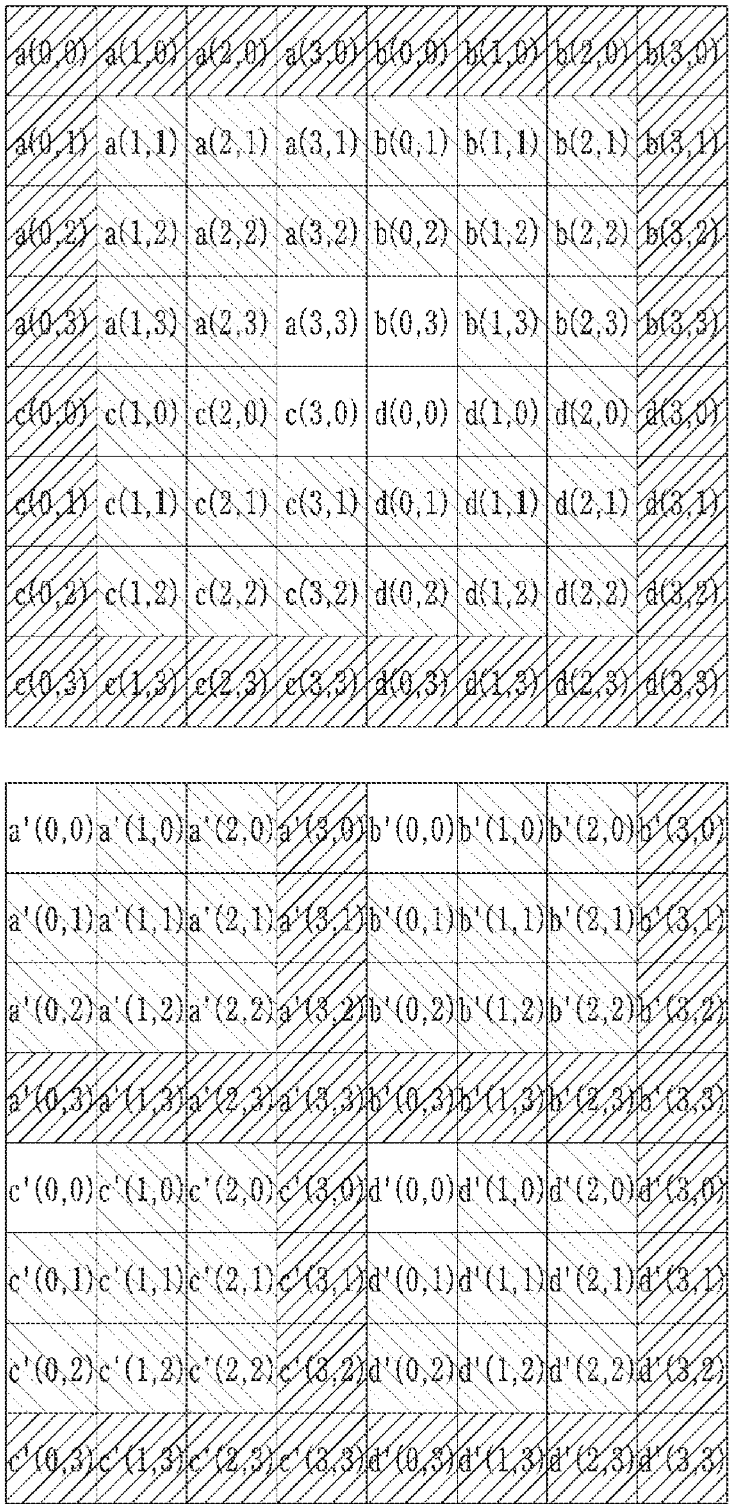
FIG. 12 is a diagram illustrating the distribution characteristic of the residual signals before and after shuffling of the 2N×2N prediction unit (PU) according to the present invention.

FIG. 12 is a diagram illustrating the distribution characteristic of the residual signals before and after shuffling of the 2N×2N prediction unit (PU) according to the present invention.

Referring to FIG. 12, the upper block shows the distribution before shuffling of the residual signals within the 2N×2N PU of the 8×8 CU that is predicted in the inter mode. Equation 5 below shows a value according to the position of each residual signal within the upper block in FIG. 12.

[Equation 5]

$$a(x, y), b(x, y), c(x, y), d(x, y), 0 \le x \le \frac{PU\ \text{width}}{2}, 0 \le y \le \frac{PU\ \text{height}}{2}$$

Due to the distribution characteristic of the residual signals within the PU of the CU predicted in the inter mode, many residual signals having relatively small values are distributed in the central region within the upper block in FIG. 12, and many residual signals having larger values are distributed as being closer to the boundary of the upper block.

The lower block in FIG. 12 shows the distribution characteristic of residual signals within the 2N×2N PU after performing shuffling. This shows that the distribution of residual signals for each sub-block of the PU on which shuffling has been performed is the distribution of residual signals appropriate for the first basis vector of DST-7. That is, since the residual signal within each sub-block has larger value as being away from the position of (0, 0), when performing transform, transform coefficient values in which the frequency is transformed through DST-7 are concentrated in the low frequency domain.

Equation 6 below represents a method of performing shuffling depending on the position of each of four sub-blocks within the PU, wherein the four sub-blocks result from the partitioning of the PU in the quad tree structure.

[Equation 6]

$$S0$$
$$a'(x, y) = a(W_{blk0} - 1 - x, H_{blk0} - 1 - y)$$
$$S1$$
$$b'(x, y) = b(x, H_{blk1} - 1 - y)$$
$$S2$$
$$c'(x, y) = c(W_{blk2} - 1 - x, y)$$
$$S3$$
$$d'(x, y) = d(x, y)$$
$$0 \le x \le W_k, 0 \le y \le H_k, k \in \{blk0, blk1, blk2, blk3\}$$

Here, $W_k$ and $H_k$ respectively denote the width and the height of the k-th sub-block (k∈{blk0, blk1, blk2, blk3}) in the PU, and blk0 to blk3 respectively denote sub-blocks that result from the partitioning of the PU in the quad tree structure. Further, x and y denote horizontal and vertical positions within the sub-block, respectively. As shown in the upper block in FIG. 12, positions of residual signals before performing shuffling are designated by a(x,y), b(x,y), c(x,y), and d(x,y). As shown in the lower block in FIG. 12, positions of residual signals which are changed through shuffling are designated by a'(x,y), b'(x,y), c'(x,y), and d'(x,y).

FIG. 13 is a diagram illustrating an example of 4×4 residual data rearrangement of sub-blocks according to the present invention.

Referring to FIG. 13, a sub-block may mean one among multiple sub-blocks that belong to an 8×8 prediction block. FIG. 13(*a*) shows the position of the original residual data before rearrangement, and FIG. 13(*b*) shows the rearranged position of the residual data.

Referring to FIG. 13(*c*), the value of residual data may gradually increase from the position of (0,0) to the position of (3,3). Here, horizontal, and/or vertical one-dimensional residual data within each sub-block may have data distribution in the form of the basis vector shown in FIG. 8.

That is, regarding shuffling according to the present invention, residual data of each sub-block may be rearranged so that the distribution of residual data is appropriate to the form of the DST-7 basis vector. After shuffling on each sub-block, DST-7 transform may be applied to data rearranged in each sub-block unit.

In the meantime, the sub-block may be further partitioned in the quad tree structure on the basis of the depth of the TU, or may be subjected to the rearrangement process selectively. For example, when the depth of the TU is two, an N×N sub-block belonging to a 2N×2N PU is partitioned into N/2×N/2 blocks, and the rearrangement process is applied to each of the N/2×N/2 blocks. Here, TU partitioning based on the quad tree may be repeatedly performed until the minimum TU size is reached.

Further, when the depth of the TU is zero, DCT-2 transform is applied to a 2N×2N block. Here, rearrangement of residual data may not be performed.

In the meantime, the SDST method according to the present invention uses the distribution characteristic of residual signals within the PU block, so the partitioning structure of the TU performing SDST may be defined as partitioning in the quad tree structure on the basis of the PU.

Figure 14A:
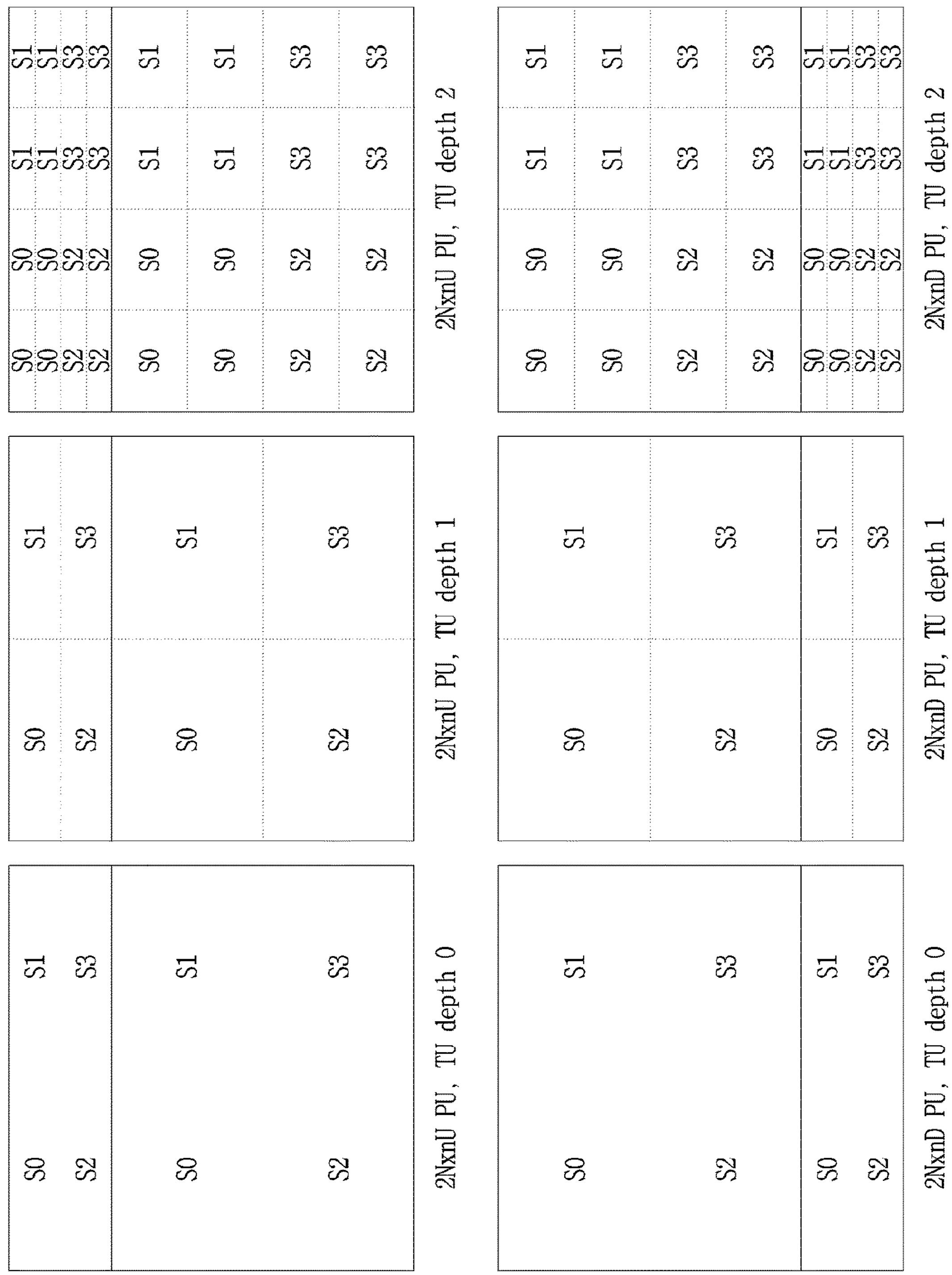
FIGS. 14*a* and 14*b* are diagrams illustrating an embodiment of a transform unit (TU) partitioning structure of the coding unit (CU) according to the prediction unit (PU) mode and the shuffling method of the transform unit (TU).
Figure 14B:
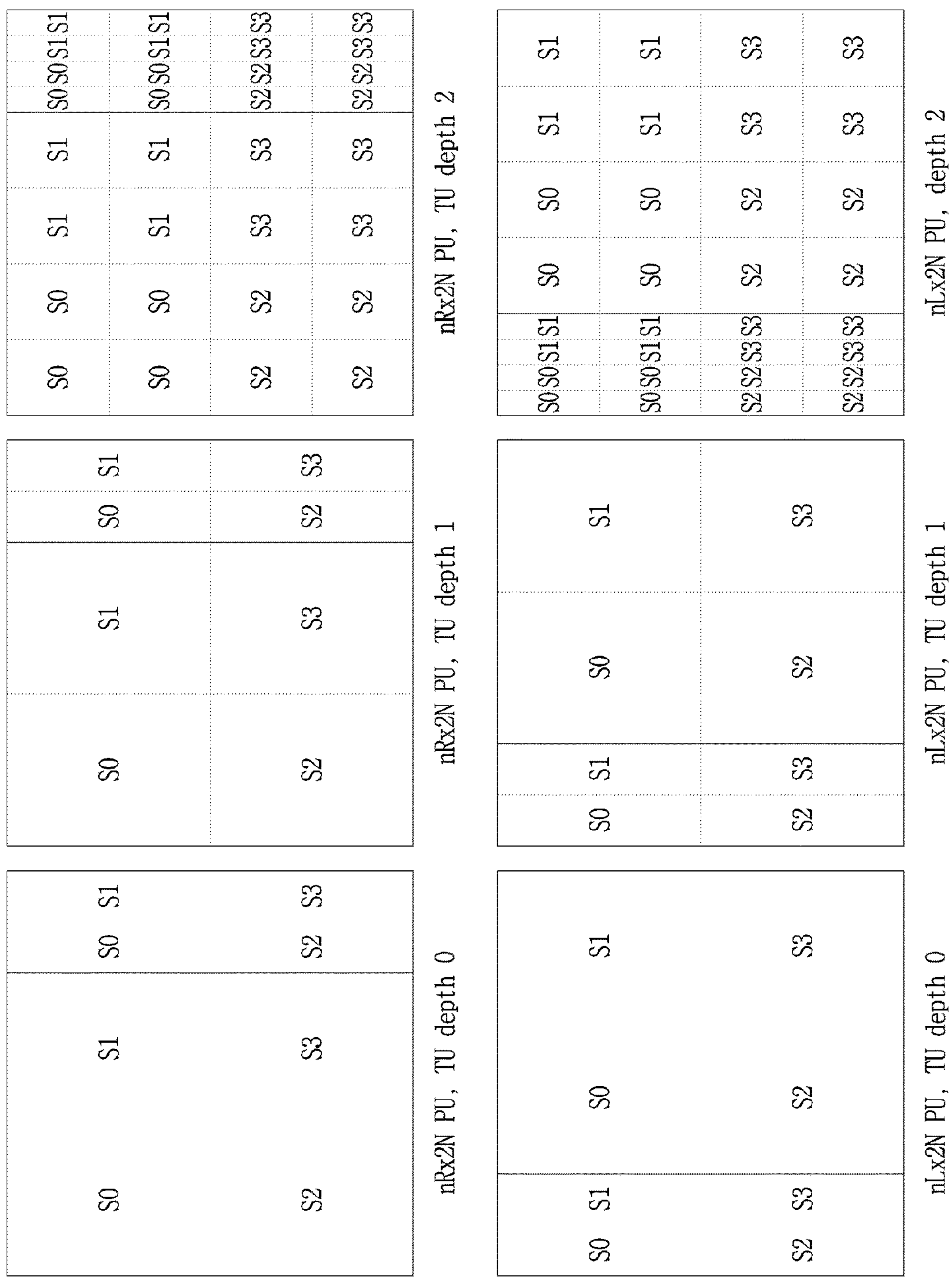

FIGS. 14(*a*) and 14(*b*) are diagrams illustrating an embodiment of a transform unit (TU) partitioning structure of the coding unit (CU) according to the prediction unit (PU) mode and the shuffling method of the transform unit (TU). FIGS. 14(*a*) and 14(*b*) show quad tree partitioning structures of the TU according to the depth of the TU, for each of asymmetric partitioning modes (2N×nU, 2N×nD, nR×2N, and nL×2N) of the inter-predicted PU.

Referring to FIGS. 14(*a*) and 14(*b*), the thick solid line of each block denotes the PU within the CU, and the thin solid line denotes the TU. Further, S0, S1, S2, and S3 within each TU denote the shuffling method of the residual signal within the TU defined in Equation 6 above.

In the meantime, in FIGS. 14(*a*) and 14(*b*), the TU at the depth of zero of each PU may be the same as the PU in block size (for example, in the 2N×2N PU, the size of the TU at the depth of zero may be the same as the size of the PU). Here, shuffling for the residual signal within the TU at the depth of zero will be described later with reference to FIG. 18.

Further, when at least one among the CU, the PU, and the TU is in the rectangular shape (for example, 2N×nU, 2N×nD, nR×2N, and nL×2N), before residual signal rearrangement, at least one among the CU, the PU, and the TU is partitioned into N sub-blocks, such as two, four, six, eight, 16 sub-blocks, and the like, then the residual signal rearrangement is applied to the sub-blocks that result from the partitioning.

Further, when at least one among the CU, the PU, and the TU is in the square shape (for example, 2N×2N, and N×N), before residual signal rearrangement, at least one among the CU, the PU, and the TU is partitioned into N sub-blocks, such as four, eight, 16 sub-blocks, and the like, then the residual signal rearrangement is applied to the sub-blocks that result from the partitioning.

Further, when the TU results from the partitioning of the CU or the PU and the TU has the top depth (is not partitioned), the TU is partitioned into N sub-blocks, such as two, four, six, eight, 16 sub-blocks, and the like, then the residual signal rearrangement is performed in units of the sub-block that result from the partitioning.

In the above example, when the CU, the PU, and the TU have different shapes or different sizes, the residual signal rearrangement is performed. However, the residual signal rearrangement may also be applied when at least two among the CU, the PU, and the TU have the same shape or the same size.

In the meantime, in FIGS. 14(*a*) and 14(*b*), an asymmetric partitioning mode of the inter-predicted PU is described, but without limited thereto, the partitioning of the TU and the shuffling of the TU may be applied to a symmetric partitioning mode (2N×N and N×2N) of the PU.

DST-7 transform may be performed on each TU within the PU on which shuffling has been performed. Here, when the CU, the PU, and the TU have the same size and the same shape, DST-7 transform is performed on one block.

Considering the distribution characteristic of the residual signals of the inter-predicted PU block, performing DST-7 transform after shuffling regardless of the size of the CU and the PU partitioning mode may be more efficient than performing DCT-2 transform.

After transform, when many transform coefficients are distributed near the low frequency component (particularly, a DC component), the distribution of residual signals has higher compression efficiency than the opposite case in terms of i) minimization of energy loss after quantization, and ii) reduction in bit usage in the entropy coding process.

FIG. 15 is a diagram illustrating the result of performing DCT-2 transform and SDST transform according to the distribution of the residual signals of a 2N×2N prediction unit (PU).

The drawing shown at the left of FIG. 15 shows the distribution where when the PU partitioning mode of the CU is 2N×2N, the residual signal increases from the center to the boundary. Further, the drawing shown in the middle of FIG. 15 shows the distribution of residual signals in which DCT-2 transform is performed on the TU at the depth of one within the PU. The drawing shown at the right of FIG. 15 shows the distribution of residual signals in which DST-7 transform (SDST) is performed after shuffling on the TU at the depth of one within the PU.

Referring to FIG. 15, compared to the case of performing DCT-2 on the TU of the PU having the distribution characteristic of residual signals described above, when performing SDST, more coefficients are concentrated near the low frequency component and coefficients on the high frequency component have smaller values. According to the transform characteristic, it is found that when transforming the residual signal of the inter-predicted PU, performing SDST is more advantageous in terms of compression efficiency rather than performing DCT-2.

The unit of the block in which DST-7 transform is performed is the TU unit, in which SDST is performed, which is defined in the PU. As described with reference to FIG. 14, the TU may be result from the partitioning of the PU unit with the maximum depth in the quad tree or in the binary tree. This means that DST-7 transform may be performed not only on a square block but also on a rectangular block after shuffling.

For example, for the inter-predicted block, the residual block having the same size as the block may be decoded, or the sub residual block corresponding to a part of the block may be decoded. Information for this may be signaled for the block, and the information may be, for example, a flag. When the residual block having the same size as the block is decoded, information on the transform kernel is determined by decoding information contained in a bitstream. When the sub residual block corresponding to a part of the block is decoded, the transform kernel for the sub residual block is determined on the basis of information for specifying the type of the sub residual block and/or the position within the block. For example, information on the type of the sub residual block and/or the position within the block may be contained in the bitstream for signaling. Here, when the block is larger than 32×32, determination of the transform kernel on the basis of the type of the sub residual block and/or the position within the block is not performed. For example, for the block larger than 32×32, a predetermined transform kernel (for example, DCT-2) may be applied, or information on the transform kernel may be explicitly signaled. Alternatively, when the width or the height of the block is larger than 32, determination of the transform kernel on the basis of the type of the sub residual block and/or the position within the block is not performed. For example, for a 64×8 block, a predetermined transform kernel (for example, DCT-2) may be applied, or information on the transform kernel may be explicitly signaled.

Information on the type of the sub residual block may be partitioning information of the block. The partitioning information of the block may be, for example, partitioning direction information indicating one between horizontal partitioning and vertical partitioning. Alternatively, the partitioning information of the block may contain partitioning ratio information. For example, the partitioning ratio may include 1:1, 1:3, and/or 3:1. The partitioning direction information and the partitioning ratio information may be signaled as separate syntax elements or as a single syntax element.

Information on the position of the sub residual block may indicate the position within the block. For example, when partitioning of the block is vertical partitioning, the information on the position indicates one between the left side and the right side. Further, when partitioning of the block is horizontal partitioning, the information on the position indicates one between the top and the bottom.

The transform kernel of the sub residual block may be determined on the basis of the type information and/or the position information. The transform kernel may be determined independently for horizontal transform and vertical transform. For example, the transform kernel may be determined on the basis of the partitioning direction. For example, in the case of vertical partitioning, the first transform kernel may be applied for vertical transform. In the case of horizontal partitioning, the first transform kernel may be applied for horizontal transform. For example, the first transform kernel or the second transform kernel may be applied to horizontal transform in the case of vertical partitioning and vertical transform in the case of horizontal partitioning. For example, in the case of vertical partitioning, the second transform kernel may be applied to horizontal transform at the left position, and the first transform kernel may be applied to horizontal transform at the right position. Further, in the case of horizontal partitioning, the second transform kernel may be applied to vertical transform at the top position, and the first transform kernel may be applied to vertical transform at the bottom position. For example, the first transform kernel and the second transform kernel may be DST-7 and DCT-8, respectively. For example, the first transform kernel and the second transform kernel may be DST-7 and DCT-2, respectively. However, without being limited thereto, among the various transform kernels described in the specification, any two different transform kernels may be used as first and second transform kernels.

Here, the block may mean the CU or the TU. Further, the sub residual block may mean a sub-TU.

Figure 16:
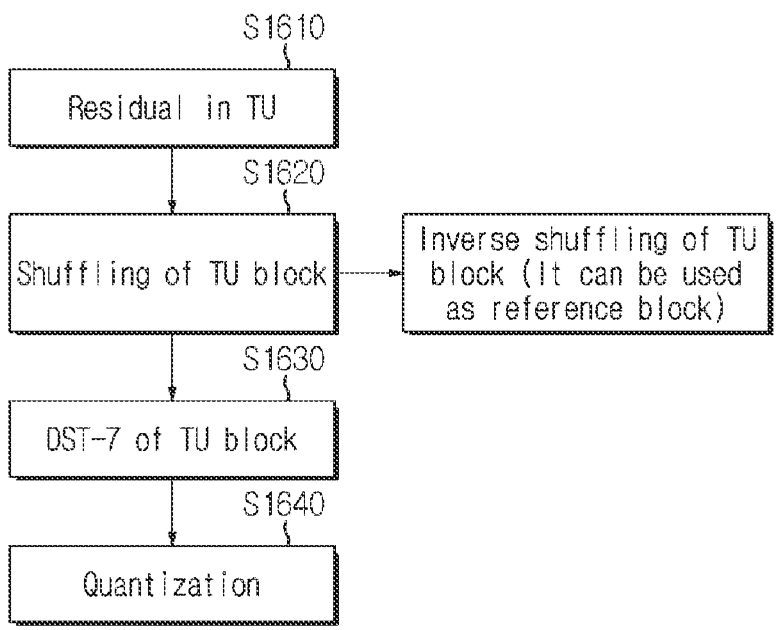
FIG. 16 is a diagram illustrating an SDST process according to the present invention.

FIG. 16 is a diagram illustrating an SDST process according to the present invention.

The residual signal of the TU which is the transform target is input at step S1610. Here, the TU may be a TU that results from the partitioning of the PU in which the prediction mode is the inter mode. Shuffling may be performed on the TU which is the transform target at step S1620. Nest, DST-7 transform is performed on the TU on which shuffling has been performed at step S1630, quantization is performed at step S1640, and a series of subsequent processes is performed, whereby the SDST process is performed in this order.

In the meantime, shuffling and DST-7 transform may be performed on the block in which the prediction mode is the intra mode.

Hereinafter, as an embodiment for implementing SDST transform in the encoder, i) a method of performing SDST on all TUs within the inter-predicted PU, and ii) a method of selectively performing SDST or DCT-2 through rate-distortion optimization will be described. In the following method, the inter-predicted block is described, but without limited thereto, the following method may be applied to the intra-predicted block.

Figure 17:
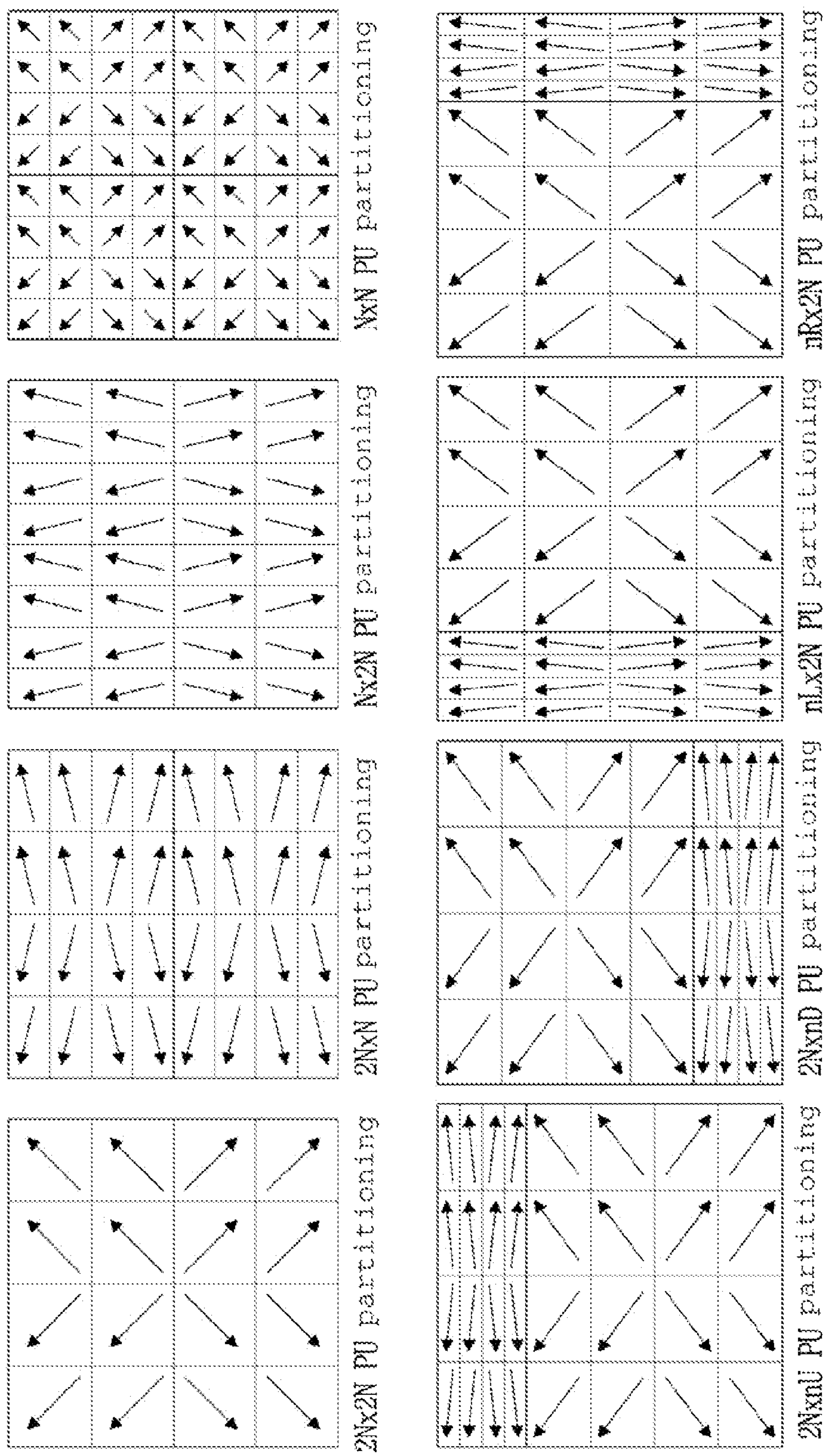
FIG. 17 is a diagram illustrating partitioning of the transform unit (TU) for each prediction unit (PU) partitioning mode of the inter-predicted coding unit (CU) and the distribution characteristic of the size of the residual absolute value according to the present invention.

FIG. 17 is a diagram illustrating partitioning of the transform unit (TU) for each prediction unit (PU) partitioning mode of the inter-predicted coding unit (CU) and the distribution characteristic of the size of the residual absolute value according to the present invention.

Referring to FIG. 17, in the inter prediction mode, the TU may result from the partitioning of the CU with up to the maximum depth in the quad tree or in the binary tree, and total K partitioning modes of the PU may be present. Here, K is a positive integer, and for example, in FIG. 17, K is 8.

As described above with reference to FIG. 10, SDST according to the present invention uses the distribution characteristic of residual signals in the PU with in the inter-predicted CU. Further, the TU may result from the partitioning of the PU in the quad tree structure or in the binary tree structure. That is, the TU at the depth of zero may correspond to the PU, and the TU at the depth of one may correspond to each sub-block obtained by partitioning the PU once in the quad tree structure or in the binary tree structure.

Each block in FIG. 17 shows a form in which the TU results from the partitioning by the depth of two with respect to each PU partitioning mode of the inter-predicted CU. Here, the thick solid line may denote the PU, the thin solid line may denote the TU, and the arrow direction of each TU may denote a direction in which the residual signal value within the TU increases. Each TU may be subjected to shuffling described above regarding the shuffling step according to the position within the PU.

Particularly, in the case of the TU at the depth of zero, shuffling may be performed in various methods in addition to the method proposed for the shuffling step.

One of them is a method where scanning starts from the residual signal at the center position of the PU block and nearby residual signals are scanned in a circling manner in the boundary direction of the block and the scanned residual signals are rearranged in zig-zag scanning order starting from the position of (0,0) in the PU.

FIG. 18 is a diagram illustrating residual signal scanning order and rearrangement order of the transform unit (TU) at the depth of zero within the prediction unit (PU) according to an embodiment of the present invention.

FIGS. 18(*a*) and 18(*b*) show the scanning order for shuffling, and FIG. 18(*c*) shows the rearrangement order for SDST.

DST-7 transform may be performed on the residual signal within each TU subjected to shuffling, and quantization, entropy encoding, and the like may be performed. This shuffling method uses the distribution characteristic of residual signals within the TU according to the PU partitioning mode, so the distribution of the residual signals may be optimized for enhancing efficiency of DST-7 transform which is the next step.

In the encoder, SDST may be performed on all TUs within the inter-predicted PU according to the SDST process shown in FIG. 16. According to the PU partitioning mode of the inter-predicted CU, TU partitioning may be performed from the PU up to the depth of two in the same form as shown in FIG. 17. By using the distribution characteristic of residual signals within the TU in FIG. 17, shuffling may be performed on the residual signal within each TU. Afterward, transform using the DST-7 transform kernel may be performed, then quantization, entropy encoding, and the like may be performed.

When reconstructing the residual signal of the TU within the inter-predicted PU, the decoder performs DST-7 inverse transform on each TU within the inter-predicted PU, and performs inverse shuffling on the reconstructed residual signal, thereby obtaining the reconstructed residual signal. In this SDST method, SDST is applied to the transform method of all TUs within the inter-predicted PU, so there is no flag or information required to be further signaled to the decoder. That is, the SDST method may be performed without any signaling of the SDST method.

In the meantime, even though SDST is performed on all TUs within the inter-predicted PU, the encoder determines a part of the rearrangement methods for the residual signal which are described above regarding the shuffling step as the optimum rearrangement method, and information on the determined rearrangement method may be signaled to the decoder.

As another embodiment of performing SDST, at least one among two or more transform methods (for example, DCT-2 and SDST) may be selected for application in order to transform the PU. According to this method, compared to the embodiment in which SDST is performed on all TUs within the inter-predicted PU, the computation of the encoder may increase. However, a more efficient transform method is selected among DCT-2 and SDST, so compression efficiency may be enhanced.

Figure 19:
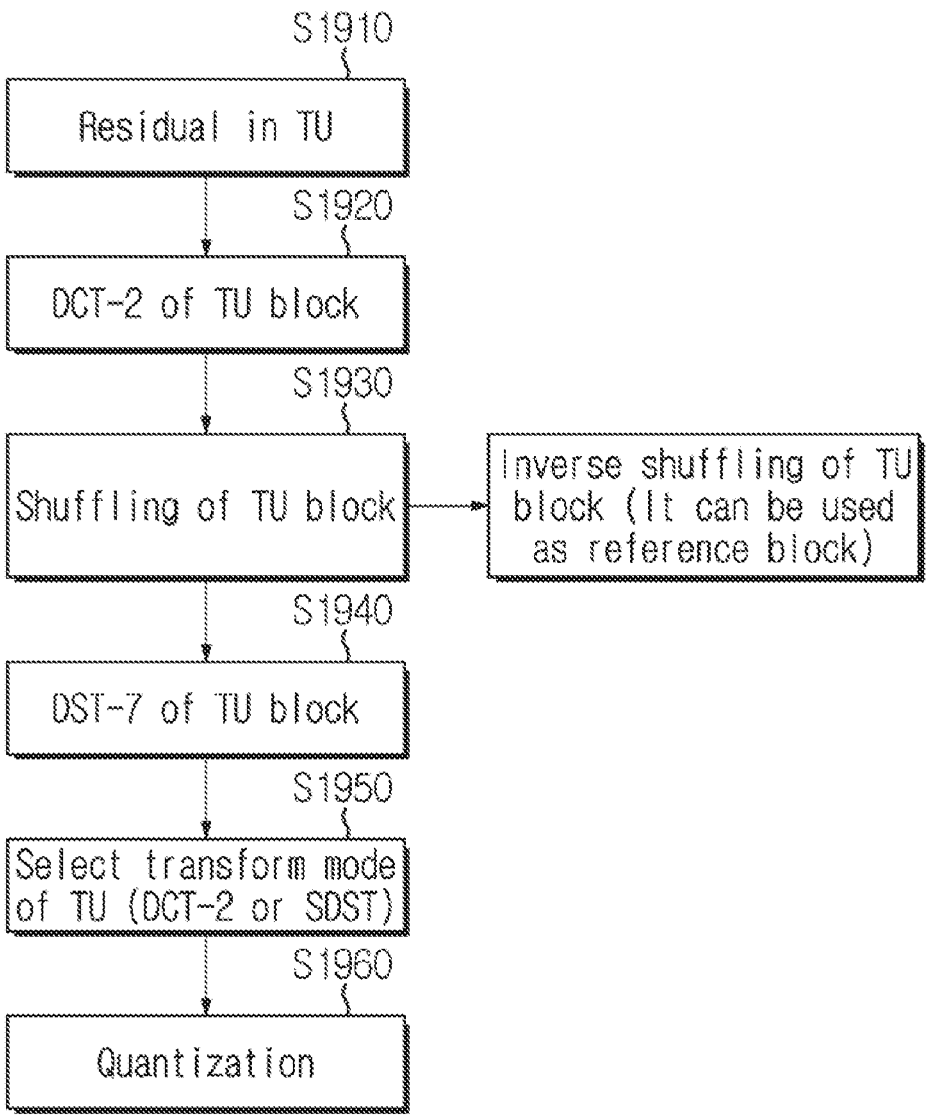
FIG. 19 is a flowchart illustrating a DCT-2 or SDST selection encoding process through rate-distortion optimization (RDO) according to the present invention.

FIG. 19 is a flowchart illustrating a DCT-2 or SDST selection encoding process through rate-distortion optimization (RDO) according to the present invention.

Referring to FIG. 19, the residual signal of the TU which is the transform target may be input at step S1910. The cost of the TU obtained by performing DCT-2 on each TU within the PU predicted in the inter mode at step S1920 may be compared with the cost of the TU obtained by performing shuffling at step S1930 and DST-7 at step S1940, thereby determining the optimum transform mode (for example, DST-2 or SDST) of the TU in terms of rate-distortion at step S1950. Next, depending on the determined transform mode, quantization may be performed on the transformed TU at step S1960, and entropy encoding may be performed.

In the meantime, only when the TU satisfies one among the following conditions, the optimum transform mode among SDST and DCT-2 is selected.

i) The TU needs to be a CU regardless of a PU partitioning mode or needs to result from partitioning of a CU in the quad tree or in the binary tree.

ii) The TU needs to be a PU according to a PU partitioning mode or needs to result from partitioning of a PU in the quad tree or in the binary tree.

iii) The TU does not result from partitioning of a CU regardless of a PU partitioning mode.

Condition i) is a method where with respect to the CU that is partitioned in the quad tree or in the binary tree regardless of the PU partitioning mode or to the TU that is obtained from partitioning into the CU size, DCT-2 or SDST is selected as the transform mode in terms of rate-distortion optimization.

Condition ii) is related to the embodiment where SDST is performed on all TUs within the inter-predicted PU. That is, according to the PU partitioning mode, DCT-2 and SDST are performed on the PU that is partitioned in the quad tree or in the binary tree or on the TU that is obtained from partitioning into the PU size, and considering each cost, the transform mode of the TU is determined.

Condition iii) is that regardless of the PU partitioning mode, the CU or the TU is not partitioned in the CU unit having the same size as the TU, and DCT-2 and SDST are performed to determine the transform mode of the TU.

In comparing the rate-distortion cost (RD cost) for the TU block at the depth of zero in a particular PU partitioning mode, the cost of the result of performing SDST on the TU at the depth of zero is compared with the cost of the result of performing DCT-2 on the TU at the depth of zero, and the transform mode of the TU at the depth of zero may be selected.

Figure 20:
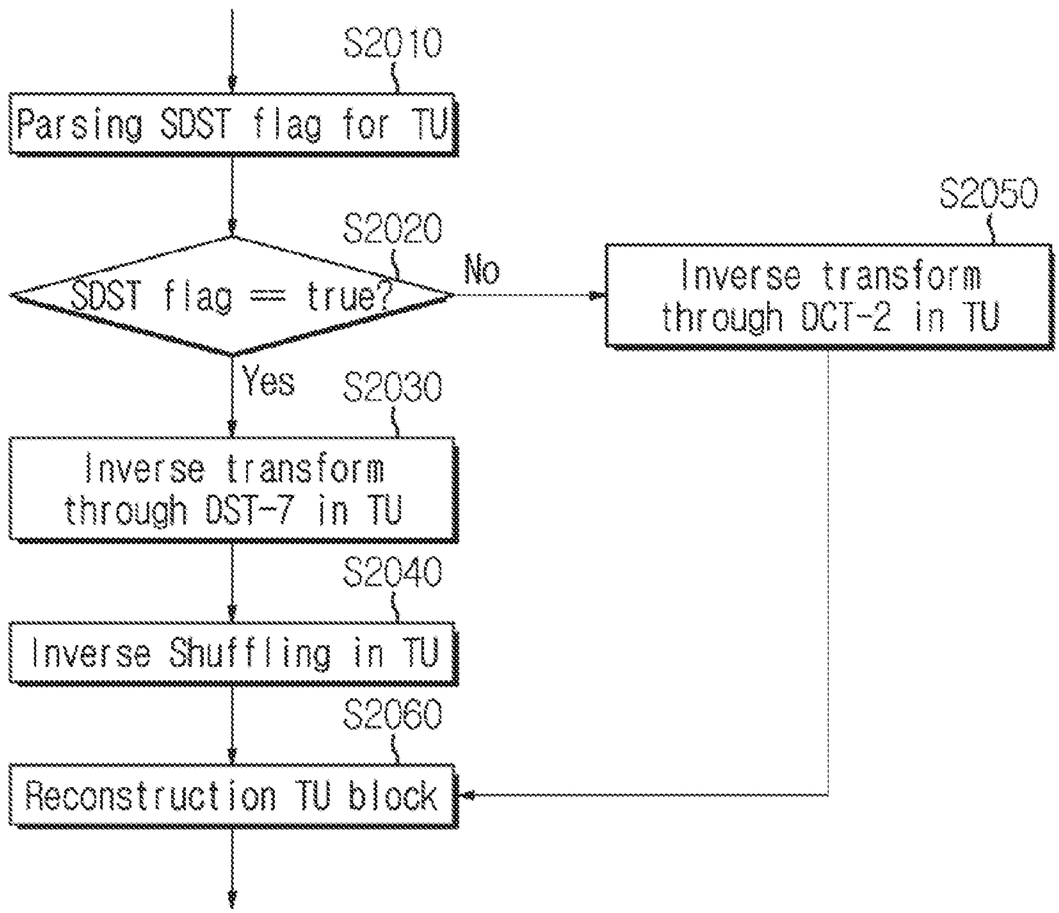
FIG. 20 is a flowchart illustrating a process of selecting DCT-2 or SDST for decoding according to the present invention.

FIG. 20 is a flowchart illustrating a process of selecting DCT-2 or SDST for decoding according to the present invention.

Referring to FIG. 20, the signaled SDST flag may be referenced for each TU at step S2010. Here, the SDST flag may be a flag indicating whether SDST is used as the transform mode.

When the SDST flag is true at step S2020—Yes, the transform mode of the TU is determined to be the SDST mode. Then, DST-7 inverse transform is performed on the residual signal within the TU at step S2030. With respect to the residual signal within the TU on which DST-7 inverse transform has been performed, inverse shuffling using Equation 6 described above is performed according to the position of the TU within the PU at step S2040. Finally, the reconstructed residual signal is obtained at step S2060.

In the meantime, when the SDST flag is not true at step S2020—No, the transform mode of the TU is determined to be the DCT-2 mode. Then, DCT-2 inverse transform is performed on the residual signal within the TU at step S2050, and the reconstructed residual signal is obtained at step S2060.

When the SDST method is used, residual data is rearranged. Here, the residual data may mean residual data corresponding to the inter-predicted PU. Integer transform derived from DST-7 using separable property may be used as the SDST method.

In the meantime, for selective use of DCT-2 or DST-7, sdst_flag may be signaled. Signaling of the sdst_flag is performed in units of the TU. The sdst_flag may indicate that it is required to identify whether SDST is performed.

Figure 21:
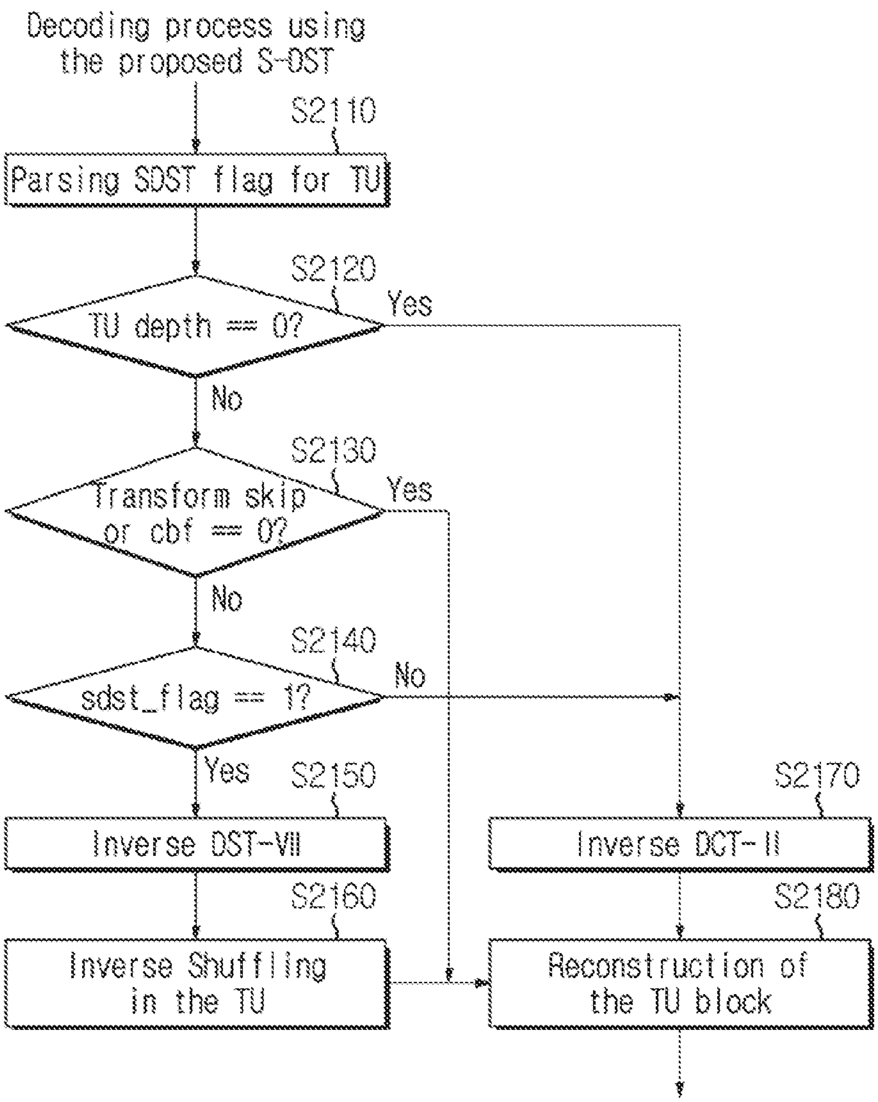
FIG. 21 is a flowchart illustrating a decoding process using SDST according to the present invention.

FIG. 21 is a flowchart illustrating a decoding process using SDST according to the present invention.

Referring to FIG. 21, the sdst_flag may be entropy decoded in units of the TU at step S2110.

First, when the depth of the TU is zero at step S2120—Yes, SDST is not used and DCT-2 is used to reconstruct the TU at steps S2170 and S2180. This is because SDST may be performed between the TU's depth of one and the maximum depth value of the TU.

Further, although the depth of the TU is not zero at step S2120—No, when the transform mode of the TU is a transform skip mode and/or the coded block flag (cbf) value of the TU is zero at step S2130—Yes, the TU is reconstructed without performing inverse transform at step S2180.

In the meantime, when the depth of the TU is not zero at step S2120—No and when the transform mode of the TU is not the transform skip mode and the cbf value of the TU is not zero at step S2130—No, the sdst_flag value is checked at step S2140.

Here, when the sdst_flag value is one at step S2140—Yes, inverse transform based on DST-7 is performed at step S2150, inverse shuffling is performed on the residual data of the TU at step S2160, and the TU is reconstructed at step S2180. In contrast, when the sdst_flag value is not one at step S2140—No, inverse transform based on DCT-2 is performed at step S2170, and the TU is reconstructed at step S2180.

Here, a signal which is the target of shuffling or rearrangement may be at least one among a residual signal before inverse transform, a residual signal before dequantization, a residual signal after inverse transform, a residual signal after dequantization, and a reconstructed residual signal, and a reconstructed block signal.

In the meantime, in FIG. 21, it is described that the sdst_flag is signaled in units of the TU, but the sdst_flag may be signaled selectively on the basis of at least one among the transform mode of the TU and the cbf value of the TU. For example, when the transform mode of the TU is the transform skip mode and/or the cbf value of the TU is zero, the sdst_flag is not signaled. Further, even when the depth of the TU is zero, the sdst_flag is not signaled.

In the meantime, it is described that the sdst_flag is signaled in units of the TU, but it may be signaled in a predetermined unit. For example, the sdst_flag may be signaled in units of at least one among a video, a sequence, a picture, a slice, a tile, a coding tree unit, a coding unit, a prediction unit, and a transform unit.

Like the embodiments of the SDST flag in FIG. 20 and the sdst_flag in FIG. 21, the selected transform mode information may be entropy encoded/decoding through an n-bit flag or index (n is a positive integer equal to or larger than one) in units of the TU. The transform mode information may indicate at least one among whether transform is performed on the TU through DCT-2, whether transform is performed on the TU through SDST, whether transform is performed on the TU through DST-7, and so on.

In the case of only the TU within the inter-predicted PU, the transform mode information may be entropy encoded/decoded in a bypass mode. Further, in the case of at least one among the transform skip mode, a residual differential PCM (RDPCM) mode, and a lossless mode, entropy encoding/decoding of the transform mode information is omitted and the transform mode information is not signaled.

Further, when the coded block flag of the block is zero, entropy encoding/decoding of the transform mode information is omitted and the transform mode information is not signaled. When the coded block flag is zero, the inverse transform process is omitted in the decoder. Thus, even when the transform mode information is not present in the decoder, reconstruction of the block is possible.

However, the transform mode information is not limited to representing the transform mode through the flag, and may be implemented in the form of a pre-defined table and an index. Here, the pre-defined table may be that an available transform mode for each index is defined.

In the meantime, in FIGS. 19 to 21, selective use of SDST or DCT-2 is described, but without being limited thereto, DCT-n or DST-n (n is a positive integer) may be applied instead of DCT-2.

Further, transform of DCT-2 or SDST may be performed separately in the horizontal direction and the vertical direction. The same transform mode may be used for the horizontal direction and the vertical direction, or different transform modes may be used.

Further, the transform mode information on whether DCT-2 is used for the horizontal direction and the vertical direction, whether SDST is used, and whether DST-7 is used may be entropy encoded/decoded, respectively. The transform mode information may be, for example, signaled as an index. The transform kernels indicated by the same index may be the same for the intra-predicted block and the inter-predicted block.

Further, the transform mode information may be entropy encoded/decoded in units of at least one among a CU, a PU, a TU, and a block.

Further, the transform mode information may be signaled according to the luma component or the chroma component. In other words, the transform mode information may be signaled according to a Y component, a Cb component, or a Cr component. For example, when signaling the transform mode information on whether DCT-2 is performed for the Y component or SDST is performed, the transform mode information signaled for the Y component may be used as the transform mode of the block without signaling any transform mode information for at least one among the Cb component and the Cr component.

Here, the transform mode information may be entropy encoded/decoding with an arithmetic coding method using a context model. When the transform mode information is implemented in the form of a pre-defined table and an index, all or a part of bins among multiple bins is entropy encoded/decoding with the arithmetic coding method using the context model.

Further, the transform mode information may be entropy encoded/decoding selectively depending on the block size. For example, when the size of the current block is equal to or larger than 64×64, the transform mode information is not entropy encoded/decoded. When the size is equal to or smaller than 32×32, the transform mode information is entropy encoded/decoded.

Further, when a non-zero transform coefficient or L quantized levels are present within the current block, the transform mode information is not entropy encoded/decoded, and one method among DCT-2, DST-7, and SDST methods is performed. Here, regardless of the position of the non-zero transform coefficient or the quantized level within the block, the transform mode information may not be entropy encoded/decoded. Further, only when the non-zero transform coefficient or the quantized level is present at the top left position within the block, the transform mode information may not be entropy encoded/decoded. Here, L may be a positive integer including zero, and may be one, for example.

Further, when the non-zero transform coefficient or J or more quantized levels are present within the current block, the transform mode information is entropy encoded/decoded. Here, J is a positive integer.

Further, the transform mode information is a method in which the use of some transform modes is limited according to the transform mode of the collocated block or the transform mode of the collocated block is represented by few bits, the binarization method of the transform method may vary.

The above-described SDST may be limitedly used on the basis of at least one among a prediction mode, an intra prediction mode, an inter prediction mode, a TU depth, a size, and a shape of the current block.

For example, SDST is used when the current block is encoded in the inter mode.

The minimum/maximum depth in which SDST is allowed may be defined. In this case, when the depth of the current block is equal to or larger than the minimum depth, SDST is used. Alternatively, when the depth of the current block is equal to or smaller than the maximum depth, SDST is used. Here, the minimum/maximum depth may be a fixed value, or may be determined variably on the basis of information indicating the minimum/maximum depth. Information indicating the minimum/maximum depth may be signaled from the encoder, and may be derived from the decoder on the basis of the attribute (for example, the size, the depth, and/or the shape) of the current/neighboring block.

The minimum/maximum size in which SDST is allowed may be defined. Similarly, when the size of the current block is equal to or larger than the minimum size, SDST is used. Alternatively, when the size of the current block is equal to or smaller than the maximum size, SDST is used. Here, the minimum/maximum size may be a fixed value, or may be determined variably on the basis of information indicating the minimum/maximum size. Information indicating the minimum/maximum size may be signaled from the encoder, and may be derived from the decoder on the basis of the attribute (for example, the size, the depth, and/or the shape) of the current/neighboring block. For example, when the current block is 4×4, DCT-2 is used as the transform method, and transform mode information on whether DCT-2 is used or SDST is used is not entropy encoded/decoded.

The shape of the block in which SDST is allowed may be defined. In this case, when the shape of the current block is the defined block shape, SDST is used. Further, the shape of the block in which SDST is not allowed may be defined. In this case, when the shape of the current block is the defined block shape, SDST is not used. The shape of the block in which SDST is allowed or is not allowed may be fixed, and information on this may be signaled from the encoder. Alternatively, it may be derived from the decoder on the basis of the attribute (for example, the size, the depth, and/or the shape) of the current/neighboring block. The shape of the block in which SDST is allowed or is not allowed may mean, for example, in an M×N block, M, N, and/or the ratio between M and N.

Further, when the depth of the TU is zero, DCT-2 or DST-7 is used as the transform method, and transform mode information on which transform method has been used is entropy encoded/decoded. When DST-7 is used as the transform method, the rearrangement process of the residual signal is performed. Further, when the depth of the TU is one or more, DCT-2 or SDST is used as the transform method, and transform mode information on which transform method has been used is entropy encoded/decoded.

Further, the transform method may be used selectively depending on the partitioning shape of the CU and the PU or the shape of the current block.

According to the embodiment, when the partitioning shape of the CU and the PU or the shape of the current block is 2N×2N, DCT-2 is used. With respect to remaining partitioning shapes and block shapes, DCT-2 or SDST may be selectively used.

Further, when the partitioning shape of the CU and the PU or the shape of the current block is 2N×N or N×2N, DCT-2 is used. With respect to remaining partitioning shapes and block shapes, DCT-2 or SDST may be selectively used.

Further, when the partitioning shape of the CU and the PU or the shape of the current block is nR×2N, nL×2N, 2N×nU, or 2N×nD, DCT-2 is used. With respect to remaining partitioning shapes and block shapes, DCT-2 or SDST may be selectively used.

In the meantime, when SDST or DST-7 is performed in units of a block that results from partitioning of the current block, scanning and inverse scanning may be performed on the transform coefficient (quantized level) in units of the block that results from the partitioning. Further, when SDST or DST-7 is performed in units of a block that results from partitioning of the current block, scanning and inverse scanning may be performed on the transform coefficient (quantized level) in units of the current block that is not partitioned.

Further, transform/inverse transform using SDST or DST-7 may be performed according to at least one among the intra prediction mode (direction) of the current block, the size of the current block, and the component (the luma component or the chroma component) of the current block.

Further, in transform/inverse transform using SDST or DST-7, DST-1 may be used instead of DST-7. Further, in transform/inverse transform using SDST or DST-7, DCT-4 may be used instead of DST-7.

Further, in transform/inverse transform using DCT-2, the rearrangement method that is used for rearrangement of the residual signals of SDST or DST-7 may be applied. That is, even when using DCT-2, rearrangement of the residual signals or rotation of the residual signal using a predetermined angle is performed.

Hereinafter, various modifications and embodiments for the shuffling method and the signaling method will be described.

SDST of the present invention is intended to enhance image compression efficiency by changing transform, shuffling, rearrangement, and/or flipping methods. Performing DST-7 through shuffling of the residual signal effectively reflects the distribution characteristic of residual signals within the PU, so high compression efficiency is achieved.

In the above description related to the shuffling step, the residual signal rearrangement method has been described. Hereinafter, in addition to the shuffling method for rearrangement of the residual signals, other implementation methods will be described.

The rearrangement method described below may be applied to at least one of embodiments related to the SDST method described above.

In order to minimize hardware complexity in implementing rearrangement of the residual signals, the residual signal rearrangement process may be implemented by a horizontal flipping method and a vertical flipping method. The residual signal rearrangement method may be implemented through flipping as shown in the following (1) to (4). Rearrangement described below may mean flipping.

$$r'(x,y)=r(x,y);\ \text{no flipping} \quad (1)$$

$$r'(x,y)=r(w-1-x,y);\ \text{horizontal flipping} \quad (2)$$

$$r'(x,y)=r(x,h-1-y);\ \text{vertical flipping} \quad (3)$$

$$r'(x,y)=r(w-1-x,h-1-y);\ \text{horizontal and vertical flipping} \quad (4)$$

The expression r'(x,y) denotes a residual signal after rearrangement, and the expression r(x,y) denotes a residual signal before rearrangement. The width and the height of the block are designated by w and h, respectively. The position of the residual signal within the block is represented by x and y. The inverse rearrangement method of the rearrangement method using flipping may be performed in the same process as the rearrangement method. That is, the residual signals that are rearranged using horizontal flipping may be reconstructed into the original residual signal arrangement by performing horizontal flipping again. The rearrangement method performed by the encoder and the inverse rearrangement method performed by the decoder may be the same flipping method.

For example, when performing horizontal flipping on the residual block on which horizontal flipping has been performed, the residual block before performing flipping is obtained, which is represented as follows.

$$r'(w-1-x,y)=r(w-1-(w-1-x),y)=r(x,y).$$

For example, when performing vertical flipping on the residual block on which vertical flipping has been performed, the residual block before performing flipping is obtained, which is represented as follows.

$$r'(x,h-1-y)=r(x,h-1-(h-1-y))=r(x,y).$$

For example, when performing horizontal and vertical flipping on the residual block on which horizontal and vertical flipping have been performed, the residual block before performing flipping is obtained, which is represented as follows.

$$r'(w-1-x,h-1-y)=r(w-1-(w-1-x),h-1-(h-1-y))=r(x,y).$$

The residual signal shuffling/rearrangement method based on flipping may be used without partitioning the current block. That is, in the SDST method, it is described that the current block (the TU, and the like) is partitioned into sub-blocks and DST-7 is used for each sub-block. However, when using the residual signal shuffling/rearrangement method based on flipping, the current block is not partitioned into sub-blocks and flipping is performed on the entire or a part of the current block, then DST-7 transform is performed. Further, when using the residual signal shuffling/rearrangement method based on flipping, the current block is not partitioned into sub-blocks, and after performing DST-7 inverse transform, flipping is performed on all or a part of the current block.

The maximum size (M×N) and/or the minimum size (O×P) of the block in which it is capable of performing residual signal shuffling/rearrangement based on flipping may be defined. Here, the size may include at least one among the width, which is the horizontal size (M or O), and the height, which is the vertical size (N or P). The M, N, O, and P may be positive integers. The maximum size of the block and/or the minimum size of the block may be predefined values in the encoder/decoder, or may be information signaled from the encoder to the decoder.

For example, when the size of the current block is smaller than the minimum size in which it is capable of performing the flipping method, flipping and DST-7 transform are not performed and only DCT-2 transform is performed. Here, the SDST flag that is transform mode information indicating whether flipping and DST-7 are used as the transform mode may not be signaled.

For example, when the width of the block is smaller than the minimum width in which it is capable of performing the flipping method and the height of the block is larger than the minimum height in which it is capable of performing the flipping method, one-dimensional transform in the horizontal direction is performed only with DCT-2. Regarding one-dimensional transform in the vertical direction, one-dimensional vertical transform is performed using DST-7 after vertical flipping, or one-dimensional vertical transform is performed using DST-7 without flipping. Here, the SDST flag that is transform mode information indicating whether flipping is used as the transform mode may be signaled only for one-dimensional transform in the vertical direction.

For example, when the height of the block is smaller than the minimum width in which it is capable of performing the flipping method and the width of the block is larger than the minimum width in which it is capable of performing the flipping method, regarding the one-dimensional transform in the horizontal direction, one-dimensional horizontal transform is performed using DST-7 after horizontal flipping, or one-dimensional horizontal transform is performed using DST-7 without flipping. The one-dimensional transform in the vertical direction is performed only with DCT-2. Here, the SDST flag that is transform mode information indicating whether flipping is used as the transform mode may be signaled only for one-dimensional transform in the horizontal direction.

For example, when the size of the current block is larger than the maximum size in which it is capable of performing the flipping method, flipping and DST-7 transform are not used and only DCT-2 transform is used. Here, the SDST flag that is transform mode information indicating whether flipping and DST-7 transform are used as the transform mode may not be signaled.

For example, when the size of the current block is larger than the maximum size in which it is capable of performing the flipping method, only DCT-2 transform or DST-7 transform is used.

For example, when the maximum size in which it is capable of performing the flipping method is 32×32 and the minimum size is 4×4, flipping and DST-7 transform are used for a block in the size of 64×64 and only DCT-2 transform is used. Here, for the block in the size of 64×64, the SDST flag that is transform mode information indicating whether flipping and DST-7 are used as the transform mode may not be signaled. Further, for the block in the size of 4×4 to 32×32, the SDST flag that is transform mode information indicating whether flipping and DST-7 are used as the transform mode may be signaled. In this case, DST-7 transform is not used for the block in the size of 64×64, so it is possible to save the memory space for storing DST-7 transform used for the block in the size of 64×64.

For example, when the maximum size in which it is capable of performing the flipping method is 32×32 and the minimum size is 4×4, not only the flipping method is used for the block in the size of 64×64 and DCT-2 or DST-7 transform are used.

For example, a square block in the size of M×N may be partitioned into four sub-blocks in the quad tree, and the shuffling/rearrangement method may be performed on each of the sub-blocks using flipping, then DST-7 transform may be performed. Here, the flipping method may be explicitly signaled for each of the sub-blocks. The flipping method may be signaled as a fixed-length code of two bits, and may be signaled as a truncated unary code. Further, it is possible to use a binarization method based on the occurrence probability of the flipping method according to each block resulting from the partitioning. Here, M and N may be positive integers, for example, 64×64.

For example, a square block in the size of M×N may be partitioned into four sub-blocks in the quad tree, and the shuffling/rearrangement method may be performed on each of the sub-blocks using flipping, then DST-7 transform may be performed. The flipping method for each of the sub-blocks may be implicitly determined. For example, horizontal and vertical flipping may be determined for the first (top left) sub-block, vertical flipping may be determined for the second (top right) sub-block, horizontal flipping may be determined for the third (bottom left) sub-block, and no flipping may be determined for the fourth (bottom right) sub-block. As described above, when the flipping method is implicitly determined, signaling for the flipping method is not required. Here, M and N may be positive integers, for example, 64×64.

For example, a rectangular block in the size of 2M×N may be partitioned into two M×N square blocks in the binary tree, and the shuffling/rearrangement method may be performed on each of the two blocks using flipping, then DST-7 transform may be performed. Here, the flipping method may be explicitly signaled for each of the sub-blocks. The flipping method may be signaled as a fixed-length code of two bits, and may be signaled as a truncated unary code. Further, it is possible to use a binarization method based on the occurrence probability of the flipping method according to each of the sub-blocks. Here, M and N may be positive integers, for example, 8×8.

For example, a rectangular block in the size of 2M×N may be partitioned into two M×N square blocks in the binary tree, and the shuffling/rearrangement method may be performed on each of the sub-blocks using flipping, then DST-7 transform may be performed. The flipping method for each of the sub-blocks may be implicitly determined. Horizontal flipping may be determined for the first (left) sub-block, and no flipping may be determined for the second (right) sub-block. As described above, when the flipping method is implicitly determined, signaling for the flipping method is not required. Here, M and N may be positive integers, for example, 4×4.

For example, a rectangular block in the size of M×2N may be partitioned into two M×N square blocks in the binary tree, and the shuffling/rearrangement method may be performed on each of the sub-blocks using flipping, then DST-7 transform may be performed. The flipping method for each of the sub-blocks may be implicitly determined. Vertical flipping may be determined for the first (top) sub-block, and no flipping may be determined for the second (bottom) sub-block. As described above, when the flipping method is implicitly determined, signaling for the flipping method is not required. Here, M and N may be positive integers, for example, 4×4.

It is possible to apply at least one among two methods: a method of performing DCT-2 transform/inverse transform on a block in the size of M×N; and a method where the block is partitioned in the quad tree or in the binary tree to generate sub-blocks and flipping is performed on each of the sub-blocks, then DST-7 transform/inverse transform is performed. Here, the flipping method may be performed differently depending on the relative position in the block which is the parent block of the sub-blocks, and this may be implicitly determined. Here, M and N may be positive integers, and for example, M and N may be 64. That is, the block in the size of M×N may be a relatively large block in size.

In the case of the top left sub-block, horizontal and vertical flipping may be determined as flipping for the sub-block.

In the case of the top right sub-block, vertical flipping may be determined as flipping for the sub-block.

In the case of the bottom left sub-block, horizontal flipping may be determined as flipping for the sub-block.

In the case of the bottom right sub-block, it may be determined that flipping for the sub-block is not performed.

Information (sdst_flag or sdst flag) on use of the residual signal shuffling/rearrangement method based on flipping may be entropy encoded/decoding using the transform mode information. That is, through signaling for the transform mode information, the same method performed in the encoder may be performed in the decoder. For example, when the flag bit indicating the transform mode information has a first value, the residual signal shuffling/rearrangement method based on flipping and DST-7 are used as the transform/inverse transform method. When the flag bit has a second value, another transform/inverse transform method is used. Here, the transform mode information may be entropy encoded/decoded for each block. Here, another transform/inverse transform method may be a DCT-2 transform/inverse transform method. Further, in the case of one among the transform skip mode, the residual differential PCM (RDPCM) mode, and the lossless mode, entropy encoding/decoding of the transform mode information is omitted and the transform mode information is not signaled.

The transform mode information may be entropy encoded/decoded using at least one among the depth of the current block, the size of the current block, the shape of the current block, transform mode information of the neighboring block, the coded block flag of the current block, and information on whether the transform skip mode of the current block is used. For example, when the coded block flag of the current block is zero, entropy encoding/decoding of the transform mode information is omitted and the transform mode information is not signaled. Further, the transform mode information may be predictively encoded/decoded from the transform mode information of the reconstructed block adjacent to the current block during entropy encoding/decoding. Further, the transform mode information may be signaled on the basis of at least one among coding parameters of the current block and the neighboring block.

Further, using flipping method information, at least one among the four flipping methods (no flipping, horizontal flipping, vertical flipping, and horizontal and vertical flipping) may be entropy encoded/decoded in the form of a flag or an index (flipping_idx). That is, by signaling the flipping method information, the same flipping method performed in the encoder may be performed in the decoder. The transform mode information may include the flipping method information.

Further, in the case of one among the transform skip mode, the residual differential PCM (RDPCM) mode, and the lossless mode, entropy encoding/decoding of the flipping method information is omitted and the flipping method information is not signaled. The flipping method information may be entropy encoded/decoded using at least one among the depth of the current block, the size of the current block, the shape of the current block, flipping method information of the neighboring block, the coded block flag of the current block, and information on whether the transform skip mode of the current block is used. For example, when the coded block flag of the current block is zero, entropy encoding/decoding of the flipping method information is omitted and the transform mode information is not signaled. Further, the flipping method information may be predictively encoded/decoded from the flipping method information of the reconstructed block adjacent to the current block during entropy encoding/decoding. Further, the flipping method information may be signaled on the basis of at least one among coding parameters of the current block and the neighboring block.

Further, the residual signal rearrangement method is not limited to the residual signal rearrangement described above, and shuffling may be implemented by rotating the residual signal within the block at a predetermined angle. Here, the predetermined angle may mean an angle of zero degrees, 90 degrees, 180 degrees, −90 degrees, −180 degrees, 270 degrees, −270 degrees, 45 degrees, −45 degrees, 135 degrees, −135 degrees, and the like. Here, information on the angle may be entropy encoded/decoded in the form of a flag or an index, and may be performed similarly to the signaling method for the transform mode information.

Further, the angle information may be predictively encoded/decoded from the angle information of the reconstructed block adjacent to the current block during entropy encoding/decoding. When performing rearrangement using the angle information, it is possible to perform SDST or DST-7 after partitioning of the current block, but it is also possible to perform SDST or DST-7 in units of the current block without partitioning of the current block.

The predetermined angle may be determined differently depending on the position of the sub-block. A method of rearrangement through rotation of only the sub-block at a particular position (for example, the first sub-block) among sub-blocks may be used in a limited manner. Further, rearrangement using a predetermined angle may be applied to the entire current block. Here, the current block which is the target of rearrangement may be at least one among a residual block before inverse transform, a residual block before dequantization, a residual block after inverse transform, a residual block after dequantization, a reconstructed residual block, and a reconstructed block.

In the meantime, in order to achieve the same effect as the rearrangement or rotation of the residual signals, coefficients of the transform matrix for transform may be rearranged or rotated, and this may be applied to pre-arranged residual signals so as to perform transform. That is, instead of rearrangement of the residual signals, rearrangement of the transform matrix is used to perform transform, so it is possible to achieve the same effect as the method of performing rearrangement and transform on the residual signals. Here, the rearrangement of the coefficients of the transform matrix may be performed in the same manner as the residual signal rearrangement methods described above, and the method of signaling information required therefor may be performed in the same manner as the method of signaling information required for the residual signal rearrangement method described above.

In the meantime, a part of the residual signal rearrangement method described above regarding the shuffling step may be determined as the optimum rearrangement method by the encoder, and information (flipping method information) on the determined rearrangement method may be signaled to the decoder. For example, when four rearrangement methods are used, the encoder signals information on the residual signal rearrangement method to the decoder as many as two bits.

Further, when the used rearrangement methods have different occurrence probabilities, the rearrangement method having the high occurrence probability is encoded using few bits and the rearrangement method having the low occurrence probability is encoded using relatively more bits. For example, four rearrangement methods are arranged in order of decreasing occurrence probability, and signaling as truncated unary codes (for example, (0, 10, 110, 111) or (1, 01, 001, 000)) is possible.

Further, the occurrence probability of the rearrangement method may vary depending on coding parameters, such as the prediction mode of the current CU, the intra prediction mode (direction) of the PU, the motion vector of the neighboring block, and the like. Thus, the encoding method of information (flipping method information) on the rearrangement method may be used differently depending on the coding parameter. For example, the occurrence probability of the rearrangement method may vary according to the prediction mode of the intra prediction. Thus, for each intra mode, few bits may be assigned to the rearrangement method having the high occurrence probability and many bits may be assigned to the rearrangement method having the low occurrence probability. Alternatively, depending on a case, the rearrangement method having the extremely low occurrence probability may not be used and may not be assigned any bits.

A rearrangement set including at least one among the residual signal rearrangement methods may be constructed according to at least one among the prediction mode (inter mode or intra mode) of the current block, the intra prediction mode (including a directional mode and a non-directional mode), the inter prediction mode, the block size, the block shape (a square shape or a non-square shape), a luma/chroma signal, the transform mode information, and the like. The rearrangement may mean flipping. Further, on the basis of at least one among coding parameters of the current block and the neighboring block, a rearrangement set including at least one of the residual signal rearrangement methods may be constructed.

Further, according to at least one among the prediction mode of the current block, the intra prediction mode, the inter prediction mode, the block size, the block shape, the luma/chroma signal, the transform mode information, and the like, at least one of the following rearrangement sets may be selected. Further, on the basis of at least one of the coding parameters of the current block and the neighboring block, at least one of the rearrangement sets may be selected.

The rearrangement set may include at least one among "no flipping", "horizontal flipping", "vertical flipping", and "horizontal and vertical flipping". Examples of the rearrangement set are shown as follows.

1. No flipping
2. Horizontal flipping
3. Vertical flipping
4. Horizontal and vertical flipping
5. No flipping, and horizontal flipping
6. No flipping, and vertical flipping
7. No flipping, and horizontal and vertical flipping
8. Horizontal flipping, and vertical flipping
9. Horizontal flipping, and horizontal and vertical flipping
10. Vertical flipping, and horizontal and vertical flipping
11. No flipping, horizontal flipping, and vertical flipping
12. No flipping, horizontal flipping, and horizontal and vertical flipping
13. No flipping, vertical flipping, and horizontal and vertical flipping 14. Horizontal flipping, vertical flipping, and horizontal and vertical flipping
15. No flipping, horizontal flipping, vertical flipping, and horizontal and vertical flipping On the basis of the rearrangement set, at least one of the residual signal rearrangement methods may be used for rearrangement of the current block.

Further, according to at least one among the prediction mode of the current block, the intra prediction mode, the inter prediction mode, the block size, the block shape, the luma/chroma, the transform mode information, the flipping method information, and the like, at least one of the residual signal rearrangement methods may be selected in the rearrangement set. Further, on the basis of at least one of the coding parameters of the current block and the neighboring block, at least one of the residual signal rearrangement methods may be selected in the rearrangement set.

According to the prediction mode of the current block, at least one rearrangement set may be constructed. For example, when the prediction mode of the current block is the intra prediction, multiple rearrangement sets are constructed. When the prediction mode of the current block is the inter prediction, one rearrangement set is constructed.

According to the intra prediction mode of the current block, at least one rearrangement set may be constructed. For example, when the intra prediction mode of the current block is a non-directional mode, one rearrangement set is constructed. When the intra prediction mode of the current block is a directional mode, multiple rearrangement sets are constructed.

According to the size of the current block, at least one rearrangement set may be constructed. For example, when the size of the current block is larger than 16×16, one rearrangement set is constructed. When the size of the current block is equal to or smaller than 16×16, multiple rearrangement sets are constructed.

According to the shape of the current block, at least one rearrangement set may be constructed. For example, when the current block is in a square shape, one rearrangement set is constructed. When the current block is in a non-square shape, multiple rearrangement sets are constructed.

According to the luma/chroma signal of the current block, at least one rearrangement set may be constructed. For example, when the current block is the chroma signal, one rearrangement set is constructed. When the current block is the luma signal, multiple rearrangement sets are constructed.

Further, on the basis of the rearrangement set, an index for the residual signal rearrangement method may be entropy encoded/decoded. Here, the index may be entropy encoded/decoded into a variable-length code or a fixed-length code.

Further, on the basis of the rearrangement set, binarization and debinarization of the index for the residual signal rearrangement method may be performed. Here, the index may be subjected to binarization and debinarization into a variable-length code or a fixed-length code.

Further, the rearrangement set may be in the form of a table in the encoder and the decoder, and may be computed through an equation.

Further, the rearrangement set may be constructed in such a manner as to have symmetry. For example, a table for the rearrangement set may be constructed in such a manner as to have symmetry. Here, the table may be constructed in such a manner as to have symmetry for the intra prediction mode.

Further, the rearrangement set may be constructed according to at least one among whether the intra prediction mode is in a particular range and whether the intra prediction mode is an even number or an odd number.

The following tables show examples of a method of encoding/decoding the residual signal rearrangement method according to the prediction mode of the current block and the intra prediction mode (direction).

Further, in the following tables, the use of at least one of the residual signal rearrangement methods may be indicated using the flipping method information.

TABLE 1

| Prediction mode | Intra prediction direction (intra prediction mode) | Residual signal rearrangement method (1) | (2) | (3) | (4) |
|---|---|---|---|---|---|
| Intra | Horizontal direction or mode close to horizontal direction | 0 | — | 1 | — |
| Intra | Vertical direction or mode close to vertical direction | 0 | 1 | — | — |
| Intra | Diagonal direction at 45-degree angle or mode close to diagonal direction at 45-degree angle | * | — | — | — |
| Intra | Even number | 0 | 10 | 11 | — |
| Intra | Odd number | 0 | — | 10 | 11 |
| Intra | Other cases (otherwise) | 0 | 110 | 10 | 111 |
| Inter | N/A | 00 | 10 | 11 | |

In Table 1, columns (1) to (4) of the residual signal rearrangement method specify the residual signal rearrangement method such as an index for scanning/rearrangement order for residual signal rearrangement described above, an index for a predetermined angle value, an index for a predetermined flipping method, or the like. In Table 1, the mark * in the column of the residual signal rearrangement method denotes that the corresponding rearrangement method is used implicitly without signaling, and the mark - denotes that the corresponding rearrangement method is not used in the corresponding case. The meaning of that the rearrangement method is used implicitly may be that the rearrangement method is used with the transform mode information (sdst_flag or sdst flag) without entropy encoding/decoding of the index for the residual signal rearrangement method. The columns (1) to (4) of the residual signal rearrangement method may refer (1) no flipping, (2) horizontal flipping, (3) vertical flipping, and (4) horizontal and vertical flipping, respectively. Further, the numerals 0, 1, 10, 11, 110, 111, and the like may be the result of binarization/debinarization used for entropy encoding/decoding the residual signal rearrangement method. As the binarization/debinarization method, a fixed-length code, a truncated unary code, a unary code, or the like may be used. As shown in Table 1, when the current block corresponds to at least one among the prediction mode and the intra prediction mode (direction), at least one rearrangement method is used in the encoder and the decoder. Here, the diagonal direction at a 45-degree angle may mean a direction toward the top left position in the current block or a direction toward the current block from the top left position in the current block.

TABLE 2

| Prediction mode | Intra prediction direction (intra prediction mode) | Residual signal rearrangement method (1) | (2) | (3) | (4) |
|---|---|---|---|---|---|
| Intra | Horizontal direction or mode close to horizontal direction | 0 | — | 1 | — |
| Intra | Vertical direction or mode close to vertical direction | 1 | 0 | — | — |
| Intra | Diagonal direction at 45-degree angle or mode close to diagonal direction at 45-degree angle | * | — | — | — |
| Intra | Other cases (otherwise) | 00 | 01 | 10 | 11 |
| Inter | N/A | 00 | 01 | 10 | 11 |

As another example, as shown in Table 2, when the current block corresponds to at least one of the prediction modes and at least one of the intra prediction modes (directions), at least one rearrangement method is used in the encoder and the decoder.

TABLE 3

| Prediction mode | Intra prediction direction (intra prediction mode) | Residual signal rearrangement method (1) | (2) | (3) | (4) |
|---|---|---|---|---|---|
| Intra | Horizontal direction or mode close to horizontal direction | 0 | — | 1 | — |
| Intra | Vertical direction or mode close to vertical direction | 0 | 1 | — | — |
| Intra | Diagonal direction at 45-degree angle or mode close to diagonal direction at 45-degree angle | * | — | — | — |
| Intra | Other cases (otherwise) | 0 | 110 | 10 | 111 |
| Inter | N/A | 0 | 110 | 10 | 111 |

As another example, as shown in Table 3 when the current block corresponds to at least one of the prediction modes and at least one of the intra prediction modes (directions), at least one rearrangement method is used in the encoder and the decoder.

TABLE 4

| Prediction mode | Intra prediction direction (intra prediction mode) | Residual signal rearrangement method (1) | (2) | (3) | (4) |
|---|---|---|---|---|---|
| Intra | Even number | 0 | 10 | 11 | — |
| Intra | Odd number | 0 | — | 10 | 11 |
| Inter | N/A | 00 | 01 | 10 | 11 |

As another example, as shown in Table 4, when the current block corresponds to at least one of the prediction modes and at least one of the intra prediction modes (directions), at least one rearrangement method is used in the encoder and the decoder. For example, when the current block in in the intra mode and the intra prediction direction is an even number, at least one among no flipping, horizontal flipping, and vertical flipping methods is used as the residual signal rearrangement method. Further, when the current block is in the intra mode and the intra prediction direction is an odd number, at least one among no flipping, vertical flipping, horizontal and vertical flipping methods is used as the residual signal rearrangement method.

TABLE 5

| Prediction mode | Intra prediction direction (intra prediction mode) | Residual signal rearrangement method (1) | (2) | (3) | (4) |
|---|---|---|---|---|---|
| Intra | Even number | 0 | 10 | 11 | — |
| Intra | Odd number | 0 | — | 10 | 11 |
| Intra | Non-directional mode (DC mode or Planar mode) | 0 | 110 | 10 | 111 |
| Inter | N/A | 00 | 01 | 10 | 11 |

As another example, as shown in Table 5, when the current block corresponds to at least one of the prediction modes and at least one of the intra prediction modes (directions), at least one rearrangement method is used in the encoder and the decoder.

TABLE 6

| Prediction mode | Intra prediction direction (intra prediction mode) | Residual signal rearrangement method (1) | (2) | (3) | (4) |
|---|---|---|---|---|---|
| Intra | Even number mode rather than non-directional mode | 0 | 10 | 11 | — |
| Intra | Odd number mode rather than non-directional mode | 0 | — | 10 | 11 |
| Intra | Non-directional mode (DC mode or Planar mode) | 00 | 01 | 10 | 11 |
| Inter | N/A | 00 | 01 | 10 | 11 |

As another example, as shown in Table 6, when the current block corresponds to at least one of the prediction modes and at least one of the intra prediction modes (directions), at least one rearrangement method is used in the encoder and the decoder.

TABLE 7

| Prediction mode | Intra prediction direction (intra prediction mode) | Residual signal rearrangement method (1) | (2) | (3) | (4) |
|---|---|---|---|---|---|
| Intra | Horizontal direction or mode close to horizontal direction | 0 | 11 | 10 | — |
| Intra | Vertical direction or mode close to vertical direction | 0 | 10 | 11 | — |
| Intra | Diagonal direction at 45-degree angle or mode close to diagonal direction at 45-degree angle | * | — | — | — |
| Intra | Other cases (otherwise) | 0 | 110 | 10 | 111 |
| Inter | N/A | 0 | 110 | 10 | 111 |

As another example, as shown in Table 1, when the current block corresponds to at least one of the prediction modes and at least one of the intra prediction modes (directions), at least one rearrangement method is used in the encoder and the decoder.

TABLE 8

| Prediction mode | Intra prediction direction (intra prediction mode) | Residual signal rearrangement method (1) | (2) | (3) | (4) |
|---|---|---|---|---|---|
| Intra | Horizontal direction or mode close to horizontal direction | 0 | — | 10 | 11 |
| Intra | Vertical direction or mode close to vertical direction | 0 | 10 | — | 11 |
| Intra | Diagonal direction at 45-degree angle or mode close to diagonal direction at 45-degree angle | * | — | — | — |
| Intra | Other cases (otherwise) | 0 | 110 | 10 | 111 |
| Inter | N/A | 0 | 110 | 10 | 111 |

As another example, as shown in Table 8, when the current block corresponds to at least one of the prediction modes and at least one of the intra prediction modes (directions), at least one rearrangement method is used in the encoder and the decoder.

TABLE 9

| Prediction mode | Residual signal rearrangement method (1) | (2) | (3) | (4) |
|---|---|---|---|---|
| Intra | 0 | 110 | 10 | 111 |
| Inter | 00 | 01 | 10 | 11 |

As another example, as shown in Table 9, when the current block corresponds to at least one of the prediction modes and at least one of the intra prediction modes (directions), at least one rearrangement method is used in the encoder and the decoder.

TABLE 10

| Prediction mode | Intra prediction direction (intra prediction mode) | Residual signal rearrangement method (1) | (2) | (3) | (4) |
|---|---|---|---|---|---|
| Intra | Horizontal direction or mode close to horizontal direction | 0 | — | 10 | 11 |
| Intra | Vertical direction or mode close to vertical direction | 0 | 10 | — | 11 |
| Intra | Diagonal direction at 45-degree angle or mode close to diagonal direction at 45-degree angle | * | — | — | — |
| Intra | Diagonal direction at 135-degree angle or mode close to diagonal direction at 135-degree angle | 0 | 10 | 11 | — |
| Intra | Diagonal direction at −45-degree angle or mode close to diagonal direction at −45-degree angle | 0 | 10 | 11 | — |
| Intra | Other cases (otherwise) | 00 | 01 | 10 | 11 |
| Inter | N/A | 0 | 110 | 10 | 111 |

As another example, as shown in Table 10, when the current block corresponds to at least one of the prediction modes and at least one of the intra prediction modes (directions), at least one rearrangement method is used in the encoder and the decoder. Here, the diagonal direction at a 135-degree angle may mean a direction toward the top right position in the current block or a direction toward the current block from the top right position in the current block. For example, the value of the diagonal direction mode at a 135-degree angle may be six. Here, the diagonal direction at a −45-degree angle may mean a direction toward the bottom right position in the current block or a direction toward the current block from the bottom right position in the current block. For example, the value of the diagonal direction mode at a −45-degree angle may be two.

TABLE 11

| Prediction mode | Intra prediction direction (intra prediction mode) | Residual signal rearrangement method (1) | (2) | (3) | (4) |
|---|---|---|---|---|---|
| Intra | Horizontal direction mode close to horizontal direction, and odd number mode | 0 | — | 1 | — |
| Intra | Horizontal direction or mode close to horizontal direction, and even number mode | 0 | 1 | — | — |
| Intra | Vertical direction or mode close to vertical direction, and odd number mode | 0 | 1 | — | — |
| Intra | Vertical direction or mode close to vertical direction, and even number mode | 0 | — | 1 | — |
| Intra | Diagonal direction at 45-degree angle or mode close to diagonal direction at 45-degree angle, and odd number mode | * | — | — | — |
| Intra | Diagonal direction at 45-degree angle or mode close to diagonal direction at 45-degree angle, and even number mode | — | — | — | * |
| Intra | Other cases (otherwise) | 0 | 110 | 10 | 111 |
| Inter | N/A | 0 | 110 | 10 | 111 |

As another example, as shown in Table 11, when the current block corresponds to at least one of the prediction modes and at least one of the intra prediction modes (directions), at least one rearrangement method is used in the encoder and the decoder.

TABLE 12

| Prediction mode | Intra prediction direction (intra prediction mode) | Residual signal rearrangement method (1) | (2) | (3) | (4) |
|---|---|---|---|---|---|
| Intra | Horizontal direction or mode close to horizontal direction, and odd number mode | 0 | — | 1 | — |
| Intra | Horizontal direction or mode close to horizontal direction, and even number mode | 0 | — | — | 1 |
| Intra | Vertical direction or mode close to vertical direction, and odd number mode | 0 | 1 | — | — |
| Intra | Vertical direction or mode close to vertical direction, and even number mode | 0 | — | — | 1 |

TABLE 12-continued

| Prediction mode | Intra prediction direction (intra prediction mode) | Residual signal rearrangement method (1) | (2) | (3) | (4) |
|---|---|---|---|---|---|
| Intra | Diagonal direction at 45-degree angle or mode close to diagonal direction at 45-degree angle | * | — | — | — |
| Intra | Other cases (otherwise) | 0 | 10 | 11 | — |
| Inter | N/A | 0 | 110 | 10 | 111 |

As another example, as shown in Table 12, when the current block corresponds to at least one of the prediction modes and at least one of the intra prediction modes (directions), at least one rearrangement method is used in the encoder and the decoder.

TABLE 13

| | Residual signal rearrangement method | | | |
|---|---|---|---|---|
| Prediction mode | (1) | (2) | (3) | (4) |
| Intra and inter | 0 | 10 | 110 | 1110 |

As another example, as shown in Table 13, when the current block corresponds to at least one of the prediction modes and at least one of the intra prediction modes (directions), at least one rearrangement method is used in the encoder and the decoder. Here, the residual signal rearrangement method may mean the type of transform. For example, when the residual signal rearrangement method is (1), both horizontal transform and vertical transform mean the first transform kernel. As another example, when the residual signal rearrangement method is (2), horizontal transform and vertical transform mean the second transform kernel and the first transform kernel, respectively. As another example, when the residual signal rearrangement method is (3), horizontal transform and vertical transform mean the first transform kernel and the second transform kernel, respectively. As another example, when the residual signal rearrangement method is (4), horizontal transform and vertical transform mean the second transform kernel and the second transform kernel, respectively. For example, the first transform kernel may be DST-7, and the second transform kernel may be DCT-8. When the intra prediction mode is the Planar mode or the DC mode, information (flipping method information) on four rearrangement methods is entropy encoded/decoded using the truncated unary code based on the frequency of occurrences. When the intra prediction direction is the horizontal direction or the mode close to the horizontal direction, the probability of the rearrangement method (1) and/or rearrangement method (3) is high. In this case, one bit may be used for each of the two rearrangement methods, and information on the rearrangement method may be entropy encoded/decoded. Here, the meaning of the mode close to the horizontal direction may be that a value of a particular mode is between a value for the horizontal direction mode−K and the value for the horizontal direction mode+K. Here, K may be an integer. For example, when the value for the horizontal direction mode is 18 and K is four and the particular mode is 20, the particular mode is the mode close to the horizontal direction. For example, when the value for the horizontal direction mode is 18 and K is four and the particular mode is 26, the particular mode is not the mode close to the horizontal direction.

When the intra prediction direction is the vertical direction or the mode close to the vertical direction, the probability of the rearrangement method (1) and/or rearrangement method (2) is high. In this case, one bit may be used for each of the two methods, and information on the rearrangement method may be entropy encoded/decoded. Here, the meaning of the mode close to the vertical direction may be that a value of a particular mode is between a value for the vertical direction mode−K and the value for the vertical direction mode+K. Here, K may be an integer. For example, when the value for the vertical direction mode is 50 and K is two and the particular mode is 51, the particular mode is the mode close to the vertical direction. For example, when the value for the vertical direction mode is 50 and K is eight and the particular mode is 20, the particular mode is not the mode close to the vertical direction.

When the intra prediction direction is the diagonal direction at a 45 degree angle or the mode close to the diagonal direction at a 45 degree angle, probabilities of the other rearrangement methods (2), (3), and (4) are very low compared with the probability of the rearrangement method (1). In this case, only one of the above methods is applied, and the method may be used implicitly without signaling of information on the rearrangement method. Here, the meaning of the mode close to the diagonal direction at a 45 degree angle may be that a value of a particular mode is between a value for the diagonal direction mode at a 45 degree angle−K and a value for the diagonal direction mode at a 45 degree angle+K. Here, K may be an integer. For example, when the value for the diagonal direction mode at a 45-degree angle is 34 and K is two and the particular mode is 36, the particular mode is the mode close to the diagonal direction mode at a 45-degree angle. For example, when the value for the diagonal direction mode at a 45-degree angle is 34 and K is eight and the particular mode is 10, the particular mode is not the mode close to the diagonal direction mode at a 45-degree angle.

When the intra prediction direction is an even number, information on the rearrangement method is entropy encoded/decoded into a truncated unary code or a unary code only for the rearrangement methods (1), (2), and (3).

When the intra prediction direction is an odd number, information on the rearrangement method is entropy encoded/decoded into a truncated unary code or a unary code only for the rearrangement methods (1), (3), and (4).

For other intra prediction directions, the occurrence probability of the rearrangement method (4) may be low, so information on the rearrangement method is entropy encoded/decoded into a truncated unary code or a unary code only for the rearrangement methods (1), (2), and (3).

In the case of inter prediction, the occurrence probabilities of the rearrangement methods (1) to (4) may be regarded to be equal, and the information on the rearrangement method may be entropy encoded/decoded into the fixed-length code of two bits.

Arithmetic coding/decoding may be used for the code. Further, arithmetic coding using a context model for the code may not be used, and entropy encoding/decoding may be possible in a bypass mode.

Transform/inverse transform with DST-7 may be performed for a region or a CTU within a picture, the entire picture, or the current block within a picture group without flipping, or transform/inverse transform may be performed by selecting one among two methods of performing transform/inverse transform with DCT-2. In this case, one-bit flag information (transform mode information) indicating whether to use DST-7 or DCT-2 in units of the current block may be entropy encoded/decoded. This method may be used for a case where the longer the distance from the reference sample, the greater the energy of the residual signal, or may be used to reduce computation complexity in encoding and decoding. Information on the region in which this method is used may be signaled in units of a CTU, a slice, a PPS, a SPS, or other particular regions, and a one-bit flag may be signaled in the on/off form.

For a region or a CTU within a picture, the entire picture, or the current block within a picture group, transform/inverse transform may be performed by selecting one among three methods: DCT-2 transform/inverse transform, DST-7 transform/inverse transform without flipping, and DST-7 transform/inverse transform after performing vertical flipping. Information on which method among the three methods to be selected may be selected implicitly using nearby information of the current block, and may be selected explicitly through signaling of an index (transform mode information or flipping method information). The index may be signaled into truncated unary codes in a manner that DCT-2 is 0, DST-7 without flipping is 10, and DST-7 after vertical flipping is 11. Further, according to the size and the nearby information of the current block, binarization of DCT-2 and of DST-7 may be exchanged for signaling. Further, the first binary number of the binary numbers may be signaled in units of a CU, and the remaining binary numbers may be signaled in units of a TU or a PU. Information on the region in which this method is used may be signaled in units of a CTU, a slice, a PPS, a SPS, or other particular regions, and a one-bit flag may be signaled in the on/off form.

For a region or a CTU within a picture, the entire picture, or the current block within a picture group, transform/inverse transform may be performed by selecting one among four methods: DCT-2 transform/inverse transform, DST-7 transform/inverse transform without flipping, DST-7 transform/inverse transform after performing horizontal flipping, and DST-7 transform/inverse transform after performing vertical flipping. Information on which method among the four methods to be selected may be selected implicitly using nearby information of the current block, and may be selected explicitly through signaling of an index (transform mode information or flipping method information). The index may be signaled into truncated unary codes in a manner that DCT-2 is 0, DST-7 without flipping is 10, DST-7 after horizontal flipping is 110, and DST-7 after vertical flipping is 111. Further, according to the size and the nearby information of the current block, binarization of DCT-2 and of DST-7 may be exchanged for signaling. Further, the first binary number of the binary numbers may be signaled in units of a CU, and the remaining binary numbers may be signaled in units of a TU or a PU. According to the intra prediction mode, only a part of the four methods may be used. For example, when the intra prediction mode is smaller than the diagonal prediction mode in value, is the DC mode, or is the Planar mode, only three methods are used: DCT-2, DST-7 without flipping, and DST-7 after vertical flipping. In this case, the transform mode information or the flipping method information may be signaled in a manner that DCT-2 is 0, DST-7 without flipping is 10, and DST-7 after vertical flipping is 11. For example, when the intra prediction mode is larger than the diagonal prediction mode in value, only three methods are used: DCT-2, DST-7 without flipping, and DST-7 after horizontal flipping. In this case, the transform mode information or the flipping method information may be signaled in a manner that DCT-2 is 0, DST-7 without flipping is 10, and DST-7 after horizontal flipping is 11. Information on the region in which this method is used may be signaled in units of a CTU, a slice, a PPS, a SPS, or other particular regions, and a one-bit flag may be signaled in the on/off form.

For a region or a CTU within a picture, the entire picture, or the current block within a picture group, transform/inverse transform may be performed by selecting one among five methods: DCT-2 transform/inverse transform, DST-7 transform/inverse transform without flipping, DST-7 transform/inverse transform after performing horizontal flipping, DST-7 transform/inverse transform after performing vertical flipping, and DST-7 transform/inverse transform after performing horizontal and vertical flipping. Information on which transform among the five methods to be selected may be selected implicitly using nearby information of the current block, and may be selected explicitly through signaling of an index (transform mode information or flipping method information). The index may be signaled into truncated unary codes in a manner that DCT-2 is 0, DST-7 without flipping is 10, DST-7 after horizontal flipping is 110, DST-7 after vertical flipping is 1110, and DST-7 after horizontal and vertical flipping is 1111. Further, according to the size and the nearby information of the current block, binarization of DCT-2 and of DST-7 may be exchanged for signaling. Further, the first binary number of the binary numbers may be signaled in units of a CU, and the remaining binary numbers may be signaled in units of a TU or a PU. Further, information may be signaled into a fixed-length code by distinguishing, among the binary numbers, the first binary number, the second binary number, and the third binary number. For example, the transform mode information or the flipping method information may be signaled in a manner that DCT-2 is 0, DST-7 without flipping is 000, DST-7 after horizontal flipping is 001, DST-7 after vertical flipping is 010, and DST-7 after horizontal and vertical flipping is 011. Further, according to the intra prediction mode, only a part of the five methods may be used. For example, when the intra prediction mode is a prediction mode close to the horizontal direction prediction mode, only three transform methods are used: DCT-2, DST-7 without flipping, and DST-7 after vertical flipping. In this case, the transform mode information or the flipping method information may be signaled in a manner that DCT-2 is 0, DST-7 without flipping is 10, and DST-7 after vertical flipping is 11.

For example, when the intra prediction mode is a prediction mode close to the vertical direction prediction mode, only three transform methods are used: DCT-2, DST-7 without flipping, and DST-7 after horizontal flipping. In this case, the transform mode information or the flipping method information may be signaled in a manner that DCT-2 is 0, DST-7 without flipping is 10, and DST-7 after horizontal flipping is 11.

For example, when the intra prediction mode is a prediction mode close to the diagonal direction prediction mode, only two transform methods are used: DCT-2, and DST-7 without flipping. In this case, the transform mode information or the flipping method information may be signaled in a manner that DCT-2 is 0, and DST-7 without flipping is 1.

For example, in a case other than the above-described three cases, all of the five transform methods may be used: DCT-2, DST-7 without flipping, DST-7 after horizontal flipping, DST-7 after vertical flipping, and DST-7 after horizontal and vertical flipping. An index for the transform method may be signaled into the truncated unary code scheme, the fixed-length code scheme, or other schemes.

For example, when the intra prediction mode is a non-directional mode, all of the five transform methods are used:

DCT-2, DST-7 without flipping, DST-7 after horizontal flipping, DST-7 after vertical flipping, and DST-7 after horizontal and vertical flipping. An index for the transform method may be signaled into the truncated unary code scheme, the fixed-length code scheme, or other schemes.

For example, when the intra prediction mode is an odd number mode, four transform methods are used: DCT-2, DST-7 without flipping, DST-7 after vertical flipping, and DST-7 after horizontal and vertical flipping. In this case, the transform mode information or the flipping method information may be signaled in a manner that DCT-2 is 0, DST-7 without flipping is 10, DST-7 after vertical flipping is 110, and DST-7 after horizontal and vertical flipping is 111.

For example, when the intra prediction mode is an even number mode, four transform methods are used: DCT-2, DST-7 without flipping, DST-7 after horizontal flipping, and DST-7 after vertical flipping. In this case, the transform mode information or the flipping method information may be signaled in a manner that DCT-2 is 0, DST-7 without flipping is 10, DST-7 after horizontal flipping is 110, and DST-7 after vertical flipping is 111. Information on the region in which this method is used may be signaled in units of a CTU, a slice, a PPS, a SPS, or other particular regions, and a one-bit flag may be signaled in the on/off form.

Figure 22:
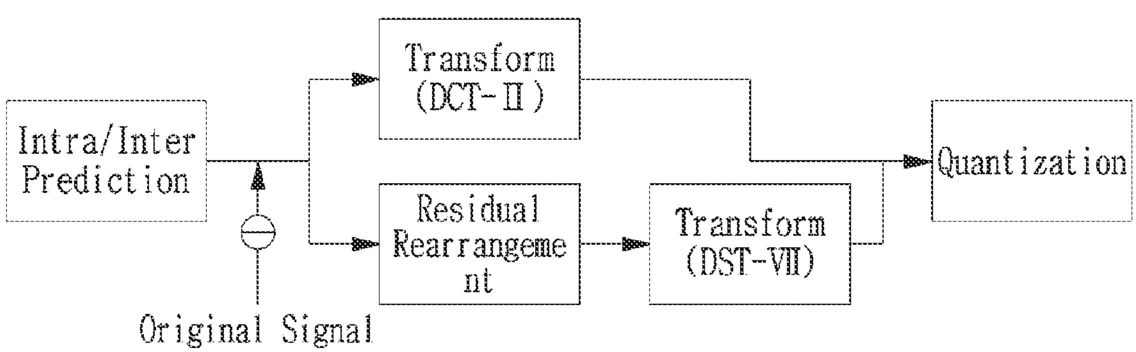
FIGS. 22 and 23 respectively show positions at which the residual signal rearrangement (residual rearrangement) is performed in the encoder and the decoder according to the present invention.
Figure 23:
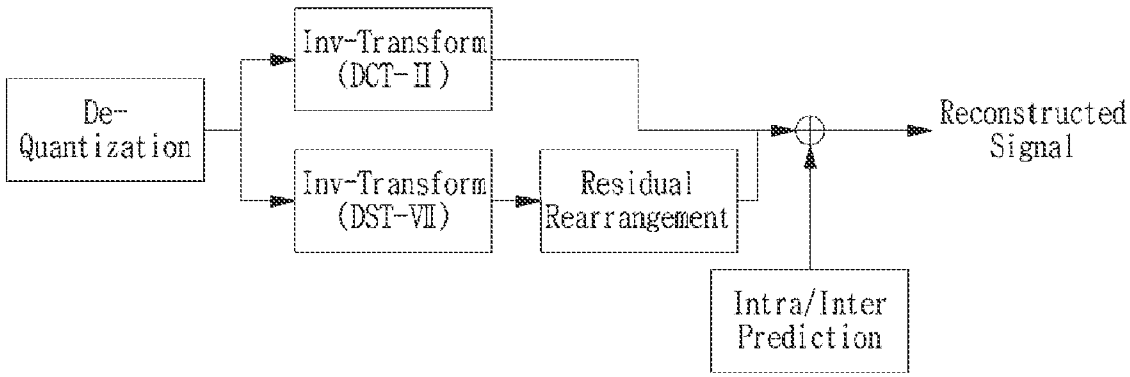

FIGS. 22 and 23 respectively show positions at which the residual signal rearrangement (residual rearrangement) is performed in the encoder and the decoder according to the present invention.

Referring to FIG. 22, in the encoder, the residual signal rearrangement may be performed before the DST-7 transform process. Although not shown in FIG. 22, in the encoder, the residual signal rearrangement may be performed between the transform process and the quantization process, or the residual signal rearrangement may be performed after the quantization process.

Referring to FIG. 23, in the decoder, the residual signal rearrangement may be performed after the DST-7 inverse transform process. Although not shown in FIG. 23, in the decoder, the residual signal rearrangement may be performed between the dequantization process and the inverse transform process, or the residual signal rearrangement may be performed before the dequantization process.

The SDST method according to the present invention has been described above with reference to FIGS. 7 to 23. Hereinafter, a decoding method, an encoding method, a decoder, an encoder, and a bitstream to which the SDST method according to the present invention is applied will be described in detail with reference to FIGS. 24 and 25.

Figure 24:
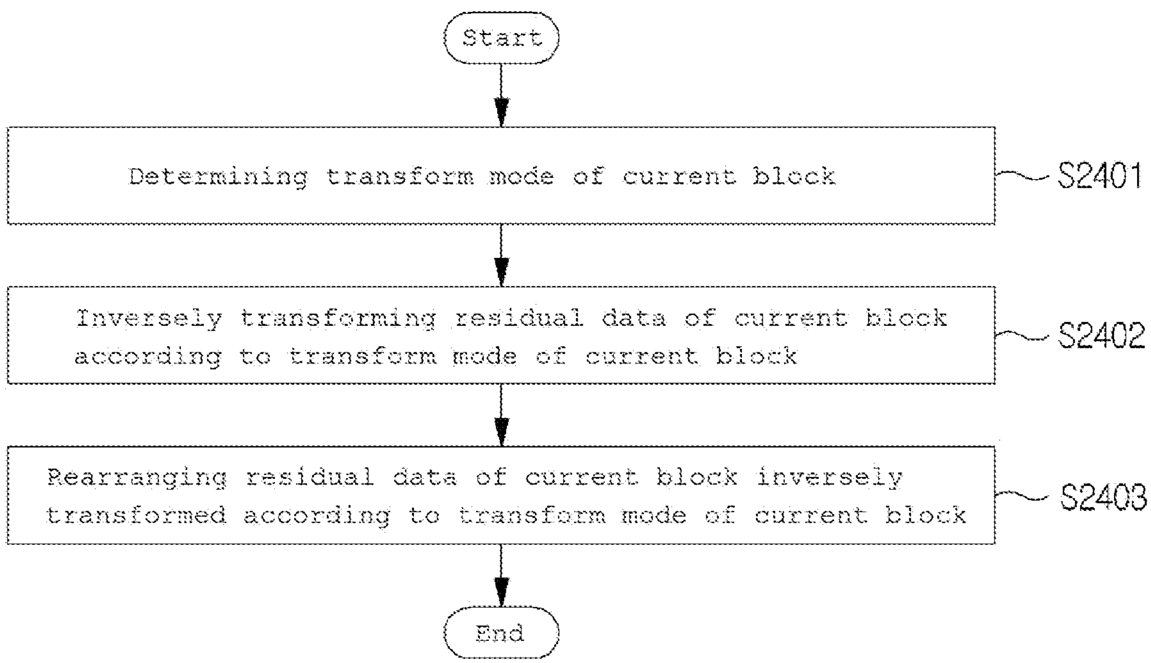
FIG. 24 is a diagram illustrating an embodiment of a decoding method using the SDST method according to the present invention.

FIG. 24 is a diagram illustrating an embodiment of a decoding method using the SDST method according to the present invention.

Referring to FIG. 24, first, the transform mode of the current block may be determined at step S2401, and inverse transform may be performed on the residual data of the current block according to the transform mode of the current block at step S2402.

Next, rearrangement may be performed on the residual data of the current block on which inverse transform has been performed according to the transform mode of the current block at step S2403.

Here, the transform mode may include at least one among shuffling discrete sine transform (SDST), shuffling discrete cosine transform (SDCT), discrete sine transform (DST), and discrete cosine transform (DCT).

The SDST mode may indicate a mode in which inverse transform is performed in a DST-7 transform mode and rearrangement is performed on the residual data on which inverse transform has been performed.

The SDCT mode may indicate a mode in which inverse transform is performed in a DCT-2 transform mode and rearrangement is performed on the residual data on which inverse transform has been performed.

The DST mode may indicate a mode in which inverse transform is performed in a DST-7 transform mode and rearrangement is not performed on the residual data on which inverse transform has been performed.

The DCT mode may indicate a mode in which inverse transform is performed in a DCT-2 transform mode and rearrangement is not performed on the residual data on which inverse transform has been performed.

Thus, only when the transform mode of the current block is one of SDST and SDCT, rearrangement of the residual data is performed.

Although it is described that inverse transform is performed in a DST-7 transform mode for SDST and DST modes as described above, transform modes based on other DSTs, such as DST-1, DST-2, and the like, may be used.

In the meantime, the determining of the transform mode of the current block at step S2401 may include: obtaining transform mode information of the current block from a bitstream; and determining the transform mode of the current block on the basis of the transform mode information.

Further, at the determining of the transform mode of the current block at step S2401, it may be determined on the basis of at least one among the prediction mode of the current block, depth information of the current block, the size of the current block, and the shape of the current block.

Specifically, when the prediction mode of the current block is the inter prediction mode, one among SDST and SDCT is determined as the transform mode of the current block.

In the meantime, the rearrangement of the residual data of the current block on which inverse transform has been performed at step S2403 may include: scanning, in order in a first direction, the residual data arranged within the current block on which inverse transform has been performed; and rearranging, in order in a second direction, the residual data scanned in the first direction within the current block on which inverse transform has been performed. Here, the order in the first direction may be one among raster scan order, up-right diagonal scan order, horizontal scan order, and vertical scan order. Further, the order in the first direction may be defined as follows.

(1) Scanning from the top row to the bottom row, and scanning from the left to the right in one row (2) Scanning from the top row to the bottom row, and scanning from the right to the left in one row (3) Scanning from the bottom row to the top row, and scanning from the left to the right in one row (4) Scanning from the bottom row to the top row, and scanning from the right to the left in one row (5) Scanning from the left column to the right column, and scanning from the top to the bottom in one column (6) Scanning from the left column to the right column, and scanning from the bottom to the top in one column (7) Scanning from the right column to the left column, and scanning from the top to the bottom in one column (8) Scanning from the right column to the left column, and scanning from the bottom to the top in one column (9) Scanning in the spiral shape: scanning from inside (or outside) the block to outside (or inside) the block, and scanning in a clockwise/counterclockwise direction In the meantime, regarding the order in the second direction, one of the above-described directions may be selectively used. The first direction and the second direction may be the same, or may differ from each other.

Further, at the rearrangement of the residual data of the current block on which inverse transform has been performed at step S2403, rearrangement is performed in units of a sub-block within the current block. In this case, the residual data may be rearranged on the basis of the position of the sub-block within the current block. Since the rearrangement of the residual data on the basis of the position of the sub-block has been described above in detail in Equation 6, a repeated description will be omitted.

Further, at the rearrangement of the residual data of the current block on which inverse transform has been performed at step S2403, the residual data arranged within the current block on which inverse transform has been performed may be rotated at a pre-defined angle for rearrangement.

Further, at the rearrangement of the residual data of the current block on which inverse transform has been performed at step S2403, according to the flipping method, flipping may be performed on the residual data arranged within the current block on which inverse transform has been performed for rearrangement. In this case, the determining of the transform mode of the current block at step S2401 may include: obtaining flipping method information from a bitstream; and determining a flipping method for the current block on the basis of the flipping method information.

Figure 25:
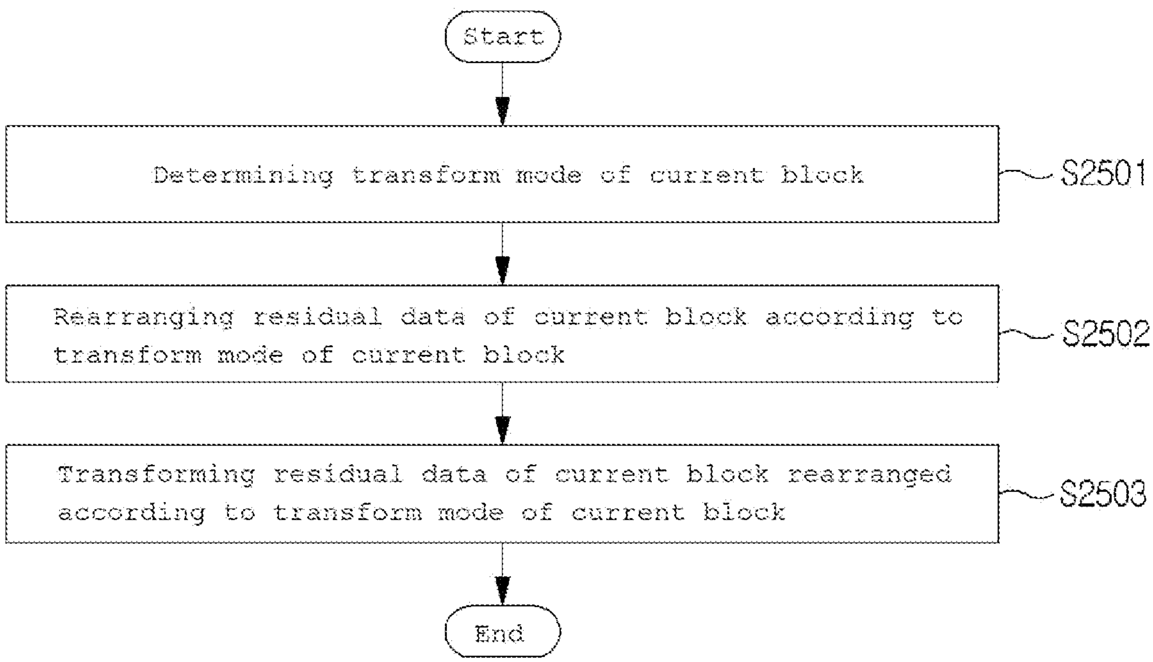
FIG. 25 is a diagram illustrating an embodiment of an encoding method using the SDST method according to the present invention.

FIG. 25 is a diagram illustrating an embodiment of an encoding method using the SDST method according to the present invention.

Referring to FIG. 25, the transform mode of the current block may be determined at step S2501.

Next, the residual data of the current block may be rearranged according to the transform mode of the current block at step S2502.

Next, the residual data of the current block that is rearranged according to the transform mode of the current block may be transformed at step S2503.

Here, the transform mode may include at least one among shuffling discrete sine transform (SDST), shuffling discrete cosine transform (SDCT), discrete sine transform (DST), and discrete cosine transform (DCT). Since SDST, SDCT, DST, and DCT modes have been described with reference to FIG. 24, a repeated description will be omitted.

In the meantime, only when the transform mode of the current block is one of SDST and SDCT, rearrangement of the residual data is performed.

Further, at the determining of the transform mode of the current block at step S2501, it may be determined on the basis of at least one among the prediction mode of the current block, depth information of the current block, the size of the current block, and the shape of the current block.

Here, when the prediction mode of the current block is the inter prediction mode, one among SDST and SDCT is determined as the transform mode of the current block.

In the meantime, the rearrangement of the residual data of the current block at step S2502 may include: scanning, in order in a first direction, the residual data arranged within the current block; and rearranging, in order in a second direction, the residual data scanned in the first direction within the current block.

Further, at the rearrangement of the residual data of the current block at step S2502, rearrangement is performed in units of a sub-block within the current block.

In this case, at the rearrangement of the residual data of the current block at step S2502, the residual data may be rearranged on the basis of the position of the sub-block within the current block.

In the meantime, at the rearrangement of the residual data of the current block at step S2502, the residual data arranged within the current block may be rotated at a pre-defined angle for rearrangement.

In the meantime, at the rearrangement of the residual data of the current block at step S2520, according to the flipping method, flipping may be performed on the residual data arranged within the current block for rearrangement.

An image decoder using the SDST method according to the present invention may include an inverse transform module that determines the transform mode of the current block, performs inverse transform on the residual data of the current block according to the transform mode of the current block, and rearranges the residual data of the current block on which inverse transform has been performed according to the transform mode of the current block. Here, the transform mode may include at least one among shuffling discrete sine transform (SDST), shuffling discrete cosine transform (SDCT), discrete sine transform (DST), and discrete cosine transform (DCT).

An image decoder using the SDST method according to the present invention may include an inverse transform module that determines the transform mode of the current block, rearranges the residual data of the current block according to the transform mode of the current block, and performs inverse transform on the residual data of the current block which is rearranged according to the transform mode of the current block. Here, the transform mode may include at least one among shuffling discrete sine transform (SDST), shuffling discrete cosine transform (SDCT), discrete sine transform (DST), and discrete cosine transform (DCT).

An image encoder using the SDST method according to the present invention may include a transform module that determines the transform mode of the current block, and rearranges the residual data of the current block according to the transform mode of the current block, and transforms the residual data of the current block which is rearranged according to the transform mode of the current block. Here, the transform mode may include at least one among shuffling discrete sine transform (SDST), shuffling discrete cosine transform (SDCT), discrete sine transform (DST), and discrete cosine transform (DCT).

An image encoder using the SDST method according to the present invention may include a transform module that determines the transform mode of the current block, transforms the residual data of the current block according to the transform mode of the current block, and rearranges the residual data of the current block which is transformed according to the transform mode of the current block. Here, the transform mode may include at least one among shuffling discrete sine transform (SDST), shuffling discrete cosine transform (SDCT), discrete sine transform (DST), and discrete cosine transform (DCT).

A bitstream generated by the encoding method using the SDST method according to the present invention may include: determining the transform mode of the current block; rearranging the residual data of the current block according to the transform mode of the current block; and transforming the residual data of the current block which is rearranged according to the transform mode of the current block, wherein the transform mode may include at least one among shuffling discrete sine transform (SDST), shuffling discrete cosine transform (SDCT), discrete sine transform (DST), and discrete cosine transform (DCT).

FIGS. 26 to 31 show examples of positions at which the flipping method is performed in the encoder and the decoder according to the present invention.

Figure 26:
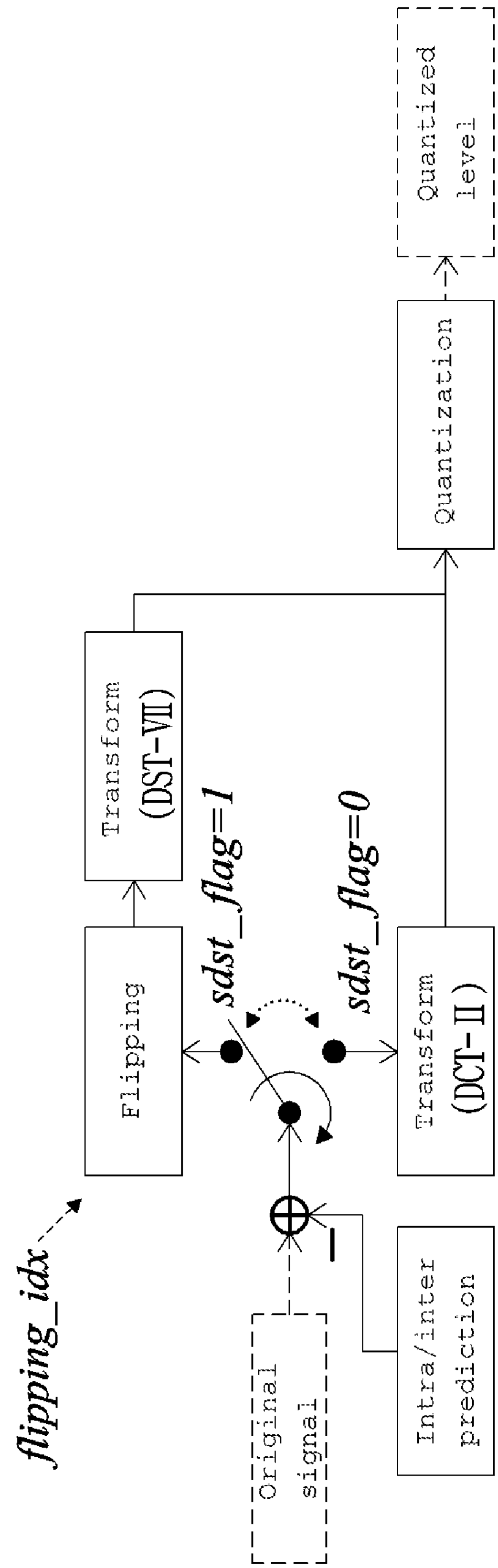
FIG. 26 is a diagram illustrating an embodiment of an encoding process in a method of performing transform after flipping.

FIG. 26 is a diagram illustrating an embodiment of an encoding process in a method of performing transform after flipping.

Figure 27:
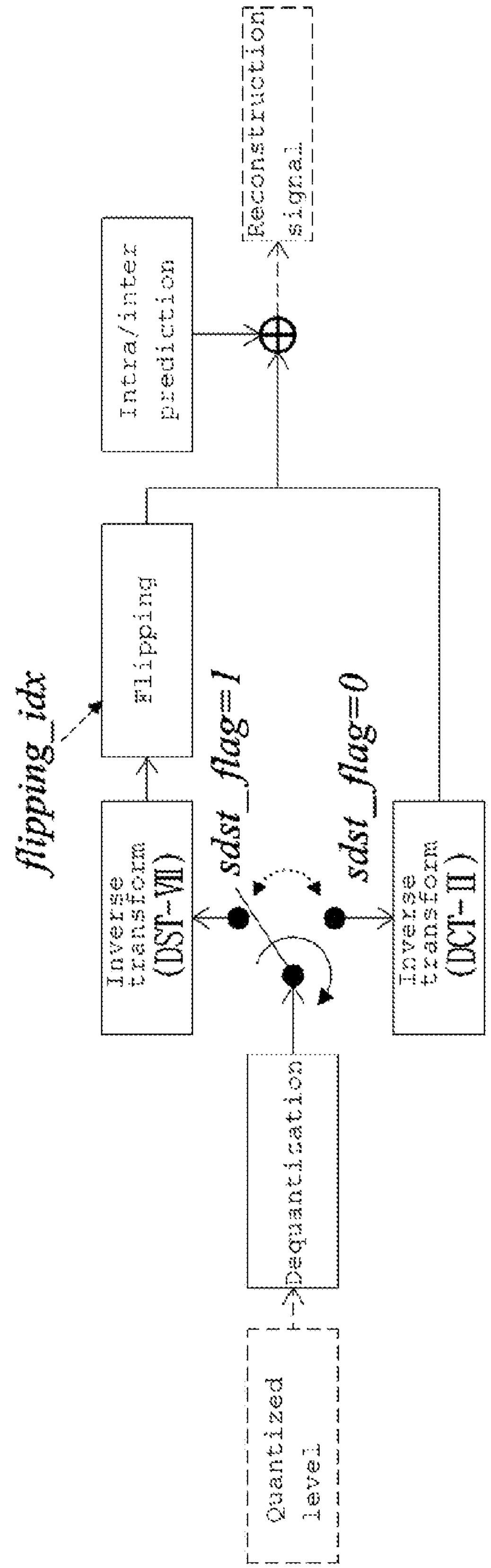
FIG. 27 is a diagram illustrating an embodiment of a decoding process in a method of performing flipping after inverse transform.

FIG. 27 is a diagram illustrating an embodiment of a decoding process in a method of performing flipping after inverse transform.

Referring to FIG. 26, an inter or intra prediction signal is subtracted from the original signal for the current block to generate the residual signal, then one among DCT-2 transform, flipping, and DST-7 transform may be selected as the transform method. When the transform method is DCT-2 transform, transform is performed on the residual signal using DCT-2 transform, thereby generating a transform coefficient. When the transform method is flipping and DST-7 transform methods, one of four flipping methods (no flipping, horizontal flipping, vertical flipping, and horizontal and vertical flipping) is selected to perform flipping on the residual signal, then DST-7 transform is used to perform transform on the residual signal on which flipping has been performed, thereby generating a transform coefficient. By performing quantization on the transform coefficient, a quantized level may be generated.

Referring to FIG. 27, the quantized level is received to perform dequantization, thereby generating the transform coefficient. It is possible to select a method that corresponds to a method selected among, in the encoding process, DCT-2 inverse transform or DST-7 inverse transform, and flipping. That is, when DCT-2 transform is performed in the encoding process, DCT-2 inverse transform is performed in the decoding process. Further, when flipping and DST-7 transform methods are performed in the encoding process, DST-7 inverse transform and flipping are performed in the decoding process. When the inverse transform method is DCT-2 inverse transform, inverse transform is performed on the transform coefficient using DCT-2 inverse transform, thereby generating a reconstructed residual signal. When the inverse transform method is DST-7 inverse transform and flipping methods, inverse transform is performed on the residual coefficient using DST-7 inverse transform to generate the reconstructed residual signal. Then, one of four flipping methods (no flipping, horizontal flipping, vertical flipping, and horizontal and vertical flipping) is selected to perform flipping on the reconstructed residual signal, thereby generating a flipping and reconstructed residual signal. The inter or intra prediction signal is added to the reconstructed residual signal or to the flipping and reconstructed residual signal, thereby generating a reconstruction signal.

Figure 28:
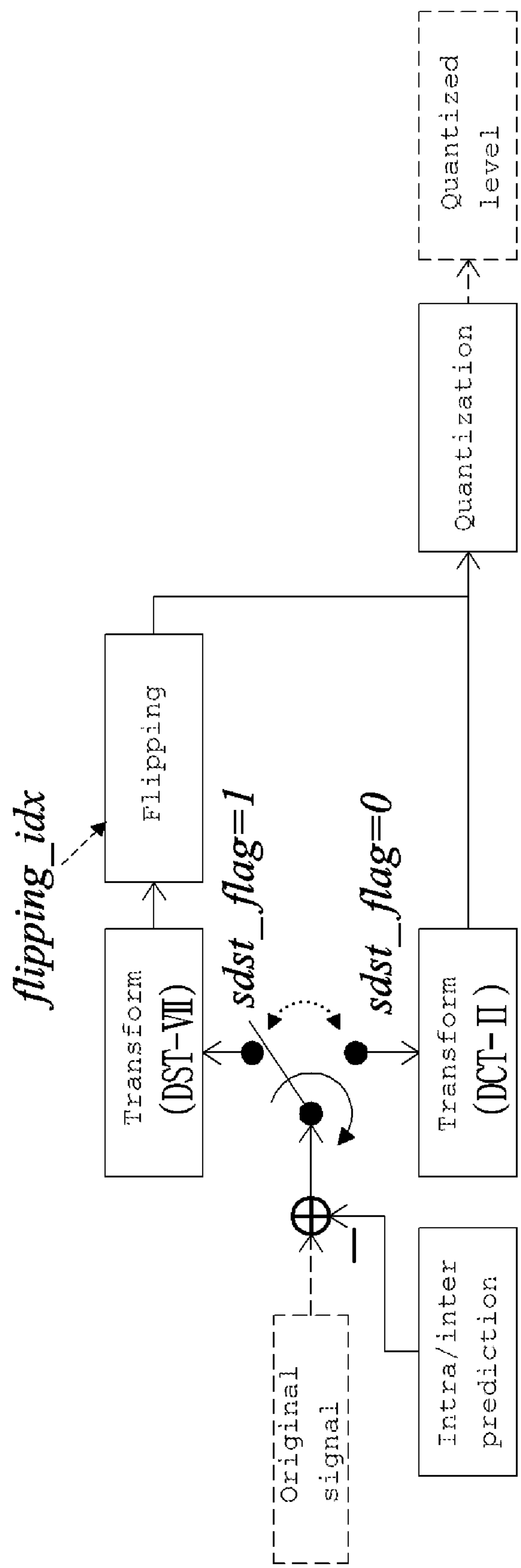
FIG. 28 is a diagram illustrating an embodiment of an encoding process in a method of performing flipping after transform.

FIG. 28 is a diagram illustrating an embodiment of an encoding process in a method of performing flipping after transform.

Figure 29:
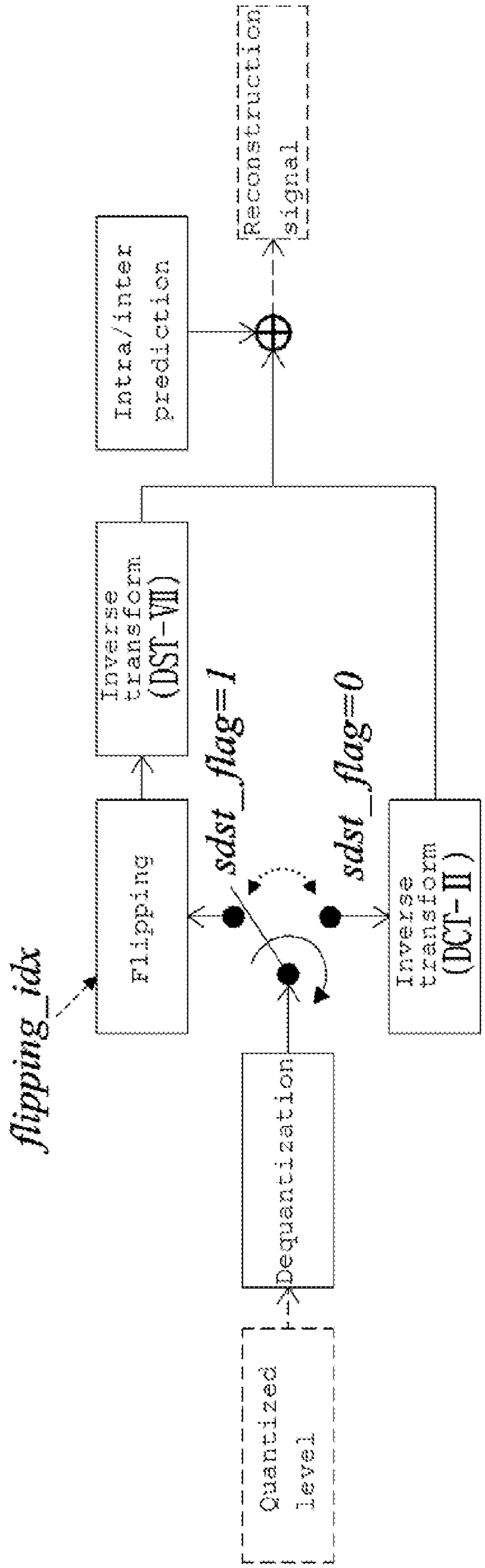
FIG. 29 is a diagram illustrating an embodiment of a decoding process in a method of performing inverse transform after flipping.

FIG. 29 is a diagram illustrating an embodiment of a decoding process in a method of performing inverse transform after flipping.

Referring to FIG. 28, an inter or intra prediction signal is subtracted from the original signal for the current block to generate the residual signal, then one among DCT-2 transform, DST-7 transform, and flipping may be selected as the transform method. When the transform method is DCT-2 transform, transform is performed on the residual signal using DCT-2 transform, thereby generating a transform coefficient. When the transform method is DST-7 transform and flipping methods, transform is performed on the residual signal using DST-7 transform. Then, one of four flipping methods (no flipping, horizontal flipping, vertical flipping, and horizontal and vertical flipping) is selected to perform flipping on the transform coefficient, thereby generating the transform coefficient on which flipping has been performed. By performing quantization on the transform coefficient or on the transform coefficient on which flipping has been performed, a quantized level may be generated. When performing flipping on the transform coefficient, rearrangement of the transform coefficients is performed. The method of performing rearrangement may be the same method as flipping, may be a method of performing second transform to rotate the axis at the zero point of the transform basis, may be a method of exchanging positive and negative signs of the transform coefficients, and so on.

Referring to FIG. 29, the quantized level is received to perform dequantization, thereby generating the transform coefficient. It is possible to select a method that corresponds to a method selected among, in the encoding process, DCT-2 inverse transform or flipping, and DST-7 inverse transform. That is, when DCT-2 transform is performed in the encoding process, DCT-2 inverse transform is performed in the decoding process. When DST-7 transform and flipping methods are performed in the encoding process, flipping and DST-7 inverse transform are performed in the decoding process. When the inverse transform method is DCT-2 inverse transform, inverse transform is performed on the transform coefficient using DCT-2 inverse transform, thereby generating a reconstructed residual signal. When the inverse transform method is flipping and DST-7 inverse transform methods, one of four flipping methods (no flipping, horizontal flipping, vertical flipping, and horizontal and vertical flipping) is selected to performing flipping on the transform coefficient. Then, DST-7 inverse transform is used to perform inverse transform on the transform coefficient on which flipping has been performed, thereby generating a reconstructed residual signal. The inter or intra prediction signal is added to the reconstructed residual signal, thereby generating a reconstruction signal.

Figure 30:
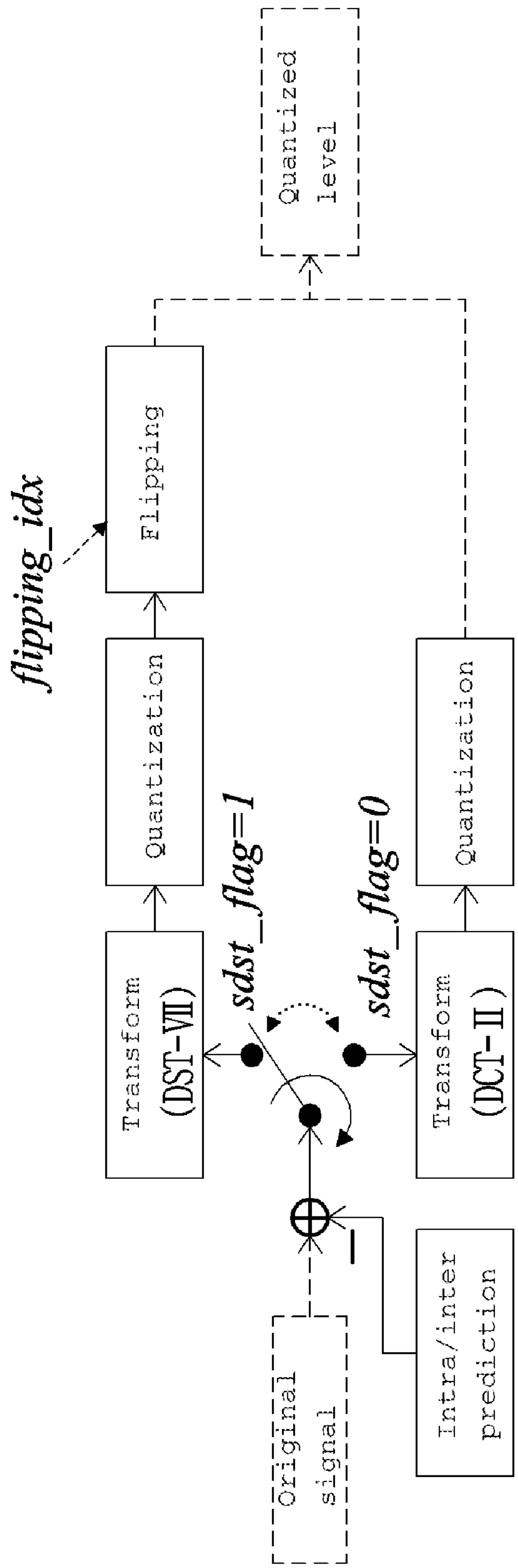
FIG. 30 is a diagram illustrating an embodiment of an encoding process in a method of performing flipping after quantization.

FIG. 30 is a diagram illustrating an embodiment of an encoding process in a method of performing flipping after quantization.

Figure 31:
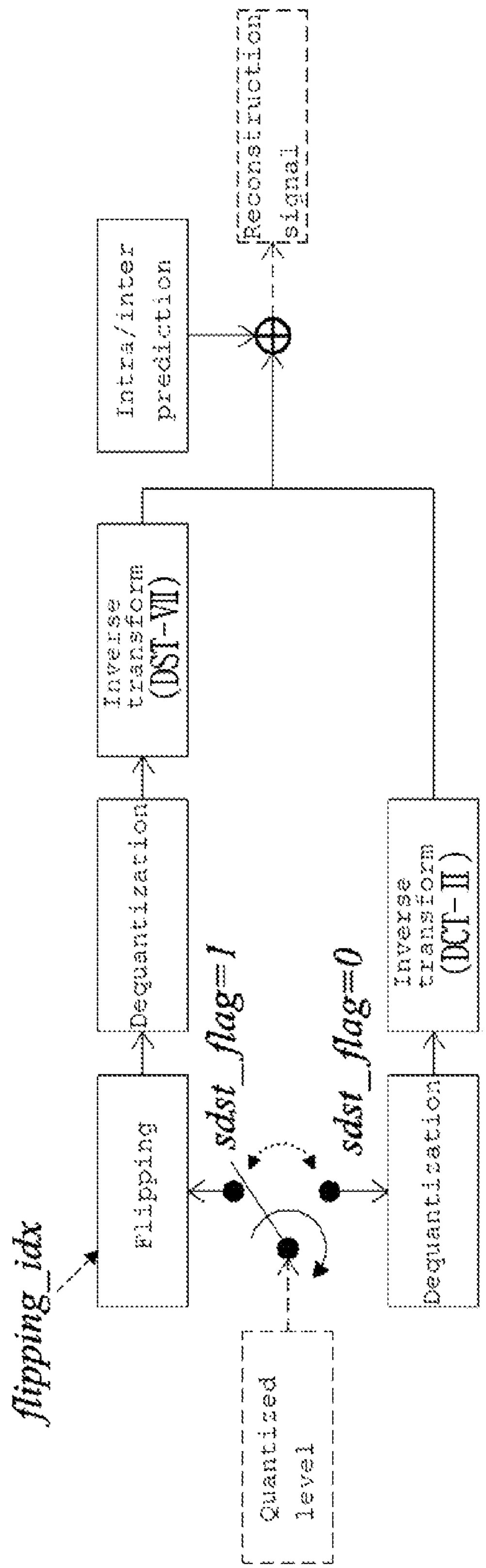
FIG. 31 is a diagram illustrating an embodiment of a decoding process in a method of performing dequantization after flipping.

FIG. 31 is a diagram illustrating an embodiment of a decoding process in a method of performing dequantization after flipping.

Referring to FIG. 30, an inter or intra prediction signal is subtracted from the original signal for the current block to generate the residual signal, then one among DCT-2 transform and DST-7 transform may be selected as the transform method. When the transform method is DCT-2 transform, transform is performed on the residual signal using DCT-2 transform, thereby generating a transform coefficient. When the transform method is DST-7 transform, transform is performed on the residual signal using DST-7 transform, thereby generating a transform coefficient. By performing quantization on the transform coefficient, a quantized level may be generated. Further, when the transform method is DST-7 transform, one of four flipping methods (no flipping, horizontal flipping, vertical flipping, and horizontal and vertical flipping) is selected to perform flipping on the quantized level, thereby generating the quantized level on which flipping has been performed. Further, when performing flipping on the quantized level, rearrangement of the quantized levels is performed. The method of performing rearrangement may be the same method as flipping, may be a method of performing second transform to rotate the axis at the zero point of the transform basis, may be a method of exchanging positive and negative signs of the quantized levels, and so on.

Referring to FIG. 31, the quantized level is received, and the inverse transform method corresponding to a method selected among DCT-2 inverse transform and DST-7 inverse transform in the encoding process is selected. That is, when DCT-2 transform is performed in the encoding process, DCT-2 inverse transform is performed in the decoding process. Further, when DST-7 transform is performed in the encoding process, DST-7 inverse transform is performed in the decoding process. When the inverse transform method is DCT-2 inverse transform, dequantization is performed on the quantized level to generate a transform coefficient, then DCT-2 inverse transform is used to perform inverse transform on the transform coefficient, thereby generating a reconstructed residual signal. When the inverse transform method is a DST-7 inverse transform method, one of four flipping methods (no flipping, horizontal flipping, vertical flipping, and horizontal and vertical flipping) is selected to perform flipping on the quantized level, then dequantization is performed on the quantized level on which flipping has been performed, thereby generating a transform coefficient. Inverse transform is performed on the transform coefficient using DST-7 inverse transform, thereby generating a reconstructed residual signal. The inter or intra prediction signal is added to the reconstructed residual signal, thereby generating a reconstruction signal.

In the meantime, the position at which the flipping method is performed in the decoder may be determined on the basis of information on the flipping position which is signaled from the encoder.

Figure 32:
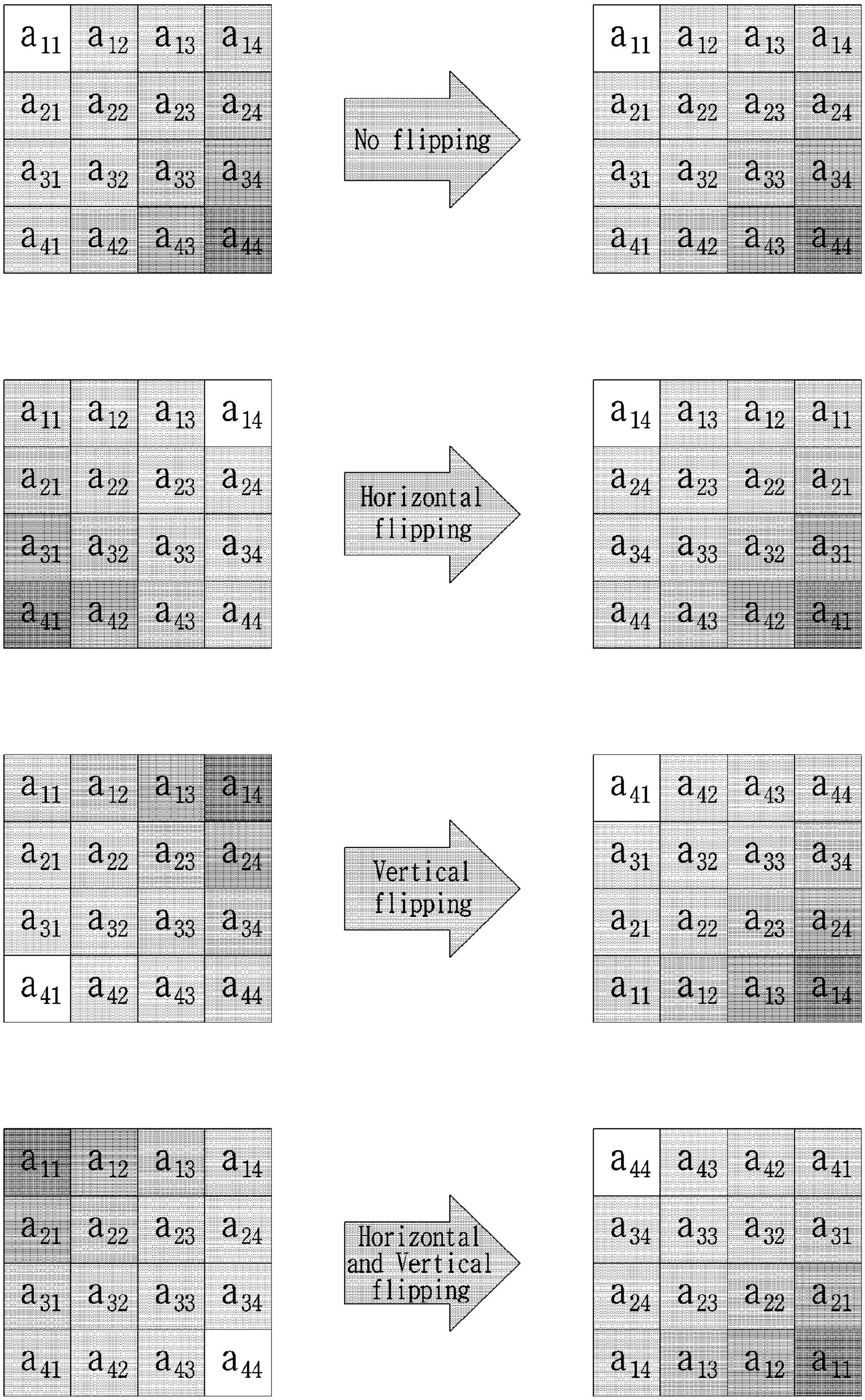
FIG. 32 is a diagram illustrating performance of flipping on the residual block.

FIG. 32 is a diagram illustrating performance of flipping on the residual block.

Referring to FIG. 32, at least one among "no flipping", "horizontal flipping", "vertical flipping", and "horizontal and vertical flipping" may be performed on the residual block. As shown in FIG. 32, the position of the sample within the residual block may vary depending on the flipping type.

Figure 33:
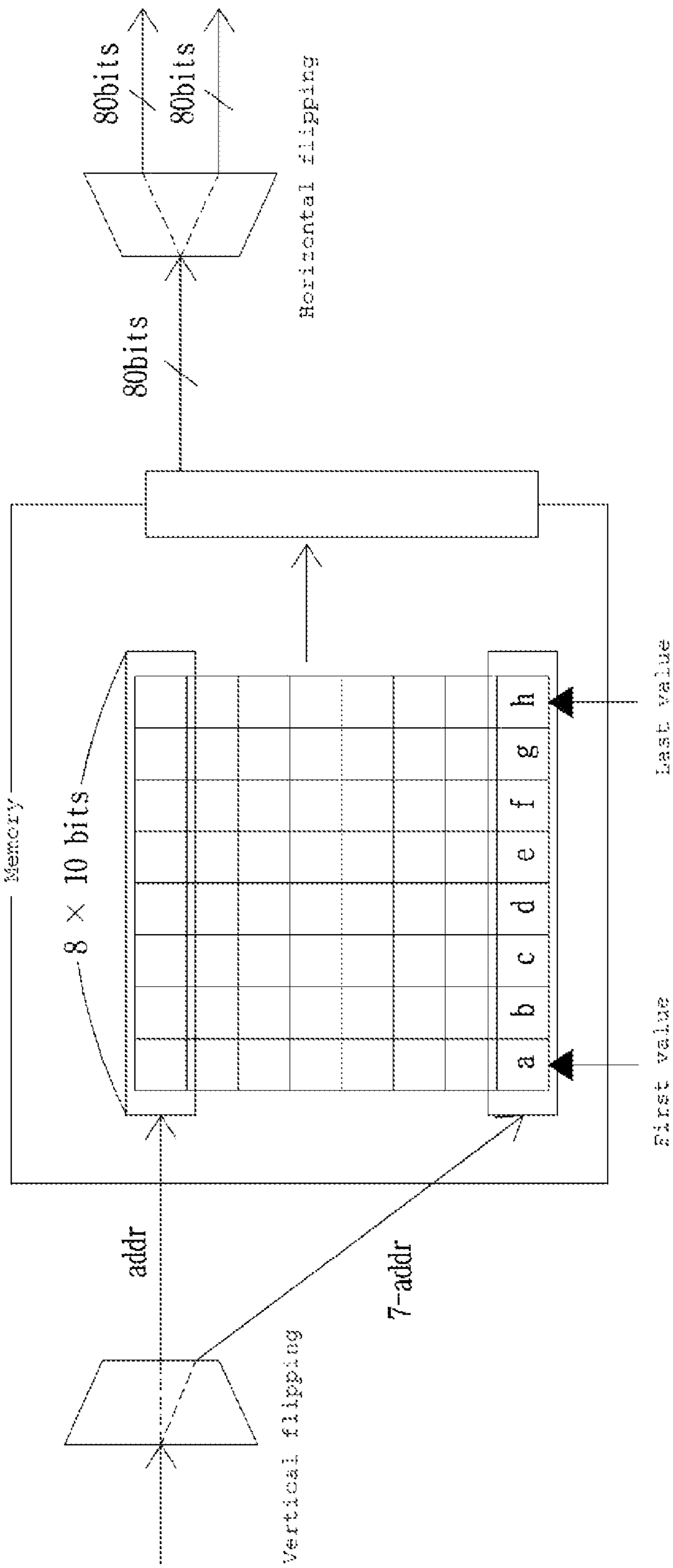
FIG. 33 is a diagram illustrating an embodiment for implementing performance of flipping on a residual block in the size of 8×8, into hardware.

FIG. 33 is a diagram illustrating an embodiment for implementing performance of flipping on a residual block in the size of 8×8, into hardware.

Referring to FIG. 33, in hardware implementation of vertical flipping on an M×N residual block, vertical flipping is performed on an M×N block by changing an address value (addr) which is used for reading data from a residual block memory, into M−1-addr. That is, instead of vertical flipping operation, a memory row address for the M×N block is changed to read data within the residual block, thereby implementing vertical flipping.

In hardware implementation of horizontal flipping on an M×N residual block, horizontal flipping is performed on an M×N block by changing data values in the residual block memory in reverse order for reading. That is, instead of horizontal flipping operation, the order of reading data values for the M×N block is changed, thereby implementing horizontal flipping. For example, when data a, b, c, d, e, f, g, and h, are stored in the memory in this order, data values h, g, f, e, d, c, b, and a are read in this order, thereby performing horizontal flipping.

Figure 34:
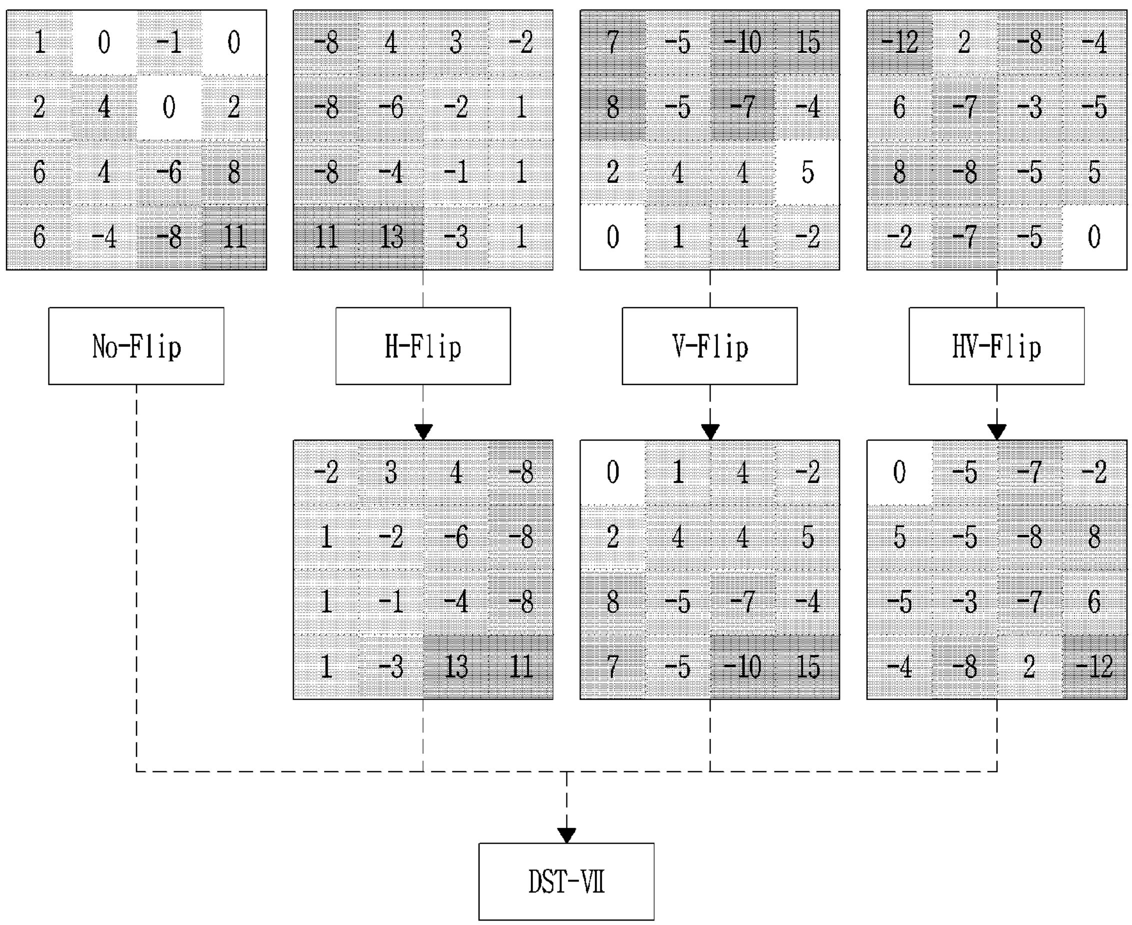
FIG. 34 is a diagram illustrating performance of flipping and transform on the residual block.

FIG. 34 is a diagram illustrating performance of flipping and transform on the residual block.

Referring to FIG. 34, at least one among "no flipping (No-Flip)", "horizontal flipping (H-Flip)", "vertical flipping (V-Flip)", and "horizontal and vertical flipping (HV-Flip)" may be performed on the residual block, and DST-7 transform may be performed. As shown in FIG. 34, the position of the sample within the residual block may vary depending on the flipping type, and DST-7 transform may be performed.

The following shows an example of using an adaptive multiple transform (AMT) method in which at least one among the transforms used in the specification is used.

An AMT set may be constructed using at least one among the transforms used in the specification. For example, besides transforms such as DCT-2, DCT-5, DCT-8, DST-1, DST-7, and the like, at least one transform for each block which is intra- and inter-encoded/decoded may be added to the AMT transform set. Specifically, DST-4 and identity transform may be added to the AMT transform set for the inter-encoded/decoded block, and KLT-1 and KLT-2 may be added to the AMT transform set for the intra-encoded/decoded block.

The transform corresponding to a block in the size such as 4×24, and 8×48 other than the power of two may be added. For example, in the intra encoding/decoding process, seven transform sets each having four transform pairs may be defined as shown in Table 14 below.

TABLE 14

| Prediction mode | Transform-pair set |
|---|---|
| T0, intra | { (DST-4, DST-4), (DST-7, DST-7), (DST-4, DCT-8), (DCT-8, DST-4) } |
| T1, intra | { (DST-7, DST-7), (DST-7, DCT-5), (DCT-5, DST-7), (DST-1, DCT-5) } |
| T2, intra | { (DST-7, DST-7), (DST-7, DCT-8), (DCT-8, DST-7), (DCT-5, DCT-5) } |
| T3, intra | { (DST-4, DST-4), (DST-4, DCT-5), (DCT-8, DST-4), (DST-1, DST-7) } |
| T4, intra | { (DST-4, DST-7), (DST-7, DCT-5), (DCT-8, DST-7), (DST-1, DST-7) } |
| T5, intra | { (DST-7, DST-7), (DST-7, DCT-5), (DCT-8, DST-7), (DST-1, DST-7) } |
| T6, intra | { (DST-7, DST-7), (DST-7, DCT-5), (DCT-5, DST-7), (DST-1, DST-7) } |

In Table 14, the first item of the transform pair may refer to transform in the vertical direction, and the second item may refer to transform in the horizontal direction. The transform-pair set in Table 14 may be defined in such a manner that each of the seven transform sets is assigned on the basis of different intra prediction modes and different block sizes. In Table 14, T0 to T6 may denote available transform-pair sets corresponding to respective block sizes. For example, T0 may be used for 2×2 block size, T1 may be used for 4×4 block size, T2 may be used for 8×8 block size, T3 may be used for 16×16 block size, T4 may be used for 32×32 block size, T5 may be used for 64×64 block size, and T6 may be used for 128×128 block size. The identity transform may be applied to a block in the size not exceeding 16×16. Further, the identity transform may be applied to a block in a mode close to horizontal and vertical intra prediction direction. The mode close to horizontal and/or vertical intra prediction direction may be defined as a threshold value based on the size of the block. For example, when the transform index is three and the block satisfies the above condition, horizontal and/or vertical identity transform is applied. In the meantime, in the inter encoding/decoding process, two transform sets each having four transform pairs may be defined as shown in Table 15 below.

TABLE 15

| | |
|---|---|
| T0, inter | { (DCT-8, DCT-8), (DCT-8, DST-7), (DST-7, DCT-8), (DST-7, DST-7) } |
| T1, inter | { (KLT-1, KLT-1), (KLT-1, KLT-2), (KLT-2, KLT-1), (KLT-2, KLT-2) } |

In Table 15, T0 and T1 may denote available transform-pair sets corresponding to the block size. For example, in Table 15, transform set (namely, $T1,_{inter}$) including KLTs may be applied to a block in the size equal to or smaller than 16×16, and $T0,_{inter}$ may be applied to a block in the size larger than 16×16.

Further, a method of approximating the AMT transform using only DCT-2 transform and adjustment steps may be used. The adjustment step may be defined using block-band orthogonal matrices for transforming DCT-2 transform into the form similar to the AMT transform.

A primary transform set for the AMP used in the specification may be composed of DCT-2, DCT-8, DST-4, DST-7 transforms, and the like, and the primary transform set may be composed of DCT-8, DST-4, and DST-7 transforms. Further, a DST-7 transform matrix may be implemented by performing flipping, sign change, and the like on the basis of a DCT-8 transform matrix.

For example, the transforms are used to construct a two-dimensional transform set (namely, horizontal and vertical transforms) to use the result in the inter encoding/decoding process. In the intra encoding/decoding process, two-dimensional transform sets as shown in Table 16 below may be used.

TABLE 16

| | TrIdx | | | |
|---|---|---|---|---|
| predModIdx | 0 | 1 | 2 | 3 |
| 0 | DST4,DST4 | DST7,DST7 | DST4,DCT8 | DCT8,DST4 |
| 1 | DST7,DST7 | DST7,DCT2 | DCT2,DST7 | DCT2,DCT8 |
| 2 | DST7,DST7 | DST7,DCT8 | DCT8,DST7 | DCT2,DST7 |
| 3 | DST4,DST4 | DST4,DCT2 | DCT8,DST4 | DCT2,DST7 |
| 4 | DST4,DST7 | DST7,DCT2 | DCT8,DST7 | DCT2,DST7 |
| 5 | DST7,DST7 | DST7,DCT2 | DCT8,DST7 | DCT2,DST7 |
| 6 | DST7,DST7 | DST7,DCT2 | DCT2,DST7 | DCT2,DST7 |

Table 16 shows a transform set for vertical and horizontal transforms with respect to each prediction mode (predModIdx) and each transform index (TrIdx). Further, the AMT transform set may be replaced by a transform set using DCT-8 and DST-7.

Further, when the horizontal or vertical size of the block exceeds 32 pixels, AMT transform is not applied to the block, and at least one among AMT transform use information (AMT flag) and transform index information (AMT index) is not signaled to the decoder.

The transform matrices of DCT-8, DST-1, and DCT-5 included in the AMT transform set used in the specification may be replaced by other transform matrices. Flipped DST-7 may be used instead of DCT-8. DST-6 may be used instead of DST-1. DCT-2 may be used instead of DCT-5.

The transform matrices of the flipped DST-7 and the DST-6 may be derived from DST-7 as shown in Equation 7 below.

[Equation 7]

$$\mathrm{Flip}S_N^{7}[l,k]=S_N^{7}[l,N-k-1] \quad \text{Flipped DST-7}$$

$$S_N^{6}[l,k]=S_N^{7}[k,l] \quad \text{DST-6}$$

Here, $S_N^7[k,l]$ denotes the l-th component of the k-th basis vector in the N×N transform matrix of DST-7.

Further, AMT transform including transform matrices of DCT-8, DST-1, and DCT-5 may be applied to both a luma component and a chroma component.

Transform for the luma component may be determined on the basis of a mode-dependent transform set and the explicitly signaled AMT index indicating horizontal and vertical transforms.

In the case of a chroma component/intra mode, transform may be determined in the same manner as the method of determining transform for the luma component, the number of transform candidates may be smaller than the number of transform candidates for the luma component.

In the case of a chroma component/inter mode, transform may be determined by a one-bit flag that indicates whether the AMT index is the same as a collocated block or default transform (DCT-2×DCT-2) of the luma component.

Further, AMT may select horizontal transform and vertical transform in DCT-2, DST-7, and in flipped DST-7 (FDST-7). Further, an AMT flag may be defined. When the AMT flag is zero, it indicates that DCT-2 is used for both horizontal transform and vertical transform. When the AMT flag is one, it indicates that another transform is used according to the AMT index. Only when both the width and the height of the block are equal to or smaller than 64, AMT usage is allowed. The AMT flag may be determined by the intra prediction mode. In an even number intra prediction mode, the AMT flag may be implicitly assigned to be one. In an odd number intra prediction mode, the AMT flag may be implicitly assigned to be zero. Further, in the odd number intra prediction mode, the AMT flag may be implicitly assigned to be one. In the even number intra prediction mode, the AMT flag may be implicitly assigned to be zero.

A transform set to which two transforms DST-7 and DCT-8 are added may be used, and the maximum block size to which AMT is applied may be limited to the size of 32×32. Forward N×N DST-7 having discrete Fourier transform (DFT) with the length of 2N+1 may be implemented to obtain N×N DST-7. The 2N+1 FFT may be reconstructed into a two-dimensional FFT. DCT-8 may be derived from DST-7 through sign changing and reordering immediately before and after DST-7 computation. Therefore, DST-7 may be reused to implement DCT-8.

Transform or inverse transform for the current block may only be performed on the sub-block within the current block. For example, the sub-block may be a sub-block at the top left position in the current block. The horizontal length (width) and the vertical length (height) of the sub-block may be independently determined. For example, the horizontal length (width) (or the vertical length (height)) of the sub-block may be determined according to the type of transform kernel applied to horizontal transform or inverse transform (or vertical transform or inverse transform). For example, when the transform kernel applied to horizontal transform or inverse transform is DCT-2, the horizontal length (width) is 32 samples. For example, when the transform kernel applied to horizontal transform or inverse transform is not DCT-2 but, for example, DST-7 or DCT-8, the horizontal length (width) is 16 samples. Similarly, for example, when the transform kernel applied to vertical transform or inverse transform is DCT-2, the vertical length (height) is 32 samples. For example, when the transform kernel applied to vertical transform or inverse transform is not DCT-2 but, for example, DST-7 or DCT-8, the vertical length (height) is 16 samples. Further, since the sub-block is unable to be larger than the current block, when the length of the current block is shorter than the derived length (for example, 32 samples or 16 samples) of the sub-block, the length of the block on which transform or inverse transform is performed is determined to be the length of the current block. Transform or inverse transform may not be performed on samples in the region within the current block, which are not included in the sub-block. All of the sample values of the samples may be set to "zero". Here, the sub-block may include the residual signal that is a difference between an input signal and a prediction signal or may include a transform coefficient that results from transform of the residual signal.

In the intra and inter encoding/decoding process, AMT transform may be implicitly determined.

Intra prediction mode dependent transforms of the luma component and the chroma component may be represented as Table 17 and Table 18 below, respectively.

TABLE 17

| Intra prediction mode | Horizontal transform | Vertical transform | Block size limit |
|---|---|---|---|
| Planar Ang. 31,32,34,36,37 | DST-7 | DST-7 | Width <= 64 && Height <= 64 |
| DC Ang. 33,35 | DCT-2 | DCT-2 | Width <= 64 && Height <= 64 |
| Ang. 2,4, 6...28,30 Ang. 39,41,43...63,65 | DST-7 | DCT-2 | Width <= 64 && Height <= 64 |
| Ang. 3,5,7...27,29 Ang. 38,40,42...64,66 | DCT-2 | DST-7 | Width <= 64 && Height <= 64 |

TABLE 18

| Intra prediction mode | Horizontal transform | Vertical transform | Block size limit |
|---|---|---|---|
| LM modes | DST-7 | DST-7 | Width <= 8 && Height <= 8 |
| Planar | DST-7 | DST-7 | Width <= 16 && Height <= 16 |
| Hor | DST-7 | DCT-2 | Width <= 16 && Height <= 32 |
| Ver, VDIA | DCT-2 | DST-7 | Width <= 32 && Height <= 16 |

Here, Table 17 shows a transform mapping table for the luma component, and Table 18 shows a transform mapping table for the chroma component. Further, position dependent transform may be used for the residual signal in the merge mode. Transform for the residual signal in the merge mode may vary according to spatial motion vector predictor (MVP) candidates used for motion compensation of the current block.

Table 19 below shows a mapping table between an MVP position and transform.

TABLE 19

| MVP position | Horizontal transform | Vertical transform | Block size limit |
|---|---|---|---|
| L (left) | DST-7 | DCT-2 | Width <= 32 && Height <= 32 |
| A (above) | DCT-2 | DST-7 | Width <= 32 && Height <= 32 |

In Table 19, for a left MVP candidate, DST-7 and DCT-2 may be used as horizontal and vertical transforms, respectively. Further, for an above MVP candidate, DCT-2 and DST-7 may be used as horizontal and vertical transforms, respectively. In other cases, DCT-2 may be used as default transform. Transform use information in which AMT transform use information, primary transform, and non-separable secondary transform (NSST) use information, secondary transform, are combined may be entropy encoded/decoded. Use of AMT and NSST may be represented by a single transform index, and instead of signaling indexes of primary and secondary transforms independently, primary and secondary transforms may be combined by one transform index for signaling. Further, the combined transform index may be used for both the luma component and the chroma component.

Further, the transform used in the specification may be selected from N pre-defined transform candidate sets for each block. Here, N may be a positive integer. Each of the transform candidates may specify primary horizontal transform, primary vertical transform, and secondary transform (which may be the same as the identity transform). A list of the transform candidates may vary depending on the block size and the prediction mode. The selected transform may be signaled as follows. When the coded block flag is one, a flag indicating whether a first transform of the candidate list is used is transmitted. When the flag indicating whether the first transform of the candidate list is used is zero, the following is applied: when the number of the non-zero transform coefficient levels is larger than a threshold value, a transform index indicating the used transform candidate is transmitted; otherwise, a second transform of the list is used.

Further, NSST which is secondary transform is used only when DCT-2 which is primary transform is used as default transform. Further, regarding horizontal transform or vertical transform, when the width or the height is independently equal to or smaller than four, DST-7 is selected without signaling.

Further, when the number of the non-zero transform coefficients is larger than a threshold value, the AMT flag is signaled. In the case of the inter block, the threshold value may be set to two. In the case of the intra block, the threshold value may be set to zero. When the number of the non-zero transform coefficients is larger than two, the AMT index is signaled. Otherwise, it is estimated to be zero. In the case of NSST, regarding the block of the intra luma component, when the sum of the number of non-zero transform coefficients of the top left 8×8 or 4×4 luma component and the number of non-zero AC coefficients of the top left 8×8 or 4×4 chroma component is larger than two, an NSST index is signaled.

Regarding the residual block, when the width of the block is equal to or smaller than K, DST-7 is used for one-dimensional horizontal transform instead of DCT-2. When the height of the block is equal to or smaller than L, DST-7 is used for one-dimensional vertical transform instead of DCT-2. Further, even though the width or the height of the block is equal to or smaller than K, when the intra prediction mode is a linear model (LM) chroma mode, DCT-2 is used. Here, K and L may be positive integers, for example, four. Further, the K and the L may be the same or may have different values. Further, the residual block may be a block encoded in the intra mode. Further, the residual block may be a chroma block.

Instead of performing the flipping method on the residual signal, the transform kernel, or the transform matrix on which flipping has been performed may be used to perform transform/inverse transform. Here, the transform/inverse transform kernel or the transform/inverse transform matrix on which flipping has been performed may be a kernel or a matrix that has been subjected to flipping and is pre-defined in the encoder/decoder. In this case, since the transform/inverse transform matrix on which flipping has been performed is used to perform transform/inverse transform, it is possible to obtain the same effect as performing flipping on the residual signal. Here, flipping may be at least one among no flipping, horizontal flipping, vertical flipping, and horizontal and vertical flipping. In this case, it is possible to signal information on whether transform/inverse transform on which flipping has been performed is used. Further, the information on whether transform/inverse transform on which flipping has been performed is used may be signaled for each of the transform/inverse transform in the horizontal direction and the transform/inverse transform in the vertical direction.

Further, instead of performing the flipping method on the residual signal, flipping may be performed on the transform kernel or the transform matrix in the encoding/decoding process to perform transform/inverse transform. In this case, since flipping is performed on the transform/inverse transform matrix to perform transform/inverse transform, it is possible to obtain the same effect as performing flipping on the residual signal. Here, flipping may be at least one among no flipping, horizontal flipping, vertical flipping, and horizontal and vertical flipping. In this case, it is possible to signal information on whether flipping is performed on the transform/inverse transform matrix. Further, the information on whether flipping is performed on the transform/inverse transform matrix may be signaled for each of the transform/inverse transform in the horizontal direction and the transform/inverse transform in the vertical direction.

When the flipping method is determined on the basis of the intra prediction mode and two or more intra prediction modes of the current block are used, flipping is performed before/after transform/inverse transform of the current block as the flipping method for the non-directional mode.

Further, when the flipping method is determined on the basis of the intra prediction mode and two or more intra prediction modes of the current block are used, flipping is performed before/after transform/inverse transform of the current block as the flipping method for a main directional mode. Here, the main directional mode may be at least one among a vertical mode, a horizontal mode, and a diagonal mode.

When the size of the transform is equal to or larger than M×N, all transform coefficients that are present in regions of M/2 to M, and N/2 to N during transform or after transform are set to a value of zero. Here, M and N may be positive integers, for example, 64×64.

In order to reduce memory requirements, right shift operation may be performed by K on the transform coefficient that is generated after performing the transform. Further, right shift operation may be performed by K on a temporary transform coefficient that is generated after performing the horizontal transform. Further, right shift operation may be performed by K on a temporary transform coefficient that is generated after performing the vertical transform. Here, K is a positive integer.

In order to reduce memory requirements, right shift operation may be performed by K on the reconstructed residual signal that is generated after performing the inverse transform. Further, right shift operation may be performed by K on a temporary transform coefficient that is generated after performing the horizontal inverse transform. Further, right shift operation may be performed by K on a temporary transform coefficient that is generated after performing the vertical inverse transform. Here, K is a positive integer.

At least one of the flipping methods may be performed on at least one among signals that are generated before performing transform/inverse transform in the horizontal direction, after performing transform/inverse transform in the horizontal direction, before performing transform/inverse transform in the vertical direction, and after performing transform/inverse transform in the vertical direction. In this case, it is possible to signal flipping method information used in the transform/inverse transform in the horizontal direction or the transform/inverse transform in the vertical direction.

Further, DCT-4 may be used instead of DST-7. A DCT-4 transform/inverse transform matrix in 2N−1 size is extracted from a DCT-2 transform/inverse transform matrix in 2N size for use, so only the DCT-2 transform/inverse transform matrix is stored in the encoder/decoder instead of DCT-4, whereby memory requirements of the encoder/decoder is reduced. Further, a DCT-4 transform/inverse transform logic in 2N−1 size is utilized from a DCT-2 transform/inverse transform logic in 2N size, so the chip area required for implementing the encoder/decoder is reduced. Here, the above example is not applied only to the DCT-2 and the DCT-4, and the above example is applied when there is a transform matrix or transform logic shared between at least one of types of DST transform/inverse transforms and at least one of types of DCT transform/inverse transforms. That is, from one transform/inverse transform matrix or logic, another transform/inverse transform matrix or logic may be extracted for use. Further, in the case of a particular transform/inverse transform size, from one transform/inverse transform matrix or logic, another transform/inverse transform matrix or logic may be extracted for use. Further, from one transform/inverse transform matrix, another transform/inverse transform matrix may be extracted in at least one unit among a matrix unit, a basis vector unit, and a matrix coefficient unit.

Further, when the current block is smaller than a size of M×N, instead of the particular transform/inverse transform, another transform/inverse transform is used for transform/inverse transform of the current block. Further, when the current block is larger than a size of M×N, instead of the particular transform/inverse transform, another transform/inverse transform is used for transform/inverse transform of the current block. Here, M and N are positive integers. The particular transform/inverse transform and another transform/inverse transform may be transform/inverse transforms pre-defined in the encoder/decoder.

Further, at least one among transforms of DCT-4, DCT-8, DCT-2, DST-4, DST-1, DST-7, and the like used in the specification may be replaced by at least one of transforms that are computed on the basis of transforms of DCT-4, DCT-8, DCT-2, DST-4, DST-1, DST-7, and the like. Here, the computed transform may be transform computed by modifying a coefficient value within transform matrices of DCT-4, DCT-8, DCT-2, DST-4, DST-1, DST-7, and the like. Further, the coefficient value within the transform matrices of DCT-4, DCT-8, DCT-2, DST-4, DST-1, DST-7, and the like may have an integer value. That is, the transforms of DCT-4, DCT-8, DCT-2, DST-4, DST-1, DST-7, and the like may be integer transforms. Further, a coefficient value within the computed transform matrix may have an integer value. That is, the computed transform may be integer transform. Further, the computed transform may be a result of performing left shift operation by N on the coefficient value within the transform matrices of DCT-4, DCT-8, DCT-2, DST-4, DST-1, DST-7, and the like. Here, N may be a positive integer.

DCT-Q and DST-W transforms may mean that DCT-Q and DST-W transforms and DCT-Q and DST-W inverse transform are included. Here, Q and W may have positive integers of one or more, and for example, the numerals 1 to 9 may have the same meaning as Roman numerals I to IX.

Further, transforms of DCT-4, DCT-8, DCT-2, DST-4, DST-1, DST-7, and the like used in the specification are not limited thereto, and at least one between DCT-Q and DST-W transforms may be used by replacing the transforms of DCT-4, DCT-8, DCT-2, DST-4, DST-1, DST-7. Here, Q and W may have positive integers of one or more, and for example, the numerals 1 to 9 may have the same meaning as Roman numerals I to IX.

Further, the transform used in the specification may be performed in the square transform form in the case of a square block. The transform may be performed in the non-square transform form in the case of a non-square block. In the case of a square shape region including at least one of a square block and a non-square block, transform may be performed on the region in the square transform form. In the case of a non-square shape region including at least one of a square block and a non-square block, transform may be performed on the region in the non-square transform form.

Further, in the specification, information on the rearrangement method may be flipping method information.

Further, the transform used in the specification may mean at least one among transform and inverse transform.

The encoder may perform transform with respect to a residual block to generate a transform coefficient, quantize the transform coefficient to generate a quantized coefficient level, and entropy-encode the quantized coefficient level, in order to improve the subjective/objective image quality of an image.

The decoder may entropy-decode the quantized coefficient level, dequantize the quantized coefficient level to generate the transform coefficient, and inverse transform the transform coefficient to generate the reconstructed residual block.

Transform type information on which transform is used as transform and inverse transform may be explicitly entropy-encoded/decoded. In addition, transform type information on which transform is used as transform and inverse transform may be implicitly determined based on at least one of encoding parameters without being entropy-encoded/decoded.

Hereinafter, embodiments of an image encoding/decoding method and apparatus for performing at least one of transform or inverse transform and a recording medium for storing a bitstream in the present invention will be described.

Using at least one of the following embodiments, a block may be partitioned into N sub-blocks and at least one of prediction, transform/inverse transform, quantization/dequantization or entropy encoding/decoding may be performed. Such a mode may be referred to as a first sub-block partitioning mode (e.g., an ISP mode or an Intra Sub-Partitions mode).

The block may mean a coding block, a prediction block, or a transform block. For example, the block may be a transform block.

In addition, the partitioned sub-block may mean at least one of a coding block, a prediction block, or a transform block. For example, the partitioned sub-block may be a transform block.

In addition, the block or the partitioned sub-block may be at least one of an intra block, an inter block or an intra block copy block. For example, the block and the sub-block may be an intra block.

In addition, the block or the partitioned sub-block may be at least one of an intra prediction block, an inter prediction block or an intra block copy prediction block. For example, the block and the sub-block may be an intra prediction block.

In addition, the block or the partitioned sub-block may be at least one of a luma signal block or a chroma signal block. For example, the block and the sub-block may be a luma signal block.

When the block is partitioned into N sub-blocks, the block before partitioning may be a coding block, and the partitioned sub-block may be at least one of a prediction block or a transform block. That is, prediction, transform/inverse transform, quantization/dequantization, entropy encoding/decoding of a transform coefficient may be performed with a partitioned sub-block size.

In addition, when the block is partitioned into N sub-blocks, the block before partitioning may be at least one of a coding block or a prediction block and the partitioned sub-block may be a transform block. That is, prediction may be performed with the size of the block before partitioning, and transform/inverse transform, quantization/dequantization, entropy encoding/decoding of a transform coefficient may be performed with a partitioned sub-block size.

Whether the block is partitioned into a plurality of sub-blocks may be determined based on at least one of the area (the product of the width and the height, etc.), the size (the width, the height or a combination of the width or the height) and the shape/form (a rectangle (non-square), a square, etc.) of the block.

For example, when a current block is a 64×64 block, the current block may be partitioned into a plurality of sub-blocks.

As another example, when a current block is a 32×32 block, the current block may be partitioned into a plurality of sub-blocks.

As another example, when a current block is a 32×16 block, the current block may be partitioned into a plurality of sub-blocks.

As another example, when a current block is a 16×32 block, the current block may be partitioned into a plurality of sub-blocks.

As another example, when a current block is a 4×4 block, the current block may not be partitioned into a plurality of sub-blocks.

As another example, when a current block is a 2×4 block, the current block may not be partitioned into a plurality of sub-blocks.

As another example, when the area of the current block is equal to or greater than 32, the current block may be partitioned into a plurality of sub-blocks.

As another example, when the area of the current block is less than 32, the current block may not be partitioned into a plurality of sub-blocks.

As another example, when the area of the current block is 256 and the shape of the current block is a rectangle, the current block may be partitioned into a plurality of sub-blocks.

As another example, when the area of the current block is 16 and the shape of the current block is a square, the current block may not be partitioned into a plurality of sub-blocks.

When the block is partitioned, the block may be partitioned into a plurality of sub-blocks in at least one partitioning direction of a vertical direction or a horizontal direction.

For example, the current block may be partitioned into two sub-blocks in a vertical direction.

As another example, the current block may be partitioned into two sub-blocks in a horizontal direction.

As another example, the current block may be partitioned into four sub-blocks in a horizontal direction.

As another example, the current block may be partitioned into four sub-blocks in a vertical direction.

When the block is partitioned into N sub-blocks, N may be a positive integer and, for example, may be 2 or 4. In addition, N may be determined using at least one of the area, size, shape, or partitioning direction of the block.

For example, when the current block is a 4×8 or 8×4 block, the current block may be partitioned into two sub-blocks in the horizontal direction or partitioned into two sub-blocks in the vertical direction.

As another example, when the current block is a 16×8 or 16×16 block, the current block may be partitioned into four sub-blocks in the vertical direction or four sub-blocks in the horizontal direction.

As another example, when the current block is an 8×32 or 32×32 block, the current block may be partitioned into four sub-blocks in the horizontal direction or four sub-blocks in the vertical direction.

As another example, when the current block is a 16×4, 32×4, or 64×4 block, the current block may be partitioned into four sub-blocks in the vertical direction. In addition, when the current block is a 16×4, 32×4 or 64×4 block, the current block may be partitioned into two sub-blocks in the horizontal direction.

As another example, when the current block is a 4×16, 4×32 or 4×64 block, the current block may be partitioned into four sub-blocks in the horizontal direction. In addition, when the current block is a 4×16, 4×32 or 4×64 block, the current block may be partitioned into two sub-blocks in the vertical direction.

As another example, when the current block is a J×4 block, the current block may be partitioned into two sub-blocks in the horizontal direction. Here, J may be a positive integer.

As another example, when the current block is a 4×K block, the current block may be partitioned into two sub-blocks in the vertical direction. Here, J may be a positive integer.

As another example, when the current block is a J×K (K>4) block, the current block may be partitioned into four sub-blocks in the horizontal direction. Here, J may be a positive integer.

As another example, when the current block is a J×K (J>4) block, the current block may be partitioned into four sub-blocks in the vertical direction. Here, J may be a positive integer.

As another example, when the current block is a J×K (K>4) block, the current block may be partitioned into four sub-blocks in the vertical direction. Here, J may be a positive integer.

As another example, when the area of the current block is 64, the current block may be partitioned into four sub-blocks in the horizontal direction or the vertical direction.

As another example, when the current block is a 16×4 block and the shape of the current block is a rectangle, the current block may be partitioned into four sub-blocks in the vertical direction.

As another example, when the area of the current block is 1024 and the shape of the current block is a square, the current block may be partitioned into four sub-blocks in the horizontal direction or the vertical direction.

In addition, the sub-block may have at least one of a minimum area, a minimum width, or a minimum height.

For example, the sub-block may have S as a minimum area. Here, S may be a positive integer, and may be 16, for example.

As another example, the sub-block may have J as a minimum width. Here, J may be a positive integer, and may be 4, for example.

As another example, the sub-block may have K as a minimum height. Here, K may be a positive integer, and may be 4, for example.

In each partitioned sub-block, a reconstructed block may be generated by adding a residual block (or a reconstructed residual block) and a prediction block. Here, at least one of reconstructed samples in each reconstructed sub-block may be used as a reference sample in intra prediction of a sub-block encoded/decoded later.

Encoding/decoding order of sub-blocks partitioned from the block may be determined according to at least one of partitioning directions.

For example, the encoding/decoding order of the horizontally partitioned sub-blocks may be determined as an order from an upper direction to a lower direction.

As another example, the encoding/decoding order of the vertically partitioned sub-blocks may be determined as an order from a left direction to a right direction.

For the partitioned sub-blocks, an intra prediction mode may be shared and used.

At this time, information on the intra prediction mode for each sub-block may be entropy-encoded/decoded only once in a block before partitioning.

For the partitioned sub-blocks, an intra block copy mode may be shared and used.

At this time, information on the intra block copy mode for each sub-block may be entropy-encoded/decoded only once in a block before partitioning.

In order to indicate a sub-block partitioning mode in which the block is partitioned into N sub-blocks and at least one of prediction, transform/inverse transform, quantization/dequantization or entropy encoding/decoding is performed in a unit of sub-block, at least one of sub-block partitioning mode information or partitioning direction information may be entropy-encoded/decoded.

Here, the sub-block partitioning mode information may be used to indicate the sub-block partitioning mode. When it is indicated that the sub-block partitioning mode is used (second value), the block may be partitioned into sub-blocks and at least one of prediction, transform/inverse transform, quantization/dequantization or entropy encoding/decoding may be performed. When it is indicated that the sub-block partitioning mode is not used (first value), the block may not be partitioned into sub-blocks and at least one of prediction, transform/inverse transform, quantization/dequantization or entropy encoding/decoding may be performed. Here, the first value may be 0, and the second value may be 1.

In addition, the partitioning direction information may be used to indicate whether the sub-block partitioning mode is vertical partitioning or horizontal partitioning. When the partitioning direction information has a first value, the block may be partitioned into the sub-blocks in the horizontal direction and the first value may be 0. In addition, when the partitioning direction information has a second value, the block may be partitioned into the sub-blocks in the vertical direction and the second value may be 1.

When the current block does not use a closest reference sample line (first reference sample line) as a reference sample line, at least one of the sub-block partitioning mode information or the partitioning direction information may not be entropy-encoded/decoded. At this time, from the sub-block partitioning mode information, it may be inferred that the current block is not partitioned into sub-blocks.

Here, the current block doing not use the closest reference sample line (first reference sample line) as the reference sample line may mean that a second or more reference sample line may be used as the reconstructed reference line around the current block.

That is, only when the current block uses the closest reference sample line as the reference sample line, at least one of the sub-block partitioning mode information or the partitioning direction information may be entropy-encoded/decoded.

At least one of the area, size, shape, or partitioning direction of a coefficient group used during entropy-encoding/decoding of a transform coefficient may be determined based on at least one of the area, size, shape, or partitioning direction of the sub-block.

For example, when the area of the sub-block is 16, the area of the coefficient group may be determined as 16.

As another example, when the area of the sub-block is 32, the area of the coefficient group may be determined as 16.

As another example, when the size of the sub-block is 1×16 or 16×1, the size of the coefficient group may be determined as 1×16 or 16×1.

As another example, when the size of the sub-block is 2×8 or 8×2, the size of the coefficient group may be determined as 2×8 or 8×2.

As another example, when the size of the sub-block is 4×4, the size of the coefficient group may be determined as 4×4.

As another example, when the width of the sub-block is 2, the width of the coefficient group may be determined as 2.

As another example, when the width of the sub-block is 4, the width of the coefficient group may be determined as 4.

As another example, when the height of the sub-block is 2, the height of the coefficient group may be determined as 2.

As another example, when the height of the sub-block is 4, the height of the coefficient group may be determined as 4.

As another example, when the shape of the sub-block is a rectangle (non-square), the shape of the coefficient group may be determined as a rectangle (non-square).

As another example, when the shape of the sub-block is a square, the shape of the coefficient group may be determined as a square.

As another example, when the size of the sub-block is 16×4 and the form thereof is a rectangle, the size of the coefficient group may be determined as at least one of 4×4 or 8×2.

As another example, the size of the sub-block is 4×8 and the form thereof is a rectangle, the size of the coefficient group may be determined as at least one of 4×4 or 2×8.

As another example, the size of the sub-block is 32×4 and the form thereof is a rectangle, the size of the coefficient group may be determined as at least one of 4×4 or 8×2.

As another example, the size of the sub-block is 8×64 and the form thereof is a rectangle, the size of the coefficient group may be determined as at least one of 4×4 or 2×8.

As another example, the size of the sub-block is 16×4 and the partitioning direction is a vertical direction, the size of the coefficient group may be determined as 4×4.

As another example, the size of the sub-block is 4×8 and the partitioning direction is a horizontal direction, the size of the coefficient group may be determined as 4×4.

As another example, the size of the sub-block is 32×4 and the partitioning direction is a horizontal direction, the size of the coefficient group may be determined as 8×2.

As another example, the size of the sub-block is 8×64 and the partitioning direction is a vertical direction, the size of the coefficient group may be determined as 2×8.

For each partitioned sub-block, a coded block flag indicating whether at least one transform coefficient having a non-zero value is present in sub-block units may be entropy-encoded/decoded.

For example, the coded block flag may indicate that at least one transform coefficient having a non-zero value is present in at least one sub-block in sub-block units.

As another example, when m means a total number of sub-blocks and the coded block flags of m−1 sub-blocks from the front of the sub-blocks indicate that a transform coefficient having a non-zero value is not present, it may be inferred that the coded block flag of an m-th sub-block indicates that at least one transform coefficient having a non-zero value is present.

As another example, when the coded block flag is entropy-encoded/decoded in sub-block units, the coded block flag may be entropy-encoded/decoded in units of blocks before partitioning.

As another example, when the coded block flag is entropy-encoded/decoded in units of blocks before partitioning, the coded block flag may not be entropy-encoded/decoded in sub-block units.

Meanwhile, when the current block is in a first sub-block partitioning mode and the size of the current block is a predefined size, the size of a sub-block for intra prediction and the size of a sub-block for transform may be different from each other. That is, sub-block partitioning for intra prediction and sub-block partitioning for transform may be different from each other. Here, the predefined size may be 4×N or 8×N (N>4). Here, sub-block partitioning may mean vertical partitioning.

For example, when the current block is in a first sub-block partitioning mode and the size of the current block is 4×N (N>4), the current block may be vertically partitioned into subblocks having a size of 4×N, for intra prediction, and the current block may be vertically partitioned into subblocks having a size of 1×N, for transform. At this time, one-dimensional transform/inverse transform may be performed in order to perform transform having a size of 1×N. That is, one-dimensional transform/inverse transform may be performed based on at least one of the partitioning mode of the current block or the size of the current block.

As another example, when the current block is in a first sub-block partitioning mode and the size of the current block is 8×N (N>4), the current block may be vertically partitioned into subblocks having a size of 4×N, for intra prediction, and the current block may be vertically partitioned into sub-blocks having a size of 2×N, for transform. At this time, two-dimensional transform/inverse transform may be performed in order to perform transform having a size of 2×N. That is, two-dimensional transform/inverse transform may be performed based on at least one of the partitioning mode of the current block or the size of the current block.

Here, N may mean a positive integer and may be a positive integer less than 64 or 128.

In addition, the size of the current block may mean at least one of the size of the coding block, the size of a prediction block or the size of a transform block of the current block.

Figure 35:
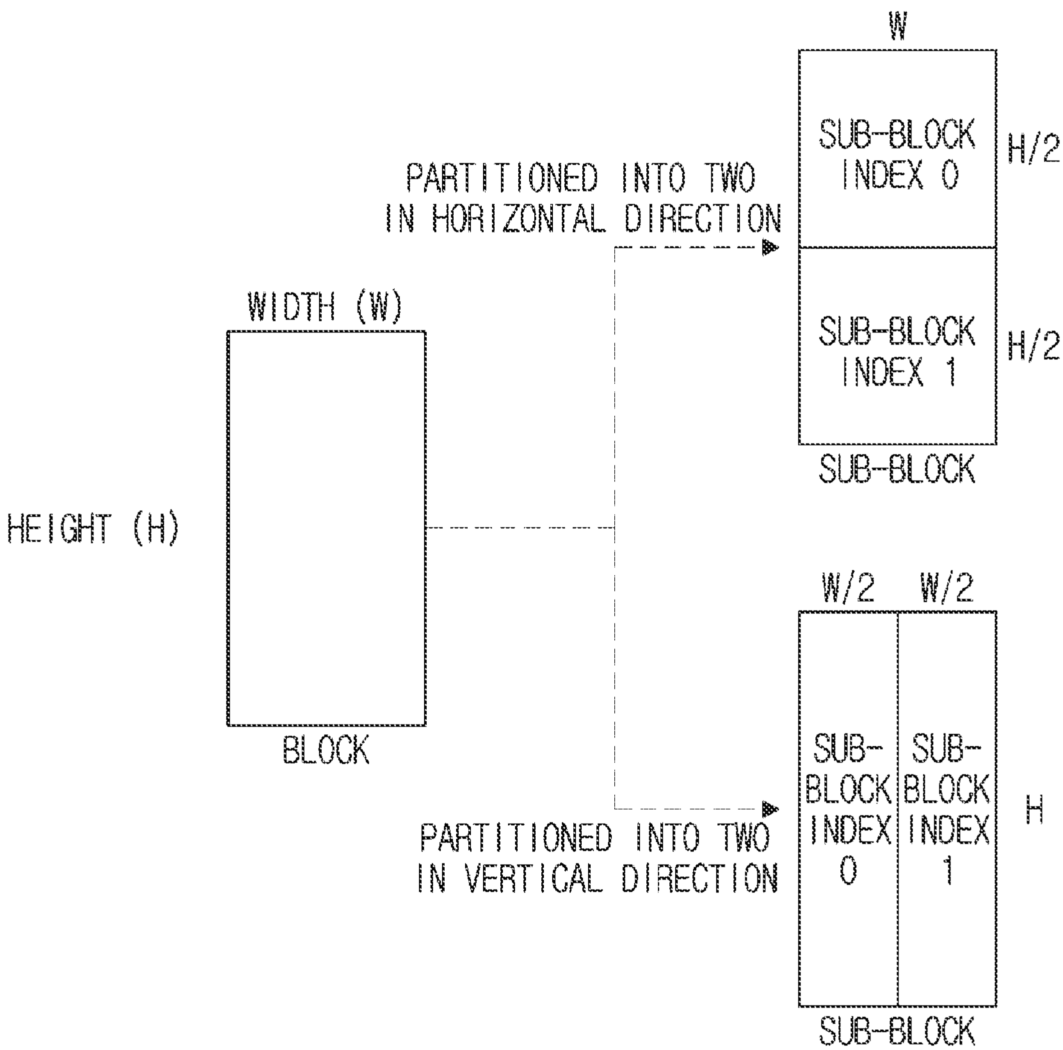
FIGS. 35 to 37 are diagrams illustrating embodiments of a first sub-block partitioning mode according to the present invention.

As in the example of FIG. 35, according to the embodiment of the first sub-block partitioning mode, the current block may be partitioned into two sub-blocks in the horizontal direction and may be partitioned into two sub-blocks in the vertical direction.

Figure 36:
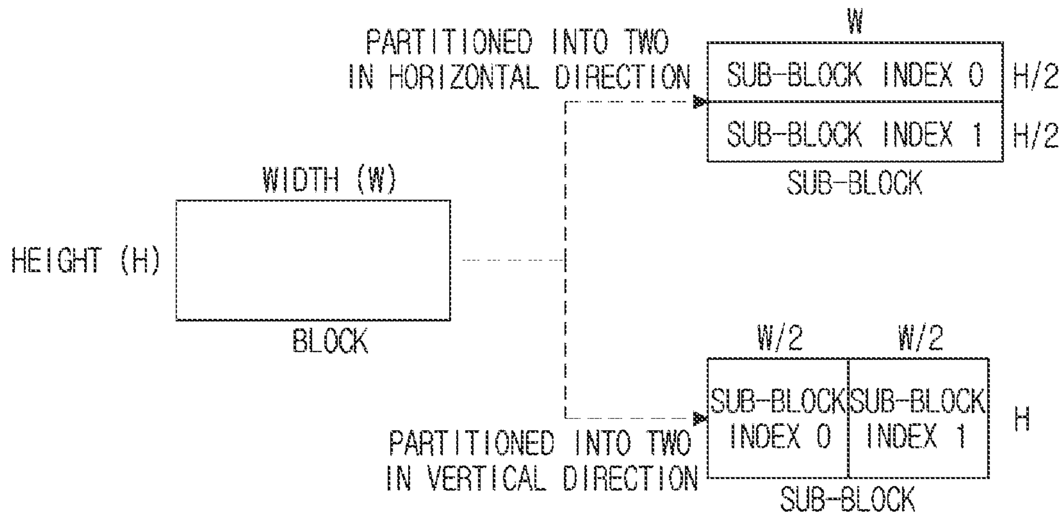

As in the example of FIG. 36, according to the embodiment of the first sub-block partitioning mode, the current block may be partitioned into two sub-blocks in the horizontal direction and may be partitioned into two sub-blocks in the vertical direction.

Figure 37:
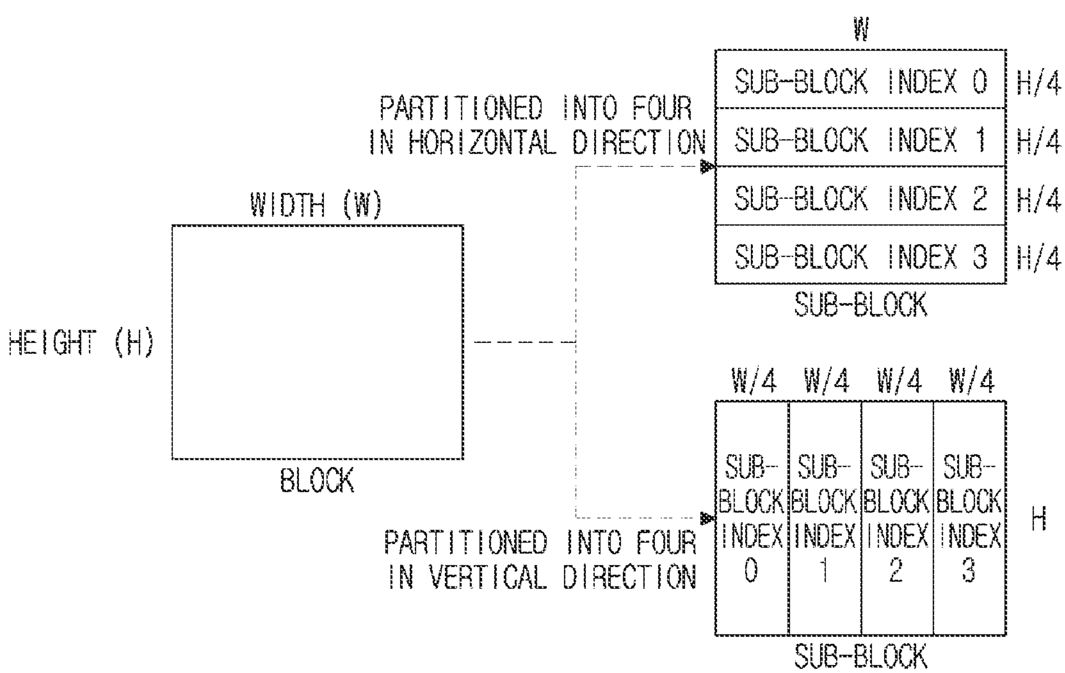

As in the example of FIG. 37, according to the embodiment of the first sub-block partitioning mode, the current block may be partitioned into four sub-blocks in the horizontal direction and may be partitioned into four sub-blocks in the vertical direction.

Using at least one of the following embodiments, the block may be partitioned into N sub-blocks to perform at least one of transform/inverse transform, quantization/dequantization or entropy encoding/decoding in a unit of sub-block. Such a mode may be referred to as a second sub-block partitioning mode (e.g., an SBT mode or a Sub-Block Transform mode).

The block may mean at least one of a coding block, a prediction block, or a transform block. For example, the block may be a transform block.

In addition, the partitioned sub-block may mean at least one of a coding block, a prediction block, or a transform block. For example, the partitioned sub-block may be a transform block.

In addition, the block or the partitioned sub-block may be at least one of an intra block, an inter block or an intra block copy block. For example, the block or the partitioned sub-block may be an inter block.

In addition, the block or the partitioned sub-block may be at least one of an intra prediction block, an inter prediction block or an intra block copy prediction block. For example, the block may be an inter prediction block.

In addition, the block or the partitioned sub-block may be at least one of a luma signal block or a chroma signal block. For example, the block and the sub-block may be a luma signal block.

When the block is partitioned into N sub-blocks, the block before partitioning may be a coding block, and the partitioned sub-block may be at least one of a prediction block or a transform block. That is, transform/inverse transform, quantization/dequantization and entropy encoding/decoding of a transform coefficient may be performed with a partitioned sub-block size.

In addition, When the block is partitioned into N sub-blocks, the block before partitioning may be at least one of a coding block or a prediction block, and the partitioned sub-block may be a transform block. That is, prediction is performed with the size of the block before partitioning, and transform/inverse transform, quantization/dequantization and entropy encoding/decoding of a transform coefficient may be performed with the size of the partitioned sub-block.

Whether the block is partitioned into a plurality of sub-blocks may be determined based on at least one of the area (the product of the width and the height), size (the width or the height or a combination of the width and the height) or shape/form (rectangle, square, etc.) of the block.

For example, when the current block is a 64×64 block, the current block may be partitioned into a plurality of sub-blocks.

As another example, when the current block is a 32×32 block, the current block may be partitioned into a plurality of sub-blocks.

As another example, when the current block is a 32×16 block, the current block may be partitioned into a plurality of sub-blocks.

As another example, when the current block is a 16×32 block, the current block may be partitioned into a plurality of sub-blocks.

As another example, when the current block is a 4×4 block, the current block may not be partitioned into a plurality of sub-blocks.

As another example, when the current block is a 2×4 block, the current block may not be partitioned into a plurality of sub-blocks.

As another example, when at least one of the width or the height of the current block is greater than the maximum size of a transform block, the current block may not be partitioned into a plurality of sub-blocks. That is, when at least one of the width or the height of the current block is less than or equal to the maximum size of a transform block, a second sub-block partitioning mode may be applied to the current block.

As another example, when at least one of the width or the height of the current block is greater than the maximum size of a transform block, the current block may not be partitioned into a plurality of sub-blocks. That is, when both of the width and the height of the current block are less than or equal to the maximum size of a transform block, a second sub-block partitioning mode may be applied to the current block.

In addition, when at least one of the width or the height of the current block is less than or equal to the maximum size of a transform block, at least one of information (the sub-block partitioning mode information, the partitioning direction information, sub-block location information or sub-block size information) indicating the second sub-block partitioning mode may be entropy-encoded/decoded. Here, the maximum size of the transform block may be determined based on transform block maximum size information signaled in a higher-level unit. For example, the maximum size of the transform block may be determined as any one of 64 or 32 based on the transform block maximum size information.

As another example, when the area of the current block is equal to or greater than 32, the current block may be partitioned into a plurality of sub-blocks.

As another example, when the area of the current block is less than 32, the current block may not be partitioned into a plurality of sub-blocks.

As another example, when the area of the current block is 256 and the shape of the current block is a rectangle, the current block may be partitioned into a plurality of sub-blocks.

As another example, when the area of the current block is 16 and the shape of the current block is a square, the current block may not be partitioned into a plurality of sub-blocks.

When at least one of the width or the height of the current block is greater than or equal to a predefined value, the current block may be partitioned into a plurality of sub-blocks.

For example, when at least one of the width or the height of the current block is equal to or greater than 8, the current block may be partitioned into a plurality of sub-blocks.

In contrast, when both the width and the height of the current block are less than the predefined value, the current block may not be partitioned into a plurality of sub-blocks.

When the current block is in a GPM (Geometric Partitioning Mode), the transform block of the current block may not be partitioned into a plurality of sub-blocks. Here, GPM may be a prediction mode in which the prediction block of the current block is partitioned into two sub-blocks to perform prediction. When the current block is in a GPM, the prediction block of the current block may be partitioned into two sub-blocks. At this time, information on a partitioning direction for partitioning the prediction block of the current block into two sub-blocks may be entropy-encoded/decoded. Inter prediction may be performed with respect to two sub-blocks, thereby generating the prediction samples for two sub-blocks. In addition, the prediction samples for the generated two sub-blocks may be weighted-summed to derive the prediction sample of the current block. That is, when the prediction block of the current block is partitioned into at least two sub-blocks, the transform block of the current block may not be partitioned into at least two sub-blocks. Similarly, when the prediction block of the current block is not partitioned into at least two sub-blocks, the transform block of the current block may be partitioned into at least two sub-blocks.

When the block is partitioned, the block may be partitioned into a plurality of sub-blocks in at least one of the vertical direction or the horizontal direction.

For example, the current block may be partitioned into two sub-blocks in the vertical direction.

As another example, the current block may be partitioned into two sub-blocks in the horizontal direction.

When the block is partitioned into N sub-blocks, N may be a positive integer, and may be 2, for example. In addition, N may be determined using at least one of the area, size, shape, or partitioning direction of the block.

For example, when the current block is a 4×8 or 8×4 block, the current block may be partitioned into two sub-blocks in the horizontal direction or two sub-blocks in the vertical direction.

As another example, when the current block is a 16×8 or 16×16 block, the current block may be partitioned into two sub-blocks in the vertical direction or two sub-blocks in the horizontal direction.

As another example, when the current block is an 8×32 or 32×32 block, the current block may be partitioned into two sub-blocks in the horizontal direction or two sub-blocks in the vertical direction.

As another example, when the current block is a J×8 block, the current block may be partitioned into two sub-blocks in the horizontal direction. Here, J may be a positive integer.

As another example, when the current block is an 8×K block, the current block may be partitioned into two sub-blocks in the vertical direction. Here, J may be a positive integer.

As another example, when the current block is a J×K (K>8) block, the current block may be partitioned into two sub-blocks in the horizontal direction. Here, J may be a positive integer. At this time, the heights of the partitioned sub-blocks may have a ratio of 1:3 or 3:1.

As another example, when the current block is a J (J>8)×K block, the current block may be partitioned into two sub-blocks in the vertical direction. Here, J may be a positive integer. At this time, the widths of the partitioned sub-blocks may have a ratio of 1:3 or 3:1.

As another example, when the area of the current block is 64, the current block may be partitioned into two sub-blocks in the horizontal direction or the vertical direction.

As another example, when the current block is a 16×4 block and the shape of the current block is a rectangle, the current block may be partitioned into two sub-blocks in the vertical direction.

As another example, when the area of the current block is 1024 and the shape of the current block is a square, the current block may be partitioned into two sub-blocks in the horizontal direction or the vertical direction.

In addition, the sub-block may have at least one of a minimum area, a minimum width, or a minimum height.

For example, the sub-block may have S as a minimum area. Here, S may be a positive integer, and may be 16, for example.

As another example, the sub-block may have J as a minimum width. Here, J may be a positive integer, and may be 4, for example.

As another example, the sub-block may have K as a minimum height. Here, K may be a positive integer, and may be 4, for example.

In order to indicate the sub-block partitioning mode in which the block is partitioned into N sub-blocks to perform at least one of transform/inverse transform, quantization/dequantization or entropy encoding/decoding, at least one of the sub-block partitioning mode information, the partitioning direction information, the sub-block position information or the sub-block size information may be entropy-encoded/decoded.

Here, the sub-block partitioning mode information may be used to indicate the sub-block partitioning mode. When this indicates that the sub-block partitioning mode is used (second value), the block may be partitioned into sub-blocks and at least one of transform/inverse transform, quantization/dequantization or entropy encoding/decoding may be performed. When this indicates that the sub-block partitioning mode is not used (first value), the block may not be partitioned into sub-blocks and at least one of transform/inverse transform, quantization/dequantization or entropy encoding/decoding may be performed. Here, the first value may be 0 and the second value may be 1.

In addition, the partitioning direction information may be used to indicate whether the sub-block partitioning mode is partitioned in the vertical direction or the horizontal direction. When the partitioning direction information has a first value, the sub-blocks may be partitioned in the vertical direction, and the first value may be 0. In addition, when the partitioning direction information has a second value, the sub-block may be partitioned in the horizontal direction, and the second value may be 1.

In addition, the sub-block position information may be used to indicate the residual signal of which of the partitioned sub-blocks is encoded/decoded. When the sub-block position information has a first value, the residual signal of the first sub-block may be encoded/decoded, and the first value may be 0. In addition, when the sub-block position information has a second value, the residual signal of the second sub-block may be coded/decoded, and the second value may be 1. In addition, when the sub-block position information has a first value, at least one of the coded block flag for the luma signal or the coded block flag for the chroma signal for the first sub-block may be entropy-encoded/decoded. In addition, when the sub-block position information has a second value, at least one of the coded block flag for the luma signal or the coded block flag for the chroma signal for the second sub-block may be entropy-encoded/decoded.

In addition, the sub-block size information may be used to indicate whether the width or height of the partitioned sub-block is 4 or 4 of the width or height of the block. When the sub-block size information has a first value, this may indicate that the width or height of the sub-block in which the residual signal indicated by the sub-block position information is encoded/decoded is 4 of the width or height of the block, and the first value may be 0. In addition, when the sub-block size information has a second value, this may indicate that the width or height of the sub-block in which the residual signal indicated by the sub-block position information is encoded/decoded is 4 of the width or height of the block, and the first value may be 1. For example, when there is only a case where the size of the partitioned sub-block is 4 of the width or height of the block, the sub-block size information may not entropy-encoded/decoded.

In each partitioned sub-block, the reconstructed block may be generated by adding a residual block (or a reconstructed residual block) and a prediction block.

The encoding/decoding order of the sub-blocks partitioned from the block may be determined according to at least one of partitioning directions.

For example, the encoding/decoding order of the sub-blocks partitioned in the horizontal direction may be determined as an order from an upper direction to a lower direction.

As another example, the encoding/decoding order of the sub-blocks partitioned in the vertical direction may be determined as an order from a left direction to a right direction.

In the partitioned sub-blocks, the coded block flag indicating whether at least one of the transform coefficients having a non-zero value is present may be entropy-encoded/decoded in sub-block units.

For example, the coded block flag may indicate that at least one of the transform coefficients having a non-zero value is present in at least one sub-block in sub-block units.

As another example, when the coded block flag is entropy-encoded/decoded in sub-block units, the coded block flag may not entropy-encoded/decoded in units of blocks before partitioning.

As another example, when the coded block flag is entropy-encoded/decoded in units of blocks before partitioning, the coded block flag may not be entropy-encoded/decoded in sub-block units.

For only the sub-block indicated by the sub-block position information, the residual signal may be entropy-encoded/decoded.

At this time, since the residual signal may be always present in the sub-block indicated by the sub-block position information, it may be inferred that the coded block flag indicates that at least one non-zero transform coefficient is present.

In addition, since the residual signal may not always present in the sub-block which is not indicated by the sub-block position information, it may be inferred that the coded block flag indicates that at least one non-zero transform coefficient is not present.

At least one of the area, size, shape, or partitioning direction of a coefficient group used when the transform coefficient is entropy-encoded/decoded may be determined based on at least one of the area, size, shape, or partitioning direction of the sub-block.

For example, when the area of the sub-block is 16, the area of the coefficient group may be determined as 16.

As another example, when the area of the sub-block is 32, the area of the coefficient group may be determined as 16.

As another example, when the size of the sub-block is 1×16 or 16×1, the size of the coefficient group may be determined as 1×16 or 16×1.

As another example, when the size of the sub-block is 2×8 or 8×2, the size of the coefficient group may be determined as 2×8 or 8×2.

As another example, when the size of the sub-block is 4×4, the size of the coefficient group may be determined as 4×4.

As another example, when the width of the sub-block is 2, the width of the coefficient group may be determined as 2.

As another example, when the width of the sub-block is 4, the width of the coefficient group may be determined as 4.

As another example, when the height of the sub-block is 2, the height of the coefficient group may be determined as 2.

As another example, when the height of the sub-block is 4, the height of the coefficient group may be determined as 4.

As another example, when the shape of the sub-block is a rectangle (non-square), the shape of the coefficient group may be determined as a rectangle (non-square).

As another example, when the shape of the sub-block is a square, the shape of the coefficient group may be determined as a square.

As another example, when the size of the sub-block is 16×4 and the form thereof is a rectangle, the size of the coefficient group may be determined as at least one of 4×4 or 8×2.

As another example, when the size of the sub-block is 4×8 and the form thereof is a rectangle, the size of the coefficient group may be determined as at least one of 4×4 or 2×8.

As another example, when the size of the sub-block is 32×4 and the form thereof is a rectangle, the size of the coefficient group may be determined as at least one of 4×4 or 8×2.

As another example, when the size of the sub-block is 8×64 and the form thereof is a rectangle, the size of the coefficient group may be determined as at least one of 4×4 or 2×8.

As another example, when the size of the sub-block is 16×4 and the partitioning direction is a vertical direction, the size of the coefficient group may be determined as 4×4.

As another example, when the size of the sub-block is 4×8 and the partitioning direction is a horizontal direction, the size of the coefficient group may be determined as 4×4.

As another example, when the size of the sub-block is 32×4 and the partitioning direction is a horizontal direction, the size of the coefficient group may be determined as 8×2.

As another example, when the size of the sub-block is 8×64 and the partitioning direction is a vertical direction, the size of the coefficient group may be determined as 2×8.

Meanwhile, the area of the coefficient group used when the transform coefficient is entropy-encoded/decoded may be determined as a predefined value. Here, the predefined value may be 4 or 16.

In addition, the area or size of the transform coefficient group may be determined based on the size of the current block regardless of the color component of the current block. At this time, the size of the current block may include at least one of the width or the height of the current block.

For example, when the width and height of the current block are 2, the size of the coefficient group may be determined as 2×2.

As another example, when the size of the current block is 2×4 or 4×2, the size of the coefficient group may be determined as 2×2.

Figure 38:
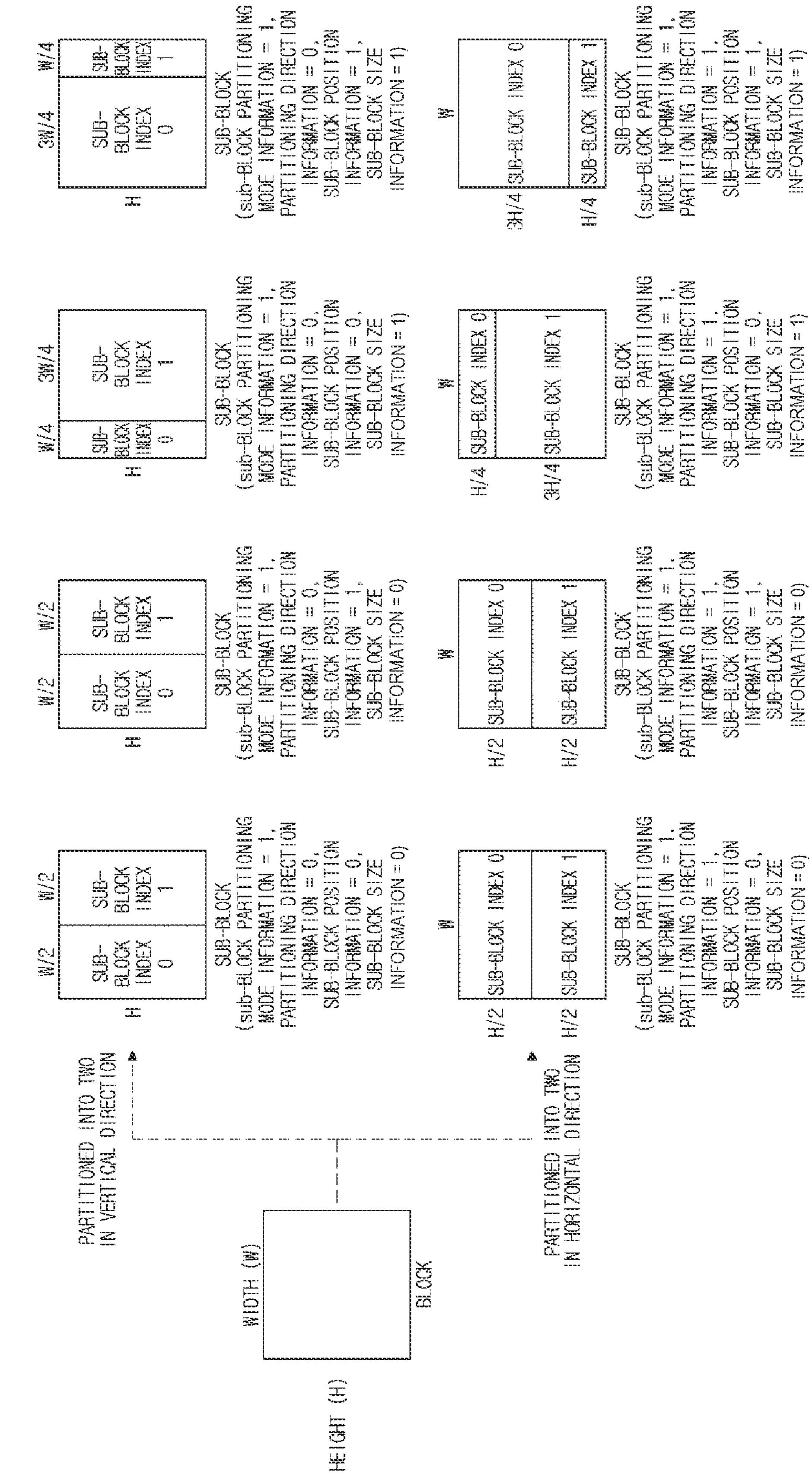
FIG. 38 is a diagram illustrating an embodiment of a second sub-block partitioning mode according to the present invention.

As in the example of FIG. 38, according to the embodiment of the second sub-block partitioning mode, the current block may be partitioned into two sub-blocks (4 or 4 of the height) in the horizontal direction, and may be partitioned into two sub-blocks (4 or 4 of the width) in the vertical direction. In the example of FIG. 38, a gray shade may mean a block in which the residual signal is encoded/decoded among sub-blocks, and the block may be indicated using the sub-block position information.

Sub-block partitioning mode use information indicating whether a mode in which the block is partitioned into N sub-blocks and at least one of prediction, transform/inverse transform, quantization/dequantization or entropy encoding/decoding is performed is used may be entropy-encoded/decoded in at least one of a parameter set or a header.

Here, the sub-block partitioning mode use information may mean at least one of the first sub-block partitioning mode or the second sub-block partitioning mode.

At this time, at least one of the parameter set or the header may be at least one of a video parameter set, a decoding parameter set, a sequence parameter set, an adaptation parameter set, a picture parameter set, a picture header, a slice header, a tile group header or a tile header.

For example, in order to indicate whether the sub-block partitioning mode is used within a video, the sub-block partitioning mode use information may be entropy-encoded/decoded in the video parameter set.

As another example, in order to indicate whether the sub-block partitioning mode is used within a decoding process, the sub-block partitioning mode use information may be entropy-encoded/decoded in the sequence parameter set.

As another example, in order to indicate whether the sub-block partitioning mode is used within a sequence, the sub-block partitioning mode use information may be entropy-encoded/decoded in the sequence parameter set.

As another example, in order to indicate whether the sub-block partitioning mode is used within several pictures, the sub-block partitioning mode use information may be entropy-encoded/decoded in the adaptation parameter set or the adaptation header.

As another example, in order to indicate whether the sub-block partitioning mode is used within a picture, the sub-block partitioning mode use information may be entropy-encoded/decoded in the picture parameter set or the picture header.

As another example, in order to indicate whether the sub-block partitioning mode is used within a slice, the sub-block partitioning mode use information may be entropy-encoded/decoded in the slice header.

As another example, in order to indicate whether the sub-block partitioning mode is used within a tile group, the sub-block partitioning mode use information may be entropy-encoded/decoded in the tile group header.

As another example, in order to indicate whether the sub-block partitioning mode is used within a tile, the sub-block partitioning mode use information may be entropy-encoded/decoded in the tile header.

Transform/inverse transform type of each block or sub-block may be determined using at least one of the following embodiments.

At least one of a one-dimensional transform type, a two-dimensional transform combination or whether to use transform for the block or the sub-block may be determined based on at least one of a prediction mode, an intra prediction mode, a color component, a size, a shape (form), sub-block partitioning related information, secondary transform performance information or matrix based intra prediction performance information for the block or the sub-block. The matrix based intra prediction may indicate an intra prediction based on the matrix For example, a one-dimensional transform type indicating at least one of a horizontal transform type or a vertical transform type may be determined based on at least one of a prediction mode, an intra prediction mode, a color component, a size, a shape (form), sub-block partitioning related information, secondary transform performance information or matrix based intra prediction performance information for the block or the sub-block.

As another example, a two-dimensional transform combination indicating a combination of a horizontal transform type and a vertical transform type may be determined based on at least one of an intra prediction mode, a prediction mode, a color component, a size, a shape or sub-block partitioning related information for the block or the sub-block.

As another example, information indicating whether to perform transform may be determined based on at least one of an intra prediction mode, a prediction mode, a color component, a size, a shape or sub-block partitioning related information for the block or the sub-block.

At this time, at least one of a one-dimensional transform type, a two-dimensional transform combination or whether to use transform may be different from each other according to at least one of an intra prediction mode, a prediction mode, a color component, a size, a shape or sub-block partitioning related information for the block or the sub-block.

In addition, when at least one of a one-dimensional transform type, a two-dimensional transform combination or whether to use transform used for the block or the sub-block is determined based on at least one of an intra prediction mode, a prediction mode, a color component, a size, a shape (form), sub-block partitioning related information, secondary transform performance information or matrix based intra prediction performance information for the block or the sub-block, information on a one-dimensional transform type, information on a two-dimensional transform combination or information as to whether to use transform may not be entropy-encoded/decoded.

That is, at least one of a one-dimensional transform type, a two-dimensional transform combination or whether to use transform for the block or the sub-block may be implicitly determined according to a predetermined rule in the encoder/decoder. The predetermined rule may be set based on the coding parameter in the encoder/decoder.

Here, matrix based intra prediction may mean an intra prediction mode in which at least one of a boundary averaging process, a matrix vector multiplication process or a linear interpolation process is performed to generate a prediction block.

Here, transform may mean at least one of transform or inverse transform.

In addition, the block may mean each sub-block partitioned from the block.

Primary transform may mean at least one of DCT-J or DST-K based integer transform, such as DCT-2, DCT-8, DST-7, DCT-4, or DST-4 which is performed with respect to a residual block to generate a transform coefficient. Here, J and K may be positive integers.

Primary transform may be performed using a transform matrix extracted from a transform matrix of at least one of DCT-J or DST-K based integer transform such as DCT-2, DCT-8, DST-7, DCT-4, or DST-4. That is, primary transform may be performed using the extracted transform matrix. In addition, at least one of the coefficients in the extracted transform matrix may be equal to at least one of the coefficients in the transform matrix of at least one of DCT-J or DST-K based integer transform such as DCT-2, DCT-8, DST-7, DCT-4 or DST-4. In addition, the extracted transform matrix may be included in a transform matrix to be extracted. In addition, the extracted transform matrix may be obtained by performing at least one of flipping or sign change with respect to specific coefficients in the transform matrix to be extracted.

For example, at least one of DCT-J or DST-K based integer transform such as DCT-8, DST-7, DCT-4, or DST-4 may be extracted from the transform matrix of DCT-2 and used for primary transform.

Here, at least one of DCT-J or DST-K based integer transform such as DCT-2, DCT-8, DST-7, DCT-4 or DST-4 may have a coefficient in a transform matrix different from at least one of DCT-J or DST-K based integer transform such as DCT-2, DCT-8, DST-7, DCT-4 or DST-4.

For example, a DCT-8 based integer transform matrix may be derived by performing at least one of horizontal flipping with respect to the DST-7 based integer transform matrix or sign change with respect to at least one of DST-7 transform matrix coefficients. At this time, vertical flipping may be used instead of horizontal flipping.

As another example, a DST-7 based integer transform matrix may be derived by performing at least one of horizontal flipping with respect to the DCT-8 based integer transform matrix or sign change with respect to at least one of DCT-8 transform matrix coefficients. At this time, vertical flipping may be used instead of horizontal flipping.

As another example, a DCT-4 based integer transform matrix may be derived by performing at least one of horizontal flipping with respect to the DST-4 based integer transform matrix or sign change with respect to at least one of DST-4 transform matrix coefficients. At this time, vertical flipping may be used instead of horizontal flipping.

As another example, a DST-4 based integer transform matrix may be derived by performing at least one of horizontal flipping with respect to the DCT-4 based integer transform matrix or sign change with respect to at least one of DCT-4 transform matrix coefficients. At this time, vertical flipping may be used instead of horizontal flipping.

Secondary transform may mean at least one of transform for rotating at least one of transform coefficients based on an angle. Secondary transform may be performed after primary transform.

In the encoder, secondary transform may be performed with respect to the coefficients of a low-frequency region of an upper left side of the transform coefficient subjected to primary transform. The size of the low-frequency region, to which secondary transform is applied, may be determined based on the size of the transform block.

In the decoder, secondary inverse transform may be performed before primary inverse transform is performed. In the following description, secondary transform may include secondary inverse transform.

Secondary transform may be referred to as LFNST (Low Frequency Non-Separable Transform) because a non-separable transform kernel is used rather than a horizontal and vertical separable transform kernel (or type).

Secondary transform may be performed only for an intra prediction encoding/decoding, and a secondary transform kernel may be determined based on an intra prediction mode. Specifically, a transform set including a plurality of transform kernel may be determined based on the intra prediction mode. In addition, a transform kernel which will be applied to secondary transform may be determined in a transform set determined based on index information. Here, the transform set may include four types of transform sets.

In addition, when the intra prediction mode of the current block is a CCLM mode, a transform set for a chroma block may be determined based on the intra prediction mode of a luma block corresponding to the chroma block. Here, when the luma block corresponding to the chroma block is in a matrix based intra prediction mode, this may be regarded as a PLANAR mode and the transform set for the chroma block may be determined. In addition, when the luma block corresponding to the chroma block is in an IBC mode, this may be regarded as a DC mode and the transform set for the chroma block may be determined.

As another example, when the luma block corresponding to the chroma block is in a matrix based intra prediction mode, an IBC mode, or a palette mode, this may be regarded as a PLANAR mode and the transform set for the chroma block may be determined.

As another example, when the luma block corresponding to the chroma block is in a matrix based intra prediction mode, an IBC mode, or a palette mode, this may be regarded as a DC mode and the transform set for the chroma block may be determined.

In addition, a secondary transform kernel in the transform set may be determined using secondary transform index information. Here, the secondary transform kernel may indicate a secondary transform matrix.

Whether to use transform may mean whether to use at least one of primary transform or secondary transform in the residual block. Whether to use transform may include at least one of whether to use primary transform or whether to use secondary transform. Whether to use transform may indicate whether to apply the transform skip mode. Also, transform_skip_flag may indicate the transform skip flag.

For example, when transform_skip_flag which is information indicating whether to use at least one of primary transform or secondary transform has a first value (e.g., 0), this may indicate that at least one of primary transform or secondary transform is used.

As another example, when transform_skip_flag which is information indicating whether to use at least one of primary transform or secondary transform has a second value (e.g., 1), this may indicate that at least one of primary transform or secondary transform is not used.

The one-dimensional transform type may mean the type of primary transform and mean a horizontal transform type trTypeHor or a vertical transform type trTypeVer for at least one of the DCT-J or DST-K based integer transform type. Here, J and K may be positive integers.

As the type of primary transform, first transform to N-th transform may be used. Here, N may be a positive integer of 2 or more.

For example, first transform may mean DCT-2 based integer transform.

As another example, when first transform is used for horizontal transform and vertical transform, trTypeHor which is a transform type for horizontal transform and trTypeVer which is a transform type for vertical transform may have values Q and R, respectively. Here, Q and R may be at least one of a negative integer, 0 or a positive integer. For example, Q and R may be 0 and 0, respectively.

For example, when trTypeHor has a first value, this may mean DCT-2 based integer horizontal transform.

As another example, when trTypeVer has a first value, this may mean DCT-2 based integer vertical transform.

The first value may be 0.

For example, second transform may mean at least one of DCT-J or DST-K based integer transform, such as DCT-8, DST-7, DCT-4, or DST-4, other than DCT-2. Here, J and K may be positive integers. That is, second transform may mean at least one of transforms other than first transform.

As another example, when second transform is used for at least one of horizontal transform or vertical transform, trTypeHor which is a transform type for horizontal transform and trTypeVer which is a transform type for vertical transform may have values T and U, respectively. Here, T and U may be at least one of a negative integer, 0 or a positive integer. For example, T and U may be a value equal to or greater than 1 and a value equal to or greater than 1, respectively. In addition, T and U may be greater than Q and R, respectively.

For example, when trTypeHor has a second value, this may mean DST-7 based integer horizontal transform.

As another example, when trTypeHor has a third value, this may mean DCT-8 based integer horizontal transform.

As another example, when trTypeVer has a second value, this may mean DST-7 based integer vertical transform.

As another example, when trTypeVer has a third value, this may mean DCT-8 based integer vertical transform.

The second value may be 1. In addition, the third value may be 2.

Instead of DST-7, DST-4 may be used. In addition, instead of DCT-8, DCT-4 may be used.

For example, first transform may be DCT-2 based integer transform. In addition, second transform may be DST-7 based integer transform. In addition, third transform may be DCT-8 based integer transform. In addition, second transform may mean at least one of second transform or third transform.

As another example, first transform may be DCT-2 based integer transform. In addition, second transform may be DST-4 based integer transform. In addition, third transform may be DCT-4 based integer transform. In addition, second transform may mean at least one of second transform or third transform.

That is, first transform may be DCT-2 based integer transform, and second transform to N-th transform may mean at least one of DCT-J or DST-K based integer transform such as DCT-8, DST-7, DCT-4 or DST-4, other than DCT-2. Here, N may be a positive integer equal to or greater than 3.

For example, first transform may be DCT-2 based integer transform. In addition, second transform may be DST-7 based integer transform extracted from DCT-2 based integer transform matrix. In addition, third transform may be DCT-8 based integer transform extracted from DCT-2 based integer transform matrix. In addition, second transform may mean at least one of second transform or third transform.

As another example, first transform may be DCT-2 based integer transform. In addition, second transform may be DST-4 based integer transform extracted from DCT-2 based integer transform matrix. In addition, third transform may be DCT-4 based integer transform extracted from DCT-2 based integer transform matrix. In addition, second transform may mean at least one of second transform or third transform.

That is, first transform may be DCT-2 based integer transform, and second transform to N-th transform may mean at least one of DCT-J or DST-K based integer transform, such as DCT-8, DST-7, DCT-4 or DST-4, extracted from DCT-2 based integer transform matrix. Here, N may be a positive integer equal to or greater than 3. In addition, second transform may mean at least one of second transform to N-th transform.

Instead of DCT-2, at least one of DCT-J or DST-K based integer transform such as DCT-8, DST-7, DCT-4, or DST-4 may be used.

The two-dimensional transform combination may mean a combination of primary transforms and mean a combination of a horizontal transform type trTypeHor and a vertical transform type trTypeVer for at least one of DCT-J or DST-K based integer transform type. In addition, the two-dimensional transform combination may mean mts_idx which is a multi-transform selection index.

For example, when first transform is used for horizontal transform and vertical transform, mts_idx which is a multi-transform selection index may have a value of P. Here, P may be at least one of a negative integer, 0 or a positive integer. For example, P may be 0.

For example, when mts_idx is 0, trTypeHor and trTypeVer may have a first value (e.g., 0), respectively. That is, when mts_idx is 0, this may mean DCT-2 based integer horizontal transform and DCT-2 based integer vertical transform.

As another example, when second transform is used for at least one of horizontal transform or vertical transform, mts_idx which is a multi-transform selection index may have a value of S or more. Here, S may be at least one of a negative integer, 0 or a positive integer. For example, S may be 1. In addition, S may be greater than P.

For example, when mts_idx is 1, trTypeHor and trTypeVer may have a second value (e.g., 1), respectively.

As another example, when mts_idx is 2, trTypeHor and trTypeVer may have a third value (e.g., 2) and a second value (e.g., 1), respectively.

As another example, when mts_idx is 3, trTypeHor and trTypeVer may have a second value (e.g., 1) and a third value (e.g., 2), respectively.

As another example, when mts_idx is 4, trTypeHor and trTypeVer may have a third value (e.g., 3), respectively.

For example, when trTypeHor has a second value, this may mean DST-7 based integer horizontal transform.

For another example, when trTypeHor has a third value, this may mean DCT-8 based integer horizontal transform.

For another example, when trTypeVer has a second value, this may mean DST-7 based integer vertical transform.

For another example, when trTypeVer has a third value, this may mean DCT-8 based integer vertical transform.

The second value may be 1. In addition, the third value may be 2.

In the above embodiment, instead of DST-7, DST-4 may be used. In addition, instead of DCT-8, DCT-4 may be used.

For example, in first transform, horizontal transform and vertical transform may be DCT-2 based integer transform, respectively. In addition, in second transform, horizontal transform and vertical transform may be DST-7 and DST-7 based integer transforms, respectively. In addition, in third transform, horizontal transform and vertical transform may be DCT-8 and DST-7 based integer transforms, respectively. In addition, in fourth transform, horizontal transform and vertical transform may be DST-7 and DCT-8 based integer transforms, respectively. In addition, in fifth transform, horizontal transform and vertical transform may be DCT-8 and DCT-8 based integer transforms, respectively. In addition, second transform may mean at least one of second transform, third transform, fourth transform or fifth transform.

As another example, in first transform, horizontal transform and vertical transform may be DCT-2 based integer transform, respectively. In addition, in second transform, horizontal transform and vertical transform may be DST-4 and DST-4 based integer transforms, respectively. In addition, in third transform, horizontal transform and vertical transform may be DCT-4 and DST-4 based integer transforms, respectively. In addition, in fourth transform, horizontal transform and vertical transform may be DST-4 and DCT-4 based integer transforms, respectively. In addition, in fifth transform, horizontal transform and vertical transform may be DCT-4 and DCT-4 based integer transforms, respectively. In addition, second transform may mean at least one of second transform, third transform, fourth transform or fifth transform.

That is, in first transform, horizontal transform and vertical transform may be respectively DCT-2 based integer transform, and, in second transform to N-th transform, horizontal transform and vertical transform may mean at least one of DCT-J or DST-K based integer transform such as DCT-8, DST-7, DCT-4 or DST-4, other than DCT-2. Here, N may be an integer equal to or greater than 3.

For example, in first transform, horizontal transform and vertical transform may be DCT-2 based integer transform, respectively. In addition, in second transform, horizontal transform and vertical transform may be DST-7 and DST-7 based integer transforms extracted from the DCT-2 based integer transform matrix, respectively. In addition, in third transform, horizontal transform and vertical transform may be DCT-8 based integer transform extracted from the DCT-2 based integer transform matrix and DST-7 based integer transform extracted from the DCT-2 based integer transform matrix, respectively. In addition, in fourth transform, horizontal transform and vertical transform may be DST-7 based integer transform extracted from the DCT-2 based integer transform matrix and DCT-8 based integer transform extracted from the DCT-2 based integer transform matrix, respectively. In addition, in fifth transform, horizontal transform and vertical transform may be DCT-8 and DCT-8 based integer transforms extracted from the DCT-2 based integer transform matrix, respectively. In addition, second transform may mean at least one of second transform, third transform, fourth transform or fifth transform.

As another example, in first transform, horizontal transform and vertical transform may be DCT-2 based integer transform, respectively. In addition, in second transform, horizontal transform and vertical transform may be DST-4 and DST-4 based integer transforms extracted from the DCT-2 based integer transform matrix, respectively. In addition, in third transform, horizontal transform and vertical transform may be DCT-4 based integer transform extracted from the DCT-2 based integer transform matrix and DST-4 based integer transform extracted from the DCT-2 based integer transform matrix, respectively. In addition, in fourth transform, horizontal transform and vertical transform may be DST-4 based integer transform extracted from the DCT-2 based integer transform matrix and DCT-4 based integer transform extracted from the DCT-2 based integer transform matrix, respectively. In addition, in fifth transform, horizontal transform and vertical transform may be DCT-4 and DCT-4 based integer transforms extracted from the DCT-2 based integer transform matrix. In addition, second transform may mean at least one of second transform, third transform, fourth transform or fifth transform.

That is, in first transform, horizontal transform and vertical transform may be respectively DCT-2 based integer transform, and, in second transform to N-th transform, horizontal transform and vertical transform may mean at least one of DCT-J or DST-K based integer transform such as DCT-8, DST-7, DCT-4 or DST-4 extracted from the DCT-2 based integer transform matrix. Here, N may be a positive integer equal to or greater than 3. In this case, second transform may mean at least one of second transform to N-th transform.

Instead of DCT-2 transform, at least one of DCT-J or DST-K based integer transform such as DCT-8, DST-7, DCT-4, or DST-4 may be used.

The prediction mode may mean the prediction mode of the block and mean which of the intra prediction mode, the inter prediction mode and the IBC (Intra Block Copy) mode is used to perform encoding/decoding.

For example, when, in a specific mode, both intra prediction and inter prediction are performed to generate a prediction block, the specific mode may mean an inter prediction mode.

For example, when, in the specific mode, a current image is used as a reference image and a vector is used for prediction, the specific mode may mean an intra block copy prediction mode. The intra block copy prediction mode may be an IBC mode. Here, the IBC mode may mean a mode in which a reference region is set within the current image/slice/tile/tile group/CTU, a position in the reference region is indicated by a block vector, and prediction is performed using a region indicated by the block vector.

The color component may mean the color component of the block and may mean a luma (Y) or chroma component.

For example, the chroma component may mean at least one of a Cb component or a Cr component. That is, the color component may mean the Y component, the Cb component, or the Cr component.

As another example, the color component may mean at least one of an R component, a G component, or a B component.

As another example, when an image is decomposed into multiple components and is encoded/decoded, the color component may mean the decomposed components.

The sub-block partitioning related information may mean information indicating that the block is partitioned into a plurality of sub-blocks.

For example, the sub-block partitioning related information may include at least one of sub-block partitioning mode information or partitioning direction information.

As another example, the sub-block partitioning related information may include at least one of sub-block partitioning mode information, partitioning direction information, sub-block position information or sub-block size information.

The size may mean at least one of a block size, a sub-block size or a transform size. Here, the size may mean at least one of a width, a height or a combination of the width and the height.

The transform size may mean a transform size used in the corresponding block. The transform size may be less than or equal to the block size.

The size may be M×N such as 2×2, 4×2, 2×4, 4×4, 8×4, 8×2, 2×8, 8×8, 8×8, 16×8, 16×4, 16×2, 2×16, 4×16, 8×16, 16×16, 32×16, 32×8, 32×4, 32×2, 2×32, 4×32, 8×32, 16×32, 32×32, 64×32, 64×16, 64×8, 64×4, 64×2, 2×64, 4×64, 8×64, 16×64, 32×64, 64×64, 128×64, 128×32, 32×128, 64×128 or 128×128. Here, M and N may be positive integers and may be the same or different. In addition, M may be S*N. N may be S*M. Here, S may be a positive integer.

Here, M may mean a width and N may mean a height.

For example, in the case of a block having a size of 64×64, transform having a size of 32×32 may be performed in an upper left region of the block. At this time, a quantization matrix having a size of 32×32 may be used.

As another example, in the case of a block having a size of 64×32, transform having a size of 32×32 may be performed in an upper left region of the block. At this time, a quantization matrix having a size of 32×32 may be used.

As another example, in the case of a block having a size of 32×64, transform having a size of 16×32 may be performed in an upper left region of the block. At this time, a quantization matrix having a size of 16×32 may be used.

As another example, in the case of a block having a size of 32×32, transform having a size of 32×32 may be performed in the block. At this time, a quantization matrix having a size of 32×32 may be used.

The form (or shape) may mean at least one of the form of a block, the form of a sub-block or the form of transform.

The form may be a square or a non-square form.

The square form may mean a square form.

The non-square form may mean a rectangular form.

The form of transform may mean the form of transform used in the corresponding block. When a horizontal transform size and a vertical transform size are different from each other, the form of transform may be a non-square. In addition, when a horizontal transform size and a vertical transform size are the same, the form of transform may be a square. The form of transform may be equal to or different from that of the corresponding block.

The form of the quantization matrix may mean the form of the quantization matrix used in the corresponding block. When a horizontal transform size and a vertical transform size are different from each other, the form of the quantization matrix may be a non-square. In addition, when a horizontal transform size and a vertical transform size are the same, the form of the quantization matrix may be a square. The form of the quantization matrix may be equal to or different from that of the corresponding block. The form of the quantization matrix may be equal to or different from that of transform.

For example, in the case of a square block having a size of 64×64, square transform having a size of 32×32 may be performed in the upper left region of the block. At this time, a square quantization matrix having a size of 32×32 may be used.

As another example, in the case of a square block having a size of 16×16, square transform having a size of 16×16 may be performed in the block. At this time, a square quantization matrix having a size of 16×16 may be used.

As another example, in the case of a non-square block having a size of 16×4, non-square transform having a size of 16×4 may be performed in the block. At this time, a quantization matrix having a size of 16×4 may be used.

As another example, in the case of a non-square block having a size of 2×8, transform having a size of 2×8 may be performed in the block. At this time, a quantization matrix having a size of 2×8 may be used.

The following shows a first embodiment in which at least one of a one-dimensional transform type, a two-dimensional transform combination or whether to use transform for the block or the sub-block is determined. Here, a one-dimensional transform type of at least one of horizontal transform or vertical transform for the block or the sub-block may be determined.

When the width W or height H of the block or the sub-block is less than X, a horizontal transform type trTypeHor or a vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, a horizontal transform type trTypeHor or a vertical transform type trTypeVer may be determined as first transform indicating DCT-2 based integer transform.

Here, Y may be a positive integer, and may be 16, 32, or 64, for example.

When the width or height of the block or the sub-block is greater than or equal to X or is less than or equal to Y, a horizontal transform type trTypeHor or a vertical transform type trTypeVer may be determined as second transform indicating DST-7 based integer transform.

At this time, second transform may mean that trTypeHor or trTypeVer has a second value.

Here, the second value may be 1. Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

Here, all sub-blocks partitioned from the block may be transformed using the same horizontal transform type or the same vertical transform type.

In addition, a one-dimensional transform type for at least one of horizontal transform or vertical transform for the block or the sub-block may be determined regardless of the intra prediction mode. That is, the transform type for at least one of horizontal transform or vertical transform for the block or the sub-block may be determined regardless of the intra prediction mode. The transform type may be selected from at least two transform types.

When the current block is in the sub-block partitioning mode, the transform type for at least one of horizontal transform or vertical transform may be determined based on the width or height of the current block regardless of the intra prediction mode. Here, the sub-block partitioning mode may be a first sub-block partitioning mode (ISP mode) or a second sub-block partitioning mode (SBT mode).

As in the example of Table 20, at least one of the horizontal transform type trTypeHor or the vertical transform type trTypeVer for the block or the sub-block may be determined.

TABLE 20

| trTypeHor | trTypeVer |
|---|---|
| (W>=4 && W<=16)? 1:0 | (H>=4 && H<=16)? 1:0 |

For example, when the current block is in the sub-block partitioning mode, the transform type for at least one of horizontal transform or vertical transform may be determined based on Table 20 regardless of the intra prediction mode.

In addition, in order to reduce implementation complexity of the encoder/decoder, the one-dimensional transform type for horizontal transform and vertical transform may be determined on the same criterion according to the width of the block and the height of the block.

Conditions for determining horizontal transform and vertical transform may be the same regardless of the width of the block or the height of the block. That is, the condition for determining horizontal transform and the condition for determining vertical transform may be the same.

The above conditions may mean comparison between the width or height of the current block and a specific positive integer.

Here, since logic for the conditions for determining horizontal transform and vertical transform may be shared, it is possible to reduce implementation complexity of the encoder/decoder.

In addition, as shown in the example of Table 20, the transform type for at least one of horizontal transform or vertical transform used in the sub-block may be determined without performing comparison between the width and height of the current block, in order to reduce computational complexity.

As compared to Tables 23 and 24 below, in Table 20, since the transform type for at least one of horizontal transform or vertical transform used in the sub-block may be determined without performing comparison between the width and height of the current block, it is possible to reduce computational complexity.

The following shows a second embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined as second transform indicating DCT-8 based integer transform.

At this time, second transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

Here, all sub-blocks partitioned from the block may be transformed using the same horizontal transform type or the same vertical transform type. In addition, the one-dimensional transform type for at least one of horizontal transform or vertical transform for the block or the sub-block may be determined regardless of the intra prediction mode.

As in the example of Table 21, at least one of the horizontal transform type trTypeHor or the vertical transform type trTypeVer for the block or the sub-block may be determined.

TABLE 21

| trTypeHor | trTypeVer |
|---|---|
| (W>=4 && W<=16)? 2:0 | (H>=4 && H<=16)? 2:0 |

The following shows a third embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

At least one of the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

In addition, when the width or height of the block or the sub-block is Z, horizontal transform or vertical transform may not be performed.

Here, Z may be a positive integer including 0, and may be 1, for example.

Here, all sub-blocks partitioned from the block may be transformed using the same horizontal transform type or the same vertical transform type. In addition, the one-dimensional transform type for at least one of horizontal transform or vertical transform for the block or the sub-block may be determined regardless of the intra prediction mode.

As shown in the example of Table 22, at least one of the horizontal transform type trTypeHor or the vertical transform type trTypeVer for the block or the sub-block may be determined.

TABLE 22

| trTypeHor | trTypeVer |
|---|---|
| 0 | 0 |

The following shows a fourth embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may indicate that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the width is less than or equal to the height, the horizontal transform type may be determined as second transform indicating DST-7 based integer transform. Otherwise, the horizontal transform type may be determined as first transform indicating DCT-2 based integer transform.

When the height is less than or equal to the width, the vertical transform type may be determined as second transform indicating DST-7 based integer transform. Otherwise, the horizontal transform type may be determined as first transform indicating DCT-2 based integer transform.

At this time, second transform may mean that trTypeHor or trTypeVer has a second value. Here, the second value may be 1.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

Here, all sub-blocks partitioned from the block may be transformed using the same horizontal transform type or the same vertical transform type. In addition, the one-dimensional transform type for at least one of horizontal transform or vertical transform for the block or the sub-block may be determined regardless of the intra prediction mode.

As in the example of Table 23, at least one of the horizontal transform type trTypeHor or the vertical transform type trTypeVer for the block or the sub-block may be determined.

TABLE 23

| trTypeHor | trTypeVer |
|---|---|
| (W>=4 && W<=16)?<br>( (W<=H) ?1:0):0<br>or<br>(W>=4 && W<=16 && W<=H)?<br>1:0 | (H>=4 && H<=16)?<br>( (H<=W) ?1:0):0<br>or<br>(H>=4 && H<=16 && H<=W)?<br>1:0 |

The following shows a fifth embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the width is less than or equal to the height, the horizontal transform type may be determined as first transform indicating DCT-2 based integer transform. Otherwise, the horizontal transform type may be determined as second transform indicating DST-7 based integer transform.

When the height is less than or equal to the width, the vertical transform type may be determined as first transform indicating DCT-2 based integer transform. Otherwise, the horizontal transform type may be determined as second transform indicating DST-7 based integer transform.

At this time, second transform may mean that trTypeHor or trTypeVer has a second value. Here, the second value may be 1.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

Here, all sub-blocks partitioned from the block may be transformed using the same horizontal transform type or the same vertical transform type. In addition, the one-dimensional transform type for at least one of horizontal transform or vertical transform for the block or the sub-block may be determined regardless of the intra prediction mode.

As in the example of Table 24, at least one of the horizontal transform type trTypeHor or the vertical transform type trTypeVer for the block or the sub-block may be determined.

TABLE 24

| trTypeHor | trTypeVer |
|---|---|
| (W>=4 && W<=16)? ( (W<=H) ?0:1):0 | (H>=4 && H<=16)? ( (H<=W) ?0:1):0 |

The following shows a sixth embodiment in which at least one of a one-dimensional transform type, a two-dimensional transform combination or whether to use transform for the block or the sub-block is determined. Here, the two-dimensional transform combination for horizontal transform and vertical transform for the block or the sub-block may be determined.

mts_idx which is a multi-transform selection index may be entropy-encoded/decoded to determine the two-dimensional transform combination of the block or the sub-block. The horizontal transform type trTypeHor and the vertical transform type trTypeVer may be determined using the two-dimensional transform combination table predetermined in the encoder and the decoder. At this time, the two-dimensional transform combination may mean each item in a two-dimensional transform combination table.

mts_idx which is the multi-transform selection index may be entropy-encoded/decoded when the block is not partitioned into sub-blocks. The multi-transform selection index mts_idx may be determined based on lfnst_idx, that is, secondary transform performance information. In other words, the multi-transform selection index mts_idx may be entropy encoded/decoded based on lfnst_idx, that is, secondary transform performance information.

When the multi-transform selection index mts_idx is not present in a bitstream, the multi-transform selection index mts_idx may be inferred to be a first value (for example, 0). In other words, when the multi-transform selection index mts_idx is not entropy encoded/decoded, the multi-transform selection index mts_idx may be inferred to be a first value (for example, 0).

According to an embodiment, whether or not the multi-transform selection index mts_idx is signaled may be determined based on at least one of intra prediction explicit multi-transform selection enabled information (sps_explicit_mts_intra_enabled_flag) and inter prediction explicit multi-transform selection enabled information (sps_explicit_mts_inter_enabled_flag). For example, when a current block is intra predicted and intra prediction explicit multi-transform selection enabled information indicates that multi-transform is enabled for an intra prediction block, a multi-transform selection index for the current block may be signaled. On the contrary, when intra prediction explicit multi-transform selection enabled information indicates that multi-transform is not enabled for an intra prediction block, a multi-transform selection index for the current block may not be signaled.

In addition, when a current block is inter predicted and inter prediction explicit multi-transform selection enabled information indicates that multi-transform is enabled for an inter prediction block, a multi-transform selection index for the current block may be signaled. On the contrary, when inter prediction explicit multi-transform selection enabled information indicates that multi-transform is not enabled for an inter prediction block, a multi-transform selection index for the current block may not be signaled.

In addition, when a current block is predicted according to an IBC mode, whether or not a multi-transform selection index is signaled may be determined according to intra prediction explicit multi-transform selection enabled information and/or inter prediction explicit multi-transform selection enabled information. In addition, when a current block is predicted according to an IBC mode, a multi-transform selection index for the current block may not be signaled irrespective of intra prediction explicit multi-transform selection enabled information and inter prediction explicit multi-transform selection enabled information. Herein, when a current block is predicted according to an IBC mode, secondary transform/inverse transform may not be performed for the current block. In addition, when a current block is not an IBC mode and/or inter-prediction mode but an intra-prediction mode, secondary transform/inverse transform may be performed for the current block.

As in the example of Table 25, at least one of the horizontal transform type trTypeHor or the vertical transform type trTypeVer for the block or the sub-block may be determined. As in the example of Table 25, the two-dimensional transform combination table may be predetermined and the two-dimensional transform combination indicated by the multi-transform selection index may be determined.

TABLE 25

| | | | | | |
|---|---|---|---|---|---|
| mts_idx[x0] [ y0 ] | 0 | 1 | 2 | 3 | 4 |
| trTypeHor | 0 | 1 | 2 | 1 | 2 |
| trTypeVer | 0 | 1 | 1 | 2 | 2 |

The following shows a seventh embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the partitioning direction information has a first value (0) and the sub-block position information has a first value (0), the horizontal transform type may be determined as third transform indicating DCT-8 based integer transform, and the vertical transform type may be determined as second transform indicating DST-7 based integer transform.

When the partitioning direction information has a first value (0) and the sub-block position information has a second value (1), the horizontal transform type may be determined as second transform indicating DST-7 based integer transform, and the vertical transform type may be determined as second transform indicating DST-7 based integer transform.

When the partitioning direction information has a second value (1) and the sub-block position information has a first value (0), the horizontal transform type may be determined as second transform indicating DST-7 based integer transform, and the vertical transform type may be determined as third transform indicating DCT-8 based integer transform.

When the partitioning direction information has a second value (1) and the sub-block position information has a second value (1), the horizontal transform type may be determined as second transform indicating DST-7 based integer transform, and the vertical transform type may be determined as second transform indicating DST-7 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 26, at least one of the horizontal transform type trTypeHor or the vertical transform type trTypeVer for the block or the sub-block may be determined.

TABLE 26

| partitioning direction information | sub-block position information | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

The following shows an eighth embodiment in which at least one of a one-dimensional transform type, a two-dimensional transform combination, and whether to use transform for the block or the sub-block is determined. Here, the one-dimensional transform type for horizontal transform and vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the partitioning direction information has a first value (0) and the sub-block position information has a first value (0), the horizontal transform type may be determined as first transform indicating DCT-2 based integer transform, and the vertical transform type may be determined as second transform indicating DST-7 based integer transform.

When the partitioning direction information has a first value (0) and the sub-block position information has a second value (1), the horizontal transform type may be determined as second transform indicating DST-7 based integer transform, and the vertical transform type may be determined as second transform indicating DST-7 based integer transform.

When the partitioning direction information has a second value (1) and the sub-block position information has a first value (0), the horizontal transform type may be determined as second transform indicating DST-7 based integer transform, and the vertical transform type may be determined as first transform indicating DCT-2 based integer transform.

When the partitioning direction information has a second value (1) and the sub-block position information has a second value (1), the horizontal transform type may be determined as second transform indicating DST-7 based integer transform, and the vertical transform type may be determined as second transform indicating DST-7 based integer transform.

At this time, second transform may mean that trTypeHor or trTypeVer has a second value. Here, the second value may be 1.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 27, at least one of the horizontal transform type trTypeHor or the vertical transform type trTypeVer for the block or the sub-block may be determined.

TABLE 27

| partitioning direction information | sub-block position information | trTypeHor | trTypeVer |
|---|---|---|---|
| 0 | 0 | 0 | 1 |
| 0 | 1 | 1 | 1 |
| 1 | 0 | 1 | 0 |
| 1 | 1 | 1 | 1 |

The following shows a ninth embodiment in which at least one of a one-dimensional transform type, a two-dimensional transform combination, and whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the sub-block size information has a first value (0), the partitioning direction information has a first value (0) and the sub-block position information has a first value (0), the horizontal transform type may be determined as third transform indicating DCT-8 based integer transform, and the vertical transform type may be determined as second transform indicating DST-7 based integer transform.

When the sub-block size information has a first value (0), the partitioning direction information has a first value (0) and the sub-block position information has a second value (1), the horizontal transform type may be determined as second transform indicating DST-7 based integer transform, and the vertical transform type may be determined as second transform indicating DST-7 based integer transform.

When the sub-block size information has a first value (0) the partitioning direction information has a second value (1) and the sub-block position information has a first value (0), the horizontal transform type may be determined as second transform indicating DST-7 based integer transform, and the vertical transform type may be determined third transform indicating DCT-8 based integer transform.

When the sub-block size information has a first value (0), the partitioning direction information has a second value (1) and the sub-block position information has a second value (1), the horizontal transform type may be determined as second transform indicating DST-7 based integer transform, the vertical transform type may be determined as second transform indicating DST-7 based integer transform.

When the sub-block size information has a second value (1), the partitioning direction information has a first value (0) and the sub-block position information has a first value (0), the horizontal transform type may be determined as first transform indicating DCT-2 based integer transform, and the vertical transform type may be determined as second transform indicating DST-7 based integer transform.

When the sub-block size information has a second value (1), the partitioning direction information has a first value (0) and the sub-block position information has a second value (1), the horizontal transform type may be determined as second transform indicating DST-7 based integer transform, and the vertical transform type may be determined as second transform indicating DST-7 based integer transform.

When the sub-block size information has a second value (1), the partitioning direction information has a second value (1) and the sub-block position information has a first value (0), the horizontal transform type may be determined as second transform indicating DST-7 based integer transform, and the vertical transform type may be determined as first transform indicating DCT-2 based integer transform.

When the sub-block size information has a second value (1), the partitioning direction information has a second value (1) and the sub-block position information has a second value (1), the horizontal transform type may be determined as second transform indicating DST-7 based integer transform, and the vertical transform type may be determined as second transform indicating DST-7 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 28, at least one of the horizontal transform type trTypeHor or the vertical transform type trTypeVer for the block or the sub-block may be determined.

TABLE 28

| sub-block size information | partitioning direction information | sub-block position information | trTypeHor | trTypeVer |
|---|---|---|---|---|
| 0 | 0 | 0 | 2 | 1 |
| 0 | 0 | 1 | 1 | 1 |
| 0 | 1 | 0 | 1 | 2 |
| 0 | 1 | 1 | 1 | 1 |
| 1 | 0 | 0 | 0 | 1 |
| 1 | 0 | 1 | 1 | 1 |
| 1 | 1 | 0 | 1 | 0 |
| 1 | 1 | 1 | 1 | 1 |

The following shows a tenth embodiment in which at least one of a one-dimensional transform type, a two-dimensional transform combination, and whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the sub-block size information has a first value (0), the partitioning direction information has a first value (0) and the sub-block position information has a first value (0), the horizontal transform type may be determined as first transforming indicating DCT-2 based integer transform, and the vertical transform type may be determined as second transform indicating DST-7 based integer transform.

When the sub-block size information has a first value (0), the partitioning direction information has a first value (0) and the sub-block position information has a second value (1), the horizontal transform type may be determined as second transform indicating DST-7 based integer transform, and the vertical transform type may be determined as second transform indicating DST-7 based integer transform.

When the sub-block size information has a first value (0), the partitioning direction information has a second value (1) and the sub-block position information has a first value (0), the horizontal transform type may be determined as second transform indicating DST-7 based integer transform, and the vertical transform type may be determined as first transform indicating DCT-2 based integer transform.

When the sub-block size information has a first value (0), the partitioning direction information has a second value (1) and the sub-block position information has a second value (1), the horizontal transform type may be determined as second transform indicating DST-7 based integer transform, and the vertical transform type may be determined as second transform indicating DST-7 based integer transform.

When the sub-block size information has a second value (1), the partitioning direction information has a first value (0) and the sub-block position information has a first value (0), the horizontal transform type may be determined as third transform indicating DCT-8 based integer transform, and the vertical transform type may be determined as second transform indicating DST-7 based integer transform.

When the sub-block size information has a second value (1), the partitioning direction information has a first value (0) and the sub-block position information has a second value (1), the horizontal transform type may be determined as second transform indicating DST-7 based integer transform, and the vertical transform type may be determined as second transform indicating DST-7 based integer transform.

When the sub-block size information has a second value (1), the partitioning direction information has a second value (1) and the sub-block position information has a first value (0), the horizontal transform type may be determined as second transform indicating DST-7 based integer transform, and the vertical transform type may be determined as third transform indicating DCT-8 based integer transform.

When the sub-block size information has a second value (1), the partitioning direction information has a second value (1) and the sub-block position information has a second value (1), the horizontal transform type may be determined as second transform indicating DST-7 based integer transform, and the vertical transform type may be determined as second transform indicating DST-7 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 29, at least one of the horizontal transform type trTypeHor or the vertical transform type trTypeVer for the block or the sub-block may be determined.

TABLE 29

| sub-block size information | partoning direction information | sub-block position information | trTypeHor | trTypeVer |
|---|---|---|---|---|
| 0 | 0 | 0 | 0 | 1 |
| 0 | 0 | 1 | 1 | 1 |
| 0 | 1 | 0 | 1 | 0 |
| 0 | 1 | 1 | 1 | 1 |
| 1 | 0 | 0 | 2 | 1 |
| 1 | 0 | 1 | 1 | 1 |
| 1 | 1 | 0 | 1 | 2 |
| 1 | 1 | 1 | 1 | 1 |

The following shows an eleventh embodiment in which at least one of a one-dimensional transform type, a two-dimensional transform combination, and whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the partitioning direction information has a first value (0), the horizontal transform type may be determined as third transform indicating DCT-8 based integer transform, and the vertical transform type may be determined as second transform indicating DST-7 based integer transform.

When the partitioning direction information has a second value (1), the horizontal transform type may be determined as second transform indicating DST-7 based integer transform, and the vertical transform type may be determined as third transform indicating DCT-8 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 30, at least one of the horizontal transform type trTypeHor or the vertical transform type trTypeVer for the block or the sub-block may be determined.

TABLE 30

| partitioning direction information | trTypeHor | trTypeVer |
|---|---|---|
| 0 | 2 | 1 |
| 0 | 1 | 2 |

The following shows a twelfth embodiment in which at least one of a one-dimensional transform type, a two-dimensional transform combination, and whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

the partitioning direction information has a first value (0), the horizontal transform type may be determined as third transform indicating DCT-8 based integer transform, and the vertical transform type may be determined as second transform indicating DST-7 based integer transform.

When the partitioning direction information has a second value (1), the horizontal transform type may be determined as second transform indicating DST-7 based integer transform, and the vertical transform type may be determined as second transform indicating DST-7 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 31, at least one of the horizontal transform type trTypeHor or the vertical transform type trTypeVer for the block or the sub-block may be determined.

TABLE 31

| partitioning direction information | trTypeHor | trTypeVer |
|---|---|---|
| 0 | 2 | 1 |
| 1 | 1 | 1 |

The following shows a thirteenth embodiment in which at least one of a one-dimensional transform type, a two-dimensional transform combination, and whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the partitioning direction information has a first value (0), the horizontal transform type may be determined as second transform indicating DST-7 based integer transform, and the vertical transform type may be determined as third transform indicating DCT-8 based integer transform.

When the partitioning direction information has a second value (1), the horizontal transform type may be determined as second transform indicating DST-7 based integer transform, and the vertical transform type may be determined as second transform indicating DST-7 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 32, at least one of the horizontal transform type trTypeHor or the vertical transform type trTypeVer for the block or the sub-block may be determined.

TABLE 32

| partitioning direction information | trTypeHor | trTypeVer |
|---|---|---|
| 0 | 1 | 2 |
| 1 | 1 | 1 |

The following shows a fourteenth embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

The horizontal transform type may be determined as second transform indicating DST-7 based integer transform, and the vertical transform type may be determined as second transform indicating DST-7 based integer transform.

At this time, second transform may mean that trTypeHor or trTypeVer has a second value. Here, the second value may be 1.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 33, at least one of the horizontal transform type trTypeHor or the vertical transform type trTypeVer for the block or the sub-block may be determined.

TABLE 33

| trTypeHor | trTypeVer |
|---|---|
| 1 | 1 |

The following shows a fifteenth embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transforming indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the sub-block position information has a first value (0), the horizontal transform type may be determined as third transform indicating DCT-8 based integer transform, and the vertical transform type may be determined as second transform indicating DST-7 based integer transform.

When the sub-block position information has a second value (1), the horizontal transform type may be determined as second transform indicating DST-7 based integer transform, and the vertical transform type may be determined as second transform indicating DST-7 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 34, at least one of the horizontal transform type trTypeHor or the vertical transform type trTypeVer for the block or the sub-block may be determined.

TABLE 34

| partitioning direction information | trTypeHor | trTypeVer |
|---|---|---|
| 0 | 2 | 1 |
| 1 | 1 | 1 |

The following shows a sixteenth embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the sub-block position information has a first value (0), the horizontal transform type may be determined as second transform indicating DST-7 based integer transform, and the vertical transform type may be determined as third transform indicating DCT-8 based integer transform.

When the sub-block position information has a second value (1), the horizontal transform type may be determined as second transform indicating DST-7 based integer transform, and the vertical transform type may be determined as second transform indicating DST-7 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 35, at least one of the horizontal transform type trTypeHor or the vertical transform type trTypeVer for the block or the sub-block may be determined.

TABLE 35

| partitioning direction information | trTypeHor | trTypeVer |
|---|---|---|
| 0 | 1 | 2 |
| 1 | 1 | 1 |

The following shows a seventeenth embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-bock may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the sub-block position information has a first value (0), the horizontal transform type may be determined as third transform indicating DCT-8 based integer transform, and the vertical transform type may be determined as second transform indicating DST-7 based integer transform.

When the sub-block position information has a second value (1), the horizontal transform type may be determined as second transform indicating DST-7 based integer transform, and the vertical transform type may be determined as third transform indicating DCT-8 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 36, at least one of the horizontal transform type trTypeHor or the vertical transform type trTypeVer for the block or the sub-block may be determined.

TABLE 36

| partitioning direction information | trTypeHor | ttTypeVer |
|---|---|---|
| 0 | 2 | 1 |
| 1 | 1 | 2 |

The following shows an eighteenth embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the partitioning direction information has a first value (0), the horizontal transform type may be determined as first transform indicating DCT-2 based integer transform, and the vertical transform type may be determined as second transform indicating DST-7 based integer transform.

When the partitioning direction information has a second value (1), the horizontal transform type may be determined as second transform indicating DST-7 based integer transform, and the vertical transform type may be determined as first transform indicating DCT-2 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 37, at least one of the horizontal transform type trTypeHor or the vertical transform type trTypeVer for the block or the sub-block may be determined.

TABLE 37

| partitioning direction information | trTypeHor | trTypeVer |
|---|---|---|
| 0 | 0 | 1 |
| 1 | 1 | 0 |

The following shows a nineteenth embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the partitioning direction information has a first value (0), the horizontal transform type may be determined as first transform indicating DCT-2 based integer transform, and the vertical transform type may be determined as second transform indicating DST-7 based integer transform.

When the partitioning direction information has a second value (1), the horizontal transform type may be determined as second transform indicating DST-7 based integer transform, and the vertical transform type may be determined as second transform indicating DST-7 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 38, at least one of the horizontal transform type trTypeHor or the vertical transform type trTypeVer for the block or the sub-block may be determined.

TABLE 38

| partitioning direction information | trTypeHor | trTypeVer |
|---|---|---|
| 0 | 0 | 1 |
| 1 | 1 | 1 |

The following shows a twentieth embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the partitioning direction information has a first value (0), the horizontal transform type may be determined as second transform indicating DST-7 based integer transform, and the vertical transform type may be determined as first transform indicating DCT-2 based integer transform.

When the partitioning direction information has a second value (1), the horizontal transform type may be determined as second transform indicating DST-7 based integer transform, and the vertical transform type may be determined as second transform indicating DST-7 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 39, at least one of the horizontal transform type trTypeHor or the vertical transform type trTypeVer for the block or the sub-block may be determined.

TABLE 39

| partitioning direction information | trTypeHor | trTypeVer |
|---|---|---|
| 0 | 1 | 0 |
| 1 | 1 | 1 |

The following shows a twenty-first embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the sub-block position information has a first value (0), the horizontal transform type may be determined as first transform indicating DCT-2 based integer transform, and the vertical transform type may be determined as second transform indicating DST-7 based integer transform.

When the sub-block position information has a second value (1), the horizontal transform type may be determined as second transform indicating DST-7 based integer transform, and the vertical transform type may be determined as second transform indicating DST-7 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 40, at least one of the horizontal transform type trTypeHor or the vertical transform type trTypeVer for the block or the sub-block may be determined.

TABLE 40

| sub-block position information | trTypeHor | trTypeVer |
|---|---|---|
| 0 | 0 | 1 |
| 1 | 1 | 1 |

The following shows a twenty-second embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the sub-block position information has a first value (0), the horizontal transform type may be determined as second transform indicating DST-7 based integer transform, and the vertical transform type may be determined as first transform indicating DCT-2 based integer transform.

When the sub-block position information has a second value (1), the horizontal transform type may be determined as second transform indicating DST-7 based integer transform, and the vertical transform type may be determined as second transform indicating DST-7 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 41, at least one of the horizontal transform type trTypeHor or the vertical transform type trTypeVer for the block or the sub-block may be determined.

TABLE 41

| sub-block position information | trTypeHor | trTypeVer |
|---|---|---|
| 0 | 1 | 0 |
| 1 | 1 | 1 |

The following shows a twenty-third embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2 or 4, for example.

When the width or height of the block or the sub-block is greater than Y, the horizontal transform type or the vertical transform type may be determined as first transform indicating DCT-2 based integer transform.

Here, Y may be a positive integer, and may be 16, 32, or 64, for example.

When the width or height of the block or the sub-block is greater than or equal to X or is less than or equal to Y, the horizontal transform type or the vertical transform type may be determined according to the following conditions.

When the sub-block location information has a first value (0), the horizontal transform type may be determined as first transform indicating DCT-2 based integer transform, and the vertical transform type may be determined as second transform indicating DST-7 based integer transform.

When the sub-block location information has a second value (1), the horizontal transform type may be determined as second transform indicating DST-7 based integer transform, and the vertical transform type may be determined as first transform indicating DCT-2 based integer transform.

At this time, second transform may mean that trTypeHor or trTypeVer has a second value. Here, the second value may be 1.

At this time, third transform may mean that trTypeHor or trTypeVer has a third value. Here, the third value may be 2.

Here, X may be a positive integer, and may be 2 or 4, for example. Here, Y may be a positive integer, and may be 16, 32, or 64, for example.

In addition, when the width or height of the block or the sub-block is Z, horizontal transform or vertical transform may not be performed.

Here, Z may be a positive integer including 0, and may be 1, for example.

As in the example of Table 42, at least one of the horizontal transform type trTypeHor or the vertical transform type trTypeVer for the block or the sub-block may be determined.

TABLE 42

| sub-block position information | trTypeHor | trTypeVer |
|---|---|---|
| 0 | 0 | 1 |
| 1 | 1 | 0 |

The following shows a twenty-fourth embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2, 4, or 8 for example.

When the width or height of the block or the sub-block is greater than Y, the horizontal transform type or the vertical transform type may be determined as first transform indicating DCT-2 based integer transform.

Here, Y may be a positive integer, and may be 8, 16, 32, or 64, for example.

When the width or height of the block or the sub-block is greater than or equal to X or is less than or equal to Y, the horizontal transform type or the vertical transform type may be determined as second transform indicating DST-7 based integer transform.

At this time, second transform may mean that trTypeHor or trTypeVer has a second value. Here, the second value may be 1.

Here, X may be a positive integer, and may be 2, 4, or 8, for example. Here, Y may be a positive integer, and may be 8, 16, 32, or 64, for example.

In addition, when the width or height of the block or the sub-block is Z, horizontal transform or vertical transform may not be performed.

Here, Z may be a positive integer including 0, and may be 1, for example.

Here, all sub-blocks partitioned from the block may be transformed using the same horizontal transform type or the same vertical transform type. In addition, the one-dimensional transform type for at least one of horizontal transform or vertical transform for the block or the sub-block may be determined regardless of the intra prediction mode.

As in the example of Table 43, at least one of the horizontal transform type trTypeHor or the vertical transform type trTypeVer for the block or the sub-block may be determined.

TABLE 43

| trTypeHor | trTypeVer |
|---|---|
| (W>=4 && W<=8)? 1:0 | (H>=4 && H<=8)? 1:0 |

The following shows a twenty-fifth embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

When the width W or height H of the block or the sub-block is less than X, the horizontal transform type trTypeHor or the vertical transform type trTypeVer may be determined as first transform indicating DCT-2 based integer transform.

At this time, first transform may mean that trTypeHor or trTypeVer has a first value. Here, the first value may be 0.

Here, X may be a positive integer, and may be 2, 4, or 8, for example.

When the width or height of the block or the sub-block is greater than Y, the horizontal transform type or the vertical transform type may be determined as first transform indicating DCT-2 based integer transform.

Here, Y may be a positive integer, and may be 8, 16, 32, or 64, for example.

When the width or height of the block or the sub-block is greater than or equal to X or is less than or equal to Y, the horizontal transform type or the vertical transform type may be determined as second transform indicating DST-7 based integer transform.

At this time, second transform may mean that trTypeHor or trTypeVer has a second value. Here, the second value may be 1.

Here, X may be a positive integer, and may be 2, 4, or 8, for example. Here, Y may be a positive integer, and may be 8, 16, 32, or 64, for example.

In addition, when the width or height of the block or the sub-block is Z, horizontal transform or vertical transform may not be performed.

Here, Z may be a positive integer including 0, and may be 1, for example.

Here, all sub-blocks partitioned from the block may be transformed using the same horizontal transform type or the same vertical transform type. In addition, the one-dimensional transform type for at least one of horizontal transform or vertical transform for the block or the sub-block may be determined regardless of the intra prediction mode.

As in the example of Table 44, at least one of the horizontal transform type trTypeHor or the vertical transform type trTypeVer for the block or the sub-block may be determined.

TABLE 44

| trTypeHor | trTypeVer |
|---|---|
| (W>=4 && W<=32)? 1:0 | (H>=4 && H<=32)? 1:0 |

The following shows a twenty-sixth embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined.

At least one of one-dimensional transform type, a two-dimensional transform combination or whether to use transform may be determined according to at least one of the intra prediction mode of the block or the sub-block, the width W of the block or the sub-block or the height H of the block or the sub-block.

When the intra prediction mode of the block or the sub-block corresponds to at least one of INTRA PLANAR, INTRA_ANGULAR31, INTRA_ANGULAR32, INTRA_ANGULAR34, INTRA_ANGULAR36 or INTRA_ANGULAR37, the following may be performed.

When the width W or height H of the block or the sub-block is less than X, the horizontal transform type trTypeHor or the vertical transform type trTypeVer may be determined as first transform indicating DCT-2 based integer transform.

When the width or height of the block or the sub-block is greater than Y, the horizontal transform type or the vertical transform type may be determined as first transform indicating DCT-2 based integer transform.

When the width or height of the block or the sub-block is greater than or equal to X or is less than or equal to Y, the horizontal transform type or the vertical transform type may be determined as second transform indicating DST-7 based integer transform.

When the intra prediction mode of the block or the sub-block corresponds to at least one of INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63 or INTRA_ANGULAR65, the following may be performed.

When the width W of the block or the sub-block is less than X, the horizontal transform type trTypeHor may be determined as first transform indicating DCT-2 based integer transform.

When the width of the block or the sub-block is greater than Y, the horizontal transform type may be determined as first transform indicating DCT-2 based integer transform.

When the width of the block or the sub-block is greater than or equal to X and is less than or equal to Y, the horizontal transform type may be determined as second transform indicating DST-7 based integer transform.

When the intra prediction mode of the block or the sub-block corresponds to at least one of INTRA_ANGULAR3, INTRA_ANGULAR5, . . . , INTRA_ANGULAR27, INTRA_ANGULAR29, INTRA_ANGULAR38, INTRA_ANGULAR40, . . . , INTRA_ANGULAR64 or INTRA_ANGULAR66, the following may be performed.

When the height H of the block or the sub-block is less than X, the vertical transform type trTypeVer may be determined as first transform indicating DCT-2 based integer transform.

When the height of the block or the sub-block is greater than Y, the vertical transform type may be determined as first transform indicating DCT-2 based integer transform.

When the height of the block or the sub-block is greater than or equal to X and is less than or equal to Y, the vertical transform type may be determined as second transform indicating DST-7 based integer transform.

In the cases other than the above cases, at least one of the horizontal transform type or the vertical transform type may be determined as first transform indicating DCT-2 based integer transform.

At this time, first transform may mean that trTypeHor or trTypeVer has a first value. Here, the first value may be 0. At this time, second transform may mean that trTypeHor or trTypeVer has a second value. Here, the second value may be 1.

Here, X may be a positive integer, and may be 2, 4, or 8, for example. Here, Y may be a positive integer, and may be 8, 16, 32, or 64, for example.

In addition, when the width or height of the block or the sub-block is Z, horizontal transform or vertical transform may not be performed.

Here, Z may be a positive integer including 0, and may be 1, for example.

Here, all sub-blocks partitioned from the block may be transformed using the same horizontal transform type or the same vertical transform type.

Here, the intra prediction mode may mean an intra prediction mode value, an intra prediction mode direction, etc.

As in the example of Table 45, at least one of the horizontal transform type trTypeHor or the vertical transform type trTypeVer for the block or the sub-block may be determined.

TABLE 45

| intra prediction mode | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | (W>=4 && W<=16)? 1:0 | (H>=4 && H<=16)? 1:0 |
| INTRA_ANGULAR33, INTRA_ANGULAR35 | 0 | 0 |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | (W>=4 && W<=16)? 1:0 | 0 |
| INTRA_ANGULAR3, INTRA_ANGULAR5, . . . , INTRA_ANGULAR27, INTRA_ANGULAR29, INTRA_ANGULAR38, INTRA_ANGULAR40, . . . , INTRA_ANGULAR64, INTRA_ANGULAR66 | 0 | (H>=4 && H<=16)? 1:0 |

The following shows a twenty-seventh embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined according to the prediction mode of the block or the sub-block.

When the prediction mode of the block or the sub-block is an intra prediction mode or an intra block copy prediction mode, a one-dimensional transform type for at least one of horizontal transform or vertical transform for the block or the sub-block may be determined based on at least one of the first to twenty-sixth embodiments.

When the prediction mode of the block or the sub-block is an inter prediction mode, a one-dimensional transform type for at least one of horizontal transform or vertical transform for the block or the sub-block may be determined based on at least one of the third and twenty-sixth embodiments.

The following shows a twenty-eighth embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined according to the color component of the block or the sub-block.

When the color component of the block or the sub-block is a luma component, a one-dimensional transform type for at least one of horizontal transform or vertical transform for the block or the sub-block may be determined based on at least one of the first to twenty-sixth embodiments.

When the color component of the block or the sub-block is a chroma component, a one-dimensional transform type for at least one of horizontal transform or vertical transform for the block or the sub-block may be determined based on at least one of the third and twenty-sixth embodiments.

When the color component of the block or the sub-block is a chroma component, the horizontal transform type trTypeHor or the vertical transform type trTypeVer for the block or the sub-block may be determined as a predefined transform type regardless of the intra prediction mode. Here, the predefined transform type may be first transform indicating DCT-2 based integer transform.

The following shows a twenty-ninth embodiment in which at least one of a one-dimensional transform type, a two-dimensional transform combination or whether to use transform for the block or the sub-block is determined. Here, the one-dimensional transform type for at least one of horizontal transform or vertical transform for the block or the sub-block may be determined according to the shape of the block or the sub-block.

When the shape of the block or the sub-block is a square or a rectangle (non-square), a one-dimensional transform type for at least one of horizontal transform or vertical transform for the block or the sub-block may be determined based on at least one of the first to twenty-sixth embodiments.

Various transform/inverse transform type determination methods for the block or the sub-block may be performed, and at least one of the following scan methods may be performed after transform or before inverse transform.

At least one of the following scan methods may be performed with respect to a quantized coefficient level or a quantized level subjected to at least one transform or quantization in the encoder/decoder.

Here, the quantized coefficient level may mean a result generated by performing transform and quantization with respect to a residual block. In addition, the quantized level may mean a result generated by performing quantization with respect to a residual block.

In addition, the quantized coefficient level and the quantized level may have the same meaning and may have the same meaning as a transform coefficient. That is, the quantized coefficient level, the quantized level and the transform coefficient may mean an object when a residual block is entropy-encoded/decoded.

Figure 39:
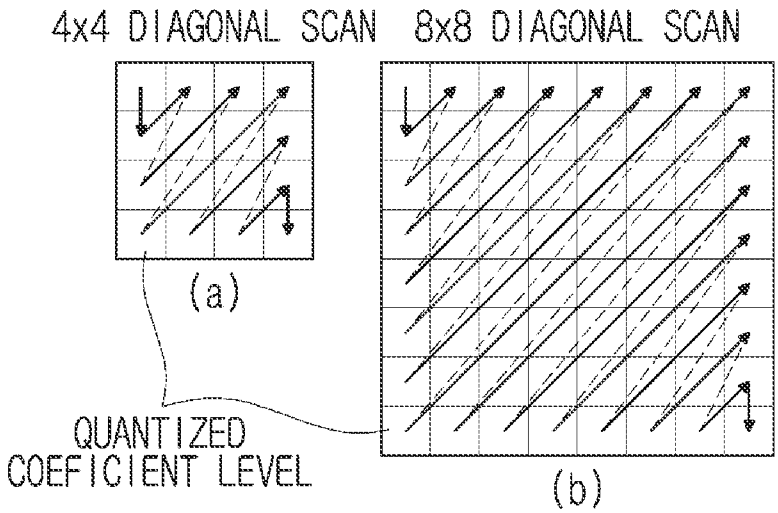
FIG. 39 is a diagram illustrating an embodiment of diagonal scan.

As shown in the example of FIG. 39, the quantized coefficient levels in a two-dimensional residual block may be aligned as a one-dimensional coefficient level array using diagonal scan. In addition, a one-dimensional reconstructed coefficient level array may be aligned as quantized coefficient levels in a two-dimensional residual block using diagonal scan.

At this time, a diagonal scan direction may be from a down-left side to an up-right side or from an up-right side to a down-left side, as in the example of FIG. 11.

The scan direction from the down-left side to the top-right side may be referred to as up-right diagonal scan. In addition, the scan direction from the up-right side to the down-left side may be referred to as down-left diagonal scan.

The example of FIG. 39 shows the up-right scan among diagonal scans.

Figure 40:
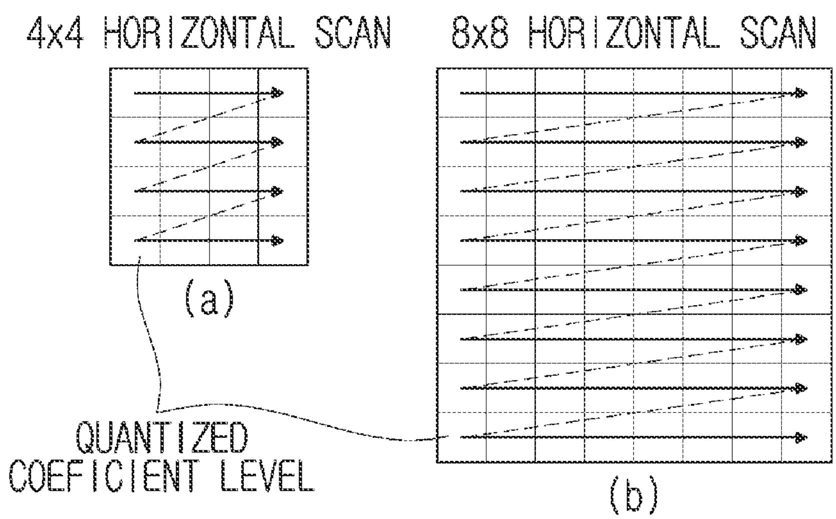
FIG. 40 is a diagram illustrating an embodiment of horizontal scan.

As in the example of FIG. 40, the quantized coefficient levels in a two-dimensional residual block may be aligned as a one-dimensional coefficient level array using horizontal scan. In addition, a one-dimensional reconstructed coefficient level array may be aligned as quantized coefficient levels in a two-dimensional residual block using horizontal scan.

At this time, horizontal scan may be a method of preferentially scanning coefficients corresponding to a first row.

Figure 41:
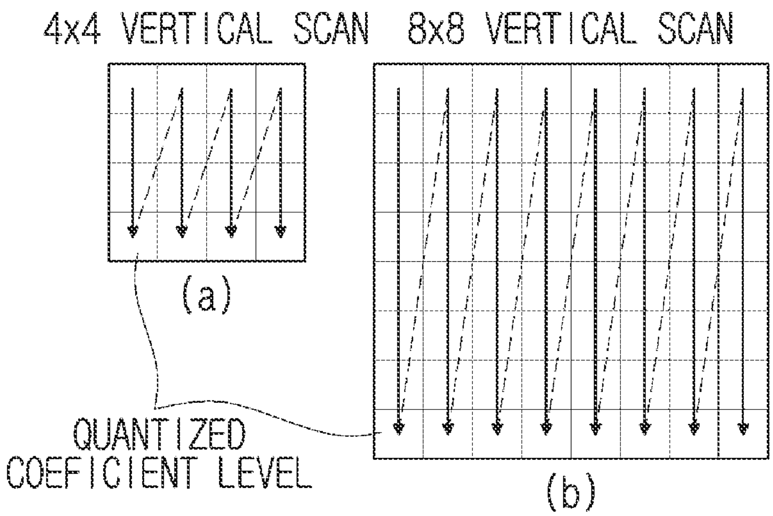
FIG. 41 is a diagram illustrating an embodiment of vertical scan.

As in the example of FIG. 41, the quantized coefficient levels in a two-dimensional residual block may be aligned as a one-dimensional coefficient level array using vertical scan. In addition, a one-dimensional reconstructed coefficient level array may be aligned as quantized coefficient levels in a two-dimensional residual block using vertical scan.

At this time, vertical scan may be a method of preferentially scanning coefficients corresponding to a first column.

Figure 42:
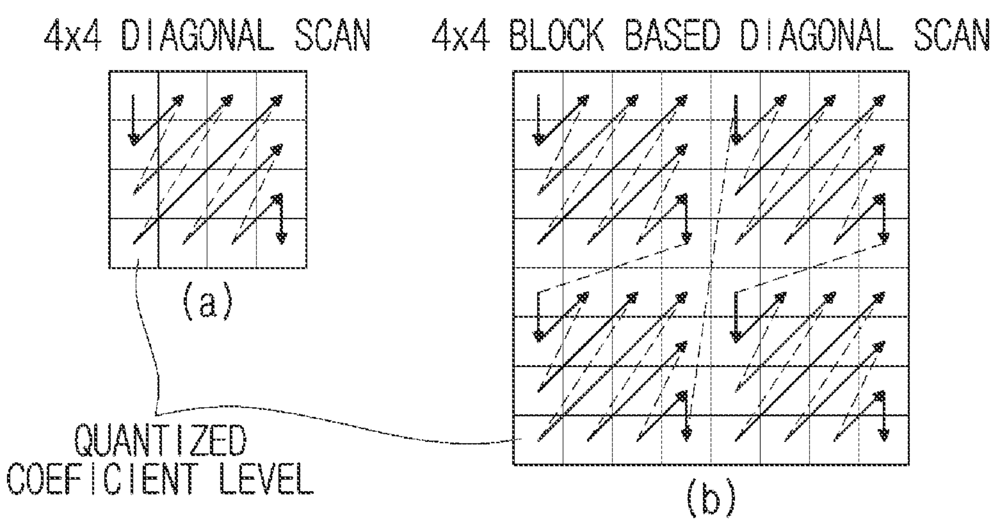
FIG. 42 is a diagram illustrating an embodiment of block based diagonal scan.

As in the example of FIG. 42, the quantized coefficient levels in a two-dimensional residual block may be aligned as a one-dimensional coefficient level array using block-based diagonal scan. In addition, a one-dimensional reconstructed coefficient level array may be aligned as quantized coefficient levels in a two-dimensional residual block using block-based diagonal scan.

At this time, a block size may be M×N. Here, at least one of M or N may be a positive integer and may be 4. In addition, a block size may be equal to the size of a coefficient group used in transform coefficient encoding/decoding.

The diagonal scan direction may be from the down-left side to the up-right side as in the example of FIG. 14. In addition, the diagonal scan direction may be from the up-right side to the down-left side.

The example of FIG. 42 shows block-based up-right scan among block-based diagonal scans.

At this time, the block may mean a sub-block partitioned from a block having a specific size. If the block-based scan is used, even sub-blocks in the block having the specific size may be scanned using the same scan method as the scan method in the block.

As in the example of FIG. 42, when block-based diagonal scan is used, after a block having a size of 8×8 is partitioned into sub-blocks each having a size of 4×4, the sub-blocks each having a size of 4×4 may be scanned using diagonal scan and the coefficients in the sub-block may be scanned using diagonal scan.

Figure 43:
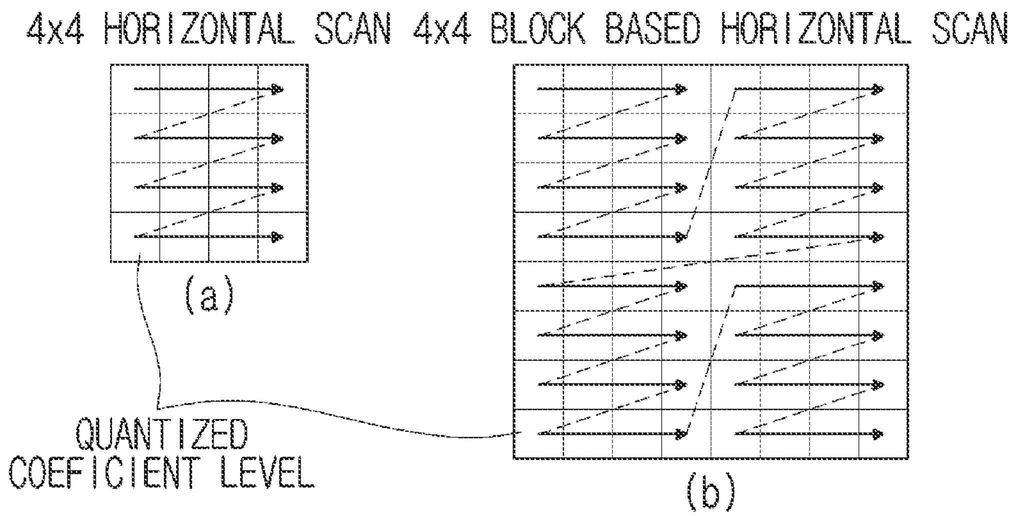
FIG. 43 is a diagram illustrating an embodiment of block based horizontal scan.

As in the example of FIG. 43, the quantized coefficient levels in a two-dimensional residual block may be aligned as a one-dimensional coefficient level array using block-based horizontal scan. In addition, a one-dimensional reconstructed coefficient level array may be aligned as quantized coefficient levels in a two-dimensional residual block using block-based horizontal scan. At this time, a block size may be 4×4 and blocks corresponding to a first row may be preferentially scanned.

At this time, a block size may be M×N. Here, at least one of M or N may be a positive integer and may be 4. In addition, a block size may be equal to the size of a coefficient group used in transform coefficient encoding/decoding.

At this time, block-based horizontal scan may be a method of preferentially scanning coefficients corresponding to a first row.

Figure 44:
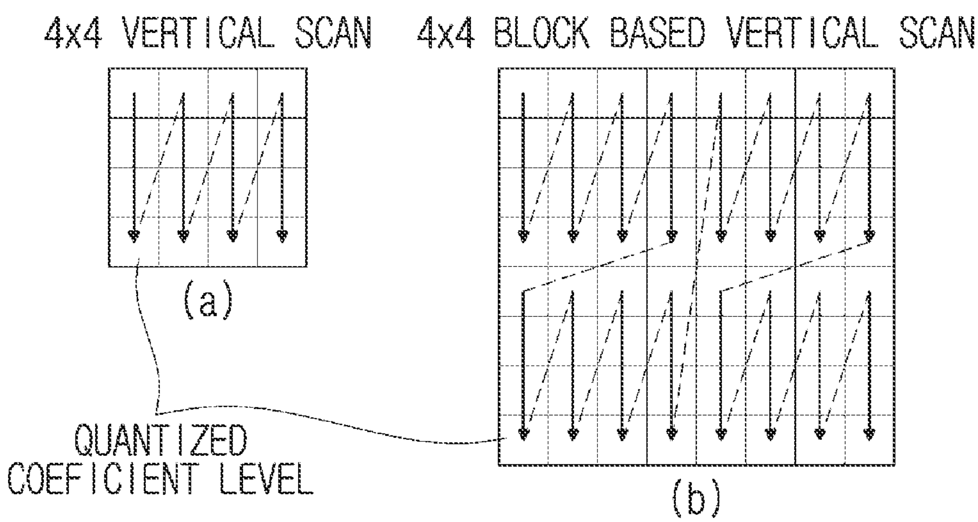
FIG. 44 is a diagram illustrating an embodiment of block based vertical scan.

As in the example of FIG. 44, the quantized coefficient levels in a two-dimensional residual block may be aligned as a one-dimensional coefficient level array using block-based vertical scan. In addition, a one-dimensional reconstructed coefficient level array may be aligned as quantized coefficient levels in a two-dimensional residual block using block-based vertical scan.

At this time, a block size may be M×N. Here, at least one of M or N may be a positive integer and may be 4. In addition, a block size may be equal to the size of a coefficient group used in transform coefficient encoding/decoding.

At this time, block-based vertical scan may be a method of preferentially scanning coefficients corresponding to a first column.

Figure 45:
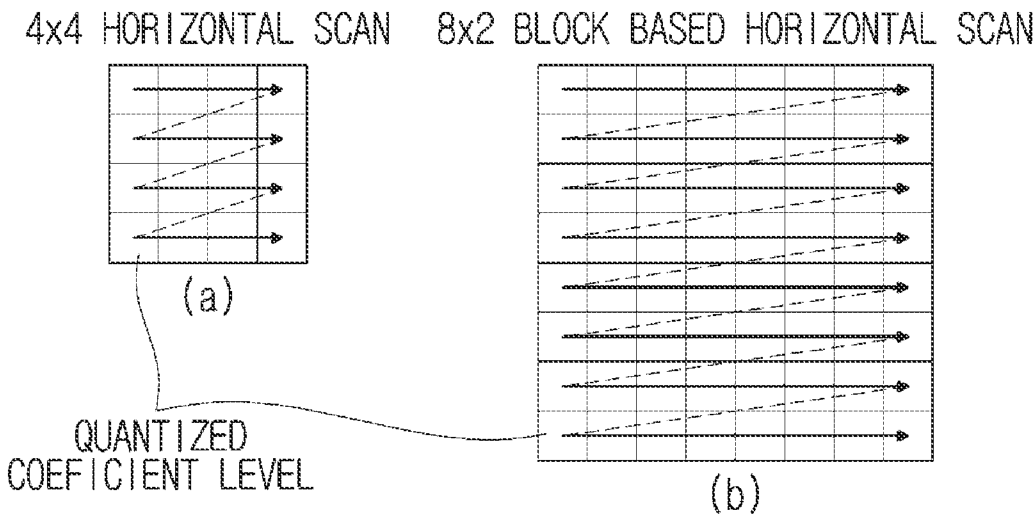
FIG. 45 is a diagram illustrating an embodiment of block based horizontal scan.

As in the example of FIG. 45, the quantized coefficient levels in a two-dimensional residual block may be aligned as a one-dimensional coefficient level array using block-based horizontal scan. In addition, a one-dimensional reconstructed coefficient level array may be aligned as quantized coefficient levels in a two-dimensional residual block using block-based horizontal scan.

At this time, a block size may be M×N. Here, at least one of M or N may be a positive integer and may be 8 and 2, respectively. In addition, a block size may be equal to the size of a coefficient group used in transform coefficient encoding/decoding.

At this time, block-based horizontal scan may be a method of preferentially scanning coefficients corresponding to a first row.

Figure 46:
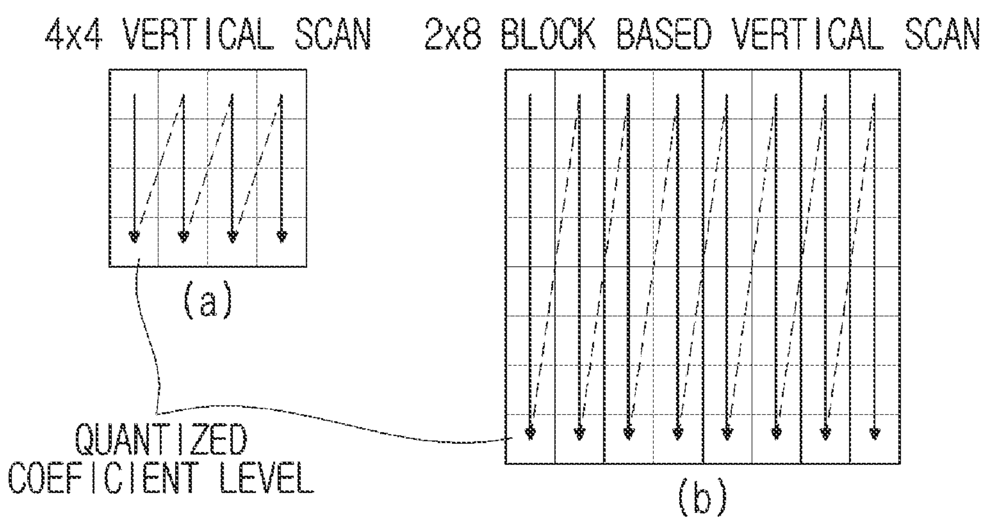
FIG. 46 is a diagram illustrating an embodiment of block based vertical scan.

As in the example of FIG. 46, the quantized coefficient levels in a two-dimensional residual block may be aligned as a one-dimensional coefficient level array using block-based vertical scan. In addition, a one-dimensional reconstructed coefficient level array may be aligned as quantized coefficient levels in a two-dimensional residual block using block-based vertical scan.

At this time, a block size may be M×N. Here, at least one of M or N may be a positive integer and may be 2 and 8, respectively. In addition, a block size may be equal to the size of a coefficient group used in transform coefficient encoding/decoding.

At this time, block-based vertical scan may be a method of preferentially scanning coefficients corresponding to a first column.

As in the examples of FIGS. 39 to 46, scan corresponding to (a) may be used for a residual block having a size of J×K for a J×K block, and scan corresponding to (b) may be used for a residual block having a size of M×N or more for a block having a size of at least one of 8×8/16×16/32×32/64×64 or a residual block having a size of M×N. J, K, M and N may be positive integers. In addition, J and K may be less than M and N, respectively. In addition, J×K may be 4×4 and M×N may be 8×8.

As in the examples of FIGS. 39 to 46, although only the scan method corresponding to a maximum size of 8×8 is shown, the scan method corresponding to the size of 8×8 is applicable to a scan method corresponding to a size greater than 8×8, and the above scan is applicable not only to a residual block having a square form but also to a residual block having a non-square form.

In order to align the quantized coefficient levels in the two-dimensional residual block having a square/non-square form in the encoder, the quantized coefficient levels in the residual may be scanned. In addition, in order to align the one-dimensional reconstructed coefficient level array as quantized coefficient levels in the two-dimensional residual block having a square/non-square form in the decoder, the coefficient level may be scanned.

Figure 47:
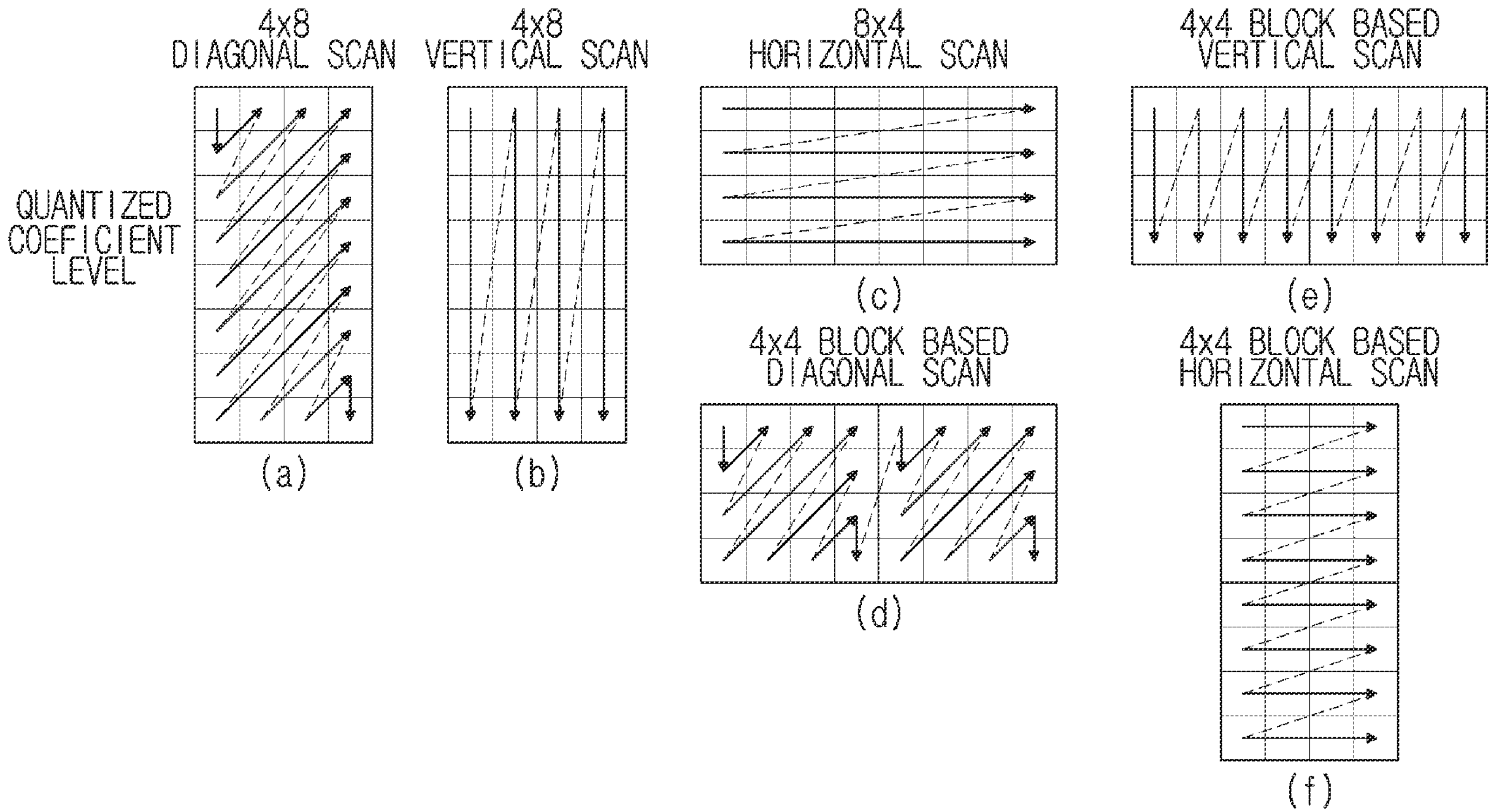
FIG. 47 is a diagram illustrating various embodiments of scan based on the shape of a block.

As in the example of FIG. 47, at least one of the quantized coefficient levels may be scanned.

For example, as in the example of FIG. 47(*a*), the quantized coefficient levels in a two-dimensional residual block may be aligned as a one-dimensional coefficient level array using diagonal scan. In addition, a one-dimensional reconstructed coefficient level array may be aligned as quantized coefficient levels in a two-dimensional residual block using diagonal scan.

At this time, a diagonal scan direction may be from a down-left side to an up-right side or from an up-right side to a down-left side, as in the example of FIG. 47(*a*).

The scan direction from the down-left side to the top-right side may be referred to as up-right diagonal scan. In addition, the scan direction from the up-right side to the down-left side may be referred to as down-left diagonal scan.

The example of FIG. 47(*a*) shows the up-right scan among diagonal scans.

As another example, as in the example of FIG. 47(*b*), the quantized coefficient levels in a two-dimensional residual block may be aligned as a one-dimensional coefficient level array using vertical scan. In addition, a one-dimensional reconstructed coefficient level array may be aligned as quantized coefficient levels in a two-dimensional residual block using vertical scan.

At this time, vertical scan may be a method of preferentially scanning coefficients corresponding to a first column.

As another example, as in the example of FIG. 47(*c*), the quantized coefficient levels in a two-dimensional residual block may be aligned as a one-dimensional coefficient level array using horizontal scan. In addition, a one-dimensional reconstructed coefficient level array may be aligned as quantized coefficient levels in a two-dimensional residual block using horizontal scan.

At this time, horizontal scan may be a method of preferentially scanning coefficients corresponding to a first row.

As another example, as in the example of FIG. 42, the quantized coefficient levels in a two-dimensional residual block may be aligned as a one-dimensional coefficient level array using block-based diagonal scan. In addition, a one-dimensional reconstructed coefficient level array may be aligned as quantized coefficient levels in a two-dimensional residual block using block-based diagonal scan.

At this time, a block size may be M×N. Here, at least one of M or N may be a positive integer and may be 4. In addition, a block size may be equal to the size of a coefficient group used in transform coefficient encoding/decoding.

The diagonal scan direction may be from the down-left side to the up-right side as in the example of FIG. 47(*d*). In addition, the diagonal scan direction may be from the up-right side to the down-left side.

The example of FIG. 47(*d*) shows an example in which block-based up-right scan among block-based diagonal scans is performed with respect to an entire 8×4 block.

As another example, as in the example of FIG. 47(*e*), for an entire 8×4 block, the quantized coefficient levels in a two-dimensional residual block may be aligned as a one-dimensional coefficient level array using block-based vertical scan. In addition, for an entire 8×4 block, a one-dimensional reconstructed coefficient level array may be aligned as quantized coefficient levels in a two-dimensional residual block using block-based vertical scan.

At this time, a block size may be M×N. Here, at least one of M or N may be a positive integer and may be 4. In addition, a block size may be equal to the size of a coefficient group used in transform coefficient encoding/decoding.

At this time, block-based vertical scan may be a method of preferentially scanning coefficients corresponding to a first column.

As another example, as in the example of FIG. 47(*f*), for an entire 4×8 block, the quantized coefficient levels in a two-dimensional residual block may be aligned as a one-dimensional coefficient level array using block-based horizontal scan. In addition, for an entire 4×8 block, a one-dimensional reconstructed coefficient level array may be aligned as quantized coefficient levels in a two-dimensional residual block using block-based horizontal scan.

At this time, a block size may be M×N. Here, at least one of M or N may be a positive integer and may be 4. In addition, a block size may be equal to the size of a coefficient group used in transform coefficient encoding/decoding.

At this time, block-based horizontal scan may be a method of preferentially scanning coefficients corresponding to a first row.

As in the above example, when a residual block has a non-square shape, the residual block may be scanned in the non-square shape or the residual block may be partitioned into a size of M×N which is a specific square block unit and scan may be performed for each specific square block unit and within the specific square block unit. Here, M and N may be positive integers and may be the same or different.

Figure 48:
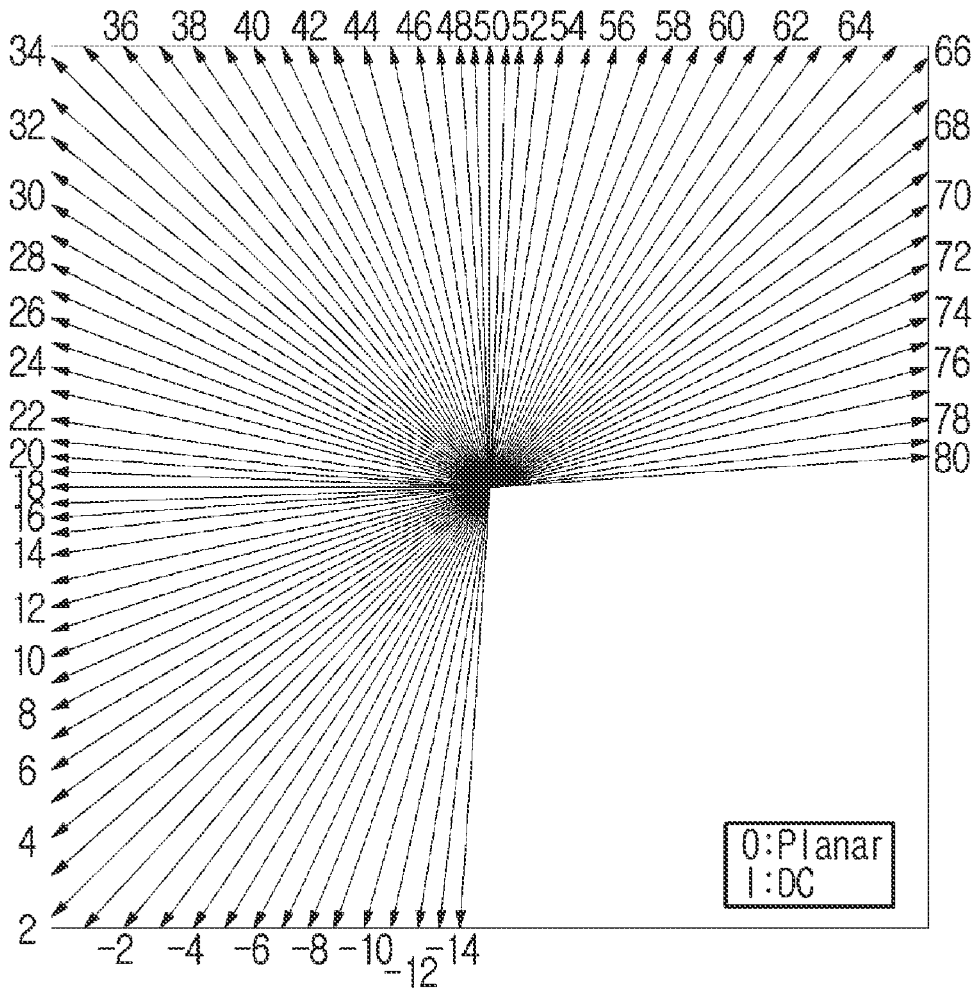
FIG. 48 is a diagram illustrating an intra prediction mode.
Figures 54, 55:
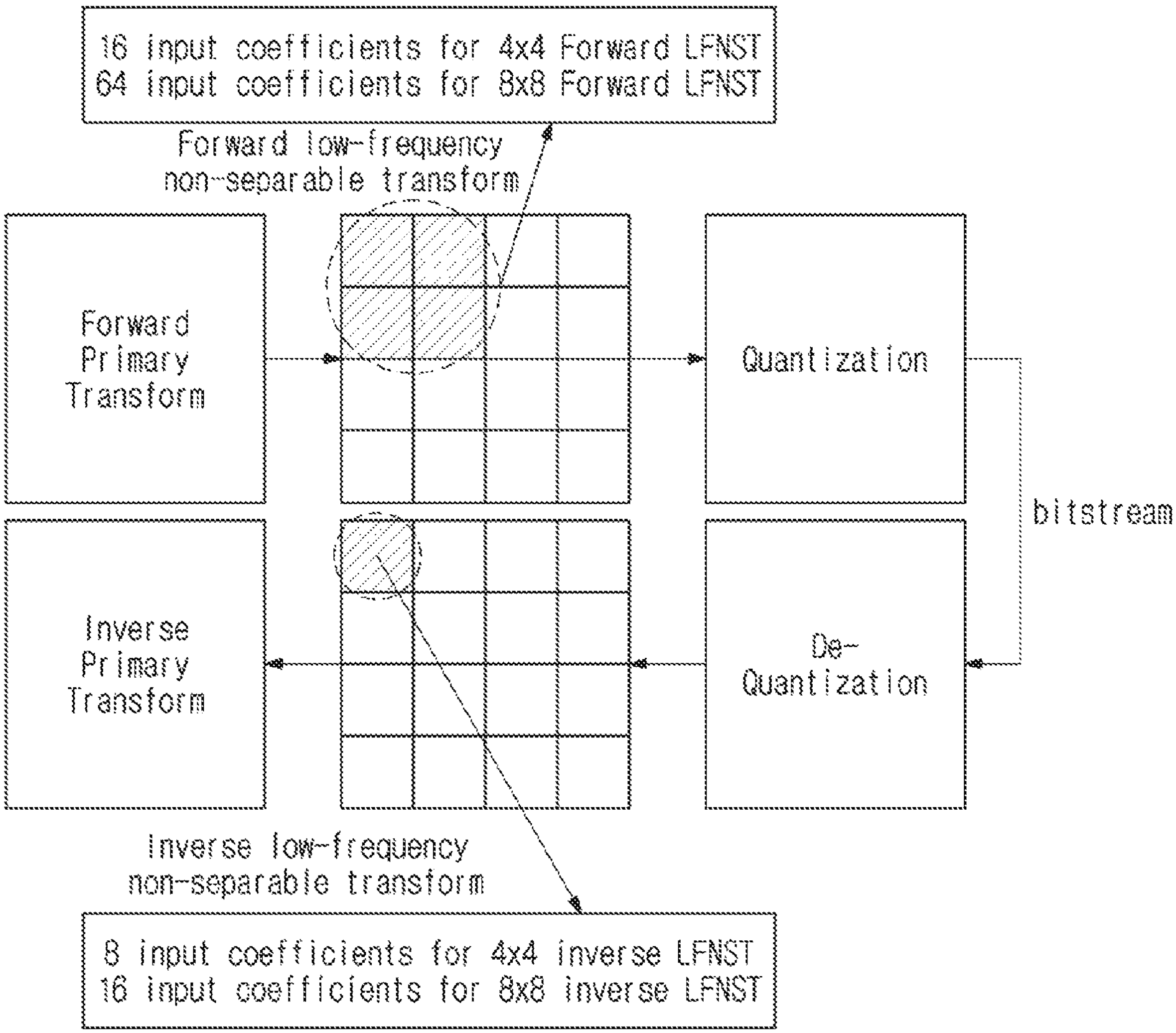
Figures 56, 57:
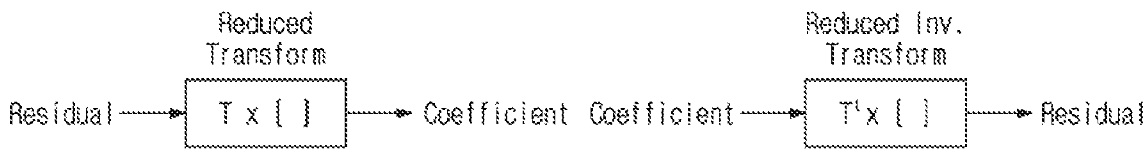
Figure 92:
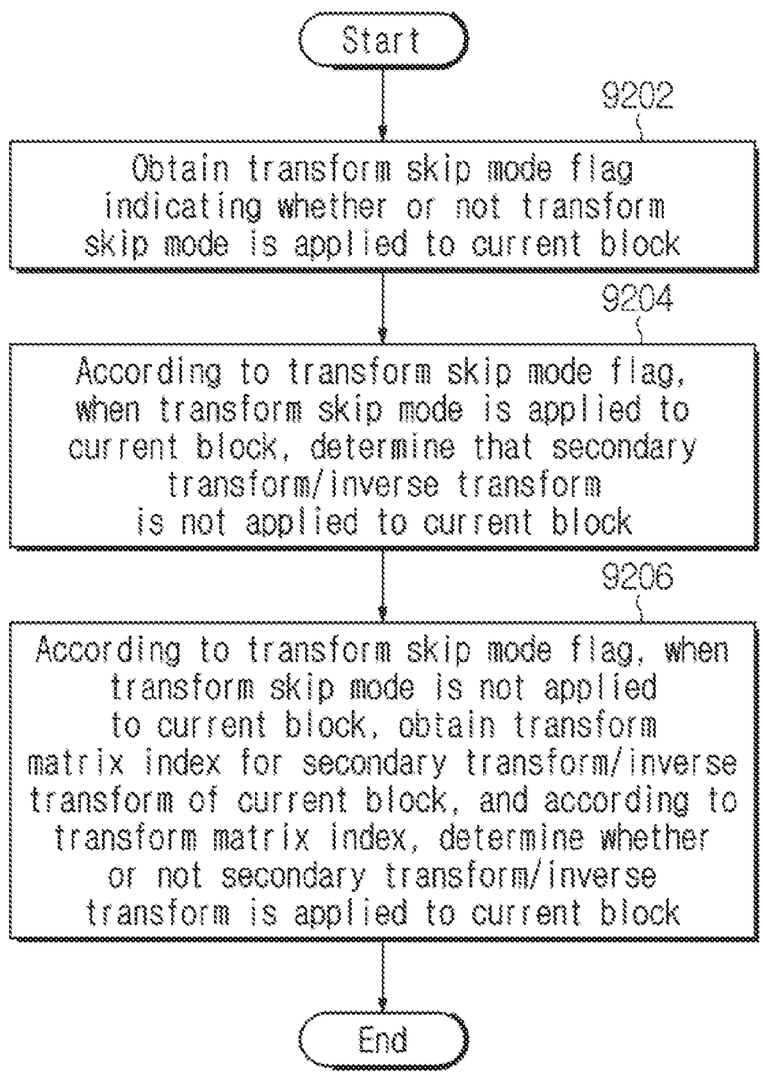
Figure 93:
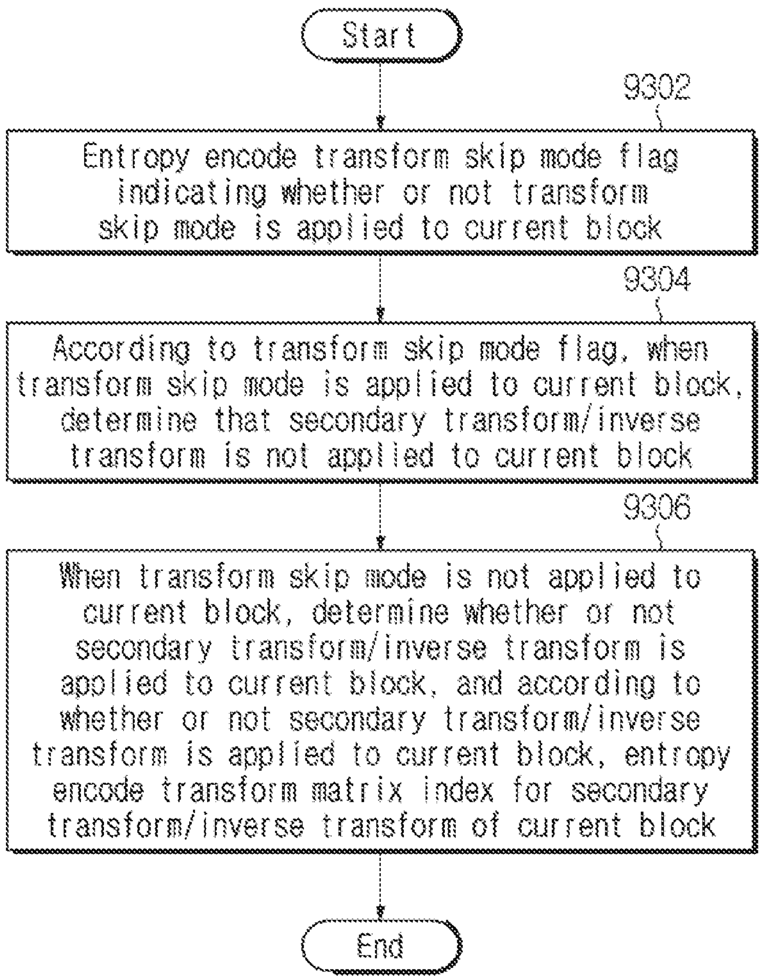

FIG. 48 shows an example of the intra prediction mode values of Planar (0) and DC (1) which are a directional intra prediction mode (−14 to 80 excluding 0 and 1) having various directions and a non-directional intra prediction mode.

Table 46 shows the intra prediction mode value corresponding to the intra prediction mode.

TABLE 46

| intra prediction mode value | intra prediction mode |
|---|---|
| 0 | INTRA PLANAR |
| 1 | INTRA DC |
| 2 . . 66 | INTRA ANGULAR2 . . . INTRA ANGULAR66 |
| 81 . . 83 | INTRA LT CCLM, INTRA L CCLM, INTRA T CCLM, |

Tables 64 to 68 are diagrams showing examples of an encoding process or a decoding process using transform according to an embodiment of the present invention.

Referring to Table 64, multi-transform selection enabled information sps_mts_enabled_flag signaled from at least one of the parameter set may indicate that multi-transform selection is enabled and, when at least one of the following conditions is satisfied, implicit multi-transform selection information implicitMtsEnabled may be set to a first value (e.g., 1) indicating implicit multi-transform selection.

- the current block is in an ISP mode (IntraSubPartitionsSplitType is not equal to ISP_NO_SPLIT)
- the current block is in an SBT mode and the larger value of the width and height of the current block is less than or equal to 32 (cu_sbt_flag is equal to 1 and Max (nTbW, nTbH) is less than or equal to 32)
- both intra prediction explicit multi-transform selection enabled information and inter prediction explicit multi-transform selection enabled information indicate that explicit multi-transform selection is not enabled and the prediction mode of the current block is an intra prediction mode (sps_explicit_mts_intra_enabled_flag and sps_explicit_mts_inter_enabled_flag are both equal to 0 and CuPredMode[xTbY][yTbY] is equal to MODE_INTRA)

in the case where the derived implicit multi-transform selection information indicates implicit multi-transform selection (implicitMtsEnabled=1), the horizontal transform type trTypeHor and the vertical transform type trTypeVer may be selected as follows.

- in the case of the ISP mode, the horizontal transform type trTypeHor and the vertical transform type trTypeVer are selected based on the width and height of the current block (e.g., Table 20 above).
- in the case where both intra prediction explicit multi-transform selection enabled information and inter prediction explicit multi-transform selection enabled information indicate that explicit multi-transform selection is not enabled (sps_explicit_mts_intra_enabled_flag and sps_explicit_mts_inter_enabled_flag are both equal to 0), the horizontal transform type trTypeHor and the vertical transform type trTypeVer are selected based on the width and height of the current block (e.g., Table 20 above).
- in the case of the SBT mode, the horizontal transform type trTypeHor and the vertical transform type trTypeVer are selected based on the partitioning direction information and the sub-block position information (e.g., Table 68).

In contrast, when the derived implicit multi-transform selection information does not indicate implicit multi-transform selection (implicitMtsEnabled=0), as the horizontal transform type trTypeHor and the vertical transform type trTypeVer, the horizontal transform type trTypeHor and the vertical transform type trTypeVer are selected based on the signaled multi-transform selection information tu_mts_idx and Table of FIG. 52.

Meanwhile, when the current block is a chroma component (cIdx is greater than 0), the horizontal transform type trTypeHor and the vertical transform type trTypeVer may be selected as first transform indicating DCT-2 based integer transform regardless of the derived implicit multi-transform selection information.

Referring to Table 65, multi-transform selection enabled information sps_mts_enabled_flag signaled from at least one of the parameter set may indicate that multi-transform selection is enabled and, when at least one of the following conditions is satisfied, implicit multi-transform selection information implicitMtsEnabled may be set to a first value (e.g., 1) indicating implicit multi-transform selection.

the current block is in an ISP mode (IntraSubPartitionsSplitType is not equal to ISP_NO_SPLIT)

the current block is in an SBT mode and the larger value of the width and height of the current block is less than or equal to 32 (cu_sbt_flag is equal to 1 and Max (nTbW, nTbH) is less than or equal to 32)

both intra prediction explicit multi-transform selection enabled information and inter prediction explicit multi-transform selection enabled information indicate that explicit multi-transform selection is not enabled and the prediction mode of the current block is an intra prediction mode (sps_explicit_mts_intra_enabled_flag and sps_explicit_mts_inter_enabled_flag are both equal to 0 and CuPredMode[xTbY][yTbY] is equal to MODE_INTRA)

in the case where the derived implicit multi-transform selection information indicates implicit multi-transform selection (implicitMtsEnabled=1), the horizontal transform type trTypeHor and the vertical transform type trTypeVer may be selected as follows.

in the case of the ISP mode, based on the width and height of the current block (e.g., Table 20 above), the horizontal transform type trTypeHor and the vertical transform type trTypeVer are selected.

in the case where both intra prediction explicit multi-transform selection enabled information and inter prediction explicit multi-transform selection enabled information indicate that explicit multi-transform selection is not enabled and the prediction mode of the current block indicates the intra prediction mode (sps_explicit_mts_intra_enabled_flag and sps_explicit_mts_inter_enabled_flag are both equal to 0 and CuPredMode[xTbY][yTbY] is equal to MODE_INTRA), the horizontal transform type trTypeHor and the vertical transform type trTypeVer are selected based on the width and height of the current block (e.g., Table 20 above).

in the case of the SBT mode, the horizontal transform type trTypeHor and the vertical transform type trTypeVer are selected based on the partitioning direction information and the sub-block position information (e.g., FIG. 53).

In contrast, when the derived implicit multi-transform selection information does not indicate implicit multi-transform selection (implicitMtsEnabled=0), as the horizontal transform type trTypeHor and the vertical transform type trTypeVer, the horizontal transform type trTypeHor and the vertical transform type trTypeVer are selected based on the signaled multi-transform selection information tu_mts_idx and Table 67.

Meanwhile, when the current block is a chroma component (cIdx is greater than 0), the horizontal transform type trTypeHor and the vertical transform type trTypeVer may be selected as first transform indicating DCT-2 based integer transform regardless of the derived implicit multi-transform selection information.

According to an embodiment, unlike Table 64 and Table 65, when intra prediction explicit multi-transform selection enabled information indicates that explicit multi-transform selection is not enabled and a prediction mode of a current block indicates an intra-prediction mode (sps_explicit_mts_intra_enabled_flag is equal to 0 and CuPredMode [xTbY][yTbY] is equal to MODE_INTRA), implicit multi-transform selection information (implictMtsEnabled) may be set to a second value (for example 1) indicating implicit multi-transform selection.

According to an embodiment, when intra prediction explicit multi-transform selection enabled information indicates that explicit multi-transform selection is not enabled, a transform matrix index indicates that secondary transform/inverse transform is not applied to a current block, and matrix based intra-prediction mode usage information indicates that a matrix based intra-prediction mode is not applied to the current block (sps_explicit_mts_intra_enabled_flag is equal to 0, lfnst_idx[x0][y0] is equal to 0 and intra_mip_flag [x0][y0] is equal to 0), implicit multi-transform selection information (implictMtsEnabled) may be set to a second value (for example 1) indicating implicit multi-transform selection.

According to an embodiment, when intra prediction explicit multi-transform selection enabled information indicates that explicit multi-transform selection is not enabled, a prediction mode of a current block indicates an intra-prediction mode, a transform matrix index indicates that secondary transform/inverse transform is not applied to a current block, and matrix based intra-prediction mode usage information indicates that a matrix based intra-prediction mode is not applied to the current block (sps_explicit_mts_intra_enabled_flag is equal to 0, CuPredMode[0] [xTbY][yTbY] is equal to MODE_INTRA, lfnst_idx[x0] [y0] is equal to 0 and intra_mip_flag[x0][y0] is equal to 0), implicit multi-transform selection information (implictMtsEnabled) may be set to a second value (for example 1) indicating implicit multi-transform selection.

The matrix based intra-prediction mode usage information may be entropy encoded/decoded.

According to another embodiment, multi-transform selection enabled information sps_mts_enabled_flag signaled from at least one of the parameter set may indicate that multi-transform selection is enabled and, when at least one of the following conditions is satisfied, implicit multi-transform selection information implicitMtsEnabled may be set to a first value (e.g., 1) indicating implicit multi-transform selection.

the current block is in an ISP mode the current block is in an SBT mode and the larger value of the width and height of the current block is less than or equal to 32 intra prediction explicit multi-transform selection enabled information indicates that explicit multi-transform selection is not enabled, the prediction mode of the current block is an intra prediction mode, secondary inverse transform is not performed with respect to the current block, and the current block is not in a matrix based intra prediction mode.

When the derived implicit multi-transform selection indicates implicit multi-transform selection (implicitMtsEnabled=1), the horizontal transform type trTypeHor and the vertical transform type trTypeVer may be selected as follows. In the above embodiment, unlike the embodiments of Table 64 and Table 65, since the horizontal transform type and the vertical transform type are selected by determining only the SBT mode, computational complexity may be reduced.

- in the case of the SBT mode, based on the partitioning direction information and the sub-block location information (e.g., Table 68), the horizontal transform type trTypeHor and the vertical transform type trTypeVer are selected.
- in the case of the non-SBT mode (in the case of the ISP mode), the horizontal transform type trTypeHor and the vertical transform type trTypeVer are selected based on the width and height of the current block (e.g., Table 20 above).
- in the case of the non-SBT mode (the intra prediction explicit multi-transform enabled information indicates that explicit multi-transform selection is not enabled, the prediction mode of the current block is an intra prediction mode, secondary inverse transform is not performed with respect to the current block, and the current block is not in a matrix based intra prediction mode), the horizontal transform type trTypeHor and the vertical transform type trTypeVer are selected based on the width and height of the current block (e.g., Table 20 above).

Here, the case of the non-SBT mode (the case of the ISP mode or the case where the intra prediction explicit multi-transform enabled information indicates that explicit multi-transform selection is not enabled, the prediction mode of the current block is an intra prediction mode, secondary inverse transform is not performed with respect to the current block, and the current block is not in a matrix based intra prediction mode) may be divided into two cases, and, in the two cases, the horizontal transform type and the vertical transform type may be determined by the same method.

That is, in two cases, that is, 1) the case of the ISP mode and 2) the case where the intra prediction explicit multi-transform enabled information indicates that explicit multi-transform selection is not enabled, the prediction mode of the current block is an intra prediction mode, secondary inverse transform is not performed with respect to the current block, and the current block is not in a matrix based intra prediction mode, the horizontal transform type trTypeHor and the vertical transform type trTypeVer may be selected based on the width and height of the current block (e.g., Table 20 above).

In contrast, when the derived implicit multi-transform selection information does not indicate implicit multi-transform selection (implicitMtsEnabled=0), the horizontal transform type trTypeHor and the vertical transform type trTypeVer are selected based on the signaled multi-transform selection information and Table of Table 67.

Meanwhile, when the current block is a chroma component, the horizontal transform type trTypeHor and the vertical transform type trTypeVer may be selected as first transform indicating DCT-2 based integer transform regardless of the derived implicit multi-transform selection information. In addition, when the current block is in an ISP mode and secondary inverse transform is performed with respect to the current block, the horizontal transform type trTypeHor and the vertical transform type trTypeVer may be selected as first transform indicating DCT-2 based integer transform regardless of the derived implicit multi-transform selection information.

In addition, when multi-transform selection enabled information sps_mts_enabled_flag indicates that multi-transform selection is not enabled, the horizontal transform type trTypeHor and the vertical transform type trTypeVer may be selected as first transform indicating DCT-2 based integer transform.

In addition, when multi-transform selection enabled information sps_mts_enabled_flag indicates that multi-transform selection is not enabled and implicit multi-transform selection information does not indicate implicit multi-transform selection (implicitMtsEnabled=0), the horizontal transform type trTypeHor and the vertical transform type trTypeVer may be selected as first transform indicating DCT-2 based integer transform.

In the above example, when multi-transform selection enabled information sps_mts_enabled_flag indicates that multi-transform selection is enabled, multi-transform selection enabled information may be set to a first value (e.g., 1).

In the above example, when implicit multi-transform selection information implicitMtsEnabled indicates implicit multi-transform selection, the implicit multi-transform selection information may be set to a first value (e.g., 1). In addition, when implicit multi-transform selection information implicitMtsEnabled does not indicate implicit multi-transform selection, implicit multi-transform selection information may be set to a second value (e.g., 0).

In the above example, when intra prediction explicit multi-transform selection enabled information indicates that explicit multi-transform selection is enabled, intra prediction explicit multi-transform selection enabled information may be set to a first value (e.g., 1). In addition, when intra prediction explicit multi-transform selection enabled information indicates that explicit multi-transform selection is not enabled, intra prediction explicit multi-transform selection enabled information may be set to a second value (e.g., 0).

In the above example, when inter prediction explicit multi-transform selection enabled information indicates that explicit multi-transform selection is enabled, inter prediction explicit multi-transform selection enabled information may be set to a first value (e.g., 1). In addition, when inter prediction explicit multi-transform selection enabled information indicates that explicit multi-transform selection is not enabled, inter prediction explicit multi-transform selection enabled information may be set to a second value (e.g., 0).

For example, when the current block is in an ISP (Intra Sub-block Partitions) mode, the determination may be made based on at least one of the width or the height of the current block, regardless of the intra prediction mode of the current block. Specifically, as in the example of Table 20 above, the horizontal transform type and the vertical transform type may be determined.

For example, when the current block is in an ISP (Intra Sub-block Partitions) mode, implicit multi-transform selection information may be set to a value indicating implicit multi-transform selection.

In addition, when intra prediction explicit multi-transform selection enabled information indicates that explicit multi-transform selection is not enabled, the prediction mode of the current block is an intra prediction mode, secondary inverse transform is not performed with respect to the current block, and the current block is not in a matrix based intra prediction mode, the implicit multi-transform selection information may be set to a value indicating implicit multi-transform selection.

Here, when implicit multi-transform selection information indicates implicit multi-transform selection, the horizontal transform type and the vertical transform type may be determined based on whether the current block is in an SBT (Sub-Block Transform) mode.

Specifically, when the implicit multi-transform selection information indicates implicit multi-transform selection and the current block is not in an SBT (Sub-Block Transform) mode, the horizontal transform type and the vertical transform type may be determined regardless of the intra prediction mode of the current block. Specifically, as in the example of Table 20 above, the horizontal transform type and the vertical transform type may be determined.

When the current block is in an ISP (Intra Sub-block Partitions) mode and secondary inverse transform is performed, the horizontal transform type and the vertical transform type may be determined as first transform indicating DCT-2 based integer transform regardless of implicit multi-transform selection information.

When the current block is a chroma component, the horizontal transform type and the vertical transform type may be determined as first transform indicating DCT-2 based integer transform, regardless of implicit multi-transform selection information.

In an encoder, for improving the subject/objective quality of an image, a primary transform coefficient may be generated by performing a primary transform for a residual block, a secondary transform coefficient may be generated by performing a secondary transform for the primary transform coefficient, a quantized coefficient level may be generated by quantizing the secondary transform coefficient, and the quantized coefficient level may be entropy encoded.

In a decoder, a quantized coefficient level may be entropy decoded, a secondary transform coefficient may be generated by dequantizing the quantized coefficient level, a primary transform coefficient may be generated by secondary-inverse transforming the secondary transform coefficient, and a reconstructed residual block may be generated by primary-inverse transforming the primary transform coefficient.

As shown in FIG. 49, a secondary transform may be performed between a primary transform and a quantization in an encoder. In addition, a secondary inverse transform may be performed between a dequantization and a primary inverse transform in a decoder. Herein, a secondary transform may be a reduced secondary transform or a low-frequency non-separable transform (LFNST).

At least one of transform matrix set information (index) and a transform matrix index indicating which transform is used as primary/secondary transform and inverse transform may be explicitly entropy encoded/decoded. Transform matrix set information and the transform matrix index may be included in secondary transform index information. Alternatively, a transform matrix index may mean secondary transform index information.

In addition, transform matrix set information and/or a transform matrix index indicating which transform is used as primary/secondary transform and inverse transform may not be entropy encoded/decoded. Instead, transform matrix set information and/or a transform matrix index may be implicitly determined based on at least one coding parameter.

Hereinafter will be described embodiments of an image encoding/decoding method and apparatus for performing at least one of primary/secondary transform and inverse transform and a recording medium for storing a bitstream.

In the present specification, a matrix A×B may mean a matrix with A columns and B rows, unless otherwise stated. Also, in a special case, it may mean a matrix with B columns and A rows.

The non-separable transform may be performed on the following input samples, thereby generating output samples.

In an encoder, input samples may be primary transform coefficients. In a decoder, input samples may be dequantized secondary transform coefficients.

As an example of 4×4 input samples, input samples may be expressed by a two-dimensional matrix form, as shown in Equation 8 below.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{[Equation 8]}$$

4×4 input samples in the two-dimensional matrix form may be expressed by a one-dimensional vector form, as shown in Equation 9 below.

$$\vec{X} = [X_{00}X_{01}X_{02}X_{03}X_{10}X_{11}X_{12}X_{13}X_{20}X_{21}X_{22}X_{23}X_{30}X_{31}X_{32}X_{33}]^T \quad \text{[Equation 9]}$$

The 4×4 input samples in the two-dimensional matrix form may be expressed by a one-dimensional vector form by using at least one of a raster scan, a horizontal scan, a vertical scan, a diagonal scan (up-right diagonal scan or down-left diagonal scan), a block-based diagonal scan, a block-based horizontal scan, and a block-based vertical scan.

A non-separable transform may be performed as described in Equation 10 below. Here, $\vec{F}$ may mean a secondary-transformed coefficient vector in an encoder. In addition, in a decoder, it may mean a one-dimensional transform coefficient vector. T may mean an example of secondary transform matrix with 16×16 size that is used for a 4×4 input sample.

$$\vec{F} = T \cdot \vec{X} \quad \text{[Equation 10]}$$

$\vec{F}$ in 16×1 form may be configured with 4×4 output samples by using at least one of a raster scan, a horizontal scan, a vertical scan, a diagonal scan (up-right diagonal scan or down-left diagonal scan), a block-based diagonal scan, a block-based horizontal scan, and a block-based vertical scan.

A secondary transform/inverse transform may be calculated by matrix multiplication, when performing a non-separable transform.

To reduce computational complexity and a memory necessary for storing a transform matrix, the dimension of the transform matrix may be reduced. A reduced secondary transform/inverse transform may be performed in a transform/inverse transform process.

A reduced secondary transform may be a process of mapping a N-dimensional vector to a R-dimensional vector. Here, the N-dimensional vector for secondary transform may mean input samples. In addition, the R-dimensional vector may mean output samples. Here, N and R may be positive integers, and R may be less than R in the reduced secondary transform.

N/R may mean a reduction factor. In the case of a reduced secondary transform with 4×4 size, a reduction factor may be 1, 2, or 4. In addition, in the case of a reduced secondary transform with 8×8 size, a reduction factor may be 2, 3, 4, 6 or 8.

In a reduced secondary transform, a R×N transform matrix may be used instead of an N×N transform matrix, as shown in FIG. 50. Also, in a reduced secondary inverse transform, an N×R transform matrix may be used instead of an N×N transform matrix. Here, the R×N transform matrix may mean a matrix with N columns and R rows. Here, in addition, the N×R transform matrix may mean a matrix with R columns and N rows.

Here, R rows of a transform matrix may mean a R basis vector with N dimensions. A reduced secondary inverse transform, which is an inverse transform of the reduced secondary transform, may be a transposed form of the reduced secondary transform.

As shown in FIG. 51, a secondary transform/inverse transform may be performed in an encoder/decoder.

For example, a transform matrix with a specific size may be used for a reduced secondary transform/inverse transform.

In the case of a reduced secondary transform with D×D size, a transform matrix with C×A or C×B size may be used.

When a C×A transform matrix is used, at least one of the primary transform coefficients included in an upper-left D×D region of a block may be used as an input sample.

In addition, when a C×A transform matrix is used, an output sample may be included in an upper-left E×E region within an upper-left D×D region of a block.

In the case of a reduced secondary transform with D×D size, a transform matrix with A×A size may be reduced to C×B size so that a transform matrix with C×B size may be used.

When a C×B transform matrix is used, at least one of the primary transform coefficients included in a remaining region except a lower-right E×E region within an upper-left D×D region of a block may be used as an input sample.

In addition, when a C×B transform matrix is used, an output sample may be included in an upper-left E×E region within an upper-left D×D region of a block.

In the case of a reduced secondary inverse transform with D×D size, a transform matrix with A×C or B×C size may be used.

When an A×C transform matrix is used, at least one of the dequantized secondary transform coefficients included in an upper-left E×E region within an upper-left D×D region of a block may be used as an input sample.

In addition, when an A×C transform matrix is used, an output sample may be included in an upper-left D×D region of a block.

In the case of a reduced secondary inverse transform with D×D size, a transform matrix with A×A size may be reduced to B×C size so that a transform matrix with B×C size may be used.

When a B×C transform matrix is used, at least one of the dequantized secondary transform coefficients included in an upper-left E×E region within an upper-left D×D region of a block may be used as an input sample.

In addition, when a B×C transform matrix is used, an output sample may be included in the remaining region except a lower-right E×E region within an upper-left D×D region of a block.

The A, B, C, D and E may be positive integers. For example, A, B, C, D and E may be 64, 48, 16, 8 and 4, respectively.

Here, C may be equal to or less than A or B.

In addition, B may be equal to or less than a value of D*D.

In addition, C may be a value of E*E.

In addition, E may be equal to or less than D.

As another example, a transform matrix with a specific size may be used for a reduced secondary transform/inverse transform.

In the case of a reduced secondary transform with D×D size, a transform matrix with C×A or C×B size may be used.

When a C×A transform matrix is used, at least one of the primary transform coefficients included in an upper-left D×D region of a block may be used as an input sample.

In addition, when a C×A transform matrix is used, an output sample may be included in an upper-left E×E region within an upper-left D×D region of a block.

In the case of a reduced secondary transform with D×D size, a transform matrix with A×A size may be reduced to C×B size so that a transform matrix with C×B size may be used.

When a C×B transform matrix is used, at least one of the primary transform coefficients included in a remaining region except a lower-right D×E region within an upper-left D×D region of a block may be used as an input sample.

In addition, when a C×B transform matrix is used, an output sample may be included in an upper-left E×E region within an upper-left D×D region of a block.

In the case of a reduced secondary inverse transform with D×D size, a transform matrix with A×C or B×C size may be used.

When an A×C transform matrix is used, at least one of the dequantized secondary transform coefficients included in an upper-left E×E region within an upper-left D×D region of a block may be used as an input sample.

In addition, when an A×C transform matrix is used, an output sample may be included in an upper-left D×D region of a block.

In the case of a reduced secondary inverse transform with D×D size, a transform matrix with A×A size may be reduced to B×C size so that a transform matrix with B×C size may be used.

When a B×C transform matrix is used, at least one of the dequantized secondary transform coefficients included in an upper-left E×E region within an upper-left D×D region of a block may be used as an input sample.

In addition, when a B×C transform matrix is used, an output sample may be included in the remaining region except a lower-right D×E region within an upper-left D×D region of a block.

The A, B, C, D and E may be positive integers. For example, A, B, C, D and E may be 64, 32, 16, 8 and 4, respectively.

Here, C may be equal to or less than A or B.

In addition, B may be equal to or less than a value of D*D.

In addition, C may be a value of E*E.

In addition, E may be equal to or less than D.

For example, at least one of a reduced secondary transform, a reduced secondary inverse transform, an input sample region, and an output sample region may be different according to a size of a current block.

For example, when a size of a current block is D×D, a transform matrix with C×B size may be used as a reduced secondary transform, and a transform matrix with B×C size may be used as a reduced secondary inverse transform. Embodiments of input and output samples of a reduced secondary transform/inverse transform may be described as follows.

- Input sample of a reduced secondary transform: at least one of primary transform coefficients included in an upper-left D×D region of a block
- Output sample of a reduced secondary transform: at least one of secondary transform coefficients included in an upper-left D×E region of a block
- Input sample of a reduced secondary inverse transform: at least one of secondary transform coefficients included in an upper-left D×E region of a block Output sample of a reduced secondary inverse transform: at least one of primary transform coefficients included in an upper-left D×D region of a block As another example, when a size of a current block is C×D or D×C, a transform matrix with B×B size may be used as a reduced secondary transform, and a transform matrix with B×B size may be used as a reduced secondary inverse transform. Embodiments of input and output samples of a reduced secondary transform/inverse transform may be described as follows.

Input sample of a reduced secondary transform: at least one of primary transform coefficients included in an upper-left D×D region of a block Output sample of a reduced secondary transform: at least one of secondary transform coefficients included in an upper-left D×D region of a block Input sample of a reduced secondary inverse transform: at least one of secondary transform coefficients included in an upper-left D×D region of a block Output sample of a reduced secondary inverse transform: at least one of primary transform coefficients included in an upper-left D×D region of a block As another example, when a size of a current block is N×D or D×N, a transform matrix with B×B size may be used as a reduced secondary transform, and a transform matrix with B×B size may be used as a reduced secondary inverse transform. Here, N may be a positive integer. For example, it may be equal to or greater than B. Embodiments of input and output samples of a reduced secondary transform/inverse transform may be described as follows.

Input sample of a reduced secondary transform: at least one of primary transform coefficients included in at least one of two upper-left D×D regions of a block Output sample of a reduced secondary transform: at least one of secondary transform coefficients included in at least one of two upper-left D×D regions of a block Input sample of a reduced secondary inverse transform: at least one of secondary transform coefficients included in at least one of two upper-left D×D regions of a block Output sample of a reduced secondary inverse transform: at least one of primary transform coefficients included in at least one of two upper-left D×D regions of a block As another example, when a size of a current block is C×C, a transform matrix with C×A size may be used as a reduced secondary transform, and a transform matrix with A×C size may be used as a reduced secondary inverse transform. Embodiments of input and output samples of a reduced secondary transform/inverse transform may be described as follows.

Input sample of a reduced secondary transform: at least one of primary transform coefficients included in a remaining region except a lower-right D×D region within an upper-left C×C region of a block Output sample of a reduced secondary transform: at least one of secondary transform coefficients included in an upper-left D×E region of a block Input sample of a reduced secondary inverse transform: at least one of secondary transform coefficients included in an upper-left D×E region of a block Output sample of a reduced secondary inverse transform: at least one of primary transform coefficients included in a remaining region except a lower-right D×D region within an upper-left C×C region of a block As another example, when a size of a current block is larger than C×C, a transform matrix with B×A size may be used as a reduced secondary transform, and a transform matrix with A×B size may be used as a reduced secondary inverse transform. Embodiments of input and output samples of a reduced secondary transform/inverse transform may be described as follows.

Input sample of a reduced secondary transform: at least one of primary transform coefficients included in a remaining region except a lower-right D×D region within an upper-left C×C region of a block Output sample of a reduced secondary transform: at least one of secondary transform coefficients included in an upper-left D×D region of a block Input sample of a reduced secondary inverse transform: at least one of secondary transform coefficients included in an upper-left D×D region of a block Output sample of a reduced secondary inverse transform: at least one of primary transform coefficients included in a remaining region except a lower-right D×D region within an upper-left C×C region of a block The A, B, C, D and E may be positive integers. For example, A, B, C, D and E may be 48, 16, 8, 4 and 2, respectively.

Here, C may be equal to or less than A or B.

In addition, B may be equal to or less than a value of D*D.

In addition, C may be a value of D*E.

In addition, E may be equal to or less than D.

As another example, at least one of a reduced secondary transform, a reduced secondary inverse transform, an input sample region, and an output sample region may be different according to a size of a current block.

For example, when a size of a current block is 4×4, a transform matrix with 8×16 size may be used as a reduced secondary transform, and a transform matrix with 16×8 size may be used as a reduced secondary inverse transform. Embodiments of input and output samples of a reduced secondary transform/inverse transform may be described as follows.

Input sample of a reduced secondary transform: at least one of primary transform coefficients included in an upper-left 4×4 region of a block Output sample of a reduced secondary transform: at least one of secondary transform coefficients included in an upper-left 4×2 region of a block Input sample of a reduced secondary inverse transform: at least one of secondary transform coefficients included in an upper-left 4×2 region of a block Output sample of a reduced secondary inverse transform: at least one of primary transform coefficients included in an upper-left 4×4 region of a block As another example, when a size of a current block is 8×4 or 4×8, a transform matrix with 16×16 size may be used as a reduced secondary transform, and a transform matrix with 16×16 size may be used as a reduced secondary inverse transform. Embodiments of input and output samples of a reduced secondary transform/inverse transform may be described as follows.

Input sample of a reduced secondary transform: at least one of primary transform coefficients included in an upper-left 4×4 region of a block Output sample of a reduced secondary transform: at least one of secondary transform coefficients included in an upper-left 4×4 region of a block Input sample of a reduced secondary inverse transform: at least one of secondary transform coefficients included in an upper-left 4×4 region of a block Output sample of a reduced secondary inverse transform: at least one of primary transform coefficients included in an upper-left 4×4 region of a block As another example, when a size of a current block is Nx4 or 4×N, a transform matrix with 16×16 size may be used as a reduced secondary transform, and a transform matrix with 16×16 size may be used as a reduced secondary inverse transform. Here, N may be a positive integer. For example, it may be equal to or greater than 16. Embodiments of input and output samples of a reduced secondary transform/inverse transform may be described as follows.

- Input sample of a reduced secondary transform: at least one of primary transform coefficients included in at least one of two upper-left 4×4 regions of a block
- Output sample of a reduced secondary transform: at least one of secondary transform coefficients included in at least one of two upper-left 4×4 regions of a block
- Input sample of a reduced secondary inverse transform: at least one of secondary transform coefficients included in at least one of two upper-left 4×4 regions of a block
- Output sample of a reduced secondary inverse transform: at least one of primary transform coefficients included in at least one of two upper-left 4×4 regions of a block As another example, when a size of a current block is 8×8, a transform matrix with 8×48 size may be used as a reduced secondary transform, and a transform matrix with 48×8 size may be used as a reduced secondary inverse transform. Embodiments of input and output samples of a reduced secondary transform/inverse transform may be described as follows.

- Input sample of a reduced secondary transform: at least one of primary transform coefficients included in a remaining region except a lower-right 4×4 region within an upper-left 8×8 region of a block
- Output sample of a reduced secondary transform: at least one of secondary transform coefficients included in an upper-left 4×2 region of a block
- Input sample of a reduced secondary inverse transform: at least one of secondary transform coefficients included in an upper-left 4×2 region of a block
- Output sample of a reduced secondary inverse transform: at least one of primary transform coefficients included in a remaining region except a lower-right 4×4 region within an upper-left 8×8 region of a block As another example, when a size of a current block is larger than 8×8, a transform matrix with 16×48 size may be used as a reduced secondary transform, and a transform matrix with 48×16 size may be used as a reduced secondary inverse transform. Embodiments of input and output samples of a reduced secondary transform/inverse transform may be described as follows.

- Input sample of a reduced secondary transform: at least one of primary transform coefficients included in a remaining region except a lower-right 4×4 region within an upper-left 8×8 region of a block
- Output sample of a reduced secondary transform: at least one of secondary transform coefficients included in an upper-left 4×4 region of a block
- Input sample of a reduced secondary inverse transform: at least one of secondary transform coefficients included in an upper-left 4×4 region of a block
- Output sample of a reduced secondary inverse transform: at least one of primary transform coefficients included in a remaining region except a lower-right 4×4 region within an upper-left 8×8 region of a block As another example, at least one of a reduced secondary transform, a reduced secondary inverse transform, an input sample region, and an output sample region may be different according to a size of a current block.

For example, when a size of a current block is 4×4, a transform matrix with 8×16 size may be used as a reduced secondary transform, and a transform matrix with 16×8 size may be used as a reduced secondary inverse transform. Embodiments of input and output samples of a reduced secondary transform/inverse transform may be described as follows.

- Input sample of a reduced secondary transform: at least one of primary transform coefficients included in an upper-left 4×4 region of a block
- Output sample of a reduced secondary transform: at least one of secondary transform coefficients included in an upper-left 4×2 region of a block
- Input sample of a reduced secondary inverse transform: at least one of secondary transform coefficients included in an upper-left 4×2 region of a block
- Output sample of a reduced secondary inverse transform: at least one of primary transform coefficients included in an upper-left 4×4 region of a block As another example, when a size of a current block is Nx4 or 4×N, a transform matrix with 16×16 size may be used as a reduced secondary transform, and a transform matrix with 16×16 size may be used as a reduced secondary inverse transform. Here, N may be a positive integer. For example, it may be equal to or greater than 8. Embodiments of input and output samples of a reduced secondary transform/inverse transform may be described as follows.

- Input sample of a reduced secondary transform: at least one of primary transform coefficients included in an upper-left 4×4 region of a block
- Output sample of a reduced secondary transform: at least one of secondary transform coefficients included in an upper-left 4×4 region of a block
- Input sample of a reduced secondary inverse transform: at least one of secondary transform coefficients included in an upper-left 4×4 region of a block
- Output sample of a reduced secondary inverse transform: at least one of primary transform coefficients included in an upper-left 4×4 region of a block As another example, when a size of a current block is 8×8, a transform matrix with 8×48 size may be used as a reduced secondary transform, and a transform matrix with 48×8 size may be used as a reduced secondary inverse transform. Embodiments of input and output samples of a reduced secondary transform/inverse transform may be described as follows.

- Input sample of a reduced secondary transform: at least one of primary transform coefficients included in a remaining region except a lower-right 4×4 region within an upper-left 8×8 region of a block
- Output sample of a reduced secondary transform: at least one of secondary transform coefficients included in an upper-left 4×2 region of a block
- Input sample of a reduced secondary inverse transform: at least one of secondary transform coefficients included in an upper-left 4×2 region of a block
- Output sample of a reduced secondary inverse transform: at least one of primary transform coefficients included in a remaining region except a lower-right 4×4 region within an upper-left 8×8 region of a block As another example, when a size of a current block is larger than 8×8, a transform matrix with 16×48 size may be used as a reduced secondary transform, and a transform matrix with 48×16 size may be used as a reduced secondary inverse transform. Embodiments of input and output samples of a reduced secondary transform/inverse transform may be described as follows.

Input sample of a reduced secondary transform: at least one of primary transform coefficients included in a remaining region except a lower-right 4×4 region within an upper-left 8×8 region of a block Output sample of a reduced secondary transform: at least one of secondary transform coefficients included in an upper-left 4×4 region of a block Input sample of a reduced secondary inverse transform: at least one of secondary transform coefficients included in an upper-left 4×4 region of a block Output sample of a reduced secondary inverse transform: at least one of primary transform coefficients included in a remaining region except a lower-right 4×4 region within an upper-left 8×8 region of a block As another example, at least one of a reduced secondary transform, a reduced secondary inverse transform, an input sample region, and an output sample region may be different according to a size of a current block.

For example, when a size of a current block is 4×4, a size of a current block is 8×4 or 4×8, or a size of a current block is Nx4 or 4×N, a transform matrix with 8×16 size may be used as a reduced secondary transform, and a transform matrix with 16×8 size may be used as a reduced secondary inverse transform. Here, N may be a positive integer. For example, it may be equal to or greater than 16. Embodiments of input and output samples of a reduced secondary transform/inverse transform may be described as follows.

Input sample of a reduced secondary transform: at least one of primary transform coefficients included in an upper-left 4×4 region of a block Output sample of a reduced secondary transform: at least one of secondary transform coefficients included in an upper-left 4×2 region or upper-left 2×4 region of a block Input sample of a reduced secondary inverse transform: at least one of secondary transform coefficients included in an upper-left 4×2 region or upper-left 2×4 region of a block Output sample of a reduced secondary inverse transform: at least one of primary transform coefficients included in an upper-left 4×4 region of a block As another example, when a size of a current block is 8×8, a transform matrix with 8×48 size may be used as a reduced secondary transform, and a transform matrix with 48×8 size may be used as a reduced secondary inverse transform. Embodiments of input and output samples of a reduced secondary transform/inverse transform may be described as follows.

Input sample of a reduced secondary transform: at least one of primary transform coefficients included in a remaining region except a lower-right 4×4 region within an upper-left 8×8 region of a block Output sample of a reduced secondary transform: at least one of secondary transform coefficients included in an upper-left 4×2 region of a block Input sample of a reduced secondary inverse transform: at least one of secondary transform coefficients included in an upper-left 4×2 region of a block Output sample of a reduced secondary inverse transform: at least one of primary transform coefficients included in a remaining region except a lower-right 4×4 region within an upper-left 8×8 region of a block.

As another example, when a size of a current block is larger than 8×8, a transform matrix with 16×48 size may be used as a reduced secondary transform, and a transform matrix with 48×16 size may be used as a reduced secondary inverse transform. Embodiments of input and output samples of a reduced secondary transform/inverse transform may be described as follows.

Input sample of a reduced secondary transform: at least one of primary transform coefficients included in a remaining region except a lower-right 4×4 region within an upper-left 8×8 region of a block Output sample of a reduced secondary transform: at least one of secondary transform coefficients included in an upper-left 4×4 region of a block Input sample of a reduced secondary inverse transform: at least one of secondary transform coefficients included in an upper-left 4×4 region of a block Output sample of a reduced secondary inverse transform: at least one of primary transform coefficients included in a remaining region except a lower-right 4×4 region within an upper-left 8×8 region of a block As another example, at least one of a reduced secondary transform, a reduced secondary inverse transform, an input sample region, and an output sample region may be different according to a size of a current block.

For example, when a size of a current block is 4×4, a transform matrix with 8×16 size may be used as a reduced secondary transform, and a transform matrix with 16×8 size may be used as a reduced secondary inverse transform. Embodiments of input and output samples of a reduced secondary transform/inverse transform may be described as follows.

Input sample of a reduced secondary transform: at least one of primary transform coefficients included in an upper-left 4×4 region of a block Output sample of a reduced secondary transform: at least one of secondary transform coefficients included in an upper-left 4×2 region of a block Input sample of a reduced secondary inverse transform: at least one of secondary transform coefficients included in an upper-left 4×2 region of a block Output sample of a reduced secondary inverse transform: at least one of primary transform coefficients included in an upper-left 4×4 region of a block As another example, when a size of a current block is 8×4 or 4×8, a transform matrix with 16×16 size may be used as a reduced secondary transform, and a transform matrix with 16×16 size may be used as a reduced secondary inverse transform. Embodiments of input and output samples of a reduced secondary transform/inverse transform may be described as follows.

Input sample of a reduced secondary transform: at least one of primary transform coefficients included in an upper-left 4×4 region of a block Output sample of a reduced secondary transform: at least one of secondary transform coefficients included in an upper-left 4×4 region of a block Input sample of a reduced secondary inverse transform: at least one of secondary transform coefficients included in an upper-left 4×4 region of a block Output sample of a reduced secondary inverse transform: at least one of primary transform coefficients included in an upper-left 4×4 region of a block As another example, when a size of a current block is Nx4 or 4×N, a transform matrix with 16×16 size may be used as a reduced secondary transform, and a transform matrix with 16×16 size may be used as a reduced secondary inverse transform. Here, N may be a positive integer. For example, it may be equal to or greater than 16. Embodiments of input and output samples of a reduced secondary transform/inverse transform may be described as follows.

Input sample of a reduced secondary transform: at least one of primary transform coefficients included in at least one of two upper-left 4×4 regions of a block Output sample of a reduced secondary transform: at least one of secondary transform coefficients included in at least one of two upper-left 4×4 regions of a block Input sample of a reduced secondary inverse transform: at least one of secondary transform coefficients included in at least one of two upper-left 4×4 regions of a block Output sample of a reduced secondary inverse transform: at least one of primary transform coefficients included in at least one of two upper-left 4×4 regions of a block As another example, when a size of a current block is 8×8 or a size of a current block is larger than 8×8, a transform matrix with 8×48 size may be used as a reduced secondary transform, and a transform matrix with 48×8 size may be used as a reduced secondary inverse transform. Embodiments of input and output samples of a reduced secondary transform/inverse transform may be described as follows.

Input sample of a reduced secondary transform: at least one of primary transform coefficients included in a remaining region except a lower-right 4×4 region within an upper-left 8×8 region of a block Output sample of a reduced secondary transform: at least one of secondary transform coefficients included in an upper-left 4×2 region of a block Input sample of a reduced secondary inverse transform: at least one of secondary transform coefficients included in an upper-left 4×2 region of a block Output sample of a reduced secondary inverse transform: at least one of primary transform coefficients included in a remaining region except a lower-right 4×4 region within an upper-left 8×8 region of a block As another example, at least one of a reduced secondary transform, a reduced secondary inverse transform, an input sample region, and an output sample region may be different according to a size of a current block.

For example, when a size of a current block is 4×4, a size of a current block is 8×4 or 4×8, or a size of a current block is Nx4 or 4×N, a transform matrix with 8×16 size may be used as a reduced secondary transform, and a transform matrix with 16×8 size may be used as a reduced secondary inverse transform. Here, N may be a positive integer. For example, it may be equal to or greater than 16. Embodiments of input and output samples of a reduced secondary transform/inverse transform may be described as follows.

Input sample of a reduced secondary transform: at least one of primary transform coefficients included in an upper-left 4×4 region of a block Output sample of a reduced secondary transform: at least one of secondary transform coefficients included in an upper-left 4×2 region or upper-left 2×4 region of a block Input sample of a reduced secondary inverse transform: at least one of secondary transform coefficients included in an upper-left 4×2 region or upper-left 2×4 region of a block Output sample of a reduced secondary inverse transform: at least one of primary transform coefficients included in an upper-left 4×4 region of a block As another example, when a size of a current block is 8×8 or a size of a current block is larger than 8×8, a transform matrix with 8×48 size may be used as a reduced secondary transform, and a transform matrix with 48×8 size may be used as a reduced secondary inverse transform. Embodiments of input and output samples of a reduced secondary transform/inverse transform may be described as follows.

Input sample of a reduced secondary transform: at least one of primary transform coefficients included in a remaining region except a lower-right 4×4 region within an upper-left 8×8 region of a block Output sample of a reduced secondary transform: at least one of secondary transform coefficients included in an upper-left 4×2 region of a block Input sample of a reduced secondary inverse transform: at least one of secondary transform coefficients included in an upper-left 4×2 region of a block Output sample of a reduced secondary inverse transform: at least one of primary transform coefficients included in a remaining region except a lower-right 4×4 region within an upper-left 8×8 region of a block As reduced secondary transform matrices, there may be a total of J transform matrix sets and a total of K non-separable transform matrices per each transform matrix set. Here, J and K may be positive integers. For example, J may be 4 and K may be 2.

Transform matrix set index lfnstTrSetIdx for a current block may be entropy encoded/decoded in at least one unit of CU, PU, TU, CB, PB and TB. Herein, in a decoder, a transform matrix set may be determined by using the entropy decoded transform matrix set index lfnstTrSetIdx.

A transform matrix set may be determined according to an intra-prediction mode of a current block. A transform matrix set may be determined according to at least one of coding parameters of a current block and a neighboring block. A transform matrix set may be determined according to a prediction mode of a current block.

For example, different transform matrix sets may be determined between a case where a prediction mode of a current block is an intra-prediction mode and a case where the prediction mode of the current block is an IBC mode. As another example, different transform matrix sets may be determined among cases where: a prediction mode of a current block is an intra-prediction mode; the prediction mode of the current block is an inter-prediction mode; and the prediction mode of the current block is an IBC mode.

A transform matrix set may be determined according to a color component of a current block. For example, different transform matrix sets may be determined between a case where a color component of a current block is Y (luma) and a case where the color component of the current block is Cb (chroma) or Cr (chroma).

A transform matrix set may be determined according to a size of a current block. For example, different transform matrix sets may be determined between a case where a size (product of horizontal size and vertical size) of a current block is equal to or less than 16 and a case where the size (product of horizontal size and vertical size) of the current block is greater than 16.

A transform matrix set may be determined according to a form of a current block. For example, different transform matrix sets may be determined between a case where a form of a current block is square and a case where the form of the current block is non-square.

A transform matrix set may be determined according to whether or not to partition a current block into sub-blocks during prediction. For example, different transform matrix sets may be determined between a case where a current block is partitioned into sub-blocks during prediction and a case where the current block is not partitioned into sub-blocks during prediction.

A transform matrix set may be determined according to whether or not to use primary transform of a current block.

As shown in Table 47, different transform matrix sets may be determined according to whether or not to use primary transform of a current block. Herein, even when primary transform/inverse transform is not performed for a current block, secondary transform/inverse transform may be performed.

For example, when information on whether or not to use primary transform (transform_skip_flag) has a first value (for example, 0), a first transform matrix set may be determined.

In addition, when information on whether or not to use primary transform (transform_skip_flag) does not have a first value (for example, 0), a second transform matrix set may be determined.

Here, the first transform matrix set and the second transform matrix set may be different from each other.

TABLE 47

| | | |
|---|---|---|
| Information on whether or not to use transform (transform_skip_flag) | 0 | 1 |
| Transform matrix set index (lfnstTrSetIdx) | 0 | 1 |

A transform matrix set may be determined according to a primary transform type of a current block.

As shown in Table 48, different transform matrix sets may be determined according to a type of primary transform for a current block.

(for example, 2)), a third transform matrix set may be determined. In addition, when a type for primary transform is a second transform (trTypeHor is a third value (for example, 2) or trTypeVer is a third value (for example, 2)), a second transform matrix set may be determined. Here, the first to third transform matrix sets may be different from one another.

As another example, when a type for primary transform is a first transform (DCT-2 based integer transform or trTypeHor is a first value (for example, 0) or trTypeVer is a first value (for example, 0)), a first transform matrix set may be determined. In addition, when a type for primary transform is a second transform (trTypeHor is a second value (for example, 1) or trTypeVer is a second value (for example, 1)), a second transform matrix set may be determined. In addition, when a type for primary transform is a second transform (trTypeHor is a third value (for example, 2) or trTypeVer is a second value (for example, 1)), a third transform matrix set may be determined. In addition, when a type for primary transform is a second transform (trTypeHor is a second value (for example, 1) or trTypeVer is a third value (for example, 2)), a third transform matrix set may be determined. In addition, when a type for primary transform is a second transform (trTypeHor is a third value (for example, 2) or trTypeVer is a third value (for example, 2)), a first transform matrix set may be determined. Here, the first to third transform matrix sets may be different from one another.

TABLE 48

| | | | | | |
|---|---|---|---|---|---|
| Horizontal transform type (trTypeHor) | 0 (DCT-2) | 1 (DCT-7) | 2 (DCT-8) | 1 (DCT-7) | 2 (DCT-8) |
| Vertical transform type (trTypeVer) | 0 (DCT-2) | 1 (DCT-7) | 1 (DCT-7) | 2 (DCT-8) | 2 (DCT-8) |
| Transform matrix set index (lfnstTrSetIdx) | 0 | 3 | 2 | 1 | 0 |

For example, when a type for primary transform is a first transform (DCT-2 based integer transform or trTypeHor is a first value (for example, 0) or trTypeVer is a first value (for example, 0)), a first transform matrix set may be determined.

For example, when a type for primary transform is a second transform (DCT-2 based integer transform or trTypeHor is not a first value (for example, 0) or trTypeVer is not a first value (for example, 0)), a second transform matrix set may be determined.

Here, the first transform matrix set and the second transform matrix set may be different from each other.

As another example, when a type for primary transform is a first transform (DCT-2 based integer transform or trTypeHor is a first value (for example, 0) or trTypeVer is a first value (for example, 0)), a first transform matrix set may be determined. In addition, when a type for primary transform is a second transform (trTypeHor is a second value (for example, 1) or trTypeVer is a second value (for example, 1)), a second transform matrix set may be determined. In addition, when a type for primary transform is a second transform (trTypeHor is a third value (for example, 2) or trTypeVer is a second value (for example, 1)), a third transform matrix set may be determined. In addition, when a type for primary transform is a second transform (trTypeHor is a second value (for example, 1) or trTypeVer is a third value As another example, when a type for primary transform is a first transform (DCT-2 based integer transform or trTypeHor is a first value (for example, 0) or trTypeVer is a first value (for example, 0)), a first transform matrix set may be determined. In addition, when a type for primary transform is a second transform (trTypeHor is a second value (for example, 1) or trTypeVer is a second value (for example, 1)), a first transform matrix set may be determined. In addition, when a type for primary transform is a second transform (trTypeHor is a third value (for example, 2) or trTypeVer is a second value (for example, 1)), a third transform matrix set may be determined. In addition, when a type for primary transform is a second transform (trTypeHor is a second value (for example, 1) or trTypeVer is a third value (for example, 2)), a third transform matrix set may be determined. In addition, when a type for primary transform is a second transform (trTypeHor is a third value (for example, 2) or trTypeVer is a third value (for example, 2)), a second transform matrix set may be determined. Here, the first to third transform matrix sets may be different from one another.

As another example, when a type for primary transform is a first transform (DCT-2 based integer transform or trTypeHor is a first value (for example, 0) or trTypeVer is a first value (for example, 0)), a first transform matrix set may be determined. In addition, when a type for primary transform is a second transform (trTypeHor is a second value (for example, 1) or trTypeVer is a second value (for example, 1)), a second transform matrix set may be determined. In addition, when a type for primary transform is a second transform (trTypeHor is a third value (for example, 2) or trTypeVer is a second value (for example, 1)), a third transform matrix set may be determined. In addition, when a type for primary transform is a second transform (trTypeHor is a second value (for example, 1) or trTypeVer is a third value (for example, 2)), a fourth transform matrix set may be determined. In addition, when a type for primary transform is a second transform (trTypeHor is a third value (for example, 2) or trTypeVer is a third value (for example, 2)), a first transform matrix set may be determined. Here the first to fourth transform matrix sets may be different from one another.

As another example, when a type for primary transform is a first transform (DCT-2 based integer transform or trTypeHor is a first value (for example, 0) or trTypeVer is a first value (for example, 0)), a first transform matrix set may be determined. In addition, when a type for primary transform is a second transform (trTypeHor is a second value (for example, 1) or trTypeVer is a second value (for example, 1)), a second transform matrix set may be determined. In addition, when a type for primary transform is a second transform (trTypeHor is a third value (for example, 2) or trTypeVer is a second value (for example, 1)), a third transform matrix set may be determined. In addition, when a type for primary transform is a second transform (trTypeHor is a second value (for example, 1) or trTypeVer is a third value (for example, 2)), a fourth transform matrix set may be determined. In addition, when a type for primary transform is a second transform (trTypeHor is a third value (for example, 2) or trTypeVer is a third value (for example, 2)), a second transform matrix set may be determined. Here the first to fourth transform matrix sets may be different from one another.

As another example, when a type for primary transform is a first transform (DCT-2 based integer transform or trTypeHor is a first value (for example, 0) or trTypeVer is a first value (for example, 0)), a first transform matrix set may be determined. In addition, when a type for primary transform is a second transform (trTypeHor is a second value (for example, 1) or trTypeVer is a second value (for example, 1)), a first transform matrix set may be determined. In addition, when a type for primary transform is a second transform (trTypeHor is a third value (for example, 2) or trTypeVer is a second value (for example, 1)), a third transform matrix set may be determined. In addition, when a type for primary transform is a second transform (trTypeHor is a second value (for example, 1) or trTypeVer is a third value (for example, 2)), a fourth transform matrix set may be determined. In addition, when a type for primary transform is a second transform (trTypeHor is a third value (for example, 2) or trTypeVer is a third value (for example, 2)), a second transform matrix set may be determined. Here the first to fourth transform matrix sets may be different from one another.

As another example, when a type for primary transform is a first transform (DCT-2 based integer transform or trTypeHor is a first value (for example, 0) or trTypeVer is a first value (for example, 0)), a first transform matrix set may be determined. In addition, when a type for primary transform is a second transform (trTypeHor is a second value (for example, 1) or trTypeVer is a second value (for example, 1)), a second transform matrix set may be determined. In addition, when a type for primary transform is a second transform (trTypeHor is a third value (for example, 2) or trTypeVer is a second value (for example, 1)), a third transform matrix set may be determined. In addition, when a type for primary transform is a second transform (trTypeHor is a second value (for example, 1) or trTypeVer is a third value (for example, 2)), a fourth transform matrix set may be determined. In addition, when a type for primary transform is a second transform (trTypeHor is a third value (for example, 2) or trTypeVer is a third value (for example, 2)), a fifth transform matrix set may be determined. Here, the first to fifth transform matrix sets may be different from one another.

A transform matrix set may be determined according to a two-dimensional transform combination of a current block.

As shown in Table 49, different transform matrix sets may be determined according to a two-dimensional transform combination of a current block.

For example, when the multi-transform selection index mts_idx is a first value (for example, 0), a first transform matrix set may be determined. In addition, when the multi-transform selection index mts_idx is not a first value (for example, 0), a second transform matrix set may be determined. Here, the first transform matrix set and the second transform matrix set may be different from each other.

For example, when the multi-transform selection index mts_idx is a first value (for example, 0), a first transform matrix set may be determined. In addition, when the multi-transform selection index mts_idx is a second value (for example, 1), a second transform matrix set may be determined. In addition, when the multi-transform selection index mts_idx is a third value (for example, 2), a third transform matrix set may be determined. In addition, when the multi-transform selection index mts_idx is a fourth value (for example, 3), a third transform matrix set may be determined. In addition, when the multi-transform selection index mts_idx is a fifth value (for example, 4), a second transform matrix set may be determined. Here, the first to third transform matrix sets may be different from one another.

For example, when the multi-transform selection index mts_idx is a first value (for example, 0), a first transform matrix set may be determined. In addition, when the multi-transform selection index mts_idx is a second value (for example, 1), a second transform matrix set may be determined. In addition, when the multi-transform selection index mts_idx is a third value (for example, 2), a third transform matrix set may be determined. In addition, when the multi-transform selection index mts_idx is a fourth value (for example, 3), a third transform matrix set may be determined. In addition, when the multi-transform selection index mts_idx is a fifth value (for example, 4), a first transform matrix set may be determined. Here, the first to third transform matrix sets may be different from one another.

For example, when the multi-transform selection index mts_idx is a first value (for example, 0), a first transform matrix set may be determined. In addition, when the multi-transform selection index mts_idx is a second value (for example, 1), a first transform matrix set may be determined. In addition, when the multi-transform selection index mts_idx is a third value (for example, 2), a third transform matrix set may be determined. In addition, when the multi-transform selection index mts_idx is a fourth value (for example, 3), a third transform matrix set may be determined. In addition, when the multi-transform selection index mts_idx is a fifth value (for example, 4), a second transform matrix set may be determined. Here, the first to third transform matrix sets may be different from one another.

TABLE 49

| Multi-transform selection index (mts_idx) | 0 | 1 | 2 | 3 | 4 |
|---|---|---|---|---|---|
| Transform matrix set index (lfnstTrSetIdx) | 0 | 3 | 2 | 1 | 0 |

For example, when the multi-transform selection index mts_idx is a first value (for example, 0), a first transform matrix set may be determined. In addition, when the multi-transform selection index mts_idx is a second value (for example, 1), a second transform matrix set may be determined. In addition, when the multi-transform selection index mts_idx is a third value (for example, 2), a third transform matrix set may be determined. In addition, when the multi-transform selection index mts_idx is a fourth value (for example, 3), a fourth transform matrix set may be determined. In addition, when the multi-transform selection index mts_idx is a fifth value (for example, 4), a first transform matrix set may be determined. Here the first to fourth transform matrix sets may be different from one another.

For example, when the multi-transform selection index mts_idx is a first value (for example, 0), a first transform matrix set may be determined. In addition, when the multi-transform selection index mts_idx is a second value (for example, 1), a second transform matrix set may be determined. In addition, when the multi-transform selection index mts_idx is a third value (for example, 2), a third transform matrix set may be determined. In addition, when the multi-transform selection index mts_idx is a fourth value (for example, 3), a fourth transform matrix set may be determined. In addition, when the multi-transform selection index mts_idx is a fifth value (for example, 4), a second transform matrix set may be determined. Here the first to fourth transform matrix sets may be different from one another.

For example, when the multi-transform selection index mts_idx is a first value (for example, 0), a first transform matrix set may be determined. In addition, when the multi-transform selection index mts_idx is a second value (for example, 1), a second transform matrix set may be determined. In addition, when the multi-transform selection index mts_idx is a third value (for example, 2), a third transform matrix set may be determined. In addition, when the multi-transform selection index mts_idx is a fourth value (for example, 3), a fourth transform matrix set may be determined. In addition, when the multi-transform selection index mts_idx is a fifth value (for example, 4), a first transform matrix set may be determined. Here the first to fourth transform matrix sets may be different from one another.

For example, when the multi-transform selection index mts_idx is a first value (for example, 0), a first transform matrix set may be determined. In addition, when the multi-transform selection index mts_idx is a second value (for example, 1), a first transform matrix set may be determined. In addition, when the multi-transform selection index mts_idx is a third value (for example, 2), a third transform matrix set may be determined. In addition, when the multi-transform selection index mts_idx is a fourth value (for example, 3), a fourth transform matrix set may be determined. In addition, when the multi-transform selection index mts_idx is a fifth value (for example, 4), a second transform matrix set may be determined. Here, the first to fifth transform matrix sets may be different from one another.

According to an embodiment, after the transform matrix index lfnst_idx is signaled, the multi-transform selection index mts_idx may be signaled. In addition, a multi-transform selection index may be signaled adaptively to a transform matrix index. For example, when a transform matrix index has a first value (for example, 0), that is, when secondary transform/inverse transform is not applied to a current block, a multi-transform selection index may be signaled. On the other hand, when a transform matrix index does not have a first value, that is, when secondary transform/inverse transform is applied to a current block, a multi-transform selection index may not be signaled.

Herein, a non-separable transform matrix in each transform matrix set may be determined according to the transform matrix index lfnst_idx. Here, the transform matrix index lfnst_idx may be entropy encoded/decoded. In the following case, where the transform matrix index lfnst_idx is not a first value (for example, 0), a transform index may be selected according to a value of the transform matrix index lfnst_idx, and the selected transform matrix may be used for a reduced secondary transform/inverse transform.

The transform matrix index may be signaled in an intra block.

The transform matrix index may be signaled when at least one of a horizontal size and a vertical size of a current block is equal to or greater than N. Here, N may be a positive integer. For example, it may be 4. The transform matrix index may be signaled when an intra sub-block partitioning type (IntraSubPartitionsSplitType) is identical with ISP_NO_SPLIT. The transform matrix index may be signaled when no matrix based intra prediction mode is used. Herein, when information on whether or not to use a matrix based intra prediction mode (intra_mip_flag) has a first value (for example, 0), a transform matrix index may be signaled.

According to an embodiment, when a size of a current block is less than a predetermined threshold, a transform matrix index may be signaled. For example, when the larger value of height and width of a current block is less than a predetermined threshold, a transform matrix index may be signaled. The threshold may be a value indicating a maximum size of a transform block (MaxTbSizeY).

According to an embodiment, depending on the position of a last non-zero transform coefficient of a current block, whether or not to signal the transform matrix index lfnst_idx may be determined. For example, when a last non-zero transform coefficient of a current block is positioned on the upper-left corner of the current block, since there is only one non-zero transform coefficient in the current block, second transform/inverse transform is not performed. Accordingly, in this case, the transform matrix index lfnst_idx may not be signaled. Herein, it may be determined that secondary transform/inverse transform is not performed for a current block.

According to another embodiment, when there is a non-zero transform coefficient outside the application region of secondary inverse transform for a current block, the transform matrix index lfnst_idx may not be signaled. For example, the application region of secondary inverse transform of a current block may be an upper-left sub-block of the current block. A size of a sub-block of a block with 4×4 or larger size may be determined as 4×4. The upper-left sub-block means a sub-block immediately adjacent to the upper-left corner of the block. When a sub-block in which a last transform coefficient of a current block is positioned is not an upper-left sub-block of the current block, the transform matrix index lfnst_idx may not be signaled. Herein, it may be determined that secondary transform/inverse transform is not performed for a current block. Herein, a sub-block may mean a coefficient group.

According to yet another embodiment, the application region of secondary inverse transform of a current block may be a part of an upper-left sub-block of the current block. For example, when a size of a current block is 4×4 or 8×8, the application region of secondary inverse transform of a current block may be determined according to first eight transform coefficients in the scanning order of an upper-left sub-block. Accordingly, when a last transform coefficient of a current block is in the 9th position or later in a scanning order, the transform matrix index lfnst_idx may not be signaled. Herein, it may be determined that secondary transform/inverse transform is not performed for a current block.

The transform matrix index may be signaled when no intra residual DPCM method is used. Herein, when information on whether or not to use an intra residual DPCM method (intra_bdpcm_flag) has a first value (for example, 0), a transform matrix index may be signaled.

In addition, when information on whether or not to use an intra residual DPCM method (intra_bdpcm_flag) has a first value (for example, 0), a transform skip mode flag may be implicitly determined as a first value (for example, 0). In the present specification, a transform skip mode may mean a transform omission mode. When a transform skip mode flag is a first value (for example, 0), at least one of primary transform/inverse transform and secondary transform/inverse transform may be performed. In addition, when a transform skip mode flag is a second value (for example, 1), primary transform/inverse transform and secondary transform/inverse transform may not be performed.

The transform matrix index may not be signaled when an intra residual DPCM method is used. Herein, when information on whether or not to use an intra residual DPCM method (intra_bdpcm_flag) has a second value (for example, 1), a transform matrix index may not be signaled.

When the intra residual DPCM method is used, a transform skip mode flag may not be encoded/decoded/obtained. In an intra residual DPCM method, a transform process of residual signal may be skipped. Accordingly, when a DPCM method is applied to the intra residual signal, a transform skip mode flag may be implicitly determined as a second value (for example, 1). In other words, transform/inverse transform may not be performed for a current block. In addition, when the intra residual DPCM method is used, since transform/inverse transform is not performed for a current block, a transform matrix index may not be signaled.

When the intra residual DPCM method is not used, a transform skip mode flag indicating whether or not to perform transform/inverse transform for a residual signal of a current block may be encoded/decoded/obtained. Accordingly, whether or not transform/inverse transform is applied to a current block may be determined, according to a transform skip mode flag.

A method of encoding/decoding/obtaining and determining a transform skip mode flag according to whether or not to use an intra residual DPCM method may be independently determined for each color component.

The transform matrix index may be signaled when an intra reference sample line indicator is 0. Herein, when an intra reference sample line indicator (intra_luma_ref_idx) is a first value (for example, 0), a transform matrix index may be signaled. When the reference sample line indicator is 0, intra prediction may be performed by using a nearest neighboring reference sample of a current block.

The transform matrix index may be signaled when an intra luma MPM flag (intra_luma_mpm_flag) is a second value (for example, 1).

The transform matrix index may be signaled when at least one of a horizontal size and a vertical size of a current block is less than N. Here, N may be a positive integer. For example, it may be 128.

According to an embodiment, the transform matrix index may be signaled according to the multi-transform selection index mts_idx.

For example, when the multi-transform selection index mts_idx is an M-th value (for example, M−1), the transform matrix index may be signaled. Herein, when the multi-transform selection index mts_idx is an M-th value (for example, M−1), a reduced secondary transform/inverse transform may be performed.

As another example, when the multi-transform selection index mts_idx is not an M-th value (for example, M−1), the transform matrix index may not be signaled. Herein, when the multi-transform selection index mts_idx is not an M-th value (for example, M−1), a reduced secondary transform/inverse transform may not be performed.

Herein, M may be a positive integer equal to or greater than 1. For example, M may be 1.

According to an embodiment, when a current block is not partitioned into sub-blocks, the transform matrix index may be signaled. In addition, when a current block is partitioned into sub-blocks according to a first sub-block partitioning mode or a second sub-block partitioning mode, the transform matrix index may not be signaled. The current block may be CTU/CTB, CU/CB, TU/TB, etc.

According to another embodiment, the transform matrix index may be signaled, irrespective of whether or not a current block is partitioned into sub-blocks. Accordingly, secondary transform/inverse transform may be applied to a sub-block of a current block, according to the transform matrix index.

The transform matrix index may be signaled when at least one of a coded block flag in CU, a Y (luma) component coded block flag in TU/TB, a Cb (chroma) component coded block flag in TU/TB and a Cr (chroma) component coded block flag in TU/TB is a second value (for example, 1).

For example, when an coded block flag in CU is a second value (for example, 1), a transform matrix index may be signaled in a CU, and a reduced secondary transform/inverse transform may be performed in the corresponding CU.

For another example, when a Y (luma) component coded block flag in TU/TB is a second value (for example, 1), a transform matrix index may be signaled in a TU/TB, and a reduced secondary transform/inverse transform may be performed in the corresponding TU/TB.

For another example, when a Cb (chroma) component coded block flag in TU/TB is a second value (for example, 1), a transform matrix index may be signaled in a TU/TB, and a reduced secondary transform/inverse transform may be performed in the corresponding TU/TB.

For another example, when a Cr (chroma) component coded block flag in TU/TB is a second value (for example, 1), a transform matrix index may be signaled in a TU/TB, and a reduced secondary transform/inverse transform may be performed in the corresponding TU/TB.

When the transform matrix index is not present in a bitstream, it may be inferred as a first value (for example, 0).

According to tu_joint_cbcr_residual that is an indicator for an encoding/decoding method aggregating residual signals of chroma signals (Cb component and Cr component), the transform matrix index lfnst_idx may not be entropy encoded/decoded in a block (TB, TC) where tu_joint_cbcr_residual corresponds to a second value (for example, 1). In addition, the transform matrix index lfnst_idx may be entropy encoded/decoded in a block (TB, TU) where tu_joint_cbcr_residual corresponds to a first value (for example, 0).

For example, when a residual signal of a specific component is not present in a bitstream due to tu_joint_cbcr_residual, the transform matrix index lfnst_idx may not be entropy encoded/decoded in a block (TB, TU) for the corresponding component.

Here, tu_joint_cbcr_residual may mean whether or not a residual signal of a Cb component is used to derive a residual signal of a Cb component and a Cr component.

For example, when tu_joint_cbcr_residual is a first value (for example, 0), a residual signal of a Cr component may be present in a bitstream according to another syntax element value. In addition, when tu_joint_cbcr_residual is a second value (for example, 1), a residual signal of a Cb component may be used to derive a residual signal of a Cb component and a Cr component.

When tu_joint_cbcr_residual means whether or not a residual signal of a Cb component is used to derive a residual signal of a Cb component and a Cr component, a residual signal for a Cr component may not be present in a bitstream. In such a case, the transform matrix index lfnst_idx may not be entropy encoded/decoded in a block (TB, TU) for a Cr component.

In addition, tu_joint_cbcr_residual may mean whether or not a residual signal of a Cr component is used to derive a residual signal of a Cb component and a Cr component.

For example, when tu_joint_cbcr_residual is a first value (for example, 0), a residual signal of a Cb component may be present in a bitstream according to another syntax element value. In addition, when tu_joint_cbcr_residual is a second value (for example, 1), a residual signal of a Cr component may be used to derive a residual signal of a Cb component and a Cr component.

When tu_joint_cbcr_residual means whether or not a residual signal of a Cr component is used to derive a residual signal of a Cb component and a Cr component, a residual signal for a Cb component may not be present in a bitstream. In such a case, the transform matrix index lfnst_idx may not be entropy encoded/decoded in a block (TB, TU) for a Cb component.

According to an embodiment, tu_joint_cbcr_residual may be signaled when both tu_cb_coded_flag, that is, information on whether or not there is a transform coefficient of a Cb component, and tu_cr_coded_flag, that is, information on whether or not there is a transform coefficient of a Cr component indicate a second value (for example, 1). Alternatively, tu_joint_cbcr_residual may be signaled, when a current block is intra predicted and either tu_cb_coded_flag, that is, information on whether or not there is a transform coefficient of a Cb component, or tu_cr_coded_flag, that is, information on whether or not there is a transform coefficient of a Cr component indicates a second value (for example, 1).

When tu_joint_cbcr_residual indicates a second value (for example, 1), according to tu_cb_coded_flag, tu_cr_coded_flag and joint_cbcr_sign_flag, transform coefficients of a Cb component and a Cr component may be determined as follows.

According to joint_cbcr_sign_flag indicating whether or not transform coefficients of a Cb component and a Cr component have a same sign, signs of the Cb component and the Cr component may be determined. For example, when joint_cbcr_sign_flag indicates that transform coefficients of a Cb component and a Cr component have a same sign, it may be determined that the Cb component and the Cr component have a same sign. On the contrary, when joint_cbcr_sign_flag indicates that transform coefficients of a Cb component and a Cr component have opposite signs, it may be determined that signs of the Cb component and the Cr component are opposite to each other.

When both tu_cb_coded_flag and tu_cr_coded_flag indicate a second value (for example, 1) or when tu_cb_coded_flag indicates a second value (for example, 1) and tu_cr_coded_flag indicates a first value (for example, 0), a transform coefficient of a Cb component may be signaled. In addition, when tu_cr_coded_flag indicates a second value (for example, 1) and tu_cb_coded_flag indicates a first value (for example, 0), a transform coefficient of a Cr component may be signaled.

When both tu_cb_coded_flag and tu_cr_coded_flag indicate a second value (for example, 1), it may be determined that a transform coefficient of a Cr component and a transform coefficient of a Cb component have a same absolute value. Accordingly, when joint_cbcr_sign_flag indicates that transform coefficients of a Cb component and a Cr component have a same sign, it may be determined that the transform coefficient of the Cr component is the same as that of the signaled Cb component. On the contrary, when joint_cbcr_sign_flag indicates that transform coefficients of a Cb component and a Cr component do not have a same sign, the transform coefficient of the Cr component may be determined as −1 times the transform coefficient of the signaled Cb component.

When tu_cb_coded_flag indicates a second value (for example, 1) and tu_cr_coded_flag indicates a first value (for example, 0), an absolute value of a transform coefficient of a Cr component may be determined from a value obtained by dividing an absolute value of a transform coefficient of a Cb component by 2. Accordingly, when joint_cbcr_sign_flag indicates that transform coefficients of a Cb component and a Cr component have a same sign, the transform coefficient of the Cr component may be determined from a value obtained by dividing the transform coefficient of the signaled Cb component by 2. On the contrary, when joint_cbcr_sign_flag indicates that transform coefficients of a Cb component and a Cr component do not have a same sign, the transform coefficient of the Cr component may be determined from a value obtained by dividing the transform coefficient of the signaled Cb component by −2.

When tu_cr_coded_flag indicates a second value (for example, 1) and tu_cb_coded_flag indicates a first value (for example, 0), an absolute value of a transform coefficient of a Cb component may be determined from a value obtained by dividing an absolute value of a transform coefficient of a Cr component by 2. Accordingly, when joint_cbcr_sign_flag indicates that transform coefficients of a Cb component and a Cr component have a same sign, the transform coefficient of the Cb component may be determined from a value obtained by dividing the transform coefficient of the signaled Cr component by 2. On the contrary, when joint_cbcr_sign_flag indicates that transform coefficients of a Cb component and a Cr component do not have a same sign, the transform coefficient of the Cb component may be determined from a value obtained by dividing the transform coefficient of the signaled Cr component by −2.

Information on whether or not the transform coefficient exists may mean a coding block flag.

For example, when a reduced secondary transform with 8×8 size using a 16×48 transform matrix is performed, a transform coefficient that is not zero (non-zero coefficient) may be generated in an upper-left 4×4 region within an upper-left 8×8 region of a block.

In other words, only a transform coefficient having a value of 0 (zero coefficient) may be generated in the remaining region except an upper-left 4×4 region within an upper-left 8×8 region of a block.

Accordingly, when there is a non-zero transform coefficient in the remaining region except an upper-left 4×4 region within an upper-left 8×8 region of a block, a transform matrix index may not be entropy encoded/decoded on the ground that no reduced secondary transform is performed. In such a case, as a transform matrix index is inferred as a first value (for example, 0), reduced secondary transform/inverse transform may not be performed.

In addition, irrespective of whether or not the non-zero transform coefficient exists, a transform matrix index may be entropy encoded/decoded.

For example, in the case of a dual tree structure, a transform matrix index for a luma component and a transform matrix index for a chroma component may be signaled, respectively.

As another example, in the case of a non-dual tree structure (or in the case of an inter-picture slice), a transform matrix index for a luma component and a transform matrix index for a chroma component may be jointly signaled.

In a secondary transform, a 4×4 non-separable transform or an 8×8 non-separable transform may be performed according to a block (TB or TU) size.

For example, a 4×4 non-separable transform may be used, when the smaller value of the horizontal size and the vertical size of a current block is less than N. Here, N may be a positive integer. For example, N may be 8.

When Min (horizontal size of a current block, vertical size of the current block)<8, 4×4 non-separable transform/inverse transform may be used for the current block.

Also, for example, an 8×8 non-separable transform may be used, when the smaller value of the horizontal size and the vertical size of a current block is greater than N. Here, N may be a positive integer. For example, N may be 4.

When Min (horizontal size of a current block, vertical size of the current block)>4, 8×8 non-separable transform/inverse transform may be used for the current block.

For example, both the horizontal size and the vertical size of a current block are equal to or greater than N, an 8×8 reduced secondary transform may be performed. Here, N may be a positive integer. For example, N may be 8.

Otherwise, as another example, (when both the horizontal size and the vertical size of a current block are neither equal to nor greater than N), a 4×4 reduced secondary transform may be performed. Here, N may be a positive integer. For example, N may be 8.

When at least one of inter-picture slice and intra-picture slice is an intra block (at least one of a coding block, a prediction block, and a transform block), a reduced secondary transform/inverse transform may be performed for at least one of a luma component and a chroma component.

In addition, a reduced secondary transform/inverse transform may be performed when the following conditions are all satisfied.

The horizontal size or the vertical size of a current block is equal to or greater than N (Here, N may be a positive integer. For example, N may be 4).

Transform skip mode flag (information on whether or not to use a transform: transform_skip_flag) is a first value (for example, 0).

In a secondary transform, a 4×4 non-separable transform or an 8×8 non-separable transform may be performed according to a block (TB or TU) size.

For example, a 4×4 non-separable transform may be used, when the smaller value of the horizontal size and the vertical size of a current block is less than N. Here, N may be a positive integer. For example, N may be 8.

When Min (horizontal size of a current block, vertical size of the current block)<8, 4×4 non-separable transform/inverse transform may be used for the current block.

Also, for example, an 8×8 non-separable transform may be used, when the smaller value of the horizontal size and the vertical size of a current block is greater than N. Here, N may be a positive integer. For example, N may be 4.

When Min (horizontal size of a current block, vertical size of the current block)>4, 8×8 non-separable transform/inverse transform may be used for the current block.

The non-separable transform may mean a reduced secondary transform.

Depending on whether or not a reduced secondary transform/inverse transform is performed, deblocking filtering may be performed on a block boundary.

For example, when a reduced secondary transform/inverse transform is performed for at least one of neighboring blocks adjacent to a block boundary, the block boundary may be set as a target block boundary to be deblocking filtered. Also, deblocking filtering may be performed for the block boundary.

As another example, when none of the neighboring blocks adjacent to a block boundary undergoes a secondary transform/inverse transform, the block boundary may not be set as a target block boundary to be deblocking filtered. Also, deblocking filtering may not be performed for the block boundary.

Hereinafter will be described syntax element information necessary for implementing a reduced secondary transform/inverse transform in an encoder/decoder, meaning of syntax element information, and an embodiment of encoding/decoding process.

Syntax element information necessary for reduced secondary transform/inverse transform may include at least one of sps_lfnst_enabled_flag, which is information on whether or not a reduced secondary transform/inverse transform is performed in a sequence unit, a transform matrix index lfnst_idx, and transform matrix set information.

Tables 50 to 63 show an example of syntax element information necessary for reduced secondary transform/inverse transform and an example of deriving a transform matrix set index according to an intra-prediction mode (predModeIntra). At least one of syntax elements necessary for reduced secondary transform/inverse transform may be entropy encoded/decoded in at least one of a parameter set, a header, a brick, a coding tree unit (CTU), a coding unit (Coding Unit), a prediction unit (PU), a transform unit (TU), a coding block (CB), a prediction block (PB), and a transform block (TB).

Herein, a parameter set may be at least one of a video parameter set, a decoding parameter set, a sequence parameter set, an adaptation parameter set, and a picture parameter set. A header may be at least one of a picture header, a sub-picture header, a slice header, a tile group header, and a tile header.

Herein, when using a syntax element for the reduced secondary transform/inverse transform in at least one of the signaled units including a parameter set, a header, a brick, a CTU, a CU, a PU, a TU, a CB, a PB, and a TB, a reduced secondary transform/inverse transform may be performed.

For example, when a syntax element for the reduced secondary transform/inverse transform is entropy encoded/decoded in a sequence parameter set, a reduced secondary transform/inverse transform may be performed by using a syntax element for reduced secondary transform/inverse transform having a same syntax element value in a sequence unit.

As another example, when a syntax element for the reduced secondary transform/inverse transform is entropy encoded/decoded in a slice header, a reduced secondary transform/inverse transform may be performed by using a syntax element for reduced secondary transform/inverse transform having a same syntax element value in a slice unit.

As yet another example, when a syntax element for the reduced secondary transform/inverse transform is entropy encoded/decoded in an adaptation parameter set, a reduced secondary transform/inverse transform may be performed by using a syntax element for reduced secondary transform/inverse transform having a same syntax element value in a unit that refers to a same adaptation parameter set.

As shown in Table 50, sps_lfnst_enabled_flag may mean information on whether or not a reduced secondary transform/inverse transform is performed in a sequence unit.

For example, when sps_lfnst_enabled_flag is a first value (for example, 0), it may indicate that a reduced secondary transform/inverse transform is not performed in a sequence unit. When sps_lfnst_enabled_flag is a second value (for example, 1), it may indicate that a reduced secondary transform/inverse transform is performed in a sequence unit.

As another example, sps_lfnst_enabled_flag may mean whether or not the transform matrix index lfnst_idx is present in at least one of CU, PU, TU, CB, PB, and TB.

For example, when sps_lfnst_enabled_flag is a first value (for example, 0), it may indicate that the transform matrix index is not present in at least one of CU, PU, TU, CB, PB and TB. When sps_lfnst_enabled_flag is a second value (for example, 1), it may indicate that the transform matrix index is present in at least one of CU, PU, TU, CB, PB and TB.

When sps_lfnst_enabled_flag is not present in a bitstream, sps_lfnst_enabled_flag may be inferred as a first value (for example, 0).

TABLE 50

| | Descriptor |
|---|---|
| seq_parameter_set_rbsp( ) { | |
| sps_lfnst_enabled_flag | u(1) |

As shown in Tables 51 to 55, lfnst_idx[x0][y0] may a transform matrix index indicating which one of transform matrix indexes in a transform matrix set is to be used for a reduced secondary transform/inverse transform.

Herein, when lfnst_idx[x0][y0] is a first value (for example, 0), a reduced secondary transform/inverse transform may not be performed in a current block. In addition, when lfnst_idx[x0][y0] is a second value (for example, 1), a first matrix indicated by lfnst_idx[x0][y0] among transform matrices of a transform matrix set in a current block may be used for a reduced secondary transform/inverse transform. In addition, when lfnst_idx[x0][y0] is a third value (for example, 2), a second matrix indicated by lfnst_idx[x0][y0] among transform matrices of a transform matrix set in a current block may be used for a reduced secondary transform/inverse transform.

The lfnst_idx[x0][y0] may have a value from 0 to N. Here, N may be a positive integer. For example, N may be 2.

The lfnst_idx[x0][y0] may be entropy encoded/decoded in the following case.

As in the examples of Table 51 and Table 52, when numZeroOutSigCoeff is a first value (for example, 0) and (numSigCoeff>((treeType==SINGLE_TREE)? M:N)) is satisfied, lfnst_idx[x0][y0] may be entropy encoded/decoded.

Alternatively, as in the example of Table 53, when (numSigCoeff>((treeType==SINGLE_TREE)? M:N)) is satisfied irrespective of a value of numZeroOutSigCoeff, lfnst_idx[x0][y0] may be entropy encoded/decoded.

Alternatively, as in the example of Table 54, when numZeroOutSigCoeff is a first value (for example, 0), irrespective of whether or not (numSigCoeff>((treeType==SINGLE_TREE)? M:N)) is satisfied, lfnst_idx[x0][y0] may be entropy encoded/decoded.

Alternatively, as in the example of Table 55, lfnst_idx[x0][y0] may be entropy encoded/decoded, irrespective of a value of numZeroOutSigCoeff and of whether or not (numSigCoeff>((treeType==SINGLE_TREE)? M:N)) is satisfied.

Here, M and N may be positive integers. For example, M may be 2 and N may be 1.

When lfnst_idx [x0][y0] is not present in a bitstream, lfnst_idx[x0][y0] may be inferred as a value of 0.

TABLE 51

| | Descriptor |
|---|---|
| coding_unit( x0, y0, cbWidth, cbHeight, treeType ) { | |
| if( !pcm_flag[ x0 ][ y0 ] ) { | |
| if( CuPredMode[ x0 ][ y0 ] != MODE_INTRA && general_merge_flag[ x0 ][ y0 ] = = 0 ) | |
| cu_cbf | ae(v) |
| if( cu_cbf ) { | |
| numSigCoeff = 0 | |
| numZeroOutSigCoeff = 0 | |
| transform_tree( x0, y0, cbWidth, cbHeight, treeType ) | |
| lfnstWidth = ( treeType = = DUAL_TREE_CHROMA ) ? cbWidth / SubWidthC : cbWidth | |
| lfnstHeight = ( treeType = = DUAL_TREE_CHROMA ) ? cbHeight / SubHeightC : cbHeight | |
| if( Min( lfnstWidth, lfnstHeight ) >= 4 && sps_lfnst_enabled_flag = = 1 && | |
| CuPredMode[ x0 ][ y0 ] = = MODE_INTRA && IntraSubPartitionsSplitType = = ISP_NO_SPLIT && | |
| !intra_mip_flag[ x0 ][ y0 ] ) { | |

TABLE 51-continued

```
                                                                    Descriptor
        if( ( numSigCoeff > ( ( treeType = = SINGLE_TREE ) ? 2 : 1 ) ) &&
numZeroOutSigCoeff = = 0 )
          lfnst_idx[ x0 ][ y0 ]                                         ae(v)
        }
      }
    }
}
```

TABLE 52

```
                                                                    Descriptor
residual_coding( x0, y0, log2TbWidth, log2TbHeight, cIdx ) {
      if( sig_coeff_flag[ xC ][ yC ] ) {
        if( !transform_skip_flag[ x0 ][ y0 ] ) {
          numSigCoeff++
          if( ( n >= 8 && i = = 0 && ( log2TbWidth = = 2 | |
log2TbWidth = = 3 )                                    &&
( log2TbWidth = = log2TbHeight ) ) | | ( ( i = = 1 | | i = = 2 )
            && log2TbWidth >= 3 && log2TbHeight >= 3 ) )
            numZeroOutSigCoeff++
        }
        abs_level_gtx_flag[ n ][ 0 ]                                ae(v)
        remBinsPass1− −
        if( abs_level_gtx_flag[ n ][ 0 ] ) {
          par_level_flag[ n ]                                       ae(v)
          remBinsPass1− −
          abs_level_gtx_flag[ n ][ 1 ]                              ae(v)
          remBinsPass1− −
        }
        if( lastSigScanPosSb = = −1 )
          lastSigScanPosSb = n
        firstSigScanPosSb = n
      }
```

TABLE 53

```
                                                                    Descriptor
coding_unit( x0, y0, cbWidth, cbHeight, treeType ) {
  if( !pcm_flag[ x0 ][ y0 ]) {
    if( CuPredMode[ x0 ][ y0 ] != MODE_INTRA &&
general_merge_flag[ x0 ][ y0 ] = = 0)
      cu_cbf                                                        ae(v)
    if( cu_cbf ) {
      numSigCoeff = 0
      numZeroOutSigCoeff = 0
      transform_tree( x0, y0, cbWidth, cbHeight, treeType )
      lfnstWidth = ( treeType = =
DUAL_TREE_CHROMA ) ? cbWidth / SubWidthC : cbWidth
      lfnstHeight = ( treeType = =
DUAL_TREE_CHROMA ) ? cbHeight / SubHeightC : cbHeight
      if( Min( lfnstWidth, lfnstHeight ) >= 4 && sps_lfnst_enabled_flag
= = 1 &&
          CuPredMode[ x0 ][ y0 ] = = MODE_INTRA &&
IntruSubPartitionsSplitType = = ISP_NO_SPLIT &&
          !intra_mip_flag[ x0 ][ y0 ]) {
        if( numSigCoeff > ( ( treeType = = SINGLE_TREE ) ? 2 : 1 ) )
          lfnst_idx[ x0 ][ y0 ]                                     ae(v)
      }
    }
  }
}
```

TABLE 54

| | Descriptor |
|---|---|
| coding_unit( x0, y0, cbWidth, cbHeight, treeType ) { | |
| if( !pcm_flag[ x0 ][ y0 ] ) { | |
| if( CuPredMode[ x0 ][ y0 ] != MODE_INTRA && general_merge_flag[ x0 ][ y0 ] = = 0 ) | |
| cu_cbf | ae(v) |
| if( cu_cbf ) { | |
| numSigCoeff = 0 | |
| numZeroOutSigCoeff = 0 | |
| transform_tree( x0, y0, cbWidth, cbHeight, treeType ) | |
| lfnstWidth = ( treeType = = DUAL_TREE_CHROMA ) ? cbWidth / SubWidthC : cbWidth | |
| lfnstHeight = ( treeType = = DUAL_TREE_CHROMA ) ? cbHeight / SubHeightC : cbHeight | |
| if( Min( lfnstWidth, lfnstHeight ) >= 4 && sps_lfnst_enabled_flag = = 1 && | |
| CuPredMode[ x0 ][ y0 ] = = MODE_INTRA && IntraSubPartitionsSplitType = = ISP_NO_SPLIT && | |
| !intra_mip_flag[ x0 ][ y0 ] ) { | |
| if( numZeroOutSigCoeff = = 0 ) | |
| lfnst_idx[ x0 ][ y0 ] | ae(v) |
| } | |
| } | |
| } | |
| } | |

TABLE 55

| | Descriptor |
|---|---|
| coding_unit( x0, y0, cbWidth, cbHeight, treeType ) { | |
| if( !pcm_flag[ x0 ][ y0 ] ) { | |
| if( CuPredMode[ x0 ][ y0 ] != MODE_INTRA && general_merge_flag[ x0 ][ y0 ] = = 0 ) | |
| cu_cbf | ae(v) |
| if( cu_cbf ) { | |
| numSigCoeff = 0 | |
| numZeroOutSigCoeff = 0 | |
| transform_tree( x0, y0, cbWidth, cbHeight, treeType ) | |
| lfnstWidth = ( treeType = = DUAL_TREE_CHROMA ) ? cbWidth / SubWidthC : cbWidth | |
| lfnstHeight = ( treeType = = DUAL_TREE_CHROMA ) ? cbHeight / SubHeightC : cbHeight | |
| if( Min( lfnstWidth, lfnstHeight ) >= 4 && sps_lfnst_enabled_flag = = 1 && | |
| CuPredMode[ x0 ][ y0 ] = = MODE_INTRA && IntraSubPartitionsSplitType = = ISP_NO_SPLIT && | |
| !intra_mip_flag[ x0 ][ y0 ] ) { | |
| lfnst_idx[ x0 ][ y0 ] | ae(v) |
| } | |
| } | |
| } | |
| } | |

For I slice, qtbtt_dual_tree_intra_flag may mean that each CTU is partitioned into 64×64 coding units and a 64×64 coding unit is used as a root node of a luma component and a chroma component.

For example, when qtbtt_dual_tree_intra_flag is a first value (for example, 0), each CTU may be partitioned into 64×64 coding units and a 64×64 coding unit may not be used as a root node of a luma component and a chroma component. On the other hand, when qtbtt_dual_tree_intra_flag is a second value (for example, 1), each CTU may be partitioned into 64×64 coding units and a 64×64 coding unit may be used as a root node of a luma component and a chroma component.

When qtbtt_dual_tree_intra_flag is a first value (for example, 0), a single tree structure may be used for block partition for a luma component and block partition for a chroma component. According to a single tree structure, a single block partition structure is used for block partition of a luma component and block partition of a chroma component. However, according to a type of a chroma component, a block size of a luma component and a block size of the chroma component may be different from each other. A single tree type may be identified as SINGLE_TREE.

When a slice type is I slice and qtbtt_dual_tree_intra_flag is a second value (for example, 1), a dual tree structure may be used for block partition for a luma component and block partition for a chroma component from a coding tree unit (for example, 64×64 coding unit). According to a dual tree structure, different block partition structures are used for block partition of a luma component and block partition of a chroma component, respectively. In a dual tree structure, a tree type for a luma component may be identified as DUAL_TREE_LUMA. Also, in a dual tree structure, a tree type for a chroma component may be identified as DUAL_TREE_CHROMA.

For the transform matrix index lfnst_idx[x0][y0], a context model applied to context-adaptive binary arithmetic coding (CABAC) may be determined according to at least one of a multi-transform selection index tu_mts_idx[x0][y0] and a tree type. The tu_mts_idx may be equivalent to mts_idx in meaning.

For example, a context model index used for entropy encoding/decoding of the transform matrix index lfnst_idx [x0][y0] may be determined as follows.

(*tu_mts_idx*[*x*0][*y*0]==0 && treeType !=SINGLE_TREE)?1:0

For example, a context model index used for entropy encoding/decoding of the transform matrix index lfnst_idx [x0][y0] may be determined as follows.

(*tu_mts_idx*[*x*0][*y*0]==0)?1:0

For example, a context model index used for entropy encoding/decoding of the transform matrix index lfnst_idx [x0][y0] may be determined as follows.

(treeType !=SINGLE_TREE)?1:0

For example, a context model index used for entropy encoding/decoding of the transform matrix index lfnst_idx [x0][y0] may be determined as 0.

For example, a context model index used for entropy encoding/decoding of the transform matrix index lfnst_idx [x0][y0] may be determined according to at least one of coding parameters of a current block and a neighboring block.

As another example, like the example of the multi-transform selection index, a context model index used for entropy encoding/decoding of the transform matrix index lfnst_idx[x0][y0] may be determined according to at least one of a horizontal transform type and a vertical transform type.

A transform process for a scaled transform coefficient may be performed as follows.

For a transform for a scaled transform coefficient, based on an upper-left sample of a current picture, an upper-left sample (xTbY, yTbY) of a current luma component transform block, a horizontal size nTbW of a current transform block, a vertical size nTbH of a current transform block, a color component index cIdx of a current block, and a scaled transform coefficient array d[x][y] with a size of (nTbW)×(nTbH) may be input. Here, x may have a value from 0 to nTbW−1, and y may have a value from 0 to nTbH−1.

According to a transform for a scaled transform coefficient, a residual signal array r[x][y] with a size of (nTbW)×(nTbH) may be output. Here, x may have a value from 0 to nTbW−1, and y may have a value from 0 to nTbH−1.

When the transform matrix index lfnst_idx[xTbY][yTbY] is not a first value (for example, 0) and both nTbW and nTbH are equal to or greater than 4, a transform process for a scaled transform coefficient may be performed as follows.

Variables predModeIntra, nLfnstOutSize, log 2LfnstSize, numLfnstX, numLfnstY, and nonZeroSize may be derived as follows.

predModeIntra=(cIdx==0)?IntraPredModeY[xTbY][yTbY]: IntraPredModeC [xTbY][yTbY]

nLfnstOutSize=(nTbW>=8&&nTbH>=8)?48:16 log 2LfnstSize=(nTbW>=8&&nTbH>=8)?3:2 nLfnstSize=(1<<log 2LfnstSize)

numLfnstX=(nTbW>8&&nTbH==4)?2:1 numLfnstY=(nTbW==4&&nTbH>8)?2:1 nonZeroSize=((nTbW==4&&nTbH==4)||(nTbW==8&&nTbH==8))?8:16

A wide angle intra prediction mode mapping process may be performed by using the following input and output.

Input: predModeIntra, nTbW, nTbH and cIdx

Output: predModeIntra

For xSbIdx capable of having a value from 0 to numLfnstX−1 and ySbIdx capable of having a value from 0 to numLfnstY−1, the process may be performed as follows.

A value of u[x] may be derived as follows. Here, x may have a value from 0 to nonZeroSize−1.

*xC*=(*xSbIdx*<<log 2*Lfnst*Size)+DiagScanOrder[log 2*Lfnst*Size][log 2*Lfnst*Size][*x*][0]

*yC*=(*ySbIdx*<<log 2*Lfnst*Size)+DiagScanOrder[log 2*Lfnst*Size][log 2*Lfnst*Size][*x*][1]

*u*[*x*]=*d*[*xC*][*yC*]

A one-dimensional low frequency non-separable transform process may be performed by using the following input and output.

Input: an input sample length nonZeroSize of a scaled transform coefficient, a transform output sample length nTrS set as nLfnstOutSize, a scaled transform coefficient array u[x] that is not a value of 0, an intra-prediction mode predModeIntra, and a transform matrix index lfnst_idx [xTbY][yTbY].

Here, x may have a value from 0 to nonZeroSize−1.

Output: v[x]

Here, x may have a value from 0 to nLfnstOutSize−1.

The array d[(xSbIdx<<log 2LfnstSize)+x][(ySbIdx<<log 2LfnstSize)+y] may be derived as follows. Here, x and y may have a value from 0 to nLfnstSize−1.

When predModeIntra is equal to or less than 34 or when predModeIntra is the same as at least one of INTRA_LT_CCLM, INTRA_T_CCLM, and INTRA_L_CCLM, the derivation may be performed as follows.

d[(xSbIdx<<log 2LfnstSize)+x][(ySbIdx<<log 2LfnstSize)+y]=(y<4)? v[x+(y<<log 2LfnstSize)]: ((x<4) v[32+x+((y−4)<<2)]: d[x][y])

Otherwise, the derivation may be performed as follows.

d[(xSbIdx<<log 2LfnstSize)+x][(ySbIdx<log 2LfnstSize)+y]=(x<4)? v[y+(x<<log 2LfnstSize)]: ((y<4) v[32+y+((x−4)<<2)]: d[x][y])

Herein, when the array d[(xSbIdx<<log 2LfnstSize)+x][(ySbIdx<<log 2LfnstSize)+y is derived, the derivation may be performed based on at least one of coding parameters except an intra prediction mode predModeIntra.

As another example, the array d[(xSbIdx<<log 2LfnstSize)+x][(ySbIdx<<log 2LfnstSize)+y] may be derived as follows. Here, x and y may have a value from 0 to nLfnstSize−1.

When a type for primary transform is a first transform (DCT-2 based integer transform or trTypeHor is a first value (for example, 0) or trTypeVer is a first value (for example, 0)), the derivation may be performed as follows.

d[(xSbIdx<<log 2LfnstSize)+x][(ySbIdx<<log 2LfnstSize)+y]=(y<4)? v[(x+(y<<log 2LfnstSize)]: ((x<4)?v[32+x+((y−4)<<2)]: d[x][y])

Otherwise, the derivation may be performed as follows.

d[(xSbIdx<<log 2LfnstSize)+x][(ySbIdx<<log 2LfnstSize)+y]=(x<4)? v[y+(x<<log 2LfnstSize)]: ((y<4)?v[32+y+((x−4)<<2)]: d[x][y])

As another example, the array d[(xSbIdx<<log 2LfnstSize)+x][(ySbIdx<<log 2LfnstSize)+y] may be derived as follows. Here, x and y may have a value from 0 to nLfnstSize−1.

When a type for primary transform is a first transform (DCT-2 based integer transform or trTypeHor is a first value (for example, 0) and trTypeVer is a first value (for example, 0)), when a type for primary transform is a second transform (trTypeHor is a second value (for example, 1) and trTypeVer is a second value (for example, 1)), or when a type for primary transform is a second transform (trTypeHor is a third value (for example, 2) and trTypeVer is a third value (for example 2)), the derivation may be performed as follows.

d[(xSbIdx<<log 2LfnstSize)+x][(ySbIdx<<log 2LfnstSize)+y]=(y<4)? v[(x+(y<<log 2LfnstSize)]:((x<4)?v[32+x+((y−4)<<2)]: d[x][y])

Otherwise, the derivation may be performed as follows.

d[(xSbIdx<<log 2LfnstSize)+x][(ySbIdx<<log 2LfnstSize)+y]=(x<4)? v[y+(x<<log 2LfnstSize)]: ((y<4)?v[32+y+((x−4)<<2)]: d[x][y])

As another example, the array d[(xSbIdx<<log 2LfnstSize)+x][(ySbIdx<<log 2LfnstSize)+y] may be derived as follows. Here, x and y may have a value from 0 to nLfnstSize−1.

When the multi-transform selection index mts_idx is a first value (for example, 0), the derivation may be performed as follows.

d[(xSbIdx<<log 2LfnstSize)+x][(ySbIdx<<log 2LfnstSize)+y]=(y<4)? v[x+(y<<log 2LfnstSize)]: ((x<4)?v[32+x+((y−4)<<2)]: d[x][y])

Otherwise, the derivation may be performed as follows.

d[(xSbIdx<<log 2LfnstSize)+x][(ySbIdx<<log 2LfnstSize)+y]=(x<4)? v[y+(x<<log 2LfnstSize)]: ((y<4)?v[32+y+((x−4)<<2)]: d[x][y])

As another example, the array d[(xSbIdx<<log 2LfnstSize)+x][(ySbIdx<<log 2LfnstSize)+y] may be derived as follows. Here, x and y may have a value from 0 to nLfnstSize−1.

When the multi-transform selection index mts_idx is a first value (for example, 0), when the multi-transform selection index mts_idx is a second value (for example, 1), or when the multi-transform selection index mts_idx is a fifth value (for example, 4), the derivation may be performed as follows.

d[(xSbIdx<<log 2LfnstSize)+x][(ySbIdx<<log 2LfnstSize)+y]=(y<4)? v [x+(y<<log 2LfnstSize)]: ((x<4)?v[32+x+((y−4)<<2)]: d[x][y])

Otherwise, the derivation may be performed as follows.

d[(xSbIdx<<log 2LfnstSize)+x][(ySbIdx<<log 2LfnstSize)+y]=(x<4)? v [y+(x<<log 2LfnstSize)]: ((y<4)?v[32+y+((x−4)<<2)]: d[x][y])

Hereinafter, a wide angle intra prediction mode mapping process will be described.

For a wide angle intra prediction mode mapping process, an intra-prediction mode predModeIntra, a horizontal size of a transform block nTbW, a vertical size of a transform block nTbH, and a color component index of a current block cIdx are input.

According to a wide angle intra prediction mode mapping process, a modified intra-prediction mode predModeIntra is output.

In a wide angle intra prediction mode mapping process, variables nW and nH may be derived as follows.

When IntraSubPartitionsSplitType is the same as ISP_NO_SPLIT and cIdx is not a first value (for example, 0), the derivation may be performed as follows.

$$nW=nTbW$$

$$nH=nTbH$$

Otherwise, the derivation may be performed as follows.

$$nW=nCbW$$

$$nH=nCbH$$

The variable whRatio may be set as Abs(Log 2(nW/nH)). For a rectangular block (where nW is not the same as nH), predModeIntra may be modified as follows. When the following conditions are all true, predModeIntra may be set as (predModeIntra+65).

nW is greater than nH predModeIntra is equal to or greater than 2 predModeIntra is less than (whRatio>1)?(8+2*whRatio):8

When the following conditions are all true, predModeIntra may be set as (predModeIntra-67).

nH is greater than nW predModeIntra is equal to or less than 66 predModeIntra is greater than (whRatio>1)? (60−2*whRatio):60

Hereinafter, a low frequency non-separable transform process will be described.

In a low frequency non-separable transform process, a transform input sample length nonZeroSize, a transform output sample length nTrS, a scaled transform coefficient array x[j] that is not a value of 0, an intra-prediction mode predModeIntra, and a transform matrix index lfnst_idx may be input. Here, j may have a value from 0 to nonZeroSize−1.

According to a low frequency non-separable transform process, a transformed sample array y[i] may be output. Here, i may have a value from 0 to nTrS−1.

In a low frequency non-separable transform process, a low frequency non-separable transform matrix may be derived. In a process of deriving a low frequency non-separable transform matrix, a transform output sample length nTrS, an intra-prediction mode predModeIntra, and a transform matrix index lfnst_idx may be input.

According to a process of deriving a low frequency non-separable transform matrix, a transform matrix lowFreqTransMatrix with (nTrS)×(nonZeroSize) size may be output.

A transformed sample array y[i] may be derived as follows. Here, i may have a value from 0 to nTrS−1.

$$y[i]=\text{Clip3}(\text{CoeffMin},\text{CoeffMax},((\Sigma_{j=0}^{nonZeroSize-1}\text{lowFreqTransMatrix}[i][j]*x[j])+64)>>7)$$

Here, CoeffMin and CoeffMax may mean a minimum value and a maximum value of a transform coefficient, respectively, and may be derived as follows.

$$\text{CoeffMin}=-(1<<N)$$

$$\text{CoeffMax}=(1<<N)-1$$

Here, N may be a positive integer. For example, N may be 15. When N is 15, it may mean that a value of a transform coefficient is clipped so as to be included in a 16-bit dynamic range.

Hereinafter, a process of deriving a low frequency non-separable transform matrix will be described.

In a process of deriving a low frequency non-separable transform matrix, a transform output sample length nTrS, an intra-prediction mode predModeIntra, and a transform matrix index lfnst_idx may be input. In addition, according to a process of deriving a low frequency non-separable transform matrix, a transform matrix lowFreqTransMatrix may be output.

As in the example of Table 56, in a process of deriving a low frequency non-separable transform matrix, a transform matrix set index lfnstTrSetIdx may be derived according to an intra-prediction mode predModeIntra. Herein, by using Tables 57 to 63 instead of Table 56, a transform matrix set index lfnstTrSetIdx may be derived according to an intra-prediction mode predModeIntra.

When predModeIntra is the same as at least one of INTRA_LT_CCLM, INTRA_T_CCLM, and INTRA_L_CCLM, lfnstTrSetIdx may be determined as M. Here, M may be a positive integer. For example, M may be 0.

As in the examples of Tables 60 to 63, the predModeIntra may be an intra-prediction mode before a wide angle intra prediction mode mapping process is performed or while a wide angle intra prediction mode mapping process is not performed. Herein, an intra-prediction mode may have a value ranging from 0 to M. Here, M may be a maximum value (positive integer) of an intra-prediction mode. M may be 66.

For example, when the examples of Tables 57 to 59 and Tables 61 to 63 are used, since the number of transform matrices to be stored in an encoder/decoder may be reduced from 4 to 3, a memory size necessary for storing transform matrices in an encoder/decoder may be reduced.

TABLE 56

| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |
| 81 <= predModeIntra <= 83 | 0 |

TABLE 57

| predModeIntra | lfnstTrSetIdx |
|---|---|
| predModeIntra <0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 2 |
| 45 <= predModeIntra <= 55 | 2 |
| 56 <= predModeIntra <= 80 | 1 |
| 81 <= predModeIntra <= 83 | 0 |

TABLE 58

| predModeintra | lfnstTrSetIdx |
|---|---|
| predModeintra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 1 |
| 45 <= predModeIntra <= 55 | 2 |
| 56 <= predModeIntra <= 80 | 1 |
| 81 <= predModeIntra <= 83 | 0 |

TABLE 59

| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 0 |

TABLE 59-continued

| predModeIntra | lfnstTrSetIdx |
|---|---|
| 45 <= predModeIntra <= 55 | 2 |
| 56 <= predModeIntra <= 80 | 1 |
| 81 <= predModeIntra <= 83 | 0 |

TABLE 60

| predModeIntra | lfnstTrSetIdx |
|---|---|
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 66 | 1 |

TABLE 61

| predModeIntra | lfnstTrSetIdx |
|---|---|
| 0 <= predModeIntra <= 1 | 0 |
| 2 <= predModeIntra <= 12 | 1 |
| 13 <= predModeIntra <= 23 | 2 |
| 24 <= predModeIntra <= 44 | 2 |
| 45 <= predModeIntra <= 55 | 2 |
| 56 <= predModeIntra <= 66 | 1 |

TABLE 62

| predModeIntra | lfnstTrSetIdx |
|---|---|
| 0 <= predModeIntra <= 1 | 0 |
| 2 <= predModeIntra <= 12 | 1 |
| 13 <= predModeIntra <= 23 | 2 |
| 24 <= predModeIntra <= 44 | 2 |
| 45 <= predModeIntra <= 55 | 2 |
| 56 <= predModeIntra <= 66 | 1 |

TABLE 63

| predModeIntra | lfnstTrSetIdx |
|---|---|
| 0 <= predModeIntra <= 1 | 0 |
| 2 <= predModeIntra <= 12 | 1 |
| 13 <= predModeIntra <= 23 | 2 |
| 24 <= predModeIntra <= 44 | 0 |
| 45 <= predModeIntra <= 55 | 2 |
| 56 <= predModeIntra <= 66 | 1 |

As in the examples of Tables 57 to 63, a transform matrix lowFreqTransMatrix may be derived based on nTrs, lfnstTrSetIdx, and lfnst_idx.

Generally, when there is a residual signal, the residual signal may be transform encoded in an encoding process and then be transmitted by being included in a bitstream. The residual signal may be derived by being inverse-transform encoded in a decoding process.

Identification information (for example, a quantized transform coefficient, etc.) indicating whether or not there is residual signal-related information that is included in a bitstream and is transmitted to a decoder may be at least one of the following information.

cu_cbf: may mean information on whether or not there are a quantized transform coefficient of a luma component block and a residual signal quantized transform coefficient of a chroma component block, when a luma component and a chroma component have a same block partition structure.

When a luma component and a chroma component have independent block partition structures, cu_cbf may mean information on whether or not there is a quantized transform coefficient of a residual signal of a luma component block or a chroma component block. When information on whether or not there is a residual signal quantized transform coefficient has a first value (1), it may mean that there is a quantized transform coefficient of a residual signal of corresponding blocks. When the information has a second value (0), it may mean that there is no quantized transform coefficient of a residual signal of corresponding blocks. When a luma component and a chroma component have a same block partition structure and a residual signal quantized transform coefficient is present in at least one of a luma component block and a chroma component (Cb and Cr) block, cu_cbf may have a first value. On the other hand, when there is no residual signal quantized transform coefficient for all the components, cu_cbf may have a second value.

tu_cbf_luma: may mean whether or not there is a residual signal quantized transform coefficient of a luma component block. When information on whether or not there is a residual signal quantized transform coefficient of a luma component block has a first value (1), it may mean that there is a quantized transform coefficient of a residual signal of a corresponding luma block. In addition, when the information has a second value (0), it may mean that there is no quantized transform coefficient of a residual signal of a corresponding luma block.

tu_cbf_cr, tu_cbf_cb: may mean whether or not there are residual signal quantized transform coefficients of Cr and Cb respectively among chroma components. When information on whether or not there is a residual signal quantized transform coefficient of a chroma component (Cr or Cb) block has a first value (1), it may mean that there is a quantized transform coefficient of a residual signal of a corresponding chroma component (Cr or Cb) block. In addition, when the information has a second value (0), it may mean that there is no quantized transform coefficient of a residual signal of a corresponding chroma component (Cr or Cb) block.

Generally, only when cu cbf has a first value (1), at least one of tu_cbf_luma, tu_cbf_cr, and tu_cbf_cb may be additionally transmitted, thereby indicating whether or not there is a residual signal quantized transform coefficient of a luma component, Cr as a chroma component, or Cb as a chroma component.

When a luma component and a chroma component have independent block partition structures, cu_cbf may have the same information as tu_cbf_luma.

Transform encoding may include at least one of primary transform/inverse transform and secondary transform/inverse transform.

In a primary transform, for a transform target block, DCT-2 may be applied in horizontal and vertical directions. Alternatively, for a transform target block, DST-7 and DCT-8 may be applied to in the horizontal direction and in the vertical direction, respectively. In addition, a primary transform type applied to a transform target block may be signaled in an index form. When a primary transform type is DCT-2, a primary transform type index may have a value of 0. In addition, when a transform is performed according to a combination of DST-7 and DCT-8, a primary transform type index may have an arbitrary integer value greater than 0. For example, when a primary transform type index is 1, DST-7 may be applied both in horizontal and vertical directions. When a primary transform type index is 2, DST-7 may be applied in the horizontal direction and DCT-8 may be applied in the vertical direction. When a primary transform type index is 3, DCT-8 and DST-7 may be applied in the horizontal direction and in the vertical direction, respectively. When a primary transform type index is 4, DCT-8 may be applied both in horizontal and vertical directions.

A secondary transform may be applied to a part of a primary-transformed signal. A secondary transform type may be signaled in an index form. When a secondary transform type is not applied, a secondary transform type index may have a value of 0. In addition, when a secondary transform type is applied, a secondary transform type index may have an integer value greater than 0.

A kernel to be applied to a secondary inverse transform may be derived by using an index for secondary transform type signaled in a decoder. A secondary inverse transform may be performed by applying a kernel thus derived.

A kernel to be applied to a primary inverse transform may be derived by using an index for primary transform type signaled in a decoder. A primary inverse transform may be performed on a secondary-inverse transformed signal by using a kernel thus derived.

When applying a secondary transform, DCT-2 may be always applied to a primary transform type. When DCT-2 is applied to a primary transform, energy tends to be concentrated in the upper-left position of a primary-transformed block. In addition, when energy is concentrated in the upper-left position of a primary-transformed block, a secondary transform is highly likely to be applied. Accordingly, when DCT-2 is applied to a primary transform, the aspect of coding efficiency may be improved.

In addition, when a secondary transform/inverse transform is not applied, a primary transform/inverse transform may be applied by entropy encoding/decoding an index for a primary transform type.

An applicable horizontal or vertical size of primary transform and secondary transform may be limited.

When a size of a CU is larger than a maximum size enabling a primary transform, the CU is implicitly partitioned until its size becomes equal to or smaller than the maximum size enabling a primary transform. A block thus partitioned may be defined as a transform unit (TU). Accordingly, one CU may consist of one or more TUs. Based on a TU, a residual signal that is generated by prediction encoding may be transformed/inverse transformed according to a predetermined transform type.

According to an embodiment, a primary transform type index and a secondary transform type index may be signaled in a CU.

In other words, at least one of a same primary transform type and a same secondary transform type may be applied to all the TUs included in a CU.

In this case, for example, when an intra prediction signal is generated by applying an ISP method, at least one of a same primary transform type and a same secondary transform type may be applied to partitioned ISP blocks.

As this method signals a smaller amount of data than applying different primary transform types and secondary transform types to each TU included in a CU, the coding efficiency may be improved.

When signaling a primary transform type index and a secondary transform type index, the secondary transform type index may be signaled first and then the primary transform type index may be signaled.

When a secondary transform type index is not 0 (that is, when a secondary transform is applied), since DCT-2 is always applied as a primary transform type, a primary transform type index may not be signaled but be set as 0, which is a primary transform type index value indicating DCT-2. In other words, when a secondary transform type index is not a first value (for example, 0) (that is, when a secondary transform is applied), a primary transform type index may not be signaled.

When a secondary transform type index is 0 (that is, when a secondary transform is not applied), a primary transform type index may be signaled.

Meanwhile, a residual signal may be encoded/decoded through a transform skip method that does not perform a primary transform for a luma component of a CU or a TU included in the CU. In this case, a primary transform type index may not be signaled either. However, since transform skip is performed in a TU, information indicating transform skip (transform_skip_flag) may be signaled in a TU. In addition, when there is a residual signal quantized transform coefficient of a luma component block (that is, when tu_cbf_luma has a value of 1), a primary transform type index may be signaled. Accordingly, a primary transform type index to be signaled in a CU may be signaled, when a secondary transform type index to be signaled in a CU is 0 and at least one of the following conditions is satisfied.

- Residual signal is not encoded by a transform skip method for a luma component of every TU included in a CU (that is, transform_skip_flag is 0 for a luma component of every TU)
- Residual signal is not encoded by a transform skip method for a luma component of at least one TU among TUs included in a CU (that is, transform_skip_flag is 0 for a luma component of at least one TU among TUs included in a CU)
- Residual signal is not encoded by a transform skip method for a luma component of a first TU included in a CU (that is, transform_skip_flag of a first TU luma component included in a CU is 1)
- tu_cbf_luma value of every TU included in a CU is 1
- tu_cbf_luma value of at least one TU included in a CU is 1
- tu_cbf_luma value of a first TU included in a CU is 1

According to an embodiment, a primary transform type index and a secondary transform type index may be signaled in a TU.

In other words, a primary transform type and a second transform type, which are applied to TUs included in a CU, may be different from each other.

In this case, for example, when an intra prediction signal is generated by applying an ISP method, different primary and secondary transform types may be applied to each partitioned sub-block.

Since an appropriate transform type is capable of being applied to each TU, the above-described transform method may improve coding accuracy, in comparison with a method of applying a same primary transform type and a same secondary transform type to all the TUs included in a CU.

According to an embodiment, a secondary transform type index and a primary transform type index may be sequentially signaled.

When a secondary transform type index is not 0 (that is, when a secondary transform is applied), since DCT-2 is always applied as a primary transform type, a primary transform type index may not be signaled but be set as 0, which is a primary transform type index value indicating DCT-2. In other words, when a secondary transform type index is not 0 (that is, when a secondary transform is applied), a primary transform type index may not be signaled.

When a secondary transform type index is 0 (that is, when a secondary transform is not applied), a primary transform type index may be signaled.

Meanwhile, a residual signal may be encoded/decoded through a transform skip method that does not perform a primary transform for a luma component of a TU. In this case, a primary transform type index may not be signaled either. Accordingly, a primary transform type index to be signaled in a TU may be signaled, when a secondary transform type index to be signaled in a TU is 0 and a luma component of a corresponding TU is not encoded through a transform skip method.

As in the examples of Tables. 81 to 103, lfnst_idx[x0][y0] may mean a transform matrix index indicating which transform matrix among transform matrices in a transform matrix set is to be used for a reduced secondary transform/inverse transform.

In relation to a transform skip mode flag, the lfnst_idx [x0][y0] may be entropy encoded/decoded in at least one of the following cases.

- As in the example of Table 85, a tree structure is a single tree type (SINGLE_TREE) and at least one of a transform skip mode flag (transform_skip_flag[x0][y0][0]) for a luma component, a transform skip mode flag (transform_skip_flag[x0][y0][1]) for a chroma component (Cb), and a transform skip mode flag (transform_skip_flag[x0][y0][2]) for a chroma component (Cr) is a first value (for example, 0)

(treeType==SINGLE_TREE && (transform_skip_flag [x0][y0][0]==0||transform_skip_flag[x0][y0][1]==0||transform_skip_flag[x0][y0][2]==0))

- As in the example of Table 86, a tree structure is a dual tree luma type (DUAL_TREE_LUMA) and a transform skip mode flag (transform_skip_flag[x0][y0][0]) for a luma component is a first value (for example, 0)

(treeType==DUAL_TREE_LUMA && transform_skip_flag[x0][y0][0]==0)

- As in the example of Table 87, a tree structure is a single tree type (SINGLE_TREE) or a dual tree luma type (DUAL_TREE_LUMA) and a transform skip mode flag (transform_skip_flag[x0][y0][0]) for a luma component is a first value (for example, 0)

((treeType==SINGLE_TREE||treeType==DUAL_TREE_LUMA) && transform_skip_flag[x0][y0][0]==0)

- As in the example of Table 88, a tree structure is a dual tree chroma type (DUAL_TREE_CHROMA), at least one of a transform skip mode flag (transform_skip_flag [x0][y0][1]) for a chroma component (Cb) and a transform skip mode flag (transform_skip_flag[x0][y0][2]) for a chroma component (Cr) is a first value (for example, 0), and ChromaArrayType is not a first value (for example, 0)

(treeType==DUAL_TREE_CHROMA && (transform_skip_flag[x0][y0][1]==0||transform_skip_flag[x0] [y0][2]==0) && ChromaArrayType !=0)

- As in the example of Table 89, a tree structure is a single tree type (SINGLE_TREE) and at least one of a transform skip mode flag (transform_skip_flag[x0][y0][0]) for a luma component, a transform skip mode flag (transform_skip_flag [x0][y0][1]) for a chroma component (Cb), and a transform skip mode flag (transform_skip_flag[x0][y0][2]) for a chroma component (Cr) is a first value (0), or a tree structure is a dual tree luma type (DUAL_TREE_LUMA) and a transform skip mode flag (transform_skip_flag[x0][y0][0]) for a luma component is a first value (for example, 0), or a tree structure is a dual tree chroma type (DUAL_TREE_CHROMA) and at least one of a transform skip mode flag (transform_skip_flag[x0][y0][1]) for a chroma component (Cb) and a transform skip mode flag (transform_skip_flag[x0][y0][2]) for a chroma component (Cr) is a first value (for example, 0), and ChromaArrayType is not a first value (for example, 0)

((treeType==SINGLE_TREE && (transform_skip_flag[x0][y0][0]==0|| transform_skip_flag[x0][y0][1]==0|| transform_skip_flag[x0][y0][2]==0))|| (treeType==DUAL_TREE_LUMA && transform_skip_flag[x0][y0][0]==0)|| (treeType==DUAL_TREE_CHROMA && (transform_skip_flag[x0][y0][1]==0|| transform_skip_flag[x0][y0][2]==0) && ChromaArrayType !=0))

As in the example of Table 90, a tree structure is a single tree type (SINGLE_TREE) and at least one of a transform skip mode flag (transform_skip_flag[x0][y0][0]) for a luma component, a transform skip mode flag (transform_skip_flag[x0][y0][1]) for a chroma component (Cb), and a transform skip mode flag (transform_skip_flag[x0][y0][2]) for a chroma component (Cr) is a first value (0), or a tree structure is a single tree type (SINGLE_TREE) or a dual tree luma type (DUAL_TREE_LUMA) and a transform skip mode flag (transform_skip_flag[x0][y0][0]) for a luma component is a first value (for example, 0), or a tree structure is a dual tree chroma type (DUAL_TREE_CHROMA) and at least one of a transform skip mode flag (transform_skip_flag[x0][y0][1]) for a chroma component (Cb) and a transform skip mode flag (transform_skip_flag[x0][y0][2]) for a chroma component (Cr) is a first value (for example, 0), and ChromaArrayType is not a first value (for example, 0)

((treeType==SINGLE_TREE && (transform_skip_flag[x0][y0][0]==0|| transform_skip_flag[x0][y0][1]==0|| transform_skip_flag[x0][y0][2]==0))|| ((treeType==SINGLE_TREE||treeType==DUAL_TREE_LUMA) && transform_skip_flag[x0][y0][0]==0)|| (treeType==DUAL_TREE_CHROMA && (transform_skip_flag[x0][y0][1]==0||transform_skip_flag[x0][y0][2]==0) && ChromaArrayType !=0))

As in the example of Table 91, a tree structure is a single tree type (SINGLE_TREE) or a dual tree luma type (DUAL_TREE_LUMA) and a transform skip mode flag (transform_skip_flag[x0][y0][0]) for a luma component is a first value (for example, 0), or a tree structure is a dual tree chroma type (DUAL_TREE_CHROMA) and at least one of a transform skip mode flag (transform_skip_flag[x0][y0][1]) for a chroma component (Cb), and a transform skip mode flag (transform_skip_flag[x0][y0][2]) for a chroma component (Cr) is a first value (for example, 0), and ChromaArrayType is not a first value (for example, 0)

(((treeType==SINGLE_TREE||treeType==DUAL_TREE_LUMA) && transform_skip_flag[x0][y0][0]==0)|| (treeType==DUAL_TREE_CHROMA && (transform_skip_flag[x0][y0][1]==0|| transform_skip_flag[x0][y0][2]==0) && ChromaArrayType !=0))

As another example, in relation to a transform skip mode flag, the lfnst_idx[x0][y0] may be entropy encoded/decoded in at least one of the following cases.

As in the example of Table 92, a tree structure is a single tree type (SINGLE_TREE), and a transform skip mode flag (transform_skip_flag[x0][y0][0]) for a luma component, a transform skip mode flag (transform_skip_flag[x0][y0][1]) for a chroma component (Cb), and a transform skip mode flag (transform_skip_flag[x0][y0][2]) for a chroma component (Cr) are all a first value (for example, 0)

(treeType==SINGLE_TREE && (transform_skip_flag[x0][y0][0]==0 && transform_skip_flag[x0][y0][1]==0 && transform_skip_flag[x0][y0][2]==0)

As in the example of Table 93, a tree structure is a single tree type (SINGLE_TREE) and a transform skip mode flag (transform_skip_flag[x0][y0][0]) for a luma component is a first value (for example, 0)

(treeType==SINGLE_TREE && transform skip_flag[x0][y0][0]==0)

As in the example of Table 94, a tree structure is a dual tree luma type (DUAL_TREE_LUMA) and a transform skip mode flag (transform_skip_flag[x0][y0][0]) for a luma component is a first value (for example, 0)

(treeType==DUAL_TREE_LUMA && transform_skip_flag[x0][y0][0]==0)

As in the example of Table 95, a tree structure is a single tree type (SINGLE_TREE) or a dual tree luma type (DUAL_TREE_LUMA) and a transform skip mode flag (transform skip_flag[x0][y0][0]) for a luma component is a first value (for example, 0)

((treeType==SINGLE_TREE||treeType==DUAL_TREE_LUMA) && transform_skip_flag[x0][y0][0]==0

As in the example of Table 96, a tree structure is a dual tree chroma type (DUAL_TREE_CHROMA), and a transform skip mode flag (transform_skip_flag[x0][y0][1]) for a chroma component (Cb) and a transform skip mode flag (transform_skip_flag [x0][y0][2]) for a chroma component (Cr) are all a first value (for example, 0)

(treeType==DUAL_TREE_CHROMA && (transform_skip_flag[x0][y0][1]==0 && transform_skip_flag[x0][y0][2]==0))

As in the example of Table 97, a tree structure is a dual tree chroma type (DUAL_TREE_CHROMA), a transform skip mode flag (transform_skip_flag[x0][y0][1]) for a chroma component (Cb) and a transform skip mode flag (transform_skip_flag[x0][y0][2]) for a chroma component (Cr) are all a first value (for example, 0), and ChromaArrayType is not a first value (for example, 0)

(treeType==DUAL_TREE_CHROMA && (transform skip_flag[x0][y0][1]==0 && transform_skip_flag[x0][y0][2]==0) && ChromaArrayType !=0)

As in the example of Table 98, a tree structure is a single tree type (SINGLE_TREE) and a transform skip mode flag (transform_skip_flag[x0][y0][(0]) for a luma component, a transform skip mode flag (transform_skip_flag[x0][y0][1]) for a chroma component (Cb), and a transform skip mode flag (transform_skip_flag[x0][y0][2]) for a chroma component (Cr) are all a first value (for example, 0), or a tree structure is a dual tree luma type (DUAL_TREE_LUMA) and a transform skip mode flag (transform_skip_flag[x0][y0][0]) for a luma component is a first value (for example, 0), or a tree structure is a dual tree chroma type (DUAL_TREE_CHROMA) and a transform skip mode flag (transform_skip_flag[x0][y0][1]) for a chroma component (Cb) and a transform skip mode flag (transform_skip_flag[x0][y0][2]) for a chroma component (Cr) are all a first value (for example, 0), and ChromaArrayType is not a first value (for example, 0)

((treeType==SINGLE_TREE && (transform_skip_flag[x0][y0][0]==0 && transform_skip_flag[x0][y0][1]==0 && transform_skip_flag[x0][y0][2]==0))||

(treeType==DUAL_TREE_LUMA && transform_skip_flag[x0][y0][0]==0)||
(treeType==DUAL_TREE_CHROMA && (transform_skip_flag[x0][y0][1]==0 && transform_skip_flag[x0][y0][2]==0) && ChromaArrayType !=0))

As in the example of Table 99, a tree structure is a single tree type (SINGLE_TREE) and a transform skip mode flag (transform_skip_flag[x0][y0][0]) for a luma component, a transform skip mode flag (transform_skip_flag [x0][y0][1]) for a chroma component (Cb) and a transform skip mode flag (transform_skip_flag[x0][y0][2]) for a chroma component (Cr) are all a first value (for example, 0), or a tree structure is a dual tree luma type (DUAL_TREE_LUMA) and a transform skip mode flag (transform_skip_flag[x0][y0][0]) for a luma component is a first value (for example, 0), or a tree structure is a dual tree chroma type (DUAL_TREE_CHROMA) and a transform skip mode flag (transform_skip_flag [x0][y0][1]) for a chroma component (Cb) and a transform skip mode flag (transform_skip_flag[x0][y0][2]) for a chroma component (Cr) are all a first value (for example, 0)

((treeType==SINGLE_TREE && (transform_skip_flag[x0][y0][0]==0 && transform_skip_flag[x0][y0][1]==0 && transform_skip_flag[x0][y0][2]==0))||
(treeType==DUAL_TREE_LUMA && transform_skip_flag[x0][y0][0]==0)||
(treeType==DUAL_TREE_CHROMA && (transform_skip_flag[x0][y0][1]==0 && transform_skip_flag[x0][y0][2]==0))

As in the example of Table 100, a tree structure is a single tree type (SINGLE_TREE) or a dual tree luma type (DUAL_TREE_LUMA) and a transform skip mode flag (transform_skip_flag[x0][y0][0]) for a luma component is a first value (for example, 0), or a tree structure is a dual tree chroma type (DUAL_TREE_CHROMA) and a transform skip mode flag (transform_skip_flag [x0][y0][1]) for a chroma component (Cb) and a transform skip mode flag (transform_skip_flag [x0][y0][2]) for a chroma component (Cr) are all a first value (for example, 0), and ChromaArrayType is not a first value (for example, 0)

(((treeType==SINGLE_TREE||
treeType==DUAL_TREE_LUMA) && transform_skip_flag [x0][y0][0]==0|| (treeType==DUAL_TREE_CHROMA && (transform_skip_flag[x0][y0][1]==0 && transform_skip_flag[x0][y0][2]-=0) && ChromaArrayType !=0))

As in the example of Table 101, a tree structure is a single tree type (SINGLE_TREE) or a dual tree luma type (DUAL_TREE_LUMA) and a transform skip mode flag (transform_skip_flag[x0][y0][0]) for a luma component is a first value (for example, 0), or a tree structure is a dual tree chroma type (DUAL_TREE_CHROMA) and a transform skip mode flag (transform_skip_flag[x0][y0][1]) for a chroma component (Cb) and a transform skip mode flag (transform_skip_flag[x0][y0][2]) for a chroma component (Cr) are all a first value (for example, 0)

(((treeType==SINGLE_TREE||treeType==DUAL_TREE_LUMA) && transform_skip_flag[x0][y0][0]==0||
(treeType==DUAL_TREE_CHROMA && (transform_skip_flag[x0][y0][1]==0 && transform_skip_flag[x0][y0][2]==0)))

As in the example of Table 102, a tree structure is a single tree type (SINGLE_TREE) or a dual tree luma type (DUAL_TREE_LUMA) or ChromaArrayType is a first value (for example, 0) and a transform skip mode flag (transform_skip_flag[x0][y0][0]) for a luma component is a first value (for example, 0), or a tree structure is a dual tree chroma type (DUAL_TREE_CHROMA) and a transform skip mode flag (transform skip_flag [x0][y0][1]) for a chroma component (Cb) and a transform skip mode flag (transform_skip_flag [x0][y0][2]) for a chroma component (Cr) are all a first value (for example, 0) and ChromaArrayType is not a first value (for example, 0)

(((treeType==SINGLE_TREE||treeType==DUAL_TREE_LUMA|| ChromaArrayType==0) && transform_skip_flag[x0][y0][0]==0)||
(treeType==DUAL_TREE_CHROMA && (transform_skip_flag[x0][y0][1]==0 && transform_skip_flag[x0][y0][2]==0) && ChromaArrayType !=0))

As in the example of Table 103, in relation to a transform skip mode flag, the lfnst_idx[x0][y0] may be entropy encoded/decoded according to information on whether or not there is a non-zero transform coefficient or a non-zero transform coefficient level that is encoded in a corresponding transform block/unit in a unit of transform block/unit as a color component unit.

For example, when an coded block flag for a specific color component (at least one of a luma component, a Cb component, and a Cr component) is a first value (for example, 0) or a transform skip mode flag is a first value (for example, 0), lfnst_idx[x0][y0] may be entropy encoded/decoded.

According to a color component, the coded block flag may mean at least one of tu_y_coded_flag, tu_cb_coded_flag, and tu_cr_coded_flag. In addition, when the coded block flag is a first value (for example, 0), it may mean that there is no non-zero transform coefficient or no non-zero transform coefficient level that is encoded in a corresponding transform block/unit in a unit of transform block/unit. In addition, when the coded block flag is a second value (for example, 1), it may mean that there is a non-zero transform coefficient or a non-zero transform coefficient level that is encoded in a corresponding transform block/unit in a unit of transform block/unit.

Herein, when a transform skip mode flag is a first value (for example, 0), it may mean that at least one of a primary transform and a secondary transform is performed. In addition, when a transform skip mode flag is a second value (for example, 1), it may mean that at least one of a primary transform and a secondary transform is not performed.

ChromaArrayType may mean a chroma format of a current sequence or picture.

When ChromaArrayType is a first value (for example, 0), a chroma format may be determined as a 4:0:0 color format where no chroma signal is present and only a luma signal is present. When a chroma format is a 4:0:0 color format, it may be determined as monochrome without chroma component. In addition, when ChromaArrayType is a second value (for example, 1), a chroma format may be set as a 4:2:0 color format. When ChromaArrayType is a third value (for example, 2), a chroma format may be set as a 4:2:2 color format. When ChromaArrayType is a fourth value (for example, 3), a chroma format may be set as a 4:4:4 color format.

ChromaArrayType may be determined based on a chroma_format_idc syntax element value and mean a form of a chroma component.

According to an embodiment, based on secondary transform performance information, whether or not a secondary transform/inverse transform is applied to a current block may be determined. The secondary transform performance information may be derived according to a transform matrix index (lfnst_idx) and/or a tree structure. The secondary transform performance information may be determined for at least one of a sequence, a picture, sub-picture, a tile, a slice, a coding unit, a prediction unit, and a transform unit. According to secondary transform performance information, a default quantization matrix may be used for a block to which a secondary transform/inverse transform is applied. A default quantization matrix may mean a matrix with all the matrix coefficients having a constant value of N. Here, N may be a positive integer. For example, N may be 16.

According to an embodiment, when the transform matrix index indicates a first value (for example, 0), secondary transform performance information may be determined so as to indicate that a secondary transform/inverse transform is not applied to a current block. When the transform matrix index indicates other value than a first value, secondary transform performance information may be determined so as to indicate that a secondary transform/inverse transform is applied to a current block. In other words, whether or not a secondary transform is applied to a current block may be derived from a transform matrix index.

According to another embodiment, based on a tree structure, secondary transform performance information may be determined. When a tree structure is a single tree type, secondary transform performance information may be determined as follows.

For a block of a luma component, when the transform matrix index indicates a first value (for example, 0), secondary transform performance information may be determined so as to indicate that a secondary transform/inverse transform is not applied to a current block. In addition, when the transform matrix index indicates other value than a first value, secondary transform performance information may be determined so as to indicate that a secondary transform/inverse transform is applied to a current block.

However, for a block of a chroma component, secondary transform performance information may be determined so as to indicate that a secondary transform/inverse transform is not applied to a current block, irrespective of a value of a transform matrix index.

When a tree structure is a dual tree type, secondary transform performance information may be determined irrespective of a color component of a block. For example, when the transform matrix index indicates a first value (for example, 0), secondary transform performance information may be determined so as to indicate that a secondary transform/inverse transform is not applied to a current block. When the transform matrix index indicates other value than a first value, secondary transform performance information may be determined so as to indicate that a secondary transform/inverse transform is applied to a current block.

FIG. 52 illustrates a video decoding method according to an embodiment.

In the step S9202, a transform skip mode flag indicating whether or not a transform skip mode is applied to a current block may be obtained.

According to an embodiment, for a current block, information on whether or not an intra residual DPCM method is used may be obtained. When information on whether or not an intra residual DPCM method is used shows that an intra residual DPCM method is used for the current block, it may be determined that a transform skip mode is applied to the current block. When information on whether or not an intra residual DPCM method is used shows that an intra residual DPCM method is not used for the current block, the transform skip mode flag may be obtained.

According to an embodiment, for a current block, a transform skip mode flag for a luma component, a transform skip mode flag for a Cb component, and a transform skip mode flag for a Cr component may be obtained.

In the step S9204, when a transform skip mode is applied to the current block according to a transform skip mode flag, it may be determined that a secondary transform/inverse transform is not applied to the current block.

According to an embodiment, when a tree structure of the current block is a single tree type, the transform skip mode flag for the luma component indicates that a transform skip mode is applied to the luma component, the transform skip mode flag for the Cb component indicates that a transform skip mode is applied to the Cb component, and the transform skip mode flag for the Cr component indicates that a transform skip mode is applied to the Cr component, it may be determined that a secondary transform/inverse transform is not applied to the current block.

According to an embodiment, when a tree structure of the current block is a dual tree luma type and the transform skip mode flag for the luma component indicates that a transform skip mode is applied to the luma component, it may be determined that a secondary transform/inverse transform is not applied to the current block.

According to an embodiment, when a tree structure of the current block is a dual tree chroma type, the transform skip mode flag for the Cb component indicates that a transform skip mode is applied to the Cb component, and the transform skip mode flag for the Cr component indicates that a transform skip mode is applied to the Cr component, it may be determined that a secondary transform/inverse transform is not applied to the current block.

In the step S9206, when a transform skip mode is not applied to the current block according to a transform skip mode flag, a transform matrix index for a secondary transform/inverse transform of the current block may be obtained. In addition, according to the transform matrix index, it may be determined whether or not a secondary transform/inverse transform is applied to the current block.

According to an embodiment, when the current block is predicted according to an intra prediction mode that is not a matrix based intra prediction mode, a transform matrix index for a secondary transform/inverse transform of current block may be obtained.

According to an embodiment, when a secondary transform/inverse transform is applied to a current block, a secondary transform matrix of the current block may be determined according to the transform matrix index. In addition, according to the secondary transform matrix, a secondary transform/inverse transform may be applied to the current block.

According to an embodiment, whether or not a secondary transform/inverse transform is applied to the current block may be determined according to at least one of the transform matrix index, a size of the current block, and the transform skip mode flag. In addition, a secondary transform matrix of the current block may be determined according to at least one of the transform matrix index, a transform matrix set index of the current block, and the size of the current block.

FIG. 53 illustrates a video encoding method according to an embodiment.

In the step S9302, a transform skip mode flag indicating whether or not a transform skip mode is applied to a current block may be entropy encoded.

According to an embodiment, for the current block, information on whether or not an intra residual DPCM method is used may be entropy encoded. In addition, when the information on whether or not an intra residual DPCM method is used shows that an intra residual DPCM method is used for the current block, it may be determined that a transform skip mode is applied to the current block. On the other hand, when the information on whether or not an intra residual DPCM method is used shows that an intra residual DPCM method is not used for the current block, the transform skip mode flag of the current block may be entropy encoded.

According to an embodiment, for the current block, a transform skip mode flag for a luma component, a transform skip mode flag for a Cb component, and a transform skip mode flag for a Cr component may be entropy encoded.

In the step S9304, when a transform skip mode is applied to the current block according to the transform skip mode flag, it may be determined that a secondary transform/inverse transform is not applied to the current block.

According to an embodiment, when a tree structure of the current block is a single tree type, the transform skip mode flag for the luma component indicates that a transform skip mode is applied to the luma component, the transform skip mode flag for the Cb component indicates that a transform skip mode is applied to the Cb component, and the transform skip mode flag for the Cr component indicates that a transform skip mode is applied to the Cr component, it may be determined that a secondary transform/inverse transform is not applied to the current block.

According to an embodiment, when a tree structure of the current block is a dual tree luma type and the transform skip mode flag for the luma component indicates that a transform skip mode is applied to the luma component, it may be determined that a secondary transform/inverse transform is not applied to the current block.

According to an embodiment, when a tree structure of the current block is a dual tree chroma type, the transform skip mode flag for the Cb component indicates that a transform skip mode is applied to the Cb component, and the transform skip mode flag for the Cr component indicates that a transform skip mode is applied to the Cr component, it may be determined that a secondary transform/inverse transform is not applied to the current block.

In the step S9306, when a transform skip mode is not applied to the current block, it may be determined whether or not a secondary transform/inverse transform is applied to the current block. In addition, according to whether or not a secondary transform/inverse transform is applied to the current block, a transform matrix index for the secondary transform/inverse transform of the current block may be entropy encoded.

According to an embodiment, when a secondary transform/inverse transform is applied to the current block, a secondary transform matrix of the current block may be determined. In addition, according to whether or not a secondary transform/inverse transform is applied to the current block, the transform matrix index may be entropy encoded.

According to an embodiment, whether or not a secondary transform/inverse transform is applied to the current block may be determined according to at least one of the transform matrix index, a size of the current block, and the transform skip mode flag. In addition, a secondary transform matrix of the current block may be determined according to at least one of the transform matrix index, a transform matrix set index of the current block, and the size of the current block.

According to an embodiment, when the current block is predicted according to an intra prediction mode that is not a matrix based intra prediction mode, the transform matrix index may be entropy encoded.

The embodiments of FIG. 52 and FIG. 53 are illustrative, and each step of FIG. 52 and FIG. 53 may be readily modified by those skilled in the art. In addition, each configuration of FIG. 52 and FIG. 53 may be omitted or replaced by other configuration. The video decoding method of FIG. 52 may be performed in the decoder of FIG. 2. In addition, the video encoding method of FIG. 53 may be performed in the encoder of FIG. 1. In addition, one or more processors may execute commands implementing each step of FIG. 52 and FIG. 53. In addition, a program product including commands implementing each step of FIG. 52 and FIG. 53 may be stored in a memory device or be circulated online.

In this specification, when predetermined information is obtained, it may mean that the information is entropy encoded from a bitstream.

In an encoder, a transform/inverse transform may be performed by using at least one of the above-described embodiments in a transform/inverse transform process. Also, in a decoder, an inverse transform may be performed by using at least one of the above-described embodiments in an inverse transform process.

In the above-described embodiments, on the basis of at least one coding parameter among an intra-prediction mode for a block, a prediction mode, a color component, a size, a form, subblock partition-related information, secondary transform performance information, and matrix based intra prediction performance information, at least one of a one-dimensional transform type, a two-dimensional transform combination, and whether or not a transform is used may be determined in a transform/inverse transform process.

In the above-described embodiments, on the basis of at least one coding parameter among an intra-prediction mode for a block, a prediction mode, a color component, a size, a form, subblock partition-related information, secondary transform performance information, and matrix based intra prediction performance information, at least one of a reduced secondary transform/inverse transform matrix set, a reduced secondary transform/inverse transform matrix, and whether or not a reduced secondary transform/inverse transform is performed may be determined.

In an encoder, quantization/dequantization may be performed by using the quantization matrix and the above-described embodiments in a quantization/dequantization process. Also, in a decoder, dequantization may be performed by using the recovered quantization matrix and the above-described embodiments in a dequantization process. The recovered quantization matrix may be a quantization matrix with a two-dimensional form.

In the above-described embodiments, at least one of expressing, constructing, recovering, predicting and encoding/decoding a quantization matrix may be performed so that different quantization matrices are used in a quantization/dequantization process on the basis of at least one of a prediction mode for a block, a color component, a size, a form, a one-dimensional transform type, a two-dimensional transform combination, and whether or not a transform is used. Herein, at least one of quantization matrices, for which at least one of expressing, constructing, recovering, predicting and encoding/decoding is performed, may have at least one different coefficient in a quantization matrix according to at least one of a prediction mode, a color component, a size, a form, a one-dimensional transform type, a two-dimensional transform combination, and whether or not a transform is used.

In the above-described embodiments, a transform coefficient level may be generated by using a quantization matrix for a transform coefficient during quantization in an encoder, and a transform coefficient may be generated by using a quantization matrix for a transform coefficient level during dequantization in a decoder. In the present invention, for the sake of convenience, both transform coefficient and transform coefficient level are commonly called transform coefficient.

In the above-described embodiments, since an M×N or N×M quantization matrix is capable of being derived from a square M×M quantization matrix, a quantization matrix expressed as M×M size in quantization/dequantization may mean not only a square M×M quantization matrix but also a non-square M×N or N×M quantization matrix. Here, M and N may be a positive integer and have a value from 2 to 64. In addition, M and N may be different values from each other.

For example, since a non-square 16×4 or 4×16 quantization matrix is capable of being derived from a square 16×16 quantization matrix in quantization/dequantization, a quantization matrix expressed as 16×16 size in quantization/dequantization may mean not only a square 16×16 quantization matrix but also a non-square 16×4 or 4×16 quantization matrix.

In the above-described embodiments, quantization matrix information may mean information necessary for at least one of a quantization matrix and quantization matrix derivation. Herein, information necessary for deriving a quantization matrix may include at least one of information on whether or not a quantization matrix is used, information on whether or not a quantization matrix is present, information on a method of predicting a quantization matrix, a reference matrix identifier, a DC matrix coefficient or a lowest frequency matrix coefficient, and a difference value between a previously encoded/decoded quantization matrix coefficient value in a quantization matrix and a quantization matrix coefficient value to be encoded/decoded.

The above embodiments of the present invention may be applied according to a size of at least one of a block and a unit. Herein, the size may be defined as a minimum size or maximum size or both so that the above embodiments are applied, or may be defined as a fixed size to which the above embodiment is applied. In addition, among the above embodiments, a first embodiment may be applied to a first size, and a second embodiment may be applied to a second size. In other words, the above embodiments may be applied in combination depending on a size. In addition, the above embodiments may be applied only when a size is equal to or greater than a minimum size and equal to or smaller than a maximum size. In other words, the above embodiments may be applied only when a block size is within a predetermined range.

In addition, the above embodiments may be applied only when a size is equal to or greater than a minimum size and equal to or smaller than a maximum size. Here, the minimum size and the maximum size may be one of a block size and a unit size, respectively. In other words, a target block of a minimum size and a target block of a maximum size may be different from each other. In addition, the above embodiments may be applied when a size of current block is equal to or greater that a minimum size of a block and equal to or smaller than a maximum size of a block.

For example, the above embodiments may be applied only when a size of current block is equal to or greater than 8×8. For example, the above embodiments may be applied only when a size of current block is equal to or greater than 16×16. For example, the above embodiments may be applied only when a size of current block is equal to or greater than 32×32. For example, the above embodiments may be applied only when a size of current block is equal to or greater than 64×64. For example, the above embodiments may be applied only when a size of current block is equal to or greater than 128×128. For example, the above embodiments may be applied only when a size of current block is 4×4. For example, the above embodiments may be applied only when a size of current block is equal to or smaller than 8×8. For example, the above embodiments may be applied only when a size of current block is equal to or smaller than 16×16. For example, the above embodiments may be applied only when a size of current block is equal to or greater than 8×8 and equal to or smaller than 16×16. For example, the above embodiments may be applied only when a size of current block is equal to or greater than 16×16 and equal to or smaller than 64×64.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

Only any one of the above-described embodiment is not applied to the encoding/decoding process of the current block, but a combination of at least one of the embodiments or specific embodiments is applicable to the encoding/decoding process of the current block.

At least one of syntax elements (flags, indices, etc.) entropy-coded by the encoder and entropy-decoded by the decoder may use at least one of the following binarization/debinarization methods and entropy-coding/decoding methods.

- Signed 0-th order Exp_Golomb binarization/debinarization method (se(v))
- Signed k-th order Exp_Golomb binarization/debinarization method (sek(v))
- Unsigned 0-th order Exp_Golomb binarization/debinarization method (ue(v))
- Unsigned k-th order Exp_Golomb binarization/debinarization method (uek(v))
- Fixed-length binarization/debinarization method (f(n))
- Truncated Rice binarization/debinarization method or Truncated Unary binarization/debinarization method (tu(v))
- Truncated binary binarization/debinarization method (tb (v))
- Context-adaptive arithmetic encoding/decoding method (ae(v))
- Byte-unit bit string (b(8))
- Signed integer binarization/debinarization method (i(n))
- Unsigned integer binarization/debinarization method (u(n))
- Unary binarization/debinarization method

TABLE 64

| Transformation process for scaled transform coefficients |
|---|
| Inputs to this process are:<br>- a luma location ( xTbY, yTbY ) specifying the top-left sample of the current luma transform block relative to the top-left luma sample of the current picture,<br>- a variable nTbW specifying the width of the current transform block,<br>- a variable nTbH specifying the height of the current transform block,<br>- a variable cIdx specifying the colour component of the current block,<br>- an (nTbW)x(nTbH) array d[ x ][ y ] of scaled transform coefficients with x = 0..nTbW − 1. y = 0..nTbH − 1.<br>Output of this process is the (nTbW)x(nTbH) array r[ x ][ y ] of residual samples with x = 0..nTbW − 1, y = 0..nTbH − 1.<br>The variable implicitMtsEnabled is derived as follows:<br>- If sps_mts enabled flag is equal to 1 and one of the following conditions is true, implicitMtsEnabled is set equal to 1:<br>- IntraSubPartitionsSplitType is not equal to ISP_NO_SPLIT<br>- cu_sbt_flag is equal to 1 and Max( nTbW, nTbH ) is less than or equal to 32<br>- sps_explicit_mts_intra_enabled_flag and sps_explicit_mts_inter_enabled_flag are both equal to 0 and CuPredMode[ xTbY ][ yTbY ] is equal to MODE_INTRA<br>- Otherwise, implicitMtsEnabled is set equal to 0.<br>The variable trTypeHor specifying the horizontal transform kernel and the variable trTypeVer specifying the vertical transform kernel are derived as follows:<br>- If cIdx is greater than 0, trTypeHor and trTypeVer are set equal to 0.<br>- Otherwise, if implicitMtsEnabled is equal to 1, the following applies:<br>- If IntraSubPartitionsSplitType is not equal to ISP_NO_SPLIT or (sps_explicit_mts_intra_enabled_flag and sps_explicit_mts_inter_enabled_flag are equal to 0), trTypeHor and trTypeVer are derived as follows:<br>- trTypeHor = ( nTbW >= 4 && nTbW <= 16 ) ? 1 : 0 (8-1030)<br>- trTypeVer = ( nTbH >= 4 && nTbH <= 16 ) ? 1 : 0 (8-1031)<br>- Otherwise, if cu_sbt_flag is equal to 1, trTypeHor and trTypeVer are specified in Table 8-14 depending on cu_sbt_horizontal_flag and cu_sbt_pos_flag.<br>- Otherwise, trTypeHor and trTypeVer are specified in Table 8-13 depending on tu_mts_idx[ xTbY ][ yTbY ].<br>The variables nonZeroW and nonZeroH are derived as follows:<br>nonZeroW = Min( nTbW, ( trTypeHor > 0) ? 16 : 32 ) (8-1032)<br>nonZeroH = Min( nTbH, ( trTypeVer > 0) ? 16 : 32) (8-1033) |

TABLE 65

| Transformation process for scaled transform coefficients |
|---|
| Inputs to this process are:<br>- a luma location ( xTbY, yTbY ) specifying the top-left sample of the current luma transform block rela-tive<br>to the top-left luma sample of the current picture,<br>- a variable nTbW specifying the width of the current transform block,<br>- a variable nTbH specifying the height of the current transform block,<br>- a variable cIdx specifying the colour component of the current block,<br>- an (nTbW)x(nTbH) array d[ x ][ y ] of scaled transform coefficients with x = 0 .. nTbW − 1. y = 0 .. nTbH − 1.<br>Output of this process is the (nTbW)x(nTbH) array r[ x ][ y ] of residual samples with x = 0 .. nTbW − 1, y = 0 .. nTbH − 1.<br>The variable implicitMtsEnabled is derived as follows:<br>- If sps_mts_enabled flag is equal to 1 and one of the following conditions is true, implicitMtsEnabled is set equal to 1:<br>- IntraSubPartitionsSplitType is not equal to ISP NO SPLIT<br>- cu sbt flag is equal to 1 and Max( nTbW, nTbH ) is less than or equal to 32<br>- sps_explicit_mts_intra enabled flag and sps_explicit_mts_inter enabled_flag are both equal to 0 and CuPredMode[ xTbY ][ yTbY ] is equal to MODE INTRA<br>- Otherwise, implicitMtsEnabled is set equal to 0.<br>The variable trTypeHor specifying the horizontal transform kernel and the variable trTypeVer specifying the<br>vertical transform kernel are derived as follows:<br>- If cIdx is greater than 0, trTypeHor and trType Ver are set equal to 0.<br>- Otherwise, if implicitMtsEnabled is equal to 1, the following applies:<br>- If IntraSubPartitionsSplitType is not equal to ISP_NO_SPLIT or (sps_explicit_mts_intra enabled_flag and sps_explicit_mts_inter enabled flag are equal to 0 and CuPredMode[ xTbY ][ yTbY ] is equal to MODE_INTRA), trTypeHor and trTypeVer are derived as follows:<br>- trTypeHor = ( nTbW >=4 && nTbW <= 16 ) ? 1 : 0 (8-1030)<br>- trType Ver = ( nTbH >=4 && nTbH <= 16 ) ? 1 : 0 (8-1031)<br>- Otherwise, if cu sbt flag is equal to 1, trTypeHor and trType Ver are specified in Table 8-14 depending on cu_sbt_horizontal_flag and cu_sbt_pos_flag. |

TABLE 65-continued

| Transformation process for scaled transform coefficients | |
|---|---|
| - Otherwise, trTypeHor and trTypeVer are specified in Table 8-13 depending on tu_mts_idx[ xTbY ][ yTbY ]. | |
| The variables nonZeroW and nonZeroH are derived as follows: | |
| nonZeroW = Min( nTbW, ( trTypeHor > 0) ? 16 : 32 ) | (8-1032) |
| nonZeroH = Min( nTbH, ( trTypeVer>0) ? 16 : 32) | (8-1033) |

TABLE 66

The (nTbW)×(nTbH) array r of residual samples is derived as follows:

1. When nTbH is greater than 1, each (vertical) column of scaled transform coefficients d[ x ][ y ] with x = 0..nonZeroW − 1, y = 0..nonZeroH − 1 is transformed to e[ x ][ y ] with x = 0..nonZeroW − 1, y = 0..nTbH − 1 by invoking the one-dimensional transformation process as specified in clause 8.7.4.2 for each column x = 0..nonZeroW − 1 with the height of the transform block nTbH, the non-zero height of the scaled transform coefficients nonZeroH, the list d[ x ][ y ] with y = 0..nonZeroH − 1 and the transform type variable trType set equal to trTypeVer as inputs, and the output is the list e[ x ][ y ] with y = 0..nTbH − 1.
2. When nTbH and nTbW are both greater than 1, the intermediate sample values g[ x ][ y ] with x = 0..nonZeroW − 1, y = 0..nTbH − 1 are derived as follows:
   g[ x ][ y ] = Clip3( CoeffMin, CoeffMax, ( e[ x ][ y ] + 64) >> 7) (8-1034)
3. When nTbW is greater than 1, each (horizontal) row of the resulting array g[ x ][ y ] with x = 0..nonZeroW − 1, y = 0..nTbH − 1 is transformed to r[ x ][ y ] with x = 0..nTbW − 1, y = 0..nTbH − 1 by invoking the one-dimensional transformation process as specified in clause 8.7.4.2 for each row y = 0..nTbH − 1 with the width of the transform block nTbW, the non-zero width of the resulting array g[ x ][ y ] nonZeroW, the list g[ x ][ y ] with x = 0..nonZeroW − 1 and the transform type variable trType set equal to trTypeHor as inputs, and the output is the list r[ x ][ y ] with x = 0..nTbW − 1.

TABLE 67

Table 8-13 - Specification of trTypeHor and trTypeVer depending on tu mts idx[ x ][ y ]

| tu mts idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

TABLE 68

Table 8-14 - Specification of trTypeHor and trTypeVer depending on cu_sbt_horizontal_flag and cu_sbt_pos_flag

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

TABLE 69

When nTrS is 16, lfnstTrSetldx is 0 and lfnstldx is 1, the following lowFreqTransMatrix is derived.
lowFreqTransMatrix[ m ][ n ] =
{

| | | | | | | | | | | | | | | | | | |
|---|---|---|---|---|---|---|---|---|---|---|---|---|---|---|---|---|---|
| { | 108 | −44 | −15 | 1 | −44 | 19 | 7 | −1 | −11 | 6 | 2 | −1 | 0 | −1 | −1 | 0 | } |
| { | −40 | −97 | 56 | 12 | −11 | 29 | −12 | −3 | 18 | 18 | −15 | −3 | −1 | −3 | 2 | 1 | } |
| { | 25 | −31 | −1 | 7 | 100 | −16 | −29 | 1 | −54 | 21 | 14 | −4 | −7 | 2 | 4 | 0 | } |
| { | −32 | −39 | −92 | 51 | −6 | −16 | 36 | −8 | 3 | 22 | 18 | −15 | 4 | 1 | −5 | 2 | } |
| { | 8 | −9 | 33 | −8 | −16 | −102 | 36 | 23 | −4 | 38 | −27 | −5 | 5 | 16 | −8 | −6 | } |
| { | −25 | 5 | 16 | −3 | −38 | 14 | 11 | −3 | −97 | 7 | 26 | 1 | 55 | −10 | −19 | 3 | } |
| { | 8 | 9 | 16 | 1 | 37 | 36 | 94 | −38 | −7 | 3 | −47 | 11 | −6 | −13 | −17 | 10 | } |
| { | 2 | 34 | −5 | 1 | −7 | 24 | −25 | −3 | 8 | 99 | −28 | −29 | 6 | −43 | 21 | 11 | } |
| { | −16 | −27 | −39 | −109 | 6 | 10 | 16 | 24 | 3 | 19 | 10 | 24 | −4 | −7 | −2 | −3 | } |
| { | −9 | −10 | −34 | 4 | −9 | −5 | −29 | 5 | −33 | −26 | −96 | 33 | 14 | 4 | 39 | −14 | } |
| { | −13 | 1 | 4 | −9 | −30 | −17 | −3 | −64 | −35 | 11 | 17 | 19 | −86 | 6 | 36 | 14 | } |
| { | 8 | −7 | −5 | −15 | 7 | −30 | −28 | −87 | 31 | 4 | 4 | 33 | 61 | −5 | −17 | 22 | } |
| { | −2 | 13 | −6 | −4 | −2 | 28 | −13 | −14 | −3 | 37 | −15 | −3 | −2 | 107 | −36 | −24 | } |
| { | 4 | 9 | 11 | 31 | 4 | 9 | 16 | 19 | 12 | 33 | 32 | 94 | 12 | 0 | 34 | −45 | } |
| { | 2 | −2 | 8 | −16 | 8 | 5 | 28 | −17 | 6 | −7 | 18 | −45 | 40 | 36 | 97 | −8 | } |
| { | 0 | −2 | 0 | −10 | −1 | −7 | −3 | −35 | −1 | −7 | −2 | −32 | −6 | −33 | −16 | −112 | } |

},

Otherwise, when nTrS is 16, lfnstTrSetldx is 0 and lfnstldx is 2, the following lowFreqTransMatrix is derived.
lowFreqTransMatrix[ m ][ n ] =
{

| | | | | | | | | | | | | | | | | | |
|---|---|---|---|---|---|---|---|---|---|---|---|---|---|---|---|---|---|
| { | 119 | −30 | −22 | −3 | −23 | −2 | 3 | 2 | −16 | 3 | 6 | 0 | −3 | 2 | 1 | 0 | } |
| { | −27 | −101 | 31 | 17 | −47 | 2 | 22 | 3 | 19 | 30 | −7 | −9 | 5 | 3 | −5 | −1 | } |
| { | 0 | 58 | 22 | −15 | −102 | 2 | 38 | 2 | 10 | −13 | −5 | 4 | 14 | −1 | −9 | 0 | } |
| { | 23 | 4 | 66 | −11 | 22 | 89 | −2 | −26 | 13 | −8 | −38 | −1 | −9 | −20 | −2 | 8 | } |
| { | −19 | −5 | −89 | 2 | −26 | 76 | −11 | −17 | 20 | 13 | 18 | −4 | 1 | −15 | 3 | 5 | } |
| { | −10 | −1 | −1 | 6 | 23 | 25 | 87 | −7 | −74 | 4 | 39 | −5 | 0 | −1 | −20 | −1 | } |
| { | −17 | −28 | 12 | −8 | −32 | 14 | −53 | −6 | −68 | −67 | 17 | 29 | 2 | 6 | 25 | 4 | } |
| { | 1 | −24 | −23 | 1 | 17 | −7 | 52 | 9 | 50 | −92 | −15 | 27 | −15 | −10 | −6 | 3 | } |
| { | −6 | −17 | −2 | −111 | 7 | −17 | 8 | −42 | 9 | 18 | 16 | 25 | −4 | 2 | −1 | 11 | } |
| { | 9 | 5 | 35 | 0 | 6 | 21 | −9 | 34 | 44 | −3 | 102 | 11 | −7 | 13 | 11 | −20 | } |
| { | 4 | −5 | −5 | −10 | 15 | 19 | −2 | 6 | 6 | −12 | −13 | 6 | 95 | 69 | −29 | −24 | } |
| { | −6 | −4 | −9 | −39 | 1 | 22 | 0 | 102 | −19 | 19 | −32 | 30 | −16 | −14 | −8 | −23 | } |
| { | 4 | −4 | 7 | 8 | 4 | −13 | −18 | 5 | 0 | 0 | 21 | 22 | 58 | −88 | −54 | 28 | } |
| { | −4 | −7 | 0 | −24 | −7 | 0 | −25 | 3 | −3 | −30 | 8 | −76 | −34 | 4 | −80 | −26 | } |

TABLE 69-continued

| | | | | | | | | | | | | | | | | | |
|---|---|---|---|---|---|---|---|---|---|---|---|---|---|---|---|---|---|
| { | 0 | 6 | 0 | 30 | −6 | 1 | −13 | −23 | 1 | 20 | −2 | 80 | −44 | 37 | −68 | 1 | } |
| { | 0 | 0 | −1 | 5 | −1 | −7 | 1 | −34 | −2 | 3 | −6 | 19 | 5 | −38 | 11 | −115 | } |
| }, | | | | | | | | | | | | | | | | | |

TABLE 70

Otherwise, when nTrS is 16, lfnstTrSetIdx is 1 and lfnstIdx is 1, the following lowFreqTransMatrix is derived.
lowFreqTransMatrix[ m ][ n ] =

| | | | | | | | | | | | | | | | | | |
|---|---|---|---|---|---|---|---|---|---|---|---|---|---|---|---|---|---|
| { | | | | | | | | | | | | | | | | | |
| { | −111 | 39 | 4 | 3 | 44 | 11 | −12 | −1 | 7 | −16 | −5 | 2 | 3 | −1 | 4 | 2 | } |
| { | −47 | −27 | 15 | −1 | −92 | 43 | 20 | −2 | 20 | 39 | −16 | −5 | 10 | −5 | −13 | 2 | } |
| { | −35 | −23 | 4 | 4 | −17 | −72 | 32 | 6 | −59 | 18 | 50 | −6 | 0 | 40 | 0 | −13 | } |
| { | 13 | 93 | −27 | −4 | −48 | 13 | −34 | 4 | −52 | 11 | 1 | 10 | 3 | 16 | −3 | 1 | } |
| { | −11 | −27 | 1 | 2 | −47 | −4 | −36 | 10 | −2 | −85 | 14 | 29 | −20 | −2 | 57 | 4 | } |
| { | 0 | −35 | 32 | −2 | 26 | 60 | −3 | −17 | −82 | 1 | −30 | 0 | −37 | 21 | 3 | 12 | } |
| { | −17 | −46 | −92 | 14 | 7 | −10 | −39 | 29 | −17 | 27 | −28 | 17 | 1 | −15 | −13 | 17 | } |
| { | 4 | −10 | −23 | 4 | 16 | 58 | −17 | 26 | 30 | 21 | 67 | 2 | −13 | 59 | 13 | −40 | } |
| { | 5 | −20 | 32 | −5 | 8 | −3 | −46 | −7 | −4 | 2 | −15 | 24 | 100 | 44 | 0 | 5 | } |
| { | −4 | −1 | 38 | −18 | −7 | −42 | −63 | −6 | 33 | 34 | −23 | 15 | −65 | 33 | −20 | 2 | } |
| { | −2 | −10 | 35 | −19 | 5 | 8 | −44 | 14 | −25 | 25 | 58 | 17 | 7 | −84 | −16 | −18 | } |
| { | 5 | 13 | 18 | 34 | 11 | −4 | 18 | 18 | 5 | 58 | −3 | 42 | −2 | −10 | 85 | 38 | } |
| { | −5 | −7 | −34 | −83 | 2 | −1 | −4 | −73 | 4 | 20 | 15 | −12 | 4 | −3 | 44 | 12 | } |
| { | 0 | 4 | −2 | −60 | 5 | 9 | 42 | 34 | 5 | −14 | 9 | 80 | −5 | 13 | −38 | 37 | } |
| { | −1 | 2 | 7 | −57 | 3 | −7 | 9 | 68 | −9 | 6 | −49 | −20 | 6 | −4 | 36 | −64 | } |
| { | −1 | 0 | −12 | 23 | 1 | −4 | 17 | −53 | −3 | 4 | −21 | 72 | −4 | −8 | −3 | −83 | } |
| }, | | | | | | | | | | | | | | | | | |

Otherwise, when nTrS is 16, lfnstTrSetIdx is 1 and lfnstIdx is 2, the following lowFreqTransMatrix is derived
lowFreqTransMatrix[ m ][ n ] =

| | | | | | | | | | | | | | | | | | |
|---|---|---|---|---|---|---|---|---|---|---|---|---|---|---|---|---|---|
| { | | | | | | | | | | | | | | | | | |
| { | 88 | −55 | 6 | −3 | −66 | 27 | 9 | −2 | 11 | 11 | −13 | 1 | −2 | −7 | 1 | 2 | } |
| { | −58 | −20 | 27 | −2 | −27 | 75 | −29 | 0 | 47 | −42 | −11 | 11 | −9 | −3 | 19 | −4 | } |
| { | −51 | 23 | −22 | 5 | −63 | 3 | 37 | −5 | 1 | 64 | −35 | −4 | 29 | −31 | −11 | 13 | } |
| { | −27 | −76 | 49 | −2 | 40 | 14 | 9 | −17 | −56 | 36 | −25 | 6 | 14 | 3 | −6 | 8 | } |
| { | 19 | −4 | −36 | 22 | 52 | 7 | 36 | −23 | 28 | −17 | −64 | 15 | −5 | −44 | 48 | 9 | } |
| { | 29 | 50 | 13 | −10 | 1 | 34 | −59 | 1 | −51 | 4 | −16 | 30 | 52 | −33 | 24 | −5 | } |
| { | −12 | −21 | −74 | 43 | −13 | 39 | 18 | −5 | −58 | −35 | 27 | −5 | 19 | 26 | 6 | −5 | } |
| { | 19 | 38 | −10 | −5 | 28 | 66 | 0 | −5 | −4 | 19 | −30 | −26 | −40 | 28 | −60 | 37 | } |
| { | −6 | 27 | 18 | −5 | −37 | −18 | 12 | −25 | −44 | −10 | −38 | 37 | −66 | 45 | 40 | −7 | } |
| { | −13 | −28 | −45 | −39 | 0 | −5 | −39 | 69 | −23 | 16 | −12 | −18 | −50 | −31 | 24 | 13 | } |
| { | −1 | 8 | 24 | −51 | −15 | −9 | 44 | 10 | −28 | −70 | −12 | −39 | 24 | −18 | −4 | 51 | } |
| { | −8 | −22 | −17 | 33 | −18 | −45 | −57 | −27 | 0 | −31 | −30 | 29 | −2 | −13 | −53 | 49 | } |
| { | 1 | 12 | 32 | 51 | −8 | 8 | −2 | −31 | −22 | 4 | 46 | −39 | −49 | −67 | 14 | 17 | } |
| { | 4 | 5 | 24 | 60 | −5 | −14 | −23 | 38 | 9 | 8 | −34 | −59 | 24 | 47 | 42 | 28 | } |
| { | −1 | −5 | −20 | −34 | 4 | 4 | −15 | −46 | 18 | 31 | 42 | 10 | 10 | 27 | 49 | 78 | } |
| { | −3 | −7 | −22 | −34 | −5 | −11 | −36 | −69 | −1 | −3 | −25 | −73 | 5 | 4 | 4 | −49 | } |
| }, | | | | | | | | | | | | | | | | | |

TABLE 71

Otherwise, when nTrS is 16, lfnstTrSetIdx is 2 and lfnstIdx is 1, the following lowFreqTransMatrix is derived.
lowFreqTransMatrix[ m ][ n ] =

| | | | | | | | | | | | | | | | | | |
|---|---|---|---|---|---|---|---|---|---|---|---|---|---|---|---|---|---|
| { | | | | | | | | | | | | | | | | | |
| { | −112 | 47 | −2 | 2 | −34 | 13 | 2 | 0 | 15 | −7 | 1 | 0 | 8 | −3 | −1 | 0 | } |
| { | 29 | −7 | 1 | −1 | −108 | 40 | 2 | 0 | −45 | 13 | 4 | −1 | 8 | −5 | 1 | 0 | } |
| { | −36 | −87 | 69 | −10 | −17 | −33 | 26 | −2 | 7 | 14 | −11 | 2 | 6 | 8 | −7 | 0 | } |
| { | 28 | −5 | 2 | −2 | −29 | 13 | −2 | 0 | 103 | −36 | −4 | 1 | 48 | −16 | −4 | 1 | } |
| { | −12 | −24 | 15 | −3 | 26 | 80 | −61 | 9 | 15 | 54 | −36 | 2 | 0 | −4 | 6 | −2 | } |
| { | 18 | 53 | 69 | −74 | 14 | 24 | 28 | −30 | −6 | −7 | −11 | 12 | −5 | −7 | −6 | 8 | } |
| { | 5 | −1 | 2 | 0 | −26 | 6 | 0 | 1 | 45 | −9 | −1 | 0 | −113 | 28 | 8 | −1 | } |
| { | −13 | −32 | 18 | −2 | 15 | 34 | −27 | 7 | −25 | −80 | 47 | −1 | −16 | −50 | 28 | 2 | } |
| { | −4 | −13 | −10 | 19 | 18 | 46 | 60 | −48 | 16 | 33 | 60 | −48 | 1 | 0 | 5 | −2 | } |
| { | 15 | 33 | 63 | 89 | 8 | 15 | 25 | 40 | −4 | −8 | −15 | −8 | −2 | −6 | −9 | −7 | } |
| { | −8 | −24 | −27 | 15 | 12 | 41 | 26 | −29 | −17 | −50 | −39 | 27 | 0 | 35 | −67 | 26 | } |
| { | −2 | −6 | −24 | 13 | −1 | −8 | 37 | −22 | 3 | 18 | −51 | 22 | −23 | −95 | 17 | 17 | } |
| { | −3 | −7 | −16 | −21 | 10 | 24 | 46 | 75 | 8 | 20 | 38 | 72 | 1 | 2 | 1 | 7 | } |
| { | 2 | 6 | 10 | −3 | −5 | −16 | −31 | 12 | 7 | 24 | 41 | −16 | −16 | −41 | −89 | 49 | } |
| { | 4 | 8 | 21 | 40 | −4 | −11 | −28 | −57 | 5 | 14 | 31 | 70 | 7 | 18 | 32 | 52 | } |
| { | 0 | 1 | 4 | 11 | −2 | −4 | −13 | −34 | 3 | 7 | 20 | 47 | −6 | −19 | −42 | −101 | } |
| }, | | | | | | | | | | | | | | | | | |

Otherwise, when nTrS is 16, lfnstTrSetIdx is 2 and lfnstIdx is 2, the following lowFreqTransMatrix is derived.
lowFreqTransMatrix[ m ][ n ] =

TABLE 71-continued

{

| | | | | | | | | | | | | | | | | | |
|---|---|---|---|---|---|---|---|---|---|---|---|---|---|---|---|---|---|
| { | −99 | 39 | −1 | 2 | 65 | −20 | −5 | 0 | −15 | −2 | 5 | −1 | 0 | 3 | −1 | 0 | } |
| { | 58 | 42 | −33 | 3 | 33 | −63 | 23 | −1 | −55 | 32 | 3 | −5 | 21 | −2 | −8 | 3 | } |
| { | −15 | 71 | −44 | 5 | −58 | −29 | 25 | 3 | 62 | −7 | −4 | −4 | −19 | 4 | 0 | 1 | } |
| { | 46 | 5 | 4 | −6 | 71 | −12 | −15 | 5 | 52 | −38 | 13 | −2 | −63 | 23 | 3 | −3 | } |
| { | −14 | −54 | −29 | 29 | 25 | −9 | 61 | −29 | 27 | 44 | −48 | 5 | −27 | −21 | 12 | 7 | } |
| { | −3 | 3 | 69 | −42 | −11 | −50 | −26 | 26 | 24 | 63 | −19 | −5 | −18 | −22 | 12 | 0 | } |
| { | 17 | 16 | −2 | 1 | 38 | 18 | −12 | 0 | 62 | 1 | −14 | 5 | 89 | −42 | 8 | −2 | } |
| { | 15 | 54 | −8 | 6 | 6 | 60 | −26 | −8 | −30 | 17 | −38 | 22 | −43 | −45 | 42 | −7 | } |
| { | −6 | −17 | −55 | −28 | 9 | 30 | −8 | 58 | 4 | 34 | 41 | −52 | −16 | −36 | −20 | 16 | } |
| { | −2 | −1 | −9 | −79 | 7 | 11 | 48 | 44 | −13 | −34 | −55 | 6 | 12 | 23 | 20 | −11 | } |
| { | 7 | 29 | 14 | −6 | 12 | 53 | 10 | −11 | 14 | 59 | −15 | −3 | 5 | 71 | −54 | 13 | } |
| { | −5 | −24 | −53 | 15 | −3 | −15 | −61 | 26 | 6 | 30 | −16 | 23 | 13 | 56 | 44 | −35 | } |
| { | 4 | 8 | 21 | 52 | −1 | −1 | −5 | 29 | −7 | −17 | −44 | −84 | 8 | 20 | 31 | 39 | } |
| { | −2 | −11 | −25 | −4 | −4 | −21 | −53 | 2 | −5 | −26 | −64 | 19 | −8 | −19 | −73 | 39 | } |
| { | −3 | −5 | −23 | −57 | −2 | −4 | −24 | −75 | 1 | 3 | 9 | −25 | 6 | 15 | 41 | 61 | } |
| { | 1 | 1 | 7 | 18 | 1 | 2 | 16 | 47 | 2 | 5 | 24 | 67 | 3 | 9 | 25 | 88 | } |

},

TABLE 72

Otherwise, when nTrS is 16, lfnstTrSetldx is 3 and lfnstldx is 1, the following lowFreqTransMatrix is derived.
lowFreqTransMatrix[ m ][ n ] =

{

| | | | | | | | | | | | | | | | | | |
|---|---|---|---|---|---|---|---|---|---|---|---|---|---|---|---|---|---|
| { | −114 | 37 | 3 | 2 | −22 | −23 | 14 | 0 | 21 | −17 | −5 | 2 | 5 | 2 | −4 | −1 | } |
| { | −19 | −41 | 19 | −2 | 85 | −60 | −11 | 7 | 17 | 31 | −34 | 2 | −11 | 19 | 2 | −8 | } |
| { | 36 | −25 | 18 | −2 | −42 | −53 | 35 | 5 | 46 | −60 | −25 | 19 | 8 | 21 | −33 | −1 | } |
| { | −27 | −80 | 44 | −3 | −58 | 1 | −29 | 19 | −41 | 18 | −12 | −7 | 12 | −17 | 7 | −6 | } |
| { | −11 | −21 | 37 | −10 | 44 | −4 | 47 | −12 | −37 | −41 | 58 | 18 | 10 | −46 | −16 | 31 | } |
| { | 15 | 47 | 10 | −6 | −16 | −44 | 42 | 10 | −80 | 25 | −40 | 21 | −23 | −2 | 3 | −14 | } |
| { | 13 | 25 | 79 | −39 | −13 | 10 | 31 | −4 | 49 | 45 | 12 | −8 | 3 | −1 | 43 | 7 | } |
| { | 6 | 11 | −26 | 13 | −13 | −74 | −20 | −1 | 5 | −6 | 29 | −47 | 26 | −49 | 54 | 2 | } |
| { | −8 | −34 | −26 | 7 | −26 | −19 | 29 | −37 | 1 | 22 | 46 | −9 | −81 | 37 | 14 | 20 | } |
| { | −6 | −30 | −42 | −12 | −3 | 5 | 57 | −52 | −2 | 37 | −12 | 6 | 74 | 10 | 6 | −15 | } |
| { | 5 | 9 | −6 | 42 | −15 | −18 | −9 | 26 | 15 | 58 | 14 | 43 | 23 | −10 | −37 | 75 | } |
| { | −5 | −23 | −23 | 36 | 3 | 22 | 36 | 40 | 27 | −4 | −16 | 56 | −25 | −46 | 56 | −24 | } |
| { | 1 | 3 | 23 | 73 | 8 | 5 | 34 | 46 | −12 | 2 | 35 | −38 | 26 | 52 | 2 | −31 | } |
| { | −3 | −2 | −21 | −52 | 1 | −10 | −17 | 44 | −19 | −20 | 30 | 45 | 27 | 61 | 49 | 21 | } |
| { | −2 | −7 | −33 | −56 | −4 | −6 | 21 | 63 | 15 | 31 | 32 | −22 | −10 | −26 | −52 | −38 | } |
| { | −5 | −12 | −18 | −12 | 8 | 22 | 38 | 36 | −5 | −15 | −51 | −63 | −5 | 0 | 15 | 73 | } |

},

Otherwise, when nTrS is 16, lfnstTrSetldx is 3 and lfnstldx is 2, the following lowFreqTransMatrix is derived.
lowFreqTransMatrix[ m ][ n ] =

{

| | | | | | | | | | | | | | | | | | |
|---|---|---|---|---|---|---|---|---|---|---|---|---|---|---|---|---|---|
| { | −102 | 22 | 7 | 2 | 66 | −25 | −6 | −1 | −15 | 14 | 1 | −1 | 2 | −2 | 1 | 0 | } |
| { | 12 | 93 | −27 | −6 | −27 | −64 | 36 | 6 | 13 | 5 | −23 | 0 | −2 | 6 | 5 | −3 | } |
| { | −59 | −24 | 17 | 1 | −62 | −2 | −3 | 2 | 83 | −12 | −17 | −2 | −24 | 14 | 7 | −2 | } |
| { | −33 | 23 | −36 | 11 | −21 | 50 | 35 | −16 | −23 | −78 | 16 | 19 | 22 | 15 | −30 | −5 | } |
| { | 0 | −38 | −81 | 30 | 27 | 5 | 51 | −32 | 24 | 36 | −16 | 12 | −24 | −8 | 9 | 1 | } |
| { | 28 | 38 | 8 | −9 | 62 | 32 | −13 | 2 | 51 | −32 | 15 | 5 | −66 | 28 | 0 | −1 | } |
| { | 11 | −35 | 21 | −17 | 30 | −18 | 31 | 18 | −11 | −36 | −80 | 12 | 16 | 49 | 13 | −32 | } |
| { | −13 | 23 | 22 | −36 | −12 | 64 | 39 | 25 | −19 | 23 | −36 | 9 | −30 | −58 | 33 | −7 | } |
| { | −9 | −20 | −55 | −83 | 3 | −2 | 1 | 62 | 8 | 2 | 27 | −28 | 7 | 15 | −11 | 5 | } |
| { | −6 | 24 | −38 | 23 | −8 | 40 | −49 | 0 | −7 | 9 | −25 | −44 | 23 | 39 | 70 | −3 | } |
| { | 12 | 17 | 17 | 0 | 32 | 27 | 21 | 2 | 67 | 11 | −6 | −10 | 89 | −22 | −12 | 16 | } |
| { | 2 | −9 | 8 | 45 | 7 | −8 | 27 | 35 | −9 | −31 | −17 | −87 | −23 | −22 | −19 | 44 | } |
| { | −1 | −9 | 28 | −24 | −1 | −10 | 49 | −30 | −8 | −7 | 40 | 1 | 4 | 33 | 65 | 67 | } |
| { | 2 | −6 | 11 | 45 | 3 | −10 | 33 | 55 | 8 | −5 | 59 | 4 | 7 | −4 | 44 | −66 | } |
| { | −1 | 1 | −14 | 36 | −1 | 2 | −20 | 69 | 0 | 0 | −15 | 72 | 3 | 4 | 5 | 65 | } |

},

TABLE 73

Otherwise, when nTrS is 48, lfnstTrSetldx is 0 and lfnstldx is 1, the following lowFreqTransMatrix is derived.
lowFreqTransMatrix[ m ][ n ] = lowFreqTransMatrixCol0to15[ m ][ n ] with m = 0 . . . 15, n = 0 . . . 15
lowFreqTransMatrixCol0to15 =

{

| | | | | | | | | | | | | | | | | | |
|---|---|---|---|---|---|---|---|---|---|---|---|---|---|---|---|---|---|
| { | −117 | 28 | 18 | 2 | 4 | 1 | 2 | 1 | 32 | −18 | −2 | 0 | −1 | 0 | 0 | 0 | } |
| { | −29 | −91 | 47 | 1 | 9 | 0 | 3 | 0 | −54 | 26 | −8 | 3 | 0 | 1 | 0 | 0 | } |
| { | −10 | 62 | −11 | −8 | −2 | −2 | −1 | −1 | −95 | 3 | 32 | 0 | 4 | 0 | 2 | 0 | } |
| { | −15 | 15 | −10 | −2 | 1 | 0 | 1 | 0 | 10 | 112 | −20 | −17 | −4 | −4 | −1 | −2 | } |
| { | 32 | 39 | 92 | −44 | 4 | −10 | 1 | −4 | 26 | 12 | −15 | 13 | −5 | 2 | −2 | 0 | } |
| { | −10 | 1 | 50 | −15 | 2 | −3 | 1 | −1 | −28 | −15 | 14 | 6 | 1 | 1 | 1 | 0 | } |

TABLE 73-continued

| | | | | | | | | | | | | | | | | | |
|---|---|---|---|---|---|---|---|---|---|---|---|---|---|---|---|---|---|
| { | 1 | −33 | −11 | −14 | 7 | −2 | 2 | 0 | 29 | −12 | 37 | −7 | −4 | 0 | −1 | 0 | } |
| { | 0 | 6 | −6 | 21 | −4 | 2 | 0 | 0 | −20 | −24 | −104 | 30 | 5 | 5 | 1 | 2 | } |
| { | −13 | −13 | −37 | −101 | 29 | −11 | 8 | −3 | −12 | −15 | −20 | 2 | −11 | 5 | −2 | 1 | } |
| { | 6 | 1 | −14 | −36 | 9 | −3 | 2 | 0 | 10 | 9 | −18 | −1 | −3 | 1 | 0 | 0 | } |
| { | −12 | −2 | −26 | −12 | −9 | 2 | −1 | 1 | −3 | 30 | 4 | 34 | −4 | 0 | −1 | 0 | } |
| { | 0 | −3 | 0 | −4 | −15 | 6 | −3 | 1 | −7 | −15 | −28 | −86 | 19 | −5 | 4 | −1 | } |
| { | −1 | 9 | 13 | 5 | 14 | −2 | 2 | −1 | −8 | 3 | −4 | −62 | 4 | 1 | 1 | 0 | } |
| { | 6 | 2 | −3 | 2 | 10 | −1 | 2 | 0 | 8 | 3 | −1 | −20 | 0 | 1 | 0 | 0 | } |
| { | 6 | 9 | −2 | 35 | 110 | −22 | 11 | −4 | −2 | 0 | −3 | 1 | −18 | 12 | −3 | 2 | } |
| { | −1 | 7 | −2 | 9 | −11 | 5 | −1 | 1 | −7 | 2 | −22 | 4 | −13 | 0 | −1 | 0 | } |

},
lowFreqTransMatrix[ m ][ n ] = lowFreqTransMatrixCol16to31 [ m − 16 ][ n ] with m = 16 . . . 31, n = 0 . . . 15
lowFreqTransMatrixCol16to31 =
{

| | | | | | | | | | | | | | | | | | |
|---|---|---|---|---|---|---|---|---|---|---|---|---|---|---|---|---|---|
| { | 14 | −1 | −3 | 0 | −1 | 0 | 0 | 0 | 0 | 20 | 0 | 0 | 0 | 0 | 0 | 0 | } |
| { | 33 | 5 | −9 | −1 | −2 | 0 | −1 | 0 | −3 | 3 | 0 | 0 | 0 | 0 | 0 | 0 | } |
| { | 32 | −30 | −4 | 4 | −1 | 1 | 0 | 0 | 6 | 2 | −5 | 0 | 0 | 0 | 0 | 0 | } |
| { | −20 | −26 | 31 | 1 | 0 | 0 | 0 | 0 | 2 | −16 | −1 | 6 | 0 | 1 | 0 | 0 | } |
| { | 29 | −16 | −22 | 8 | 0 | 1 | 0 | 1 | −20 | 6 | 4 | −3 | 1 | 0 | 0 | 0 | } |
| { | −99 | −4 | 9 | 5 | 5 | 2 | 2 | 1 | 44 | −10 | −11 | 1 | −2 | 0 | −1 | 0 | } |
| { | 6 | −99 | 3 | 26 | −1 | 5 | 0 | 2 | 14 | 30 | −27 | −2 | 1 | −1 | 0 | −1 | } |
| { | −7 | −46 | 10 | −14 | 7 | 0 | 1 | 0 | 9 | 21 | 7 | −6 | −2 | −1 | 0 | −1 | } |
| { | −12 | 10 | 26 | 12 | −6 | 0 | −1 | 0 | −32 | −2 | 11 | 3 | 3 | −1 | 1 | 0 | } |
| { | 38 | 26 | −13 | −1 | −5 | −1 | −1 | 0 | 102 | 3 | −14 | −1 | −5 | −1 | −2 | 0 | } |
| { | −30 | 3 | −92 | 14 | 19 | 0 | 3 | 0 | −11 | 34 | 21 | −33 | 1 | −2 | 0 | −1 | } |
| { | −5 | −17 | −41 | 42 | −6 | 2 | −1 | 1 | −1 | −40 | 37 | 13 | −4 | 2 | −1 | 1 | } |
| { | −12 | 23 | 16 | −11 | −17 | 0 | −1 | 0 | −11 | 97 | −3 | −3 | 0 | −6 | 0 | −2 | } |
| { | −4 | 4 | −16 | 0 | −2 | 0 | 1 | 0 | 34 | 23 | 6 | −7 | −4 | −2 | −1 | 0 | } |
| { | −5 | −4 | −22 | 8 | −25 | 3 | 0 | 0 | −3 | −21 | 2 | −3 | 9 | −2 | 1 | 0 | } |
| { | 0 | 28 | 0 | 76 | 4 | −6 | 0 | −2 | −13 | 5 | −76 | −4 | 33 | −1 | 3 | 0 | } |

},
lowFreqTransMatrix[ m ] [ n ] = lowFreqTransMatrixCol32to47[ m − 32 ] [ n ] with m = 32 . . . 47, n = 0 . . . 15
lowFreqTransMatrixCol32to47 =
{

| | | | | | | | | | | | | | | | | | |
|---|---|---|---|---|---|---|---|---|---|---|---|---|---|---|---|---|---|
| { | 3 | 0 | −1 | 0 | 1 | 0 | 0 | 0 | 1 | 0 | 0 | 0 | 1 | 0 | 0 | 0 | } |
| { | 7 | 2 | −2 | 0 | −1 | 1 | 0 | 0 | 2 | 1 | −1 | 0 | 0 | 0 | 0 | 0 | } |
| { | 6 | −3 | 0 | 0 | 2 | 0 | −1 | 0 | 2 | −1 | 0 | 0 | 1 | 0 | 0 | 0 | } |
| { | 1 | −4 | 0 | 0 | 0 | −3 | 0 | 1 | 0 | −1 | 0 | 0 | 0 | −2 | 0 | 0 | } |
| { | 1 | −4 | −3 | 2 | −4 | 1 | 0 | 0 | 1 | −1 | −2 | 1 | −2 | 0 | 0 | 0 | } |
| { | −5 | 4 | −3 | 0 | 8 | −1 | −2 | 0 | −2 | 1 | −1 | 0 | 4 | 0 | −1 | 0 | } |
| { | −6 | 6 | 6 | −3 | 1 | 3 | −3 | 0 | −1 | 1 | 1 | 0 | 0 | 1 | −1 | 0 | } |
| { | 2 | 2 | 5 | −2 | 0 | 3 | 4 | −1 | 0 | 0 | 1 | 0 | 0 | 1 | 2 | −1 | } |
| { | 11 | −5 | −1 | 6 | −4 | 2 | 1 | 0 | 3 | −1 | 1 | 2 | −1 | 0 | 0 | 0 | } |
| { | −29 | 10 | 10 | 0 | 10 | −4 | −1 | 1 | −7 | 1 | 2 | 1 | 2 | −1 | 0 | 0 | } |
| { | −9 | −4 | 18 | 3 | 2 | 0 | 0 | −2 | −1 | −1 | 3 | 0 | 0 | 0 | 0 | −1 | } |
| { | −10 | 13 | −1 | −4 | 4 | −4 | 3 | 4 | −2 | 2 | −1 | −1 | 1 | −1 | 1 | 2 | } |
| { | −21 | −5 | 23 | 0 | 2 | −2 | −1 | 6 | −3 | −3 | 1 | 0 | 0 | 0 | 0 | 2 | } |
| { | 108 | −5 | −30 | 6 | −27 | 10 | 7 | −2 | 11 | −3 | −1 | 1 | −4 | 1 | 0 | 1 | } |
| { | −7 | 1 | 3 | −5 | 3 | 0 | −1 | 0 | 0 | 1 | 0 | −1 | 1 | 0 | 0 | 0 | } |
| { | 9 | 18 | −3 | −35 | −4 | −1 | 6 | 1 | 1 | 2 | 0 | −3 | −1 | 0 | 2 | 0 | } |

},

TABLE 74

Otherwise, when nTrS is 48, lfnstTrSetIdx is 0 and lfnstIdx is 2, the following lowFreqTransMatrix is derived.
lowFreqTransMatrix[ m ][ n ] = lowFreqTransMatrixCol0to15[ m ][ n ] with m = 0 . . . 15, n = 0 . . . 15
lowFreqTransMatrixCol0to15 =
{

| | | | | | | | | | | | | | | | | | |
|---|---|---|---|---|---|---|---|---|---|---|---|---|---|---|---|---|---|
| { | −108 | 48 | 9 | 1 | 1 | 1 | 0 | 0 | 44 | −6 | −9 | −1 | −1 | 0 | −1 | 0 | } |
| { | 55 | 66 | −37 | −5 | −6 | −1 | −2 | 0 | 67 | −30 | −20 | 4 | −2 | 0 | −1 | 0 | } |
| { | 2 | 86 | −21 | −13 | −4 | −2 | −1 | −1 | −88 | 5 | 6 | 4 | 5 | 1 | 1 | 0 | } |
| { | −24 | −21 | −38 | 19 | 0 | 4 | −1 | 2 | −23 | −89 | 31 | 20 | 2 | 3 | 1 | 1 | } |
| { | 9 | 20 | 98 | −26 | −3 | −5 | 0 | −2 | −9 | −26 | 15 | −16 | 2 | 0 | 1 | 0 | } |
| { | −21 | −7 | −37 | 10 | 2 | 2 | −1 | 1 | −10 | 69 | −5 | −7 | −2 | −2 | 0 | −1 | } |
| { | −10 | −25 | 4 | −17 | 8 | −2 | 2 | −1 | −27 | −17 | −71 | 25 | 8 | 2 | 1 | 1 | } |
| { | 2 | 5 | 10 | 64 | −9 | 4 | −3 | 1 | −4 | 8 | 62 | 3 | −17 | 1 | −2 | 0 | } |
| { | −11 | −15 | −28 | −97 | 6 | −1 | 4 | −1 | 7 | 3 | 57 | −15 | 10 | −2 | 0 | −1 | } |
| { | 9 | 13 | 24 | −6 | 7 | −2 | 1 | −1 | 16 | 39 | 20 | 47 | −2 | −2 | −2 | 0 | } |
| { | −7 | 11 | 12 | 7 | 2 | −1 | 0 | −1 | −14 | −1 | −24 | 11 | 2 | 0 | 0 | 0 | } |
| { | 0 | 0 | 7 | −6 | 23 | −3 | 3 | −1 | 5 | 1 | 18 | 96 | 13 | −9 | −1 | −1 | } |
| { | −2 | −6 | −1 | −10 | 0 | 1 | 1 | 0 | −7 | −2 | −28 | 20 | −15 | 4 | −3 | 1 | } |
| { | −1 | 6 | −16 | 0 | 24 | −3 | 1 | −1 | 2 | 6 | 6 | 16 | 18 | −7 | 1 | −1 | } |
| { | −5 | −6 | −3 | −19 | −104 | 18 | −4 | 3 | 0 | 6 | 0 | 35 | −41 | 20 | −2 | 2 | } |
| { | −1 | −2 | 0 | 23 | −9 | 0 | −2 | 0 | 1 | 1 | 8 | −1 | 29 | 1 | 1 | 0 | } |

},
lowFreqTransMatrix[ m ][ n ] = lowFreqTransMatrixCol16to31 [ m − 16 ][ n ] with m = 16 . . . 31, n = 0 . . . 15
lowFreqTransMatrixCol16to31 =

TABLE 74-continued

{

| | | | | | | | | | | | | | | | | | |
|---|---|---|---|---|---|---|---|---|---|---|---|---|---|---|---|---|---|
| { | 9 | −9 | −1 | 1 | 0 | 0 | 0 | 0 | 3 | −1 | 1 | 0 | 0 | 0 | 0 | 0 | } |
| { | −31 | −19 | 14 | 4 | 1 | 1 | 1 | 0 | −6 | 3 | 5 | −2 | 0 | 0 | 0 | 0 | } |
| { | 14 | −5 | 0 | 3 | 0 | 0 | 0 | 0 | 10 | −5 | −2 | 0 | −1 | 0 | 0 | 0 | } |
| { | −30 | 26 | 36 | −8 | −2 | −2 | 0 | −1 | 14 | 18 | −7 | −9 | −1 | −1 | 0 | 0 | } |
| { | −61 | −3 | −2 | 3 | 7 | 1 | 1 | 0 | 12 | 16 | −6 | −1 | 0 | −1 | 0 | 0 | } |
| { | −93 | 2 | 19 | 0 | 3 | 0 | 2 | 0 | 17 | 4 | 0 | 0 | −1 | 0 | 0 | 0 | } |
| { | −4 | −66 | 28 | 36 | −5 | 3 | 0 | 1 | −10 | 20 | 33 | −13 | −8 | 0 | 0 | −1 | } |
| { | −3 | −75 | 5 | −14 | 1 | 4 | 0 | 1 | −36 | 3 | 18 | −4 | 4 | 0 | 1 | 0 | } |
| { | − 1 | −27 | 13 | 6 | 1 | −1 | 0 | 0 | −34 | −6 | 0 | 3 | 4 | 1 | 2 | 0 | } |
| { | 28 | 23 | 76 | −5 | −25 | −3 | −3 | −1 | 6 | 36 | −7 | −39 | −4 | −1 | 0 | −1 | } |
| { | −20 | 48 | 11 | −13 | −5 | −2 | 0 | −1 | −105 | −19 | 17 | 0 | 6 | 2 | 3 | 0 | } |
| { | −21 | −7 | −42 | 14 | −24 | −3 | 0 | 0 | 11 | −47 | −7 | 3 | −5 | 9 | 1 | 2 | } |
| { | −2 | −32 | −2 | −66 | 3 | 7 | 1 | 2 | −11 | 13 | −70 | 5 | 43 | −2 | 3 | 0 | } |
| { | −3 | 11 | −63 | 9 | 4 | −5 | 2 | −1 | −22 | 94 | −4 | −6 | −4 | −4 | 1 | −2 | } |
| { | −2 | 10 | −18 | 16 | 21 | 3 | −2 | 0 | −2 | 11 | 6 | −10 | 6 | −3 | −1 | 0 | } |
| { | 3 | −6 | 13 | 76 | 30 | −11 | −1 | −2 | −26 | −8 | −69 | 7 | −9 | −7 | 3 | −1 | } |

}, lowFreqTransMatrix[ m ][ n ] = lowFreqTransMatrixCol32to47[ m − 32 ][ n ] with m = 32 . . . 47, n = 0 . . . 15 lowFreqTransMatrixCol32to47 =

{

| | | | | | | | | | | | | | | | | | |
|---|---|---|---|---|---|---|---|---|---|---|---|---|---|---|---|---|---|
| { | 1 | −1 | 0 | 0 | 1 | 0 | 0 | 0 | 0 | −1 | 0 | 0 | 0 | 0 | 0 | 0 | } |
| { | −7 | −1 | 1 | 0 | −1 | 1 | 1 | 0 | −2 | −1 | 1 | 0 | 0 | 0 | 0 | 0 | } |
| { | 6 | −5 | 0 | 1 | 2 | −1 | 0 | 0 | 1 | −1 | 0 | 0 | 1 | 0 | 0 | 0 | } |
| { | 1 | 3 | −2 | −1 | 3 | 2 | −2 | −1 | 0 | 1 | 0 | 0 | 1 | 1 | −1 | 0 | } |
| { | 2 | 0 | −8 | 1 | 3 | 1 | −1 | 1 | 0 | −1 | −2 | 0 | 1 | 0 | −1 | 0 | } |
| { | 5 | −4 | −2 | 0 | 4 | −2 | 0 | 1 | 0 | 0 | 0 | 0 | 2 | −1 | 0 | 0 | } |
| { | 3 | 6 | −3 | −7 | −1 | 3 | 3 | −1 | 1 | 0 | −1 | 0 | 0 | 1 | 1 | −1 | } |
| { | 1 | 14 | −2 | −8 | −2 | 1 | −3 | 0 | 2 | 2 | −1 | −2 | 0 | 1 | −1 | 0 | } |
| { | −2 | 8 | 1 | 5 | −2 | 0 | −3 | 1 | 1 | 1 | 0 | 2 | −1 | 0 | −1 | 0 | } |
| { | 2 | −4 | −18 | −3 | −1 | −1 | −2 | −2 | 1 | −2 | −2 | 0 | 0 | 0 | −1 | −1 | } |
| { | −14 | 8 | 8 | 2 | 1 | 2 | −1 | −2 | 3 | 0 | −1 | 0 | 0 | 0 | 0 | 0 | } |
| { | 0 | −1 | 19 | −1 | 1 | 0 | −1 | −6 | −1 | 1 | 2 | 0 | 1 | 0 | 0 | −2 | } |
| { | 8 | −14 | −3 | 43 | −1 | 2 | 7 | −1 | 1 | −2 | 1 | 3 | −1 | 1 | 1 | 0 | } |
| { | 10 | 23 | −19 | −5 | 0 | −6 | −4 | 6 | 3 | −2 | 1 | 1 | 0 | −1 | 0 | 0 | } |
| { | −1 | 5 | −1 | −6 | −1 | −1 | −1 | −1 | −1 | 0 | 0 | 0 | 0 | 0 | 0 | −1 | } |
| { | −10 | −34 | −25 | 13 | −1 | 0 | 11 | 5 | 1 | −1 | 1 | −2 | 0 | 0 | 2 | 0 | } |

},

TABLE 75

Otherwise, when nTrS is 48, lfnstTrSetIdx is 1 and lfnstIdx is 1, the following lowFreqTransMatrix is derived.

lowFreqTransMatrix[ m ] [ n ] = lowFreqTransMatrixCol0to15[ m ][ n ] with m = 0 . . . 15, n = 0 . . . 15 lowFreqTransMatrixCol0to15 =

| | | | | | | | | | | | | | | | | | |
|---|---|---|---|---|---|---|---|---|---|---|---|---|---|---|---|---|---|
| { | 110 | −49 | −3 | −4 | −1 | −1 | 0 | −1 | −38 | −1 | 10 | 0 | 2 | 0 | 1 | 0 | } |
| { | −43 | −19 | 17 | −1 | 3 | 0 | 1 | 0 | −98 | 46 | 14 | −1 | 2 | 0 | 1 | 0 | } |
| { | −19 | 17 | −7 | 3 | −2 | 1 | −1 | 0 | −32 | −59 | 29 | 3 | 4 | 0 | 2 | 0 | } |
| { | −35 | −103 | 39 | 1 | 7 | 0 | 2 | 0 | 38 | −13 | 25 | −6 | 1 | −1 | 0 | 0 | } |
| { | 9 | 5 | −6 | −1 | −1 | 0 | −1 | 0 | 42 | 4 | 21 | −11 | 1 | −3 | 1 | −1 | } |
| { | −5 | −5 | −28 | 9 | −3 | 2 | −1 | 1 | −20 | −78 | 22 | 16 | 1 | 3 | 0 | 1 | } |
| { | 14 | 17 | 27 | −12 | 1 | −3 | 1 | −1 | 8 | 19 | −13 | 4 | −2 | 1 | −1 | 0 | } |
| { | 7 | 35 | 17 | −4 | −1 | 0 | 0 | 0 | 3 | 8 | 54 | −17 | 1 | −2 | 1 | −1 | } |
| { | −13 | −27 | −101 | 24 | −8 | 6 | −3 | 2 | 11 | 43 | 6 | 28 | −6 | 3 | −1 | 1 | } |
| { | −11 | −13 | −3 | −10 | 3 | −1 | 1 | 0 | −19 | −19 | −37 | 8 | 4 | 2 | 0 | 1 | } |
| { | −4 | −10 | −24 | −11 | 3 | −2 | 0 | −1 | −6 | −37 | −45 | −17 | 8 | −2 | 2 | −1 | } |
| { | −2 | 1 | 13 | −17 | 3 | −5 | 1 | −2 | 3 | 0 | −55 | 22 | 6 | 1 | 1 | 0 | } |
| { | 3 | 1 | 5 | −15 | 1 | −2 | 1 | −1 | 7 | 4 | −7 | 29 | −1 | 2 | −1 | 1 | } |
| { | −4 | −8 | −1 | −50 | 6 | −4 | 2 | −2 | −1 | 5 | −22 | 20 | 6 | 1 | 0 | 0 | } |
| { | 5 | −1 | 26 | 102 | −13 | 12 | −4 | 4 | −4 | −2 | −40 | −7 | −23 | 3 | −5 | 1 | } |
| { | −5 | −6 | −27 | −22 | −12 | 0 | −3 | 0 | −5 | 8 | −20 | −83 | 0 | 0 | 0 | 0 | } |

}, lowFreqTransMatrix[ m ][ n ] = lowFreqTransMatrixCol16to31[ m − 16 ][ n ] with m = 16 . . . 31, n = 0 . . . 15 lowFreqTransMatrixCol16to31 =

| | | | | | | | | | | | | | | | | | |
|---|---|---|---|---|---|---|---|---|---|---|---|---|---|---|---|---|---|
| { | −9 | 13 | 1 | −2 | 0 | 0 | 0 | 0 | −4 | 2 | −3 | 0 | 0 | 0 | 0 | 0 | } |
| { | 26 | 26 | −15 | −3 | −2 | −1 | −1 | 0 | 11 | −7 | −9 | 2 | 0 | 0 | 0 | 0 | } |
| { | −72 | 43 | 34 | −9 | 3 | −2 | 1 | −1 | 13 | 36 | −18 | −10 | 0 | −2 | 0 | −1 | } |
| { | −1 | 7 | 6 | −7 | 1 | −1 | 0 | 0 | −13 | 14 | 2 | −4 | 2 | −1 | 0 | 0 | } |
| { | 21 | 70 | −32 | −21 | 0 | −4 | −1 | −1 | 34 | −26 | −57 | 11 | 4 | 2 | 0 | 1 | } |
| { | 80 | −6 | 25 | −5 | −4 | −1 | −1 | 0 | 6 | −24 | 7 | −9 | 0 | 0 | 0 | 0 | } |
| { | 48 | −1 | 48 | −15 | −4 | −2 | −1 | −1 | 1 | 60 | −28 | −42 | 5 | −6 | 1 | −2 | } |
| { | 10 | 14 | −11 | −34 | 4 | −4 | 1 | −1 | −80 | −7 | −6 | 2 | 15 | 0 | 3 | 0 | } |
| { | −3 | 14 | 21 | −12 | −7 | −2 | −1 | −1 | −23 | 10 | −4 | −12 | 3 | 0 | 1 | 0 | } |
| { | −12 | −30 | 3 | −9 | 5 | 0 | 1 | 0 | −56 | −9 | −47 | 8 | 21 | 1 | 4 | 1 | } |
| { | 17 | 14 | −58 | 14 | 15 | 0 | 2 | 0 | −10 | 34 | −7 | 28 | 4 | −1 | 1 | 0 | } |
| { | 8 | 74 | 21 | 40 | −14 | 0 | −2 | 0 | −36 | −8 | 11 | −13 | −23 | 1 | −3 | 0 | } |
| { | 8 | 3 | 12 | −14 | −9 | −1 | −1 | 0 | 4 | 29 | −15 | 31 | 10 | 4 | 1 | 1 | } |
| { | −16 | −15 | 18 | −29 | −11 | 2 | −2 | 1 | 40 | −45 | −19 | −22 | 31 | 2 | 4 | 1 | } |

TABLE 75-continued

| | | | | | | | | | | | | | | | | | |
|---|---|---|---|---|---|---|---|---|---|---|---|---|---|---|---|---|---|
| { | −1 | 5 | 8 | −23 | 7 | 2 | 1 | 1 | 10 | −11 | −13 | −3 | 12 | −3 | 2 | 0 | } |
| { | 9 | 7 | 24 | −20 | 41 | 3 | 6 | 1 | 15 | 20 | 12 | 11 | 17 | −9 | 1 | −2 | } |

},
lowFreqTransMatrix[ m ] [ n ] = lowFreqTransMatrixCol32to47[ m − 32 ] [ n ] with m = 32 . . . 47, n = 0 . . . 15
lowFreqTransMatrixCol32to47 =

| | | | | | | | | | | | | | | | | | |
|---|---|---|---|---|---|---|---|---|---|---|---|---|---|---|---|---|---|
| { | −2 | 2 | 0 | 1 | −1 | 1 | 0 | 0 | −1 | 1 | 0 | 0 | −1 | 0 | 0 | 0 | } |
| { | 9 | −3 | −1 | 2 | 3 | −3 | 0 | 0 | 4 | −1 | 0 | 0 | 2 | −1 | 0 | 0 | } |
| { | 3 | 0 | −12 | 3 | 6 | 1 | −3 | 2 | 1 | −1 | −2 | 0 | 3 | 1 | −1 | 1 | } |
| { | −2 | 11 | −6 | −2 | −2 | 4 | −3 | 0 | 0 | 3 | −2 | 0 | −1 | 1 | −1 | 0 | } |
| { | −4 | −32 | 5 | 24 | 1 | −6 | 12 | 4 | −3 | −2 | 4 | −2 | 0 | −1 | 0 | 0 | } |
| { | −7 | 3 | 13 | −4 | −3 | 5 | 1 | −5 | −2 | 3 | 1 | −2 | −1 | 2 | −1 | −2 | } |
| { | 11 | −11 | −51 | 11 | −2 | −10 | −2 | 13 | 2 | −6 | −4 | 4 | −2 | −3 | 2 | 2 | } |
| { | −16 | 46 | 1 | 3 | 2 | 7 | −24 | 0 | 2 | −2 | −5 | 8 | 1 | −1 | −2 | 2 | } |
| { | 2 | 9 | −10 | 0 | 1 | −5 | −4 | 4 | 2 | −2 | 2 | 2 | 0 | −2 | 1 | 0 | } |
| { | −11 | −30 | 1 | 59 | −2 | 8 | 41 | 8 | 2 | 5 | 6 | −7 | −1 | 3 | 5 | −2 | } |
| { | 23 | 34 | −31 | 4 | 10 | −22 | −30 | 22 | 4 | −15 | 9 | 20 | 2 | −5 | 9 | 4 | } |
| { | −36 | 6 | 16 | −14 | 2 | 19 | −4 | −12 | −1 | 0 | −7 | −3 | 0 | 2 | −2 | −1 | } |
| { | 61 | 22 | 55 | 14 | 13 | 3 | −9 | −65 | 1 | −11 | −21 | −7 | 0 | 0 | −1 | 3 | } |
| { | −25 | 41 | 0 | 12 | 9 | 7 | −42 | 12 | −3 | −14 | 2 | 28 | 5 | 1 | 6 | 2 | } |
| { | −9 | 23 | 4 | 9 | 14 | 9 | −14 | −4 | 0 | −12 | −7 | 6 | 3 | 0 | 6 | 3 | } |
| { | −26 | −1 | 18 | −1 | −12 | 32 | 3 | −18 | −5 | 10 | −25 | −5 | −2 | 1 | −8 | 10 | } |

},

TABLE 76

Otherwise, when nTrS is 48, lfnstTrSetIdx is 1 and lfnstIdx is 2, the following lowFreqTransMatrix is derived.
lowFreqTransMatrix[ m ][ n ] = lowFreqTransMatrixCol0to15[ m ][ n ] with m = 0 . . . 15, n = 0 . . . 15
lowFreqTransMatrixCol0to15 =
{

| | | | | | | | | | | | | | | | | | |
|---|---|---|---|---|---|---|---|---|---|---|---|---|---|---|---|---|---|
| { | 80 | −49 | 6 | −4 | 1 | −1 | 1 | −1 | −72 | 36 | 4 | 0 | 1 | 0 | 0 | 0 | } |
| { | −72 | −6 | 17 | 0 | 3 | 0 | 1 | 0 | −23 | 58 | −21 | 2 | −3 | 1 | −1 | 0 | } |
| { | −50 | 19 | −15 | 4 | −1 | 1 | −1 | 1 | −58 | −2 | 30 | −3 | 4 | −1 | 2 | 0 | } |
| { | −33 | −43 | 28 | −7 | 4 | −2 | 2 | −1 | −38 | 11 | −8 | 4 | 1 | 1 | 0 | 0 | } |
| { | 10 | 66 | −21 | −3 | −3 | 0 | −1 | 0 | −53 | −41 | −2 | 16 | −1 | 4 | −1 | 1 | 1 |
| { | 18 | 14 | 13 | −9 | 2 | −2 | 1 | −1 | 34 | 32 | −31 | 12 | −5 | 2 | −2 | 1 | } |
| { | 21 | 66 | −1 | 9 | −4 | 2 | −1 | 1 | −21 | 41 | −30 | −10 | 0 | −2 | 0 | −1 | } |
| { | 1 | −6 | −24 | 17 | −5 | 3 | −2 | 1 | 24 | 10 | 39 | −21 | 5 | −4 | 2 | −1 | } |
| { | 9 | 33 | −24 | 1 | 4 | 0 | 1 | 0 | 6 | 50 | 26 | 1 | −10 | 0 | −2 | 0 | } |
| { | −7 | −9 | −32 | 14 | −3 | 3 | −1 | 1 | −23 | −28 | 0 | −5 | −1 | 0 | 0 | 0 | } |
| { | 6 | 30 | 69 | −18 | 5 | −4 | 3 | −1 | −3 | −11 | −34 | −16 | 9 | −4 | 2 | −1 | } |
| { | 1 | −8 | 24 | −3 | 7 | −2 | 2 | −1 | −6 | −51 | −6 | −4 | −5 | 0 | −1 | 0 | } |
| { | 4 | 10 | 4 | 17 | −9 | 4 | −2 | 1 | 5 | 14 | 32 | −15 | 9 | −3 | 2 | −1 | } |
| { | −3 | −9 | −23 | 10 | −10 | 3 | −3 | 1 | −5 | −14 | −16 | −27 | 13 | −5 | 2 | −1 | } |
| { | 2 | 11 | 22 | 2 | 9 | −2 | 2 | 0 | −6 | −7 | 20 | −32 | −3 | −4 | 0 | −1 | } |
| { | 2 | −3 | 8 | 14 | −5 | 3 | −1 | 1 | −2 | −11 | 5 | −18 | 8 | −3 | 2 | −1 | } |

},
lowFreqTransMatrix[ m ][ n ] = lowFreqTransMatrixCol16to31 [ m − 16 ][ n ] with m = 16 . . . 31, n = 0 . . . 15
lowFreqTransMatrixCol16to31 =
{

| | | | | | | | | | | | | | | | | | |
|---|---|---|---|---|---|---|---|---|---|---|---|---|---|---|---|---|---|
| { | 26 | 0 | −12 | 2 | −2 | 1 | −1 | 0 | −7 | −9 | 6 | 1 | 0 | 0 | 0 | 0 | } |
| { | 55 | −46 | −1 | 6 | −2 | 1 | −1 | 0 | −22 | 7 | 17 | −7 | 2 | −1 | 1 | 0 | } |
| { | 6 | 57 | −34 | 0 | −2 | 0 | −1 | 0 | 34 | −48 | −2 | 14 | −4 | 3 | −1 | 1 | } |
| { | −55 | 24 | 26 | −5 | 2 | −1 | 1 | 0 | 15 | 46 | −40 | −1 | −1 | 0 | −1 | 0 | } |
| { | 36 | −5 | 41 | −20 | 3 | −3 | 1 | −1 | −30 | 26 | −32 | −3 | 7 | −2 | 2 | −1 | } |
| { | 40 | 4 | −4 | −9 | −3 | −2 | −1 | −1 | 27 | −31 | −43 | 19 | −2 | 3 | −1 | 1 | } |
| { | −35 | −17 | −3 | 26 | −6 | 5 | −2 | 2 | 56 | 3 | 18 | −25 | −1 | −2 | −1 | −1 | } |
| { | 33 | 32 | −30 | 4 | −3 | −1 | −1 | 0 | −4 | 13 | −16 | −10 | 0 | −1 | 0 | 0 | } |
| { | −27 | 1 | −28 | −21 | 16 | −5 | 3 | −2 | −23 | 36 | −2 | 40 | −17 | 4 | −3 | 1 | } |
| { | −36 | −59 | −24 | 14 | 4 | 2 | 1 | 1 | −23 | −26 | 23 | 26 | −3 | 5 | 0 | 2 | } |
| { | −16 | 35 | −35 | 30 | −9 | 3 | −2 | 1 | −57 | −13 | 6 | 4 | −5 | 5 | −1 | 1 | } |
| { | 38 | −1 | 0 | 25 | 6 | 2 | 1 | 1 | 47 | 20 | 35 | 1 | −27 | 1 | −5 | 0 } | } |
| { | 7 | 13 | 19 | 15 | −8 | 1 | −1 | 0 | 3 | 25 | 30 | −18 | 1 | −2 | 0 | −1 | } |
| { | −1 | −13 | −30 | 11 | −5 | 2 | −1 | 0 | −5 | −8 | −22 | −16 | 10 | 0 | 1 | 0 | } |
| { | 13 | −5 | −28 | 6 | 18 | −4 | 3 | −1 | −26 | 27 | −14 | 6 | −20 | 0 | −2 | 0 | } |
| { | 12 | −23 | −19 | 22 | 2 | 0 | 1 | 0 | 23 | 41 | −7 | 35 | −10 | 4 | −1 | 1 | } |

},
lowFreqTransMatrix[ m ][ n ] = lowFreqTransMatrixCol32to47[ m − 32 ][ n ] with m = 32 . . . 47, n = 0 . . . 15
lowFreqTransMatrixCol32to47 =
{

| | | | | | | | | | | | | | | | | | |
|---|---|---|---|---|---|---|---|---|---|---|---|---|---|---|---|---|---|
| { | 3 | 5 | −1 | −2 | −2 | −2 | −1 | 1 | 1 | 1 | 0 | 0 | −1 | −1 | 0 | 0 | } |
| { | 9 | 5 | −12 | 1 | −3 | −4 | 4 | 2 | 4 | 1 | −2 | −1 | −1 | −1 | 1 | 0 | } |
| { | −10 | 7 | 21 | −10 | 6 | 1 | −11 | 0 | −1 | −1 | 4 | 2 | 3 | 0 | −2 | −1 | } |
| { | 17 | −38 | 1 | 17 | −3 | 11 | 15 | −11 | 3 | −1 | −10 | 1 | 0 | 1 | 3 | 2 | } |
| { | 15 | −8 | 1 | 17 | −1 | −2 | 4 | −8 | 2 | 0 | −1 | 3 | 0 | 0 | 0 | −1 | } |
| { | 7 | −49 | 52 | 10 | −11 | 22 | 7 | −26 | −1 | −6 | −9 | 6 | −2 | 2 | 4 | −2 | } |
| { | −15 | −13 | −27 | 9 | 9 | −6 | 20 | 5 | −3 | 2 | −6 | −9 | 3 | −3 | 1 | 5 | } |
| { | 24 | −26 | −37 | 33 | 5 | −32 | 55 | −5 | −7 | 22 | −14 | −22 | 1 | −9 | −3 | 13 | } |

TABLE 76-continued

| | | | | | | | | | | | | | | | | | |
|---|---|---|---|---|---|---|---|---|---|---|---|---|---|---|---|---|---|
| { | 43 | −13 | 4 | −41 | −19 | −2 | −24 | 17 | 1 | −4 | 8 | 4 | −3 | −3 | −3 | −3 | } |
| { | 10 | −26 | 38 | 7 | −12 | 11 | 42 | −22 | −5 | 20 | −14 | −15 | −1 | −2 | 1 | 6 | } |
| { | 28 | 10 | 4 | 7 | 0 | −15 | 7 | −10 | −1 | 7 | −2 | 2 | 1 | −3 | 0 | 0 | } |
| { | 37 | −37 | −9 | −47 | −28 | 5 | 0 | 18 | 8 | 6 | 0 | −8 | −4 | −3 | −3 | 1 | } |
| { | 11 | 24 | 22 | −11 | −3 | 37 | −13 | −58 | −5 | 12 | −63 | 26 | 9 | −15 | 11 | 8 | } |
| { | 0 | −29 | −27 | 6 | −27 | −10 | −30 | 9 | −3 | −10 | −7 | 77 | 9 | −13 | 45 | −8 | } |
| { | −76 | −26 | −4 | −7 | 12 | 51 | 5 | 24 | 7 | −17 | −16 | −12 | −5 | 4 | 2 | 13 | } |
| { | 5 | 7 | 23 | 5 | 69 | −38 | −8 | −32 | −15 | −31 | 24 | 11 | 2 | 18 | 11 | −15 | } |
| }, | | | | | | | | | | | | | | | | | |

TABLE 77

Otherwise, when nTrS is 48, lfnstTrSetIdx is 2 and lfnstIdx is 1, the following lowFreqTransMatrix is derived.
lowFreqTransMatrix[ m ][ n ] = lowFreqTransMatrixCol0to15[ m ][ n ] with m = 0 . . . 15, n = 0 . . . 15
lowFreqTransMatrixCol0to15 =

| | | | | | | | | | | | | | | | | | |
|---|---|---|---|---|---|---|---|---|---|---|---|---|---|---|---|---|---|
| { | | | | | | | | | | | | | | | | | |
| { | −121 | 33 | 4 | 4 | 1 | 2 | 0 | 1 | −1 | −1 | 1 | 0 | 0 | 0 | 0 | 0 | } |
| { | 0 | −2 | 0 | 0 | 0 | 0 | 0 | 0 | 121 | −23 | −7 | −3 | −2 | −1 | −1 | 0 | } |
| { | −20 | 19 | −5 | 2 | −1 | 1 | 0 | 0 | 16 | 3 | −2 | 0 | 0 | 0 | 0 | 0 | } |
| { | 32 | 108 | −43 | 10 | −9 | 3 | −3 | 1 | 4 | 19 | −7 | 1 | −1 | 0 | 0 | 0 | } |
| { | −3 | 0 | −1 | 0 | 0 | 0 | 0 | 0 | −29 | 11 | −2 | 1 | 0 | 0 | 0 | 0 | } |
| { | −4 | −12 | −3 | 1 | −1 | 0 | 0 | 0 | 19 | 105 | −31 | 7 | −6 | 1 | −2 | 0 | } |
| { | 7 | 1 | 2 | 0 | 0 | 0 | 0 | 0 | 4 | 3 | −2 | 0 | 0 | 0 | 0 | 0 | } |
| { | −8 | −31 | 14 | −4 | 3 | −1 | 1 | 0 | 9 | 43 | 0 | 1 | −1 | 0 | 0 | 0 | } |
| { | −15 | −43 | −100 | 23 | −12 | 6 | −4 | 2 | −6 | −17 | −48 | 10 | −5 | 2 | −1 | 1 | } |
| { | −3 | 1 | 2 | 0 | 0 | 0 | 0 | 0 | −6 | 3 | 1 | 0 | 0 | 0 | 0 | 0 | } |
| { | −1 | −6 | −3 | 2 | −1 | 0 | 0 | 0 | −6 | −35 | 9 | 0 | 2 | 0 | 0 | 0 | } |
| { | −5 | −14 | −48 | 2 | −5 | 1 | −2 | 0 | 10 | 24 | 99 | −17 | 10 | −4 | 3 | −1 | } |
| { | −2 | 0 | 2 | 0 | 0 | 0 | 0 | 0 | −2 | 0 | 1 | 0 | 0 | 0 | 0 | 0 | } |
| { | −2 | −10 | −4 | 0 | 0 | 0 | 0 | 0 | 3 | 11 | −1 | −1 | 0 | 0 | 0 | 0 | } |
| { | −2 | −3 | −25 | −2 | −3 | 0 | −1 | 0 | −1 | −3 | −1 | 4 | −2 | 2 | 0 | 1 | } |
| { | 4 | −4 | 28 | 103 | −42 | 24 | −9 | 7 | 1 | 2 | 4 | 0 | 3 | −1 | 0 | 0 | } |
| }, | | | | | | | | | | | | | | | | | |

lowFreqTransMatrix[ m ][ n ] = lowFreqTransMatrixCol16to31 [ m − 16 ][ n ] with m = 16 . . . 31, n = 0 . . . 15
lowFreqTransMatrixCol16to31 =

| | | | | | | | | | | | | | | | | | |
|---|---|---|---|---|---|---|---|---|---|---|---|---|---|---|---|---|---|
| { | | | | | | | | | | | | | | | | | |
| { | 24 | −5 | −1 | −1 | 0 | 0 | 0 | 0 | 5 | −1 | 0 | 0 | 0 | 0 | 0 | 0 | } |
| { | 17 | 1 | −2 | 0 | 0 | 0 | 0 | 0 | −27 | 4 | 2 | 0 | 0 | 0 | 0 | 0 | } |
| { | −120 | 14 | 8 | 1 | 3 | 1 | 1 | 0 | −18 | −2 | 3 | 0 | 1 | 0 | 0 | 0 | } |
| { | 11 | −30 | 9 | −2 | 1 | −1 | 0 | 0 | 0 | −8 | 2 | 0 | 0 | 0 | 0 | 0 | } |
| { | 12 | 7 | −1 | 0 | 0 | 0 | 0 | 0 | −117 | 12 | 9 | 1 | 3 | 0 | 1 | 0 | } |
| { | 9 | 46 | −6 | 0 | 0 | 0 | 0 | 0 | 8 | −29 | 9 | −3 | 1 | 0 | 0 | 0 | } |
| { | 22 | −8 | 1 | −1 | 0 | 0 | 0 | 0 | −28 | −9 | 4 | 0 | 1 | 0 | 0 | 0 | } |
| { | −13 | −105 | 17 | −2 | 2 | 0 | 0 | 0 | −8 | −25 | −3 | 0 | 0 | 0 | 0 | 0 | } |
| { | 1 | −5 | 19 | −6 | 3 | −1 | 1 | 0 | 2 | 7 | 15 | −3 | 1 | −1 | 0 | 0 | } |
| { | 0 | 3 | −2 | 0 | 0 | 0 | 0 | 0 | −20 | 8 | −2 | 0 | 0 | 0 | 0 | 0 | } |
| { | 1 | −6 | 11 | −2 | 2 | 0 | 1 | 0 | −9 | −100 | 17 | −1 | 1 | 0 | 0 | 0 | } |
| { | 4 | 14 | 32 | 0 | 2 | 0 | 1 | 0 | −4 | 0 | −39 | 6 | −4 | 1 | −1 | 0 | } |
| { | −1 | −1 | 1 | −1 | 0 | 0 | 0 | 0 | −1 | −4 | 2 | 0 | 0 | 0 | 0 | 0 | } |
| { | −6 | −40 | −15 | 6 | −2 | 1 | 0 | 0 | 5 | 57 | −6 | 2 | 0 | 0 | 0 | 0 | } |
| { | −7 | −8 | −97 | 17 | −9 | 3 | −3 | 1 | −8 | −26 | −61 | −1 | −3 | −1 | −1 | −1 | } |
| { | −1 | 0 | −9 | −42 | 17 | −9 | 3 | −2 | −1 | 1 | −14 | 6 | −4 | 2 | −1 | 0 | } |
| }, | | | | | | | | | | | | | | | | | |

lowFreqTransMatrix[ m ] [ n ] = lowFreqTransMatrixCol32to47[ m − 32 ][ n ] with m = 32 . . . 47, n = 0 . . . 15
lowFreqTransMatrixCol32to47 =

| | | | | | | | | | | | | | | | | | |
|---|---|---|---|---|---|---|---|---|---|---|---|---|---|---|---|---|---|
| { | | | | | | | | | | | | | | | | | } |
| { | 3 | −1 | 0 | 0 | 2 | −1 | 0 | 0 | 2 | −1 | 0 | 0 | 1 | 0 | 0 | 0 | } |
| { | −12 | 2 | 1 | 0 | −5 | 1 | 0 | 0 | −1 | 0 | 0 | 0 | −2 | 0 | 0 | 0 | } |
| { | 17 | −3 | −1 | 0 | 6 | −1 | −1 | 0 | 2 | 0 | 0 | 0 | 2 | 0 | 0 | 0 | } |
| { | −7 | −1 | 2 | 0 | −3 | −1 | 1 | 0 | −2 | −2 | 1 | 0 | 0 | 0 | 0 | 0 | } |
| { | −32 | −3 | 3 | 0 | 12 | −2 | −1 | 0 | 7 | 0 | 0 | 0 | 1 | 0 | 0 | 0 | } |
| { | −3 | −19 | 3 | 0 | −4 | −6 | 1 | 0 | 0 | 0 | 0 | 0 | 0 | −1 | 0 | 0 | } |
| { | 117 | −10 | −8 | 0 | 32 | 1 | −4 | 0 | 3 | 1 | −1 | 0 | −3 | 1 | 0 | 0 | } |
| { | −7 | 32 | −5 | 1 | −1 | 4 | 0 | 0 | 2 | −1 | 0 | 0 | 1 | 0 | −1 | 0 | } |
| { | 4 | 10 | 5 | −1 | 0 | 3 | 1 | 0 | −2 | 1 | 2 | 0 | −1 | 1 | 1 | 0 | } |
| { | 30 | 13 | −3 | 0 | −116 | 6 | 10 | 0 | −35 | −5 | 4 | 0 | −3 | −1 | 0 | 0 | } |
| { | −10 | −63 | 1 | 2 | −17 | 3 | −4 | 0 | −1 | 9 | −1 | 0 | 3 | 4 | −1 | 0 | } |
| { | 2 | −3 | −4 | 0 | 2 | −2 | −2 | 0 | 0 | 0 | −1 | 0 | 0 | −1 | −1 | 0 | } |
| { | −8 | −2 | −1 | 1 | 30 | 4 | −4 | 1 | −102 | 4 | 8 | −1 | −69 | −2 | 6 | −1 | } |

TABLE 77-continued

| | | | | | | | | | | | | | | | | | |
|---|---|---|---|---|---|---|---|---|---|---|---|---|---|---|---|---|---|
| { | 1 | −95 | 18 | −6 | −10 | −34 | −2 | 0 | −4 | 17 | −2 | 0 | 0 | 2 | 1 | 0 | } |
| { | 2 | 10 | 24 | −7 | 5 | 9 | 19 | −1 | 0 | 1 | 4 | 0 | −2 | 0 | 1 | 0 | } |
| { | −1 | −2 | −4 | 4 | 0 | 3 | 1 | −1 | 0 | 2 | 0 | −2 | 2 | 0 | 0 | 0 | } |

},

TABLE 78

Otherwise, when nTrS is 48, lfnstTrSetldx is 2 and lfnstldx is 2, the following lowFreqTransMatrix is derived.
lowFreqTransMatrix[ m ] [ n ] = lowFreqTransMatrixCol0to15[ m ][ n ] with m = 0 . . . 15, n = 0 . . . 15
lowFreqTransMatrixCol0to15 =

{

| | | | | | | | | | | | | | | | | | |
|---|---|---|---|---|---|---|---|---|---|---|---|---|---|---|---|---|---|
| { | 87 | −41 | 3 | −4 | 1 | −1 | 0 | −1 | −73 | 28 | 2 | 1 | 1 | 1 | 0 | 0 | } |
| { | −75 | 4 | 7 | 0 | 2 | 0 | 1 | 0 | −41 | 36 | −7 | 3 | −1 | 1 | 0 | 0 | } |
| { | 26 | −44 | 22 | −6 | 4 | −2 | 1 | −1 | 77 | 24 | −22 | 2 | −4 | 0 | −1 | 0 | } |
| { | −39 | −68 | 37 | −7 | 6 | −2 | 2 | 0 | −9 | 56 | −21 | 1 | −2 | 0 | −1 | 0 | } |
| { | 10 | −20 | 2 | 0 | 1 | 0 | 0 | 0 | 50 | −1 | 8 | −5 | 1 | −1 | 0 | 0 | } |
| { | −21 | −45 | 8 | −2 | 3 | −1 | 1 | 0 | −7 | −30 | 26 | −8 | 3 | −1 | 1 | −1 | } |
| { | −4 | −2 | −55 | 28 | −8 | 5 | −3 | 2 | −2 | 37 | 43 | −19 | 1 | −2 | 1 | −1 | } |
| { | 2 | 19 | 47 | −23 | 6 | −4 | 2 | −1 | −23 | −22 | −44 | 17 | −2 | 2 | −1 | 0 | } |
| { | −19 | −62 | −9 | 3 | 0 | 0 | 0 | 0 | −12 | −56 | 27 | −7 | 3 | −1 | 1 | 0 | } |
| { | 1 | 9 | −5 | 0 | −1 | 0 | 0 | 0 | 0 | 22 | −1 | 2 | 0 | 1 | 0 | 0 | } |
| { | 5 | 17 | −9 | 0 | −2 | 1 | 0 | 0 | 13 | 54 | −2 | 7 | −1 | 1 | 0 | 0 | } |
| { | 7 | 27 | 56 | −2 | 10 | −3 | 3 | −1 | −2 | −6 | 8 | −28 | 3 | −4 | 1 | −1 | } |
| { | 0 | 0 | 19 | −4 | 3 | −2 | 2 | −1 | −3 | −13 | 10 | −4 | 1 | 0 | 0 | 0 | } |
| { | −3 | 0 | −27 | −80 | 40 | −16 | 6 | −4 | 4 | 3 | 31 | 61 | −22 | 7 | −1 | 1 | } |
| { | 1 | 2 | −8 | 6 | −1 | 1 | 0 | 0 | 2 | 8 | −5 | −1 | 0 | 0 | 0 | 0 | } |
| { | −4 | −18 | −57 | 8 | −8 | 1 | −3 | 0 | −5 | −20 | −69 | 7 | −6 | 2 | −2 | 1 | } |

},
lowFreqTransMatrix[ m ][ n ] = lowFreqTransMatrixCol16to31 [ m − 16 ][ n ] with m = 16 . . . 31, n = 0 . . . 15
lowFreqTransMatrixCol16to31 =

{

| | | | | | | | | | | | | | | | | | |
|---|---|---|---|---|---|---|---|---|---|---|---|---|---|---|---|---|---|
| { | 30 | −5 | −6 | 1 | −1 | 0 | 0 | 0 | −8 | −3 | 3 | 0 | 0 | 0 | 0 | 0 | } |
| { | 72 | −29 | −2 | 0 | −1 | 0 | −1 | 0 | −37 | 6 | 7 | −2 | 1 | 0 | 0 | 0 | } |
| { | 7 | −38 | 10 | 0 | 1 | 0 | 0 | 0 | −51 | 27 | 4 | −3 | 2 | −1 | 1 | 0 | } |
| { | −45 | 4 | −3 | 6 | −1 | 2 | 0 | 1 | 49 | −13 | 3 | −3 | −1 | 0 | 0 | 0 | } |
| { | 66 | 17 | −24 | 4 | −3 | 1 | −1 | 0 | 13 | −49 | 15 | 1 | 0 | 0 | 0 | 0 | } |
| { | −9 | 69 | −33 | 5 | −2 | 0 | −1 | 0 | −44 | −31 | 10 | 7 | −2 | 2 | 0 | 1 | } |
| { | −47 | −34 | −27 | 5 | 4 | −1 | 1 | 0 | −39 | −2 | 27 | 4 | −2 | 1 | 0 | 0 | } |
| { | −33 | 3 | 22 | −2 | −4 | 1 | −1 | 0 | −58 | −17 | 6 | −6 | 7 | −1 | 1 | 0 | } |
| { | 7 | −8 | 16 | −6 | 4 | −2 | 1 | −1 | −15 | 54 | −23 | 2 | −1 | 0 | 0 | 0 | } |
| { | −13 | 17 | 0 | −2 | 0 | −1 | 0 | 0 | −46 | −10 | −10 | 4 | −1 | 1 | 0 | 0 | } |
| { | 4 | 51 | −3 | −6 | −1 | −1 | 0 | 0 | −20 | 6 | −34 | 9 | −2 | 2 | −1 | 0 | } |
| { | −1 | −4 | −68 | 35 | −5 | 5 | −2 | 1 | 0 | 35 | 43 | −4 | −6 | 1 | −1 | 0 | } |
| { | −6 | −37 | −18 | −5 | 2 | −2 | 1 | −1 | 6 | −6 | −7 | 25 | −6 | 4 | −1 | 1 | } |
| { | −4 | −7 | −26 | −6 | −10 | 6 | −4 | 1 | 3 | 8 | 14 | −18 | 15 | −5 | 2 | −1 | } |
| { | 1 | | 3 | 5 | −1 | 1 | 0 | 0 | −3 | 12 | 6 | −10 | 1 | −1 | 0 | 0 | } |
| { | 1 | 4 | 0 | 33 | −7 | 5 | −2 | 1 | 0 | −9 | 53 | −22 | 3 | −1 | 0 | 0 | } |

},
lowFreqTransMatrix[ m ][ n ] = lowFreqTransMatrixCol32to47[ m − 32 ] [ n ] with m = 32 . . . 47, n = 0 . . . 15
lowFreqTransMatrixCol32to47 =

{

| | | | | | | | | | | | | | | | | | |
|---|---|---|---|---|---|---|---|---|---|---|---|---|---|---|---|---|---|
| { | 3 | 2 | −1 | 0 | −2 | −1 | 0 | 0 | 1 | 1 | 0 | 0 | −1 | 0 | 0 | 0 | } |
| { | 12 | 3 | −4 | 0 | −3 | −2 | 1 | 0 | 4 | 0 | 0 | 0 | −1 | 0 | 0 | 0 | } |
| { | 31 | −5 | −8 | 3 | −14 | 0 | 5 | −1 | 6 | 1 | −3 | 0 | −4 | −1 | 1 | 0 | } |
| { | −19 | 2 | 0 | 0 | 5 | 1 | 1 | 0 | −2 | 0 | −1 | 0 | 1 | 0 | 0 | 0 | } |
| { | −53 | 34 | 6 | −5 | 30 | −7 | −11 | 3 | −11 | −2 | 5 | 1 | 4 | 2 | −1 | −1 | } |
| { | 49 | 7 | 2 | −6 | −23 | −3 | −2 | 2 | 9 | 4 | 0 | 0 | −2 | −1 | −1 | 0 | } |
| { | −11 | 32 | −8 | −7 | 27 | −12 | −6 | 6 | −13 | 0 | 4 | −3 | 3 | −1 | −2 | 1 | } |
| { | −23 | 40 | −2 | 5 | 43 | −11 | −8 | −1 | −18 | −4 | 5 | 2 | 4 | 3 | 0 | −1 | } |
| { | −42 | −25 | 4 | 6 | 34 | 8 | 2 | −2 | −15 | −1 | 0 | −1 | 3 | 2 | 0 | 1 | } |
| { | −80 | −27 | 20 | −4 | −66 | 23 | −2 | −2 | 20 | −3 | −2 | 3 | −14 | 2 | 3 | −1 | } |
| { | 16 | −52 | 28 | 1 | 59 | 15 | −8 | −5 | −28 | −7 | 2 | 2 | 10 | 3 | 0 | −1 | } |
| { | −14 | −38 | −12 | −10 | 9 | 5 | 7 | 6 | −9 | 7 | −4 | −3 | 4 | −4 | 0 | 3 | } |
| { | 16 | 10 | 55 | −24 | 15 | 46 | −52 | 1 | 35 | −43 | 10 | 12 | −23 | 13 | 5 | −8 | } |
| { | −2 | −4 | −1 | 13 | 0 | 2 | −4 | −3 | 3 | −1 | 2 | 1 | −2 | 0 | −2 | −1 | } |
| { | −9 | −1 | −25 | 10 | 45 | −11 | 18 | 2 | 86 | 1 | −13 | −4 | −65 | −6 | 7 | 2 | } |
| { | 4 | −27 | −2 | −9 | 5 | 36 | −13 | 5 | −7 | −17 | 1 | 2 | 4 | 6 | 4 | −1 | } |

},

TABLE 79

Otherwise, when nTrS is 48, lfnstTrSetldx is 3 and lfnstldx is 1, the following lowFreqTransMatrix is derived.
lowFreqTransMatrix[ m ][ n ] = lowFreqTransMatrixCol0to15[ m ][ n ] with m = 0 . . . 15, n = 0 . . . 15
lowFreqTransMatrixCol0to15 =
{

| | | | | | | | | | | | | | | | | | |
|---|---|---|---|---|---|---|---|---|---|---|---|---|---|---|---|---|---|
| { | −115 | 37 | 9 | 2 | 2 | 1 | 1 | 0 | 10 | −29 | 8 | 0 | 1 | 0 | 1 | 0 | } |
| { | 15 | 51 | −18 | 0 | −3 | 0 | −1 | 0 | −95 | 7 | 34 | −3 | 5 | −1 | 2 | 0 | } |
| { | 29 | −22 | 16 | −6 | 3 | −2 | 1 | −1 | −4 | −80 | 12 | 15 | 0 | 3 | 0 | 1 | } |
| { | −36 | −98 | 25 | 5 | 4 | 1 | 2 | 1 | −59 | 11 | −17 | 1 | 1 | 1 | 0 | 0 | } |
| { | −6 | 18 | 3 | −3 | −1 | 0 | 0 | 0 | −50 | −5 | −38 | 12 | 0 | 2 | 0 | 1 | } |
| { | 4 | 15 | 52 | −13 | 5 | −3 | 2 | −1 | −17 | −45 | 16 | 24 | −2 | 4 | −1 | 2 | } |
| { | −20 | −7 | −43 | 4 | 0 | 1 | −1 | 1 | −7 | 35 | 0 | 12 | −4 | 1 | −1 | 0 | } |
| { | 4 | 29 | 1 | 26 | −5 | 4 | −2 | 1 | −17 | −7 | −73 | 6 | 6 | 2 | 1 | 1 | } |
| { | 12 | 13 | 10 | 2 | −1 | 3 | −1 | 1 | 17 | −2 | −46 | 12 | 7 | 0 | 2 | 0 | } |
| { | 5 | 20 | 90 | −17 | 4 | −3 | 2 | −1 | 6 | 66 | 8 | 28 | −7 | 3 | −1 | 1 | } |
| { | −3 | −4 | −34 | −12 | 2 | −1 | −1 | 0 | 5 | 25 | 11 | 43 | −10 | 4 | −2 | 1 | } |
| { | −1 | −3 | 2 | 19 | −2 | 4 | −1 | 2 | 9 | 3 | −35 | 22 | 11 | 1 | 2 | 0 | } |
| { | 10 | −4 | −6 | 12 | 5 | 1 | 1 | 0 | 11 | −9 | −12 | −2 | −7 | 0 | −1 | 0 | } |
| { | 4 | 6 | 14 | 53 | −4 | 4 | 0 | 2 | 0 | −1 | −20 | −13 | 3 | 2 | −1 | 1 | } |
| { | 2 | 9 | 13 | 37 | 19 | 6 | 2 | 2 | −9 | −3 | −9 | −28 | −20 | −4 | −3 | −1 | } |
| { | 3 | −3 | 12 | 84 | −12 | 8 | −2 | 3 | 6 | 13 | 50 | −1 | 45 | 1 | 7 | 0 | } |

},
lowFreqTransMatrix [ m ] [ n ] = lowFreqTransMatrixCol16to31 [ m − 16 ][ n ] with m = 16 . . . 31, n = 0 . . . 15
lowFreqTransMatrixCol16to31 =

| | | | | | | | | | | | | | | | | | |
|---|---|---|---|---|---|---|---|---|---|---|---|---|---|---|---|---|---|
| { | 23 | −8 | −8 | 1 | −1 | 0 | 0 | 0 | 3 | 3 | −2 | −1 | 0 | 0 | 0 | 0 | } |
| { | 23 | −47 | 1 | 6 | 0 | 1 | 0 | 1 | 8 | 5 | −12 | 0 | −1 | 0 | 0 | 0 | } |
| { | 45 | 7 | −59 | 7 | −2 | 1 | −1 | 0 | −15 | 41 | −3 | −16 | 2 | −3 | 0 | −1 | } |
| { | 6 | −13 | 7 | −3 | 0 | 0 | 0 | 0 | 14 | −4 | −14 | 3 | −1 | 0 | 0 | 0 | } |
| { | 3 | 67 | −7 | −40 | 3 | −6 | 1 | −3 | −12 | −13 | 65 | −3 | −10 | 0 | −1 | 0 | } |
| { | −87 | −8 | −14 | 7 | 8 | 1 | 2 | 0 | 23 | −35 | −6 | −3 | 1 | 1 | 0 | 0 | } |
| { | − 51 | −2 | −57 | 5 | 15 | 0 | 4 | 0 | 7 | 39 | 5 | −55 | 1 | −7 | 1 | −3 | } |
| { | −5 | 21 | −3 | 5 | −1 | −3 | 0 | −1 | −11 | 2 | −52 | −3 | 27 | −2 | 5 | 0 | } |
| { | 16 | −45 | −9 | −53 | 6 | 1 | 1 | 0 | 70 | 16 | 8 | −4 | −37 | 1 | −7 | 0 | } |
| { | 29 | 5 | −19 | 12 | 9 | −1 | 1 | 0 | −10 | 14 | −1 | −13 | 7 | 0 | 1 | 0 | } |
| { | 23 | 20 | −40 | 12 | 21 | −3 | 4 | −1 | 25 | −28 | −10 | 5 | 8 | 6 | 0 | 2 | } |
| { | −7 | −65 | −19 | −22 | 11 | 4 | 2 | 1 | −75 | −18 | 3 | −1 | −10 | 2 | 0 | 1 | } |
| { | 33 | −10 | −4 | 18 | 18 | −4 | 4 | −1 | 28 | −72 | 1 | −49 | 15 | 2 | 2 | 1 | } |
| { | −3 | 1 | −5 | 35 | −16 | −6 | −1 | −2 | 46 | 29 | 13 | 21 | 37 | −5 | 4 | −1 | } |
| { | 1 | 18 | 9 | 28 | 24 | 6 | 2 | 2 | −20 | −5 | −25 | −33 | −36 | 9 | −2 | 2 | } |
| { | −2 | 18 | −22 | −37 | −13 | 14 | 0 | 3 | 1 | −12 | −3 | 2 | −15 | −8 | 1 | −1 | } |

},
lowFreqTransMatrix[ m ][ n ] = lowFreqTransMatrixCol32to47[ m − 32 ][ n ] with m = 32 . . . 47, n = 0 . . . 15
lowFreqTransMatrixCol32to47 =
{

| | | | | | | | | | | | | | | | | | |
|---|---|---|---|---|---|---|---|---|---|---|---|---|---|---|---|---|---|
| { | 4 | 0 | 0 | −1 | 1 | 1 | 0 | 0 | 2 | 0 | 0 | 0 | 0 | 0 | 0 | 0 | } |
| { | 3 | −3 | 1 | −1 | 2 | 1 | −2 | 0 | 1 | −1 | 0 | 0 | 1 | 1 | −1 | 0 | } |
| { | 1 | 0 | 7 | −2 | −3 | 6 | 1 | −2 | 0 | 0 | 1 | 0 | −1 | 2 | 0 | −1 | } |
| { | 2 | 8 | −3 | −5 | 2 | 0 | 0 | 0 | 0 | 3 | 0 | −1 | 1 | 0 | 0 | 0 | } |
| { | 9 | −20 | −5 | 22 | −2 | 0 | 0 | −1 | 2 | −3 | −2 | 3 | −1 | 0 | 1 | 0 | } |
| { | 2 | 5 | −17 | 0 | 3 | −1 | −1 | −5 | 0 | 1 | −4 | 0 | 1 | 0 | 0 | −2 | } |
| { | 1 | −10 | 41 | 2 | 4 | −3 | −2 | 3 | −1 | −2 | 7 | 1 | 1 | −1 | −1 | 0 | } |
| { | 0 | 27 | 8 | −58 | 2 | −5 | 25 | 3 | 0 | 3 | 0 | −5 | 0 | −2 | 7 | 0 | } |
| { | −12 | 29 | 3 | 21 | 4 | 0 | 5 | −1 | −3 | 4 | 1 | 4 | 2 | 0 | 1 | 0 | } |
| { | 0 | −6 | 13 | −4 | 0 | −4 | 1 | 5 | 0 | −1 | −1 | 1 | 0 | −1 | 0 | 0 | } |
| { | −4 | 21 | −64 | −8 | −5 | 19 | 10 | −48 | 3 | −1 | 10 | −3 | 0 | 4 | 3 | −6 | } |
| { | 2 | −35 | −27 | 4 | 1 | 8 | −17 | −19 | 3 | 0 | 3 | −6 | 0 | 2 | −1 | −2 | } |
| { | 56 | −23 | 22 | −1 | 4 | −1 | −15 | 26 | 6 | 4 | −10 | 0 | 0 | 2 | −3 | 2 | } |
| { | −10 | −53 | −18 | 8 | 9 | 12 | −41 | −25 | −2 | 2 | 13 | −16 | 4 | 1 | −5 | 1 | } |
| { | −13 | 42 | 1 | 57 | −22 | −2 | −25 | −28 | 5 | 6 | 19 | −12 | −5 | −3 | −2 | 4 | } |
| { | 19 | 14 | −4 | −12 | −4 | 5 | 17 | 8 | 2 | −4 | −4 | 4 | −2 | 2 | 1 | 0 | } |

},

TABLE 80

Otherwise, when nTrS is 48, lfnstTrSetldx is 3 and lfnstldx is 2, the following lowFreqTransMatrix is derived.
lowFreqTransMatrix[ m ][ n ] = lowFreqTransMatrixCol0to15[ m ][ n ] with m = 0 . . . 15, n = 0 . . . 15
lowFreqTransMatrixCol0to15 =

| | | | | | | | | | | | | | | | | | |
|---|---|---|---|---|---|---|---|---|---|---|---|---|---|---|---|---|---|
| { | 109 | −26 | −8 | −3 | −2 | −1 | −1 | 0 | −50 | 28 | 2 | 1 | 0 | 0 | 0 | 0 | } |
| { | −39 | 31 | −5 | 2 | −1 | 1 | 0 | 0 | −95 | 6 | 18 | 0 | 4 | 0 | 1 | 0 | } |
| { | 29 | −3 | −2 | −2 | 0 | 0 | 0 | 0 | 0 | −41 | 9 | 0 | 2 | 0 | 1 | 0 | } |
| { | 18 | 96 | −23 | 2 | −5 | 1 | −2 | 0 | −10 | 6 | 10 | −2 | 1 | −1 | 1 | 0 | } |
| { | −29 | −60 | 16 | −2 | 3 | −1 | 1 | 0 | −52 | 9 | −17 | 5 | −2 | 1 | −1 | 1 | } |
| { | −23 | −5 | −15 | 5 | −2 | 1 | −1 | 1 | 2 | 79 | −13 | −4 | −2 | −1 | −1 | 0 | } |
| { | −7 | −3 | 12 | −3 | 3 | −1 | 1 | 0 | −31 | −62 | 8 | 7 | 0 | 2 | 0 | 1 | } |
| { | 1 | −26 | 5 | 0 | 1 | 0 | 1 | 0 | 24 | −3 | 43 | −6 | 4 | −2 | 1 | −1 | } |
| { | 11 | 14 | 6 | −3 | 1 | −1 | 1 | 0 | 10 | −7 | −9 | 3 | −2 | 1 | −1 | 0 | } |
| { | −10 | −11 | −47 | 3 | −4 | 1 | −1 | 0 | 5 | 28 | 11 | −2 | −1 | 0 | 0 | 0 | } |
| { | −8 | −24 | −99 | 11 | −10 | 3 | −4 | 1 | −5 | −36 | 19 | −26 | 4 | −5 | 1 | −2 | } |

TABLE 80-continued

| | | | | | | | | | | | | | | | | | |
|---|---|---|---|---|---|---|---|---|---|---|---|---|---|---|---|---|---|
| { | −5 | 1 | −1 | 0 | 1 | 0 | 0 | 0 | −10 | −14 | −6 | 8 | 0 | 1 | 0 | 0 | } |
| { | 1 | 12 | −20 | 21 | −4 | 5 | −2 | 2 | −5 | −2 | −75 | 9 | −1 | 2 | −1 | 1 | } |
| { | 2 | −9 | −18 | 8 | −3 | 3 | −1 | 1 | 3 | −25 | −62 | −6 | 0 | −2 | 0 | −1 | } |
| { | 4 | 9 | 39 | 18 | 0 | 2 | 0 | 1 | −6 | −16 | −22 | −37 | 5 | −5 | 1 | −2 | } |
| { | −7 | −2 | 15 | −6 | 1 | −1 | 1 | −1 | −11 | −3 | 22 | −14 | 0 | −2 | 1 | −1 | } |

},
lowFreqTransMatrix[ m ] [ n ] = lowFreqTransMatrixCol16to31 [ m − 16 ][ n ] with m = 16 . . . 31, n = 0 . . . 15
lowFreqTransMatrixCol16to31 =

| | | | | | | | | | | | | | | | | | |
|---|---|---|---|---|---|---|---|---|---|---|---|---|---|---|---|---|---|
| { | −18 | −8 | 6 | 0 | 1 | 0 | 1 | 0 | 6 | −2 | −3 | 0 | 0 | 0 | 0 | 0 | } |
| { | 32 | −49 | 5 | 1 | 1 | 0 | 0 | 0 | 27 | −1 | −14 | 2 | −2 | 1 | −1 | 0 | } |
| { | 86 | 4 | −33 | 2 | −6 | 1 | −2 | 0 | −32 | 58 | 1 | −7 | 0 | −2 | 0 | −1 | } |
| { | −14 | 26 | 2 | −4 | 1 | −1 | 0 | 0 | −43 | −9 | 35 | −2 | 4 | −1 | 1 | 0 | } |
| { | 13 | 56 | −2 | −9 | 0 | −2 | 0 | −1 | −34 | −18 | 41 | 0 | 3 | 0 | 1 | 0 | } |
| { | −9 | 1 | 5 | −1 | 1 | 0 | 0 | 0 | −4 | 49 | 2 | −14 | 1 | −3 | 0 | −1 | } |
| { | −75 | 9 | −45 | 5 | −1 | 1 | −1 | 0 | 14 | 35 | 0 | −23 | 2 | −5 | 1 | −2 | } |
| { | −7 | −64 | 9 | 14 | 0 | 3 | 0 | 1 | −12 | −4 | 5 | 3 | −1 | 1 | 0 | 0 | } |
| { | 22 | 21 | 1 | −21 | 2 | −4 | 1 | −2 | 92 | 1 | 53 | 0 | −9 | 1 | −2 | 0 | } |
| { | −12 | −2 | −38 | 2 | 0 | 1 | | 0 | 16 | 38 | 11 | −16 | −1 | −3 | 0 | −2 | } |
| { | 0 | 25 | 41 | 5 | −3 | 1 | 0 | 0 | 10 | −5 | −7 | 12 | 2 | 1 | 0 | 0 | } |
| { | −17 | −2 | 7 | −5 | 3 | −1 | 0 | 0 | −16 | 13 | 3 | 31 | −1 | 6 | 0 | 2 | } |
| { | −1 | −2 | −16 | −4 | 0 | −1 | 0 | 0 | −7 | 7 | −31 | 0 | 3 | 0 | 0 | 0 | } |
| { | −6 | −61 | 14 | −51 | 2 | −6 | 0 | −2 | −19 | 0 | 40 | −7 | −17 | 0 | −3 | 0 | } |
| { | −5 | 15 | 63 | 9 | −16 | 0 | −3 | 0 | 18 | 42 | −18 | 27 | 15 | 1 | 3 | 1 | } |
| { | −18 | −7 | 30 | −9 | −4 | 0 | −1 | 0 | −35 | 23 | 23 | 10 | −17 | 1 | −3 | 0 | } |

},
lowFreqTransMatrix[ m ] [ n ] = lowFreqTransMatrixCol32to47[ m − 32 ] [ n ] with m = 32 . . . 47, n = 0 . . . 15
lowFreqTransMatrixCol32to47 =

| | | | | | | | | | | | | | | | | | |
|---|---|---|---|---|---|---|---|---|---|---|---|---|---|---|---|---|---|
| { | −3 | 2 | 1 | −1 | 0 | 0 | 0 | 0 | −2 | 0 | 0 | 0 | 0 | 0 | 0 | 0 | } |
| { | 3 | 5 | −3 | −2 | 4 | 1 | −1 | −1 | 2 | 0 | 0 | 0 | 2 | 0 | 0 | 0 | } |
| { | −14 | −8 | 20 | 0 | −2 | −3 | 0 | 4 | −1 | −1 | 0 | 0 | −1 | 1 | 0 | 0 | } |
| { | 14 | −40 | 1 | 10 | 2 | 1 | −10 | 1 | 2 | −4 | −1 | −1 | 0 | 0 | −1 | 0 | } |
| { | 19 | −36 | −10 | 13 | 3 | 6 | −14 | −1 | 3 | 1 | −1 | −3 | 1 | 1 | −1 | −1 | } |
| { | −31 | −14 | 56 | −1 | 13 | −37 | −4 | 20 | −2 | 2 | −10 | 0 | 2 | −4 | 0 | −1 | } |
| { | 1 | −8 | 32 | −1 | 7 | −12 | −4 | 10 | 0 | 2 | −6 | −1 | 2 | 0 | 0 | −2 | } |
| { | 8 | −59 | −3 | 26 | 14 | 6 | −58 | 6 | −5 | 17 | −7 | −18 | 3 | 3 | −1 | −5 | } |
| { | −21 | −11 | 1 | 40 | −5 | −4 | −24 | 5 | −4 | 5 | −6 | −5 | 0 | 0 | 0 | −3 | } |
| { | 12 | −9 | −22 | 7 | −8 | 60 | 4 | −36 | −6 | −15 | 54 | 7 | 3 | −7 | −8 | 14 | } |
| { | −1 | 1 | 9 | −3 | −3 | −14 | −3 | 12 | 2 | 4 | −13 | −2 | −1 | 3 | 2 | −4 | } |
| { | −93 | −15 | −46 | −3 | 23 | −19 | 0 | −47 | 8 | 4 | 8 | 3 | 2 | 3 | 0 | 0 | } |
| { | 4 | 11 | −12 | 4 | −12 | 14 | −50 | −1 | −8 | 32 | −4 | −54 | 2 | 0 | 30 | −15 | } |
| { | 13 | −4 | 11 | 9 | 17 | 0 | 24 | 5 | 1 | −12 | 4 | 28 | 0 | 0 | −15 | 8 | } |
| { | 12 | −34 | 9 | −24 | 4 | 28 | −2 | 4 | −11 | −4 | 30 | 2 | 5 | −13 | −4 | 18 | } |
| { | −19 | 53 | 6 | 48 | −65 | 12 | −12 | 11 | −8 | −16 | 10 | −21 | −2 | −12 | 6 | 2 | } |

},

TABLE 81

| | Descriptor |
|---|---|
| coding_unit( x0, y0, cb Width, cbHeight, cqtDepth, treeType, modeType ) { | |
| ... | |
| LfnstDcOnly = 1 | — |
| LfnstZeroOutSigCoeffFlag = 1 | — |
| MtsZeroOutSigCoeffFlag = 1 | — |
| transform_tree( x0, y0, cbWidth, cbHeight, treeType, chType ) | — |
| lfnstWidth = ( treeType = = DUAL_TREE_CHROMA ) ? cbWidth / SubWidthC | — |
| : ( ( IntraSubPartitionsSplitType = = ISP_VER_SPLIT ) ? cbWidth / | |
| NumIntra SubPartitions : cbWidth ) | |
| lfnstHeight = ( treeType = = DUAL_TREE_CHROMA ) ? cbHeight / SubHeightC | — |
| : ( ( IntraSubPartitionsSplitType = = ISP_HOR_SPLIT) ? cbHeight / | |
| NumIntraSubPartitions : cbHeight ) | |
| if( Min( lfnstWidth, lfnstHeight ) >= 4 && sps_lfnst_enabled_flag = = 1 && | — |
| CuPredMode[ chType ][ x0 ][ y0] = = MODE_INTRA && | |
| transform_skip_flag[ x0 ][ y0 [ 0] = = 0 && | |
| ( treeType != DUAL_TREE_CHROMA \| \| !intra_mip_flag[ x0 ][ y0 ] \| \| | |
| Min( lfnstWidth, lfnstHeight ) >= 16) && | |
| Max( cbWidth, cbHeight ) <= MaxTbSizeY) { | |
| if( ( IntraSubPartitionsSplitType != ISP_NO_SPLIT \| \| LfnstDcOnly = = 0) | — |
| && | |
| LfnstZeroOutSigCoeffFlag = = 1) | |
| lfnst_idx | ae(v) |
| } | — |
| if( treeType != DUAL_TREE_CHROMA && lfnst idx = = 0 & & | — |
| transform_skip_flag[ x0 ][ y0 ][ 0] = = 0 && Max( cbWidth, cbHeight ) <= | |
| 32 && | |
| IntraSubPartitionsSplit[ x0 ][ y0 ] = = ISP_NO_SPLIT & & cu_sbt_flag = = | |

TABLE 81-continued

| | Descriptor |
|---|---|
| 0 && | |
| MtsZeroOutSigCoeffFlag = = 1 && tu_cbf_luma[ x0 ][ y0 ]) { | |
| if( ( ( CuPredMode[ chType ][ x0 ][ y0] = = MODE_INTER && | — |
| sps_explicit_mts_inter_enabled flag ) \| \| | |
| ( CuPredMode[ chType ][ x0 ][ y0 ] = = MODE_INTRA && | |
| sps_explicit_mts_intra_enabled_flag ) ) ) | |
| mts_idx | ae(v) |
| } | — |
| } | |

TABLE 82

| | Descriptor |
|---|---|
| transform_tree( x0, y0, tbWidth, tbHeight , treeType, chType ) { | — |
| InferTuCbfLuma = 1 | — |
| if( IntraSubPartitionsSplitType = = ISP_NO_SPLIT & & !cu_sbt_flag ) { | — |
| if( tbWidth > MaxTbSizeY \| \| tbHeight > MaxTbSize Y ) { | — |
| verSplitFirst = ( tbWidth > MaxTbSizeY && tbWidth > tbHeight ) ? 1 : 0 | — |
| trafoWidth = verSplitFirst ? (tbWidth / 2) : tbWidth | — |
| trafoHeight = ! verSplitFirst ? (tbHeight / 2) : tbHeight | — |
| transform_tree( x0, y0, trafoWidth, trafoHeight, treeType, chType ) | — |
| if( verSplitFirst ) | — |
| transform_tree( x0 + trafoWidth, y0, trafoWidth, trafoHeight, treeType, chType ) | — |
| else | — |
| transform_tree( x0, y0 + trafoHeight, trafoWidth, trafoHeight, treeType, chType ) | — |
| } else { | — |
| transform_unit( x0, y0, tbWidth, tbHeight, treeType, 0, chType ) | — |
| } | — |
| } else if( cu_sbt_flag ) { | — |
| if( !cu_sbt_horizontal_flag ) { | — |
| trafoWidth = tbWidth * SbtNumFourthsTb0 / 4 | — |
| transform_unit( x0, y0, trafoWidth, tbHeight, treeType , 0, 0 ) | — |
| transform_unit( x0 + trafoWidth, y0, tbWidth − trafoWidth, tbHeight, treeType, 1, 0 ) | — |
| } else { | — |
| trafoHeight = tbHeight * SbtNumFourthsTb0 / 4 | — |
| transform_unit( x0, y0, tbWidth, trafoHeight, treeType , 0, 0 ) | — |
| transform_unit( x0, y0 + trafoHeight, tbWidth, tbHeight − trafoHeight, treeType, 1, 0) | — |
| } | — |
| } else if( IntraSubPartitionsSplitType = = ISP_HOR_SPLIT ) { | — |
| trafoHeight = tbHeight / NumIntraSubPartitions | — |
| for( partIdx = 0; partIdx < NumIntraSubPartitions; partIdx++ ) | — |
| transform unit( x0, y0 + trafoHeight * partIdx, tb Width, trafoHeight, treeType, partIdx, 0) | — |
| } else if( IntraSubPartitionsSplitType = = ISP_VER_SPLIT ) { | — |
| trafoWidth = tbWidth / NumIntraSubPartitions | — |
| for( partIdx = 0; partIdx < NumIntraSubPartitions; partIdx++ ) | — |
| transform_unit( x0 + trafoWidth * partIdx, y0, trafo Width, tbHeight, treeType, partIdx, 0 ) | — |
| } | — |
| } | — |

TABLE 83

| | Descriptor |
|---|---|
| transform unit( x0, y0, tbWidth, tbHeight, treeType, subTuIndex, chType ) { | — |
| if( IntraSubPartitions SplitType != ISP NO SPLIT && | — |
| treeType = = SINGLE_TREE && subTuIndex = = NumIntraSubPartitions − 1 ) { | — |
| xC = CbPosX[ chType TT x0 TT y0 ] | — |
| yC = CbPos Y[ chType IT x0 TT_y0 ] | — |
| wC = CbWidth[ chType ][ x0 ][ y0 ] / SubWidthC | — |
| hC = CbHeight[ chType ][ x0 [ y0 ] / SubHeightC | — |
| } else { | — |
| xC = x0 | — |
| yC = y0 | — |
| wC = tbWidth / Sub WidthC | — |
| hC = tbHeight / SubHeightC | — |
| } | — |
| chromaAvailable = treeType != DUAL_TREE_LUMA && ChromaArrayType != 0 | — |
| & & | |

TABLE 83-continued

<table>
<tr><th></th><th>Descriptor</th></tr>
<tr><td>( IntraSubPartitionsSplitType = = ISP_NO_SPLIT –<br>( IntraSubPartitionsSplitType != ISP_NO_SPLIT &&<br>subTuIndex = = NumIntraSubPartitions − 1))</td><td></td></tr>
<tr><td>if( ( treeType = = SINGLE TREE | | treeType = = DUAL_TREE_CHROMA ) &&<br>ChromaArrayType != 0 ) {</td><td>—</td></tr>
<tr><td>if( ( IntraSubPartitionsSplitType = = ISP_NO_SPLIT && !( cu_sbt_flag & &<br>( ( subTuIndex = = 0 && cu_sbt_pos_flag ) | |<br>( subTuIndex = = 1 && !cu_sbt_pos_flag ) ) ) ) | |<br>( IntraSubPartitionsSplitType != ISP_NO_SPLIT &&<br>( subTuIndex = = NumIntraSubPartitions − 1 ) ) ) {</td><td>—</td></tr>
<tr><td>tu_cbf_cb[ xC ][ yC ]</td><td>ae(v)</td></tr>
<tr><td>tu_cbf_cr[ xC ][ yC ]</td><td>ae(v)</td></tr>
<tr><td>}</td><td>—</td></tr>
<tr><td>}</td><td>—</td></tr>
<tr><td>if( treeType = = SINGLE_TREE | | treeType = = DUAL_TREE_LUMA ) {</td><td>—</td></tr>
<tr><td>if( ( IntraSubPartitionsSplitType = = ISP_NO_SPLIT && !( cu_sbt_flag &&<br>( ( subTuIndex = = 0 && cu_sbt_pos_flag ) | |<br>( subTuIndex == 1 && !cu_sbt_pos_flag ) ) ) &&<br>( CuPredMode[ chType ][ x0 ][ y0 ] = = MODE_INTRA | |<br>( chromaAvailable && (tu_cbf_cb[ xC ][ yC ] | |<br>tu_cbf_cr[ xC ][ yC ] ) ) | |<br>CbWidth[ chType ][ x0 ][ y0 ] > MaxTbSize Y | |<br>CbHeight[ chType ][ x0 ][ y0 ] > MaxTbSize Y ) ) | |<br>( IntraSubPartitionsSplitType != ISP_NO_SPLIT &&<br>( subTuIndex < NumIntraSub Partitions − 1 | | InferTuCbfLuma ) ) )</td><td></td></tr>
<tr><td>tu_cbf_luma[ x0 ][ y0 ]</td><td>ae(v)</td></tr>
<tr><td>if(IntraSubPartitionsSplitType != ISP_NO_SPLIT )</td><td>—</td></tr>
<tr><td>InferTuCbfLuma = InferTuCbfLuma && !tu_cbf_luma[ x0 ][ y0 ]</td><td>—</td></tr>
<tr><td>}</td><td>—</td></tr>
</table>

TABLE 84

<table>
<tr><th></th><th></th></tr>
<tr><td>if( ( CbWidth[ chType ][ x0 ][ y0 ] > 64 | | CbHeight[ chType ][ x0 ][ y0 ] > 64 | |<br>tu_cbf_luma[ x0 ][ y0 ] | | ( chromaAvailable && ( tu_cbf_cb[ xC ][ yC ] | |<br>tu_cbf_cr[ xC ][ yC]) ) && treeType != DUAL_TREE_CHROMA ) {</td><td>—</td></tr>
<tr><td>if( cu_qp_delta_enabled_flag && !IsCuQpDeltaCoded ) {</td><td>—</td></tr>
<tr><td>cu_qp_delta_abs</td><td>ae(v)</td></tr>
<tr><td>if( cu_qp_delta_abs )</td><td>—</td></tr>
<tr><td>cu_qp_delta_sign_flag</td><td>ae(v)</td></tr>
<tr><td>}</td><td>—</td></tr>
<tr><td>}</td><td>—</td></tr>
<tr><td>if( ( CbWidth[ chType ][ x0 ][ y0 ] > 64 | | CbHeight[ chType ][ x0 ][ y0 ] > 64 | |<br>( chromaAvailable && ( tu_cbf_cb[ xC ][ yC ] | | tu_cbf_cr[ xC][ yC] ) ) ) &&<br>treeType != DUAL_TREE_LUMA ) {</td><td>—</td></tr>
<tr><td>if( cu_chroma_qp_offset_enabled_flag && !IsCuChromaOpOffsetCoded) {</td><td>—</td></tr>
<tr><td>cu_chroma_qp_offset_flag</td><td>ae(v)</td></tr>
<tr><td>if( cu_chroma_qp_offset_flag && chroma_qp_offset_list_len_minus1 > 0 )</td><td>—</td></tr>
<tr><td>cu_chroma_qp_offset_idx</td><td>ae(v)</td></tr>
<tr><td>}</td><td>—</td></tr>
<tr><td>}</td><td>—</td></tr>
<tr><td>if( sps_joint_cber_enabled_flag && ( ( CuPredMode[ chType ][ x0 ][ y0 ] = = MODE_INTRA<br>&& (tu_cbf_cb[ xC ][ yC ] | | tu_cbf_cr[ xC ][ yC ] ) ) | |<br>( tu_cbf_cb[ xC ][ yC] && tu_cbf_cr[ xC ][ yC] ) ) && chromaAvailable )</td><td></td></tr>
<tr><td>tu_joint_cbcr_residual_flag[ xC ][ yC ]</td><td>ae(v)</td></tr>
<tr><td>if( tu_cbf_luma[ x0 ][ y0] && treeType != DUAL_TREE_CHROMA ){</td><td></td></tr>
<tr><td>if( sps_transform_skip_enabled_flag && !BdpcmFlag[ x0 ][ y0 ][ 0] &&<br>tbWidth <= MaxTsSize && tbHeight <= MaxTsSize &&<br>( IntraSubPartitionsSplit[ x0 ][ y0 ] = = ISP_NO_SPLIT) && !cu_sbt_flag )</td><td></td></tr>
<tr><td>transform_skip_flag[ x0 ][ y0 ][ 0 ]</td><td>ae(v)</td></tr>
<tr><td>if( !transform_skip_flag[ x0 ][ y0 ][ 0 ] )</td><td></td></tr>
<tr><td>residual_coding( x0, y0, Log2( tbWidth ), Log2( tbHeight ), 0 )</td><td></td></tr>
<tr><td>else</td><td></td></tr>
<tr><td>residual_ts_coding( x0, y0, Log2( tbWidth ), Log2( tbHeight ), 0 )</td><td></td></tr>
<tr><td>}</td><td></td></tr>
<tr><td>if( tu_cbf_cb[ xC ][ yC ] && treeType != DUAL_TREE_LUMA ) {</td><td></td></tr>
<tr><td>if( sps_transform_skip_enabled_flag && !BdpcmFlag[ x0 ][ y0 ][ 1 ] &&<br>wC <= MaxTsSize && hC <= MaxTsSize && !cu_sbt_flag )</td><td></td></tr>
<tr><td>transform_skip_flag[ xC ][ yC ][ 1 ]</td><td>ae(v)</td></tr>
<tr><td>if( !transform_skip_flag[ xC ][ yC ][ 1 ] )</td><td></td></tr>
<tr><td>residual_coding( xC, yC, Log2( wC ), Log2( hC ), 1 )</td><td></td></tr>
<tr><td>else</td><td></td></tr>
<tr><td>residual_ts_coding( xC, yC, Log2( wC ), Log2( hC ), 1 )</td><td></td></tr>
<tr><td>}</td><td></td></tr>
<tr><td>if( tu_cbf_cr[ xC ][ yC] && treeType != DUAL_TREE_LUMA &&<br>!( tu_cbf_cb[ xC ][ yC] && tu_joint_cber_residual_flag[ xC ][ yC ] ) ) {</td><td></td></tr>
</table>

TABLE 84-continued

| | |
|---|---|
|     if( sps_transform_skip_enabled_flag && !BdpcmFlag[ x0 ][ y0 ][ 2 ] && | |
|       wC <= MaxTsSize && hC <= MaxTsSize && !cu_sbt_flag ) | |
|       transform_skip_flag[ xC ][ yC ][ 2 ] | ae(v) |
|     if( !transform_skip_flag[ xC ][ yC ][ 2 ] ) | |
|       residual_coding( xC, yC, Log2( wC ), Log2( hC ), 2 ) | |
|     else | |
|       residual_ts_coding( xC, yC, Log2( wC ), Log2( hC ), 2 ) | |
|   } | |
| } | |

TABLE 85

| | Descriptor |
|---|---|
| coding_unit( x0, y0, cbWidth, cbHeight, cotDepth, treeType, modeType ) { | |
| ... | |
|   LfnstDcOnly = 1 | |
|   LfnstZeroOutSigCoeffFlag = 1 | |
|   MtsZeroOutSigCoeffFlag = 1 | |
|   transform_tree( x0, y0, cbWidth, cbHeight, treeType, chType ) | |
|   lfnst Width = ( treeType = = DUAL_TREE_CHROMA ) ? cbWidth / SubWidthC | |
|         : ( ( IntraSubPartitionsSplitType = = ISP_VER_SPLIT ) ? cbWidth / | |
|           NumIntraSubPartitions : cbWidth ) | |
|   lfnstHeight = ( treeType = = DUAL_TREE_CHROMA ) ? cbHeight / SubHeightC | |
|         : ( ( IntraSubPartitionsSplitType = = ISP_HOR_SPLIT) ? cbHeight / | |
|           NumIntraSubPartitions : cbHeight ) | |
|   if( Min( lfnst+Width, lfnstHeight ) >= 4 && sps_lfnst_enabled_flag == 1 & & | |
|     CuPredMode[ chType ][ x0 ][ y0] = = MODE_INTRA && | |
|     ( treeType = = SINGLE_TREE && ( transform_skip_flag[ x0 ][ y0 ][ 0 ] = = 0 \| \| | |
| transform_skip_flag[ x0 ][ y0 ][ 1] = = 0 \| \| transform_skip_flag[ x0 ][ y0 ][ 2] = = 0) ) | |
| && | |
|     ( treeType = = DUAL_TREE_CHROMA \| \| ( !intra_mip_flag[ x0 ][ y0 ] \| \| | |
| Min( lfnstWidth, lfnstHeight ) >= 16) ) && | |
|     Max( cbWidth, cbHeight ) <= MaxTbSizeY) { | |
|     if( ( IntraSubPartitionsSplitType != ISP_NO_SPLIT \| \| LfnstDcOnly = = 0) && | |
|       LfnstZeroOutSigCoeffFlag = = 1) | |
|       lfnst_idx | ae(v) |
|   } | |
|   if( treeType != DUAL_TREE_CHROMA && lfnst_idx = = 0 && | |
|     transform_skip_flag[ x0 ][ 0 ][ 0 ] = = 0 && Max( cbWidth, cbHeight ) <= 32 & & | |
|     IntraSubPartitionsSplit[ x0 ][ y0 ] = = ISP_NO_SPLIT && cu_sbt_flag = = 0 & & | |
|     MtsZeroOutSigCoeffFlag = = 1 && tu_cbf_luma[ x0 ][ y0 ] ) { | |
|     if( ( ( CuPredMode[ chType ][ x0 ][ y0] = = MODE INTER && | |
|       sps_explicit_mts_inter_enabled_flag ) \| \| | |
|       ( CuPredMode[ chType ][ x0 ][ y0 ] = = MODE INTRA && | |
|       sps_explicit_mts_intra_enabled_flag ) ) ) | |
|       mts_idx | ae(v) |
|     } | |
|   } | |

TABLE 86

| | Descriptor |
|---|---|
| coding_unit( x0, y0, cbWidth, cbHeight, cotDepth, treeType, modeType ) { | |
| ... | |
|   LfnstDcOnly = 1 | |
|   LfnstZeroOutSigCoeffFlag = 1 | |
|   MtsZeroOutSigCoeffFlag = 1 | |
|   transform tree( x0, y0, cb Width, cbHeight, treeType, chType ) | |
|   lfnstWidth = ( treeType = = DUAL_TREE_CHROMA ) ? cbWidth / SubWidthC | |
|         : ( ( IntraSubPartitionsSplitType = = ISP_VER_SPLIT ) ? cbWidth / | |
|           NumIntraSubPartitions : cbWidth ) | |
|   lfnstHeight = ( tree Type = = DUAL_TREE_CHROMA ) ? cbHeight / SubHeightC | |
|         : ( ( IntraSubPartitionsSplitType = = ISP_HOR_SPLIT) ? cbHeight / | |
|           NumIntraSubPartitions : cbHeight ) | |
|   if( Min( lfnstWidth, lfnstHeight ) >= 4 && sps_lfnst_enabled_flag == 1 && | |
|     CuPredMode[ chType ][ x0 ][ y0] = = MODE_INTRA && | |
|     ( treeType = = DUAL_TREE_LUMA && transform_skip_flag[ x0 ][ y0 ][ 0] == 0) && | |
|     ( treeType = = DUAL_TREE_CHROMA \| \| ( !intra mip_flag[ x0 ]] y0 ] \| \| | |
| Min( lfnstWidth, lfnstHeight ) >= 16) ) && | |
|     Max( cbWidth, cbHeight ) <= MaxTbSizeY) { | |

TABLE 86-continued

| | Descriptor |
|---|---|
| if( ( IntraSubPartitionsSplitType != ISP_NO_SPLIT \| \| LnstDcOnly = = 0) && | |
| LfnstZeroOutSigCoeffFlag = = 1) | |
| lfnst_idx | ae(v) |
| } | |
| if( treeType != DUAL_TREE_CHROMA & & lfnst_idx = = 0 & & | |
| transform_skip_flag[ x0 ][ y0 ][ 0 ] = = 0 && Max( cbWidth, cbHeight ) <= 32 & & | |
| IntraSubPartitionsSplit[ x0 ][ y0 ] = = ISP_NO_SPLIT && cu_sbt_flag = = 0 & & | |
| MtsZeroOutSigCoeffFlag = = 1 && tu_cbf_luma[ x0 ][ y0 ] ) { | |
| if( ( ( CuPredMode[ chType ][ x0 ][ y0 ] = = MODE INTER & & | |
| sps_explicit_mts_inter_enabled_flag ) \| \| | |
| ( CuPredMode[ chType ][ x0 ][ y0 ] = = MODE_INTRA && | |
| sps_explicit_mts_intra_enabled_flag ) ) ) | |
| mts_idx | ae(v) |
| } | |
| } | |

TABLE 87

| | Descriptor |
|---|---|
| coding unit( x0, y0, cbWidth, cbHeight, cotDepth, treeType, modeType ) { | |
| ... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC | |
| : ( ( IntraSubPartitionsSplitType = = ISP_VER_SPLIT ) ? cbWidth / | |
| NumIntraSubPartitions : cb Width ) | |
| lfnstHeight = ( treeType = = DUAL_TREE_CHROMA ) ? cbHeight / SubHeightC | |
| : ( ( IntraSubPartitionsSplitType = = ISP_HOR_SPLIT) ? cbHeight / | |
| NumIntraSubPartitions : cbHeight ) | |
| if( Min( lfnst Width, lfnstHeight ) >= 4 && sps_lfnst_enabled_flag == 1 && | |
| CuPredMode[ chType ][ x0 ][ y0] = = MODE_INTRA && | |
| ( ( treeType = = SINGLE_TREE \| \| tree Type = = DUAL_TREE_LUMA ) && | |
| transform_skip_flag[ x0 ][ y0 ][ 0 ] = = 0 ) & & | |
| ( treeType = = DUAL_TREE_CHROMA \| \| ( !intra_mip_flag[ x0 ][ y0 ] \| \| | |
| Min( lfnstWidth, lfnstHeight ) >= 16) ) && | |
| Max( cbWidth, cbHeight ) <= MaxTbSize Y) { | |
| if( ( IntraSubPartitionsSplitType != ISP_NO_SPLIT \| \| LfnstDcOnly = = 0) && | |
| LfnstZeroOutSigCoeffFlag = = 1 ) | |
| lfnst_idx | ae(v) |
| } | |
| if( treeType != DUAL_TREE_CHROMA && lfnst_idx = = 0 && | |
| transform_skip_flag[ x0 ][ y0 ][ 0] = = 0 && Max( cbWidth, cbHeight ) <= 32 & & | |
| IntraSubPartitionsSplit[ x0 ][ 0 ] = = ISP_NO_SPLIT && cu_sbt_flag = = 0 & & | |
| MtsZeroOutSigCoeffFlag = = 1 && tu_cbf_luma[ x0 ][ y0 ] ) { | |
| if( ( ( CuPredMode[ chType ][ x0 ][ y0 ] = = MODE_INTER && | |
| sps_explicit_mts_inter_enabled_flag ) \| \| | |
| ( CuPredMode[ chType ][ x0 ]] y0 ] = = MODE_INTRA && | |
| sps_explicit_mts_intra_enabled_flag ) ) ) | |
| mts_idx | ae( v) |
| } | |
| } | |

TABLE 88

| | Descriptor |
|---|---|
| coding_unit( x0, y0, cbWidth, cbHeight, cotDepth, treeType, modeType ) { | |
| ... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnst Width = ( treeType = = DUAL TREE CHROMA ) ? cbWidth / Sub WidthC | |
| : ( ( IntraSubPartitionsSplitType == ISP_VER SPLIT ) ? cb Width / | |
| NumIntraSubPartitions : cb Width ) | |
| lfnstHeight = ( treeType == DUAL_TREE_CHROMA ) ? cbHeight / SubHeightC | |

TABLE 88-continued

| | Descriptor |
|---|---|
| : ( ( IntraSubPartitionsSplitType = = ISP HOR SPLIT) ? cbHeight / NumIntraSubPartitions : cbHeight ) | |
| if( Min( lfnst Width, lfnstHeight ) >= 4 && sps_lfnst_enabled_flag = = 1 & & CuPredMode[ chType ][ x0 ][ y0] == MODE_INTRA && ( treeType = = DUAL TREE CHROMA && ( transform skip_flag[ x0 ][ y0 ][ 1] = = 0 \| \| transform_skip_flag[ x0 ][ 10 ][ 2 ] = = 0 ) && ChromaArrayType != 0 ) && ( tree Type DUAL TREE CHROMA ( !intra_mip_flag[ x0 ][ y0 ] Min( lfnst Width, lfnstHeight ) >= 16)) && Max( cbWidth, cbHeight ) <= MaxTbSize Y) { | |
| if( ( IntraSubPartitionsSplitType != ISP NO SPLIT \|\| LfnstDcOnly == 0) & & LfnstZeroOutSigCoeffFlag == 1) | |
| lfnst_idx | ae(v) |
| } | |
| if( treeType != DUAL TREE CHROMA && lfnst idx = 0 & & transform_skip_flag[ x0 ][ 10 ][ 0 ] = = 0 && Max( cbWidth, cbHeight ) <= 32 & & IntraSubPartitionsSplit[ x0 ][ 0 ] = = ISP NO SPLIT && cu sbt flag = = 0 & & MtsZeroOutSigCoeffFlag == 1 && tu_cbf_luma[ x0 ][ y0 ] ) { | |
| if( ( ( CuPredMode[ chType ][ x0 ][ y0] == MODE INTER && sps_explicit_mts_inter enabled flag ) II ( CuPredMode[ chType ][ x0 ][ y0 ] = = MODE INTRA && sps_explicit_mts_intra_enabled_flag ) ) ) | |
| mts_idx | ae(v |
| } | |
| } | |

TABLE 89

| coding_unit( x0, y0, cbWidth, cbHeight, cqtDepth, treeType, modeType ) { | Descriptor |
|---|---|
| . . . | |
| LfnstDcOnly = 1 | — |
| LfnstZeroOutSigCoeffFlag = 1 | — |
| MtsZeroOutSigCoeffFlag = 1 | — |
| transform tree( x0, y0, cbWidth, cbHeight, treeType, chType ) | — |
| lfnstWidth = ( treeType == DUAL TREE CHROMA ) ? cbWidth / SubWidthC : ( ( IntraSubPartitionsSplitType == ISP_VER_SPLIT ) ? cbWidth / NumIntraSubPartitions : cbWidth ) | — |
| lfnstHeight = ( treeType == DUAL_TREE_CHROMA ) ? cbHeight / SubHeightC : ( ( IntraSubPartitionsSplitType == ISP HOR SPLIT) ? cbHeight / NumIntraSubPartitions : cbHeight ) | — |
| if( Min( lfnstWidth, lfnstHeight ) >= 4 && sps_lfnst_enabled_flag == 1 && CuPredMode[ chType ][ x0 ][ y0 ] == MODE_INTRA && ( ( treeType == SINGLE TREE && ( transform skip flag[ x0 ][ y0 ][ 0 ] == 0 \|\| transform_skip_flag[ x0 ][ y0 ][ 1] == 0 \|\| transform_skip_flag[ x0 ][ y0 ][ 2] == 0)) \|\| ( treeType == DUAL TREE LUMA && transform skip flag[ x0 ][ y0 ][ 0 ] == 0) \|\| ( treeType == DUAL TREE CHROMA && ( transform_skip_flag[ x0 ]] y0 ][ 1 ] == 0\|\| transform_skip_flag[ x0 ][ y0 ][ 2] == 0) && ChromaArrayType != 0) ) && ( tree Type DUAL_TREE_CHROMA \|\| ( !intra_mip_flag[ x0 ][ y0 ] \|\| Min( lfnstWidth, lfnstHeight ) >= 16) ) && Max( cbWidth, cbHeight ) <= Max TbSize Y) { | — |
| if( ( IntraSubPartitionsSplitType != ISP_NO_SPLIT \|\| LfnstDcOnly == 0) && LfnstZeroOutSigCoeffFlag == 1) | — |
| lfnst_idx | ae(v) |
| } | |
| if( treeType != DUAL_TREE_CHROMA && lfnst_idx == 0 && transform_skip_flag[ x0 ][ y0 ][ 0 ] == 0 &&Max( cbWidth, cbHeight ) <= 32 && IntraSubPartitionsSplit[ x0 ][ 0 ] == ISP_NO_SPLIT && cu_sbt_flag == 0 && MtsZeroOutSigCoeffFlag == 1 && tu_cbf_luma[ x0 ][ y0 ] { | — |
| if( ( ( CuPredMode[ chType ][ x0 ][ y0 ] == MODE INTER && sps_explicit_mts_inter enabled flag ) \|\| ( CuPredMode[ chType ][ x0 ][ y0 ] == MODE INTRA && sps_explicit_mts_intra enabled_flag ) ) ) | — |
| mts_idx | ae(v) |
| } | |
| } | — |

TABLE 90

<table>
<tr><th>coding unit( x0, y0, cbWidth, cbHeight, cqtDepth, treeType, modeType ) {</th><th>Descriptor</th></tr>
<tr><td>. . .</td><td></td></tr>
<tr><td>LfnstDcOnly = 1</td><td>—</td></tr>
<tr><td>LfnstZeroOutSigCoeffFlag = 1</td><td>—</td></tr>
<tr><td>MtsZeroOutSigCoeffFlag = 1</td><td>—</td></tr>
<tr><td>transform tree( x0, y0, cbWidth, cbHeight, treeType, chType )</td><td>—</td></tr>
<tr><td>lfnstWidth = ( treeType == DUAL_TREE_CHROMA ) ? cbWidth / SubWidthC<br>: ( ( IntraSubPartitionsSplitType == ISP_VER_SPLIT ) ? cbWidth /<br>NumIntraSubPartitions : cbWidth )</td><td>—</td></tr>
<tr><td>lfnstHeight = ( treeType == DUAL_TREE_CHROMA ) ? cbHeight /<br>SubHeightC<br>: ( ( IntraSubPartitionsSplitType == ISP_HOR_SPLIT) ? cbHeight /<br>NumIntraSubPartitions : cbHeight )</td><td>—</td></tr>
<tr><td>if( Min( lfnstWidth, lfnstHeight ) >= 4 && sps lfnst enabled flag == 1 &&<br>CuPredMode[ chType ][ x0 ][ y0 ] == MODE_INTRA &&<br>( ( treeType == SINGLE TREE && ( transform skip flag[ x0 ][ 0 ][ 0 ] ==<br>0 ||<br>transform_skip_flag[ x0 ][ y0 ][ 1] == 0 || transform_skip_flag[ x0 ][ y0 ][ 2] ==<br>0)) ||<br>( ( treeType == SINGLE_TREE || treeType == DUAL_TREE_LUMA ) &&<br>transform skip_flag[ x0 ][ y0 ][ 0 ] == 0) ||<br>( treeType == DUAL_TREE_CHROMA &&<br>( transform_skip_flag[ x0 ]] y0 ][ 1 ] == 0 ||<br>transform_skip_flag[ x0 ][ y0 ][ 2] == 0) && ChromaArrayType != 0) ) &&<br>( treeType == DUAL_TREE_CHROMA || ( !intra_mip_flag[ x0 ]] y0 ] ||<br>Min( lfnstWidth, lfnstHeight ) >= 16) ) &&<br>Max( cbWidth, cbHeight ) <= MaxTbSize Y) {</td><td>—</td></tr>
<tr><td>if( ( IntraSubPartitionsSplitType != ISP_NO_SPLIT || LfnstDcOnly == 0)<br>&&<br>LfnstZeroOutSigCoeffFlag == 1)</td><td>—</td></tr>
<tr><td>lfnst_idx</td><td>ae(v)</td></tr>
<tr><td>}</td><td>—</td></tr>
<tr><td>if( treeType != DUAL_TREE_CHROMA && lfnst_idx == 0 &&<br>transform skip flag[ x0 ][ y0 ][ 0 ] == 0 && Max( cbWidth, cbHeight ) <=<br>32 &&<br>IntraSubPartitionsSplit[ x0 ][ 0 ] == ISP_NO_SPLIT && cu_sbt_flag == 0<br>&&<br>MtsZeroOutSigCoeffFlag == 1 && tu_cbf_luma[ x0 ][ y0 ] ) {</td><td>—</td></tr>
<tr><td>if( ( ( CuPredMode[ chType ][ x0 ][ y0 ] == MODE_INTER &&<br>sps explicit mts inter enabled flag ) ||<br>( CuPredMode[ chType ][ x0 ][ y0 ] MODE INTRA &&<br>sps explicit mts intra enabled flag ) ) )</td><td>—</td></tr>
<tr><td>mts_idx</td><td>ae(v)</td></tr>
<tr><td>}</td><td>—</td></tr>
<tr><td>}</td><td>—</td></tr>
</table>

TABLE 91

<table>
<tr><th>coding_unit( x0, y0, cbWidth, cbHeight, cqtDepth, treeType, modeType ) {</th><th>Descriptor</th></tr>
<tr><td>. . .</td><td></td></tr>
<tr><td>LfnstDcOnly = 1</td><td>—</td></tr>
<tr><td>LfnstZeroOutSigCoeffFlag = 1</td><td>—</td></tr>
<tr><td>MtsZeroOutSigCoeffFlag = 1</td><td>—</td></tr>
<tr><td>transform_tree( x0, y0, cbWidth, cbHeight, treeType, chType )</td><td>—</td></tr>
<tr><td>lfnstWidth = ( treeType == DUAL_TREE_CHROMA ) ? cbWidth / SubWidthC<br>: ( ( IntraSubPartitions SplitType == ISP_VER_SPLIT ) ? cbWidth /<br>NumIntraSubPartitions : cbWidth )</td><td>—</td></tr>
<tr><td>lfnstHeight = ( treeType == DUAL TREE CHROMA ) ? cbHeight / SubHeightC<br>: ( ( IntraSubPartitionsSplitType == ISP_HOR_SPLIT) ? cbHeight /<br>NumIntraSubPartitions : cbHeight )</td><td>—</td></tr>
<tr><td>if( Min( lfnstWidth, lfnstHeight ) >= 4 && sps_lfnst_enabled_flag == 1 &&<br>CuPredMode[ chType ][ x0 ][ y0 ] == _ MODE INTRA &&<br>( ( (treeType == SINGLE_TREE || treeType == DUAL_TREE_LUMA ) &&<br>transform skip flag[ x0 ][ y0 ][ 0 ] == 0) ||<br>( treeType == DUAL_TREE_CHROMA &&<br>( transform skip_flag[ x0 ][ y0 ][ 1] == 0 ||<br>transform skip flag[ x0 ][ y0 ][ 2 ] == 0 ) && ChromaArray Type != 0 ) ) &&<br>( treeType == DUAL_TREE_CHROMA || ( !intra_mip_flag[ x0 ][ y0 ] ||<br>Min( lfnstWidth, lfnstHeight ) >= 16) ) &&<br>Max( cbWidth, cbHeight ) <= MaxTbSize Y) {</td><td>—</td></tr>
<tr><td>if( ( IntraSubPartitionsSplitType != ISP_NO_SPLIT || LfnstDcOnly == 0) &&<br>LfnstZeroOutSigCoeffFlag == 1)</td><td>—</td></tr>
</table>

TABLE 91-continued

| coding_unit( x0, y0, cbWidth, cbHeight, cqtDepth, treeType, modeType ) { | Descriptor |
|---|---|
| lfnst_idx | ae(v) |
| } | — |
| if( treeType != DUAL_TREE_CHROMA && lfnst_idx == 0 && transform_skip_flag[ x0 ][ y0 ][ 0 ] == 0 && Max( cbWidth, cbHeight ) <= 32 && IntraSubPartitionsSplit[ x0 ][ y0 ] == ISP_NO_SPLIT && cu_sbt_flag == 0 && MtsZeroOutSigCoeffFlag == 1 && tu_cbf_luma[ x0 ][ y0 ]) { | — |
| if( ( ( CuPredMode[ chType ][ x0 ][ y0 ] == MODE_INTER && sps_explicit_mts_inter enabled flag ) \|\| ( CuPredMode[ chType ][ x0 ][ y0 ] MODE_INTRA && sps_explicit_mts_intra_enabled_flag ) ) ) | — |
| mts_idx | ae(v) |
| } | — |
| } | — |

TABLE 92

| coding_unit( x0, y0, cbWidth, cbHeight, cqtDepth, treeType, mode Type ) { | Descriptor |
|---|---|
| . . . | |
| LfnstDcOnly = 1 | — |
| LfnstZeroOutSigCoeffFlag = 1 | — |
| MtsZeroOutSigCoeffFlag = 1 | — |
| transform tree( x0, y0, cbWidth, cbHeight, treeType, chType ) | — |
| lfnstWidth = ( treeType == DUAL_TREE_CHROMA ) ? cbWidth / SubWidthC : ( ( IntraSubPartitionsSplitType == ISP_VER_SPLIT ) ? cbWidth / NumIntraSubPartitions : cbWidth ) | — |
| lfnstHeight = ( treeType == DUAL_TREE_CHROMA ) ? cbHeight / SubHeightC : ( ( IntraSubPartitionsSplitType == ISP_HOR_SPLIT) ? cbHeight / NumIntraSubPartitions : cbHeight ) | — |
| if( Min( lfnstWidth, lfnstHeight ) >= 4 && sps_lfnst_enabled_flag 1 && CuPredMode[ chType ][ x0 ][ y0 ] == MODE INTRA && ( treeType == SINGLE_TREE && ( transform_skip_flag[ x0 ] [ y0 ][ 0 ] == 0 && transform_skip_flag[ x0 ][ y0 ][ 1 ] == 0 && transform_skip_flag[ x0 ][ y0 ][ 2 ] == 0 ) ) && ( treeType == DUAL_TREE_CHROMA \|\| ( !intra_mip_flag[ x0 ][ y0 ] \|\| Min( lfnstWidth, lfnstHeight ) >= 16) ) && Max( cbWidth, cbHeight ) <= Max TbSize Y) { | — |
| if( ( IntraSubPartitionsSplitType != ISP_NO_SPLIT \|\| LfnstDcOnly == 0) && LfnstZeroOutSigCoeffFlag == 1) | — |
| lfnst_idx | ae(v) |
| } | — |
| if( treeType != DUAL_TREE_CHROMA && lfnst_idx == 0 && transform_skip_flag[ x0 ][ y0 ][ 0 ] == 0 && Max( cbWidth, cbHeight ) <= 32 && IntraSubPartitionsSplit[ x0 ][ y0 ] == _ ISP_NO_SPLIT && cu_sbt_flag == 0 && MtsZeroOutSigCoeffFlag == 1 && tu_cbf_luma[ x0 ][ y0 ]} { | — |
| if( ( ( CuPredMode[ chType ][ x0 ][ y0 ] == MODE_INTER && sps_explicit_mts_inter enabled flag ) \|\| ( CuPredMode[ chType ][ x0 ][ y0 ] == MODE INTRA && sps_explicit_mts_intra_enabled_flag ) ) ) | — |
| mts_idx | ae(v) |
| } | — |
| } | — |

TABLE 93

| coding_unit( x0, y0, cbWidth, cbHeight, cqtDepth, treeType, mode Type ) { | Descriptor |
|---|---|
| . . . | |
| LfnstDcOnly = 1 | — |
| LfnstZeroOutSigCoeffFlag = 1 | — |
| MtsZeroOutSigCoeffFlag = 1 | — |
| transform_tree( x0, y0, cbWidth, cbHeight, treeType, chType ) | — |
| lfnstWidth = ( treeType == DUAL TREE CHROMA ) ? cbWidth / SubWidthC : ( ( IntraSubPartitionsSplitType == ISP_VER_SPLIT ) ? cbWidth / NumIntraSubPartitions : cbWidth ) | — |
| lfnstHeight = ( treeType == DUAL TREE CHROMA ) ? cbHeight / SubHeightC : ( ( IntraSubPartitionsSplitType == ISP_HOR_SPLIT) ? cbHeight / | — |

TABLE 93-continued

| coding_unit( x0, y0, cbWidth, cbHeight, cqtDepth, treeType, mode Type ) { | Descriptor |
|---|---|
| NumIntraSubPartitions : cbHeight ) | |
| if( Min( lfnstWidth, lfnstHeight ) >= 4 && sps_lfnst_enabled_flag == 1 && | — |
| CuPredMode[ chType ][ x0 ][ y0 ] == MODE INTRA && | |
| ( treeType == SINGLE_TREE && | |
| transform skip_flag[ x0 ][ y0 ][ 0 ] == 0) && | |
| ( treeType == DUAL_TREE_CHROMA \|\| ( !intra_mip_flag[ x0 ][ y0 ] \|\| | |
| Min( lfnstWidth, lfnstHeight ) >= 16) ) && | |
| Max( cbWidth, cbHeight ) <= Max TbSize Y) { | |
| if( ( IntraSubPartitionsSplitType != ISP_NO_SPLIT \|\| LfnstDcOnly == 0) && | — |
| LfnstZeroOutSigCoeffFlag == 1) | |
| lfnst_idx | ae(v) |
| } | — |
| if( treeType != DUAL_TREE_CHROMA && lfnst_idx == 0 && | — |
| transform_skip_flag[ x0 ][ y0 ][ 0 ] == 0 && | |
| Max( cbWidth, cbHeight ) <= 32 && | |
| IntraSubPartitionsSplit[ x0 ][ y0 ] == ISP_NO_SPLIT && cu_sbt_flag == | |
| 0 && | |
| MtsZeroOutSigCoeffFlag == 1 && tu_cbf_luma[ x0 ][ y0 ] ) { | |
| if( ( ( CuPredMode[ chType ][ x0 ][ y0 ] == MODE_INTER && | — |
| sps_explicit_mts_inter enabled flag ) \|\| | |
| ( CuPredMode[ chType ][ x0 ][ y0 ] == MODE_INTRA && | |
| sps_explicit_mts_intra_enabled_flag ) ) ) | |
| mts_idx | ae(v) |
| } | — |
| } | — |

TABLE 94

| coding_unit( x0, y0, cbWidth, cbHeight, cqtDepth, treeType, modeType ) { | Descriptor |
|---|---|
| . . . | — |
| LfnstDcOnly = 1 | — |
| LfnstZeroOutSigCoeffFlag = 1 | — |
| MtsZeroOutSigCoeffFlag = 1 | — |
| transform_tree( x0, y0, cbWidth, cbHeight, treeType, chType ) | — |
| lfnstWidth = ( tree Type == DUAL_TREE_CHROMA ) ? cbWidth / SubWidthC | — |
| : ( ( IntraSubPartitionsSplitType == ISP_VER_SPLIT ) ? cbWidth / | |
| NumIntraSubPartitions : cbWidth ) | |
| lfnstHeight = ( treeType == DUAL_TREE_CHROMA ) ? cbHeight / SubHeightC | — |
| : ( ( IntraSubPartitionsSplitType == ISP_HOR_SPLIT) ? cbHeight / | |
| NumIntraSubPartitions : cbHeight ) | |
| if( Min( lfnstWidth, lfnstHeight ) >= 4 && sps_lfnst_enabled_flag == 1 && | — |
| CuPredMode[ chType ][ x0 ][ y0 ] == MODE INTRA && | |
| ( treeType == DUAL_TREE_LUMA && | |
| transform_skip_flag[ x0 ][ y0 ][ 0 ] == 0) && | |
| ( treeType == DUAL_TREE_CHROMA \|\| ( !intra_mip_flag[ x0 ][ y0 ] \|\| | |
| Min( lfnstWidth, lfnstHeight ) >= 16 ) ) && | |
| Max( cbWidth, cbHeight ) <= MaxTbSize Y) { | |
| if( ( IntraSubPartitionsSplitType != ISP_NO_SPLIT \|\| LfnstDcOnly == 0) && | — |
| LfnstZeroOutSigCoeffFlag == 1) | |
| lfnst_idx | ae(v) |
| } | — |
| if( treeType != DUAL_TREE_CHROMA && lfnst_idx == 0 && | — |
| transform skip flag[ x0 ][ y0 ][ 0 ] == 0 && Max( cbWidth, cbHeight ) <= | |
| 32 && | |
| IntraSubPartitionsSplit[ x0 ][ y0 ] == ISP_NO_SPLIT && cu_sbt_flag == | |
| 0 && | |
| MtsZeroOutSigCoeffFlag == 1 && tu_cbf_luma[ x0 ][ y0 ] ) { | |
| if( ( ( CuPredMode[ chType ][ x0 ][ y0 ] == MODE INTER && | — |
| sps explicit mts inter enabled flag ) \|\| | |
| ( CuPredMode[ chType ][ x0 ][ y0 ] == MODE INTRA && | |
| sps explicit mts intra enabled flag ) ) ) | |
| mts_idx | ae(v) |
| } | — |
| } | — |

TABLE 95

| coding_unit( x0, y0, cbWidth, cbHeight, cqtDepth, treeType, modeType ) { | Descriptor |
|---|---|
| . . . | |
| LfnstDcOnly = 1 | — |
| LfnstZeroOutSigCoeffFlag = 1 | — |
| MtsZeroOutSigCoeffFlag = 1 | — |
| transform_tree( x0, y0, cbWidth, cbHeight, treeType, chType ) | — |
| lfnstWidth = ( treeType == DUAL_TREE_CHROMA ) ? cbWidth / SubWidthC : ( ( IntraSubPartitionsSplitType == ISP_VER_SPLIT ) ? cbWidth / NumIntraSubPartitions : cbWidth ) | — |
| lfnstHeight = ( treeType == DUAL_TREE_CHROMA ) ? cbHeight / SubHeightC : ( ( IntraSubPartitionsSplitType == ISP_HOR_SPLIT) ? cbHeight / NumIntraSubPartitions : cbHeight ) | — |
| if( Min( lfnstWidth, lfnstHeight ) >= 4 && sps_lfnst_enabled_flag == 1 && CuPredMode[ chType ][ x0 ][ y0 ] == MODE_INTRA && ( ( treeType == SINGLE_TREE \|\| treeType == DUAL_TREE_LUMA ) && transform skip flag[ x0 ][ y0 ][ 0 ] == 0 ) && ( treeType == DUAL_TREE_CHROMA \|\| ( !intra_mip_flag[ x0 ][ y0 ] \|\| Min( lfnstWidth, lfnstHeight ) >= 16) ) && Max( cbWidth, cbHeight ) <= Max TbSize Y) { | — |
| if( ( IntraSubPartitionsSplitType != ISP_NO_SPLIT \|\| LfnstDcOnly == 0) && LfnstZeroOutSigCoeffFlag == 1) | — |
| lfnst_idx | ae(v) |
| } | — |
| if( treeType != DUAL TREE CHROMA && lfnst idx == 0 && transform_skip_flag[ x0 ][ y0 ][ 0 ] == 0 && Max( cbWidth, cbHeight ) <= 32 && IntraSubPartitionsSplit[ x0 ][ y0 ] == ISP_NO_SPLIT && cu_sbt_flag == 0 && MtsZeroOutSigCoeffFlag == 1 && tu_cbf_luma[ x0 ][ y0 ] ) { | — |
| if( ( ( CuPredMode[ chType ][ x0 ][ y0 ] == MODE INTER && sps_explicit_mts_inter_enabled_flag ) ( CuPredMode[ chType ][ x0 ][ y0 ] == MODE INTRA && sps_explicit_mts_intra_enabled_flag ) ) ) | — |
| mts_idx | ae(v) |
| } | — |
| } | — |

TABLE 96

| coding_unit( x0, y0, cbWidth, cbHeight, cqtDepth, treeType, mode Type ) { | Descriptor |
|---|---|
| . . . | |
| LfnstDcOnly = 1 | — |
| LfnstZeroOutSigCoeffFlag = 1 | — |
| MtsZeroOutSigCoeffFlag = 1 | — |
| transform tree( x0, y0, cbWidth, cbHeight, treeType, chType ) | — |
| lfnstWidth = ( treeType == DUAL_TREE_CHROMA ) ? cbWidth / SubWidthC : ( ( IntraSubPartitionsSplitType == ISP VER SPLIT ) ? cbWidth / NumIntraSubPartitions : cbWidth ) | — |
| lfnstHeight = ( treeType == DUAL_TREE_CHROMA ) ? cbHeight / SubHeightC : ( ( IntraSubPartitionsSplitType == ISP_HOR_SPLIT) ? cbHeight / NumIntraSubPartitions : cbHeight ) | — |
| if( Min( lfnstWidth, lfnstHeight ) >= 4 && sps_lfnst_enabled_flag == 1 && CuPredMode[ chType ][ x0 ][ y0 ] == MODE INTRA && ( treeType == DUAL TREE CHROMA && ( transform skip flag[ x0 ][ y0 ][ 1 ] == 0 && transform_skip_flag[ x0 ][ y0 ][ 2 ] == 0)) && ( treeType == DUAL TREE CHROMA \|\| ( !intra mip flag[ x0 ][ y0 ] Min( lfnstWidth, lfnstHeight ) >= 16) ) && Max( cbWidth, cbHeight ) <= MaxTbSize Y) { | — |
| if( ( IntraSubPartitionsSplitType != ISP_NO_SPLIT \|\| LfnstDcOnly == 0) && LfnstZeroOutSigCoeffFlag == 1) | — |
| lfnst_idx | ae(v) |
| } | — |
| if( treeType != DUAL_TREE_CHROMA && lfnst_idx == 0 && transform skip flag[ x0 ][ y0 ][ 0 ] == 0 && Max( cbWidth, cbHeight ) <= 32 && IntraSubPartitionsSplit[ x0 ][ y0 ] == ISP_NO_SPLIT && cu_sbt_flag == 0 && MtsZeroOutSigCoeffFlag == 1 && tu cbf luma[ x0 ][ y0 ] ) { | — |
| if( ( ( CuPredMode[ chType ][ x0 ][ y0 ] == MODE INTER && | — |

TABLE 96-continued

<table>
<tr><th>coding_unit( x0, y0, cbWidth, cbHeight, cqtDepth, treeType, mode Type ) {</th><th>Descriptor</th></tr>
<tr><td>sps_explicit_mts_inter_enabled_flag ) ||</td><td></td></tr>
<tr><td>( CuPredMode[ chType ][ x0 ][ y0 ] == MODE_INTRA &&</td><td></td></tr>
<tr><td>sps explicit mts intra enabled flag ) ) )</td><td></td></tr>
<tr><td>mts idx</td><td>ae(v)</td></tr>
<tr><td>}</td><td>—</td></tr>
<tr><td>}</td><td>—</td></tr>
</table>

TABLE 97

<table>
<tr><th>coding_unit( x0, y0, cbWidth, cbHeight, cqtDepth, treeType, modeType ) {</th><th>Descriptor</th></tr>
<tr><td>. . .</td><td></td></tr>
<tr><td>LfnstDcOnly = 1</td><td>—</td></tr>
<tr><td>Lfnst ZeroOutSigCoeffFlag = 1</td><td>—</td></tr>
<tr><td>MtsZeroOutSigCoeffFlag = 1</td><td>—</td></tr>
<tr><td>transform_tree( x0, y0, cbWidth, cbHeight, treeType, chType )</td><td>—</td></tr>
<tr><td>lfnstWidth = ( treeType == DUAL_TREE_CHROMA ) ? cbWidth / SubWidthC</td><td>—</td></tr>
<tr><td>: ( ( IntraSubPartitionsSplitType == ISP VER SPLIT ) ? cbWidth /</td><td></td></tr>
<tr><td>NumIntraSubPartitions : cbWidth )</td><td></td></tr>
<tr><td>lfnstHeight = ( treeType == DUAL TREE CHROMA ) ? cbHeight / SubHeightC</td><td>—</td></tr>
<tr><td>: ( ( IntraSubPartitionsSplitType == ISP_HOR_SPLIT) ? cbHeight /</td><td></td></tr>
<tr><td>NumIntraSubPartitions : cbHeight )</td><td></td></tr>
<tr><td>if( Min( lfnstWidth, lfnstHeight ) >= 4 && sps_lfnst_enabled_flag == &&</td><td>—</td></tr>
<tr><td>CuPredMode[ chType ][ x0 ][ y0 ] == MODE INTRA &&</td><td></td></tr>
<tr><td>( treeType == DUAL TREE CHROMA &&</td><td></td></tr>
<tr><td>( transform skip flag[ x0 ][ y0 ][ 1] == 0 &&</td><td></td></tr>
<tr><td>transform_skip_flag[ x0 ][ y0 ][ 2 ] == 0 ) && ChromaArray Type != 0) &&</td><td></td></tr>
<tr><td>( tree Type == DUAL_TREE_CHROMA || ( !intra_mip_flag[ x0 ][ y0 ] ||</td><td></td></tr>
<tr><td>Min( lfnstWidth, lfnstHeight ) >= 16) ) &&</td><td></td></tr>
<tr><td>Max( cbWidth, cbHeight ) <= MaxTbSize Y) {</td><td></td></tr>
<tr><td>if( ( IntraSubPartitionsSplitType != ISP_NO_SPLIT || LfnstDcOnly == 0) &&</td><td>—</td></tr>
<tr><td>LfnstZeroOutSigCoeffFlag == 1)</td><td></td></tr>
<tr><td>lfnst_idx</td><td>ae(v)</td></tr>
<tr><td>}</td><td>—</td></tr>
<tr><td>if( treeType != DUAL_TREE_CHROMA && lfnst_idx == 0 &&</td><td>—</td></tr>
<tr><td>transform skip flag[ x0 ][ y0 ][ 0 ] == 0 && Max( cbWidth, cbHeight ) <=</td><td></td></tr>
<tr><td>32 &&</td><td></td></tr>
<tr><td>IntraSubPartitionsSplit[ x0 ][ y0 ] == ISP_NO_SPLIT && cu_sbt_flag ==</td><td></td></tr>
<tr><td>0 &&</td><td></td></tr>
<tr><td>MtsZeroOutSigCoeffFlag == 1 && tu cbf luma[ x0 ][ y0 ] ) {</td><td></td></tr>
<tr><td>if( ( ( CuPredMode[ chType ][ x0 ][ y0 ] == MODE INTER &&</td><td></td></tr>
<tr><td>sps explicit mts inter enabled flag ) ||</td><td></td></tr>
<tr><td>( CuPredMode[ chType ][ x0 ][ y0 ] == MODE INTRA &&</td><td></td></tr>
<tr><td>sps explicit mts intra enabled flag ) ) )</td><td></td></tr>
<tr><td>mts_idx</td><td>ae(v)</td></tr>
<tr><td>}</td><td>—</td></tr>
<tr><td>}</td><td>—</td></tr>
</table>

TABLE 98

<table>
<tr><th>coding_unit( x0, y0, cbWidth, cbHeight, cqtDepth, treeType, modeType ) {</th><th>Descriptor</th></tr>
<tr><td>. . .</td><td></td></tr>
<tr><td>LfnstDcOnly = 1</td><td>—</td></tr>
<tr><td>LfnstZeroOutSigCoeffFlag = 1</td><td>—</td></tr>
<tr><td>MtsZeroOutSigCoeffFlag = 1</td><td>—</td></tr>
<tr><td>transform_tree( x0, y0, cbWidth, cbHeight, treeType, chType )</td><td>—</td></tr>
<tr><td>lfnstWidth = ( treeType == DUAL_TREE_CHROMA ) ? cbWidth / SubWidthC</td><td>—</td></tr>
<tr><td>: ( ( IntraSubPartitionsSplitType == ISP VER SPLIT ) ? cbWidth /</td><td></td></tr>
<tr><td>NumIntraSubPartitions : cbWidth )</td><td></td></tr>
<tr><td>lfnstHeight = ( treeType == DUAL_TREE_CHROMA ) ? cbHeight / Sub-HeightC</td><td>—</td></tr>
<tr><td>: ( ( IntraSubPartitionsSplitType == ISP_HOR_SPLIT) ? cbHeight /</td><td></td></tr>
<tr><td>NumIntraSubPartitions : cbHeight )</td><td></td></tr>
<tr><td>if( Min( lfnstWidth, lfnstHeight ) >= 4 && sps_lfnst_enabled_flag == 1 &&</td><td>—</td></tr>
<tr><td>CuPredMode[ chType ][ x0 ][ y0 ] == MODE_INTRA &&</td><td></td></tr>
<tr><td>( ( treeType == SINGLE_TREE &&</td><td></td></tr>
<tr><td>( transform_skip_flag[ x0 ][ y0 ][ 0 ] == 0 &&</td><td></td></tr>
<tr><td>transform_skip_flag[ x0 ][ y0 ][ 1 ] == 0 &&</td><td></td></tr>
<tr><td>transform_skip_flag[ x0 ][ y0 ][ 2 ] == 0 ) ) ||</td><td></td></tr>
</table>

TABLE 98-continued

| coding_unit( x0, y0, cbWidth, cbHeight, cqtDepth, treeType, modeType ) { | Descriptor |
|---|---|
| ( treeType == DUAL_TREE_LUMA && transform_skip_flag[ x0 ][ y0 ][ 0 ] == 0) \|\| | |
| ( treeType == DUAL_TREE_CHROMA && ( transform_skip_flag[ x0 ][ y0 ][ 1] == 0 && transform_skip_flag[ x0 ][ 0 ][ 2 ] == 0 ) && ChromaArrayType != 0 ) ) && | |
| ( treeType == DUAL_TREE_CHROMA \|\| ( !intra_mip_flag[ x0 ][ y0 ] Min( lfnstWidth, lfnstHeight ) >= 16) ) && | |
| Max( cbWidth, cbHeight ) <= MaxTbSize Y) { | |
| if( ( IntraSubPartitionsSplitType != ISP NO SPLIT \|\| LfnstDcOnly == 0) && | — |
| LfnstZeroOutSigCoeffFlag == 1) | |
| lfnst_idx | ae(v) |
| } | — |
| if( treeType != DUAL_TREE_CHROMA && lfnst_idx == 0 && | — |
| transform_skip_flag[ x0 ][ y0 ][ 0 ] == 0 && Max( cbWidth, cbHeight ) <= 32 && | |
| IntraSubPartitionsSplit[ x0 ][ y0 ] == ISP_NO_SPLIT && cu_sbt_flag == 0 && | |
| MtsZeroOutSigCoeffFlag == 1 && tu_cbf_luma[ x0 ][ y0 ] ) { | |
| if( ( ( CuPredMode[ chType ][ x0 ][ y0 ] == MODE_INTER && | — |
| sps_explicit_mts_inter_enabled_flag ) | |
| ( CuPredMode[ chType ][ x0 ][ y0 ] == MODE_INTRA && | |
| sps_explicit_mts_intra_enabled_flag ) ) ) | |
| mts_idx | ae(v) |
| } | — |
| } | — |

TABLE 99

| coding_unit( x0, y0, cbWidth, cbHeight, cqtDepth, treeType, mode Type ) { | Descriptor |
|---|---|
| . . . | |
| LfnstDcOnly = 1 | — |
| LfnstZeroOutSigCoeffFlag = 1 | — |
| MtsZeroOutSigCoeffFlag = 1 | — |
| transform_tree( x0, y0, cbWidth, cbHeight, treeType, chType ) | — |
| lfnstWidth = ( treeType == DUAL_TREE_CHROMA ) ? cbWidth / SubWidthC | — |
| : ( ( IntraSubPartitionsSplit Type == ISP VER SPLIT ) ? cbWidth / NumIntraSubPartitions : cbWidth ) | |
| lfnstHeight = ( treeType == DUAL TREE CHROMA ) ? cbHeight / SubHeightC | — |
| : ( ( IntraSubPartitionsSplitType == ISP_HOR_SPLIT) ? cbHeight / NumIntraSubPartitions : cbHeight ) | |
| if( Min( lfnstWidth, lfnstHeight ) >= 4 && sps lfnst enabled flag == 1 && | — |
| CuPredMode[ chType ][ x0 ][ y0 ] == MODE_INTRA && | |
| ( ( treeType == SINGLE_TREE && ( transform_skip_flag[ x0 ][ y0 ][ 0 ] == 0 && transform_skip_flag[ x0 ][ y0 ][ 1 ] == 0 && transform_skip_flag[ x0 ][ y0 ][ 2 ] == 0 ) \|\| | |
| ( treeType == DUAL_TREE_LUMA && transform_skip_flag[ x0 ][ y0 ][ 0 ] == 0) \|\| | |
| ( treeType == DUAL_TREE_CHROMA && ( transform_skip_flag[ x0 ][ y0 ][ 1 ] == 0 && transform_skip_flag[ x0 ][ y0 ][ 2] == 0) ) ) && | |
| ( treeType == DUAL_TREE_CHROMA \|\| ( !intra_mip flag[ x0 ][ y0 ] \|\| Min( lfnstWidth, lfnstHeight ) >= 16) ) && | |
| Max( cbWidth, cbHeight ) <= Max TbSize Y) { | |
| if( ( IntraSubPartitionsSplitType != ISP NO_SPLIT \|\| LfnstDcOnly == 0) && | — |
| LfnstZeroOutSigCoeffFlag == 1) | |
| lfnst_idx | ae(v) |
| } | — |
| if( treeType != DUAL_TREE_CHROMA && lfnst_idx == 0 && | — |
| transform skip flag[ x0 ][ y0 ][ 0 ] == 0 && Max( cbWidth, cbHeight ) <= 32 && | — |
| IntraSubPartitionsSplit[ x0 ][ y0 ] == ISP_NO_SPLIT && cu_sbt_flag == 0 && | |
| MtsZeroOutSigCoeffFlag == 1 && tu cbf luma[ x0 ][ y0 ] ) { | |
| if( ( ( CuPredMode[ chType ][ x0 ][ 0 ] == MODE_INTER && | — |
| sps_explicit_mts_inter enabled flag ) \| | |
| ( CuPredMode[ chType ][ x0 ][ y0 ] == MODE INTRA && | |
| sps_explicit_mts_intra enabled flag ) ) ) | |
| mts_idx | ae(v) |
| } | — |
| } | — |

TABLE 100

<table>
<tr><th>coding unit( x0, y0, cbWidth, cbHeight, cqtDepth, treeType, modeType ) {</th><th>Descriptor</th></tr>
<tr><td>. . .</td><td></td></tr>
<tr><td>LfnstDcOnly = 1</td><td>—</td></tr>
<tr><td>LfnstZeroOutSigCoeffFlag = 1</td><td>—</td></tr>
<tr><td>MtsZeroOutSigCoeffFlag = 1</td><td>—</td></tr>
<tr><td>transform_tree( x0, y0, cbWidth, cbHeight, treeType, chType )</td><td>—</td></tr>
<tr><td>lfnstWidth = ( treeType == DUAL_TREE_CHROMA ) ? cbWidth / SubWidthC<br>: ( ( IntraSubPartitionsSplitType == ISP_VER_SPLIT ) ? cbWidth /<br>NumIntraSubPartitions : cbWidth )</td><td>—</td></tr>
<tr><td>lfnstHeight = ( treeType == DUAL_TREE_CHROMA ) ? cbHeight / SubHeightC<br>: ( ( IntraSubPartitionsSplitType == ISP_HOR_SPLIT) ? cbHeight /<br>NumIntraSubPartitions : cbHeight )</td><td>—</td></tr>
<tr><td>if( Min( lfnstWidth, lfnstHeight ) >= 4 && sps_lfnst_enabled_flag 1 &&<br>CuPredMode[ chType ][ x0 ][ y0 ] == MODE _INTRA &&<br>( ( ( treeType == SINGLE TREE || treeType == DUAL_TREE_LUMA ) &&<br>transform_skip_flag[ x0 ][ y0 ][ 0 ] == 0) ||<br>( treeType == DUAL_TREE_CHROMA &&<br>( transform_skip_flag[ x0 ][ y0 ][ 1] == 0 &&<br>transform_skip_flag[ x0 ][ y0 ][ 2 ] == 0 ) && ChromaArrayType != 0 ) ) &&<br>( treeType == DUAL_TREE_CHROMA || ( !intra_mip_flag[ x0 ][ y0 ] ||<br>Min( lfnstWidth, lfnstHeight ) >= 16) ) &&<br>Max( cbWidth, cbHeight ) <= MaxTbSize Y) {</td><td>—</td></tr>
<tr><td>if( ( IntraSubPartitionsSplitType != ISP_NO_SPLIT || LfnstDcOnly == 0) &&<br>LfnstZeroOutSigCoeffFlag == 1)</td><td>—</td></tr>
<tr><td>lfnst_idx</td><td>ae(v)</td></tr>
<tr><td>}</td><td>—</td></tr>
<tr><td>if( treeType != DUAL TREE CHROMA && lfnst_idx == 0 &&<br>transform_skip_flag[ x0 ][ y0 ][ 0 ] == 0 && Max( cbWidth, cbHeight ) <=<br>32 &&<br>IntraSubPartitionsSplit[ x0 ][ y0 ] == ISP NO SPLIT && cu sbt flag == 0 &&<br>MtsZeroOutSigCoeffFlag == 1 && tu_cbf luma[ x0 ][ y0 ]) {</td><td>—</td></tr>
<tr><td>if( ( ( CuPredMode[ chType ][ x0 ][ y0 ] == MODE_INTER &&<br>sps explicit mts inter enabled flag ) ||<br>( CuPredMode[ chType ][ x0 ][ y0 ] MODE_INTRA &&<br>sps_explicit_mts_intra enabled_flag ) ) )</td><td>—</td></tr>
<tr><td>mts_idx</td><td>ae(v)</td></tr>
<tr><td>}</td><td>—</td></tr>
<tr><td>}</td><td></td></tr>
</table>

TABLE 101

<table>
<tr><th>coding_unit( x0, y0, cbWidth, cbHeight, cqtDepth, treeType, modeType ) {</th><th>Descriptor</th></tr>
<tr><td>. . .</td><td></td></tr>
<tr><td>LfnstDcOnly = 1</td><td>—</td></tr>
<tr><td>LfnstZeroOutSigCoeffFlag = 1</td><td>—</td></tr>
<tr><td>MtsZeroOutSigCoeffFlag = 1</td><td>—</td></tr>
<tr><td>transform_tree( x0, y0, cbWidth, cbHeight, treeType, chType )</td><td>—</td></tr>
<tr><td>lfnstWidth = ( treeType == DUAL_TREE_CHROMA ) ? cbWidth / SubWidthC<br>: ( ( IntraSubPartitionsSplitType == ISP_VER_SPLIT ) ? cbWidth /<br>NumIntraSubPartitions : cbWidth )</td><td>—</td></tr>
<tr><td>lfnstHeight = ( treeType == DUAL_TREE_CHROMA ) ? cbHeight /<br>SubHeightC<br>: ( ( IntraSubPartitionsSplitType == ISP_HOR_SPLIT) ? cbHeight /<br>NumIntraSubPartitions : cbHeight )</td><td>—</td></tr>
<tr><td>if( Min( lfnstWidth, lfnstHeight ) >= 4 && sps_lfnst_enabled_flag == 1 &&<br>CuPredMode[ chType ][ x0 ][ y0 ] == MODE_INTRA &&<br>( ( ( treeType == SINGLE_TREE || treeType == DUAL_TREE_LUMA ) &&<br>transform_skip_flag[ x0 ][ y0 ][ 0 ] == 0) ||<br>( treeType == DUAL_TREE_CHROMA &&<br>( transform skip_flag[ x0 ][ y0 ][ 1] == 0 &&<br>transform skip flag[ x0 ][ y0 ][ 2 ] == 0 ) ) ) &&<br>( treeType == DUAL_TREE_CHROMA || ( !intra_mip_flag[ x0 ][ y0 ] ||<br>Min( lfnstWidth, lfnstHeight ) >= 16) ) &&<br>Max( cbWidth, cbHeight ) <= MaxTbSize Y) {</td><td>—</td></tr>
<tr><td>if( ( IntraSubPartitionsSplitType != ISP NO SPLIT || LfnstDcOnly == 0) &&<br>LfnstZeroOutSigCoeffFlag == 1)</td><td>—</td></tr>
<tr><td>lfnst_idx</td><td>ae(v)</td></tr>
<tr><td>}</td><td>—</td></tr>
<tr><td>if( treeType != DUAL TREE CHROMA && lfnst idx == 0 &&<br>transform_skip_flag[ x0 ][ y0 ][ 0 ] == 0 && Max( cbWidth, cbHeight ) <=<br>32 &&<br>IntraSubPartitionsSplit[ x0 ][ y0 ] == ISP_NO_SPLIT && cu_sbt_flag ==</td><td>—</td></tr>
</table>

TABLE 101-continued

| coding_unit( x0, y0, cbWidth, cbHeight, cqtDepth, treeType, modeType ) { | Descriptor |
|---|---|
| 0 && | |
| MtsZeroOutSigCoeffFlag == 1 && tu_cbf_luma[ x0 ][ y0 ] ) { | |
| if( ( ( CuPredMode[ chType ][ x0 ][ y0 ] == MODE_INTER && | — |
| sps_explicit_mts_inter_enabled_flag ) \|\| | |
| ( CuPredMode[ chType ][ x0 ][ y0 ] == MODE_INTRA && | |
| sps_explicit_mts_intra enabled flag ) ) ) | |
| mts_idx | ae(v) |
| } | — |
| } | — |

TABLE 102

| coding_unit( x0, y0, cbWidth, cbHeight, cqtDepth, treeType, modeType ) { | Descriptor |
|---|---|
| . . . | |
| LfnstDcOnly = 1 | — |
| LfnstZeroOutSigCoeffFlag = 1 | — |
| MtsZeroOutSigCoeffFlag = 1 | — |
| transform tree( x0, y0, cbWidth, cbHeight, treeType, chType ) | — |
| lfnstWidth = ( treeType == DUAL_TREE_CHROMA ) ? cbWidth / SubWidthC | — |
| : ( ( IntraSubPartitionsSplitType == ISP VER SPLIT ) ? cbWidth / | |
| NumIntraSubPartitions : cbWidth ) | |
| lfnstHeight = ( treeType == DUAL TREE CHROMA ) ? cbHeight / SubHeightC | — |
| : ( ( IntraSubPartitionsSplitType == ISP_HOR_SPLIT) ? cbHeight / | |
| NumIntraSubPartitions : cbHeight ) | |
| if( Min( lfnstWidth, lfnstHeight ) >= 4 && sps_lfnst_enabled_flag == 1 && | — |
| CuPredMode[ chType ][ x0 ][ y0 ] == MODE_INTRA && | |
| ( ( ( treeType == SINGLE TREE \|\| treeType == DUAL_TREE LUMA \|\| | |
| ChromaArrayType == 0) && transform_skip_flag[ x0 ][ y0 ][ 0 ] == 0) \|\| | |
| ( treeType == DUAL_TREE_CHROMA && | |
| ( transform_skip_flag[ x0 ][ y0 ][ 1 ] == | |
| 0 && transform skip flag[ x0 ][ y0 ][ 2 ] == 0 ) && ChromaArrayType != 0 ) ) && | |
| ( treeType == DUAL TREE CHROMA \|\| ( !intra_mip_flag[ x0 ][ y0 ] \|\| | |
| Min( lfnstWidth, lfnstHeight ) >= 16) ) && | |
| Max( cbWidth, cbHeight ) <= MaxTbSizeY) { | |
| if( ( IntraSubPartitionsSplitType != ISP_NO_SPLIT \|\| LfnstDcOnly == 0) && | — |
| LfnstZeroOutSigCoeffFlag == 1) | |
| lfnst_idx | ae(v) |
| } | |
| if( treeType != DUAL_TREE_CHROMA && lfnst_idx == 0 && | — |
| transform_skip_flag[ x0 ][ y0 ][ 0 ] == 0 && Max( cbWidth, cbHeight ) <= 32 && | |
| IntraSubPartitionsSplit[ x0 ][ y0 ] == ISP_NO_SPLIT && cu_sbt_flag == 0 && | |
| MtsZeroOutSigCoeffFlag == 1 && tu_cbf_luma[ x0 ][ y0 ] ) { | |
| if( ( ( CuPredMode[ chType ][ x0 ][ y0 ] == MODE_INTER && | — |
| sps_explicit_mts_inter enabled flag ) \|\| | |
| ( CuPredMode[ chType ][ x0 ][ y0 ] == MODE_INTRA && | |
| sps_explicit_mts_intra_enabled_flag ) ) ) | |
| mts_idx | ae(v) |
| } | — |
| } | — |

TABLE 103

```
coding unit( x0, y0, cbWidth, cbHeight, cqtDepth, treeType, modeType ) {
. . .
  LfnstDcOnly = 1
  LfnstZeroOutSigCoeffFlag = 1
  MtsDcOnly = 1
  MtsZeroOutSigCoeffFlag = 1
  transform tree( x0, y0, cbWidth, cbHeight, treeType, chType )
  lfnstWidth = ( treeType == DUAL_TREE_CHROMA ) ? cbWidth / SubWidthC :
          ( ( IntraSubPartitionsSplitType == ISP_VER_SPLIT ) ?
            cbWidth / NumIntraSubPartitions : cbWidth )
  lfnstHeight = ( treeType == DUAL TREE CHROMA ) ? cbHeight / SubHeightC :
          ( ( IntraSubPartitionsSplitType ISP_HOR_SPLIT) ?
          cbHeight / NumIntraSubPartitions : cbHeight )
  lfnstNotTsFlag = ( treeType == DUAL_TREE_CHROMA ||
              !tu_y_coded_flag[ x0 ][ y0 ] ||
              transform skip flag[ x0 ][ Y0 ][ 0 ] == 0 ) &&
```

TABLE 103-continued

```
            ( treeType == DUAL_TREE_LUMA ||
              ( ( !tu cb coded flag[ x0 ]] y0 ] ||
              transform_skip_flag[ x0 ][ y0 ][ 1 ] 0 ) &&
              ( !tu_cr_coded_flag[ x0 ][ y0 ]
              transform_skip_flag[ x0 ][ y0 ][ 2] == 0)))
  if( Min( lfnstWidth, lfnstHeight ) >= 4 && sps_lfnst_enabled_flag == 1 &&
        CuPredMode[ chType ][ x0 ][ y0 ] == MODE INTRA && lfnstNotTsFlag ==
1 &&
        (treeType == DUAL_TREE_CHROMA || !IntraMipFlag[ x0 ][ y0 ] ||
          Min( lfnstWidth, lfnstHeight ) >= 16) &&
        Max( cbWidth, cbHeight ) <= MaxTbSize Y) {
     if( ( IntraSubPartitionsSplitType != ISP NO SPLIT || LfnstDcOnly == 0) &&
          LfnstZeroOutSigCoeffFlag == 1)
        lfnst_idx                                                        ae(v)
  }
  if( treeType != DUAL_TREE_CHROMA && lfnst_idx == 0 &&
        transform_skip_flag[ x0 ][ y0 ][ 0 ] == 0 && Max( cbWidth, cbHeight ) <=
32 &&
        IntraSubPartitionsSplitType == ISP_NO_SPLIT && cu_sbt_flag == 0 &&
        MtsZeroOutSigCoeffFlag == 1 && MtsDcOnly == 0) {
     if( ( ( CuPredMode[ chType ][ x0 ][ y0 ] == MODE_INTER &&
          sps_explicit_mts inter enabled flag ) ||
          ( CuPredMode[ chType ][ x0 ][ y0 ] == MODE_INTRA &&
          sps_explicit_mts_intra enabled_flag ) ) )
        mts_idx                                                          ae(v)
  }
}
```

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high-level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

The invention claimed is:

1. A video decoding method, the method comprising:

obtaining a transform skip mode flag indicating whether a transform skip mode is applied to a current block or not; and determining, based on a reference size and the transform skip mode flag, whether to decode index information, indicating whether a secondary inverse transform is applied to the current block, from a bitstream, wherein the secondary inverse transform is applied to the current block when a value of the index information is greater than 0, wherein in response that the secondary inverse transform is applied to the current block, a secondary transform matrix for the secondary inverse transform is determined based on the index information, wherein the index information is decoded from the bitstream when the reference size is greater than a threshold value, and wherein the reference size is varied according to whether an ISP (Intra Sub-Partitioning) is applied to the current block or not.

2. The video decoding method of claim 1, wherein the secondary transform matrix of the current block is determined further based on a transform matrix set index of the current block, and a size of the current block.

3. The video decoding method of claim 1 comprising:

obtaining information on whether an intra residual DPCM (Depta Pulse Coded Modulation) method is used for the current block, wherein the transform skip mode flag is obtained from the bitstream in response to the information on whether an intra residual DPCM method is used indicating that the intra residual DPCM method is not used for the current block, and wherein in response to the information on whether an intra residual DPCM method is used indicating that the intra residual DPCM method is used for the current block, the transform skip mode flag is not obtained from the bitstream, and it is determined that a transform skip mode is applied to the current block.

4. The video decoding method of claim 1, wherein the index information for secondary transform/inverse transform of the current block is obtained when the current block is predicted according to an intra-prediction mode that is not a matrix-based intra-prediction mode.

5. The video decoding method of claim 1, wherein the transform skip mode flag is obtained for each of color components of the current block, the color components comprising a luma component, a Cb component, and a Cr component.

6. The video decoding method of claim 5, wherein in response to a tree structure of the current block is a single-tree type, even though a transform skip mode flag for the luma component indicates that the transform skip mode is not applied to the luma component, the index information is not decoded from the bitstream when at least one of a transform skip mode flag for the Cb component and a transform skip mode flag for the Cr component indicates that transform skip mode is applied to corresponding color component.

7. The video decoding method of claim 5, wherein the index information is not decoded from the bitstream, in response to a tree structure of the current block being a dual tree luma type and a transform skip mode flag for the luma component indicating that the transform skip mode is applied to the luma component.

8. The video decoding method of claim 5, wherein the index information is not decoded from the bitstream in response to a tree structure of the current block being a dual-tree chroma type, and at least one of a transform skip mode flag for the Cb component and a transform skip mode flag for the Cr component indicating that the transform skip mode is applied to corresponding color component.

9. A video encoding method, the method comprising:

entropy encoding a transform skip mode flag indicating whether a transform skip mode is applied to a current block or not; and determining, based on a reference size and whether the transform skip mode is applied to the current block, whether to encode index information, indicating whether a secondary transform is performed on the current block or not, into a bitstream, wherein when the secondary transform is applied to the current block, the index information is encoded with a value greater than 0, wherein when the secondary transform is applied to the current block, the value of the index information is determined based on a secondary transform matrix for the secondary transform, wherein the index information is encoded into the bitstream when the reference size is greater than a threshold value, and wherein the reference size is varied according to whether an ISP (Intra Sub-Partitioning) is applied to the current block or not.

10. The method of claim 1, wherein in response to the ISP being not applied to the current block, the reference size is set equal to a size of the current block, and wherein in response to the ISP being applied to the current block, the reference size is set equal to a size of a transform block which is generated by partitioning the current block.

11. The method of claim 6, wherein in response to the index information being not decoded from the bitstream, the secondary inverse transform is not applied to the luma component of the current block even though the transform skip flag for the luma component indicates that the transform skip mode is not applied to the luma component.

12. An apparatus for transmitting compressed video data, the apparatus comprising:

a processor to obtain the compressed video data which comprising a transform skip flag, indicating whether a transform skip mode is applied to a current block or not; and a transmitting unit to transmit the compressed video data, wherein whether the compressed video data further comprises index information, indicating whether a secondary transform is performed on the current block or not, or not is determined based on a reference size and whether the transform skip mode is applied to the current block, wherein when the secondary transform is applied to the current block, the index information is included in the compressed video data with a value greater than 0, wherein when the secondary transform is applied to the current block, the value of the index information is set based on a secondary transform matrix for the secondary transform, wherein the index information is included into the compressed video data when the reference size is greater than a threshold value, and wherein the reference size is varied according to whether an ISP (Intra Sub-Partitioning) is applied to the current block or not.

* * * * *